May 9, 1967 L. E. MOTT ET AL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 1

INVENTORS.
LUCILE E. MOTT
RONALD B. LOUNSBURY
BLAIR C. THOMPSON
S. PETER BEAUREGARD
JAMES L. MURTAUGH, JR.
AUGUST A. SARDINAS

BY Joseph P. Kates
ATTORNEY

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 2

INVENTORS.
LUCILE E. MOTT
RONALD B. LOUNSBURY
BLAIR C. THOMPSON
S. PETER BEAUREGARD
JAMES L. MURTAUGH, JR.
AUGUST A. SARDINAS

BY Joseph P. Kates
ATTORNEY

INVENTORS.
LUCILE E. MOTT
RONALD B. LOUNSBURY
BLAIR C. THOMPSON
S. PETER BEAUREGARD
JAMES L. MURTAUGH, JR.
AUGUST A. SARDINAS
BY Joseph P. Kates
ATTORNEY May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 4

INVENTORS.
LUCILE E. MOTT
RONALD B. LOUNSBURY
BLAIR C. THOMPSON
S. PETER BEAUREGARD
JAMES L. MURTAUGH, JR.
AUGUST A. SARDINAS

BY Joseph P. Kates
ATTORNEY

INVENTORS.
LUCILE E. MOTT
RONALD B. LOUNSBURY
BLAIR C. THOMPSON
S. PETER BEAUREGARD
JAMES L. MURTAUGH, JR.
AUGUST A. SARDINAS
BY Joseph P. Kates
ATTORNEY INVENTORS.
LUCILE E. MOTT
RONALD B. LOUNBURY
BLAIR C. THOMPSON
S. PETER BEAUREGARD
JAMES L. MURTAUGH JR.
AUGUST A. SARDINAS BY Joseph P. Kates
ATTORNEY INVENTORS.
LUCILE E. MOTT,
RONALD B. LOUNSBURY
BLAIR C. THOMPSON
S. PETER BEAUREGARD
JAMES L. MURTAUGH, JR.
AUGUST A. SARDINAS BY Joseph P. Kates

ATTORNEY

| FIG.9A |
|---|
| FIG.9B |

FIG.9

FIG.9A

| TYPE INSTRUCTION | CLASS INSTRUCTION (WITHIN TYPE) | BASIC INFORMATION REQUIRED | | | | INSTRUCTION | SYMBOLIC DESCRIPTION | SYLLABLE LAYOUT | | | |
|---|---|---|---|---|---|---|---|---|---|---|---|
| | | INSTR. | ADDRESSES | | | | | | | | |
| | | | A1 | A2 | A3 | | | | A1 | A2 | A3 |
| 3-Address | Fixed Point Arithmetic | Operator | Operand Address | Operand Address | Store Address | BAD-Binary Add | $A1 + A2 \rightarrow A3$ | 0 | (M) | (M) | (M) |
| | | | | | | BDV-Binary Divide | $A1 \div A2 \rightarrow A3$ | | | | |
| | | | | | | BMU-Binary Multiply | $A1 \times A2 \rightarrow A3$ | | | | |
| | | | | | | BSU-Binary Subtract | $A1 - A2 \rightarrow A3$ | | | | |
| | Floating Point Arithmetic | | | | | FAD-Floating Add | $A1f + A2f \rightarrow A3$ | | | | |
| | | | | | | FDV-Floating Divide | $A1f \div A2f \rightarrow A3$ | | | | |
| | | | | | | FMU-Floating Multiply | $A1f \times A2f \rightarrow A3$ | | | | |
| | | | | | | FSU-Floating Subtract | $A1f - A2f \rightarrow A3$ | | | | |
| | Logical | | | | | LAN-Logical AND | $A1 \cdot A2 \rightarrow A3$ | | | | |
| | | | | | | LOR-Logical OR | $A1 \vee A2 \rightarrow A3$ | | | | |
| | | | | | | LXR-Logical Exclusive-OR | $A1 \circledvee A2 \rightarrow A3$ | | | | |
| | Alphanumeric Compare | Operator | Operand Address | Operand Address | Branch Address | ACE-Alphanum. Compare Equal | $A1 = A2 : A3$ | 0 | (M) | (M) | B |
| | | | | | | ACG-Alphanum. Compare Greater | $A1 > A2 : A3$ | | | | |
| | | | | | | ACL-Alphanum. Compare Less | $A1 < A2 : A3$ | | | | |
| | Algebraic Compare | | | | | CEQ-Compare Equal | $A1 = A2 : A3$ | | | | |
| | | | | | | CGR-Compare Greater | $A1 > A2 : A3$ | | | | |
| | | | | | | CLS-Compare Less | $A1 < A2 : A3$ | | | | |
| | Field Arithmetic | Operator | Operand Address | Special Syllable | Store Address | BAF-Binary Add, Field | - | 0 | (M) | F | (M) |
| | | | | | | BSF-Binary Subtract, Field | - | | | | |
| | Field Logical | | | | | LAF-Logical AND, Field | - | | | | |
| | | | | | | LCF-Logical Complement, Field | - | | | | |
| | | | | | | LOF-Logical OR, Field | - | | | | |
| | | | | | | LXF-Logical Exclusive-OR, Field | - | | | | |
| | Field Adjust | | | | | AIF-Adjust and Insert, Field | - | | | | |
| | | | | | | SAF-Strip and Adjust, Field | - | | | | |
| | | | | | | SHF-Shift | A2 shifted by $A1 \rightarrow A3$ | 0 | (M) | S | (M) |
| | | | | | | TRM-Transmit Modified | A1 by $A2 \rightarrow A3$ | 0 | (M) | $V_T$ | (M) |
| | Field Compare | Operator | Operand Address | Special Syllable | Branch Address | CEF-Compare Equal, Field | - | 0 | (M) | F | B |
| | | | | | | CGF-Compare Greater, Field | - | | | | |
| | | | | | | CLF-Compare Less, Field | - | | | | |
| | Alphanumeric Search | | | | | CSE-Character Search | $A = A2 : A3$ | 0 | (M) | C | B |

| TYPE INSTRUCTION | CLASS INSTRUCTION (WITHIN TYPE) | BASIC INFORMATION REQUIRED: INSTR. | ADDRESSES: A1 | A2 | A3 | INSTRUCTION | SYMBOLIC DESCRIPTION | SYLLABLE LAYOUT | A1 | A2 | A3 |
|---|---|---|---|---|---|---|---|---|---|---|---|
| 3-Address (Cont'd) | | Operator | Operand Address | Store Address | Branch Address | BRB-Branch on Bit | | 0 | (M) | (M̲) | B |
| | | Operator | Special Syllable | Special Syllable | Branch Address | RPT-Repeat | Repeat A3 by A2, A1 Times | 0 | $R_c$ | $R_i$ | B |
| | | | | | | XLC-Index Limit Compare | - | 0 | $I_a$ | $I_v$ | B |
| | | Operator | Special Syllable | Operand Address | Branch Address | TIO-Transmit to Input/Output | - | 0 | $I_o$ | M | B |
| 2-Address | | Operator | Operand Address | Store Address | - | CBF-Convert Binary to Floating | A1→A2, floating | 0 | (M) | (M) | - |
| | | | | | | LCM-Logical Complement | A1→A2 | | | | |
| | | | | | | TRS-Transmit | A1→A2 | | | | |
| | | Operator | Operand Address | Special Syllable | - | LTF-Load Thin Film | A1→A2, thin film | 0 | (M) | T | - |
| | | | | | | LSR-Load Special Register | - | c | (M) | $V_s$ | - |
| | | Operator | Special Syllable | Special Syllable | - | SRJ-Subroutine Jump | - | 0 | $J_a$ | $J_i$ | - |
| | | Operator | Special Syllable | Branch Address | - | BRC-Branch on Condition | A1 : A2 | 0 | L | B | - |
| | | Operator | Special Syllable | Store Address | - | STF-Store Thin Film | Thin Film, A1→A2 | 0 | T | (M̲) | - |
| 1-Address | | Operator | Store Address | - | - | CLA-Clear | Zeroes→A1 | 0 | (M̲) | - | - |
| | | | | | | SER-Store External Requests | - | | | | |
| | | Operator | Branch Address | - | - | UCT-Unconditional Transfer | :A1 | 0 | B | - | - |
| No-Address | | Operator | - | - | - | HLT-Halt | - | 0 | - | - | - |
| | | | | | | IRR-Interrupt Routine Return | - | | | | |
| | | | | | | NOP-No Operation | - | | | | |
| | | | | | | RVS-Reverse Stack | - | | | | |
| | | | | | | SRR-Subroutine Return | - | | | | |
| | | | | | | SSD-Step Stack Down | - | | | | |
| | | | | | | SSU-Step Stack Up | - | | | | |

FIG. 9B

May 9, 1967 L. E. MOTT ETAL 3,319,226
DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS
Filed Nov. 30, 1962 107 Sheets-Sheet 10

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 12

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 15

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 22

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 27

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962

| BMU - Binary Multiply - 61 | 0 (M) (M) (M) $(A_1) \times (A_2) \rightarrow \overline{A}_3$ |
|---|---|

Multiply the contents of the location specified by $A_1$ by the contents of the location specified by $A_2$, store the 47 high-order bits of the double-precision product, with sign, in the location specified by $A_3$, and leave the 47 low-order bits of the double-precision product, with sign, in the TFC register.

| | |
|---|---|
| CBF - Convert Binary to Floating-Point - 25 | 0 (M) (M) $(A_1) \rightarrow A_2$, floating |

Convert the contents of the location specified by $A_1$ from binary to floating-point format, and store the result in the location specified by $A_2$.

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 42

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 44

CGF - Compare Greater Field - 51 0 (M) F B

Strip (extract) and adjust (shift) the contents of the location specified by $A_1$, as indicated by the contents of $A_2$. Alphanumerically compare this quantity with the contents of the top of the stack; if the condition is true (i. e. the 1st quantity greater, equal, or less than the contents of the top of the stack), take the next instruction from the location specified $A_3$; otherwise continue in sequence.

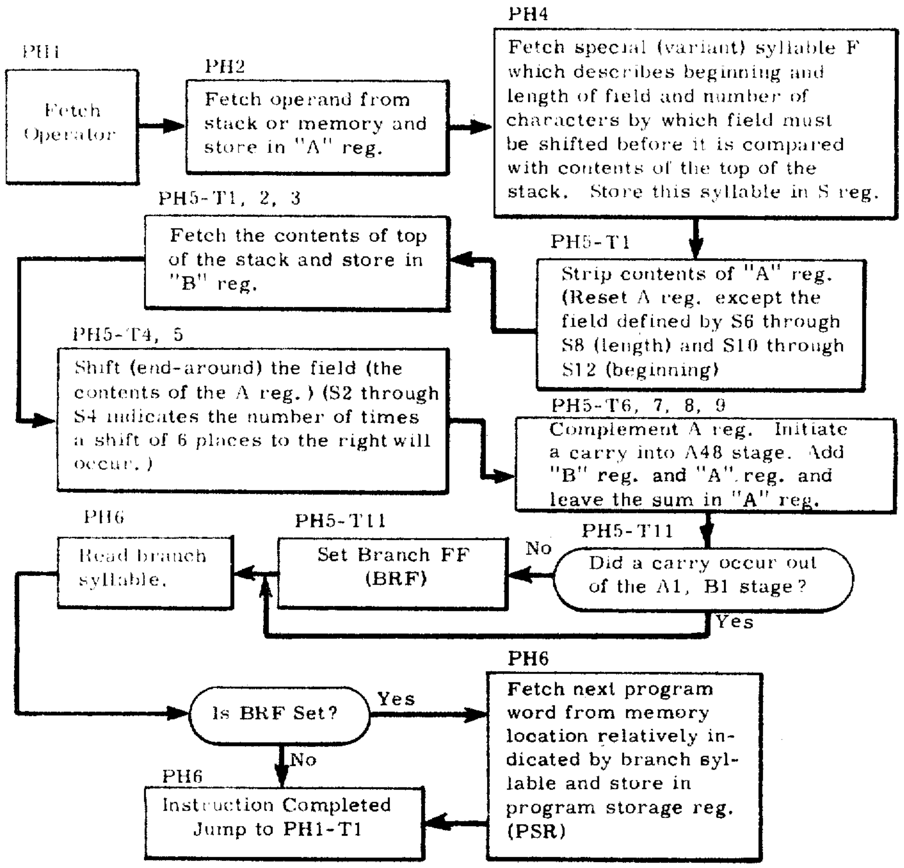

FIG. 48

CLA - Clear - 20 0 (M)
Zeroes ⟶ $\overline{A}_1$

Make the contents of the location specified by $A_1$, including the sign, equal to zero.

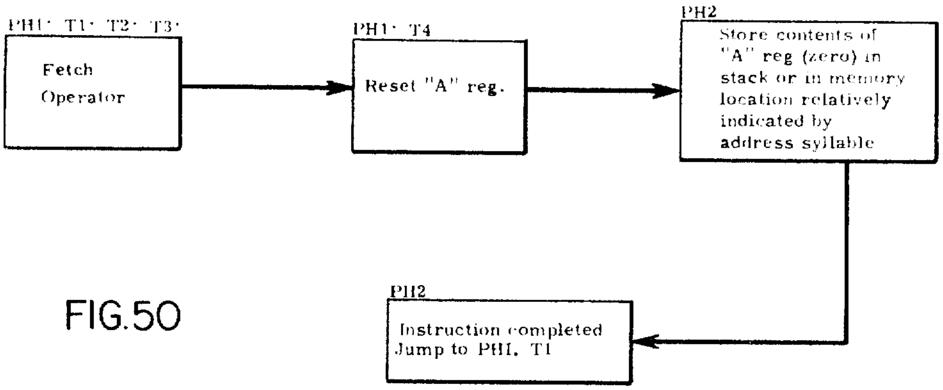

FIG. 50

HLT - Halt - 01 0

This instruction has two distinct meanings, depending on which mode of operation prevails. In the normal mode, it causes transfer to the control mode and involves the interrupt bookkeeping processes previously described. When the halt instruction is used in the control mode, the computer stops.

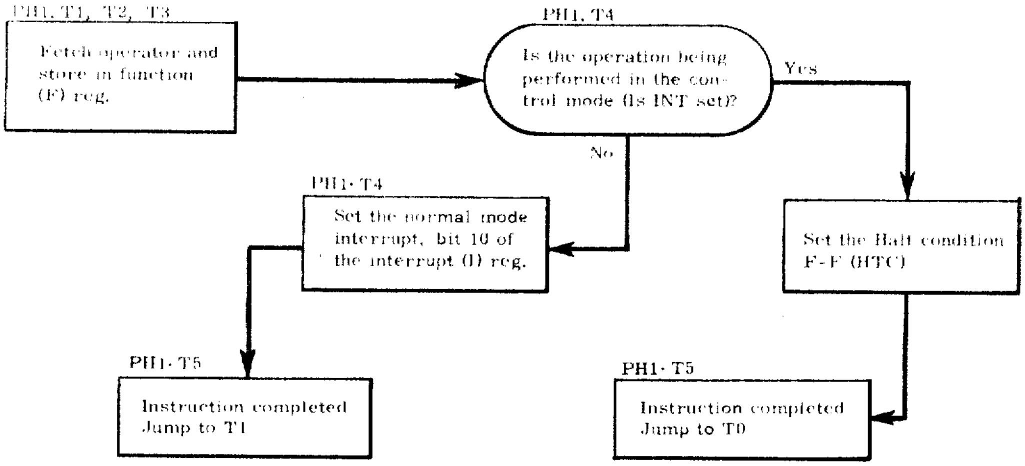

FIG. 57

CLF - Compare Less Field - 50 0 (M) F B

Strip (extract) and adjust (shift) the contents of the location specified by $A_1$, as indicated by the contents of $A_2$. Alphanumerically compare this quantity with the contents of the top of the stack; if the condition is true (e.g. the 1st quantity greater, equal, or less than the contents of the top of the stack), take the next instruction from the location by specified $A_3$; otherwise continue in sequence.

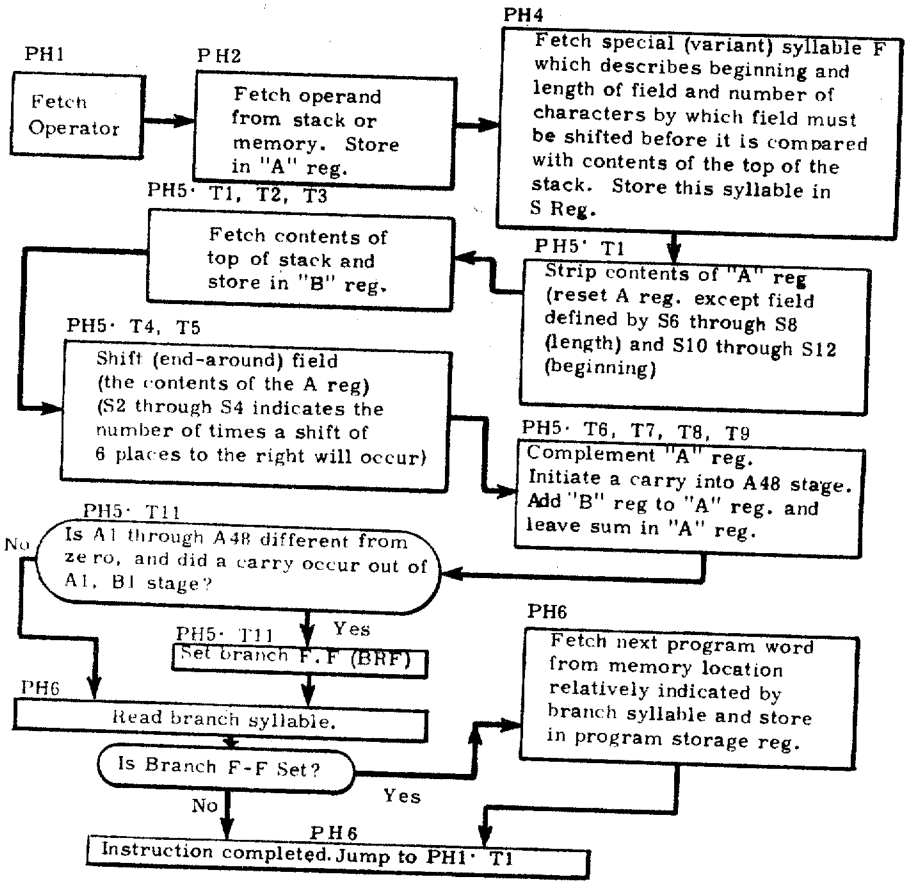

FIG. 51

CSE - Character Search - 32 0 (M) C B
Character: $(A_1) = A_2 : A_3$

Compare the six-bit character specified by bits 7 thru 12 of A2 with successive characters of the contents of the location specified by A1. Search begins to the left of the character position indicated by the thin-film character count register (CCR) and continues until the character is found or until the leftmost character has been considered. If the CCR contains zero, the search begins with the rightmost character of the word. Search is controlled by a counter (D register) loaded with the contents of the CCR. A search cycle comprises: 1) Step down counter; 2) Examine character position counter indicates; 3) test counter for zero. Counter contents at the end of the instruction is recorded in the CCR. If the character is found, the computer takes the next instruction from the location specified by A3 and the CCR indicates the position in which the character was found. If the character is not found, the computer takes the next instruction in sequence and the CCR contains zero.

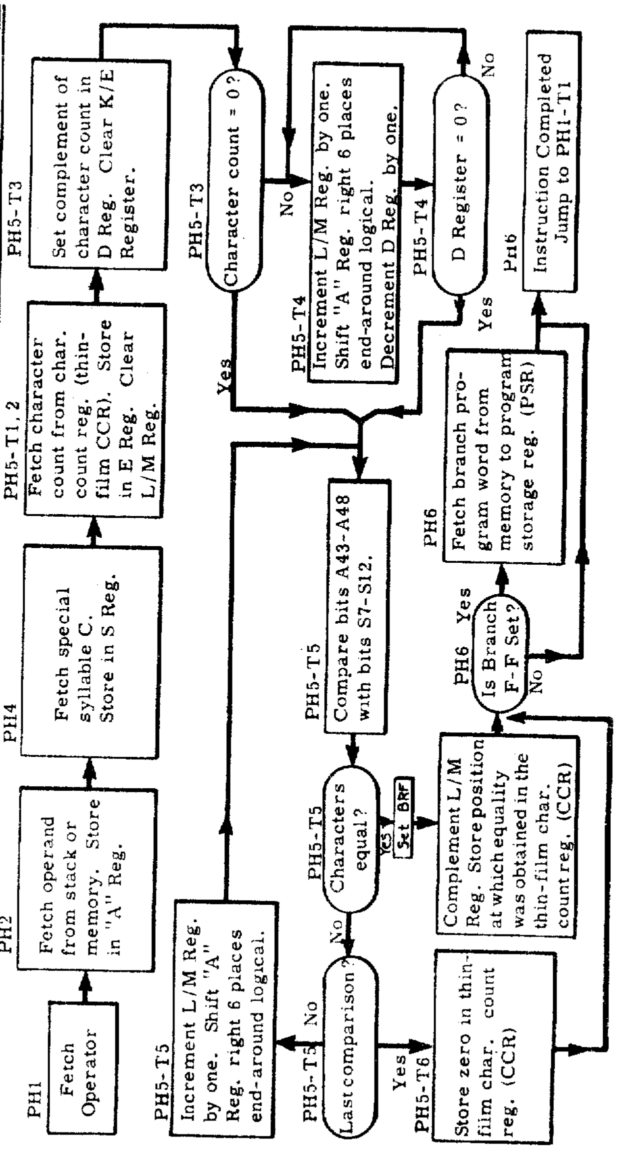

FIG. 53

| IRR - Interrupt Return - 05 | 0 |
|---|---|

Restore the contents of the BAR, BPR, and PCR, as well as the contents of the PSR and associated controls. Reset the control-mode flip-flop. Execute the next instruction contained in the restored PSR; this automatically continues the object program after interrupt processing. This instruction is operable only in the control mode.

LAN - Logical AND - 56 0 (M) (M) (M)
$(A_1) \cdot (A_2) \rightarrow \bar{A}_3$

Logically AND, bit-by-bit, the contents of the location specified by $A_1$ with the contents of the location specified by $A_2$; store the result in the location specified by $A_3$.

LOR - Logical OR - 55 0 (M) (M)
$(A_1) \vee (A_2) \rightarrow \bar{A}_3$

Logically or, bit-by-bit, the contents of the location specified by $A_1$ with the contents of the location specified by $A_2$; store the result in the location specified by $A_3$.

LXR - Logical EXCLUSIVE OR - 54 0 (M) (M)
$(A_1) \vee (A_2) \rightarrow \bar{A}_3$ Logically EXCLUSIVE OR, bit-by-bit, the contents of the location specified by $A_1$ with the contents of the location specified by $A_2$; store the result in the location specified by $A_3$.

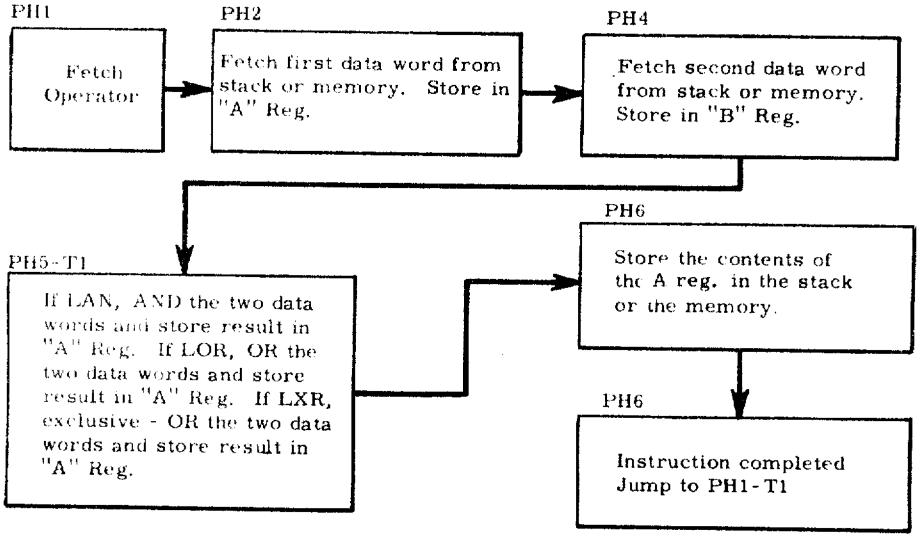

FIG. 60

LCF - Logical COMPLEMENT Field - 46 0 (M) F (M)

Strip (extract) the contents of the location specified by $A_1$ as indicated by the contents of $A_2$. One's COMPLEMENT, and strip the result as indicated by the contents of $A_2$. Clear a field of the location specified by $A_1$, this field is defined by the contents of $A_2$. Logically OR these two quantities and adjust (shift) the result as indicated by the contents of $A_2$, store the final result in the location specified by $A_3$.

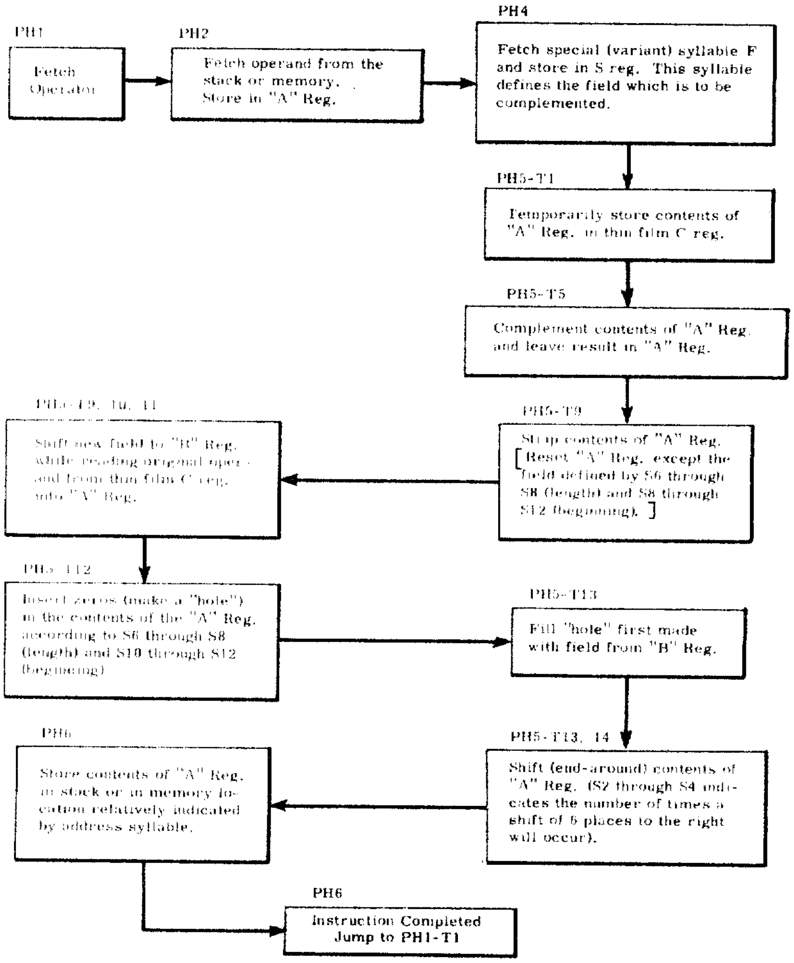

FIG. 61

LCM - Logical COMPLEMENT - 24 0 (M) $(A_1)$ (M) $A_2$

Logically (one's) COMPLEMENT, bit-by-bit, the content of the location specified by $A_1$; store the result in the location specified by $A_2$.

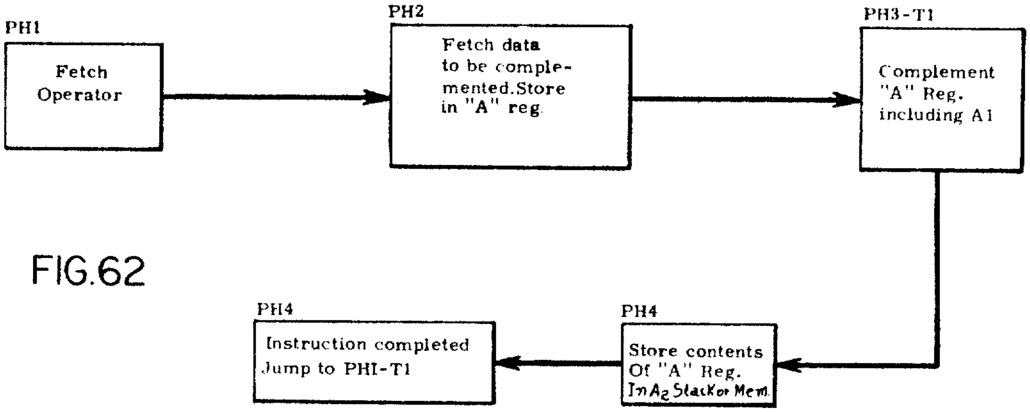

FIG. 62

SER - Store External Requests - 21 0 (M)

Store the external request lines in the least significant bits of the location specified by $A_1$. The external request lines are inputs to the D825 system whose 0 or 1 state serve to communicate a signal to a computer regarding external requests for input-output processing service.

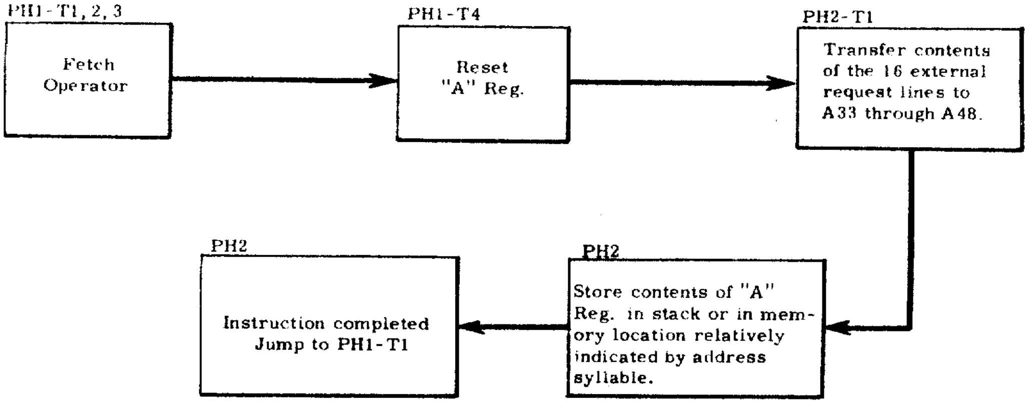

FIG. 68

| LSR - Load Special Register - 31 | 0 | (M) | Vs |
|---|---|---|---|

This instruction, operable only in the control mode, has three variations which permit loading the mask register or memory bounds registers from the least significant portion of the contents of the location specified by $A_1$, or interrupting the computer designated by the least significant bits of the contents of the location specified by $A_1$. (NOTE: This instruction must be performed in the control mode only. In the normal mode, this instruction will result in an illegal instruction interrupt.)

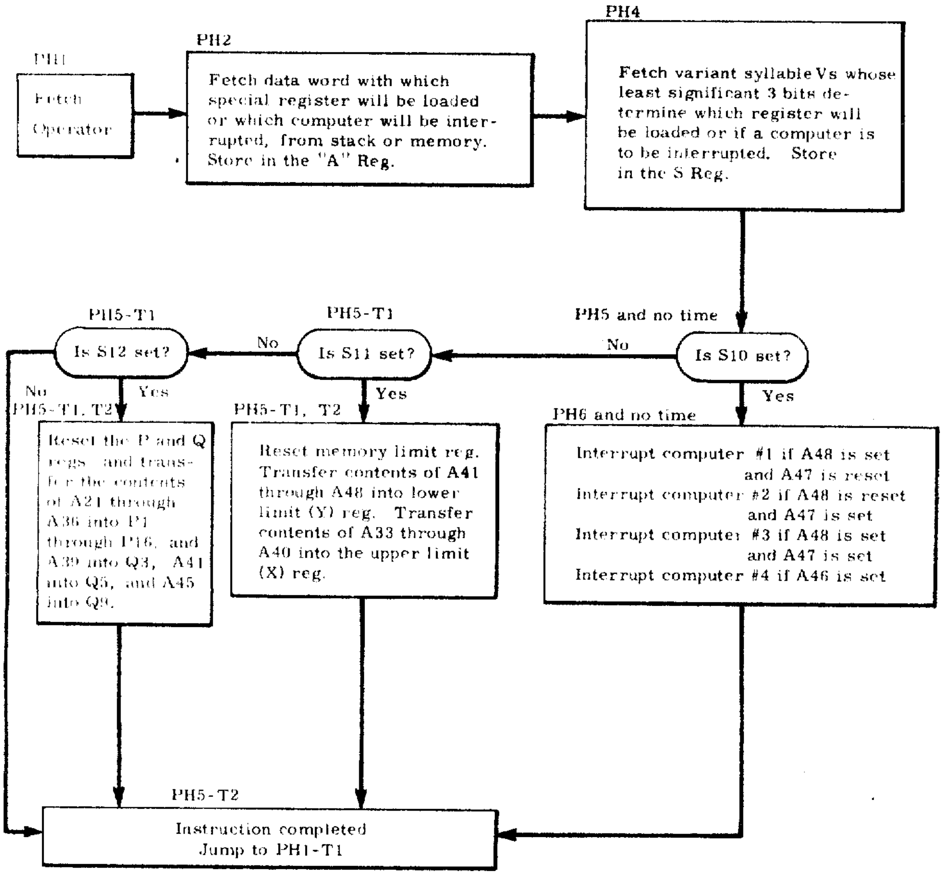

FIG. 63

LTF - Load Thin Film - 30 0 (M) T
$(A_1) \rightarrow A_2$, thin film

Load the least significant end (or whole word) of the contents of the location specified by $A_1$ into the thin film register (or group of registers) specified by $A_2$.

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 71

| | | |
|---|---|---|
| 0 1 0 0 1 0 0 • | 0 4 4 | RPR-REPEAT PROGRAM REGISTER |
| 0 1 0 0 1 0 1 | 0 4 5 | |
| 0 1 0 0 1 1 0 | 0 4 6 | |
| 0 1 0 0 1 1 1 | 0 4 7 | |
| 0 1 0 1 0 0 0 • | 0 5 0 | SSR-SUBROUTINE STORAGE REGISTER |
| 0 1 0 1 0 0 1 | 0 5 1 | |
| 0 1 0 1 0 1 0 | 0 5 2 | |
| 0 1 0 1 0 1 1 | 0 5 3 | SPARE |
| 0 1 0 1 1 0 0 • | 0 5 4 | BPR-BASE PROGRAM REGISTER |
| 0 1 0 1 1 0 1 | 0 5 5 | BAR-BASE ADDRESS REGISTER |
| 0 1 0 1 1 1 0 | 0 5 6 | SPARE |
| 0 1 0 1 1 1 1 | 0 5 7 | PCR-PROGRAM COUNT REGISTER |
| 0 1 1 0 0 0 0 • | 0 6 0 | SAR-SUBROUTINE BASE ADDRESS REGISTER |
| 0 1 1 0 0 0 1 | 0 6 1 | SPARE |
| 0 1 1 0 0 1 0 | 0 6 2 | XIR-INDEX INCREMENT REGISTER |
| 0 1 1 0 0 1 1 | 0 6 3 | IAR-INTERRUPT BASE ADDRESS REGISTER |
| 0 1 1 0 1 0 0 • | 0 6 4 | PDR-POWER FAILURE DUMP REGISTER |
| 0 1 1 0 1 0 1 | 0 6 5 | |
| 0 1 1 0 1 1 0 | 0 6 6 | SPARE |
| 0 1 1 0 1 1 1 | 0 6 7 | |
| 0 1 1 1 0 0 0 • | 0 7 0 | IDR-INTERRUPT DUMP REGISTER |
| 0 1 1 1 0 0 1 | 0 7 1 | SPARE |
| 0 1 1 1 0 1 0 | 0 7 2 | |
| 0 1 1 1 0 1 1 | 0 7 3 | |
| 0 1 1 1 1 0 0 • | 0 7 4 | |
| 0 1 1 1 1 0 1 | 0 7 5 | |
| 0 1 1 1 1 1 0 | 0 7 6 | |
| 0 1 1 1 1 1 1 | 0 7 7 | |

FIG.78A2

| THIN FILM ADDRESS | OCTAL CODE | REGISTER NAME |
|---|---|---|
| 0 0 0 0 0 0 0 • | 0 0 0 | NOT USED |
| 0 0 0 0 0 0 1 | 0 0 1 | 1 |
| 0 0 0 0 0 1 0 | 0 0 2 | 2 |
| 0 0 0 0 0 1 1 | 0 0 3 | 3 |
| 0 0 0 0 1 0 0 • | 0 0 4 | 4 |
| 0 0 0 0 1 0 1 | 0 0 5 | 5 |
| 0 0 0 0 1 1 0 | 0 0 6 | 6 |
| 0 0 0 0 1 1 1 | 0 0 7 | 7 |
| 0 0 0 1 0 0 0 • | 0 1 0 | 8 } INDEX REGISTERS 1-15 |
| 0 0 0 1 0 0 1 | 0 1 1 | 9 |
| 0 0 0 1 0 1 0 | 0 1 2 | 10 |
| 0 0 0 1 0 1 1 | 0 1 3 | 11 |
| 0 0 0 1 1 0 0 • | 0 1 4 | 12 |
| 0 0 0 1 1 0 1 | 0 1 5 | 13 |
| 0 0 0 1 1 1 0 | 0 1 6 | 14 |
| 0 0 0 1 1 1 1 | 0 1 7 | 15 |
| 0 0 1 0 0 0 0 • | 0 2 0 | 0 SPARE |
| 0 0 1 0 0 0 1 | 0 2 1 | 1 |
| 0 0 1 0 0 1 0 | 0 2 2 | 2 |
| 0 0 1 0 0 1 1 | 0 2 3 | 3 |
| 0 0 1 0 1 0 0 • | 0 2 4 | 4 |
| 0 0 1 0 1 0 1 | 0 2 5 | 5 |
| 0 0 1 0 1 1 0 | 0 2 6 | 6 |
| 0 0 1 0 1 1 1 | 0 2 7 | 7 |
| 0 0 1 1 0 0 0 • | 0 3 0 | 8 } LIMIT REGISTERS 1-15 |
| 0 0 1 1 0 0 1 | 0 3 1 | 9 |
| 0 0 1 1 0 1 0 | 0 3 2 | 10 |
| 0 0 1 1 0 1 1 | 0 3 3 | 11 |
| 0 0 1 1 1 0 0 • | 0 3 4 | 12 |
| 0 0 1 1 1 0 1 | 0 3 5 | 13 |
| 0 0 1 1 1 1 0 | 0 3 6 | 14 |
| 0 0 1 1 1 1 1 | 0 3 7 | 15 |
| 0 1 0 0 0 0 0 • | 0 4 0 | |
| 0 1 0 0 0 0 1 | 0 4 1 | } ISR-INTERRUPT STORAGE REGISTER |
| 0 1 0 0 0 1 0 | 0 4 2 | |
| 0 1 0 0 0 1 1 | 0 4 3 | SPARE |

FIG. 78A1

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

| THIN FILM ADDRESS | OCTAL CODE | REGISTER NAME |
|---|---|---|
| 1 0 0 0 0 0 0 • | 1 0 0 | PSRI-PROGRAM STORAGE REGISTER *1 |
| 1 0 0 0 0 0 1 | 1 0 1 | |
| 1 0 0 0 0 1 0 | 1 0 2 | |
| 1 0 0 0 0 1 1 | 1 0 3 | |
| 1 0 0 0 1 0 0 • | 1 0 4 | PSR2-PROGRAM STORAGE REGISTER *2 |
| 1 0 0 0 1 0 1 | 1 0 5 | |
| 1 0 0 0 1 1 0 | 1 0 6 | |
| 1 0 0 0 1 1 1 | 1 0 7 | |
| 1 0 0 1 0 0 0 • | 1 1 0 | IPR-INTERRUPT PROGRAM REGISTER |
| 1 0 0 1 0 0 1 | 1 1 1 | |
| 1 0 0 1 0 1 0 | 1 1 2 | |
| 1 0 0 1 0 1 1 | 1 1 3 | |
| 1 0 0 1 1 0 0 • | 1 1 4 | RTC-REAL TIME CLOCK |
| 1 0 0 1 1 0 1 | 1 1 5 | |
| 1 0 0 1 1 1 0 | 1 1 6 | SPARE |
| 1 0 0 1 1 1 1 | 1 1 7 | |
| 1 0 1 0 0 0 0 • | 1 2 0 | RCR-REPEAT COUNT REGISTER |
| 1 0 1 0 0 0 1 | 1 2 1 | SPARE |
| 1 0 1 0 0 1 0 | 1 2 2 | |
| 1 0 1 0 0 1 1 | 1 2 3 | CCR-CHARACTER COUNT REGISTERS |
| 1 0 1 0 1 0 0 • | 1 2 4 | TFC-THIN FILM C REGISTER |
| 1 0 1 0 1 0 1 | 1 2 5 | |
| 1 0 1 0 1 1 0 | 1 2 6 | |
| 1 0 1 0 1 1 1 | 1 2 7 | |
| 1 0 1 1 0 0 0 • | 1 3 0 | RIR-REPEAT INCREMENT REGISTERS |
| 1 0 1 1 0 0 1 | 1 3 1 | |
| 1 0 1 1 0 1 0 | 1 3 2 | |
| 1 0 1 1 0 1 1 | 1 3 3 | SPARE |
| 1 0 1 1 1 0 0 • | 1 3 4 | |
| 1 0 1 1 1 0 1 | 1 3 5 | |
| 1 0 1 1 1 1 0 | 1 3 6 | |
| 1 0 1 1 1 1 1 | 1 3 7 | |
| 1 1 0 0 0 0 0 • | 1 4 0 | STKI |
| 1 1 0 0 0 0 1 | 1 4 1 | |
| 1 1 0 0 0 1 0 | 1 4 2 | |
| 1 1 0 0 0 1 1 | 1 4 3 | |

FIG.78B1

| | | | | | | | | | | |
|---|---|---|---|---|---|---|---|---|---|---|
| 1 | 1 | 0 | 0 | 1 | 0 | 0 | • | 1 4 4 | STK2 | OPERAND STACK REGISTERS |
| 1 | 1 | 0 | 0 | 1 | 0 | 1 | | 1 4 5 | | |
| 1 | 1 | 0 | 0 | 1 | 1 | 0 | | 1 4 6 | | |
| 1 | 1 | 0 | 0 | 1 | 1 | 1 | | 1 4 7 | | |
| 1 | 1 | 0 | 1 | 0 | 0 | 0 | • | 1 5 0 | STK3 | |
| 1 | 1 | 0 | 1 | 0 | 0 | 1 | | 1 5 1 | | |
| 1 | 1 | 0 | 1 | 0 | 1 | 0 | | 1 5 2 | | |
| 1 | 1 | 0 | 1 | 0 | 1 | 1 | | 1 5 3 | | |
| 1 | 1 | 0 | 1 | 1 | 0 | 0 | • | 1 5 4 | STK4 | |
| 1 | 1 | 0 | 1 | 1 | 0 | 1 | | 1 5 5 | | |
| 1 | 1 | 0 | 1 | 1 | 1 | 0 | | 1 5 6 | | |
| 1 | 1 | 0 | 1 | 1 | 1 | 1 | | 1 5 7 | | |
| 1 | 1 | 1 | 0 | 0 | 0 | 0 | • | 1 6 0 | SPARE | |
| 1 | 1 | 1 | 0 | 0 | 0 | 1 | | 1 6 1 | | |
| 1 | 1 | 1 | 0 | 0 | 1 | 0 | | 1 6 2 | | |
| 1 | 1 | 1 | 0 | 0 | 1 | 1 | | 1 6 3 | | |
| 1 | 1 | 1 | 0 | 1 | 0 | 0 | • | 1 6 4 | | |
| 1 | 1 | 1 | 0 | 1 | 0 | 1 | | 1 6 5 | | |
| 1 | 1 | 1 | 0 | 1 | 1 | 0 | | 1 6 6 | | |
| 1 | 1 | 1 | 0 | 1 | 1 | 1 | | 1 6 7 | | |
| 1 | 1 | 1 | 1 | 0 | 0 | 0 | • | 1 7 0 | | |
| 1 | 1 | 1 | 1 | 0 | 0 | 1 | | 1 7 1 | | |
| 1 | 1 | 1 | 1 | 0 | 1 | 0 | | 1 7 2 | | |
| 1 | 1 | 1 | 1 | 0 | 1 | 1 | | 1 7 3 | | |
| 1 | 1 | 1 | 1 | 1 | 0 | 0 | • | 1 7 4 | | |
| 1 | 1 | 1 | 1 | 1 | 0 | 1 | | 1 7 5 | | |
| 1 | 1 | 1 | 1 | 1 | 1 | 0 | | 1 7 6 | | |
| 1 | 1 | 1 | 1 | 1 | 1 | 1 | | 1 7 7 | | |

FIG.78B2

May 9, 1967 L. E. MOTT ET AL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 78

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 79

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 80

May 9, 1967 L. E. MOTT ETAL 3,319,226
DATA PROCESSOR MODULE FOR A MODULAR DATA PROCESSING SYSTEM FOR
OPERATION WITH A TIME-SHARED MEMORY IN THE SIMULTANEOUS
EXECUTION OF MULTI-TASKS AND MULTI-PROGRAMS
Filed Nov. 30, 1962 107 Sheets-Sheet 83

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 85

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 90

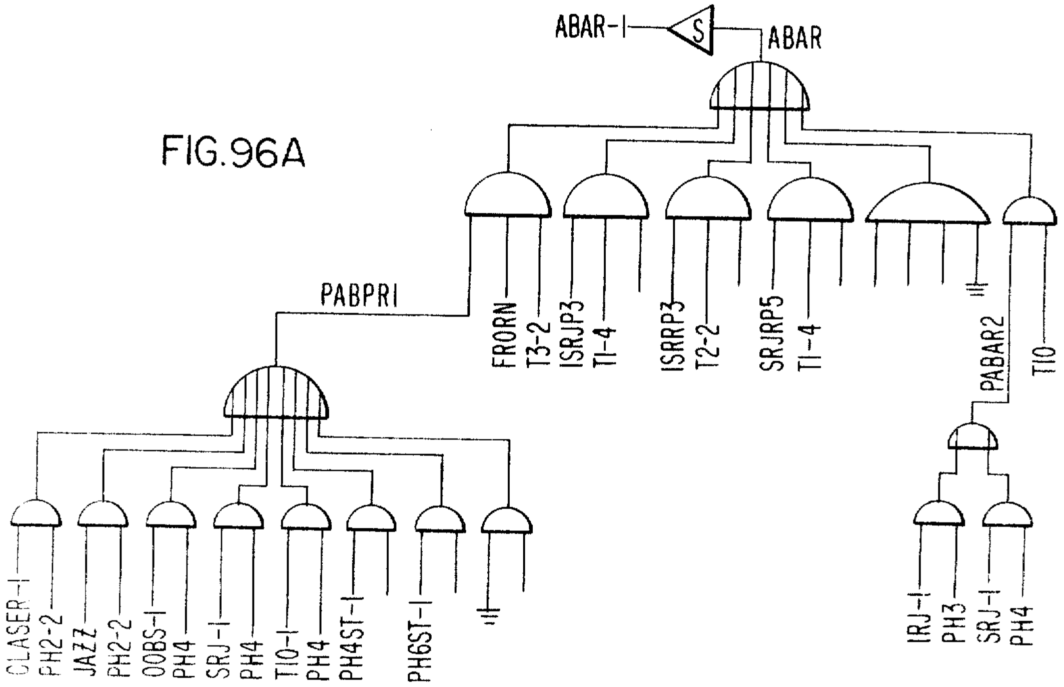
FIG. 96A
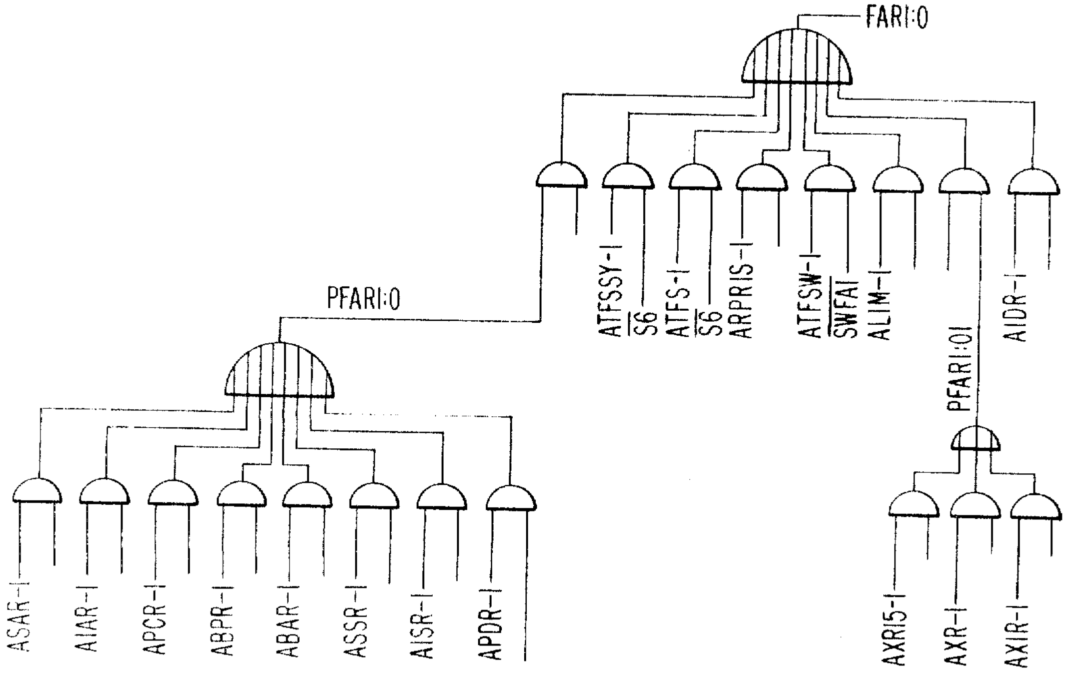
FIG. 96B1

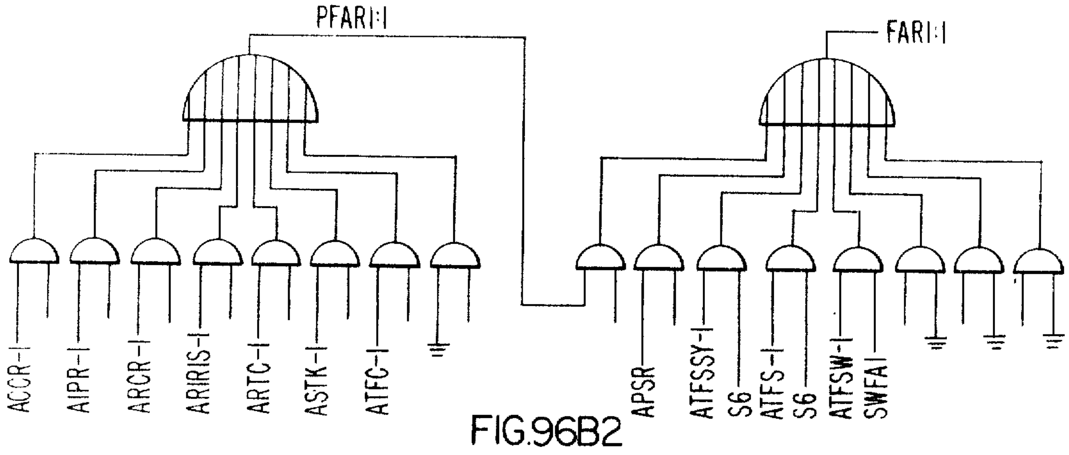
FIG.96B2
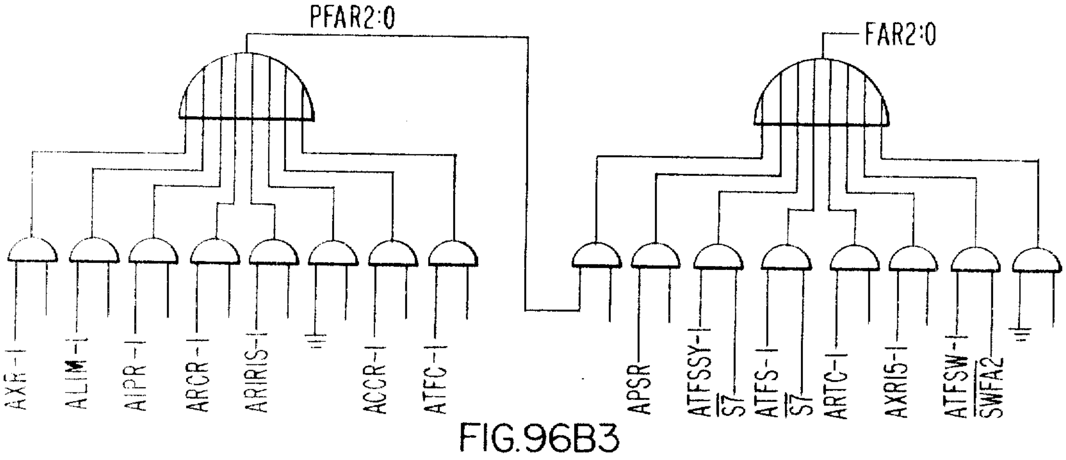
FIG.96B3
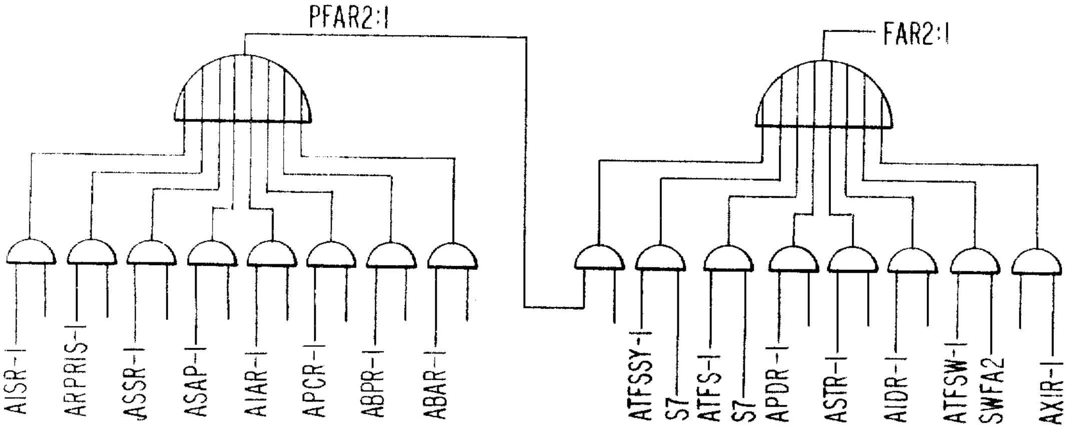
FIG.96B4

May 9, 1967 L. E. MOTT ETAL 3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Filed Nov. 30, 1962 107 Sheets-Sheet 94

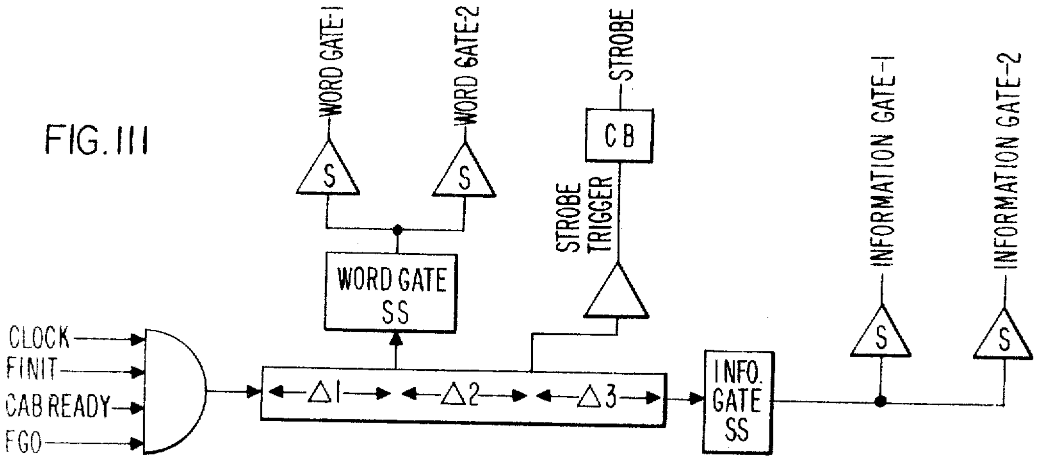
FIG. 111
SAMPLE PROGRAM (TEST MEMORY)
| WORD IN MEMORY | | | | |
|---|---|---|---|---|
| 0 0 0 0 | 1 5 4 4 | 0 0 5 7 | 3 0 3 0 | 0 0 5 5 |
| 0 0 0 1 | 3 0 3 0 | 0 0 5 4 | 2 0 4 0 | 0 0 1 2 |
| 0 0 0 2 | 3 0 5 0 | 0 0 1 2 | 0 0 0 1 | 0 0 0 0 |
| 0 0 0 3 | 3 5 5 4 | 0 0 1 1 | 0 0 0 1 | 0 0 1 2 |
| 0 0 0 4 | 3 5 5 4 | 0 0 1 1 | 0 0 0 1 | 0 0 1 3 |
| 0 0 0 5 | 7 2 7 6 | 0 0 0 1 | 0 0 1 2 | 0 0 0 1 |
| 0 0 0 6 | 0 0 1 3 | 0 0 0 7 | 0 1 0 0 | 0 0 0 0 |
| 0 0 0 7 | 1 2 5 2 | 0 0 0 1 | 0 4 2 1 | 0 0 0 0 |
| 0 0 1 0 | 2 2 4 0 | 0 0 0 3 | 0 0 0 0 | 0 0 0 0 |
| 0 0 1 1 (DATA PATTERNS) | 5 2 5 2 | 5 2 5 2 | 5 2 5 2 | 5 2 5 2 |
PROGRAM SET-UP OPERATIONS
(1) SET PCR TO FIRST PROGRAM STEP ADDRESS MINUS 1 (FOR EXAMPLE IF FIRST PROGRAM STEP IS IN LOCATION 0000 OF MEMORY 3, SET PCR TO 027777)
(2) SET LIMIT REGISTER #1 TO 7765 (10 WORDS LESS THAN 7777 OR 4096 IN OCTAL) TO TEST THE MEMORY THAT THIS PROGRAM IS IN
FIG. 112A
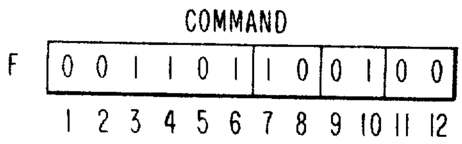
FIG. 112B United States Patent Office 3,319,226
Patented May 9, 1967

3,319,226

DATA PROCESSOR MODULE FOR A MODULAR DATA PROCESSING SYSTEM FOR OPERATION WITH A TIME-SHARED MEMORY IN THE SIMULTANEOUS EXECUTION OF MULTI-TASKS AND MULTI-PROGRAMS

Lucile E. Mott, Ardmore, Ronald B. Lounsbury, Broomall, Blair C. Thompson, King of Prussia, S. Peter Beauregard, Malvern, James L. Murtaugh, Jr., West Chester, and August A. Sardinas, Berwyn, Pa., assignors to Burroughs Corporation, Detroit, Mich., a corporation of Michigan Filed Nov. 30, 1962, Ser. No. 241,273
126 Claims. (Cl. 340—172.5)

The present invention relates to a computer. More particularly, the present invention provides a computer which may form a computer module of a modular data processing system. Such a system is described in copending U.S. patent application Ser. No. 246,855, filed Nov. 30, 1962, for Modular Computer System by James P. Anderson, Samuel A. Hoffman, Lucile E. Mott, Stanley J. Pezely, Joseph Shifman, and John A. Wilkinson.

The computer of the invention comprises structure which is operational to permit broad programming flexibility. This inventive computer is capable of accepting variable-length instructions; it provides a multilevel operand stack; it is capable of single and multiple indexing; it provides relative addressing and indirect addressing; and it incorporates subroutine control and a comprehensive interrupt system.

The computer module of the invention is the command structure of a computing system. This computer module is interconnected through a switching interlock to a plurality of memory modules and is connectible to at least one group of input/output control modules. The input/output control module group or groups are in turn connected through the switching interlock with each of the plurality of memory modules. The switching interlock may be of the type described in U.S. patent application, S.N. 89,525 of W. Hopper et al., filed Feb. 15, 1961, now Patent No. 3,274,554, for Computer Systems. Through an automatic input/output exchange unit the input/output control modules are connectible to a plurality of individual input and output units. In the computer system, each computer module, such as the computer of the present invention, has exclusive use of a data transfer bus by which it can communicate via the switching interlock with any memory module in the system. The I/O (input/output) control modules of each group have an I/O exchange through which they are connectible to input and output units, and the input/output control modules of each group may share a single bus to communicate with each of the memory modules of the system. The inventive computer has a fast access, thin-film memory portion and control system therefor. The inventive computer incorporates an arithmetic unit and controls which implement the improved instruction and operational procedures of the system.

Memory is used concurrently by all computer and I/O exchange buses. If two or more buses simultaneously address the same memory module, the switching interlock automatically resolves the conflict according to priority and queues the lower priority items. One functional bus gains immediate access while the other is delayed only until completion of the first memory transfer.

The computer of the invention provides many unique features. For example, its structure enables three-address programming and variable length instructions to provide efficiency and versatility in programming. The three-address capability takes advantage of the fact that many fundamental operations involve three factors, and therefore may need three storage locations: one each for the two operands, and one for the result. However, waste otherwise present if all instructions were of exactly three addresses is eliminated by the inventive computer structure which permits variable length instructions.

Variability and versatility in the system of this invention arises from the fact that the instructions are considered as "strings of syllables," and these strings can vary in length from one to seven syllables per instruction. Also, an instruction can begin at any syllable location of the memory word, and end with this or any succeeding syllable of the memory word, or can continue on into as many as two more succeeding memory words.

The inventive computer features a fast-access operand stack. Those operands used again and again can be kept in the stack and addressed in a shorter time than the time required to get the operand out of memory.

The invention also features capability of implementing indexing automatically by a process of modification of the address by adding the contents of one, two, or three index registers to the address in order to obtain the effective address. The contents of an index register may be modified by either replacing the contents by new contents or by adding or subtracting an increment.

The invention provides for index limit comparison by comparing the modified contents of the index register with the contents of a specific limit register, and depending upon the results of the comparison, transferring program control to the appropriate location.

For multiple indexing, this invention incorporates means and a method of adding to the address the contents of up to three index registers out of a total of 15 index registers provided. This is especially valuable in multi-coordinate systems where it is necessary to maintain more than one separate index in computing the addresses of operands in an array. The indexing means and method of the invention incorporates other features also, for example, an ample quantity of index and limit registers (15 of each) is provided. These registers are located in thin film, making them independent of program or data locations in memory. These registers are 16 bits each and, therefore, can contain an absolute memory address i.e., not relative to any base address. The contents of these index and limit registers are unsigned (not plus or minus), quantities, but if a "negative address modifier" is desired, the two's-complement "positive address modifier" serves the same purpose.

In the inventive computer relative addressing and indirect addressing are provided. The address syllable contains 12 bits to float programs and 16 bits are required to specify an absolute system address. Flexibility in addressing is provided without the full 16 bits by programming techniques in using this computer.

The program is normally contained in a block of contiguous memory locations. The beginning location of the block may be any location in memory. The address of this location is placed and retained in a thin-film register called the base program register. Any transfer of control in the program adds the literal address specified in the branch syllable to the contents of the base program register and places this sum in a program count register, another thin-film register. In this way, transfers (branches), are specified to locations relative to the beginning of the program block, and the program is loaded and executed in any position in memory with no modifications of branch addresses and no wasted indexing. Similarly, by use of the base address register provided in the thin-film memory, available space in main memory can be allocated for blocks of data to be inserted. The computer also incorporates a "snag bit" initiated feature of computer control of certain program areas.

The invention incorporates means and method whereby a set of field-defined instructions facilitates code conversion and multiple use of a memory location. A field is defined as a set of physically adjacent 6-bit characters in fixed locations in a word. The invention incorporates ability to perform arithmetic manipulation, and comparison on such fields.

The invention provides also for subroutine control. Transfer of control to a remote subroutine and of return may be effected. The transfer of control to a subroutine is made indirectly through a list of all subroutine addresses. The location of this list is specified by a subroutine base address register. This feature eases the bookkeeping required to relocate a subroutine. The instruction logic implementation means enable location of subroutine working storage area in the calling routines direct address area. Several computers of the invention may independently and simultaneously execute a subroutine through the use of independent direct address areas. Facility of handling nested and recursive subroutines is provided and use of complex subroutine jump and return instructions are facilitated by employing the invention for the multiple computer system.

The following copending U.S. patent applications are assigned to the assignee of the present invention and provide additional background information concerning system and component features to facilitate understanding of the description herein and these patent applications are incorporated by reference as a portion of this specification: U.S. patent application, Ser. No. 246,855 for "Modular Computer System," filed Nov. 30, 1962 by James P. Anderson, Samuel A. Hoffman, Lucile E. Mott, Stanley J. Pezely, Joseph Shifman, and John A. Wilkinson, which application has been referred to hereinabove; U.S. patent application, Ser. No. 241,421 for "A Data Processor Input/Output Control System, filed Nov. 30, 1962 by Stanley J. Pezely, Leonard H. Sichel, Jr., Raymond Hallman, and Cornelius C. Perkins; U.S. patent application, Ser. No. 241,225 for "Automatic Interrupt System for Data Processor," filed Nov. 30, 1962 by Cornelius C. Perkins, now U.S. Patent No. 3,274,561; U.S. patent application, Ser. No. 226,895 for "Magnetic Memory System," filed Sept. 28, 1962 by Albert M. Bates, now U.S. Patent No. 3,271,741; U.S. patent application, Ser. No. 224,344, for "High Speed Alternating Current Fault Sensing Circuit," filed Sept. 18, 1962, by Albert P. Fegely, now U.S. Patent No. 3,239,718, issued Mar. 8, 1966; U.S. patent application, Ser. No. 229,328 for "High Speed Direct Current Voltage Fault Sensing, Indicating, and Load Protecting Apparatus, filed Oct. 9, 1962 by Albert P. Fegely, now U.S. Patent No. 3,225,257, issued Dec. 21, 1965; and U.S. patent application, Ser. No. 217,009, for "Supporting Apparatus," filed Aug. 15, 1962, by Leon Mayon and Robert H. Riches, now U.S. Patent No. 3,146,017, issued Aug. 25, 1964.

The fact that the present invention pioneers a second generation of computers, very advanced over prior art computers, makes discussion of comparison and prior art disadvantages possible only generally.

No prior art machine incorporates the syllable string of the present invention. No prior art device utilizes a fast-access circular stack of limited length. No prior art computer incorporated an interrupt feature as in the invention which affords flexibility and speed in reacting to internal and external conditions.

The present invention eliminates disadvantages of the prior art going to prior art inflexibility, slowness, inadaptability, and waste, and in addition, provides advantages such as: unique features of three-address programming capability and variable length instructions which give versatility and efficiency, while maintaining economy in that where fewer than three addresses are provided, the machine has capability to take advantage of this feature.

Relative addressing provides an important advantage of the present invention in that it allows ready relocation of programs and data, merely by changing the base reference address to which the various programs and data are established as being in relation. Capability is afforded of separating the program and the data addresses. All program branches are relative to the base program register and all data addresses are relative to the data base address register. By use of this, the programs can be located and relocated at will in the memory and independently the data can be located or relocated at will in the memory. This is done with a minimum of programming by merely changing the contents of the base registers. The indirect addressing capability of the machine, which is provided for any number of levels ($n$ levels), enables greater flexibility. This indirect addressing at $n$ levels facilitates computer control of certain areas of the program if a "snag" bit is used. This enables setting of an interrupt register. The snag bit causes an interrupt.

A complex and comprehensive interrupt system facilitates the use of the computer in a control system. If an external request occurs, a computer is interrupted at the completion of its current instruction. The ability to automatically resume operation is provided. Computers may be interrupted by external requests, such as for input/output peripheral unit servicing, by internally generated signals, such as the running-down of the clock, and by other computers. Interrupt is also provided by an input/output control unit when it has finished its job. A computer which is interrupted is automatically placed in the control mode in which it can execute a special class of instructions which are not available in the normal mode. Restrictions in the normal mode are incorporated to prevent change to an automatic operating and scheduling program by overwriting memory unexpectedly, modification of the interrupt controls, and initiating the input/output unit operation for which the operating system would be unaware. These two modes of operation allow the operating system program, executed in the control mode to maintain its monitoring of all other programs.

A special type of interrupt occurs when the primary power fails. All controls necessary to resume operations are stored in non-volatile storage (in thin-film memory). System operation may resume when power is restored.

Accordingly, an object of the present invention is to provide a computer module utilizable in a modular processor, which modular processor comprises a complement of the computer modules of the invention, memory modules, input/output control modules, a switching system whereby the computers and input/output control modules share the memory modules and a common exchange of input/output devices.

Another object of the invention is to provide a computer, the arithmetic unit of which is capable of operation in parallel, but which computer can receive data in serial-parallel form, and which in incorporating fast register storage means including an operand stack, and which computer and stack in operating at a clock rate of the order of at least one megacycle provides savings in operating time.

Another object of the present invention is to provide a computer capable of operation with both binary fixed and floating point arithmetic instructions and which is oriented toward efficient floating-point computation.

Another object of the present invention is to provide a computer which is designed to incorporate all of the power of a three-address machine, but which is capable of variable length of less than the maximum of three addresses being processed with each instruction, so as to provide commensurate savings in instruction time and program storage.

Another object of the present invention is to provide a computer module for a system which adapts to real-time influence, to new programs, to changes in program priorities, and to manual or automatic interrupt signals, and wherein the operational structure permits broad programming, flexibility, and efficient operation and program storage, and wherein man-machine communication is comprehensive.

Another object of the present invention is to provide a computer incorporating a fast multiposition thin-film operand register stack wherein operands may be called from memory or alternatively from the stack of operand registers within the thin-film fast storage of the computer and wherein results of operations can be stored in memory or in the operand stack for subsequent processing at the will of the programmer.

Another object of the present invention is to provide a computer having an operand stack useful in arithmetic and processing operations to reduce the number of references to main memory by holding partial or intermediate results of computation and which stack can be operated in two modes, normal and hold.

Another object of the present invention is to provide a computer utilizing an operand stack which operates in both normal and hold mode, the hold mode being employed for list manipulation and for repeated use of a number.

Another object of the present invention is to provide a computer capable of indirect addressing for any desired number of levels.

Another object of the present invention is to provide a computer with the power of a three-address machine wherein three operand addresses can be developed for each instruction and may be modified by three of a plurality of fast index registers which combined with a powerful, indirect addressing capability provides flexible address control.

Another object of the invention is to provide a computer for use in a modular data processing system which has two modes of operation, normal and control, and wherein an interrupt system provides means for transposing operation between normal to control mode either by computer instruction or by occurrence of an event, internal or external, to the computer, and wherein the computer provides a flexible mask register interrupt modifying means to accept or ignore certain of the events which cause control mode operation.

Another object of the invention is to provide a computer for operation with control program means including an automatic operating and scheduling control and with capability of transmitting input/output descriptors to effect functions including operational control of input/output control modules.

Another object of the present invention is to provide a computer in a computer system which computer is capable of operation in a normal program controlled mode and upon interruption of its normal data processing mode of operation is capable of control mode operation and transfer of control from program control to an automatic operating and scheduling control.

Another object of the invention is to provide a computer comprising three functional areas: an arithmetic unit, a small fast magnetic storage area, and a control section with capability for indexing, address accumulation, indirect addressing, and command and subcommand functions.

Another object of the invention is to provide a multimegacycle clock operated computer with a parallel arithmetic unit capable of serial-parallel data transfer, fractional binary fixed point operation, relative direct addressing, indirect addressing, variable address structure with each address indexable, incorporating a plurality of index and limit registers and a multimegacycle auxiliary memory for data and control registers including an up-down auxiliary memory operand stack, which computer provides for parity check for switching interlock transfers and which computer incorporates a versatile instruction repetoire including binary and fixed point arithmetic instructions, field-defined instructions and control instructions.

Another object of the invention is to provide a computer capable of relative addressing wherein the relative address can become an absolute address or can become an indirect address.

Other objects and many of the attendant advantages of this invention will be readily appreciated as the same become better understood by reference to the following detailed description when considered in connection with the accompanying drawings wherein:

FIG. 1 comprises FIG. 1A and FIG. 1B which together in side-by-side relationship provide a block diagram of a preferred illustrative embodiment of the invention;

Figure 1B:
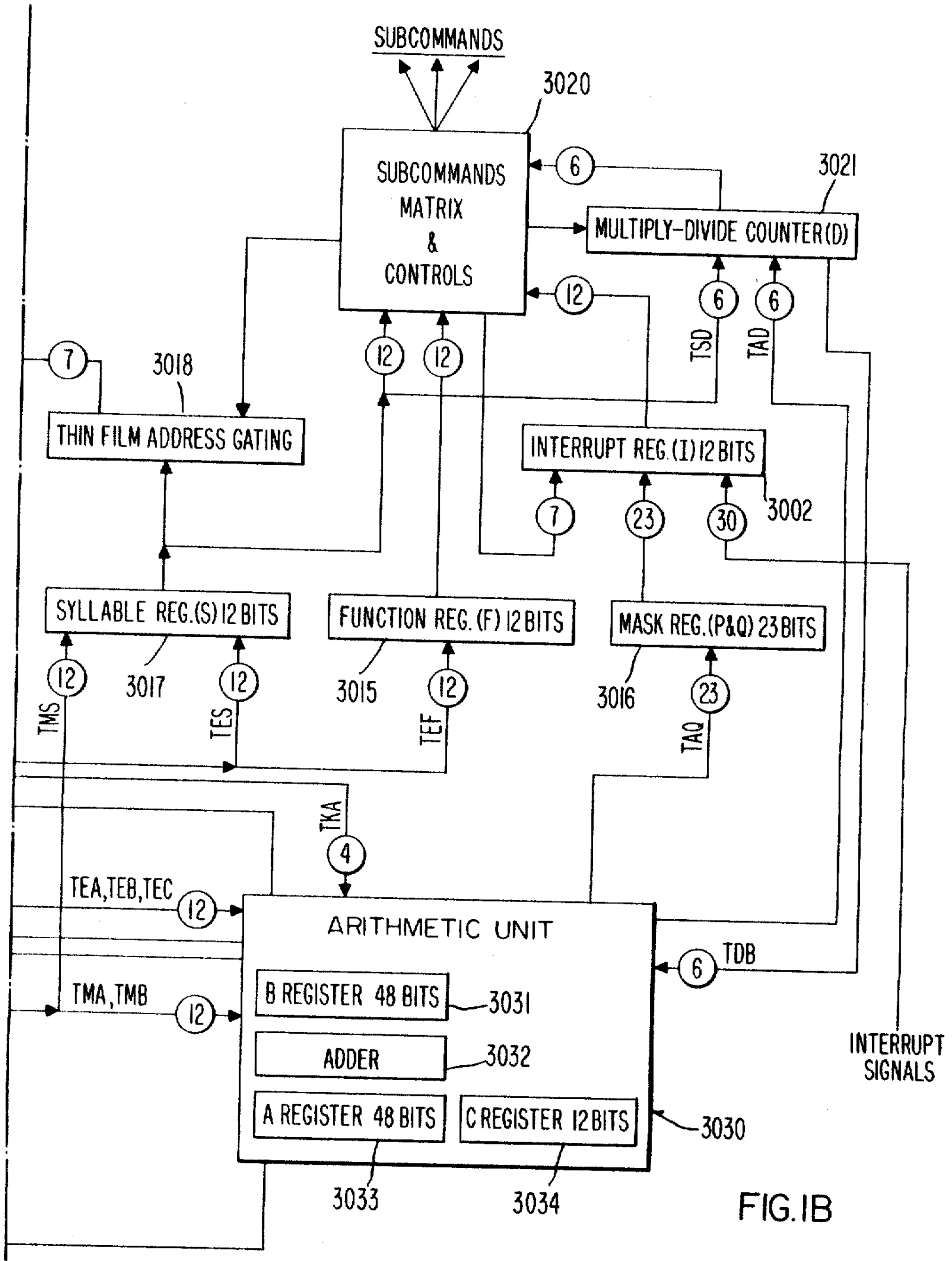
Figure 1:
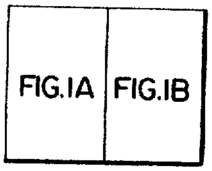
Figures 10, 10B:
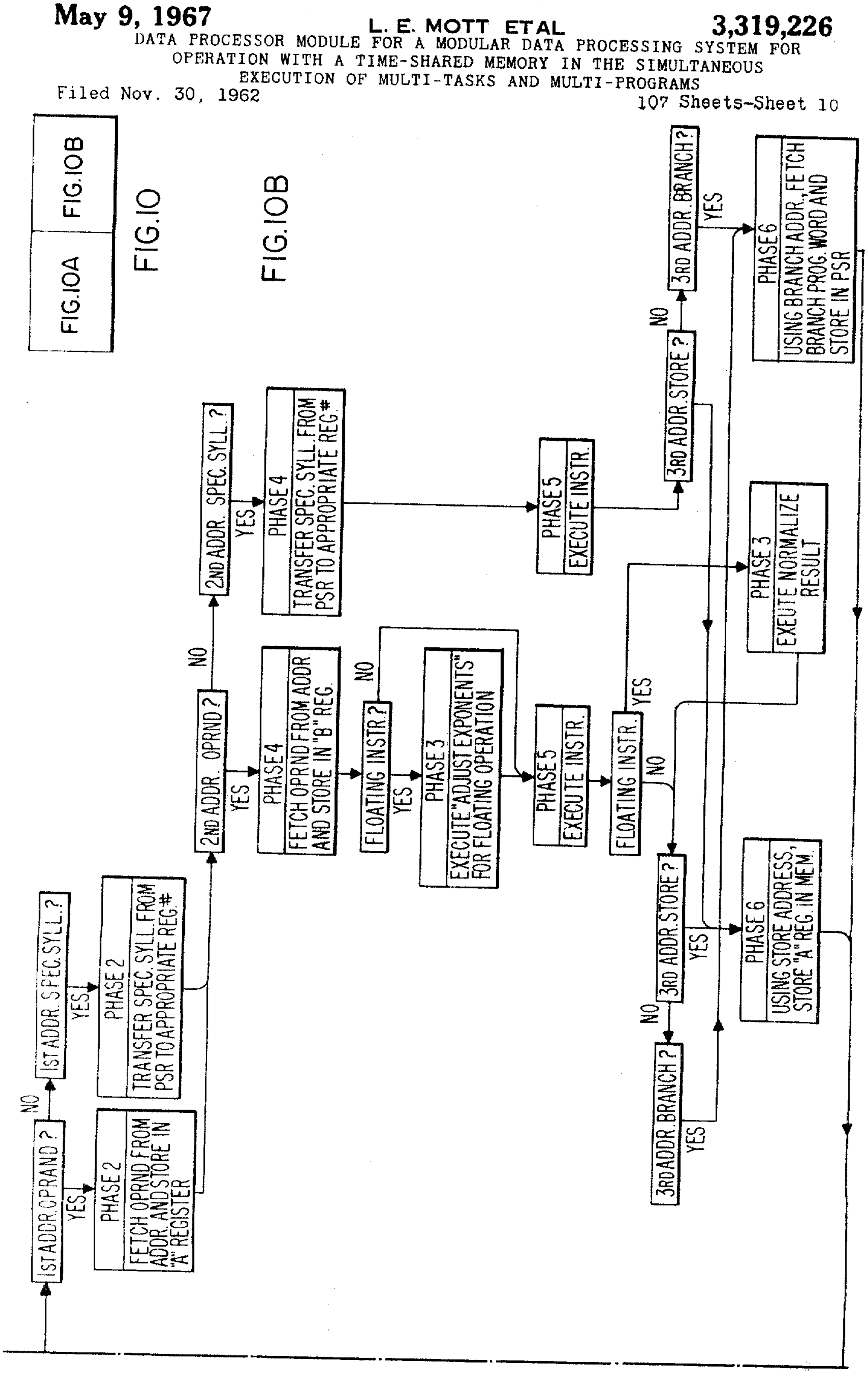
Figure 10A:
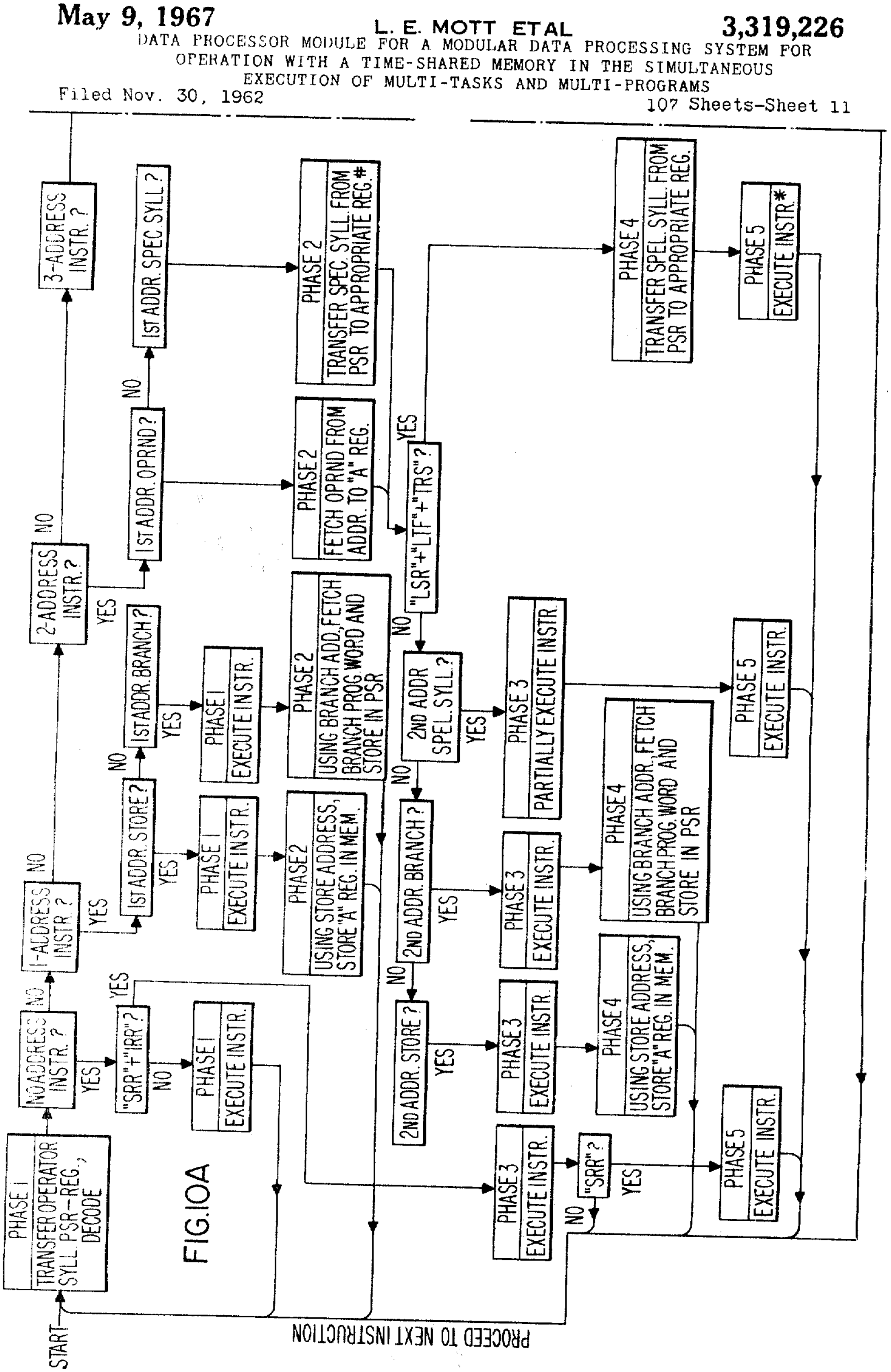
Figure 11:
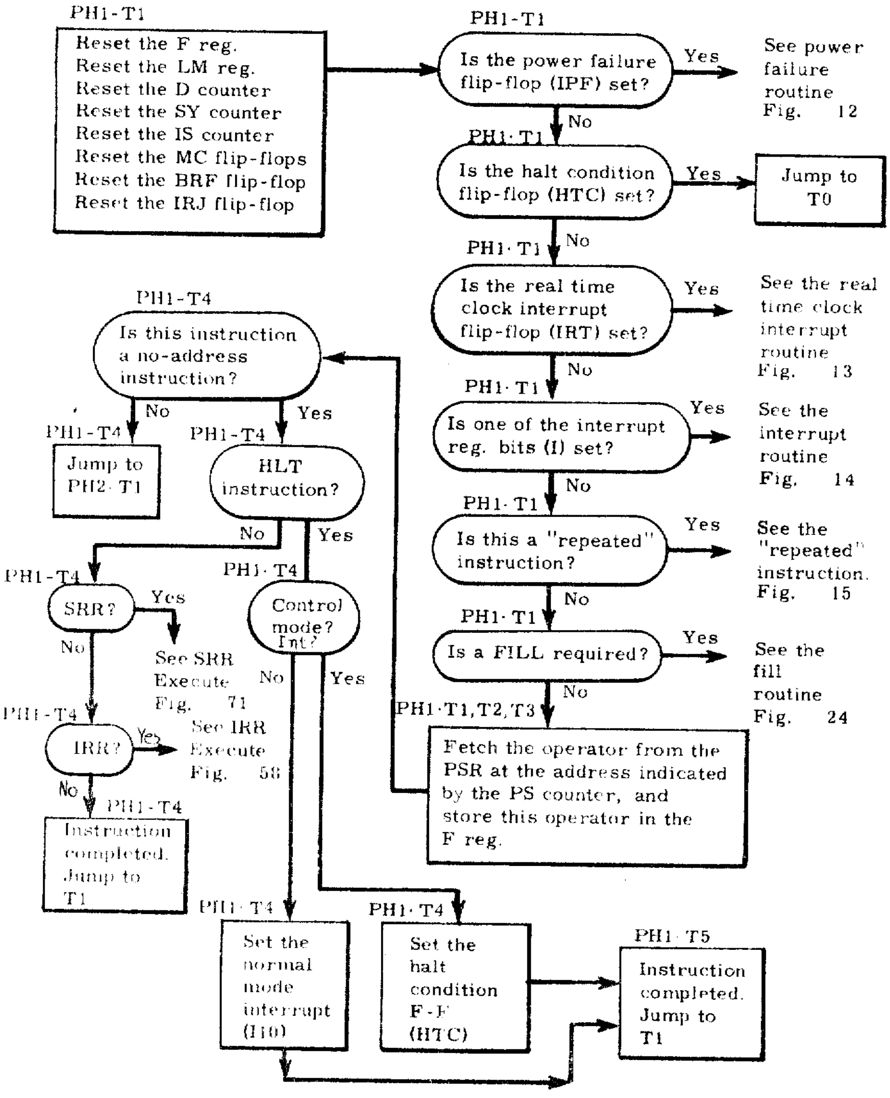
Figure 12A:
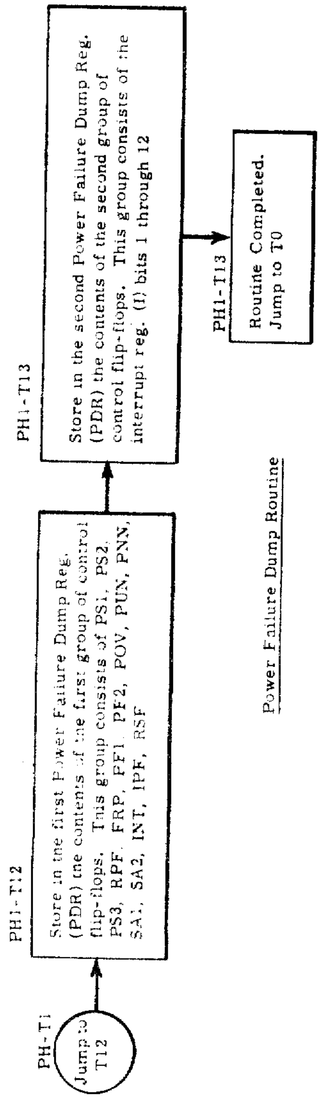
Figure 12B:
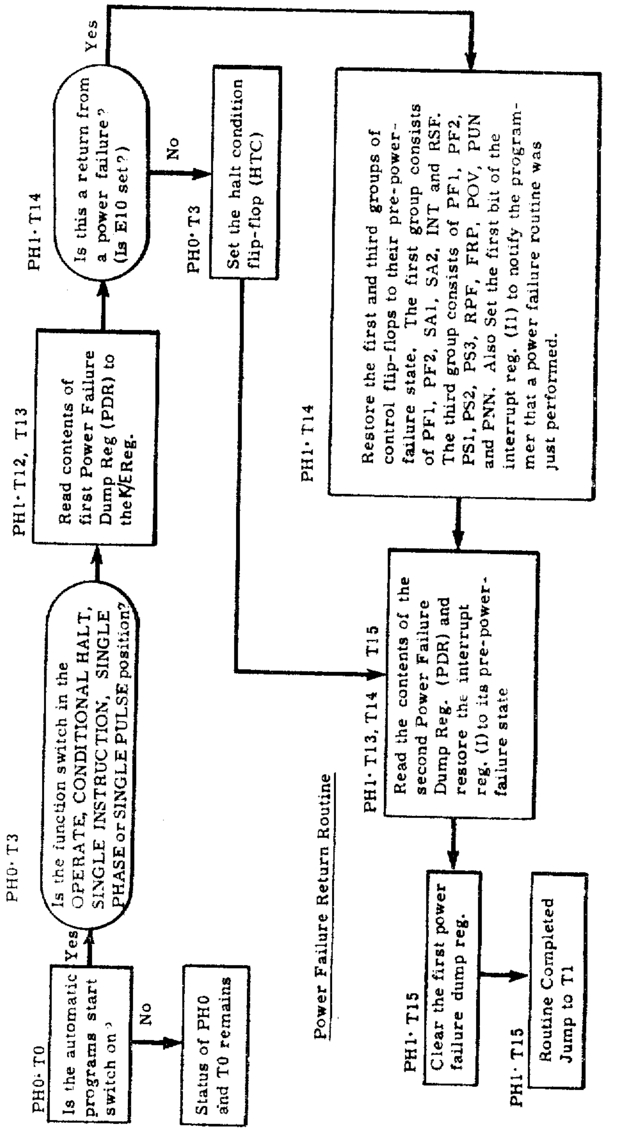
Figure 13:
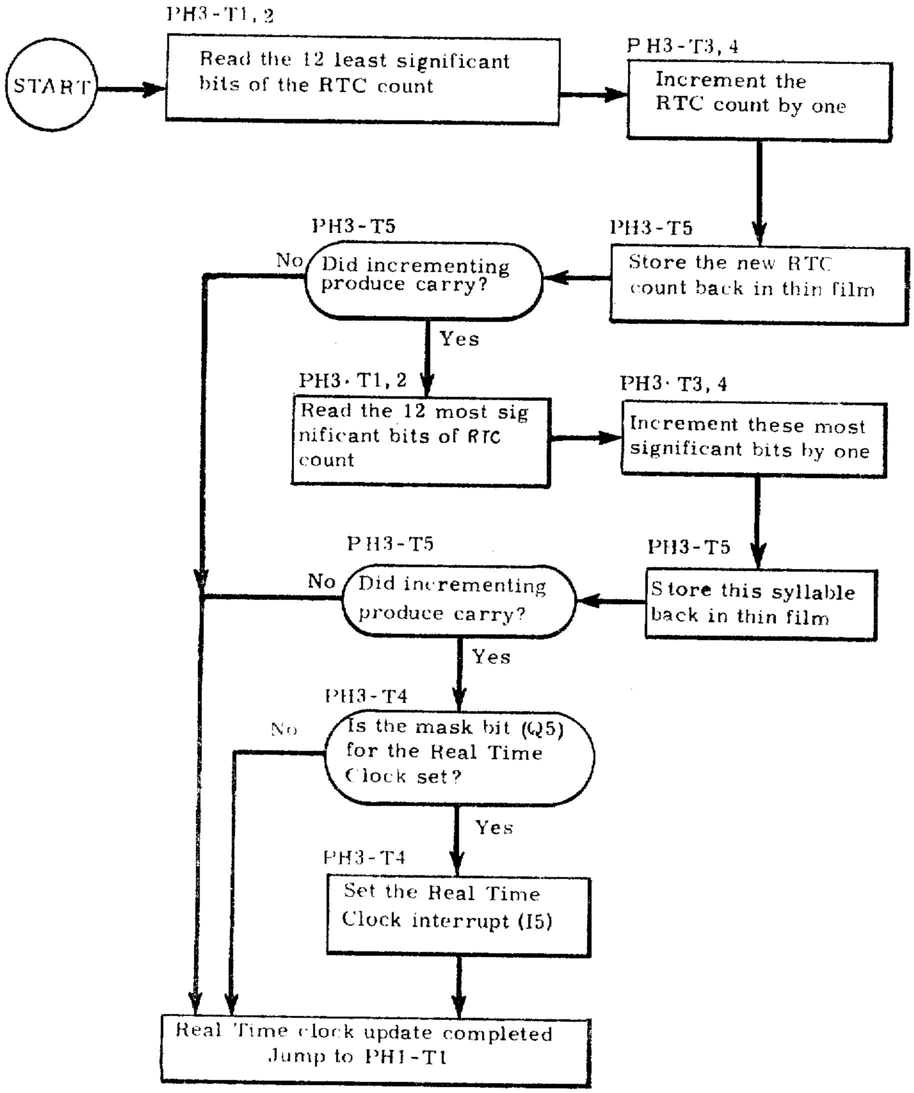
Figure 14:
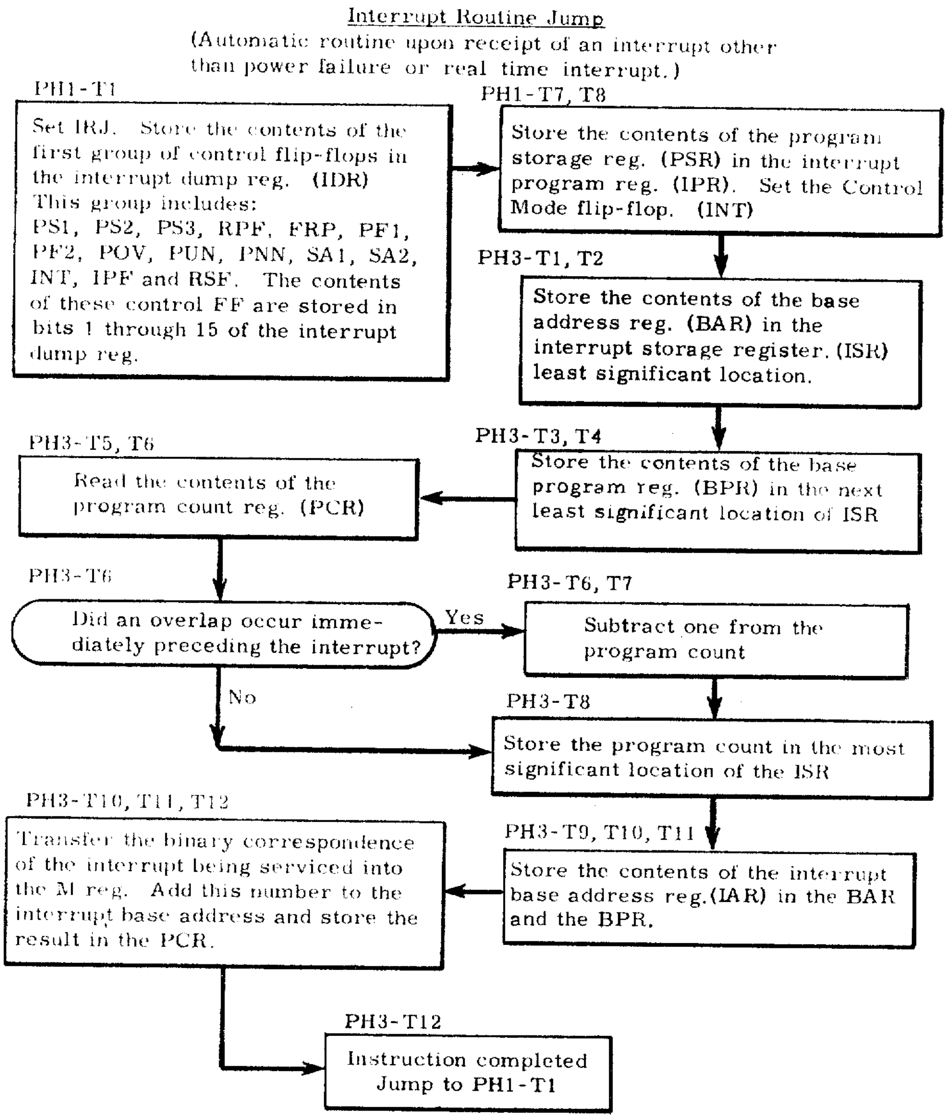
Figure 15:
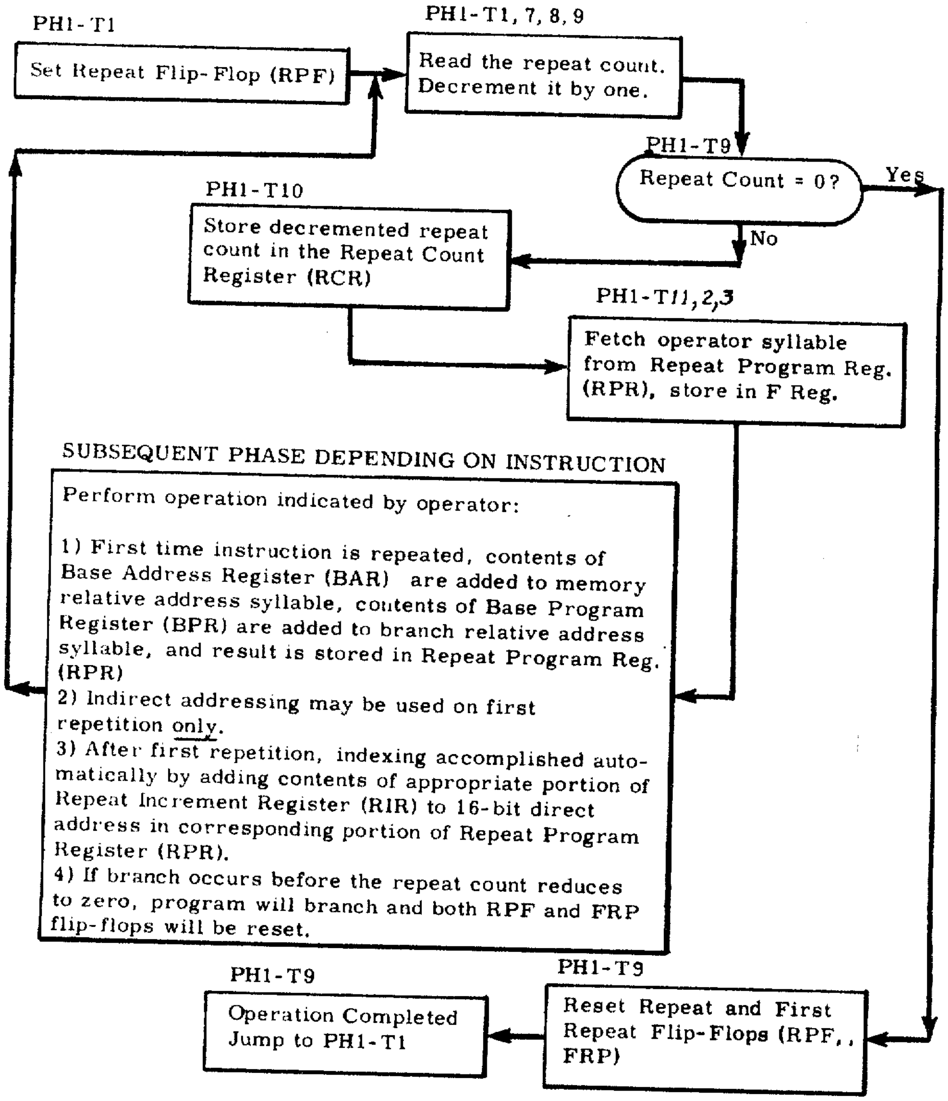
Figure 16:
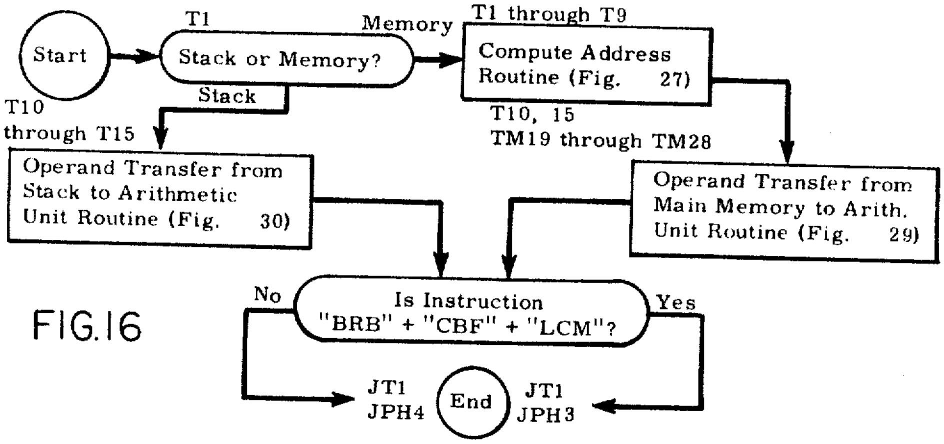
Figure 17:
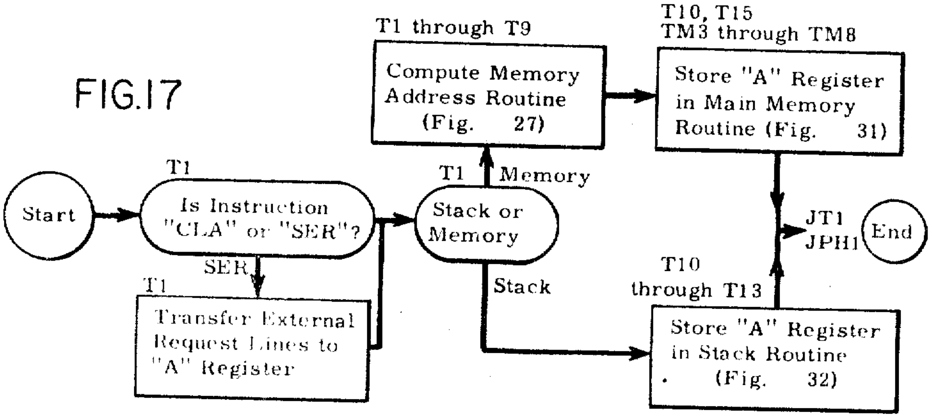
Figure 18:
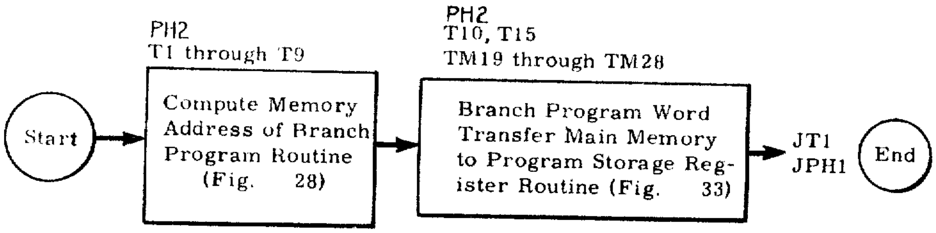
Figure 19:
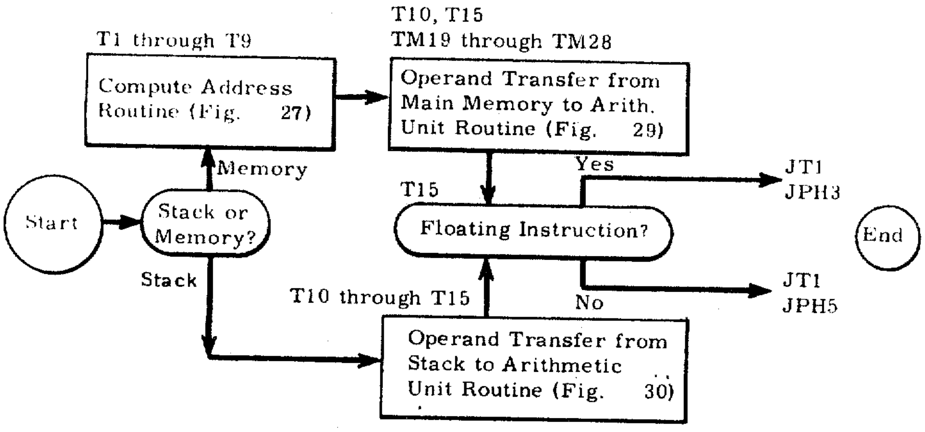
Figure 20:
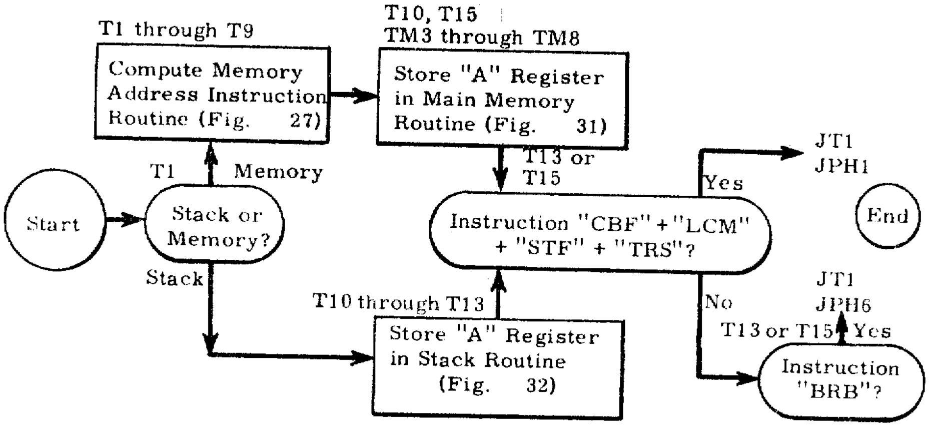
Figure 21:
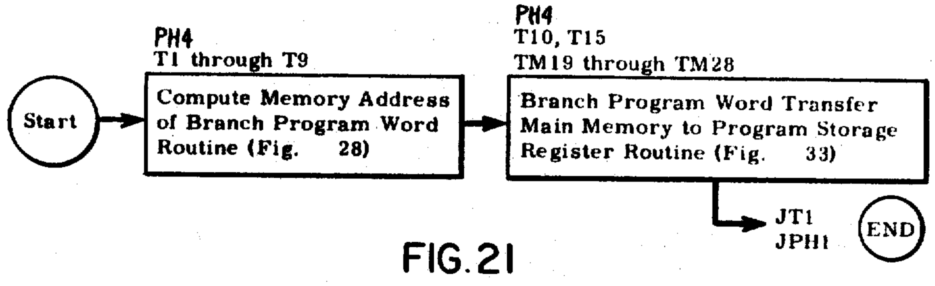
Figure 22:
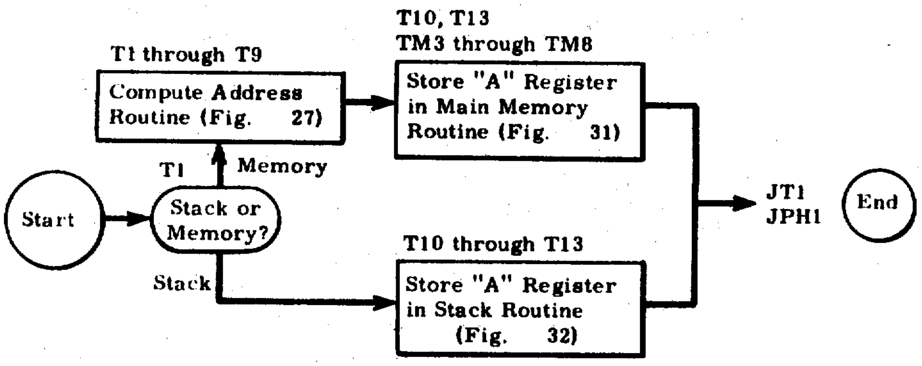
Figure 23:
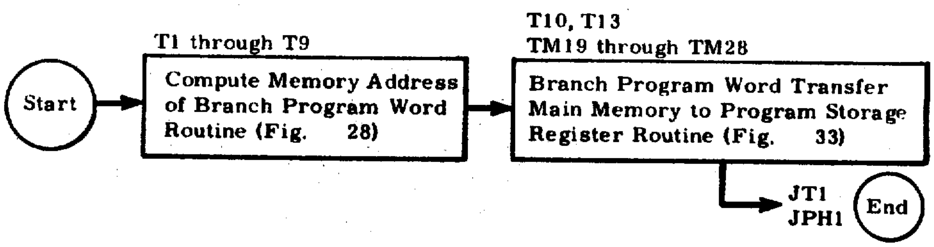
Figure 24:
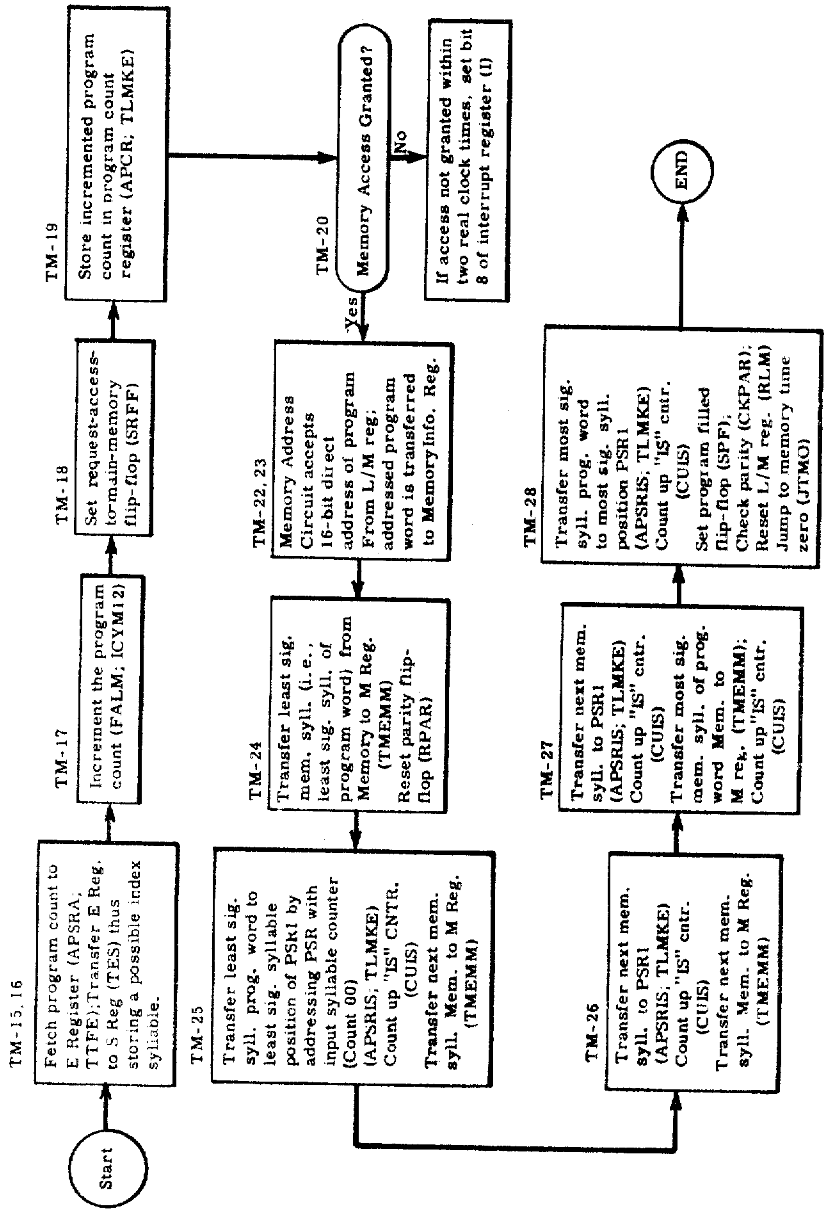
Figure 25:
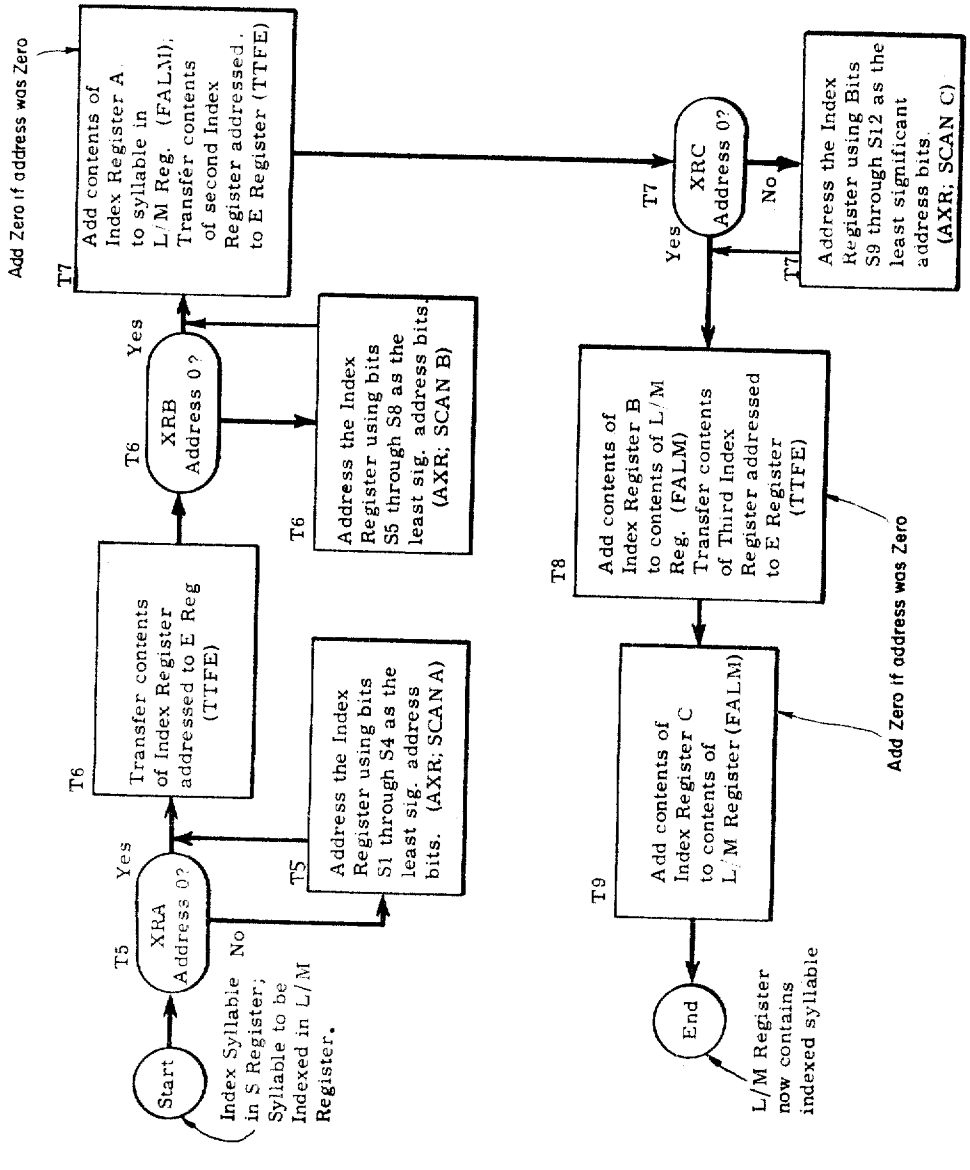
Figure 26:
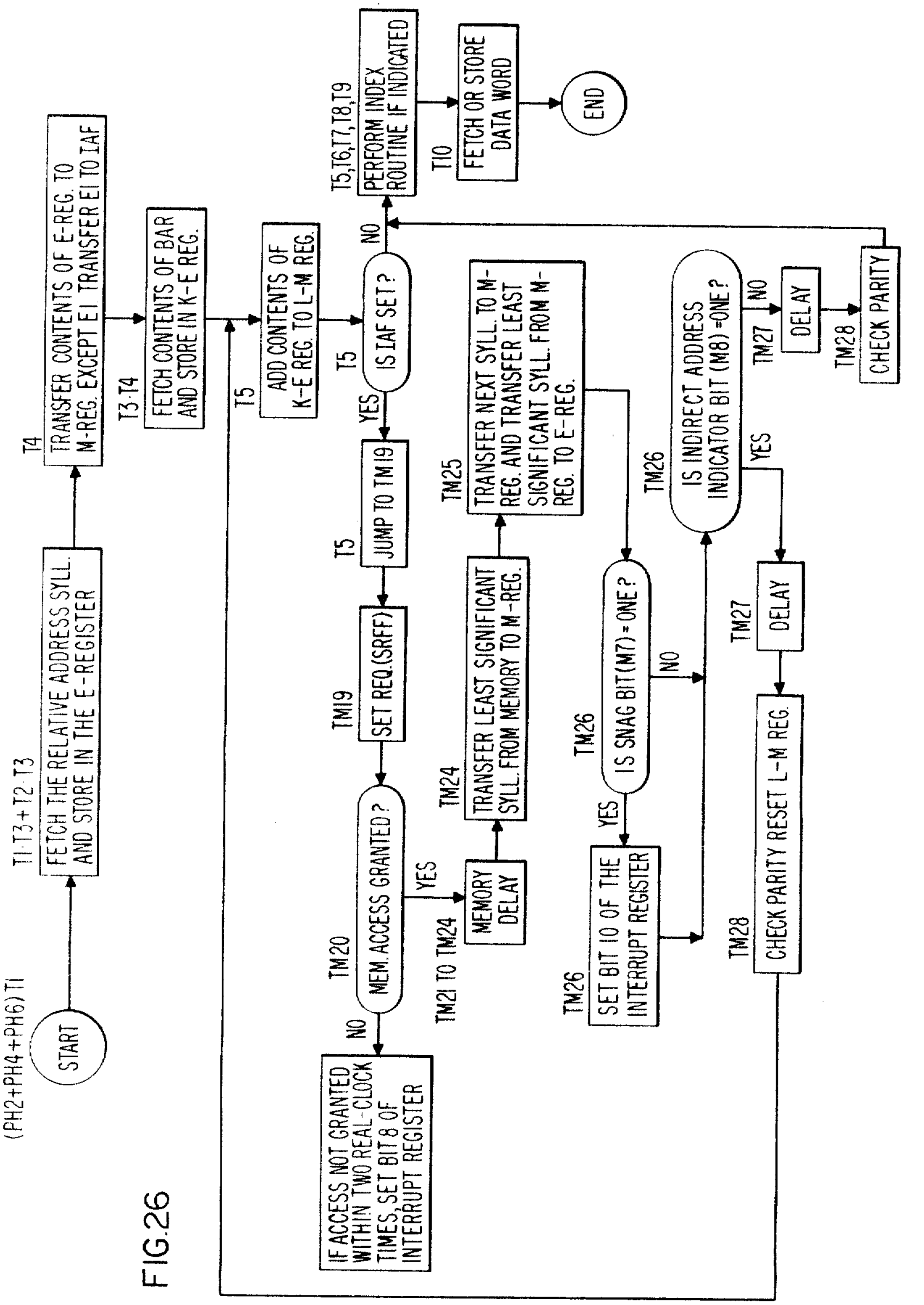
Figure 27:
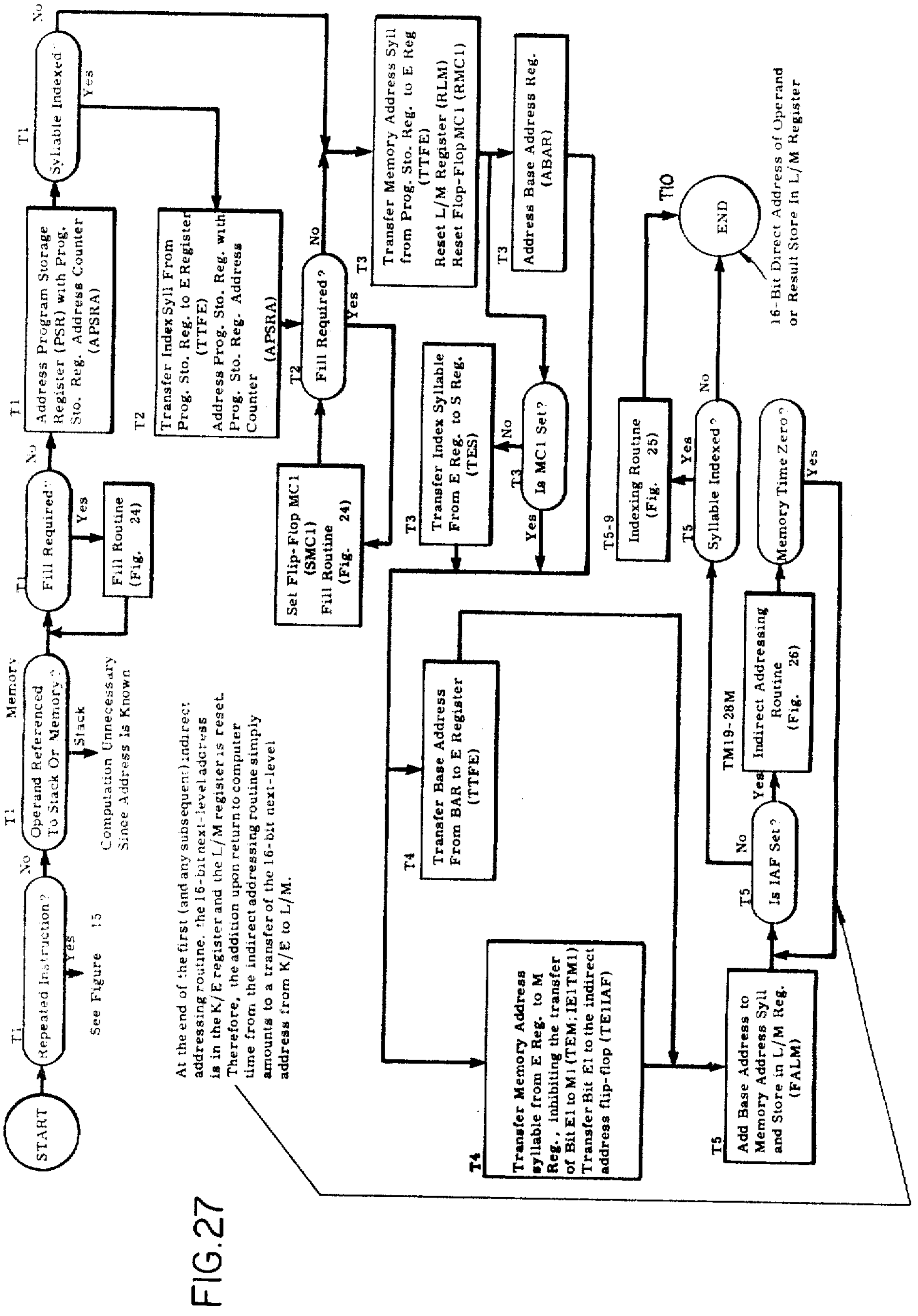
Figure 28:
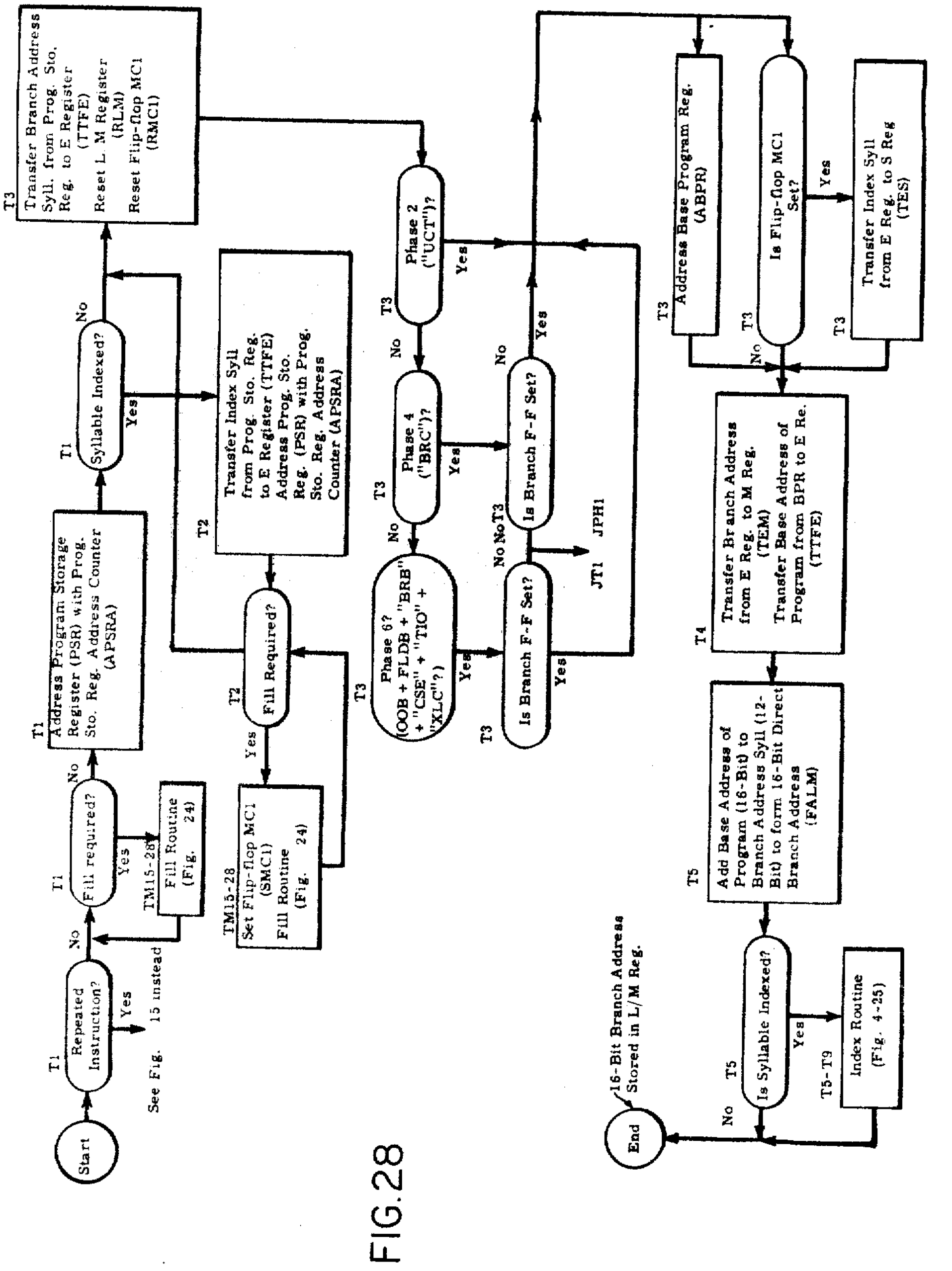
Figure 29:
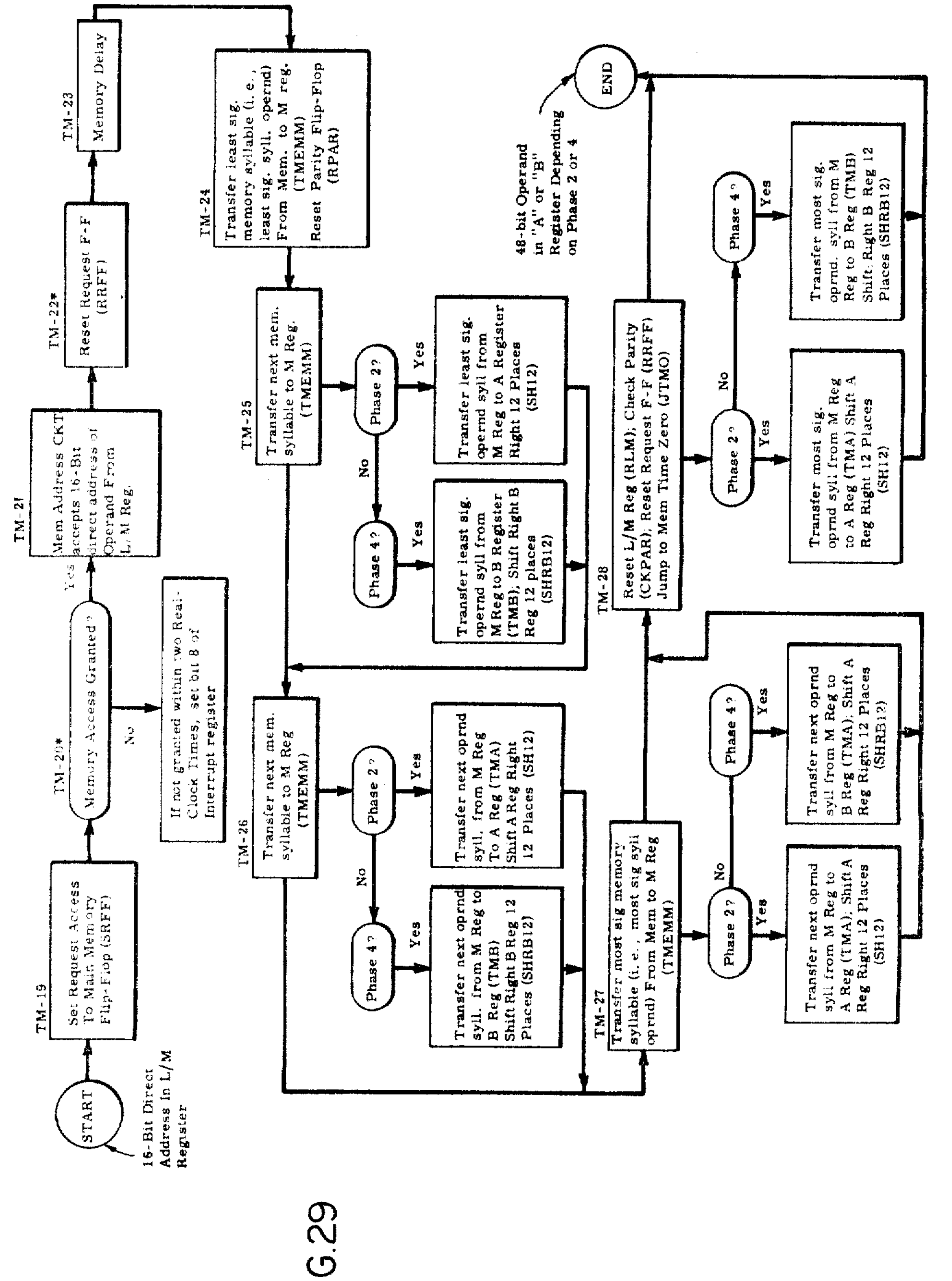
Figure 30:
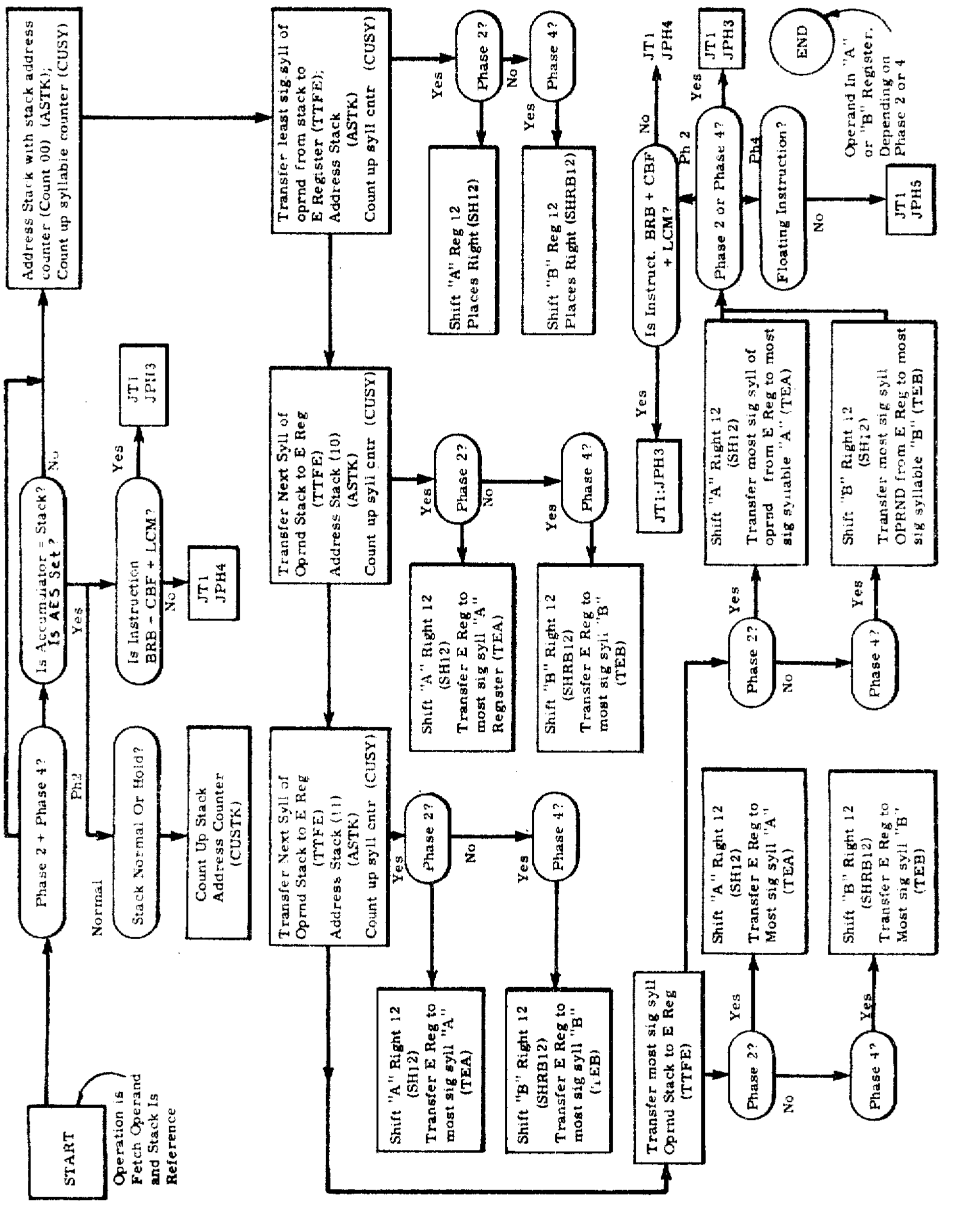
Figure 31:
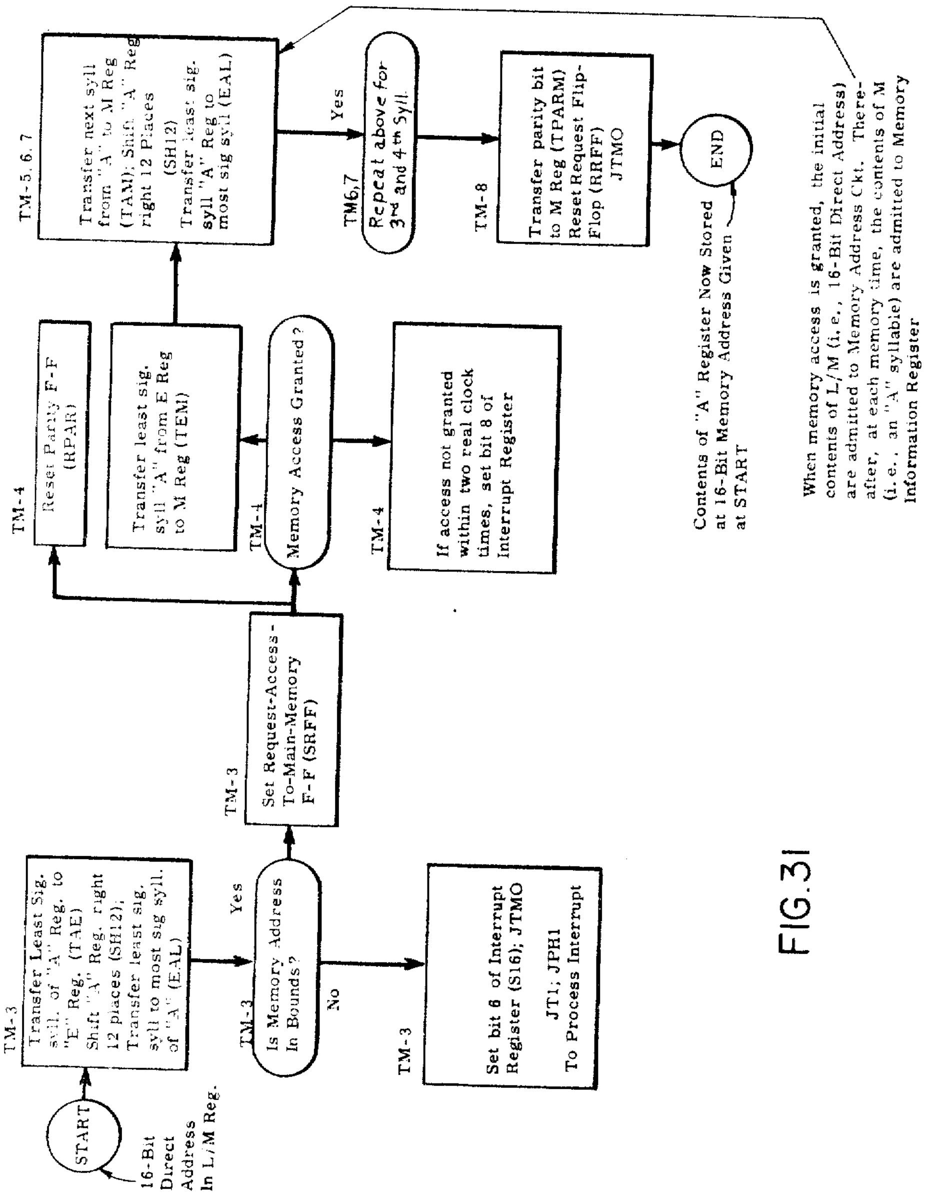
Figure 32:
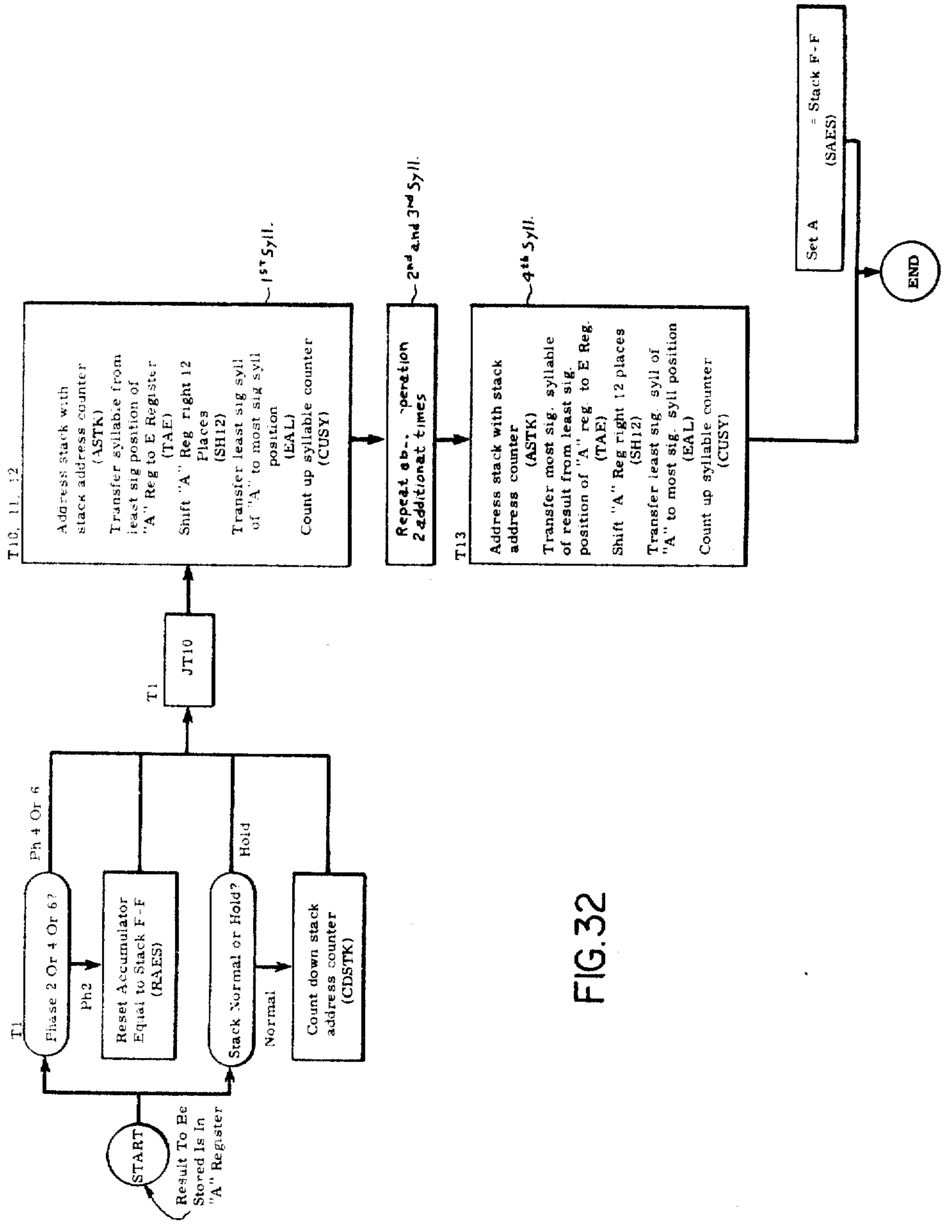
Figure 33:
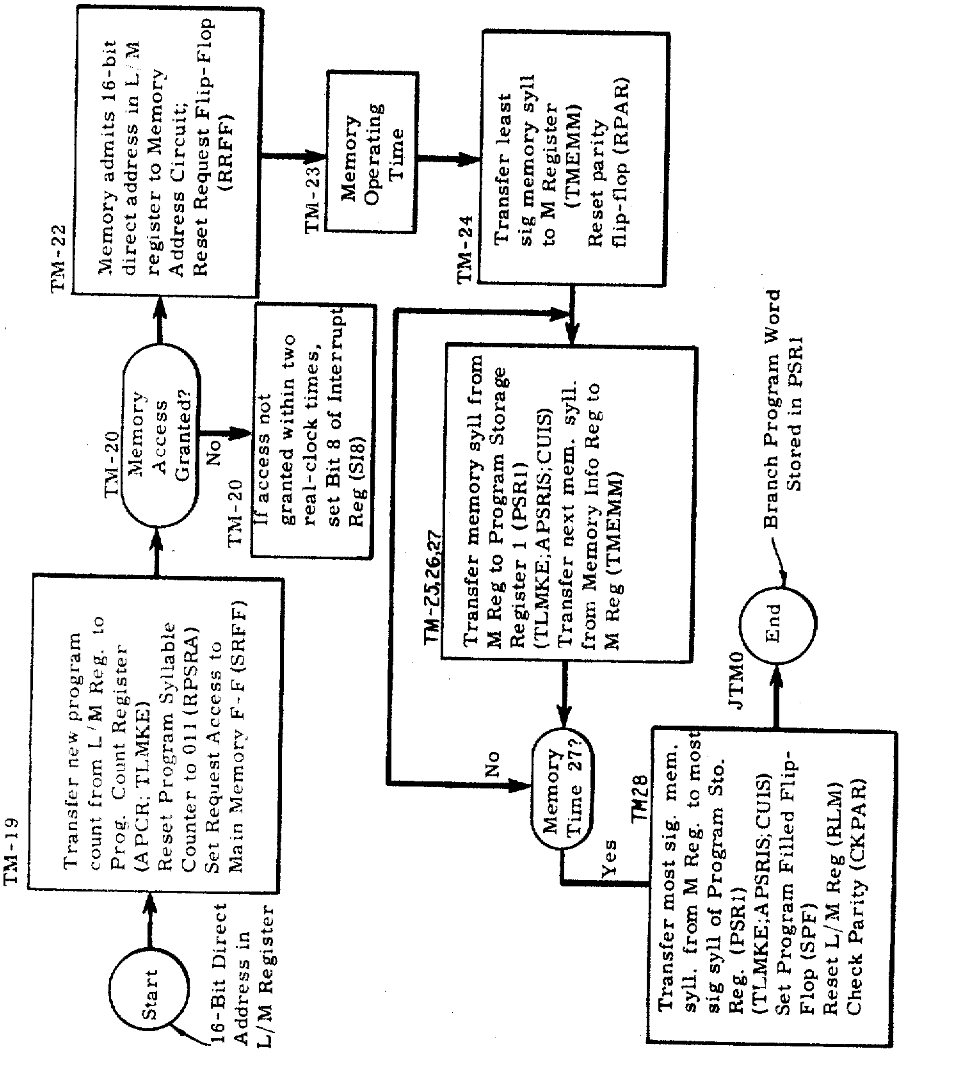
Figure 34:
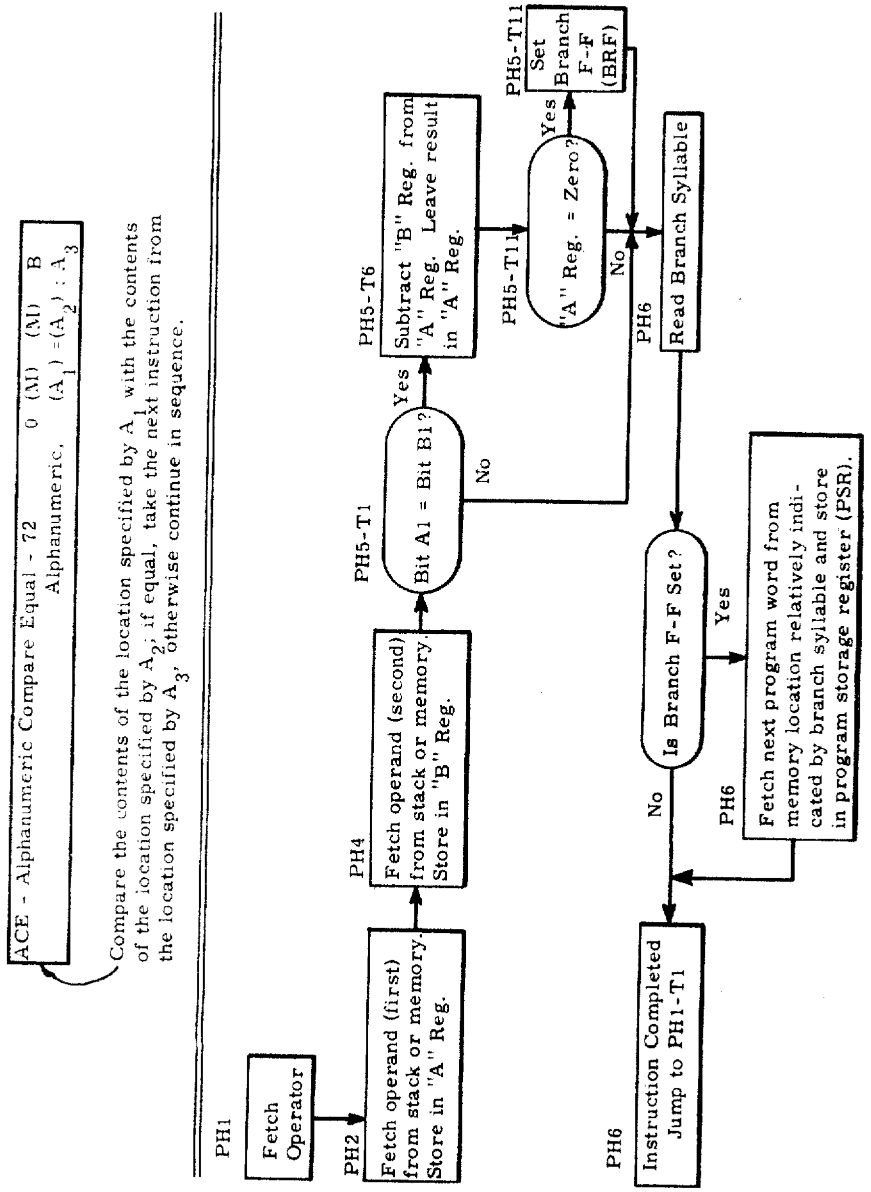
Figure 35:
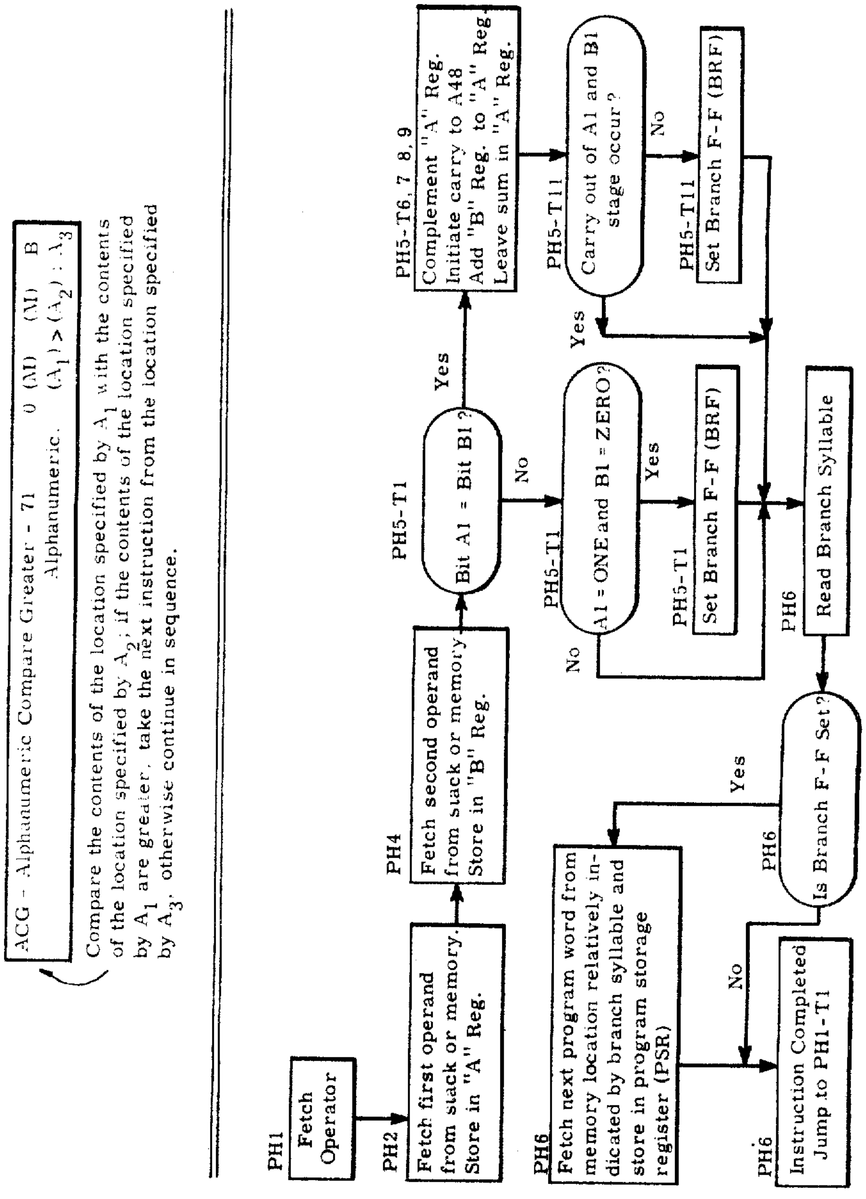
Figure 36:
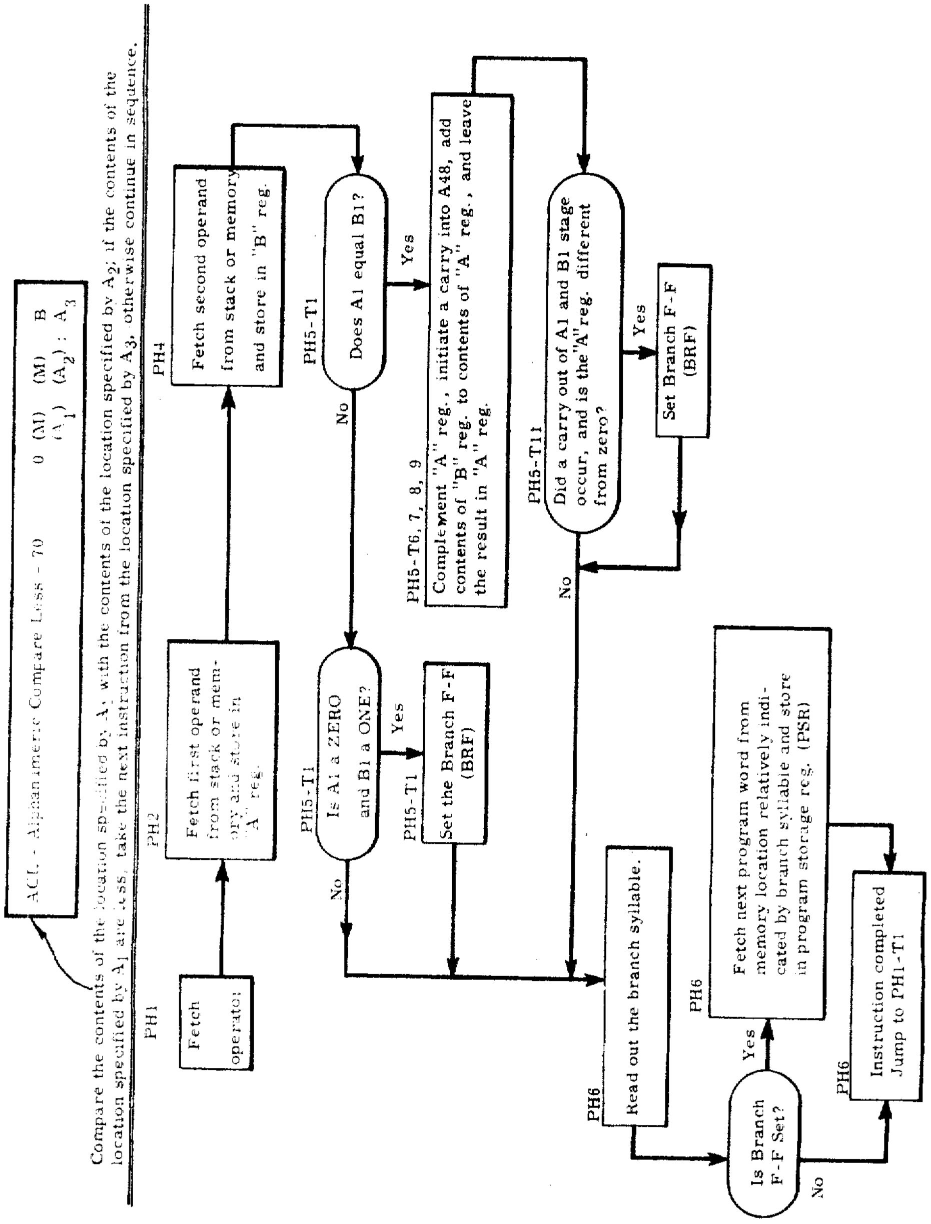
Figure 37:
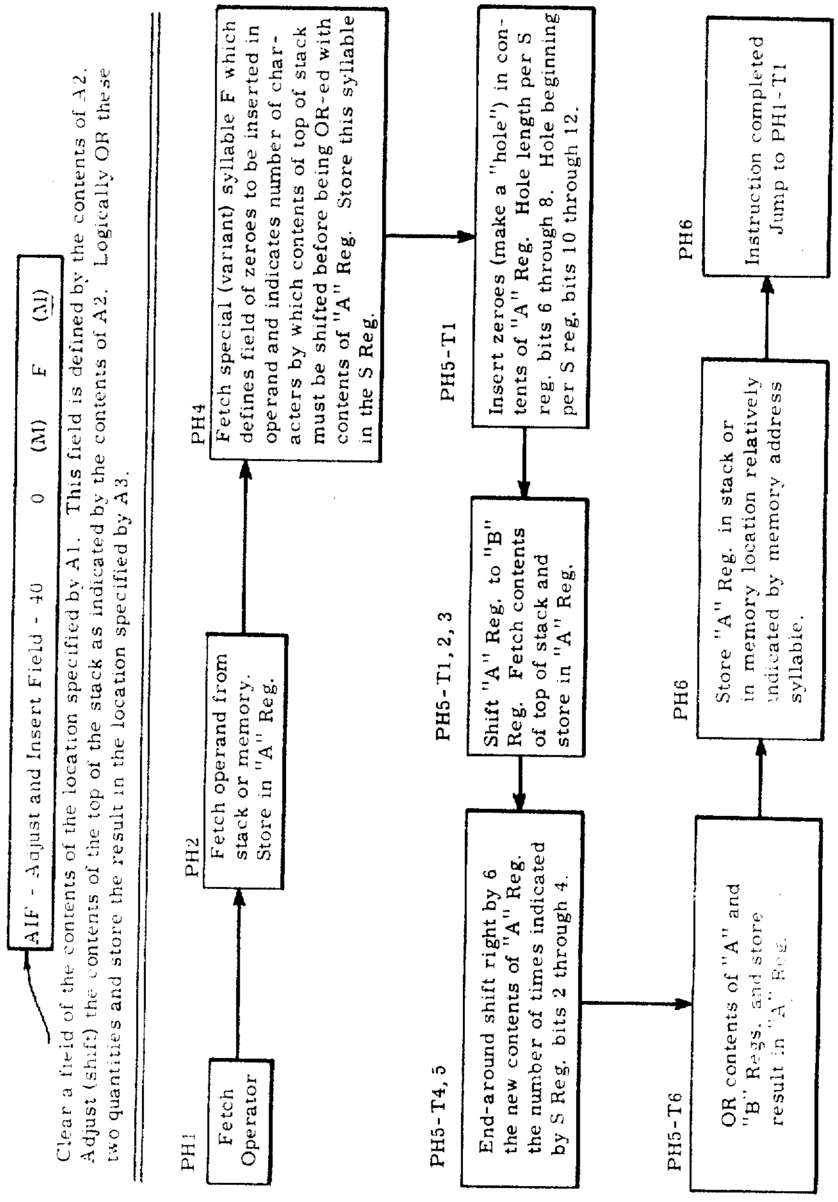
Figure 38:
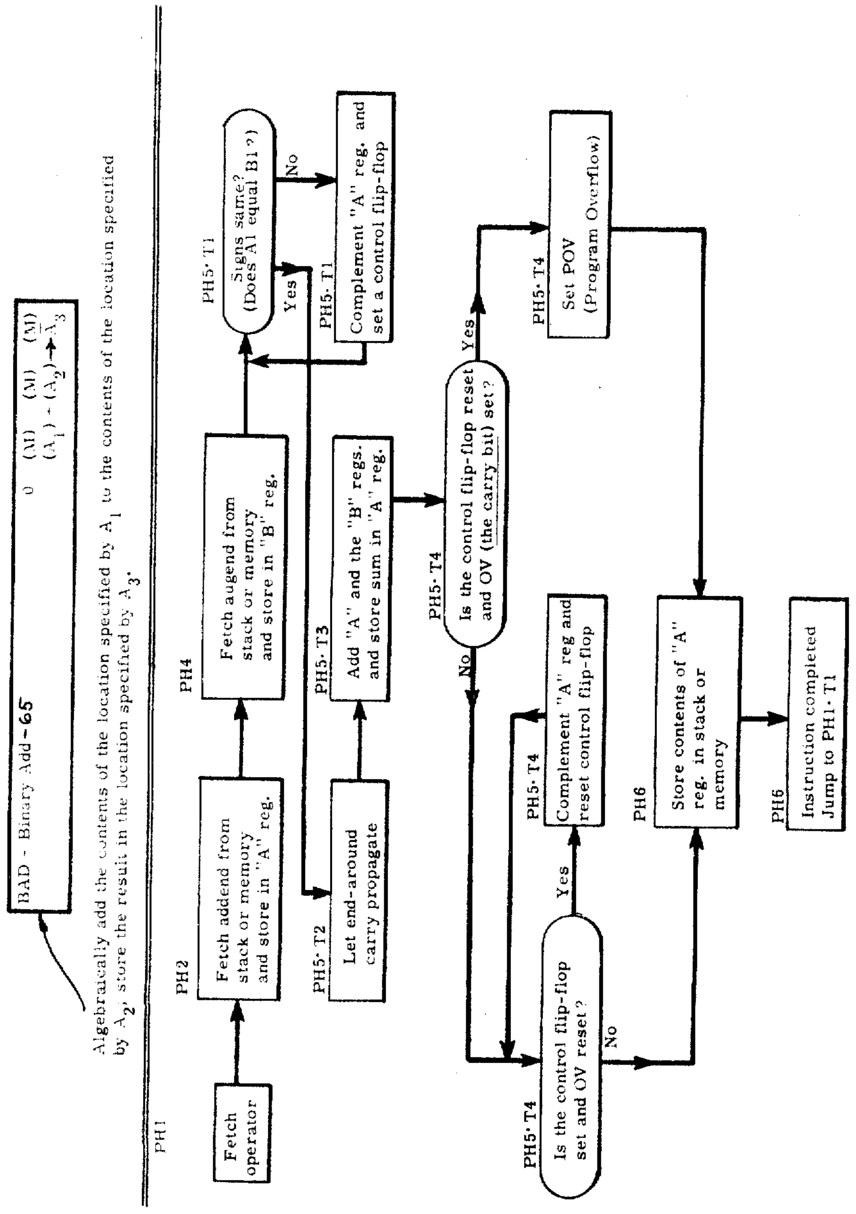
Figure 39:
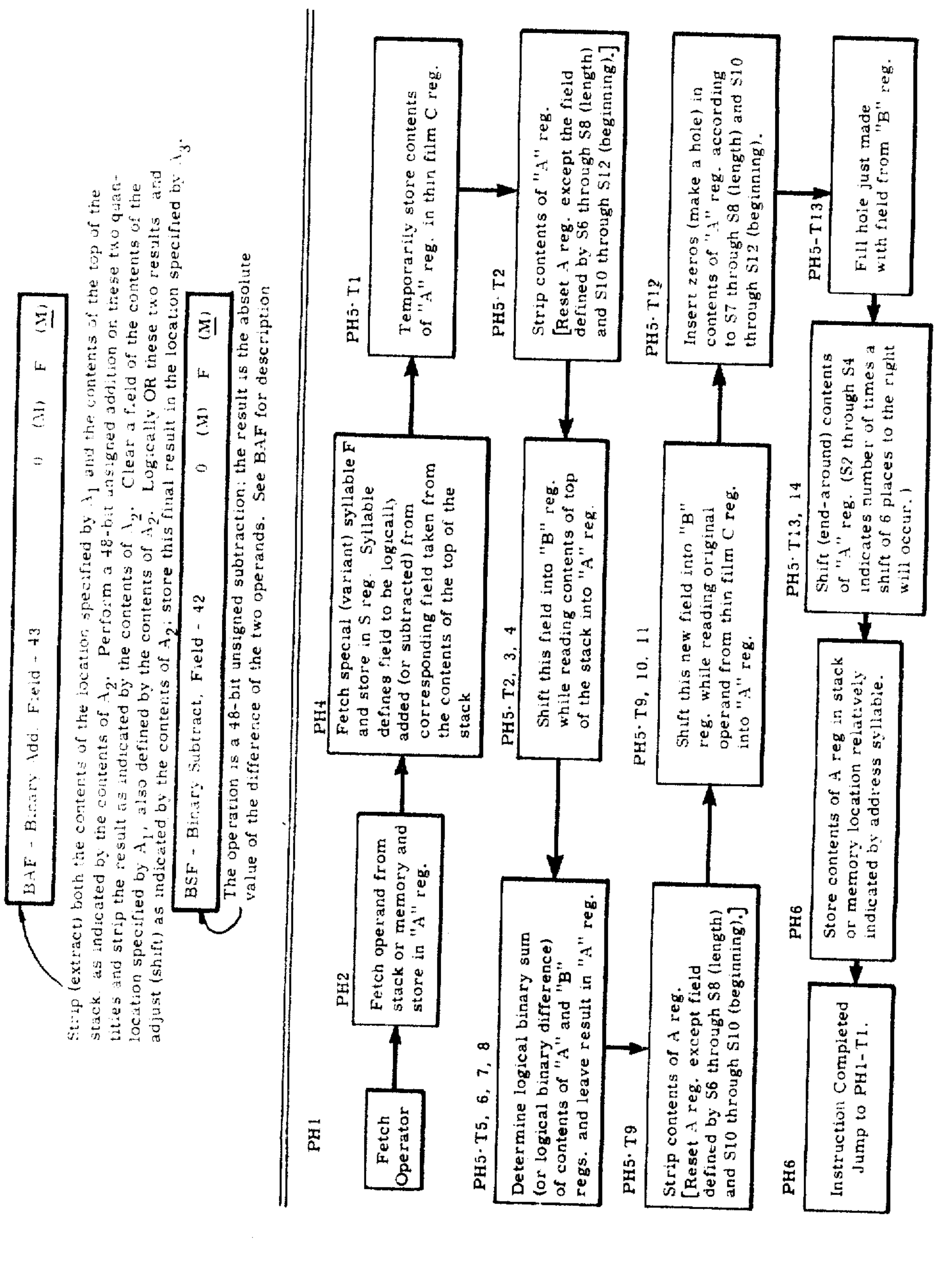
Figure 40:
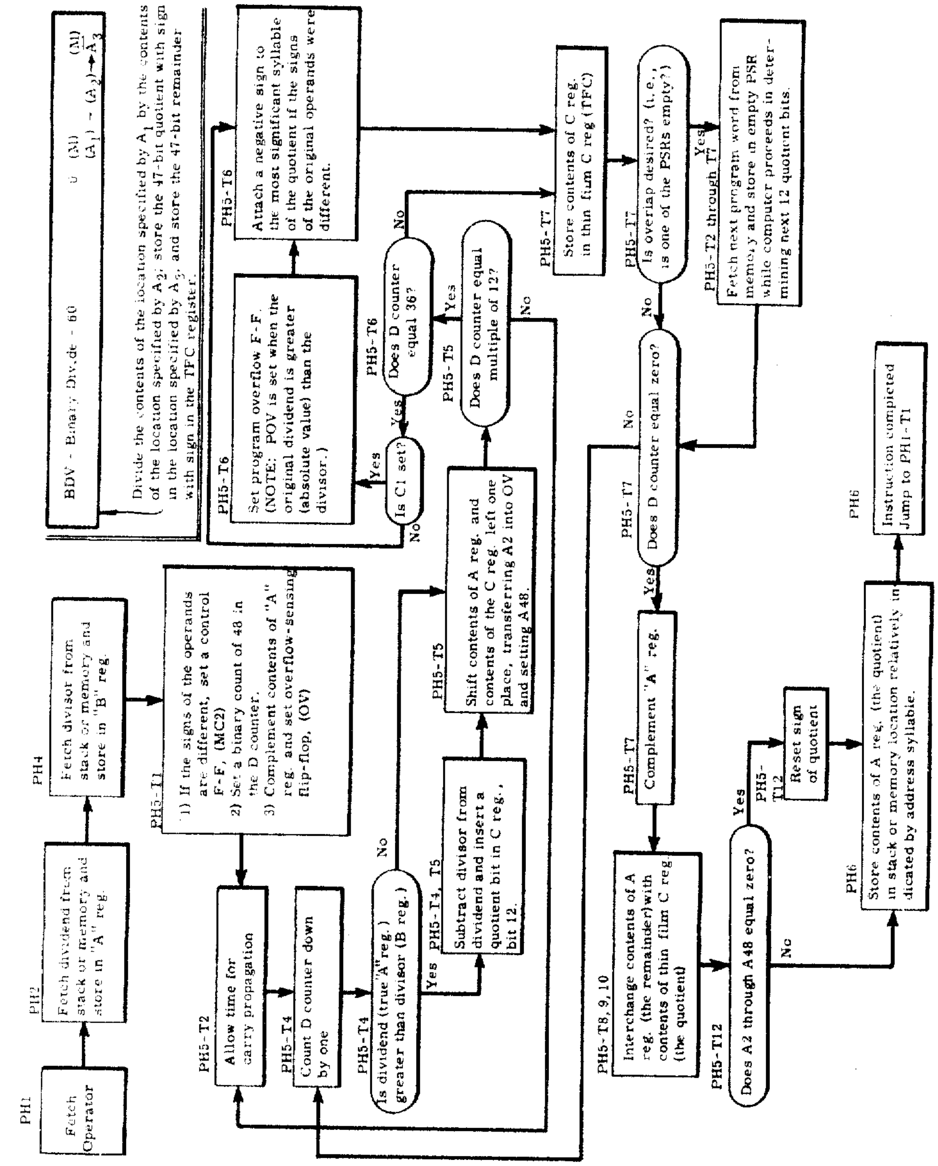
Figure 41:
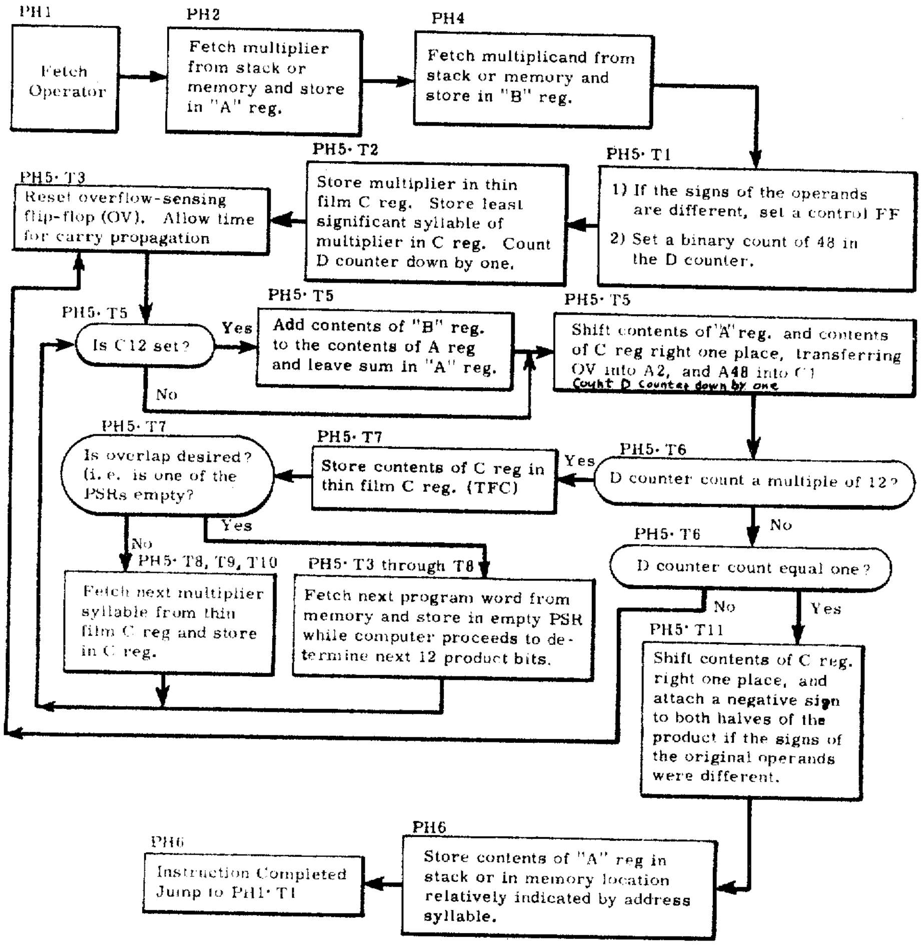
Figure 42:
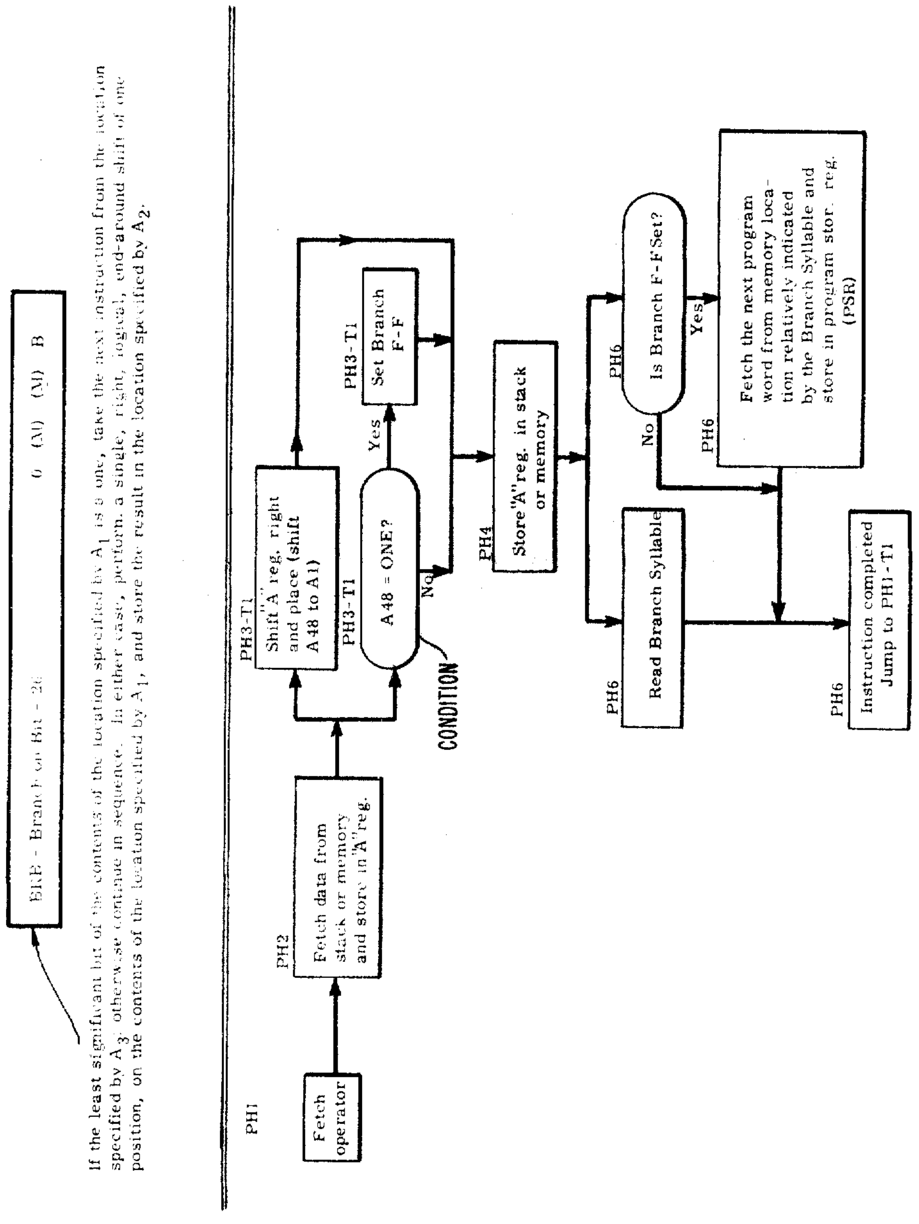
Figure 43:
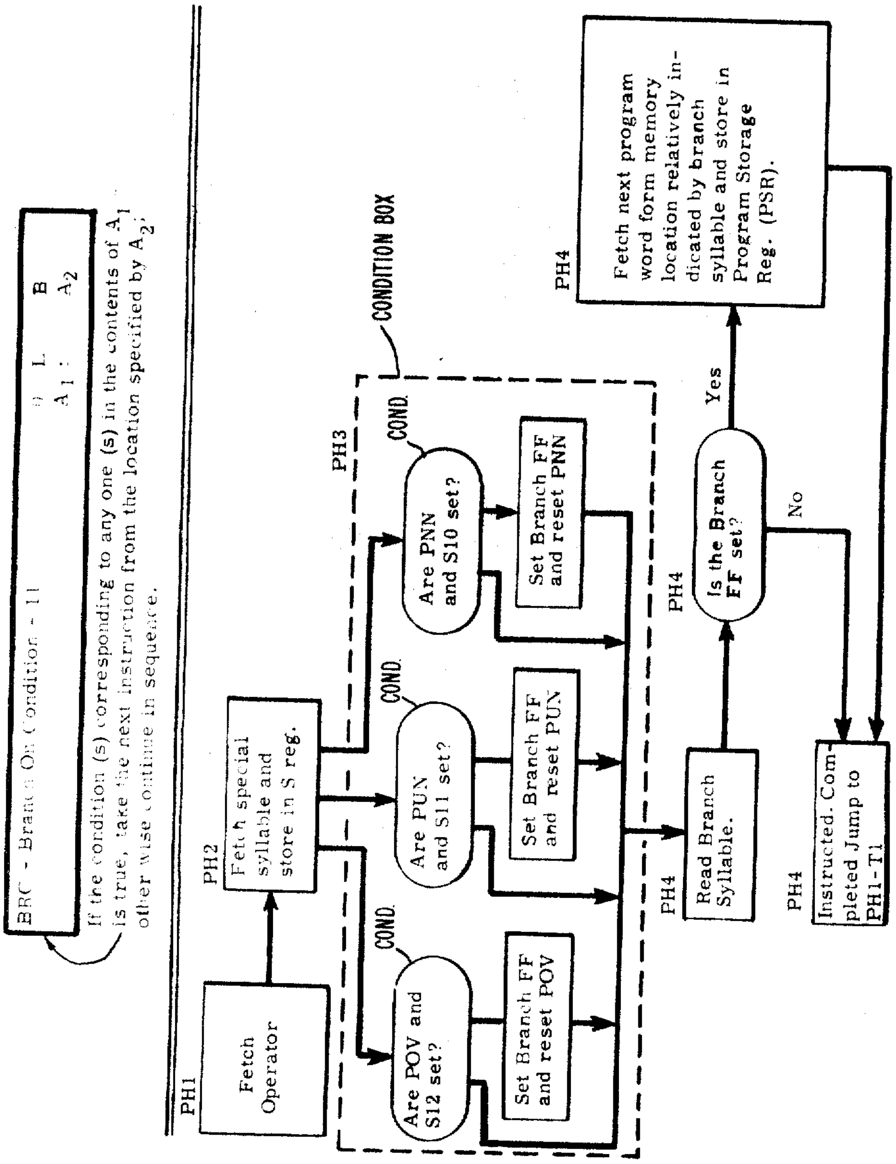
Figure 44:
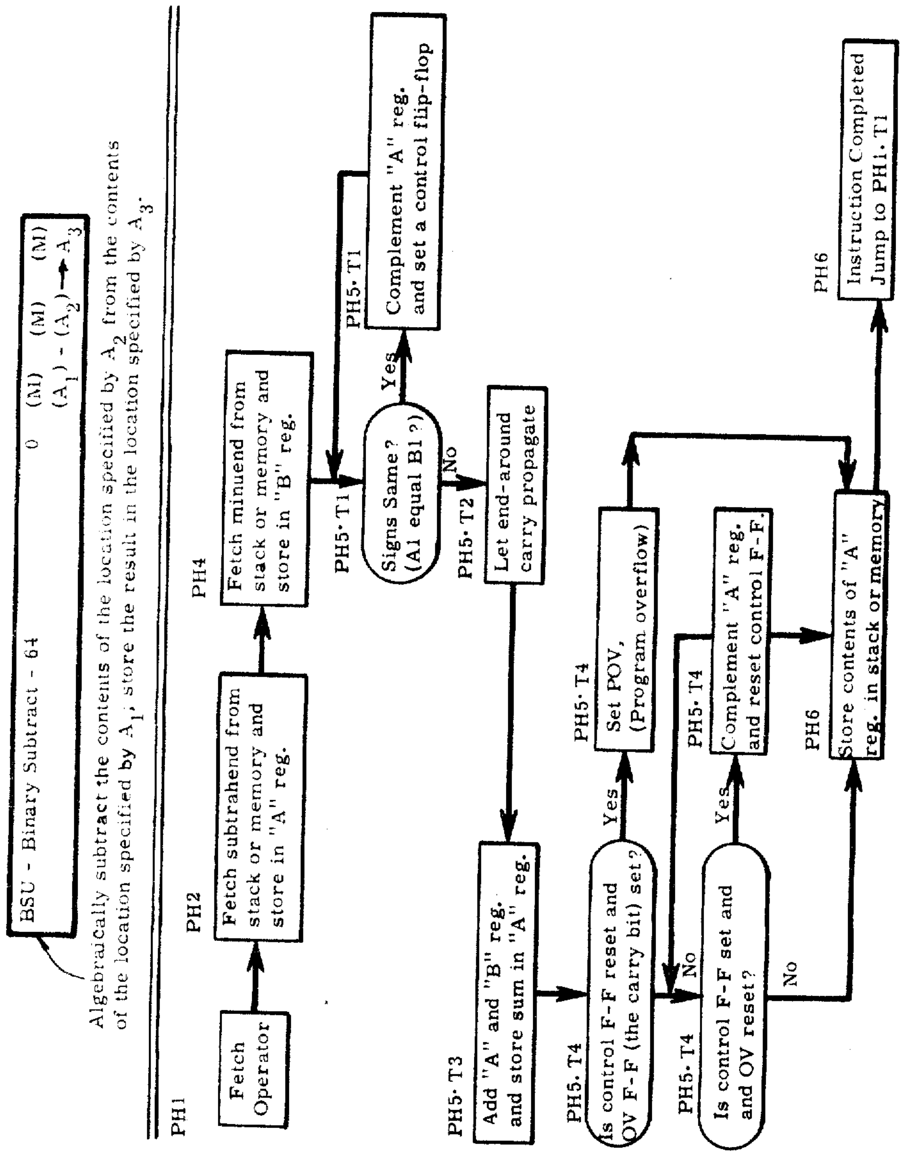
Figure 45:
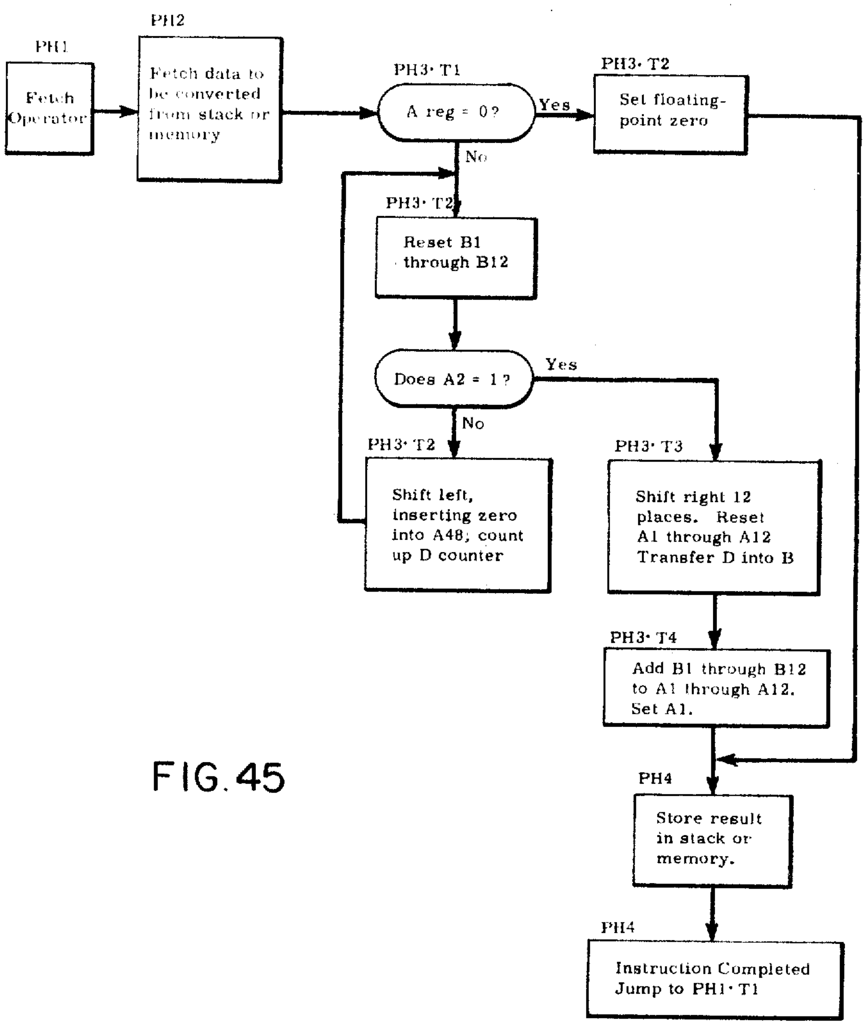
Figure 46:
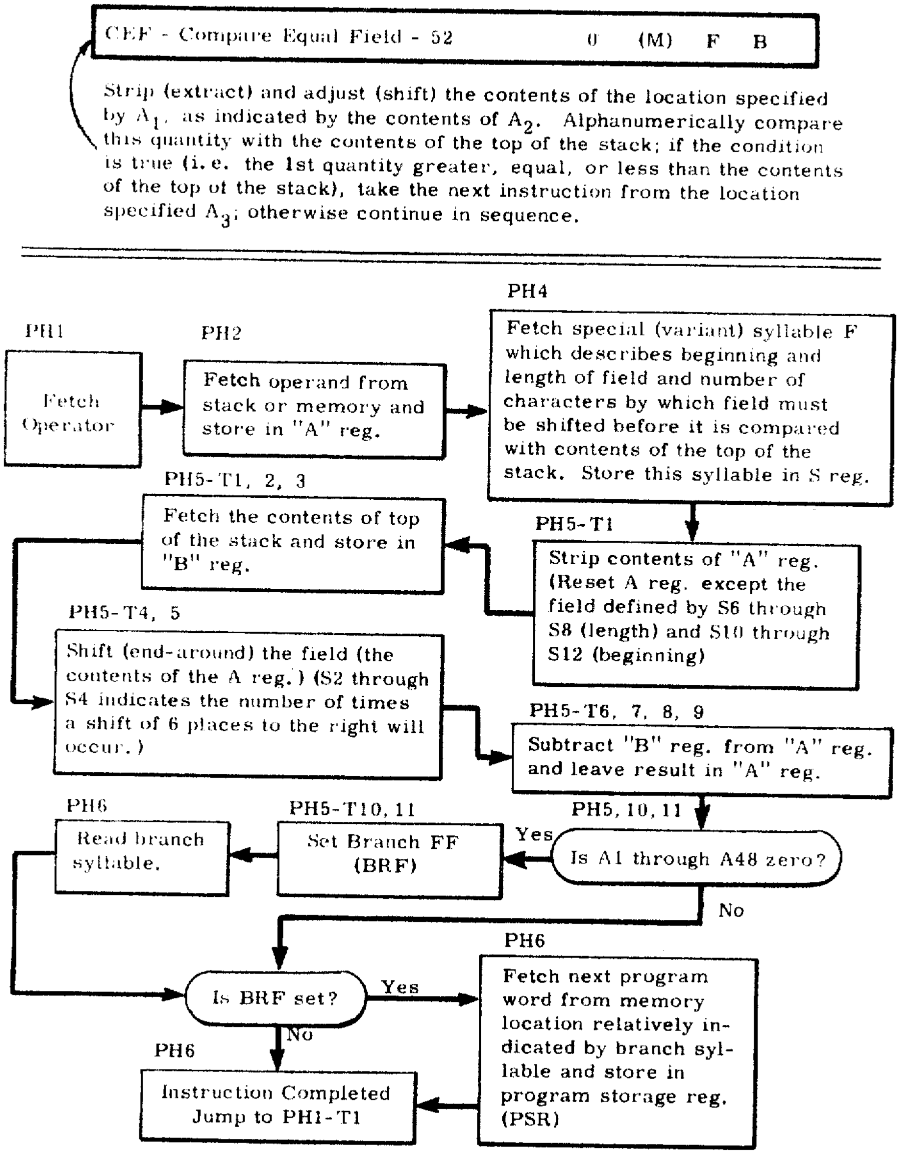
Figure 47:
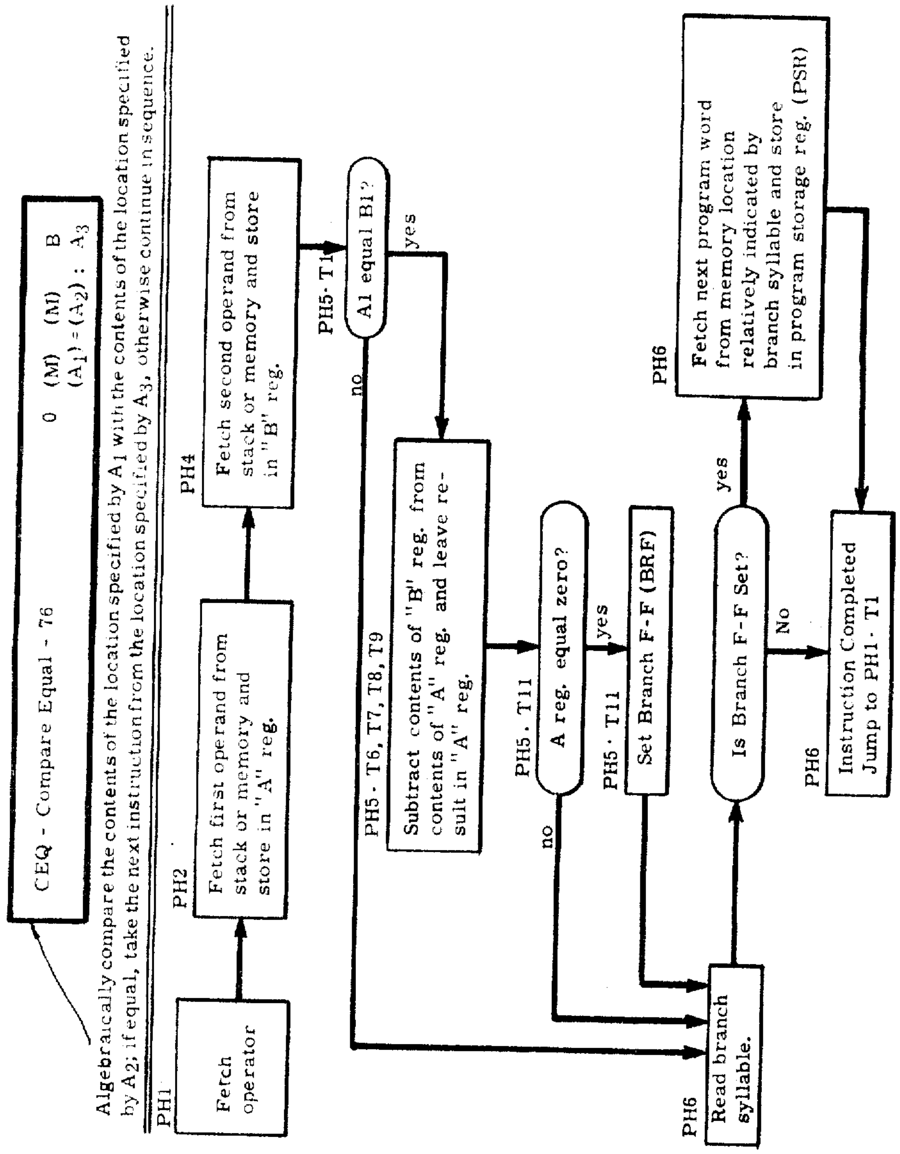
Figure 49:
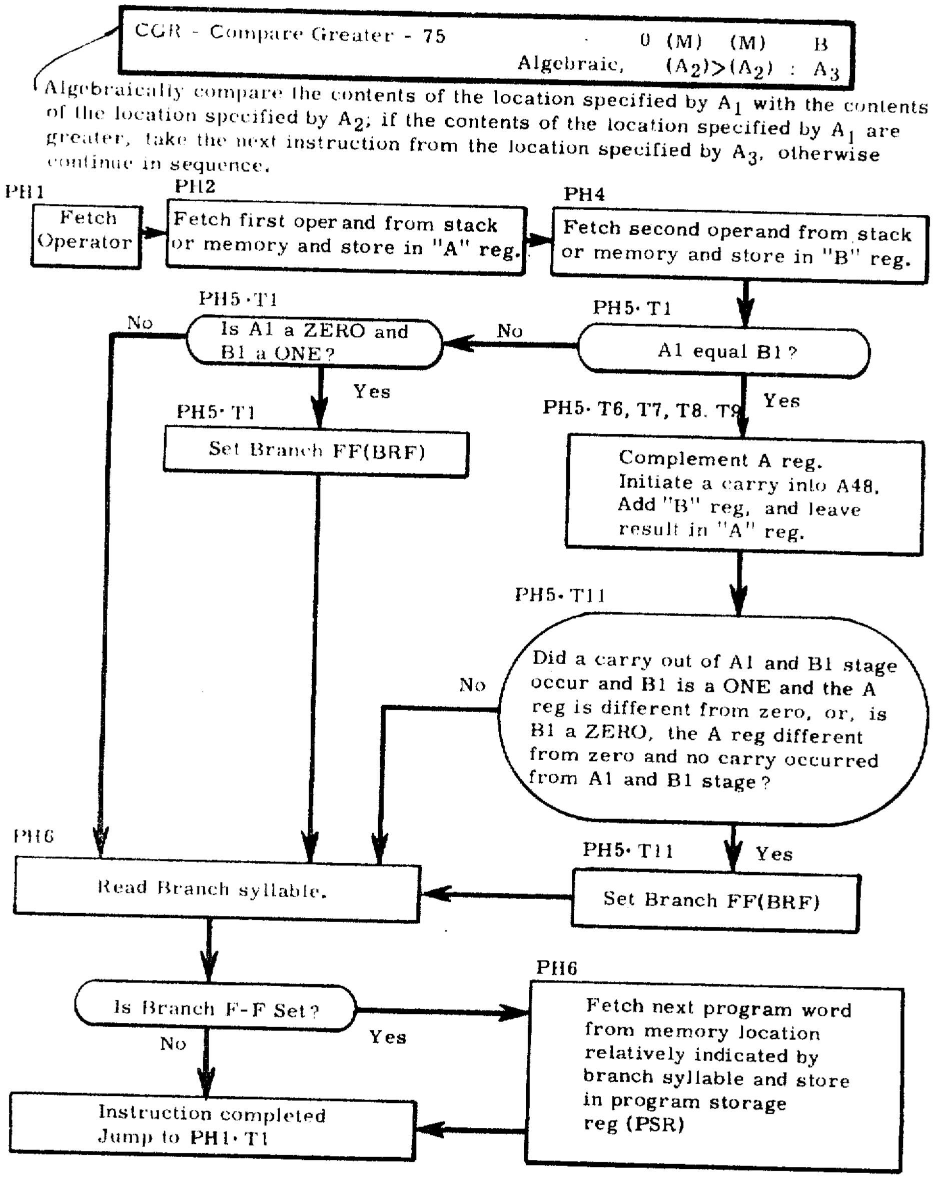
Figure 52:
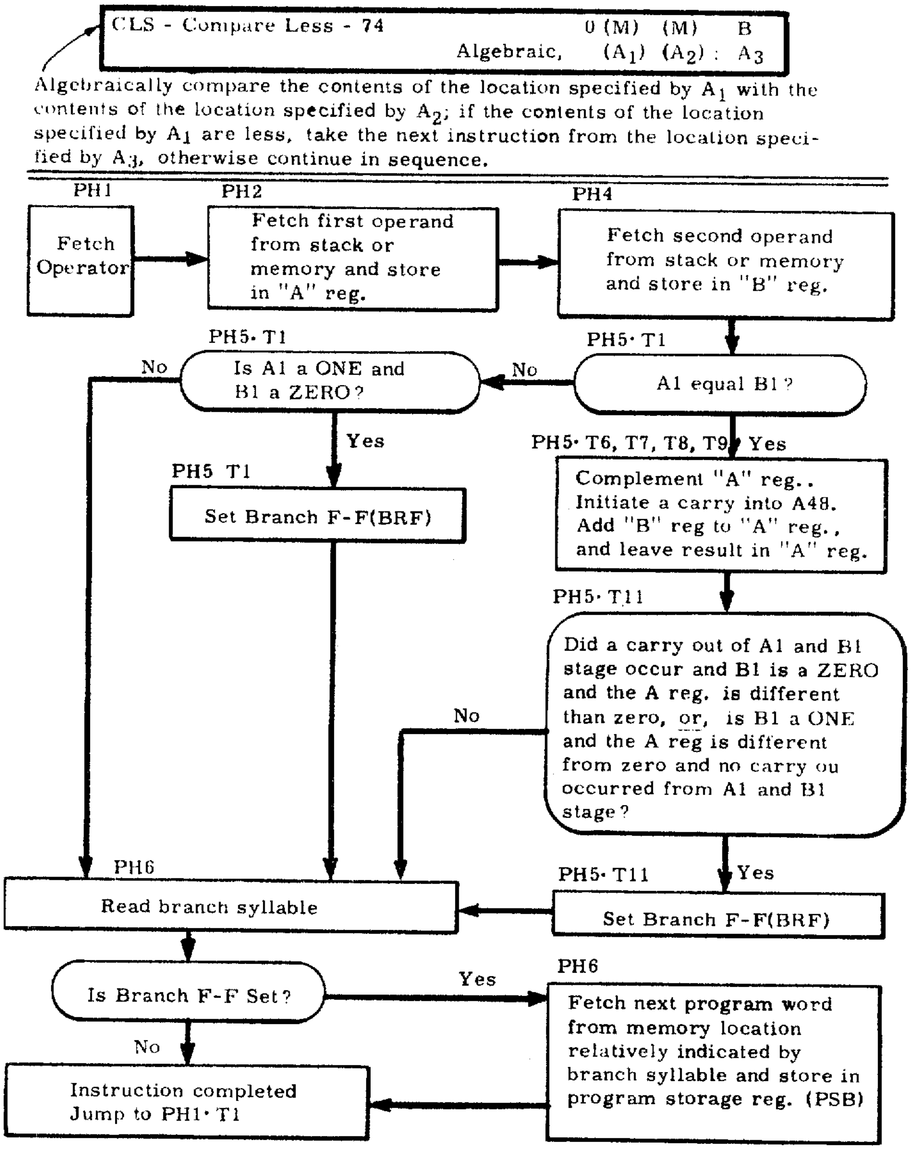
Figure 54:
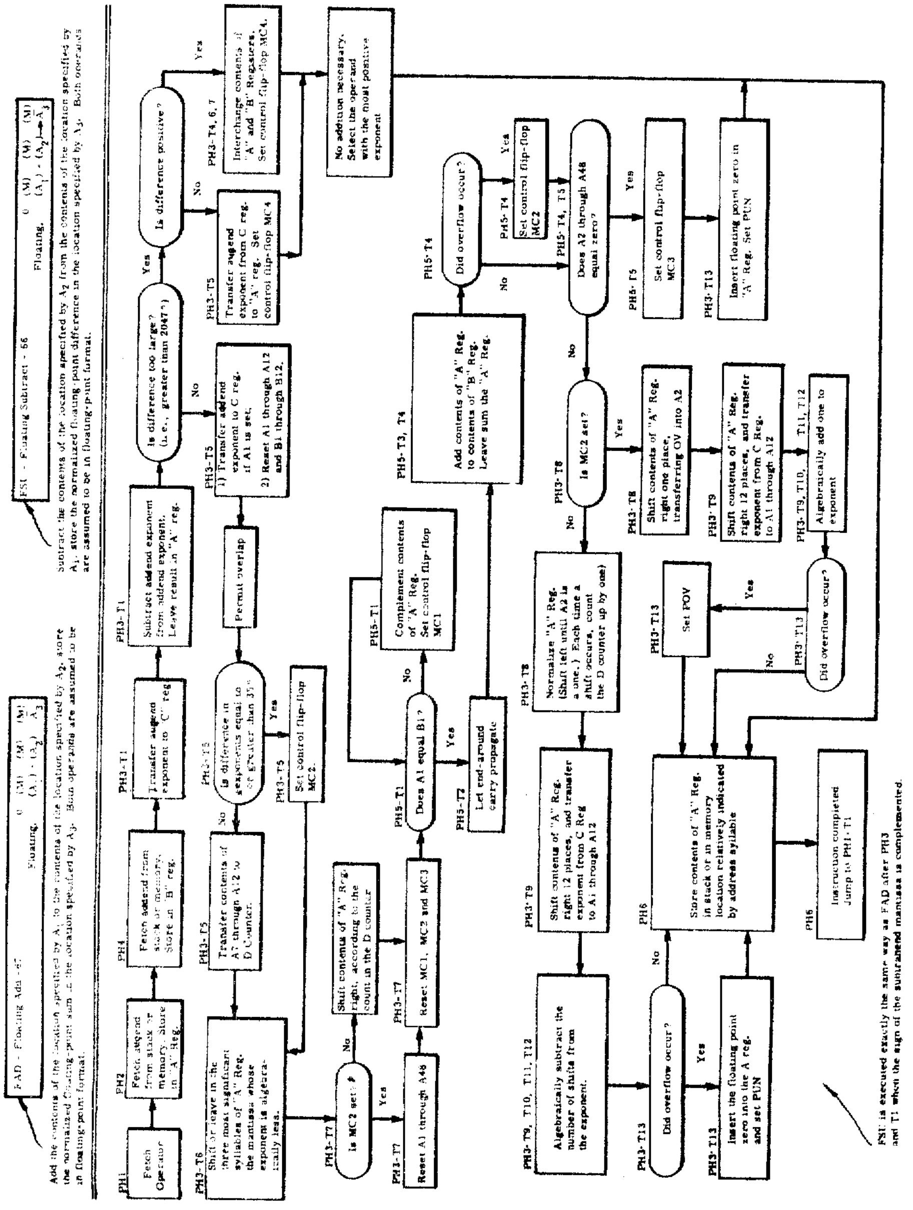
Figure 55A:
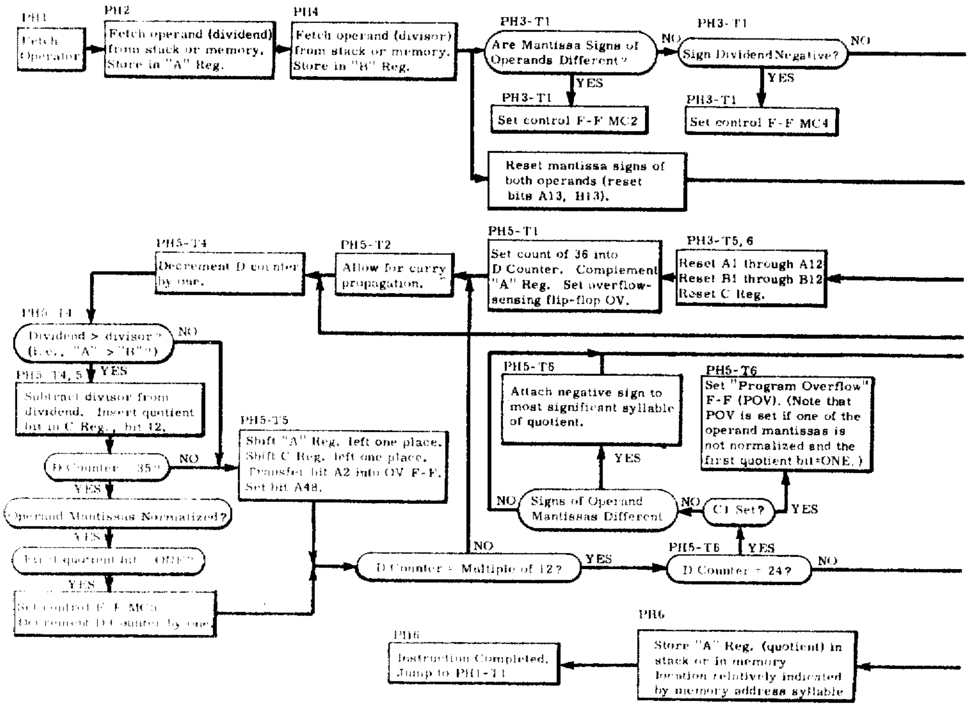
Figure 55:
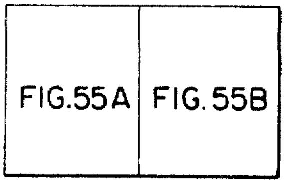
Figure 55B:
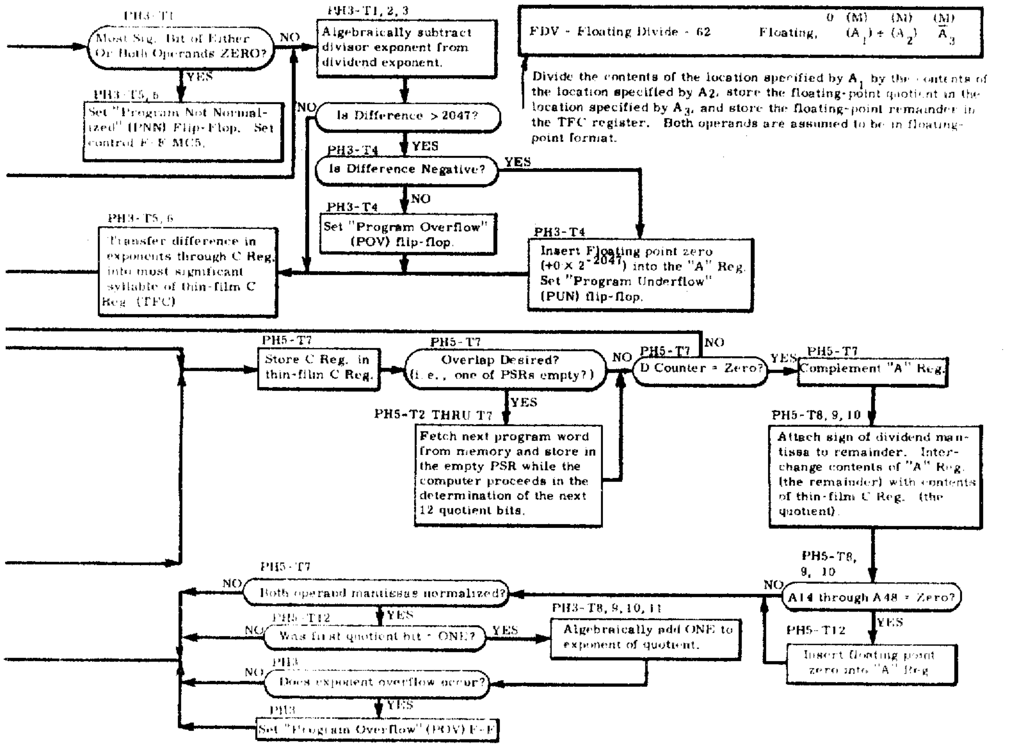
Figure 56:
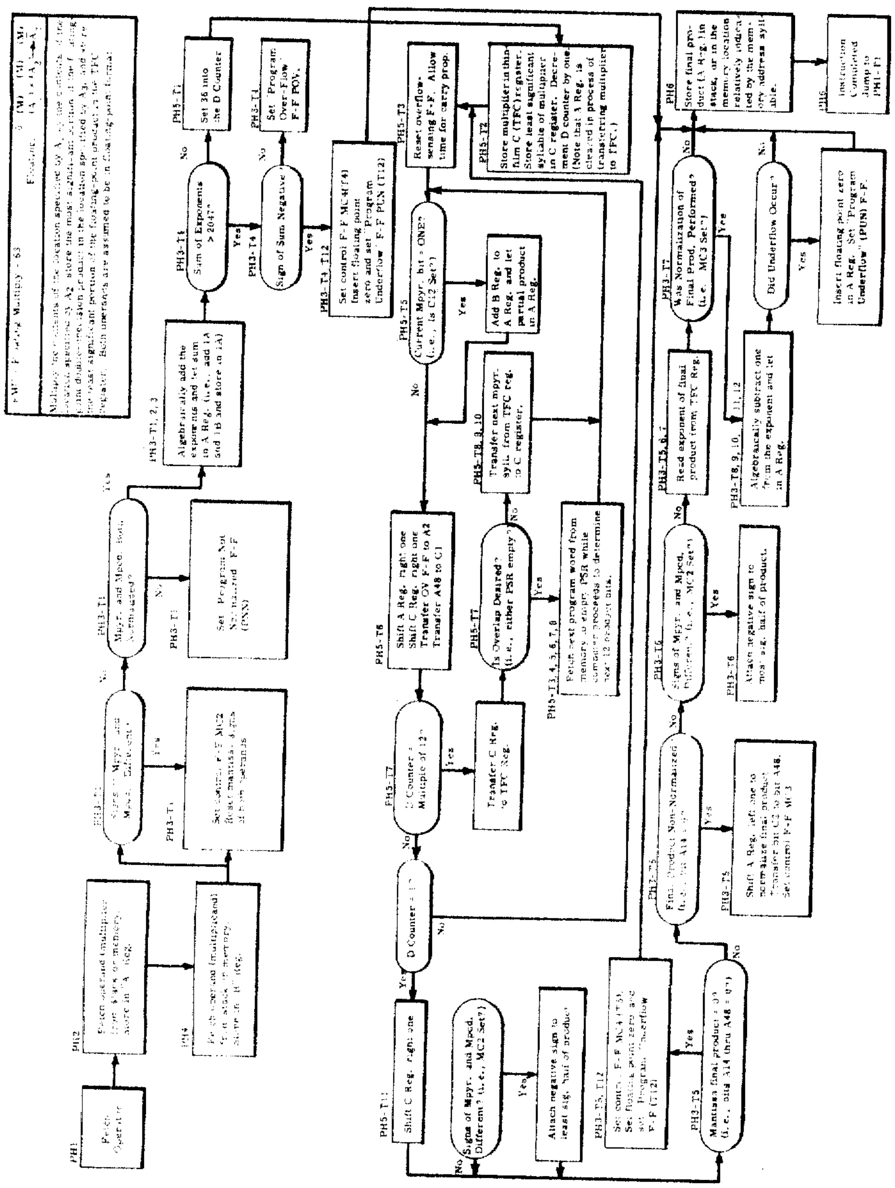
Figure 58:
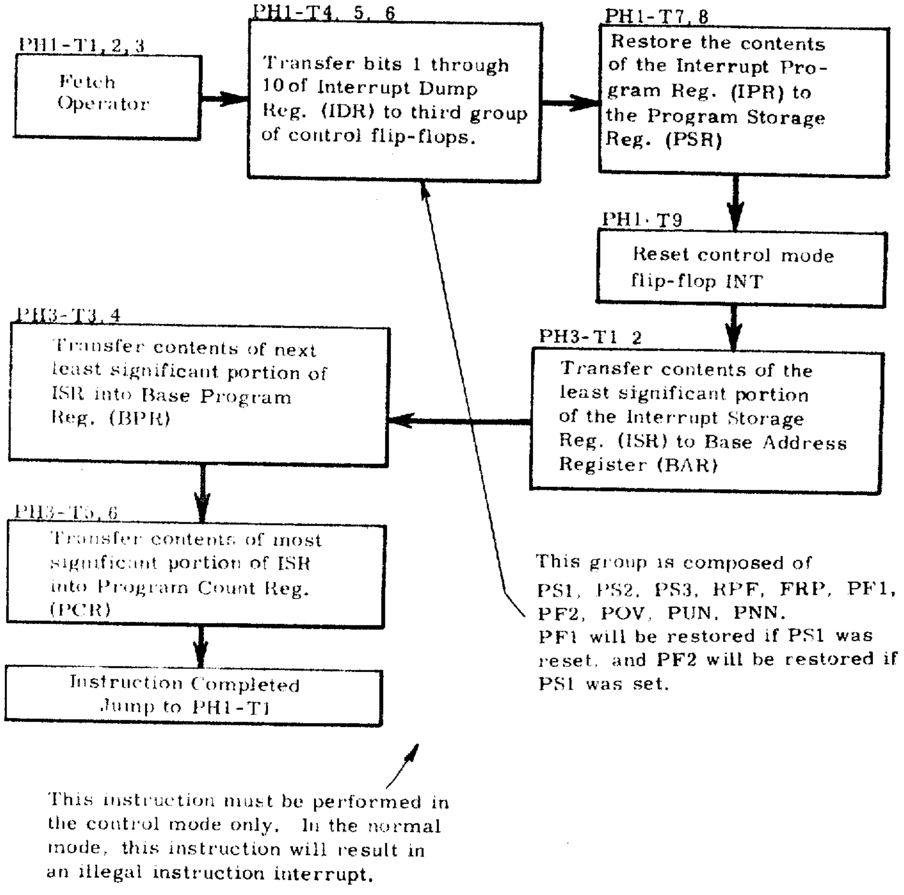
Figure 59:
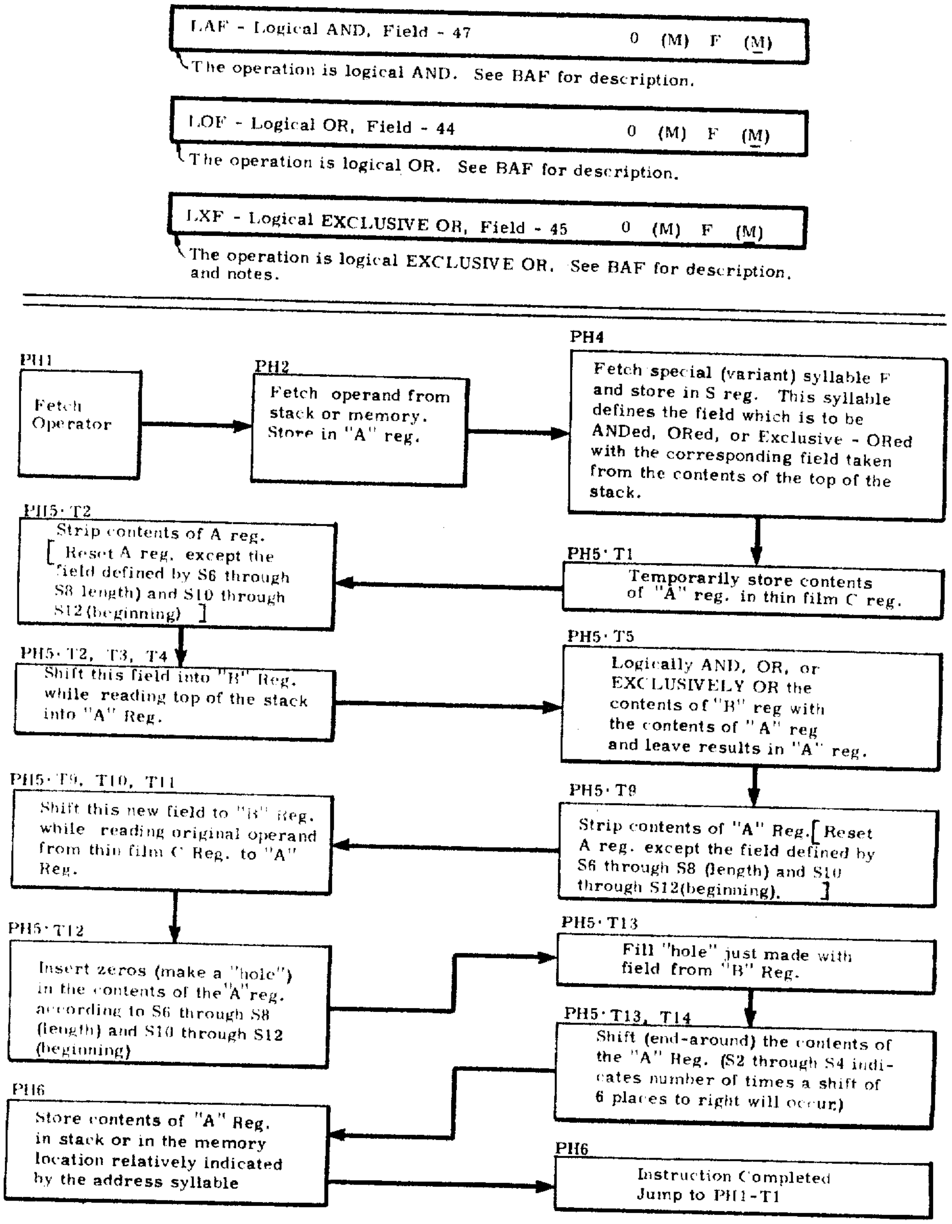
Figure 64:
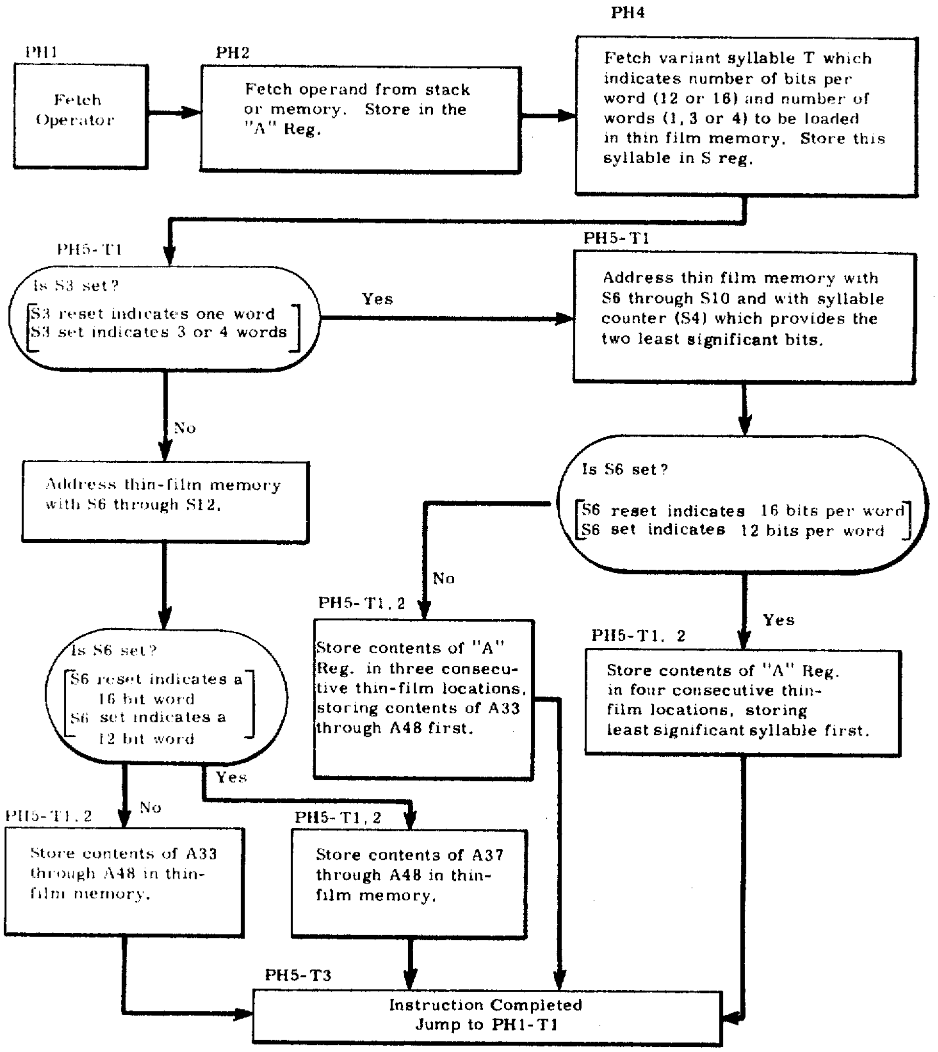
Figure 65:
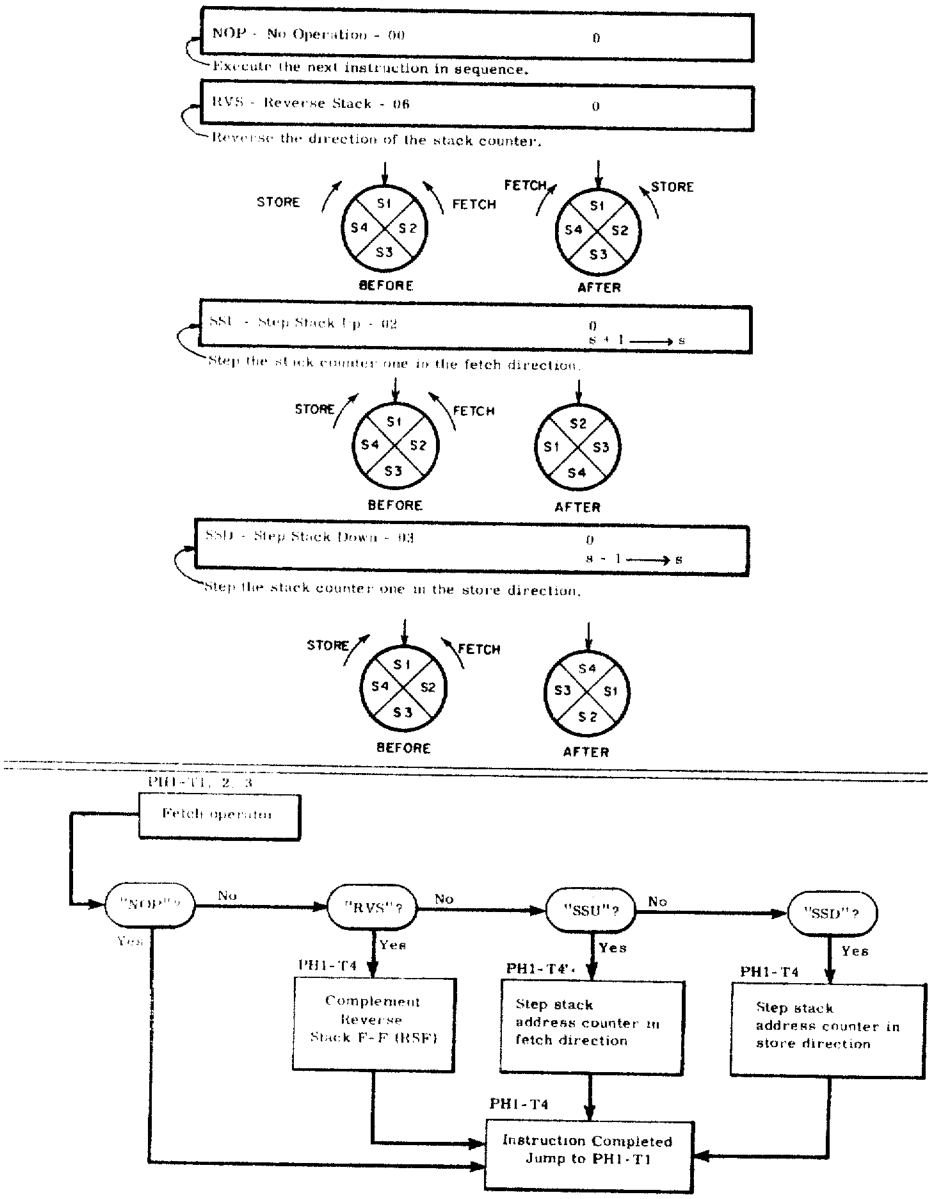
Figure 66:
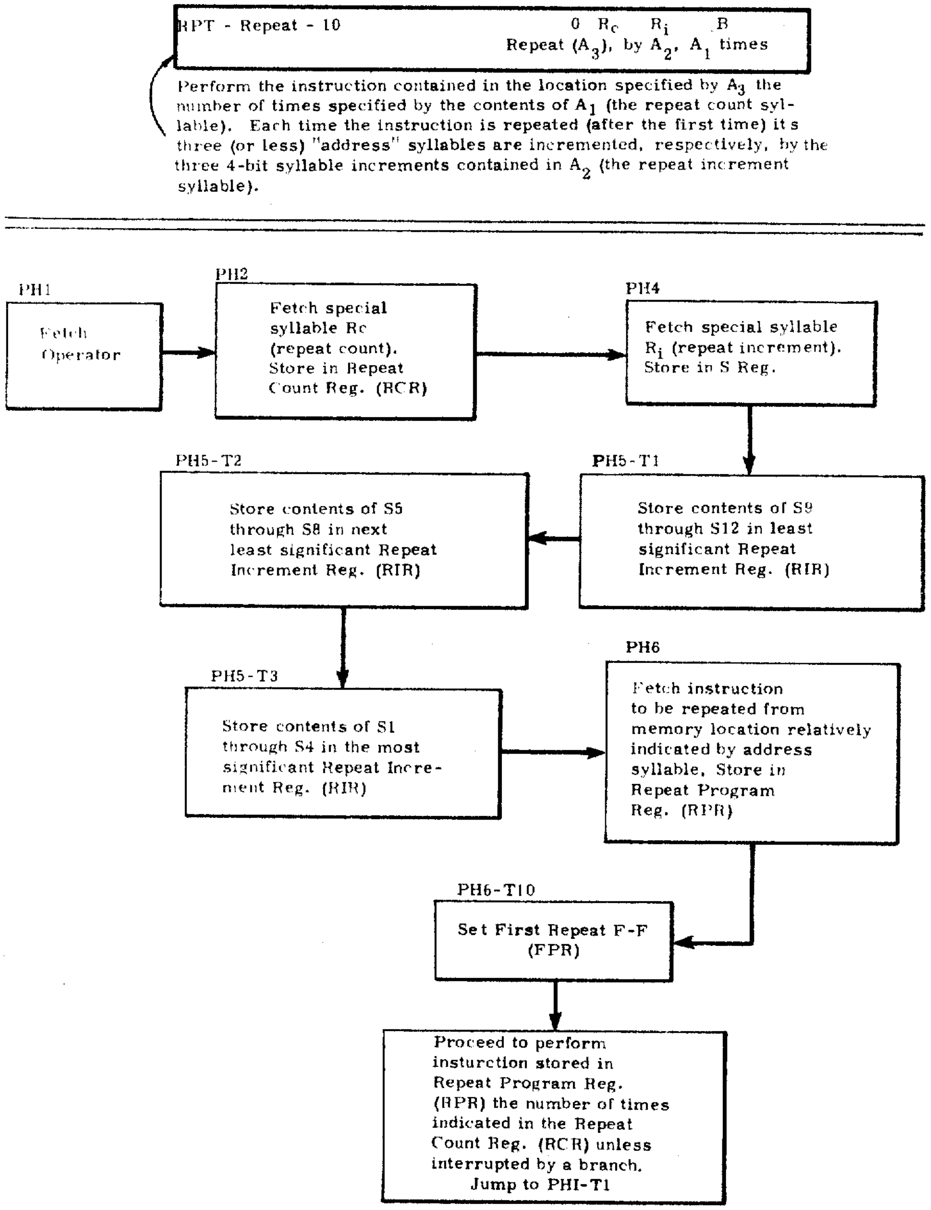
Figure 67:
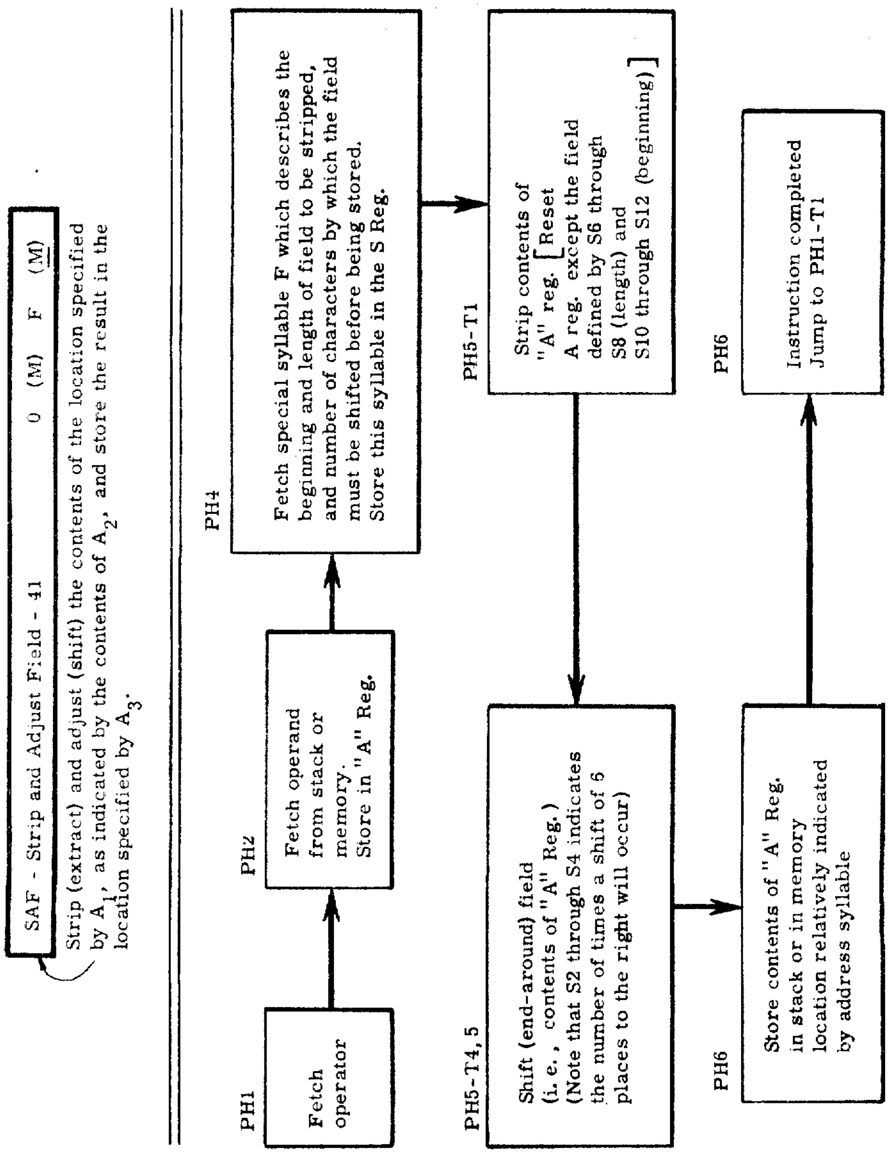
Figure 77:
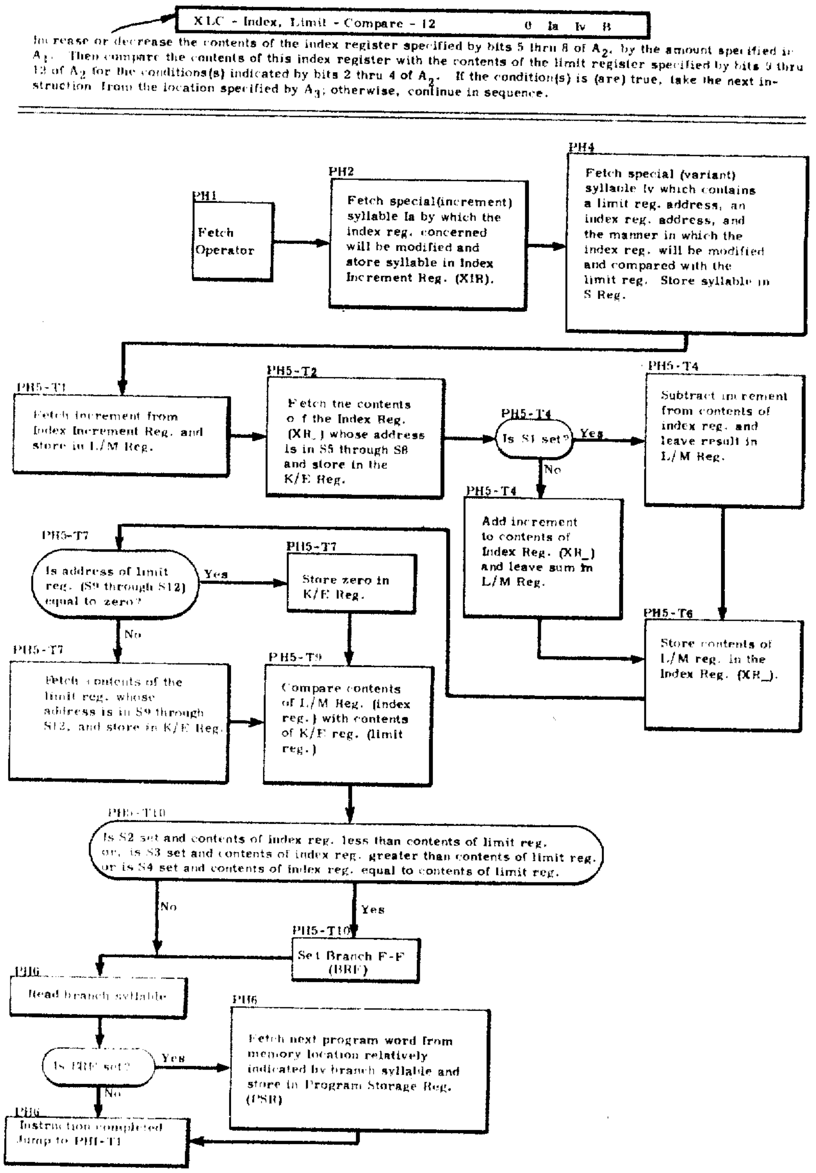

FIG. 9 comprises FIG. 9A and FIG. 9B taken in vertically tandem relationship with FIG. 9A superimposed above FIG. 9B to provide a table including each of the instructions of the computer of the illustrative embodiment of the invention wherein the instructions are categorized by numbers of addresses, by class of instruction where possible and are presented to show symbolically the execution of instructions where feasible and to show syllable layout;

FIG. 10 comprises FIG. 10A and FIG. 10B taken together in side-by-side relationship with FIG. 10A to the left and FIG. 10A and FIG. 10B together constitute a flow chart showing phase-wise, the execution of no-, one-, two-, and three-address instructions in the illustrative embodiment computer;

Each of the following figures from FIG. 11 to FIG. 77 is a flow chart illustrating a method and means for providing a desired function of the computer of the illustrative embodiment of FIG. 1;

FIG. 11 is a flow chart illustrative of the computer operation for phase 1;

FIG. 12A is a flow chart illustrative of the power failure dump routine and FIG. 12B is a flow chart illustrative of the power failure return routine;

FIG. 13 is a flow chart for the Real Time Clock Update routine;

FIG. 14 is a flow chart for the interrupt routine;

FIG. 15 is a flow chart for the repeat routine;

FIG. 16 is a flow chart for the phase 2 operand fetch;

FIG. 17 is a flow chart for the phase 2 result store;

FIG. 18 is a flow chart for the phase 2 branch;

FIG. 19 is a flow chart for the phase 4 operand fetch;

FIG. 20 is a flow chart for the phase 4 result store;

FIG. 21 is a flow chart for the phase 4 branch;

FIG. 22 is a flow chart for the phase 6 result store;

FIG. 23 is a flow chart for the phase 6 branch;

FIG. 24 is a flow chart for the fill routine;

FIG. 25 is a flow chart for the indexing routine;

FIG. 26 is a flow chart for indirect addressing routine;

FIG. 27 is a flow chart for the memory-address-compute routine for operand fetch or result store;

FIG. 28 is a flow chart for memory-address-compute routine for branch;

FIG. 29 is a flow chart for the operand fetch from memory routine;

FIG. 30 is a flow chart for fetch from operand stack showing how an operand is fetched from the top of the thin-film operand stack and stored in the arithmetic unit;

FIG. 31 is a flow chart for store result in memory routine;

FIG. 32 is a flow chart for store in stack routine;

FIG. 33 is a flow chart for the branch routine;

FIG. 34 is a flow chart of the method and means involved in the computer operation for an Alphanumeric Compare Equal instruction;

FIG. 35 is a flow chart of the method and means involved in computer operation for the Alphanumeric Compare Greater instruction;

FIG. 36 is a flow chart for the Alphanumeric Compare Less instruction;

FIG. 37 is a flow chart for the Adjust and Insert Field instruction;

FIG. 38 is a flow chart for the Binary Add instruction;

FIG. 39 is a flow chart of operations for the Binary Add, Field and Binary Subtract, Field instructions;

FIG. 40 is a flow chart of operations for the Binary Divide instruction;

FIG. 41 is a flow chart of operations for the Binary Multiply instruction;

FIG. 42 is a flow chart for the Branch On Bit instruction;

FIG. 43 is a flow chart for the Branch On Condition instruction;

FIG. 44 is a flow chart for the Binary Subtract instruction;

FIG. 45 is a flow chart for the Convert Binary To Floating Point instruction;

FIG. 46 is a flow chart for the Compare Equal Field instruction;

FIG. 47 is a flow chart of operations for the Compare Equal instruction;

FIG. 48 is a flow chart for the Compare Greater Field instruction;

FIG. 49 is a flow chart for the Compare Greater instruction;

FIG. 50 is a flow chart for the Clear instruction which enables making the contents of a location including the sign equal to zero;

FIG. 51 is a flow chart of the Compare Less, Field instruction;

FIG. 52 is a flow chart of the Compare Less instruction;

FIG. 53 is a flow chart illustrative of a means and a method involved in operation of the illustrative embodiment computer for the Character Search instruction;

FIG. 54 is a flow chart for the Floating Add and for the Floating Subtract instructions;

FIG. 55 comprises FIGS. 55A and 55B taken in side-by-side relationship with FIG. 55A to the left and FIG. 55B to the right to present a flow chart illustrative of the means and method involved in operation for the Floating Divide instruction;

FIG. 56 is a flow chart of the Floating Multiply instruction;

FIG. 57 is a flow chart illustrative of the method and means involved in operation for the Halt instruction, both in the normal mode and in the control mode of operation of the computer of this invention;

FIG. 58 is a flow chart of the Interrupt Routine Return instruction (performed in the control mode only);

FIG. 59 is a flow chart illustrative of the Logical AND, Field, Logical OR, Field and Logical Exclusive-OR, Field instructions;

FIG. 60 is a flow chart for the Logical AND, Logical OR, and Logical Exclusive-OR instructions;

FIG. 61 is a flow chart for the Logical Complement, Field instruction;

FIG. 62 is a flow chart for the Logical Complement instruction;

FIG. 63 is a flow chart for the Load Special Register instruction (performed in the control mode only);

FIG. 64 is a flow chart illustrative of the method and means involved in operation for the Load Thin Film instruction where in the least significant end (or the whole word) of the contents of the location specified by the operand indicator is loaded into the thin-film register (or group of registers) specified by the second indicator of the operator syllable for the instruction;

FIG. 65 is a flow chart and illustrative logical schematic representation of the No Operation, Reverse Stack, Step Stack Down, and Step Stack Up instructions showing stepping of the stack for the Reverse Stack, Step Stack Up and Step Stack Down operations;

FIG. 66 is a flow chart of operations for the Repeat instruction;

FIG. 67 is a flow chart for the Strip and Adjust Field instruction (to strip is to extract and to adjust is to shift).

Figure 69:
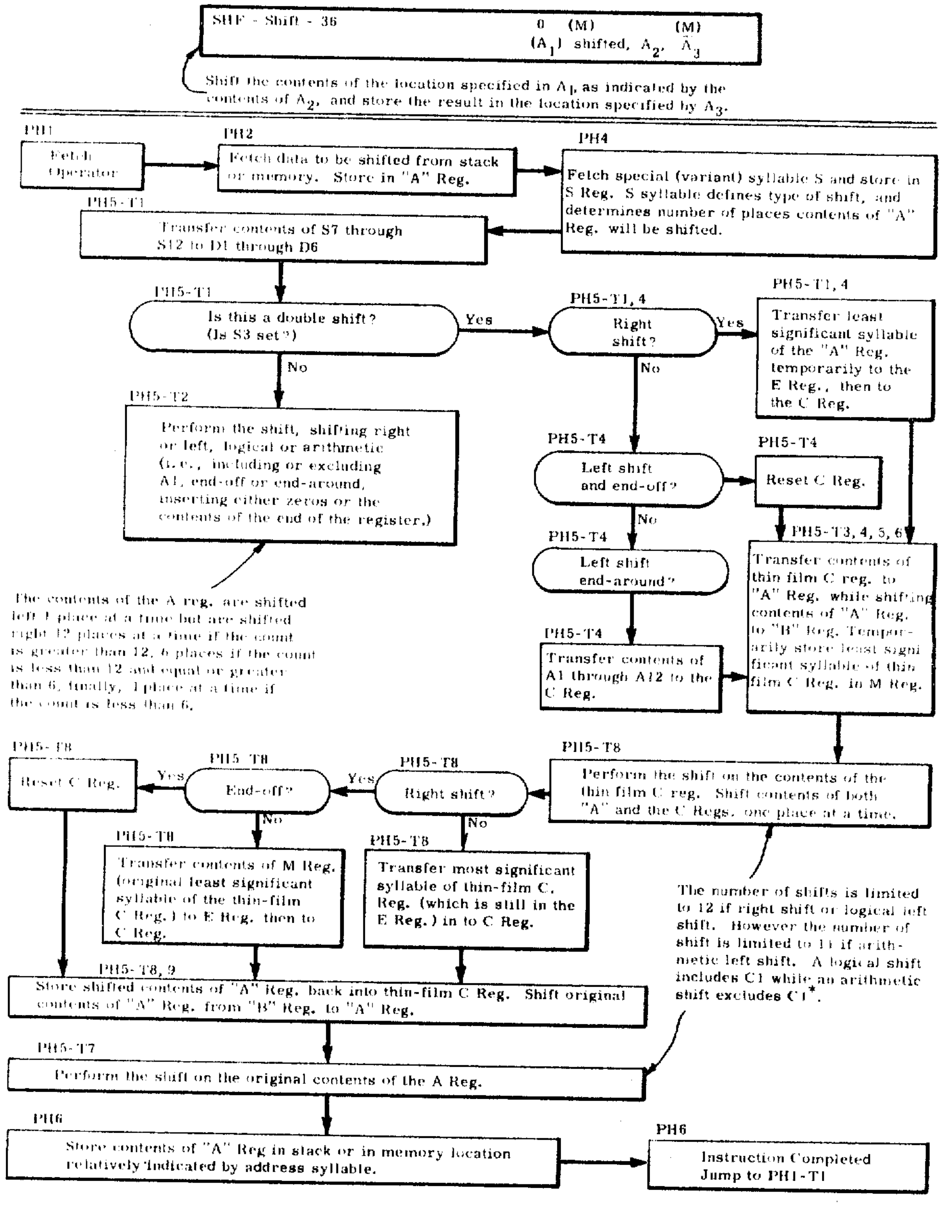

FIG. 68 is a flow chart for the Store External Requests instruction;

FIG. 69 is a flow chart of the method and means involved in the operations for the Shift instructions by means of which shift can occur to right or left, end-around or end-off, logical or arithmetic, long, both thin-film C and A registers, one place at a time for twelve places (eleven if arithmetic left shift), or short, only A register and one, six or twelve places to the right or one place to the left.

Figure 2:
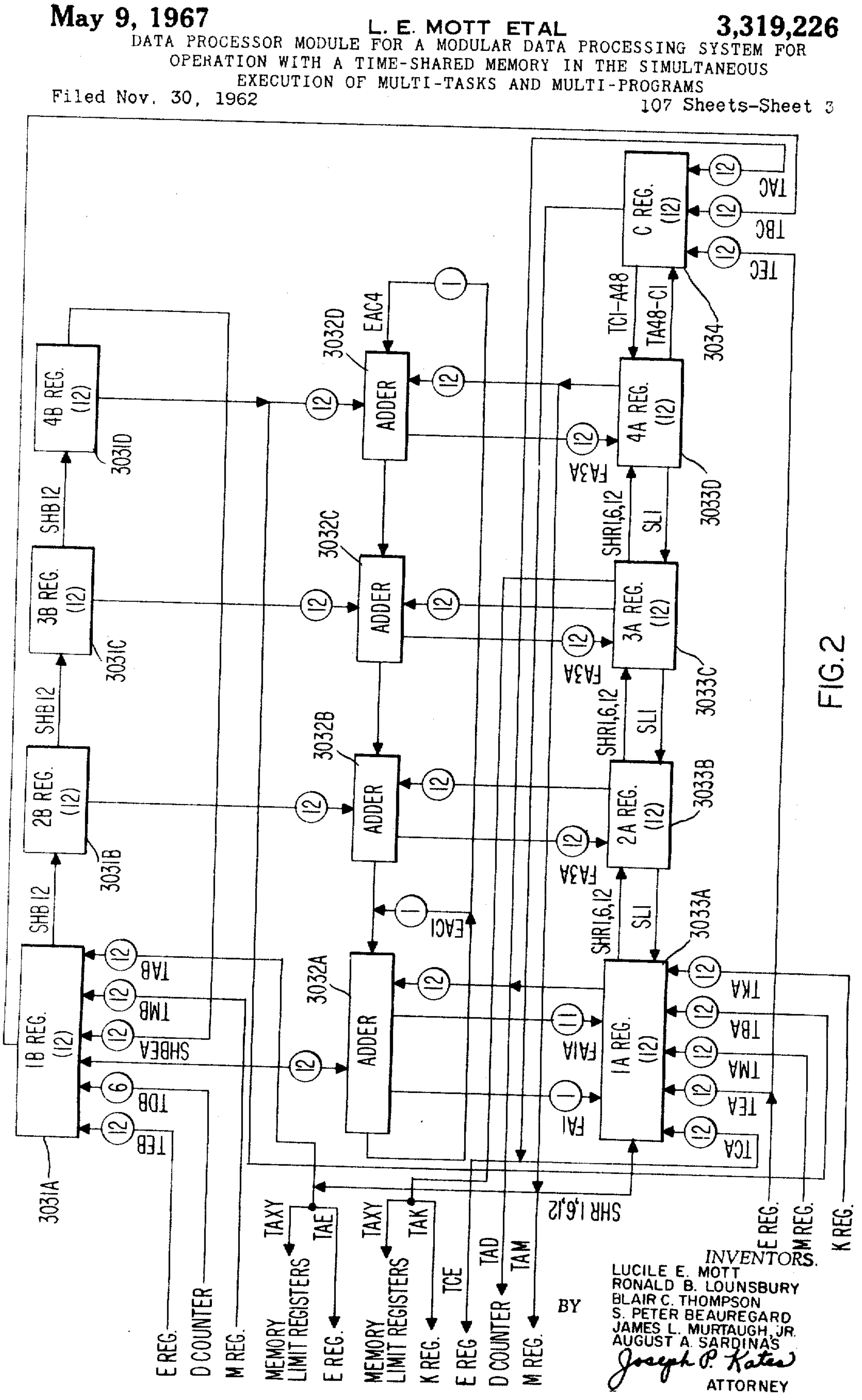
FIG. 2 is a block diagram of the arithmetic unit of the computer module of FIG. 1.
Figure 70:
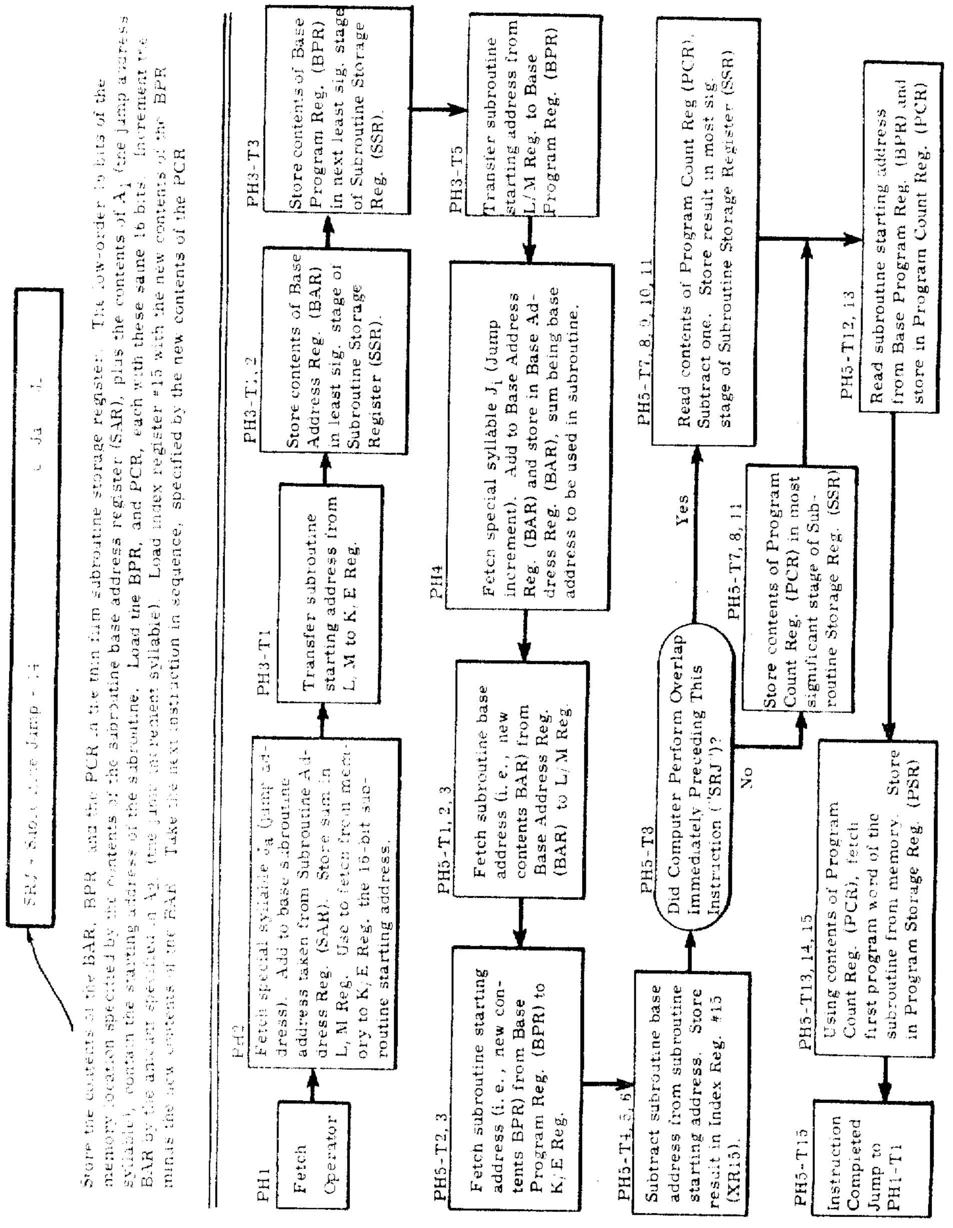
Figure 71:
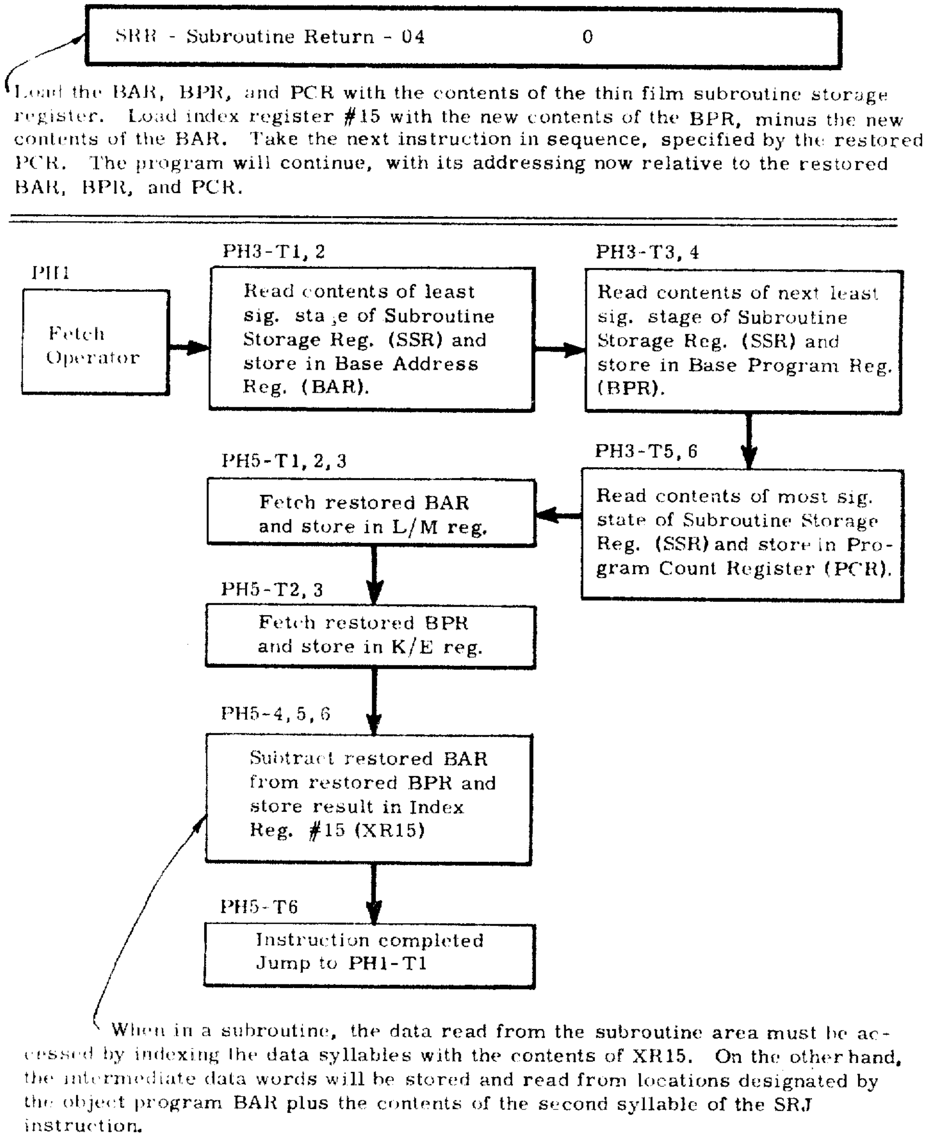
Figure 72:
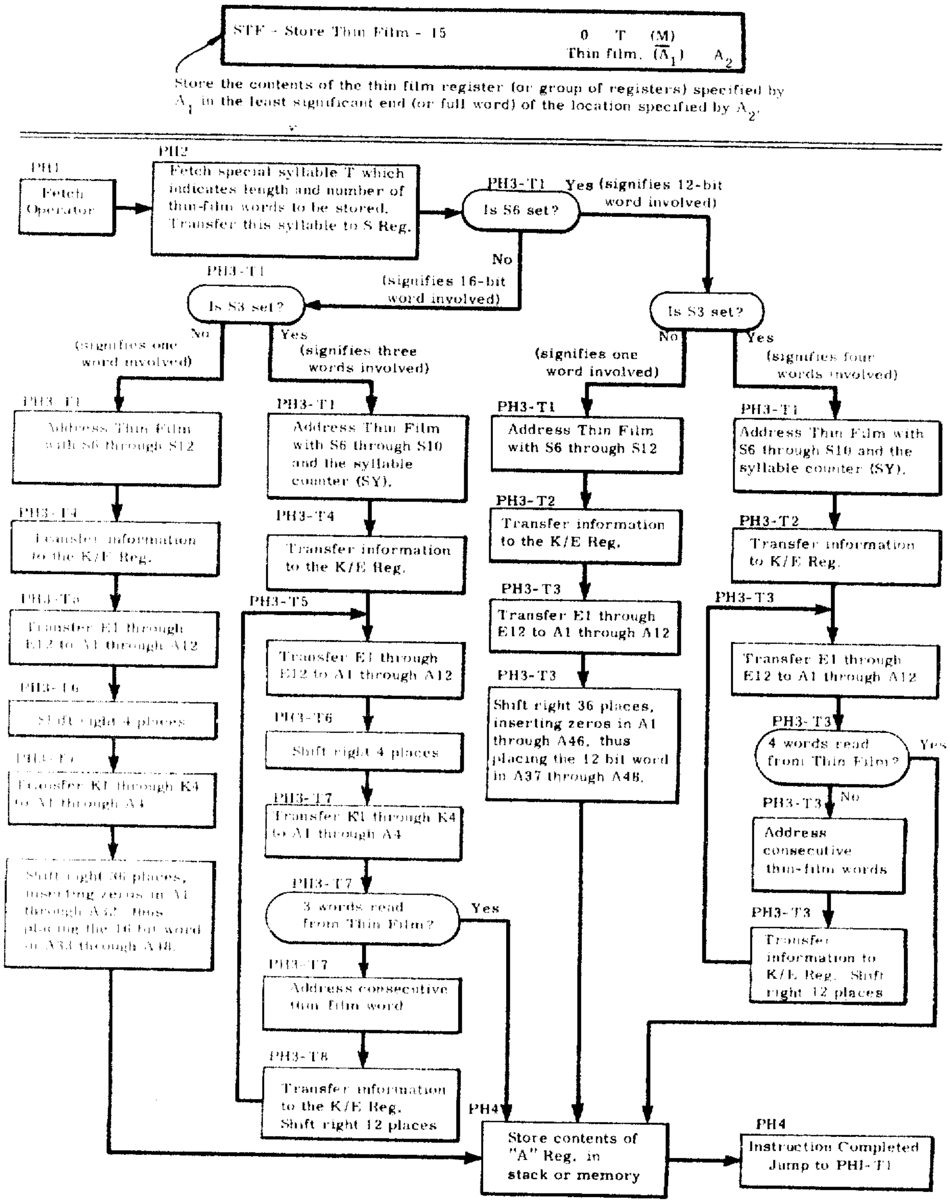
Figure 73:
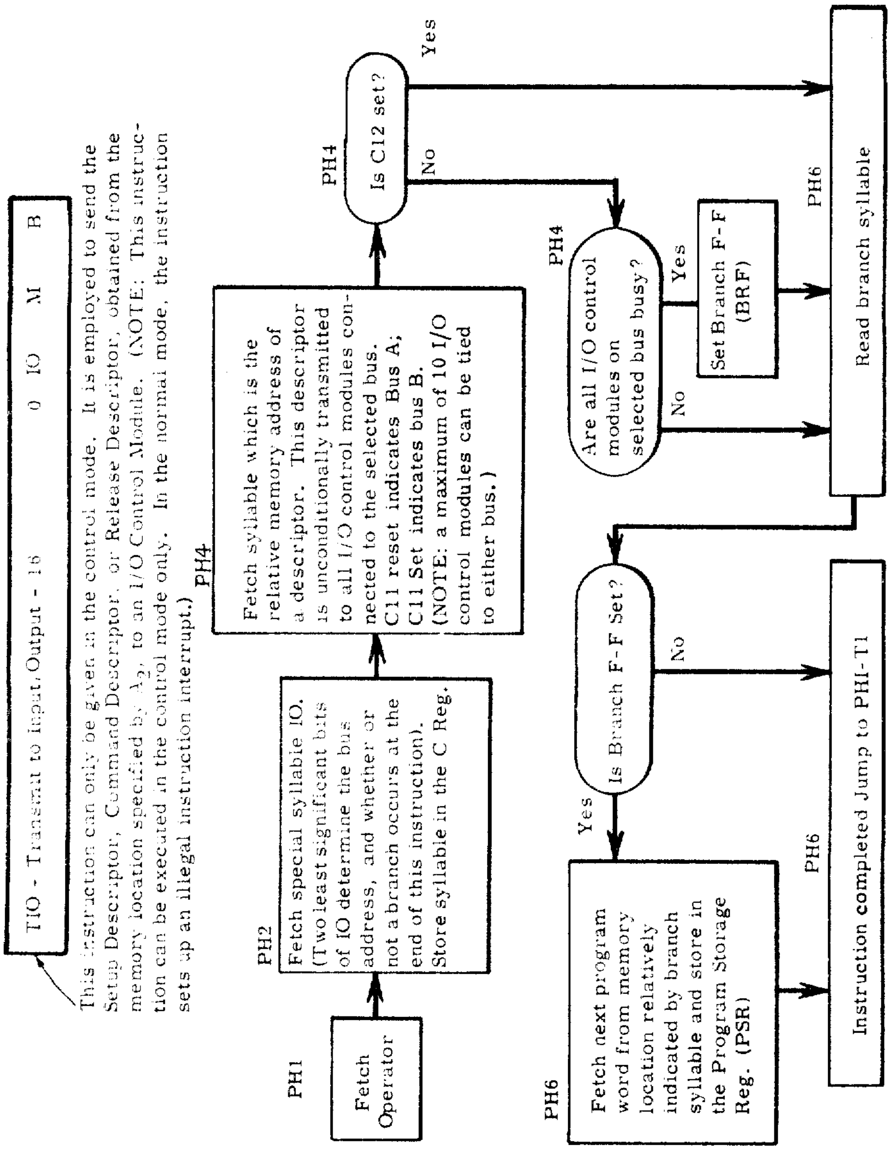
Figure 74:
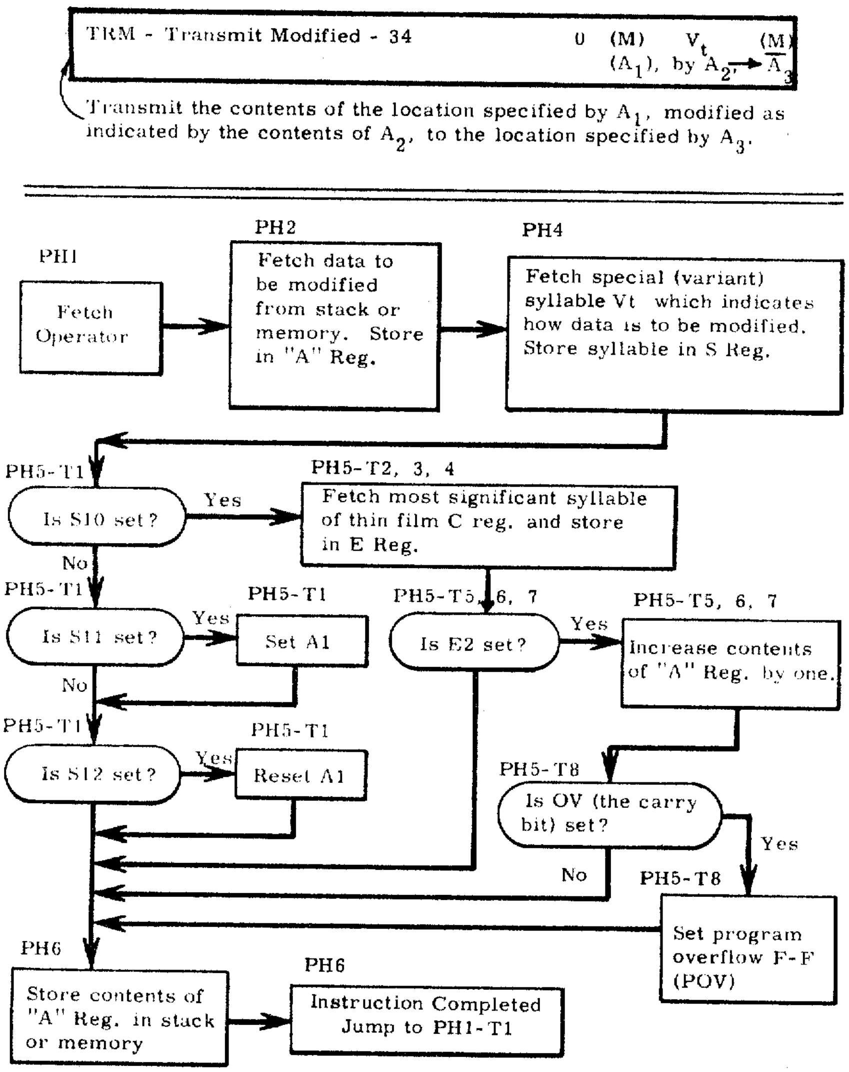
Figure 75:
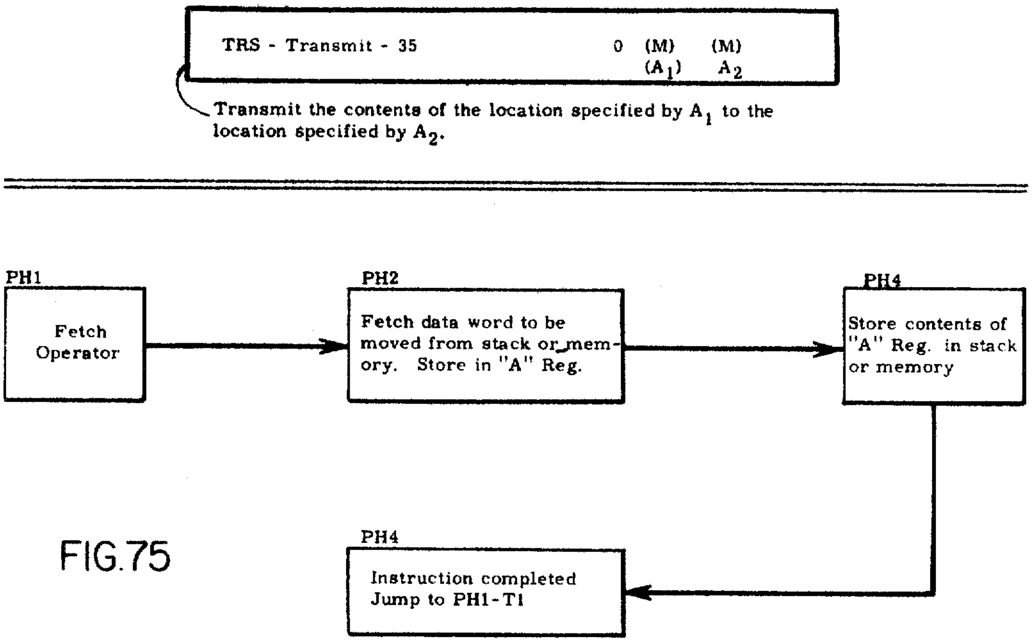
Figure 76:
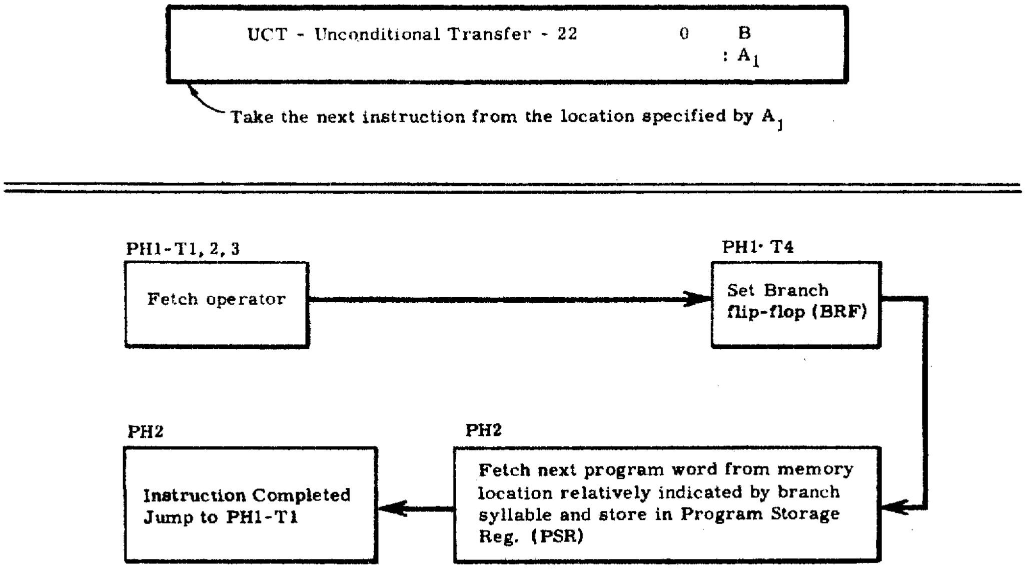
Figure 78:
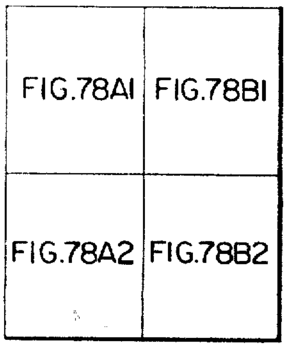
Figure 79:
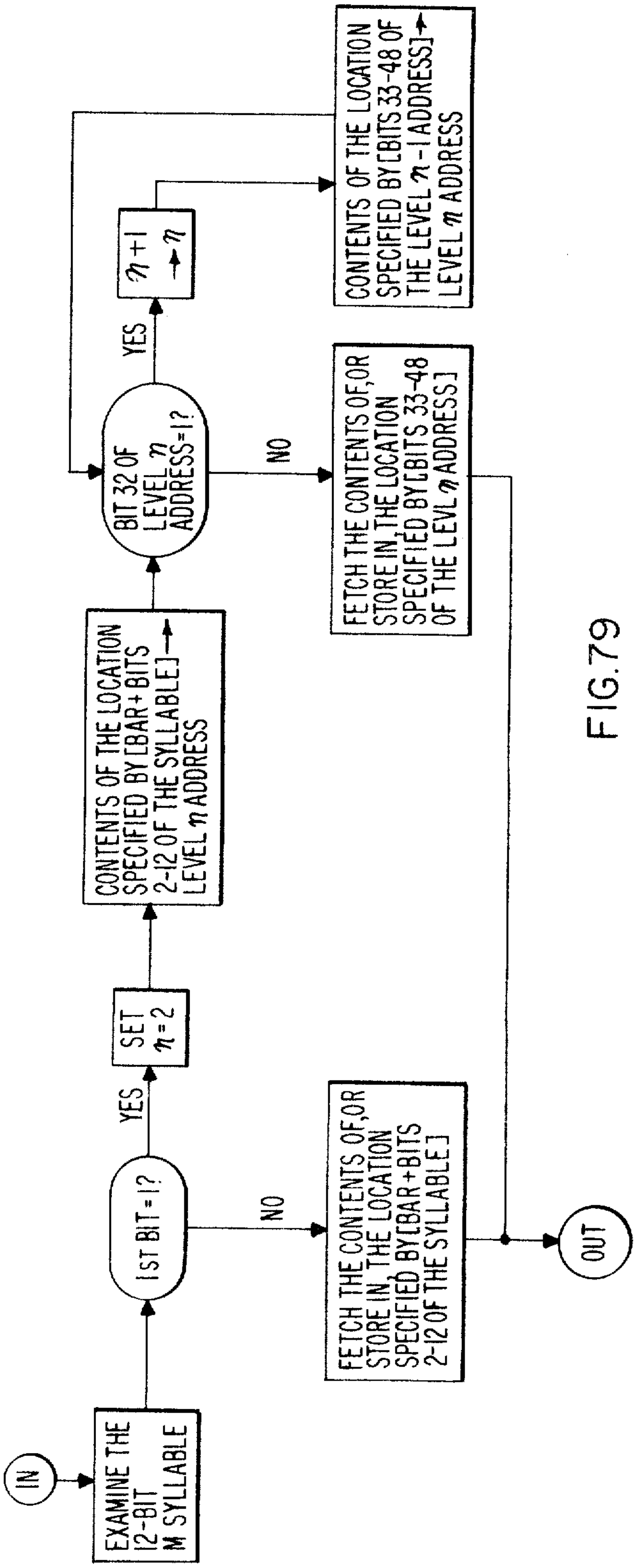
Figure 80:
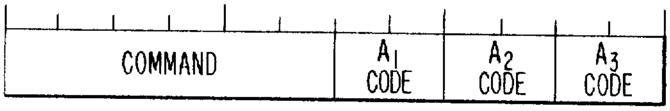
Figure 81:
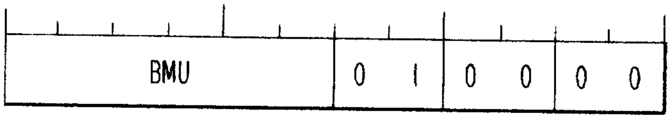
Figure 82:
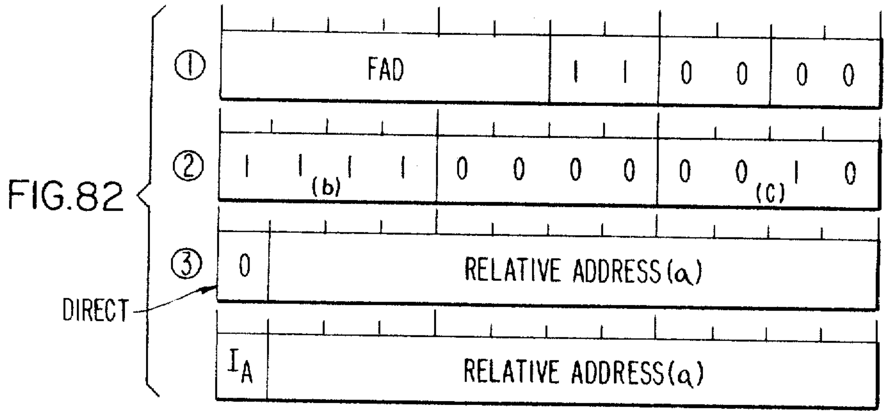
Figure 83:
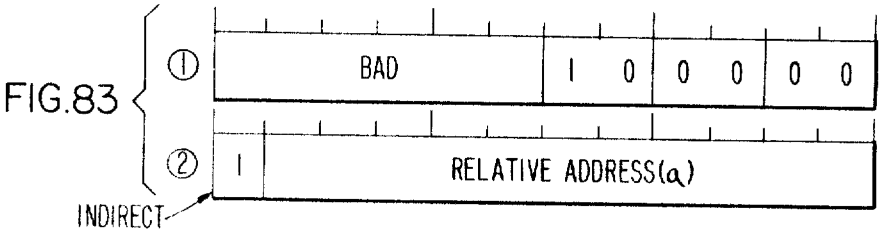
Figure 84A:
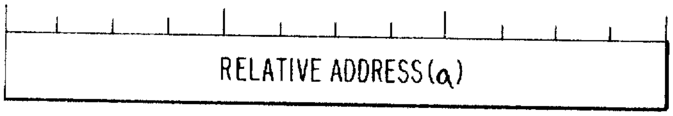
Figure 84B:
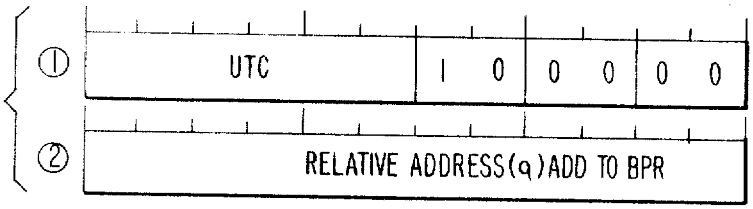
Figure 85A:
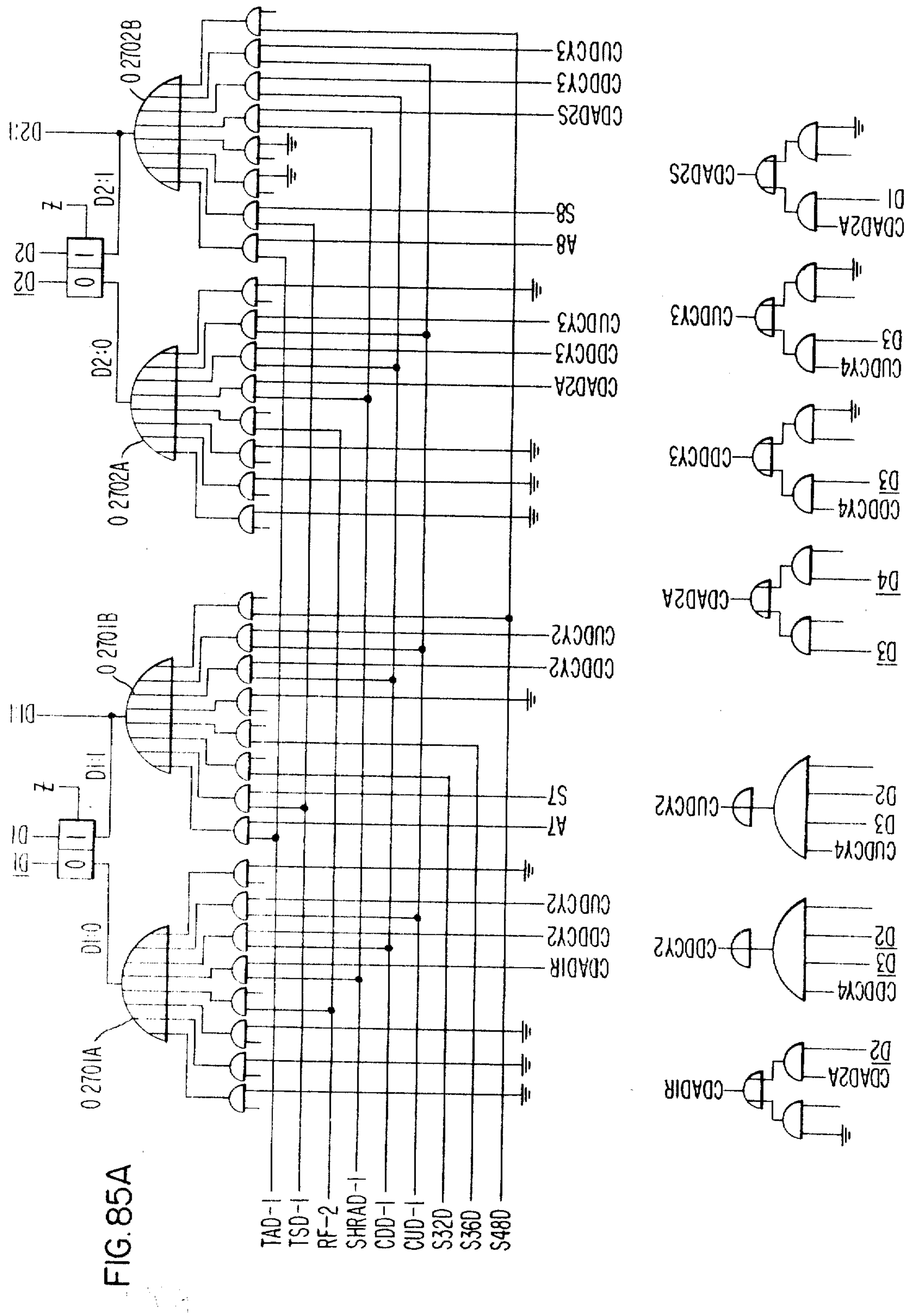
Figure 85B:
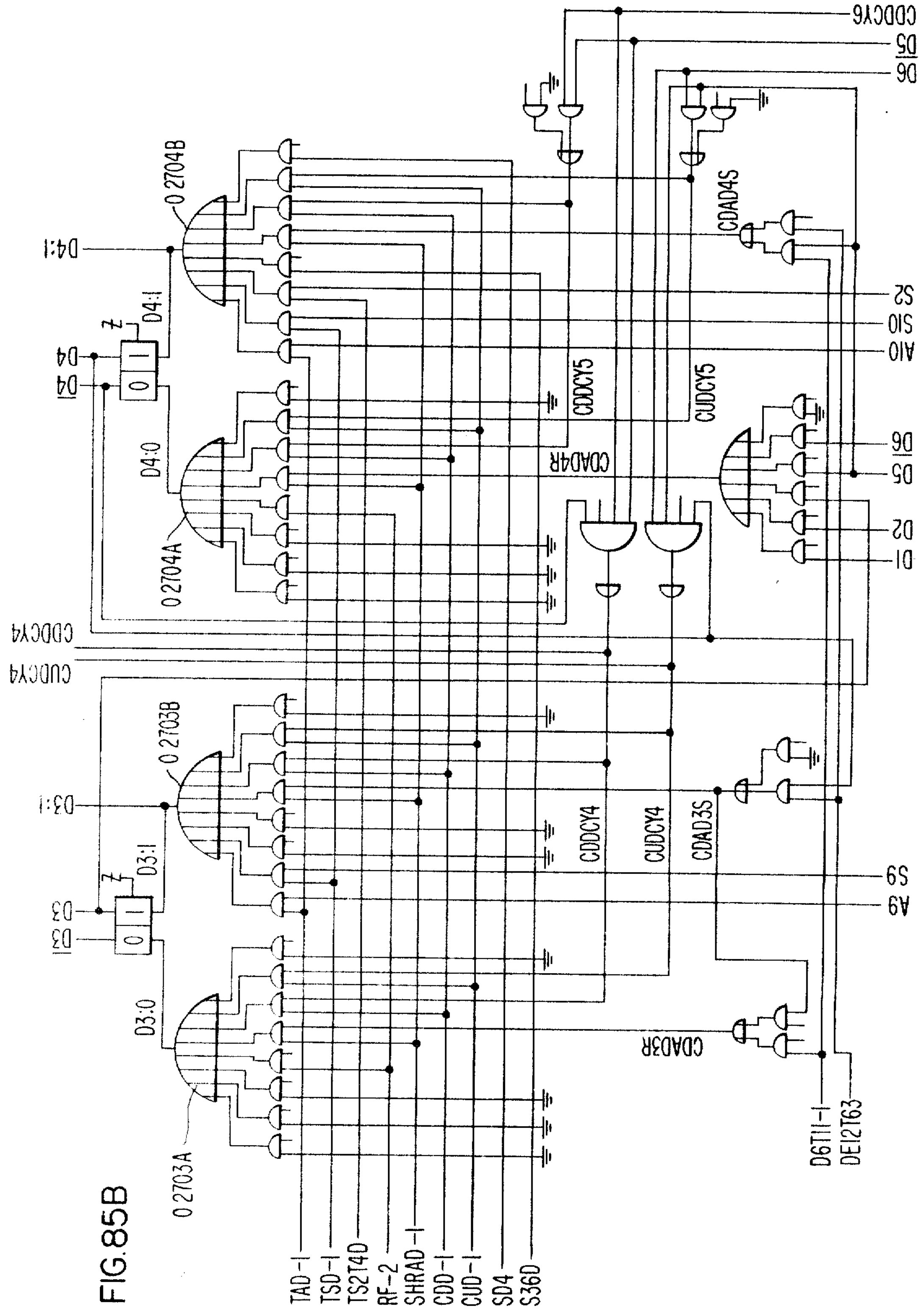
Figure 85C:
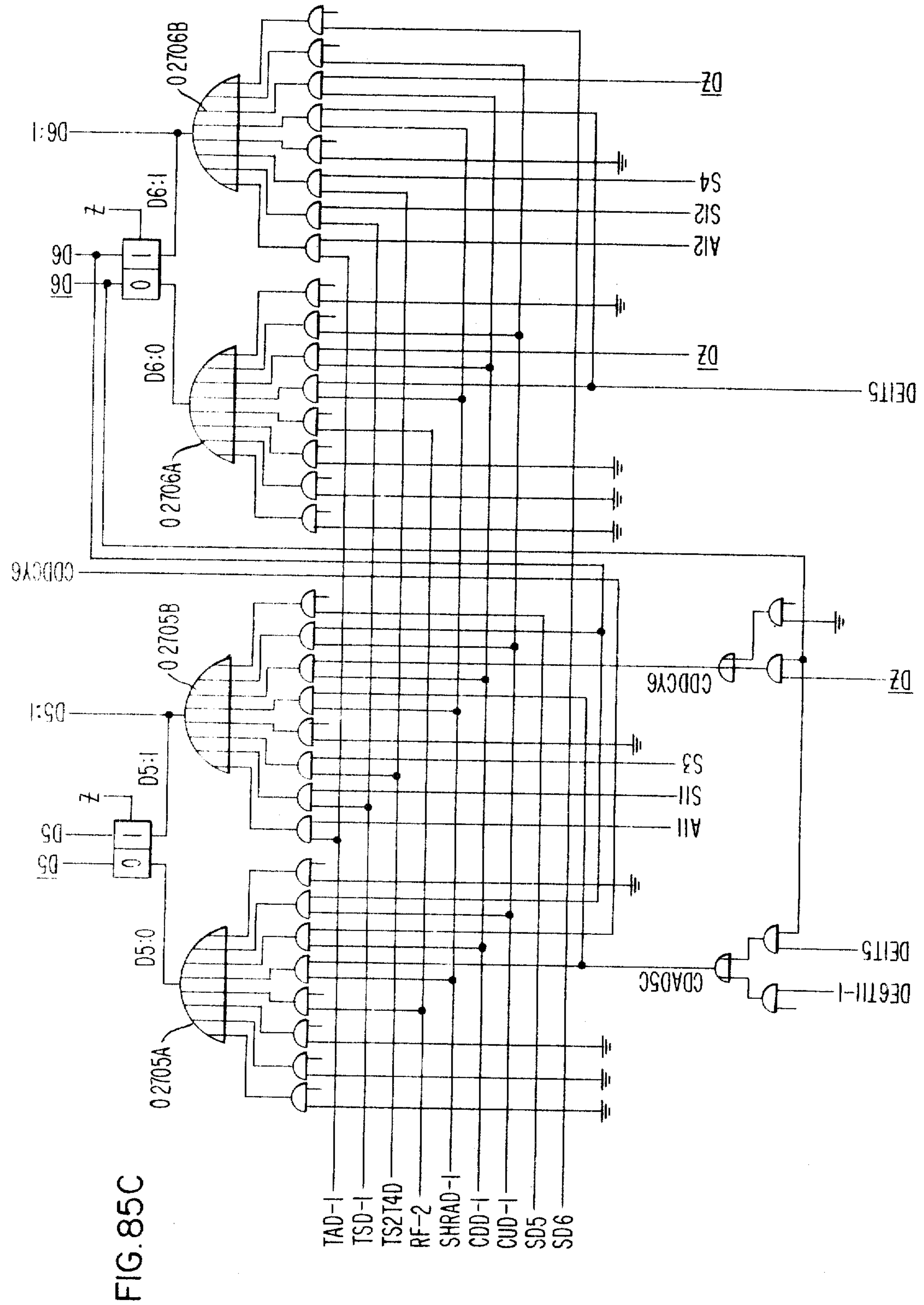
Figure 86:
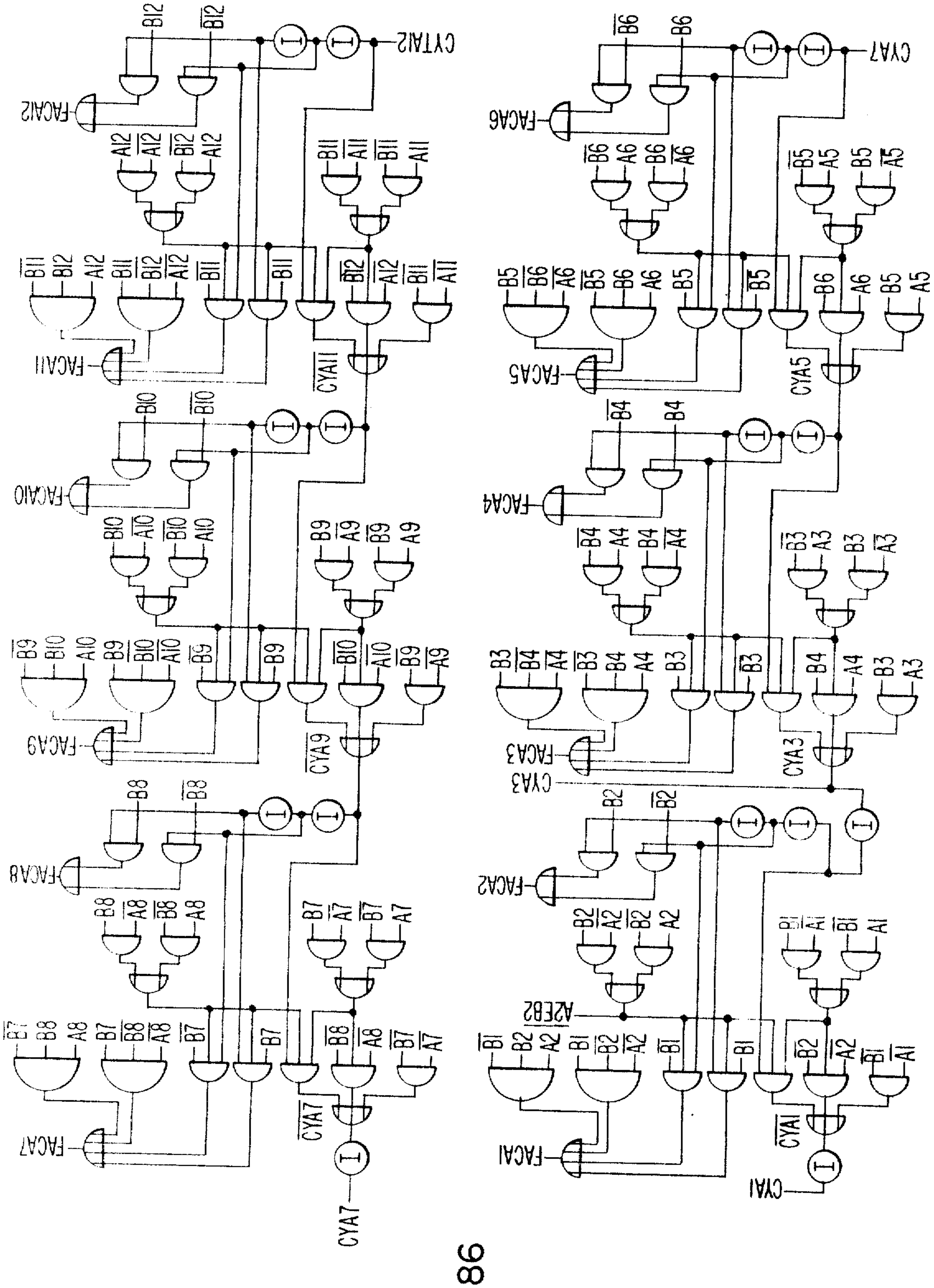
Figure 87:
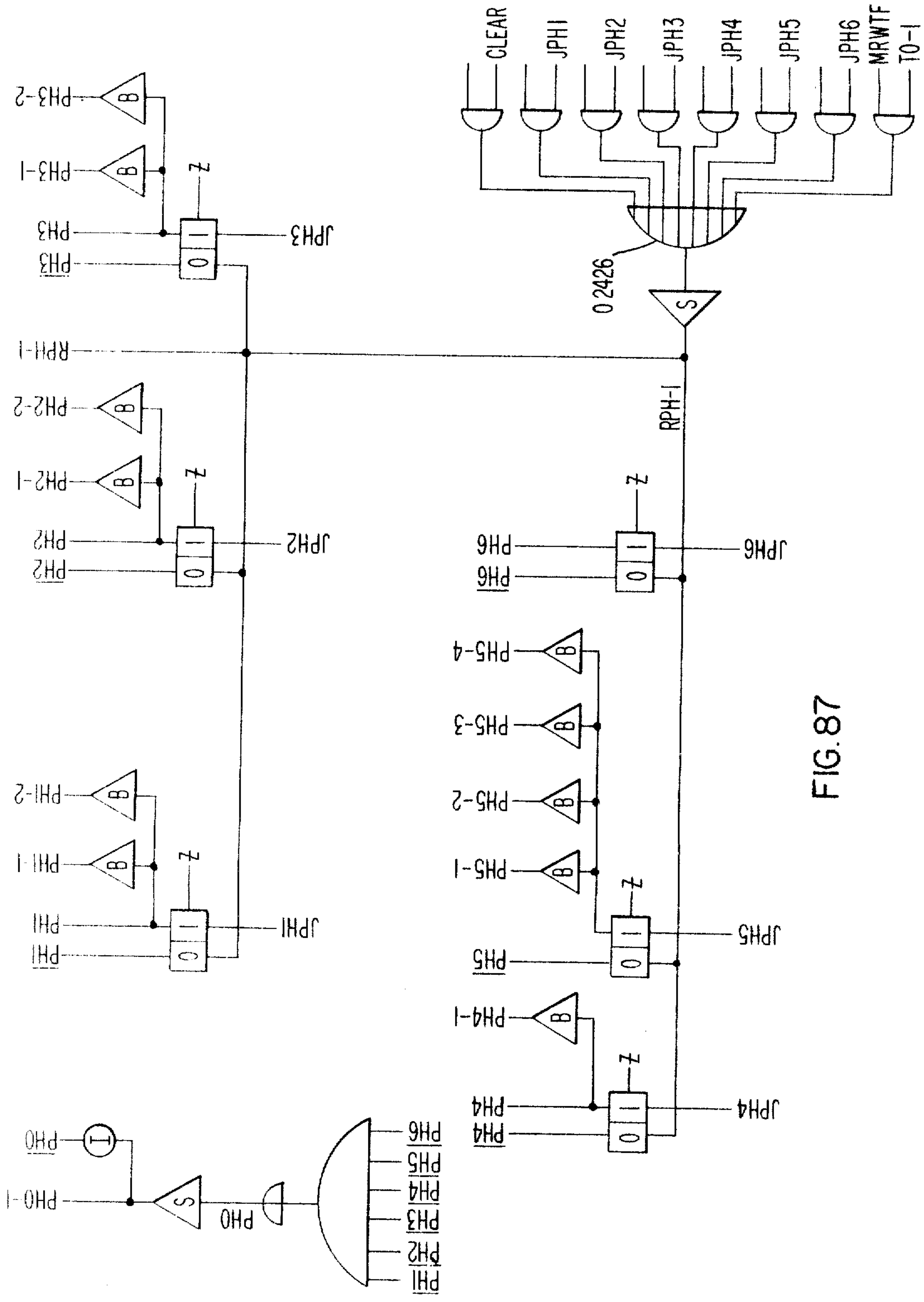
Figure 88A:
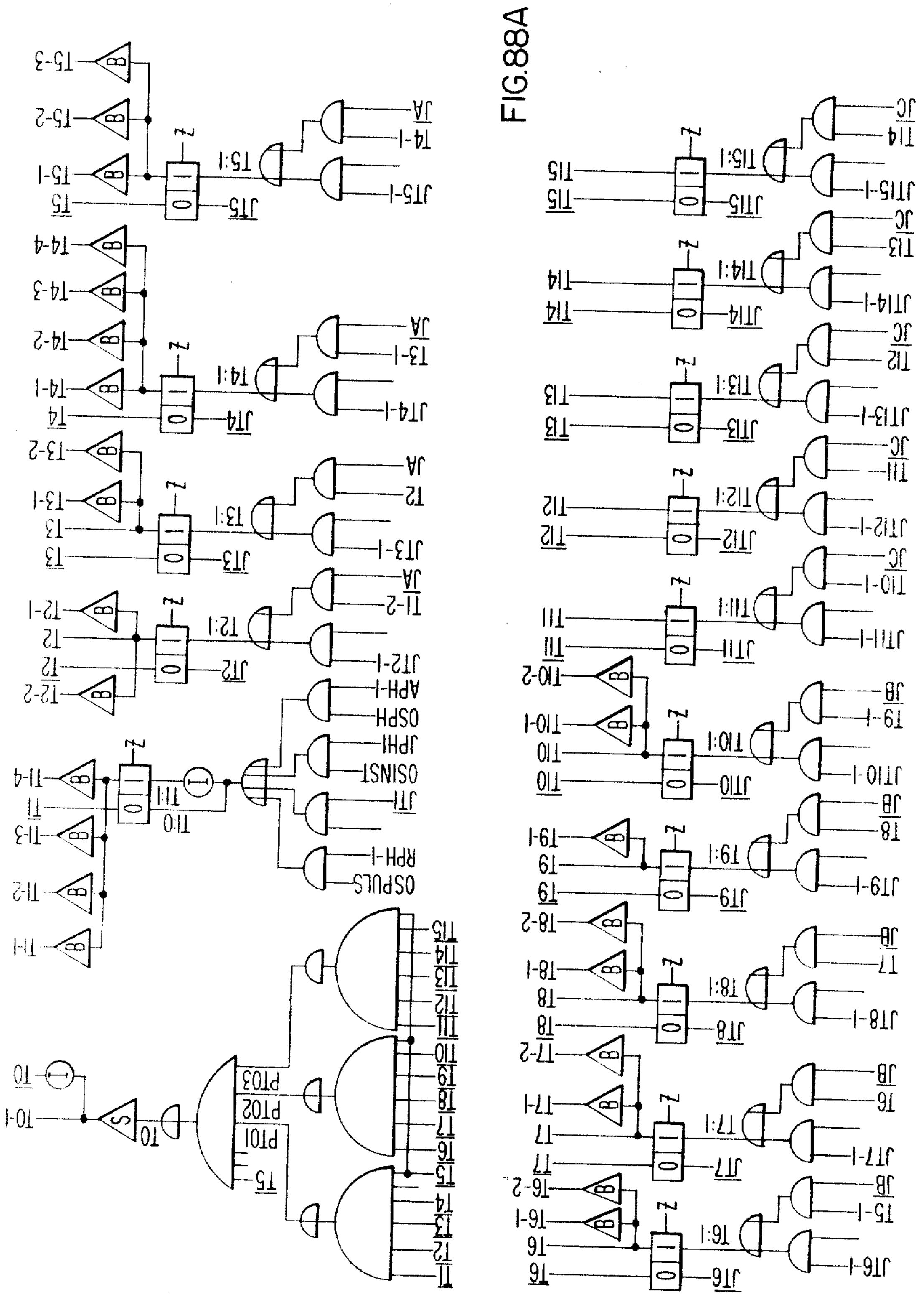
Figure 89:
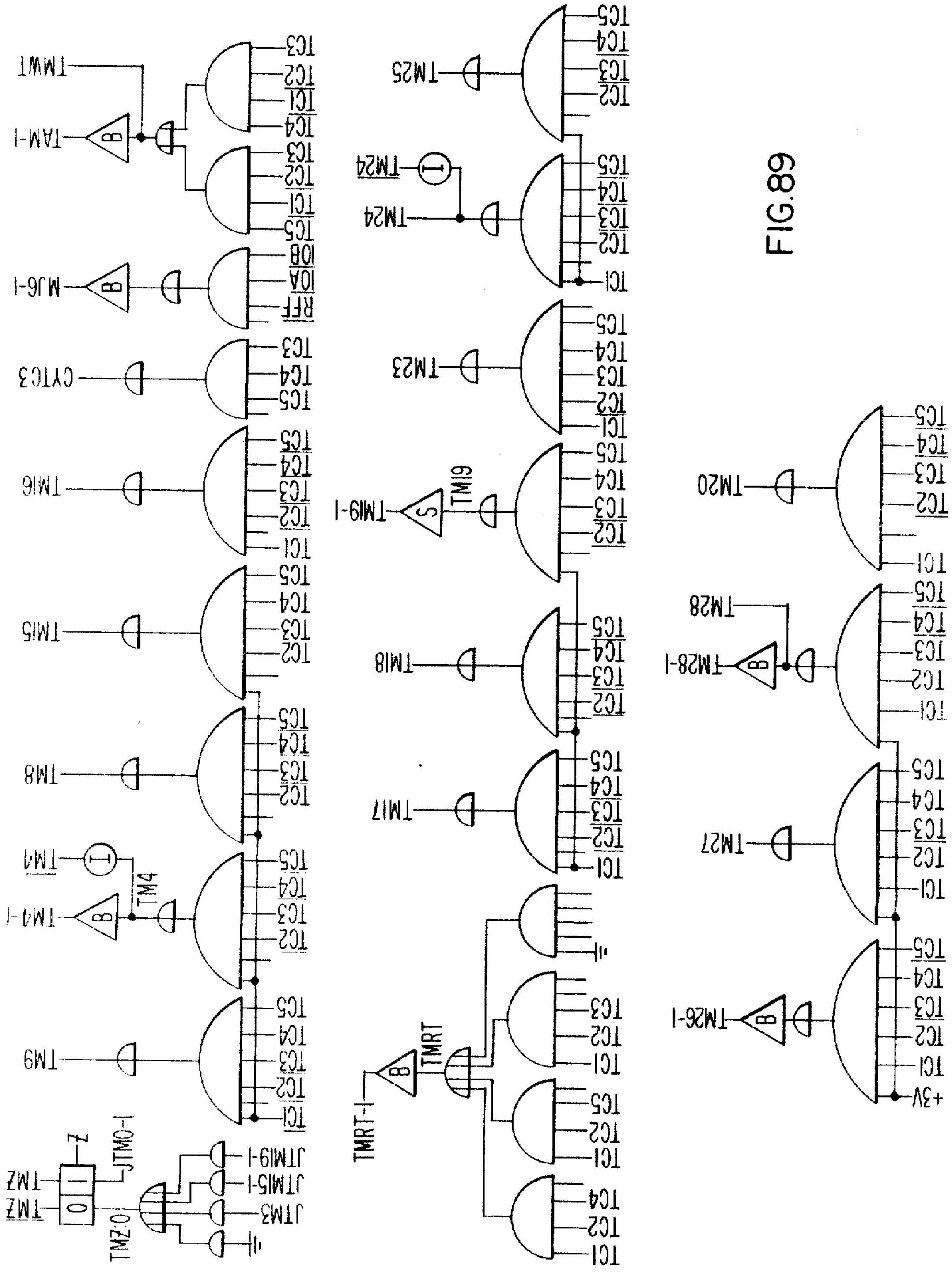
Figures 88B, 90:
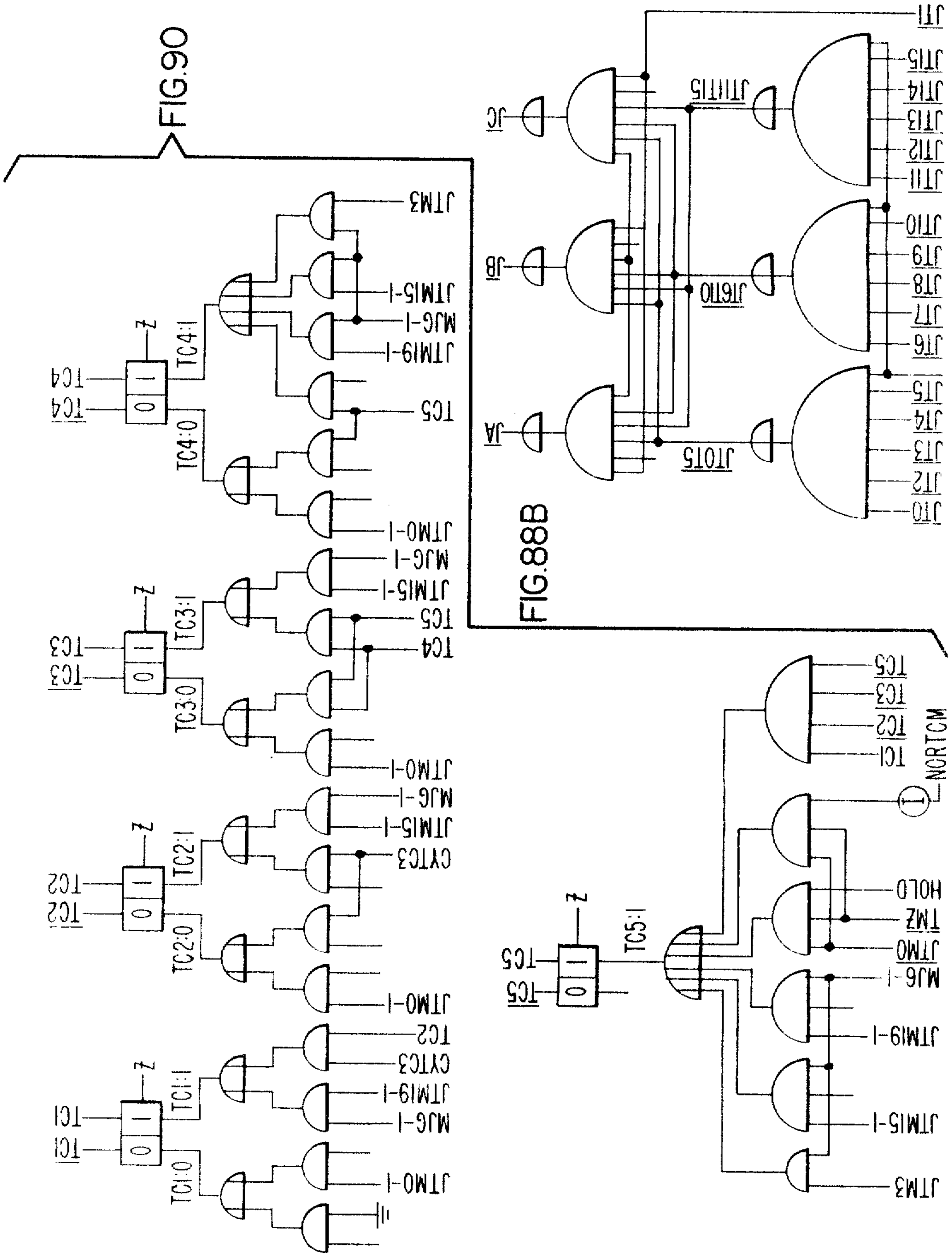
Figure 91A:
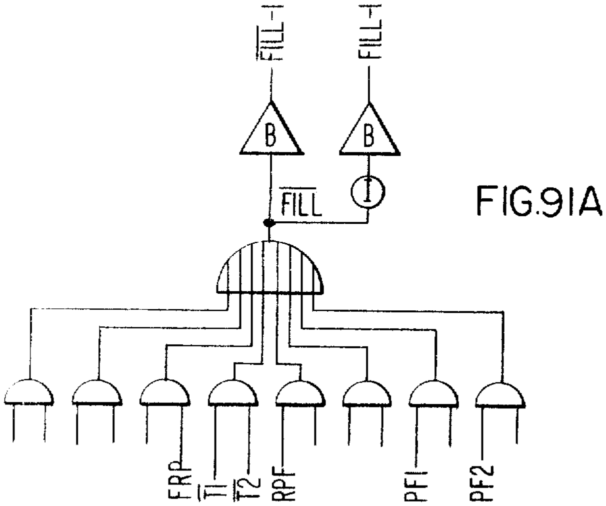
Figure 91B:
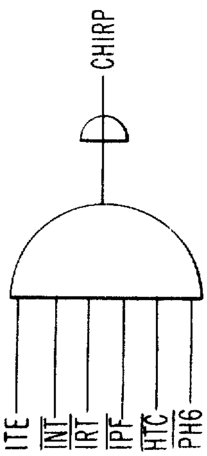
Figure 91C:
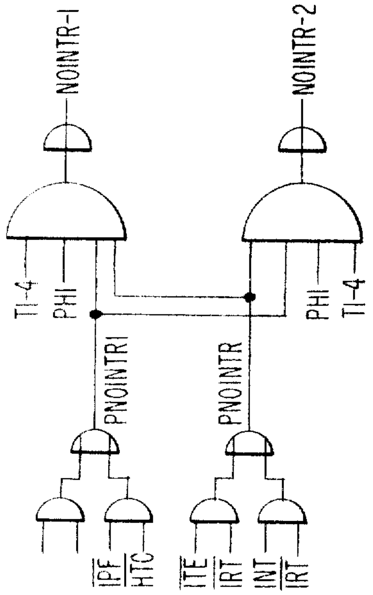
Figure 91D:
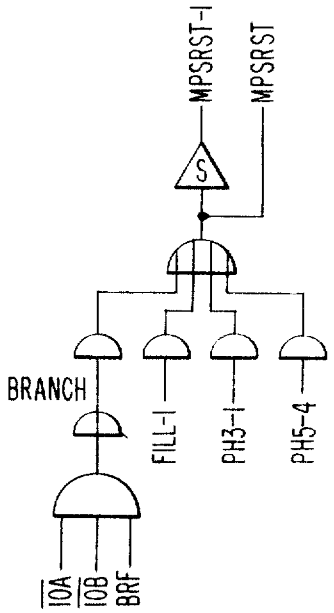
Figure 91E:
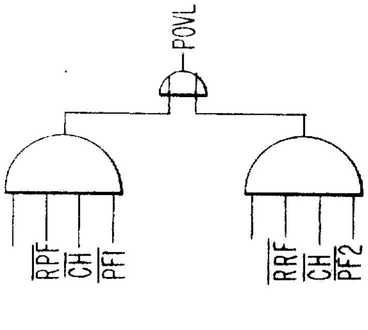
Figure 92:
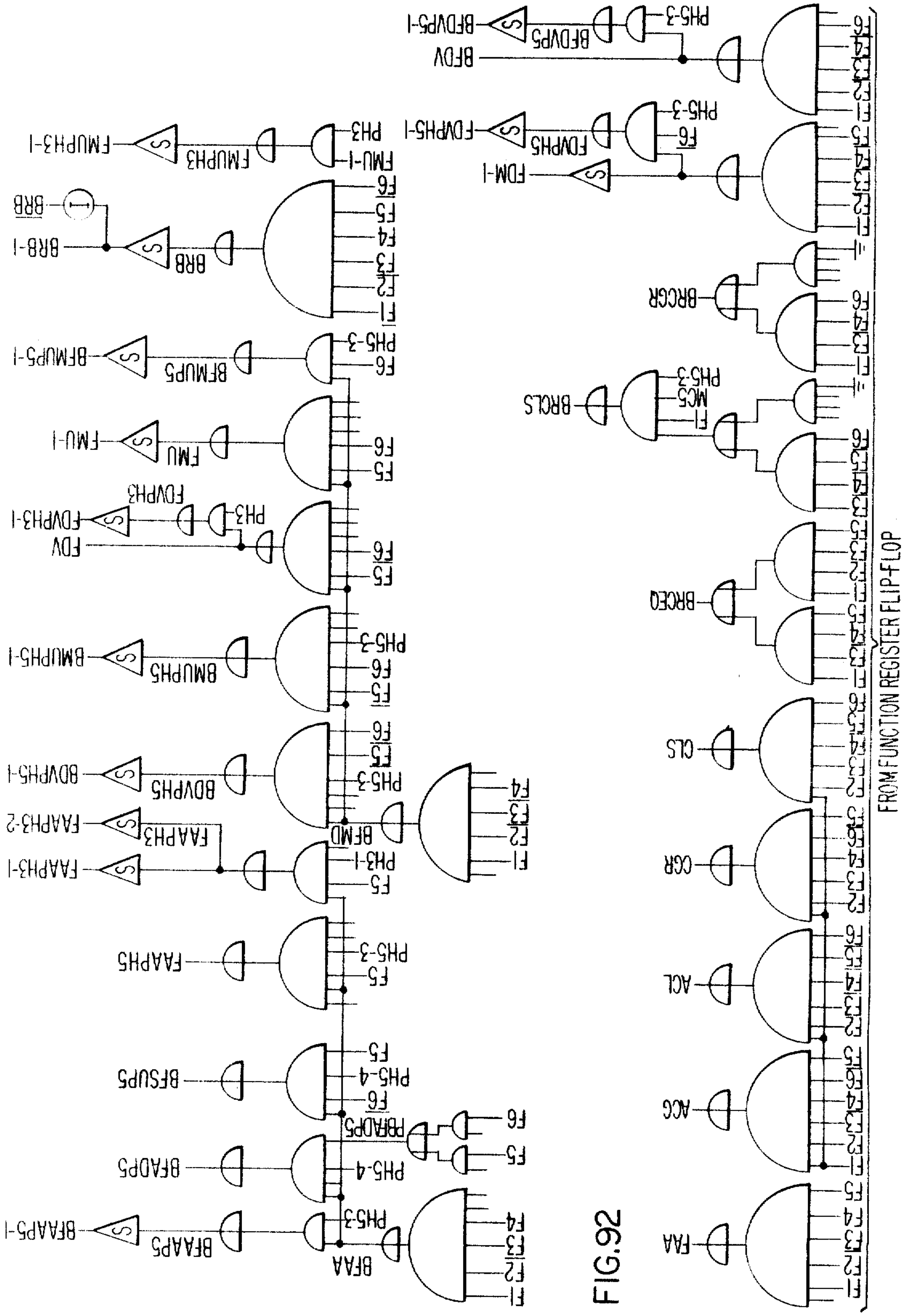
Figure 93:
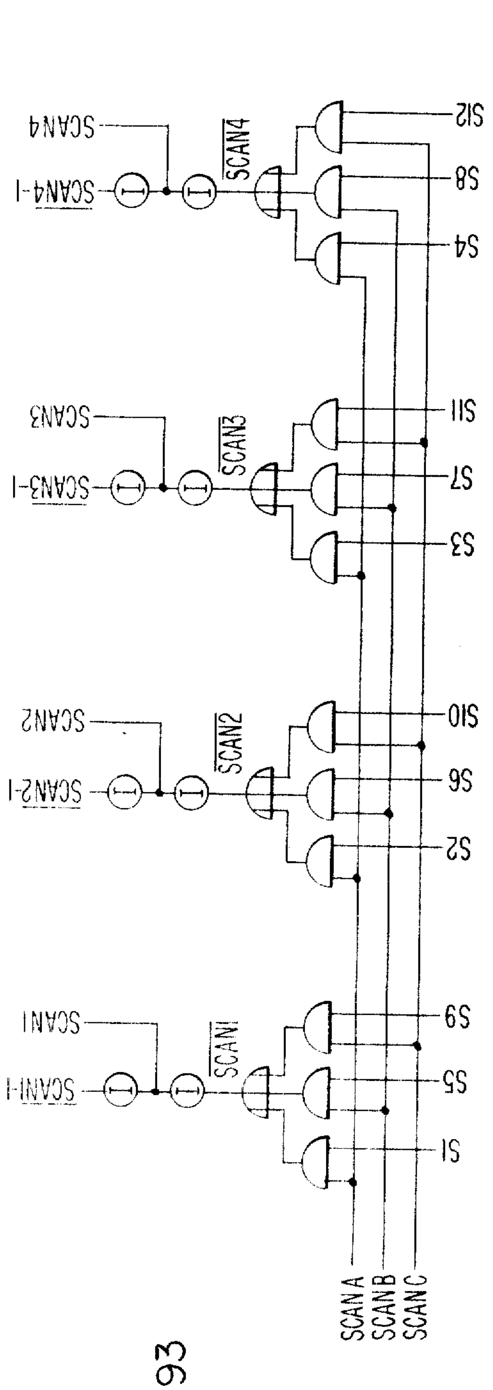
Figure 95:
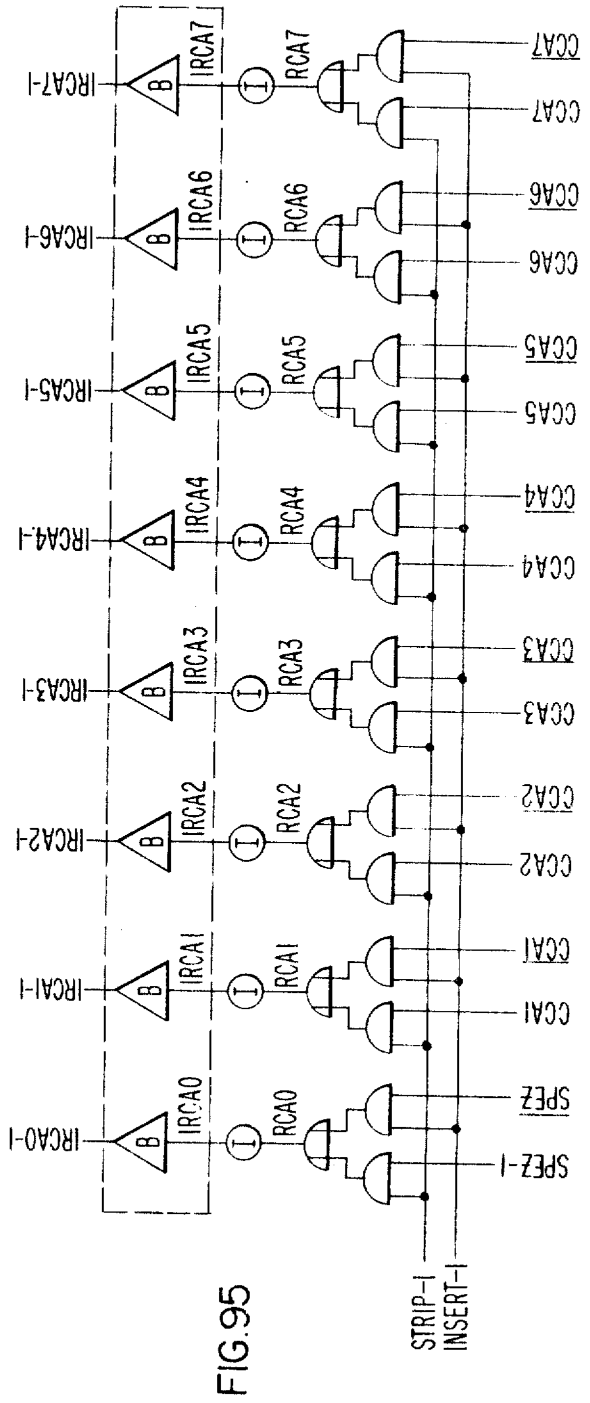
Figure 94A:
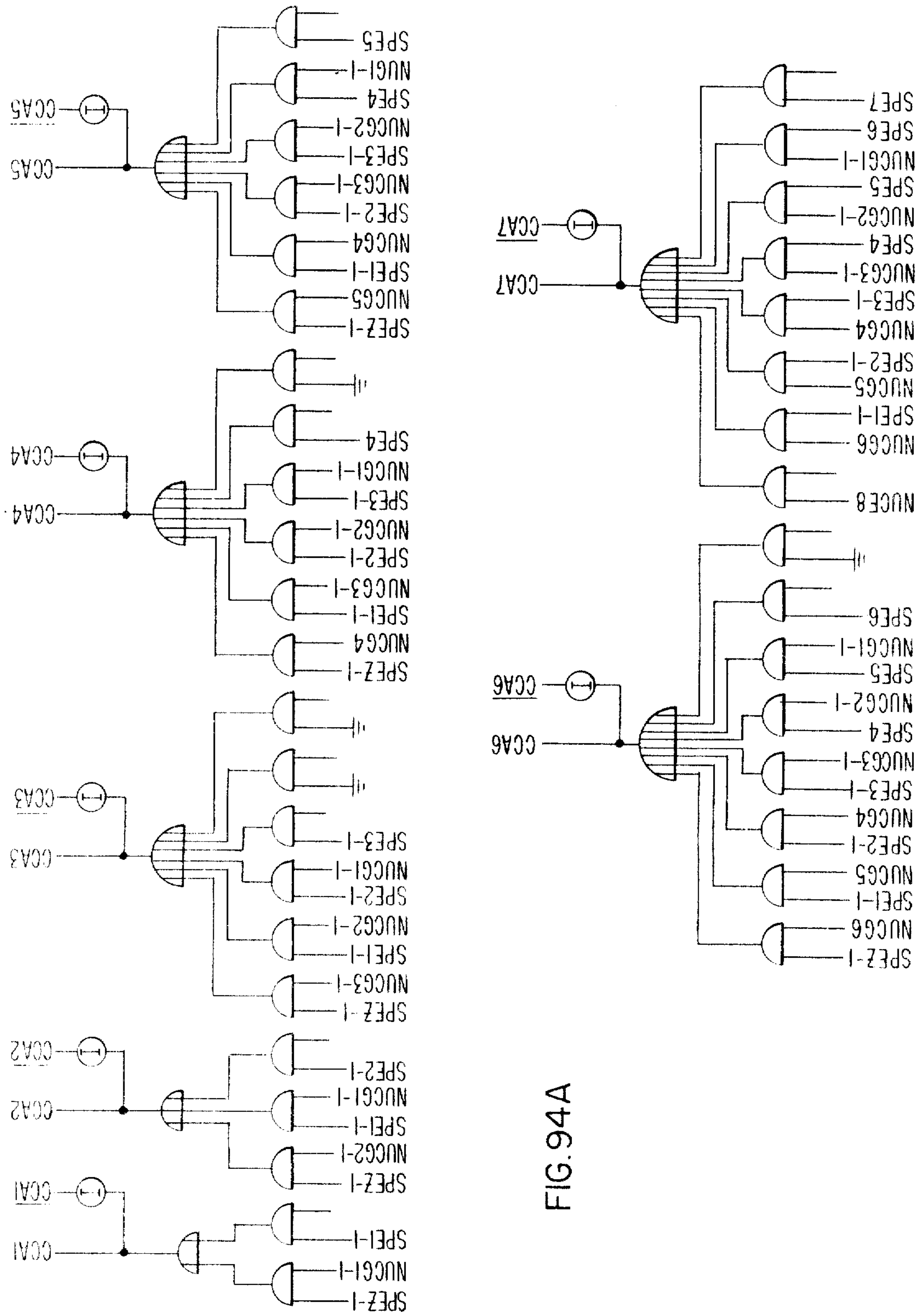
Figure 94B:
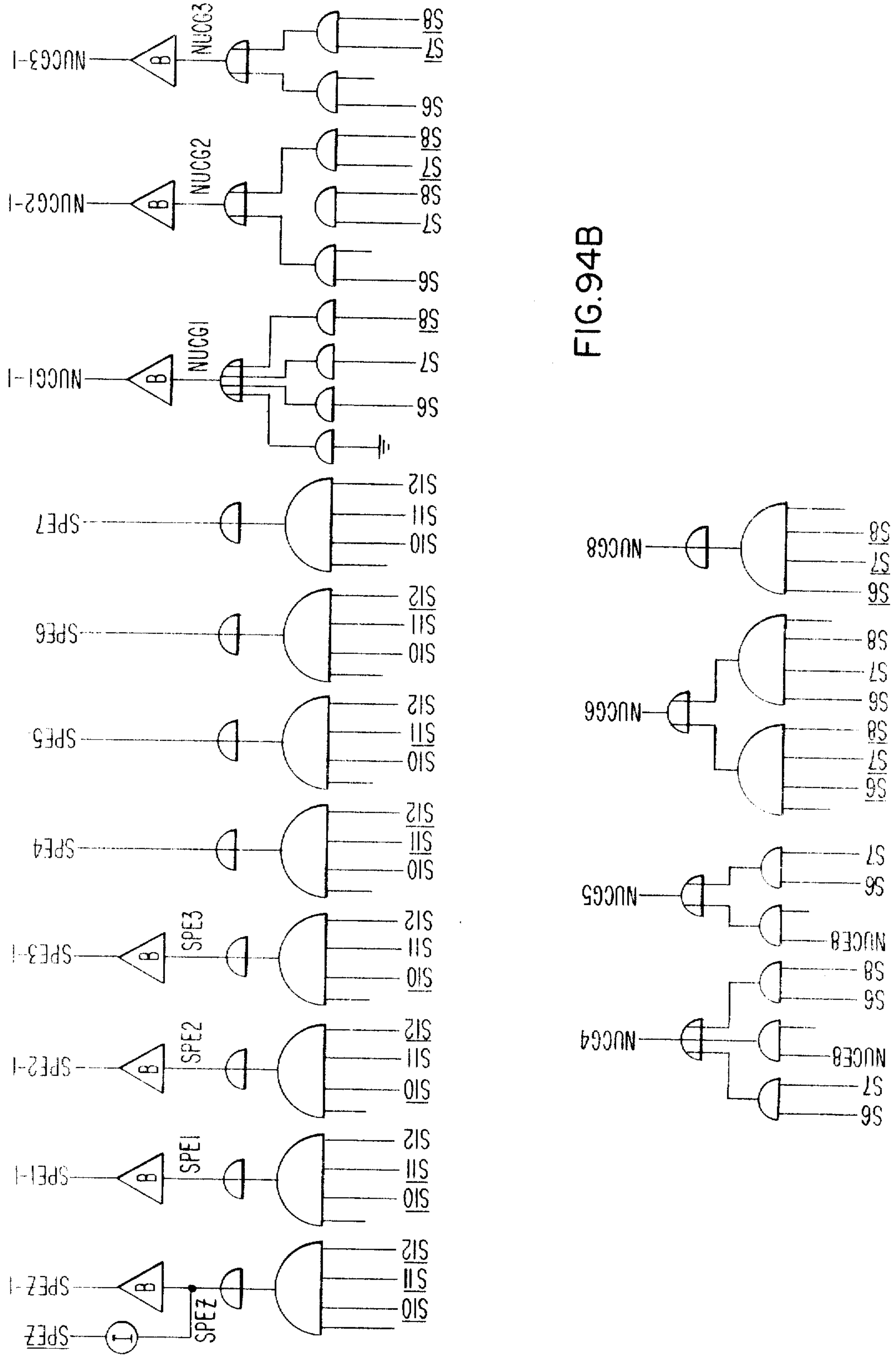
Figure 97:
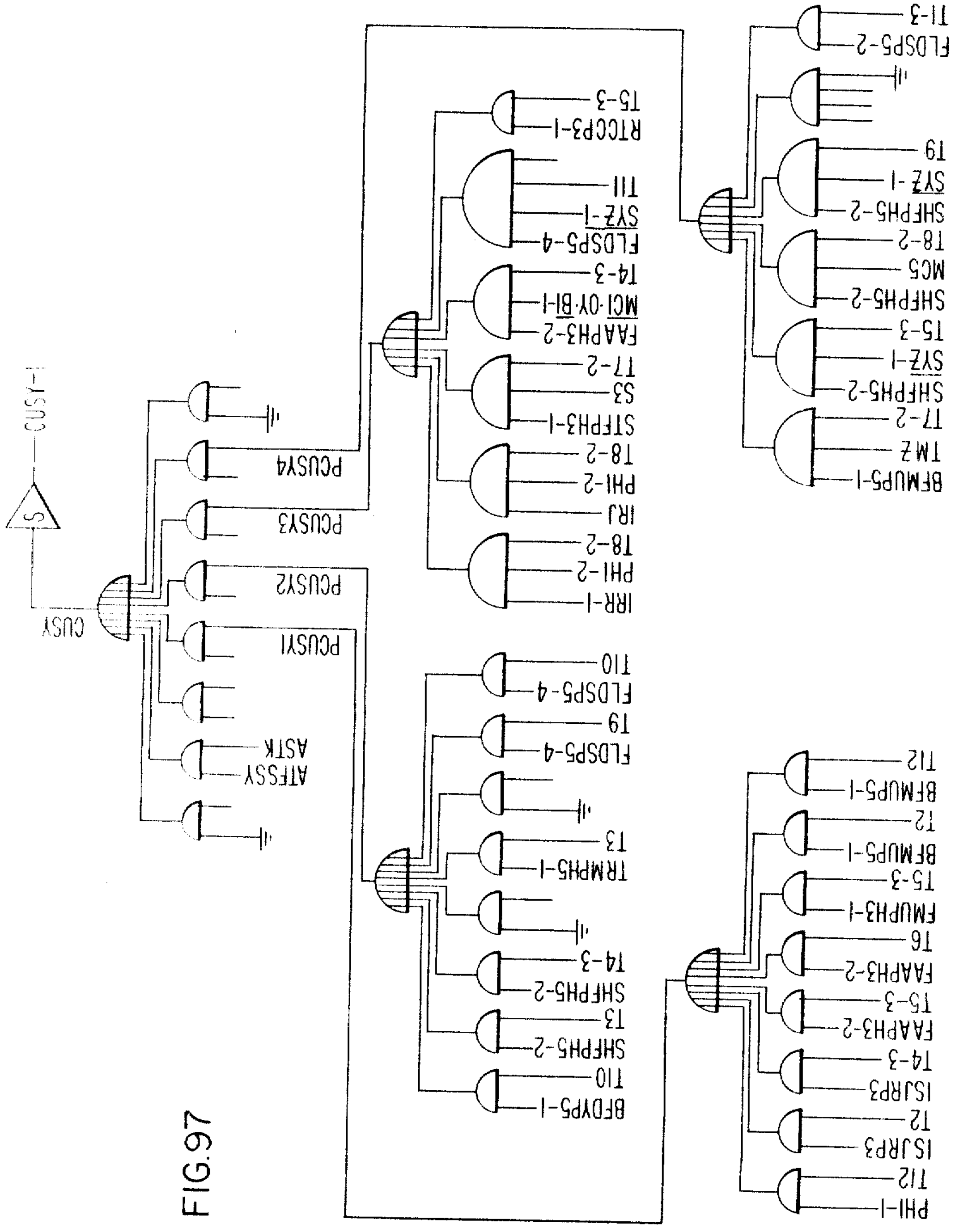
Figure 98:
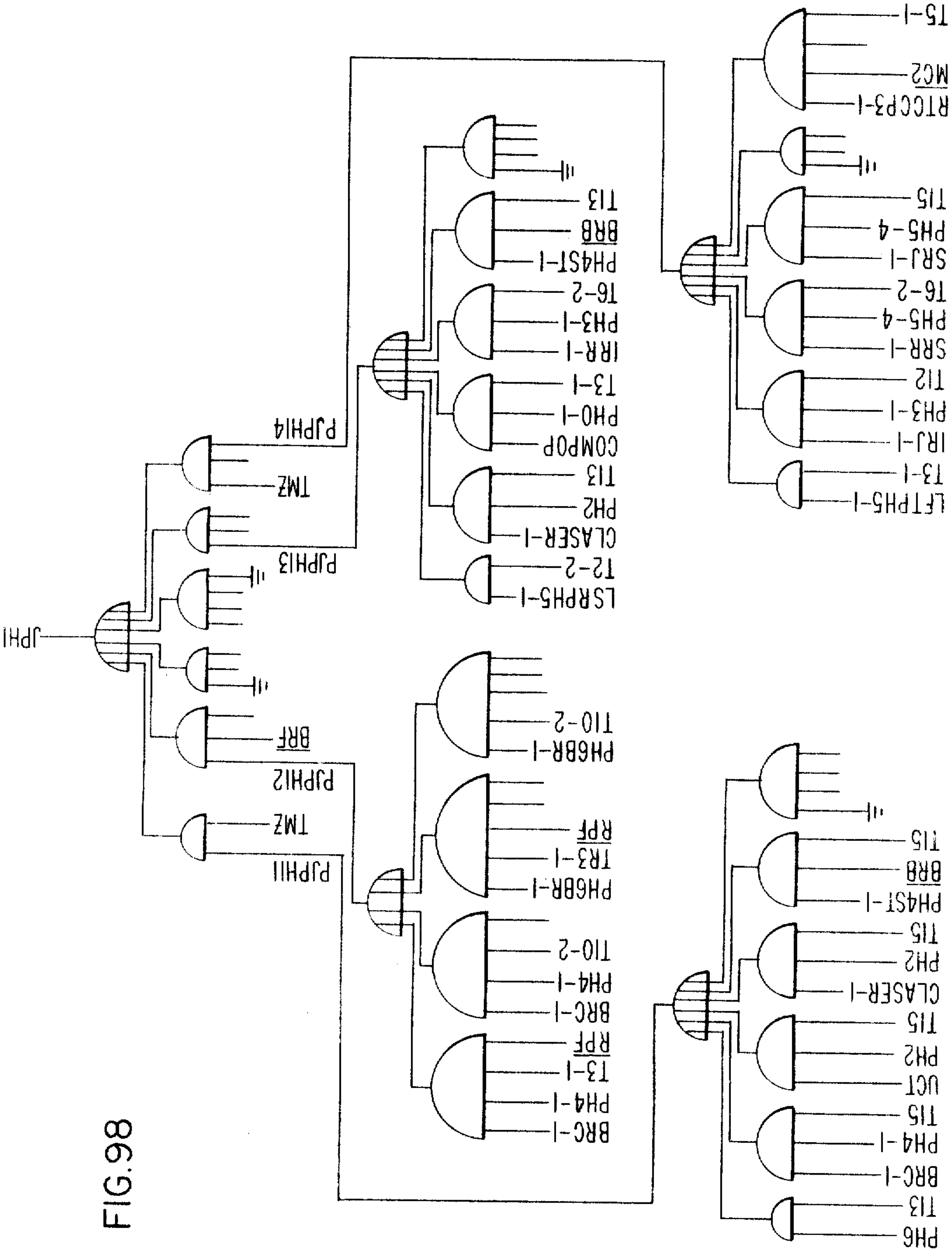
Figure 99:
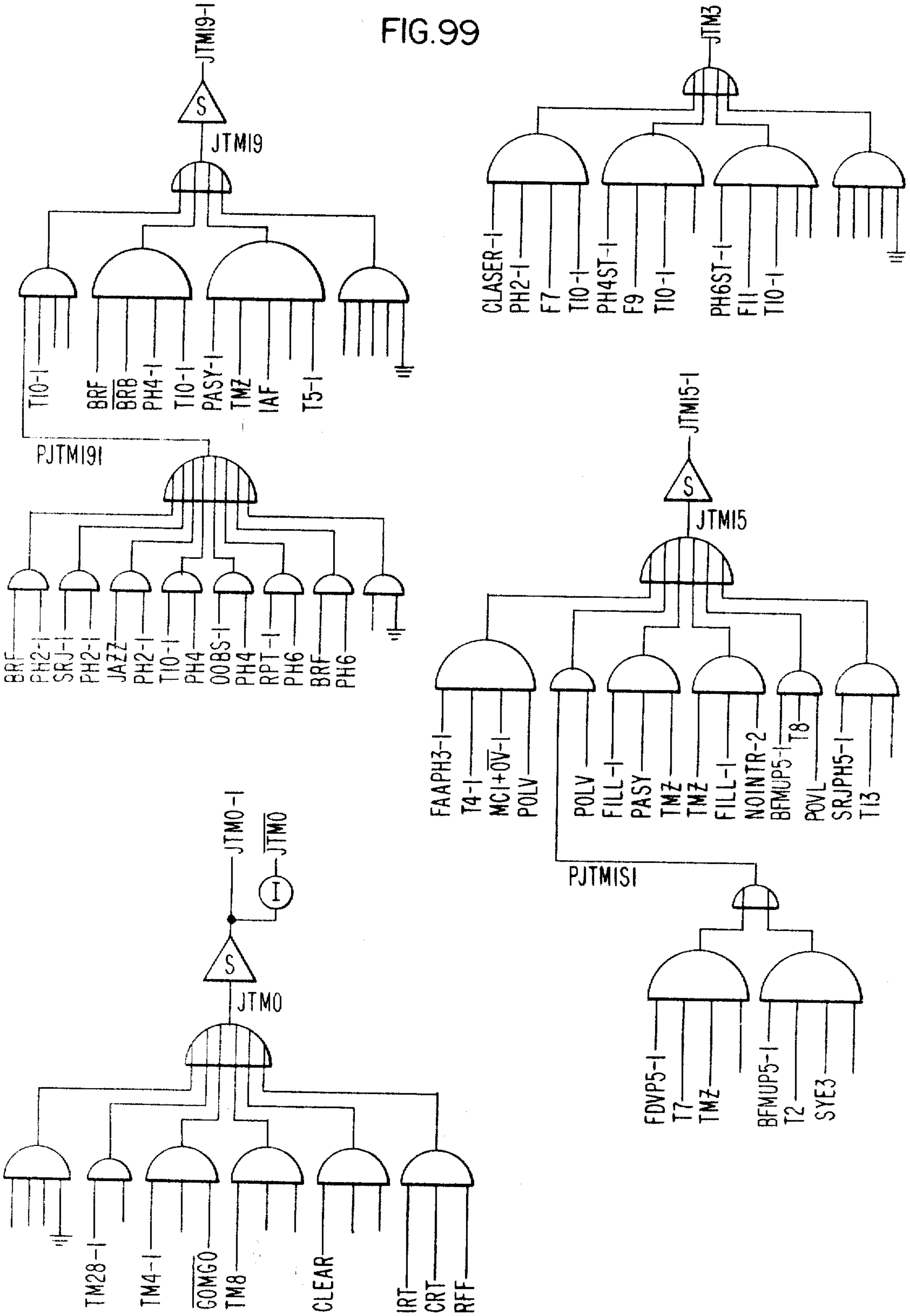
Figure 100:
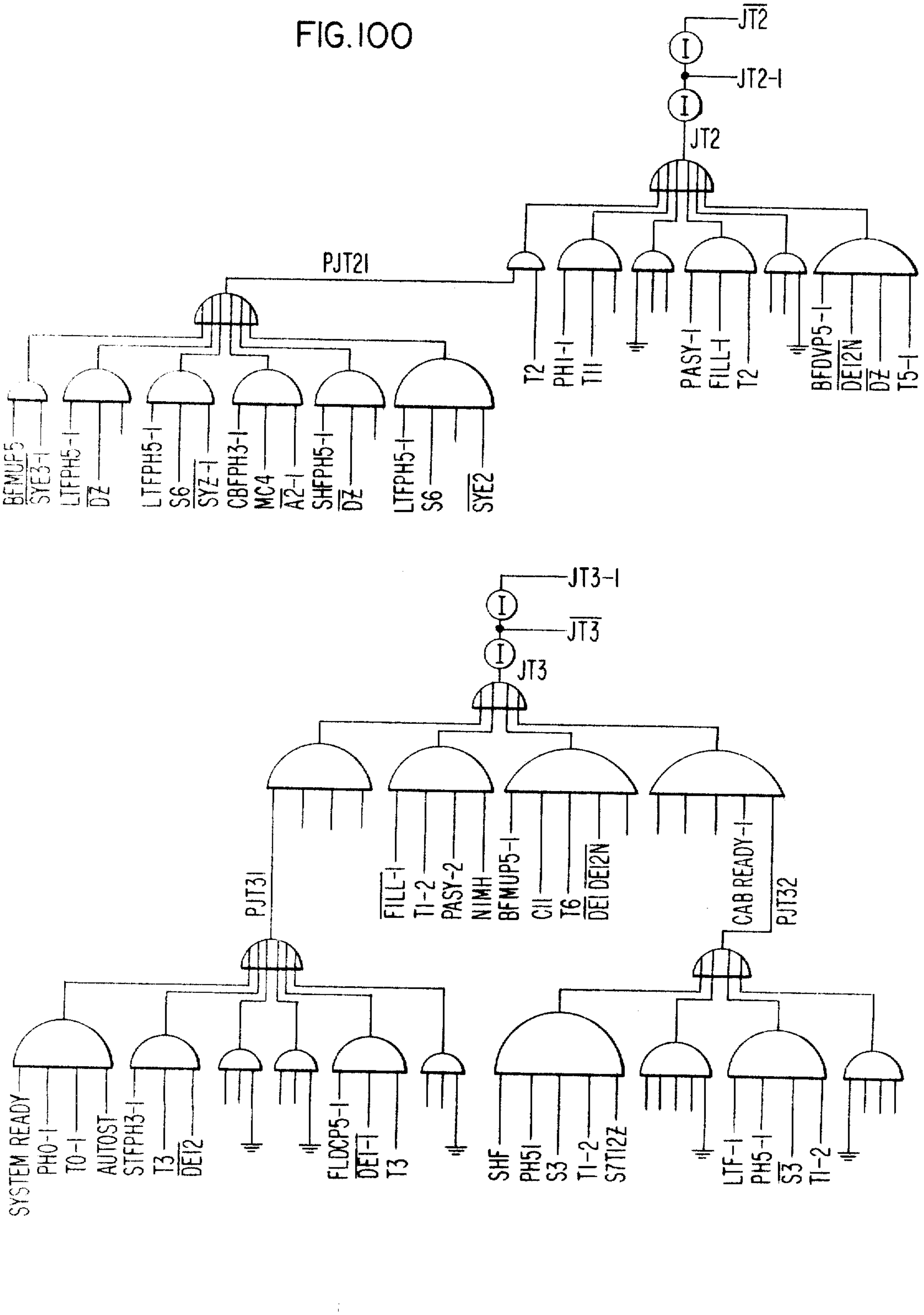
Figure 101:
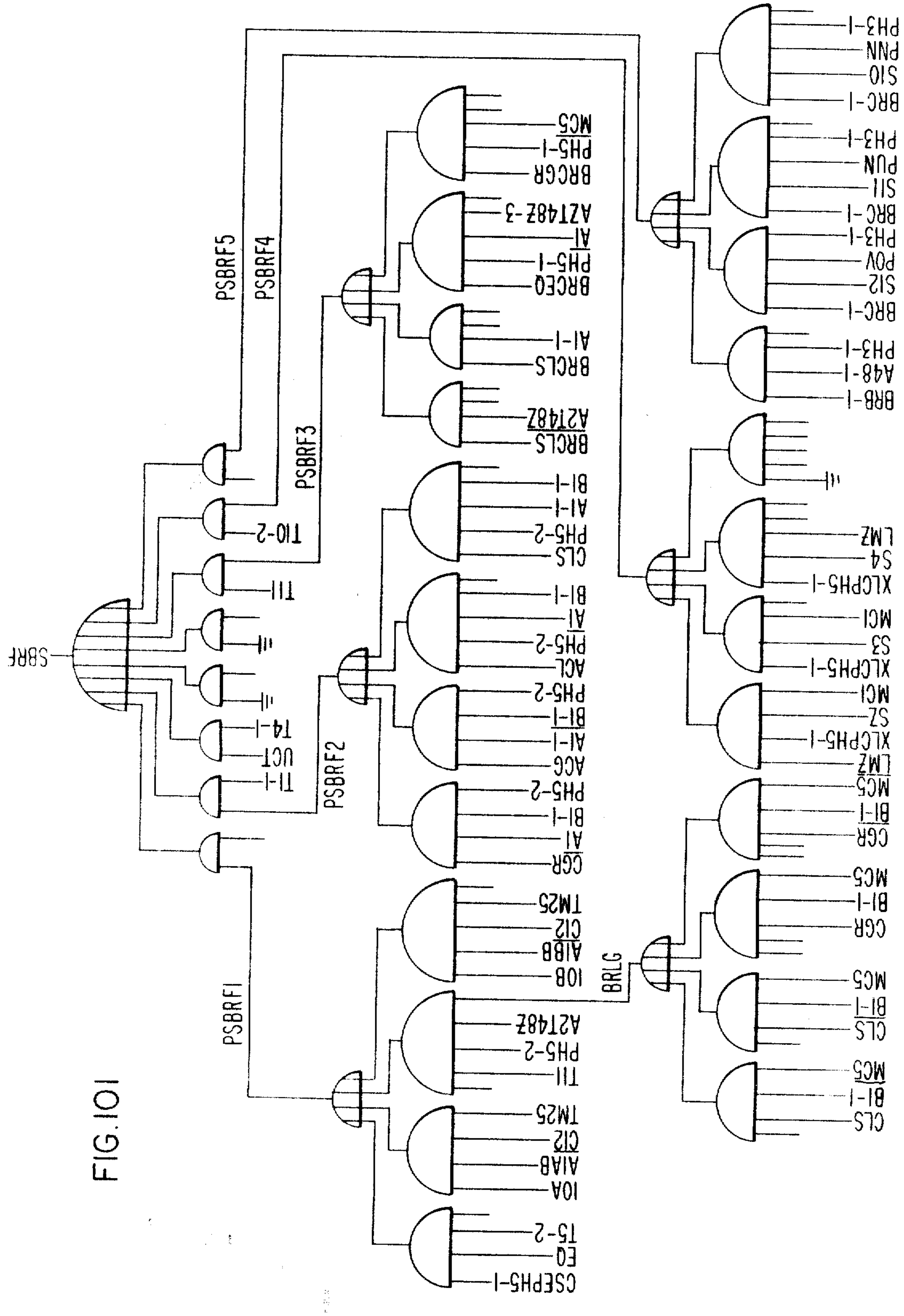
Figure 102:
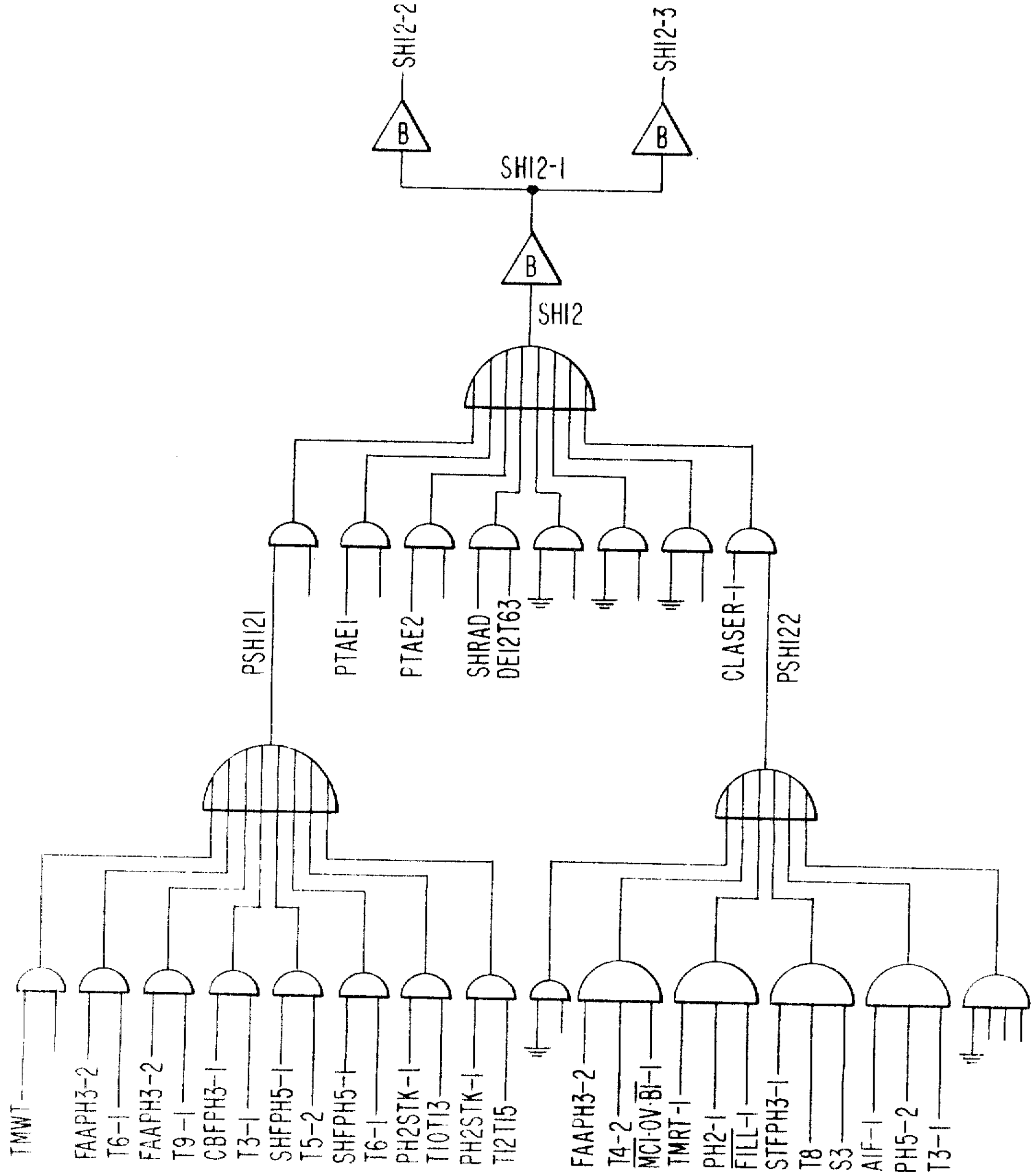
Figure 103:
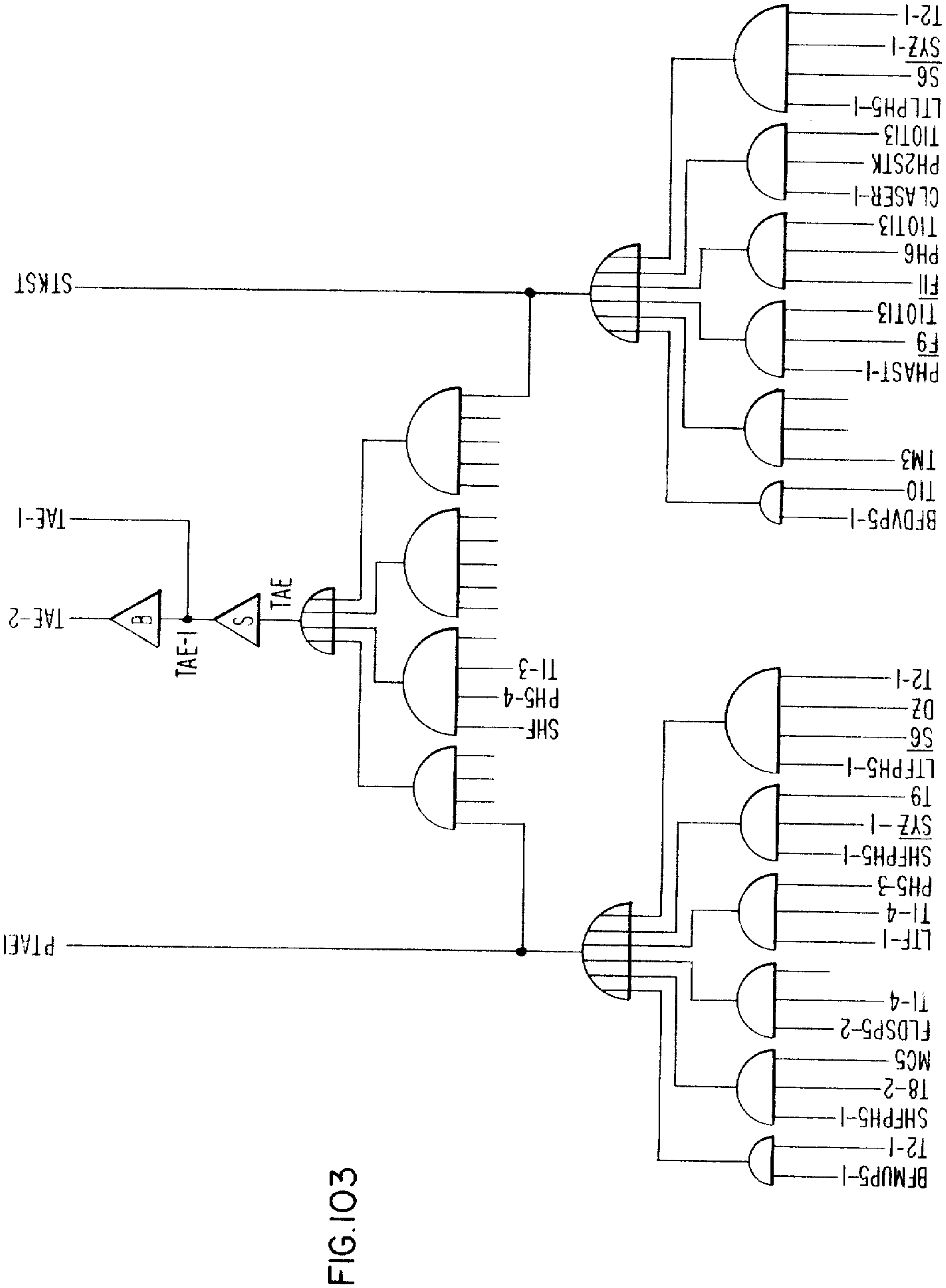
Figures 104A, 104B:
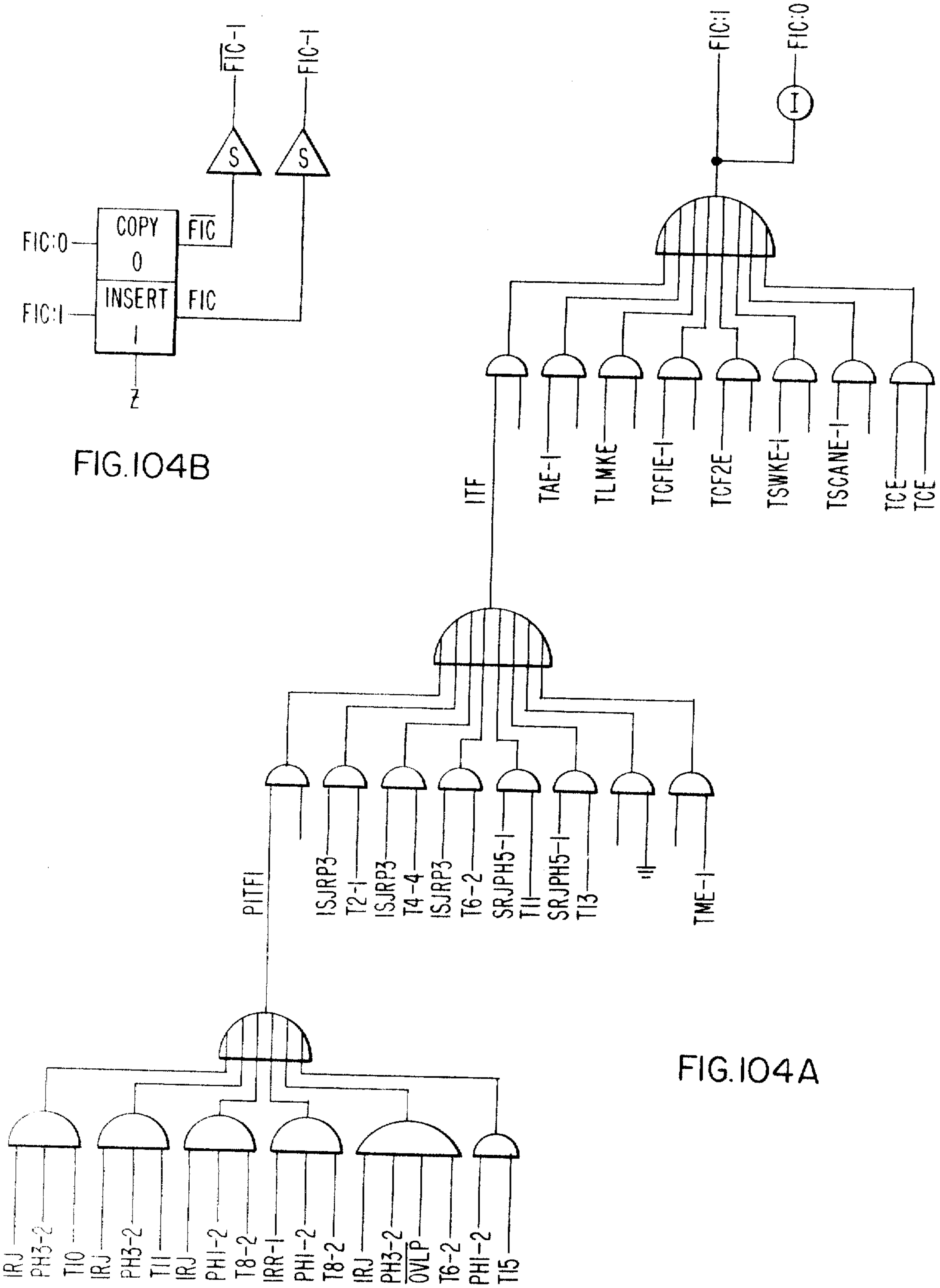
Figure 105:
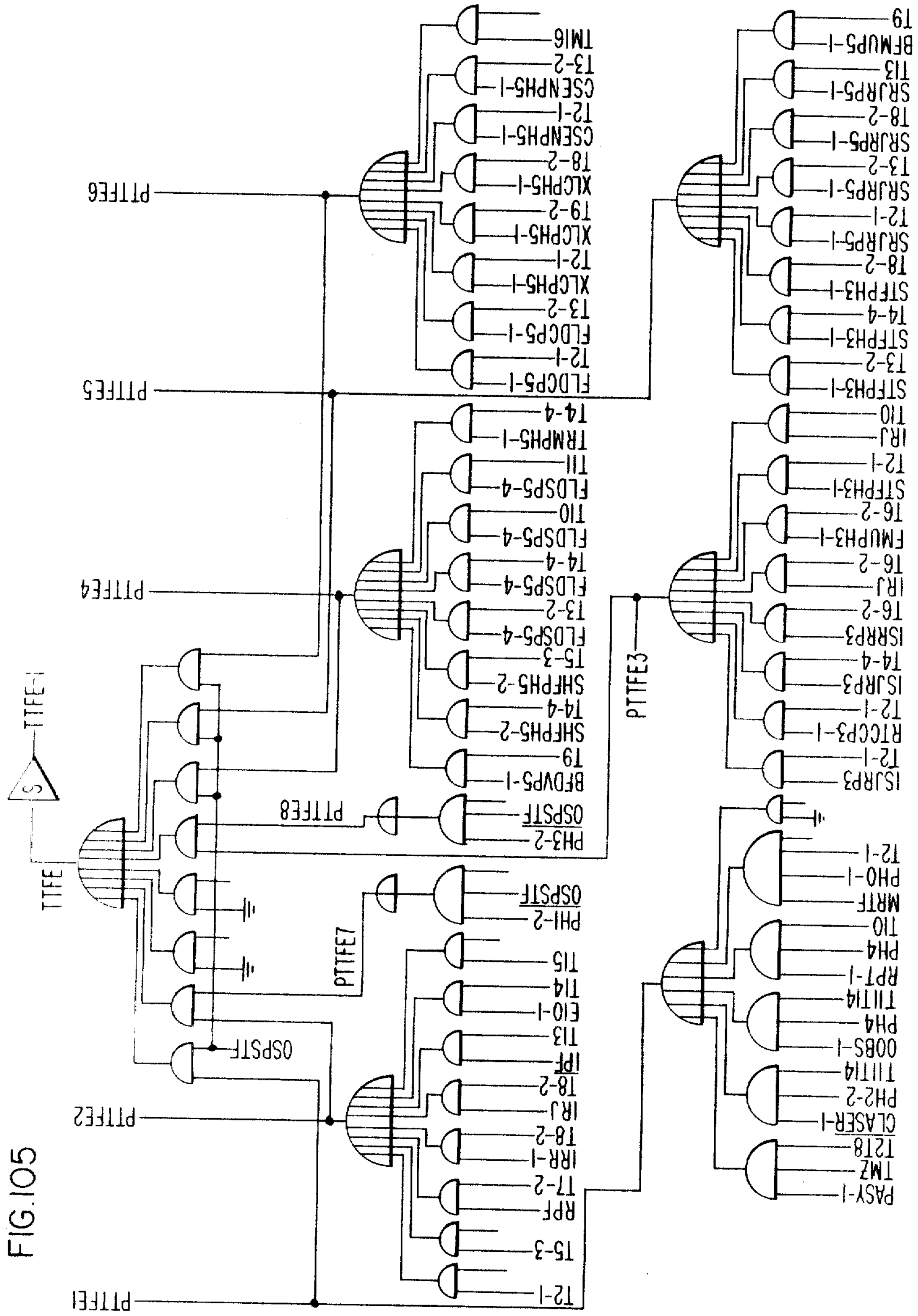
Figure 106:
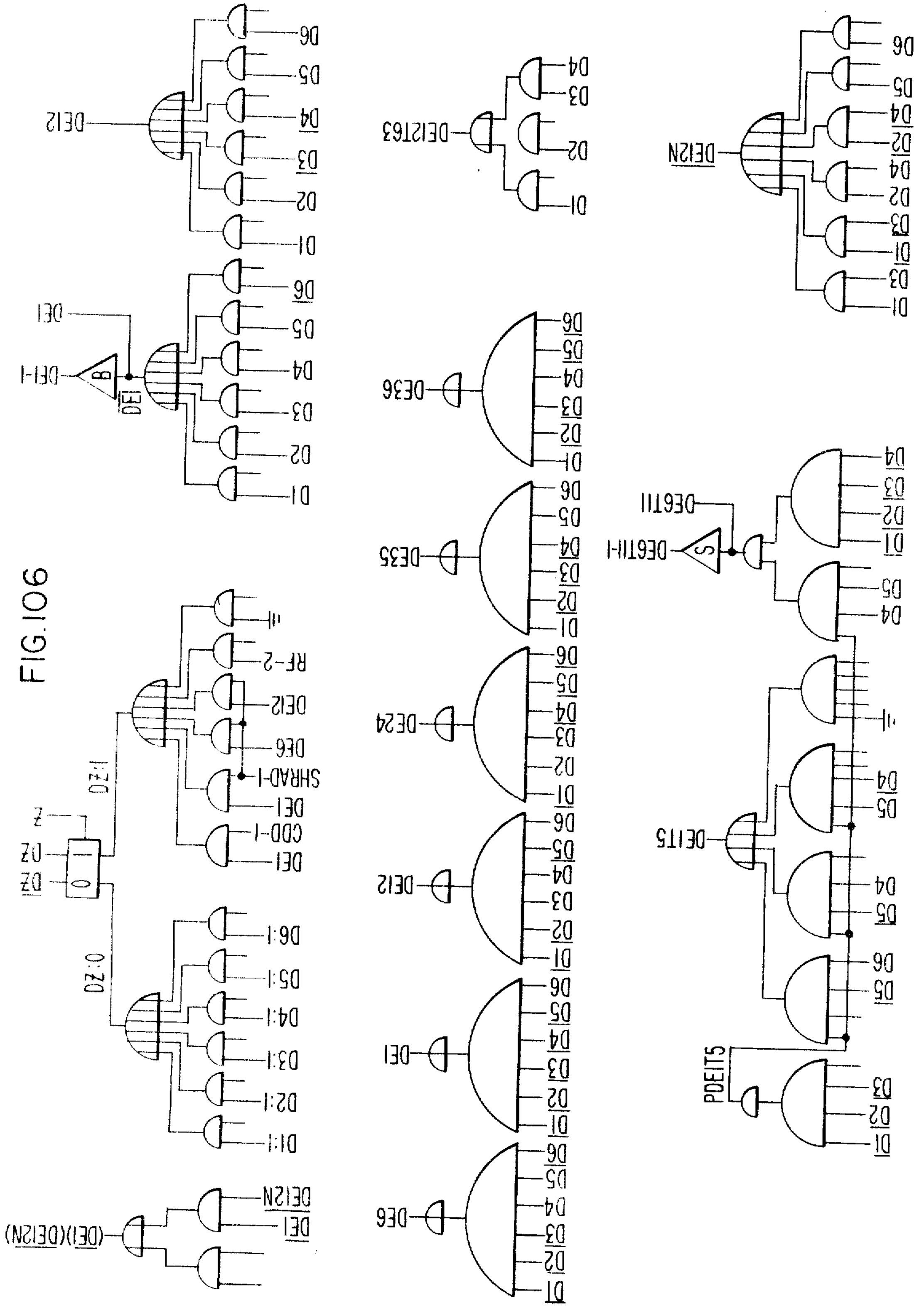
Figure 107:
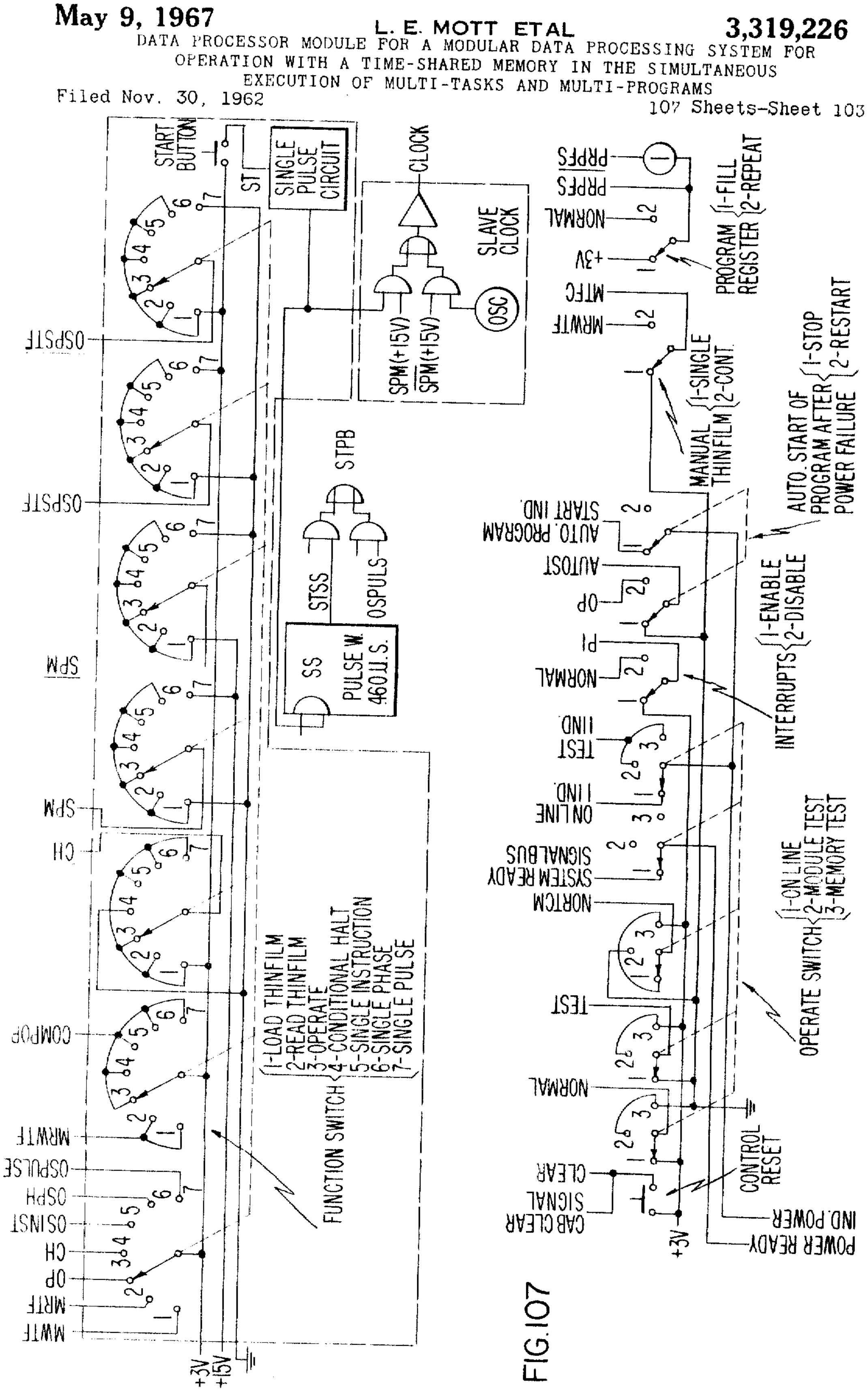
Figure 108:
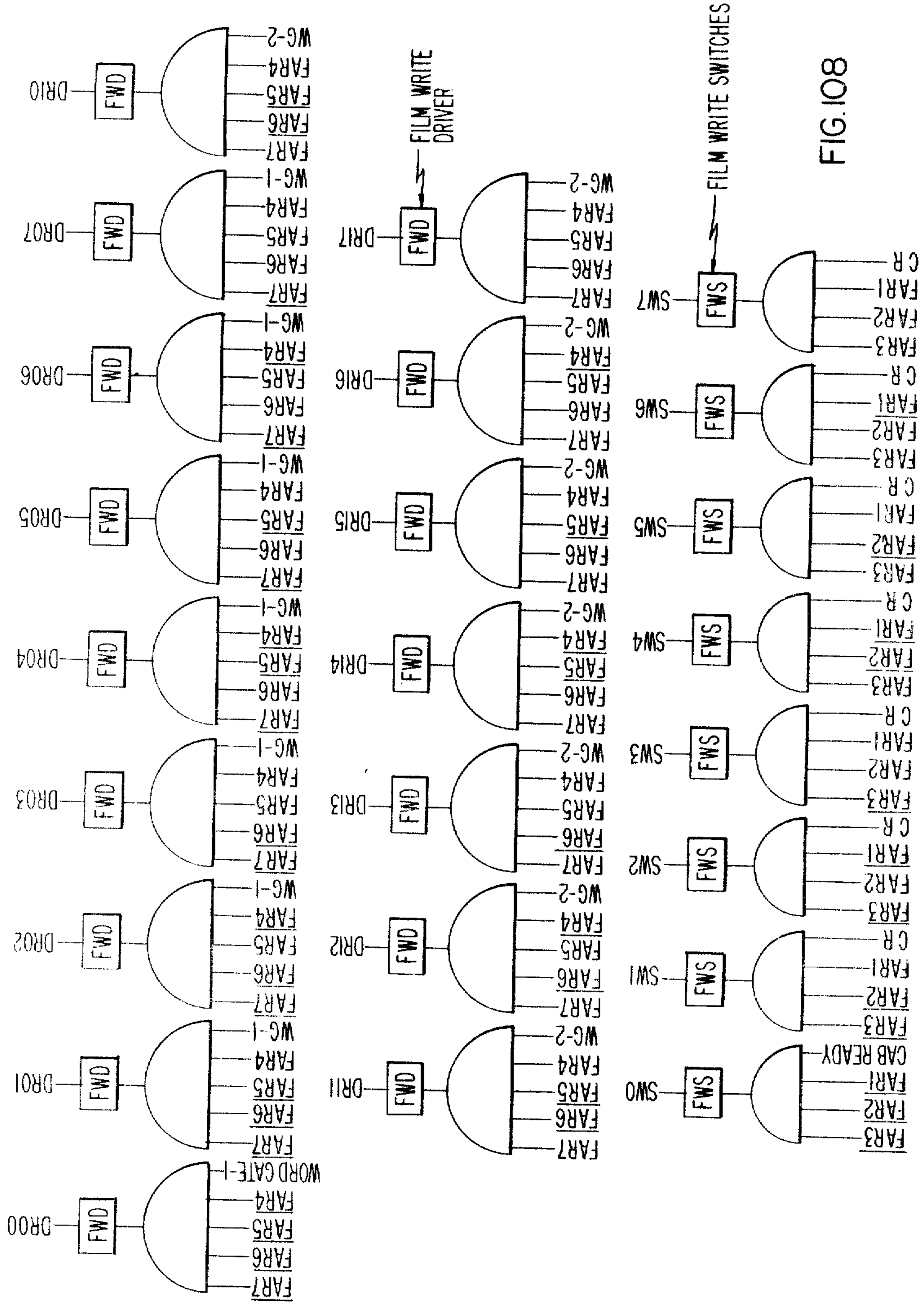
Figure 109:
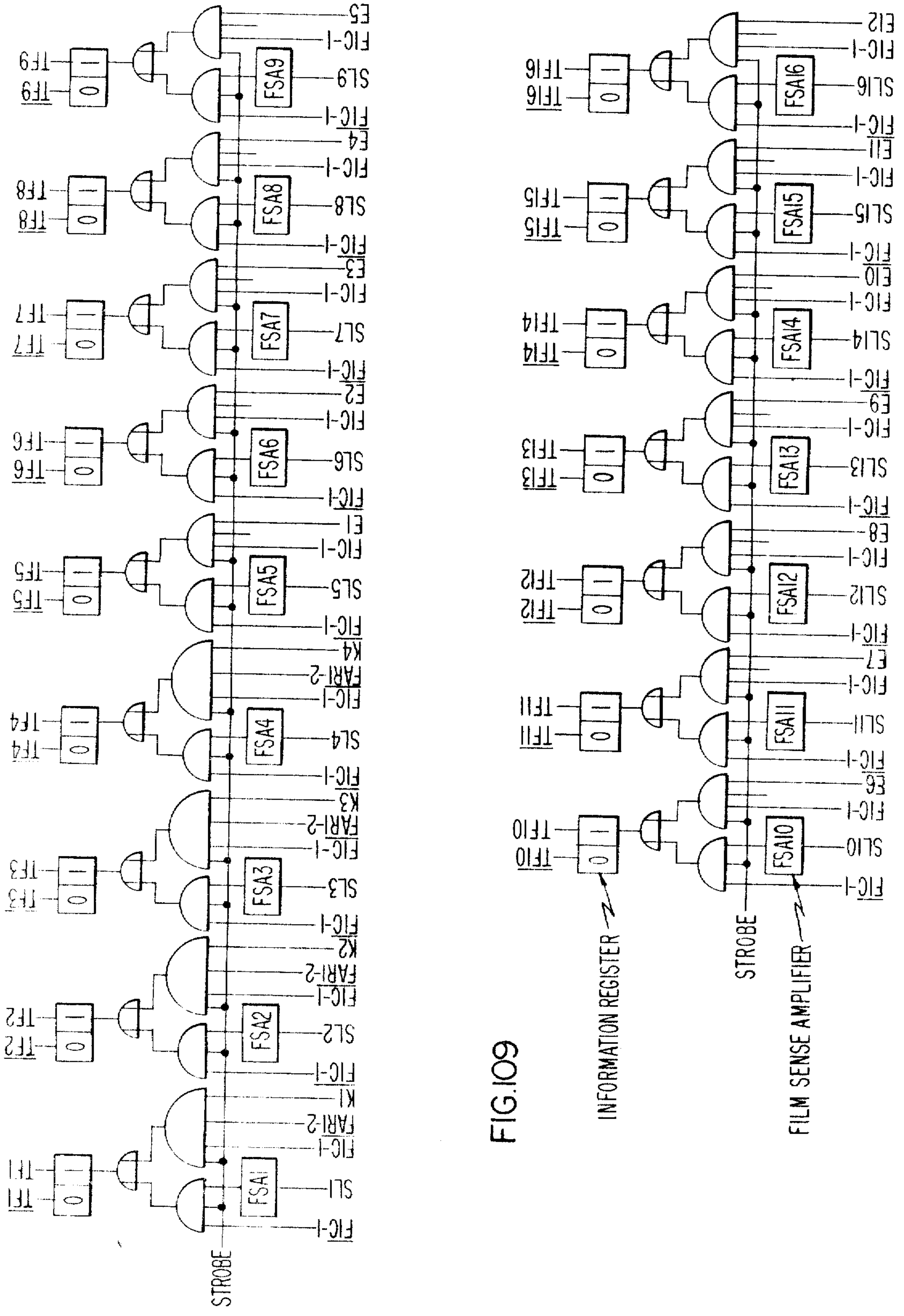
Figure 110:
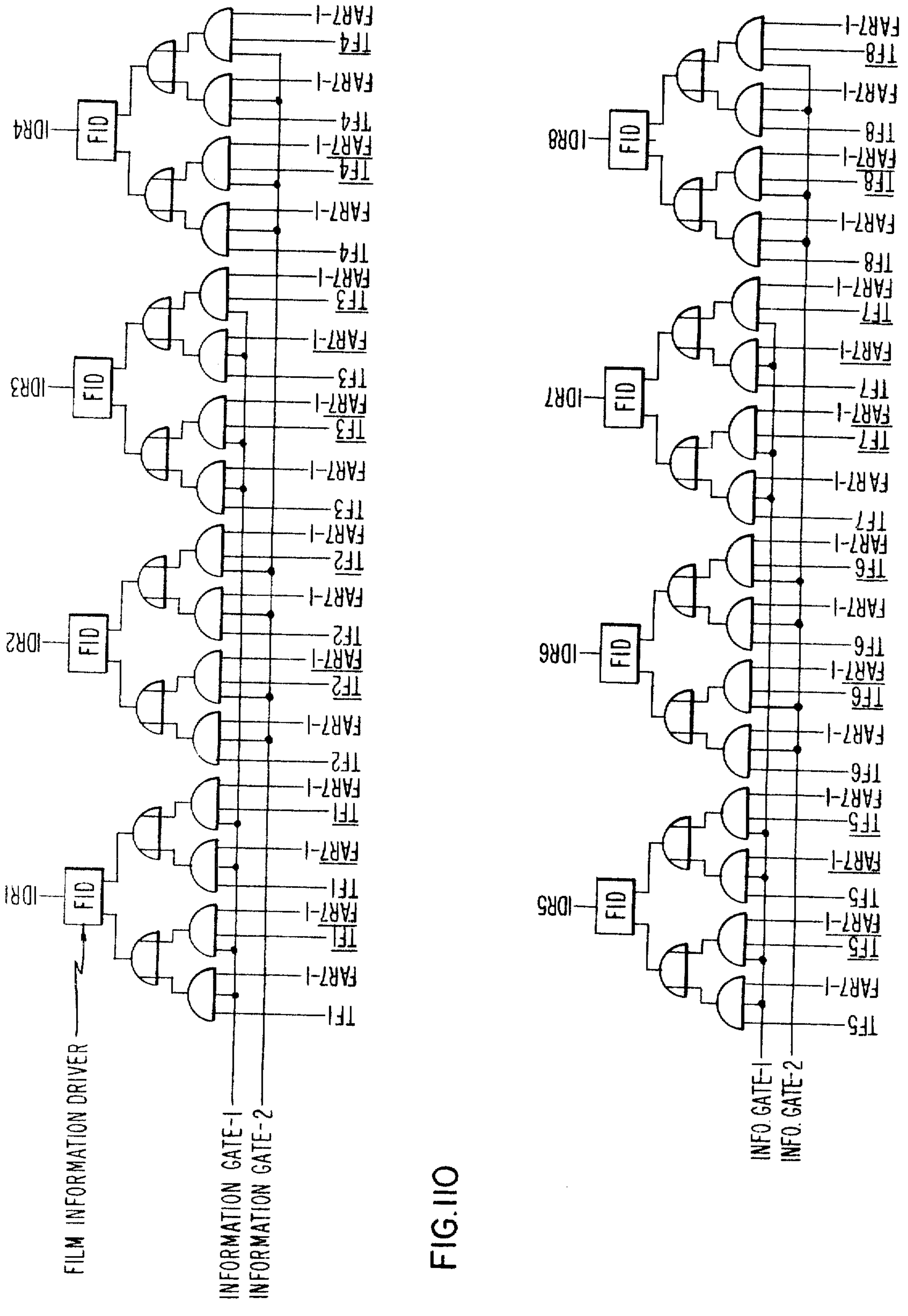

FIG. 70 is a flow chart of the Subroutine Jump instruction;

FIG. 71 is a flow chart of the Subroutine Return instruction;

FIG. 72 is a flow chart illustrative of the Store Thin Film instruction;

FIG. 73 is a flow chart of the Transmit to Input/Output instruction (executed only in the control mode and employed in a setup descriptor, command descriptor, or release descriptor to a I/O control module);

FIG. 74 is a flow chart of the operations for the Transmit Modified instruction;

FIG. 75 is a flow chart for the Transmit instruction;

FIG. 76 is a flow chart for the Unconditional Transfer instruction;

FIG. 77 is a flow chart for the Index Limit Compare instruction;

FIG. 78 comprises FIGS. 78A1, 78A2, 78B1 and 78B2 wherein FIGS. 78A1 and 78A2 are a map of the 16-bit thin-film registers and FIGS. 78B1 and 78B2 are a map of the 12-bit thin-film registers, each showing the thin-film addresses in binary code in the first column, in octal code in the second column, and by register name in the third column, and wherein the first column binary addresses in FIGS. 78A1 and 78A2 which are followed by large dots indicate a starting address for the 3-register block, and in FIGS. 78B1 and B2 the first column addresses followed by large dots indicate a starting address for the 4-register blocks;

FIG. 79 is a flow chart of indirect addressing which in conjunction with the indirect addressing routine flow charge of FIG. 26 illustrates the indirect addressing sequences involved in the method and means of the invention;

FIG. 80 is a diagrammatic representation of the structure of the operator syllable in an instruction of the computer of the present invention;

FIG. 81 is a diagrammatic representation of a binary multiply operator syllable showing an example of an operator syllable;

FIG. 82 is a diagrammatic representation of the syllables in a sample instruction involving an index syllable;

FIG. 83 is a diagrammatic representation illustrative of a sample instruction involving the memory address syllable;

FIGS. 84A and 84B illustrate the syllables utilized in an example of employment of the branched addresss syllable for the unconditional transfer instruction;

FIGS. 85A and 85B and 85C in side-by-side relationship in that order is a logical diagram of the multiply-divide counter of the FIG. 1 illustrative embodiment of the invention wherein FIG. 85A is a logical diagram of the circuits of bits 1 and 2, FIG. 85B is a logical diagram of the circuits of bits 3 and 4, and FIG. 85C is a logical diagram of the circuits of bits 5 and 6;

FIG. 86 is a logical diagram illustrative of the logical circuits of representative bits 1 through 12 of the adders of the illustrative embodiment of FIG. 1, the adder shown being the adder in the arithmetic unit;

FIG. 87 is a logical diagram of the Phase Distributor of the illustrative embodiment of FIG. 1;

FIGS. 88A and 88B is a logical diagram of the Timing Distributor of the illustrative embodiment of FIG. 1;

FIG. 89 is an illustrative embodiment of the TM, (memory time) counter of the illustrative embodiment of FIG. 1;

FIG. 90 is a logical diagram illustrative of the T (time) counter of the illustrative embodiment of FIG. 1;

FIG. 91A, B, C, D, and E, is a diagram of the program storage register fill flip-flops showing the decoders and interrupt function;

FIG. 91A is illustrative of the logical circuit to provide output in accordance with determination of whether fill is needed;

FIG. 91B and FIG. 91C are logical diagrams illustrative of the interrupt function circuits;

FIG. 91D is a logical diagram of a circuit to enable loading of the program storage register, either for needed fill or for overlap;

FIG. 91E is the logical diagram of the overlap circuit of the illustrative embodiment of the invention;

FIG. 92 is a logical diagram of a portion of the function register decoders of the subcommand matrix and control unit of the illustrative embodiment of FIG. 1 which decoders are responsive to the Function Register and shows the logic wherein the phase is coupled with the signals so as to leave a useful signal at the proper phase operation;

FIG. 93 is a logical diagram of the scan logic of the illustrative embodiment of FIG. 1;

FIG. 94A and FIG. 94B are in vertical tandum relationship wherein the outputs of FIG. 94B are inputs to FIG. 94A to present a logical diagram of the circuit for character selection for the Strip and Adjust Field function of the illustrative embodiment of the invention;

FIG. 95 is a logical diagram of the circuits to implement the reset inhibits for strip and insert function of the illustrative embodiment of the invention;

FIG. 96A is a logical diagram of the subcommand matrix circuits for the subcommands which effect the "addressing of the base address register" subcommand (the "address the base program register" subcommand matrix circuit is very similar);

FIG. 96B1, FIG. 96B2, FIG. 96B3, and FIG. 96B4 appropriately receive the "address the base address register" output of FIG. 96A (and the output of the similar address the base program register circuit) and are thin-film address gating for bits 1 and 2 of the thin-film address gating associated with the subcommand matrix and controls unit of the illustrative embodiment of FIG. 1;

FIG. 97 is a logical diagram illustrative of the logic circuits for the subcommand matrix which shows the count up the syllable counter subcommand logic to exemplify the subcommand logic which is implemented by corresponding circuits in the subcommand matrix and controls section of the illustrative embodiment of FIG. 1;

FIG. 98 is a logical diagram of the subcommand matrix of the illustrative embodiment of FIG. 1, illustrating Jump to Phase 1 portion of the logical jump of phases circuit;

FIG. 99 is a logical diagram illustrative of the jump to memory timing circuit logic of the subcommand matrix of the illustrative embodiment, and in particular, illustrating the jump and jump not to memory time zero and the jumps to memory time 3, 15, and 19;

FIG. 100 presents a portion of the circuits of the subcommand matrix of the illustrative embodiment of the invention in logical form and particularly illustrates the circuits to effect jump to T time pulses of the timing distributor circuit, the jump and not jump logic for jump to T2 and jump to T3 being the example logic circuits drawn;

FIG. 101 is a further logical diagrammatic representation of the subcommand matrix showing the set branch flip-flop circuit;

FIG. 102 is a further logical diagram of a portion of the subcommand matrix illustrating by way of example of shift command logic to shift the contents of A register by 12 subcommand logic;

FIG. 103 is a logical diagram of the portion of the subcommand matrix of the illustrative embodiment illustrating the transfer from A register to E register subcommand and wherein in conjunction with each transfer from any register to the E register, during the next pulse time, the contents of the E register are stored in the thin-film register at the address set up;

FIG. 104A is a logical diagram of a portion of the subcommand matrix of the illustrative embodiment showing the gating which commands that the contents of the E register be written in thin-film memory at the address which is set up in the thin-film address register and FIG. 104B illustrates the insert copy flop-flop circuit which receives the output of the FIG. 104A circuit;

FIG. 105 is a logical diagram of a portion of the subcommand matrix illustrating the logical circuit for transfer out of thin-film to the K and E register;

FIG. 106 is a logical diagram of the multiply-divide counter decoders of the illustrative embodiment of FIG. 1;

FIG. 107 is a schematic and logical diagram of the control switches and control clock circuits of the illustrative embodimen of FIG. 1;

FIG. 108 is a logical diagram of the thin-film memory film write drivers and film write switches of the illustrative embodiment of FIG. 1;

FIG. 109 is a logical diagram of the thin-film memory sense amplifier circuits and of thin-film memory information register circuits of the illustrative embodiment of FIG. 1;

FIG. 110 is a logical diagram of drivers 1–8 of the thin-film memory information drivers of the illustrative embodiment of FIG. 1;

FIG. 111 is a logical diagrammatic representation of the delay line circuit in the thin-film control circuits of the illustrative embodiment of FIG. 1; and, FIG. 112A presents in tabular form a sample program written in octal members and FIG. 112B is the binary equivalent of the operator syllable of the first instruction of the program of FIG. 112A.

Figure 1A:
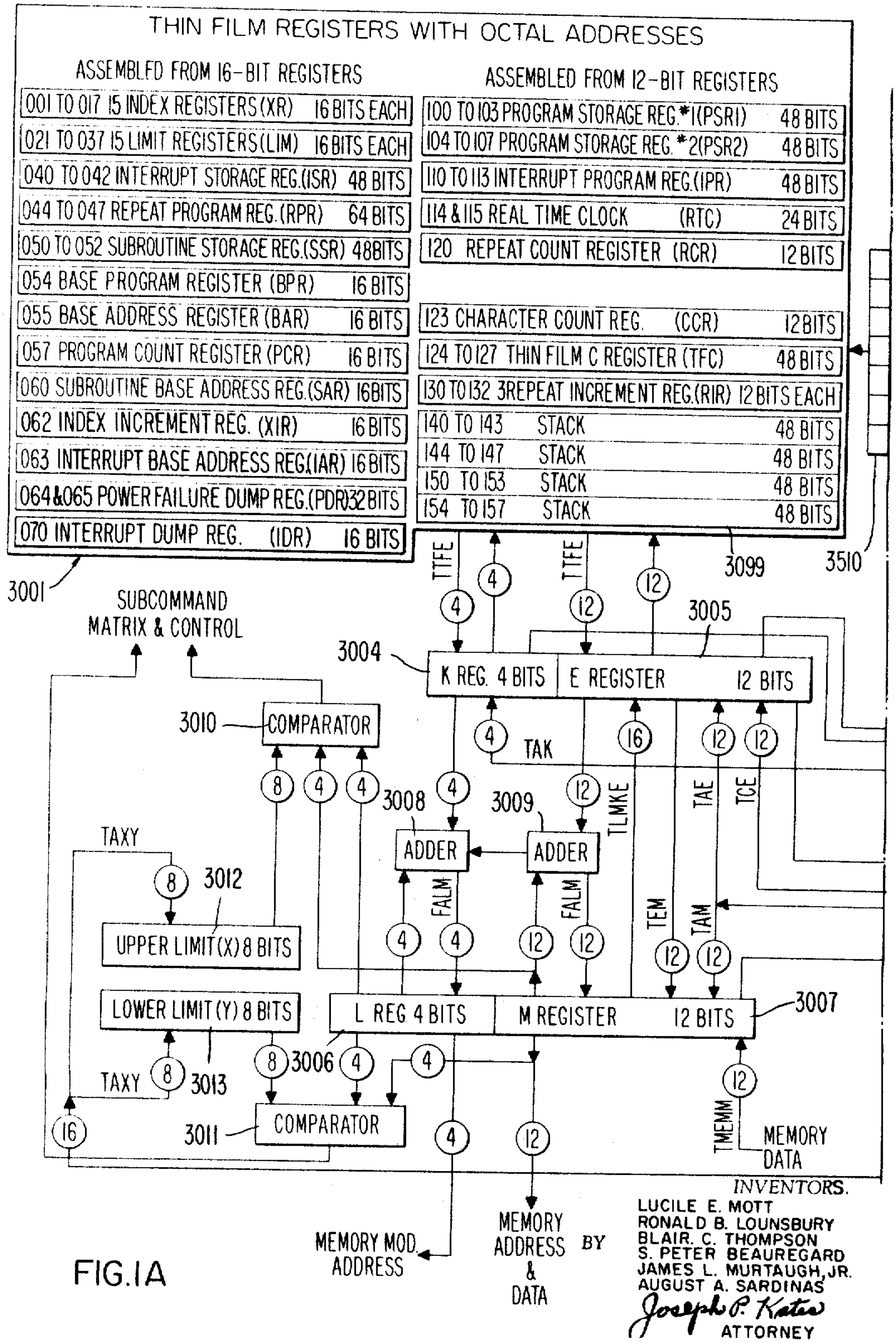
Figure 3:
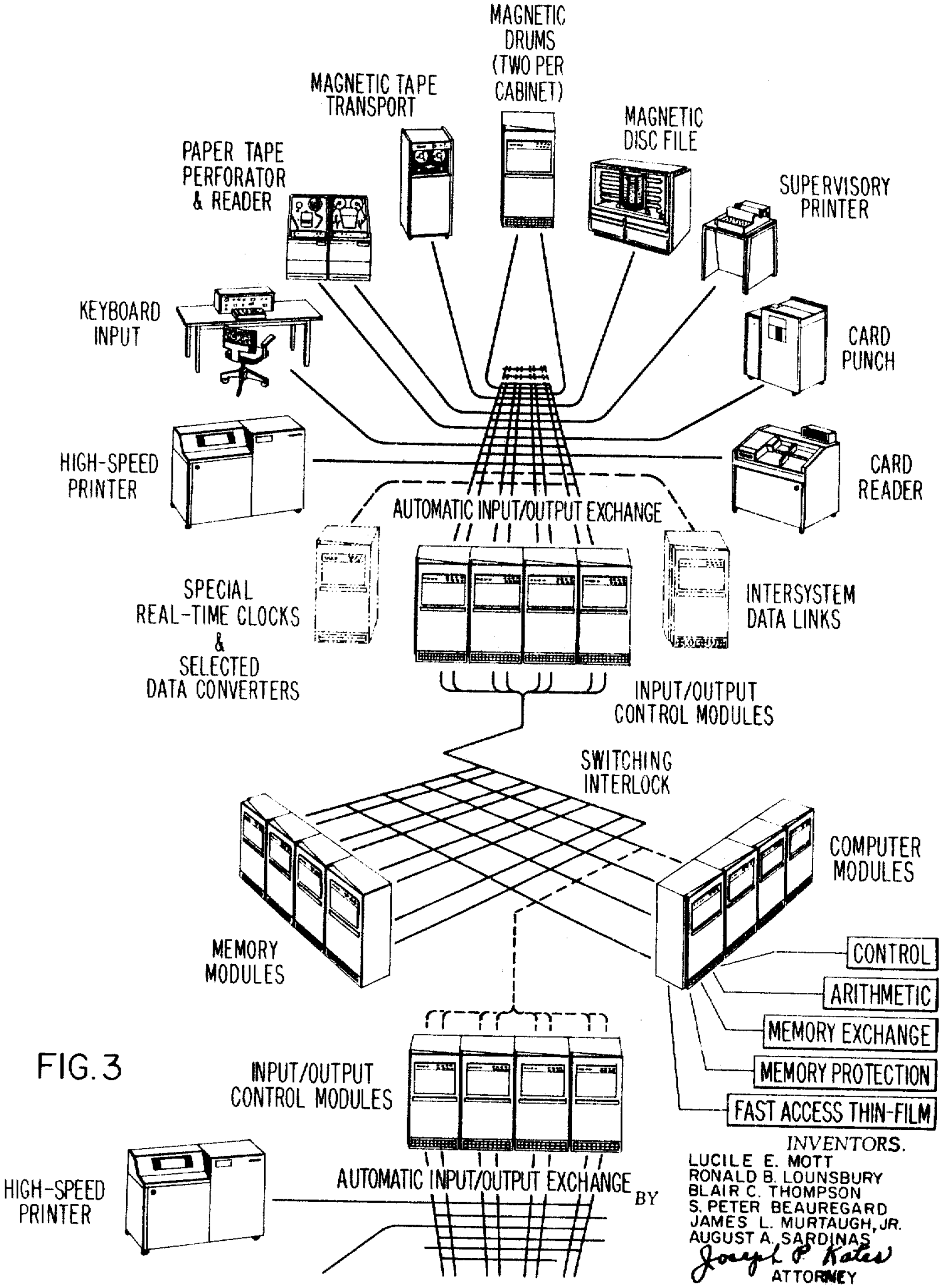
FIG. 3 is a pictorial schematic representation of the illustrative embodiment system of the aforementioned patent application for Modular Computer System with which the present invention may be utilized and wherein each of the computer modules illustrated may be the computer of FIG. 2 herein.

Now refer to the figures of the drawing and in particular, refer to the block diagram of the illustrative embodiment of the invention of FIG. 1A and FIG. 1B, and the system organization pictorial illustration of FIG. 3.

FIG. 1A and FIG. 1B, taken together, is a block diagram showing interrelationship of the component units of the computer module of the invention. The computer module comprises five functional units, (1) arithmetic; (2) thin-film memory; (3) memory exchange; (4) memory protection; and (5) control.

Referring to FIG. 3, the computer of the invention may be provided in a computer system which may comprise three or four computer modules, a plurality of memory modules, and one complement of input/output control modules, if four computers are provided, or three computers and two complements of input/output control modules, if three computers are provided. The modular system of FIG. 3 is flexible so that less than the full complement of modules of any of the types enumerated may be provided. Each computer module has exclusive use of a data transfer bus by which it can communicate, via a switching interlock with any memory module in the system. Each group of I/O (Input/Output) Control Modules is connectible to a plurality of input and output devices via an automatic exchange circuit. The I/O control modules of each I/O exchange share a single bus, and as stated, two exchanges each connected to a group of I/O Control units which group shares a separate bus may be optionally available instead of the four computers and a single bus shared by one I/O Control group. Memory may be used concurrently by all computer and input/output exchange buses. If two or more buses simultaneously address the same memory module, the switching interlock automatically resolves the conflict according to priority and queues the lower priority items. One functional bus gains immediate access, while the other is delayed only until completion of the first memory transfer.

Figure 4:
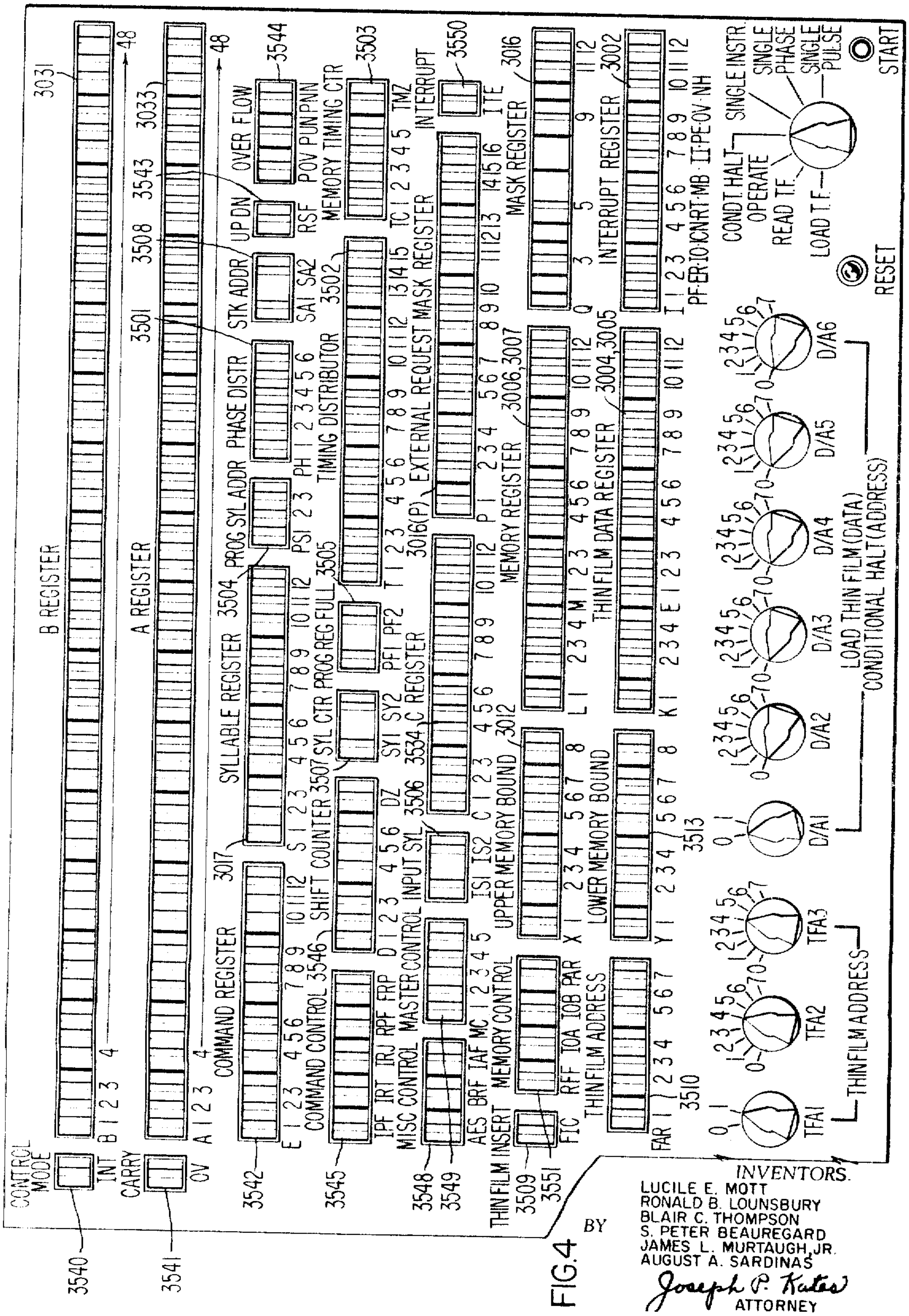
FIG. 4 is a pictorial representation of the control panel for the illustrative embodiment of FIG. 1 and illustrates the registers, address, control and other flip-flops, counters, phase and timing distributors, and switches employed in the circuits for the FIG. 1 illustrative embodiment.

The system of FIG. 3 is described in aforesaid copending application, Ser. No. 246,855 of Anderson, Hoffman, Mott, Pezely, Shifman, and Wilkinson for Computer System. The computer module of the present invention contains an arithmetic unit which operates in parallel but receives data from the switching interlock in serial-parallel form. A thin-film register storage and operand stack in each computer module may operate at a three megacycle clock rate to reduce greatly required accesses to memory modules. The command list of the computer includes binary fixed and floating point arithmetic instructions with computer organization oriented toward efficient floating-point computation. The addressing structure of the computer is designed to incorporate all of the power of a three-address machine. Less than the maximum of three addresses can be processed with each instruction with commensurate savings in instruction time and program storage. The memory modules are linear-select (word-organized) random-access, ferrite core memories. Each module may store four thousand and ninety-six words of forty-eight bits plus parity, and a fully expanded system may comprise sixteen memory modules which may store sixty-five thousand five hundred and thirty-six words. The input/output control modules consist essentially of control and data manipulation registers and associated decoding and timing circuits. Each module is capable of controlling any device in the input/output complement and there can be as many simultaneous input/output operations as there are I/O modules. The I/O exchange automatically connects control modules with specified I/O devices on command from computer modules. A status display console may be provided to display system status to the operator. FIGURE 4 illustrates the status display console. A keyboard printer may be provided to permit the operator to effect inquiries and manual interrupts.

The Input/Output Control Module is described in detail in aforementioned copending application, Ser. No. 246,-855 of Pezely, Sichel, Halman, and Perkins.

Now refer again to FIG. 1A and FIG. 1B, the computer module block diagram. The computer system which includes this computer is designed to operate with a binary data word of sufficient length (49 bits including sign and parity), for almost all computing problems and for floating point computation including 36 bits of mantissa and 12 bits of characteristic. In this computer, operands may be called from memory or from a four position stack of operand registers within a thin-film storage provided in this computer. The results of operations are stored in memory or in the operand stack for subsequent processing at the will of the programmer.

The operand stack comprises four 48-bit registers 140 to 143, 144 to 147, 150 to 153, and 154 to 157. Each register consists of four syllables of 12 bits each, for example, the first stack register consists of syllable 140, 141, 142, and 143, the second stack register consists of 12-bit syllables 144, 145, 146, and 147, etc. The operand stack 140 to 143, 144 to 147, 136 to 153, 154 to 157 is a device which is extremely useful in arithmetic and processing operations. This operand stack reduces the number of references to main memory by holding partial or intermediate results of computation. The stack operates in two modes; normal and hold. The hold mode is useful for list manipulation and for repeated use of a number.

The first syllable of an instruction supplies the operation code and three address indicators. The address indicators provide choice between fetching the operand from the stack or the memory and indicates whether the stack mode is normal or "hold" and whether the memory address is to indexed or not. Address syllables or syllable strings follow the operator syllable for each memory access called out. Each operand memory address syllable contains an 11 bit literal address and an indirect address bit. The thin-film memory is numbered 3001. A base address register 055 is provided in the thin-film portion 3001. The literal address is added to the contents of the 16-bit base address register 055 in order to refer to an area of memory known as the direct-address area.

The contents of the direct address location may be either an operand or another memory address. Indirect addressing of any desired number of levels is available by this technique.

Fifteen index registers, octal 001 to 017 are provided in thin-film memory 3001. Any or all of three operand addresses which can be developed for each instruction may be modified by the contents of three of the 15 thin-film index registers 001 to 017.

As stated, the system of FIG. 3 can accommodate up to four of the computer modules shown in FIG. 1. Rather than the aforementioned five functional area division, each computer module may also be considered to consist of three functional areas, arithmetic, thin-film memory and control. The first functional computer area, the arithmetic unit, 3030, is made up of three registers, an A register 3033, a B register 3031, and a C register 3034, and associated controls and an adder 3032. The second functional area is a set of 53 registers (later individually described and numbered), contained in a small thin-film magnetic storage unit 3001. The third area is the control section which includes capability for indexing, address accumulation indirect addressing, and a command and subcommand matrix and control unit 3020.

OPERAND STACK

Figure 6A:
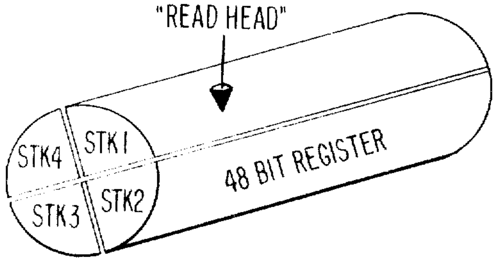
FIG. 6A is a pictorial schematic electro-mechanical representation of the operand stack in the thin-film memory portion of the illustrative embodiment of FIG. 1.
Figure 6B:
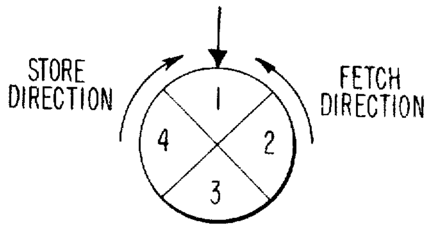
FIG. 6B is a logical representation of the operation of the operand stack of FIG. 6A.

One of the features of this invention is the thin-film fast-access operand stack 3099 (registers 140 to 143, 144 to 147, 150 to 153, and 154 to 157 of thin-film memory 3001 of FIG. 1). The operand stack of this invention is used to temporarily store as many as four data words which might be either intermediate results of data words which are to be used repeatedly. These operands which are used again and again and the intermediate results can be kept in the stack 3099 and addressed in a shorter time than required to get an operand out of main memory (the memory modules comprising the ferrite core memory modules of 4096 words each and associated register and controls). However for a read operation, only the top of the stack 3099 is accessible at a given instant. For a write operation either the top of the stack or the next level is accessible. The programmer must be aware of what values are at each level of the stack 3099 and which level is currently accessible. The stack 3099 is effectively a four word circular memory with an addressing counter. One of the four words is always being pointed at (is under the "read head"). Operation of this circular concept and the pointer "read head" at the top of the stack are shown in FIGS. 6A and 6B.

Whenever access is obtained to the stack 3099, there is an option of either holding the stack or circulating the stack one step. Normal operation is to step the stack with each stack reference. The four stack representations shown in FIGS. 6A and 6B are respectively the stack registers shown in thin-film memory portion 3001 of FIG. 1 as respective stack registers 140 to 143, 144 to 147, 150 to 153, and 154 to 157. For purposes of illustration, consider stack register 1 (140 to 143) as the one which is in position to be read out at a particular instant.

As stated, whenever access is made to the stack 3099, there is an option of either holding the stack or circulating the stack one step. As further stated, normal operation is to step the stack 3099 with each stack reference. The stepping operation follows all fetches from the stack 3099 and precedes the deposit made in the stack 3099. That is, a read operation is a fetch from the stack 3099, and stepping operation follows such a read or fetch from the stack 3099. A write is a deposit made in the stack 3099 and the stepping operation precedes the deposit made in the stack 3099. As illustrated in FIGS. 6A and 6B, this stepping action is counterclockwise following a fetch or read and clockwise preceding a deposit. As will be further described hereinbelow, address tag values in the operator syllable (see description of operator syllable in columns 14 and 15 hereinbelow) 00 and 01 designate the stack 3099 as the intended operand or result source or store place. Codes 10 and 11 refer to the memory as the source or store place of operands or a result. Indicator code 00 designates normal stepping of the stack and indicator code 01 designates that the stack be held and not be stepped. As later described herein, by instructions, step stack up, step stack down, and reverse stack the stack may be rotated so that the start register to which access is desired will be in "top of stack" position.

The illustrative embodiment ferrite-core main memory modules store 48 bits of information plus a parity bit at each memory address. The information or data comprises a four syllable (48 bits) operand or result, or a program word of four program syllables. The total time required to compute the address and to fetch four syllables from the core memory of the illustrative embodiment and to store those syllables in the appropriate register is 5.33 microseconds and the time required to compute the address and to store four syllables is 4.33 microseconds. As stated, to reduce the time required to fetch or store operands, the thin-film memory operand stack 3099 is provided. The time required to fetch an operand from the stack is 2.00 microseconds and the time to store a result is 1.67 microseconds, values considerably lower than those for the ferrite-core memory. The stack feature enables temporary storage of intermediate results. The 2.00 microseconds required for stack, read-out is reduced to 0.33 microsecond if the stack read instruction follows a stack write operation of the preceding instruction, as will be described in connection with the arithmetic unit A register.

It has been brought out that the operand stack comprises four 48-bit, thin-film registers, stack registers 140–143, 144–147, 150–153, and 154–157 shown in FIG. 1. These members, octal 140, 141, 142, 143, 144, 145, 146,

147, 150, 151, 152, 153, 154, 155, 156, and 157 each holds a 12-bit syllable of an individual 48-bit stack register. There are four syllables in each stack register. The stack registers 140–143, 144–147, 150–153, 154–157 may be visualized simply as a steppable four-word circular memory as shown in FIGURE 6A and FIGURE 6B. When the stack is addressed to fetch (read an operand), the operand in the register currently under the read head is fetched following which the stack may be stepped in the fetch direction or held (not stepped). When the stack is addressed to store (write), an operand, the stack is first either stepped in the store direction or held (not stepped), following which the operand is stored (written), in the register under the read head. An operand is thus fetched from or a result stored in, the top of the stack. Stepping the stack is defined as a "stack normal" operation, while not stepping the stack is defined as a "stack hold" operation.

If an operand or result is referenced to the operand stack, no memory address need be computed since the operand so referenced is always fetched from or stored in one "address"—the top of the stack. Accordingly, an operand or result referenced to the stack requires no memory address syllable in the syllable string.

The computer module structure shown in FIG. 1 is described in detail hereinafter after the following description of the structure of program syllables used in computer instructions. In the description of program syllable structure hereinbelow, the operation of a stack fetch or store will be described in relation to the operator syllable.

THE STRUCTURE OF PROGRAM SYLLABLES

There are 18 types of syllables used in the machine language programming of the illustrative embodiment computer. These types include the operator syllable, index syllable, the memory and the branch address syllables, thin-film address syllable, index increment variant and index increment amount syllables, shift syllable, transmit variant syllable, logical machine condition syllable, field definition syllable, character syllable, subroutine jump address and subroutine jump increment syllables, repeat count and repeat increment syllables, I/O syllable and special register and computer interrupt variant syllable.

Figure 8:
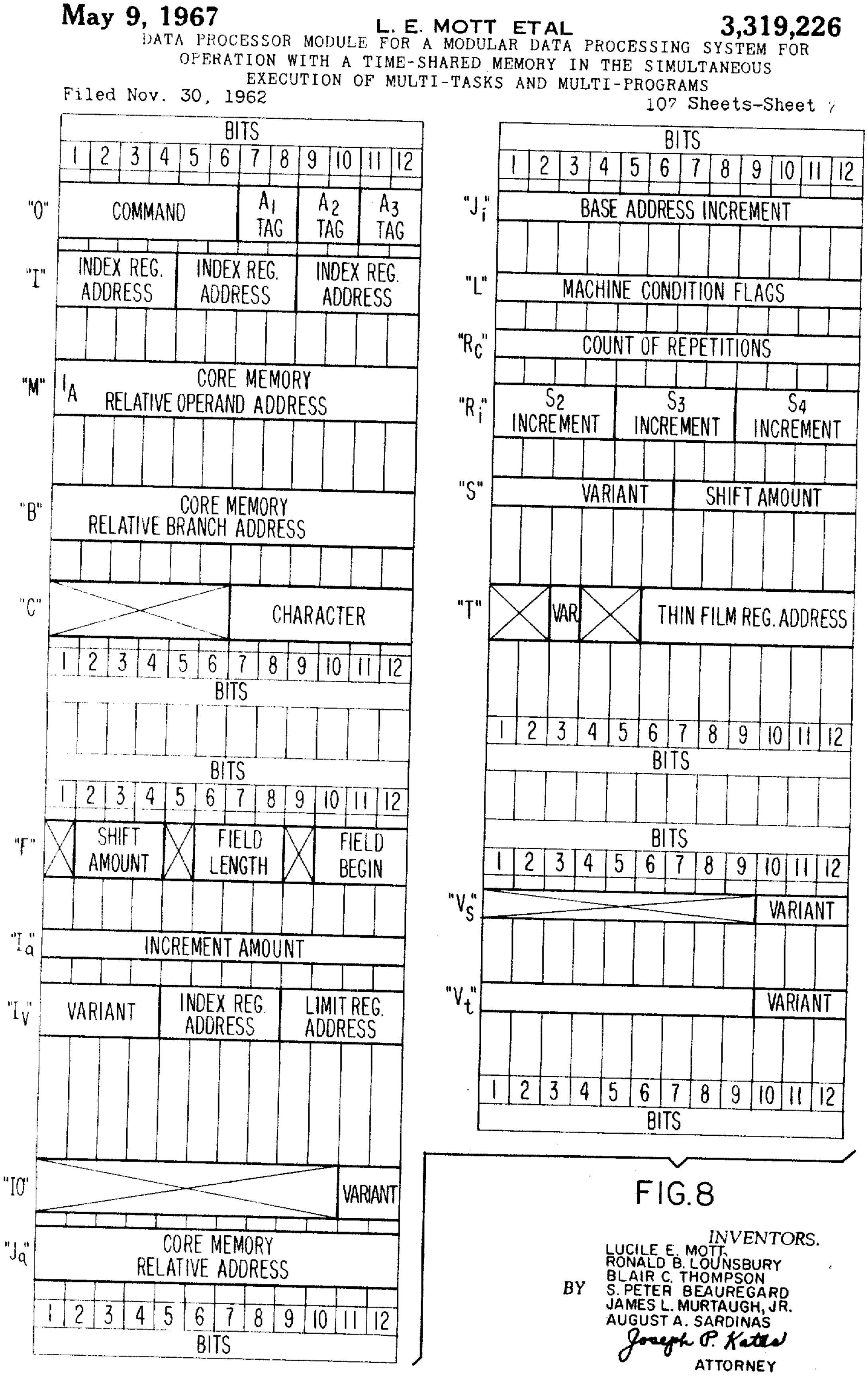
FIG. 8 is a diagrammatic representation of the syllable structure of each of the types of syllables employed in the word structure of the computer of the illustrative embodiment.

Now refer to FIG. 8 which illustrates the structure of each type of syllable. The operator syllable O comprises command bits 1 through 6 which specify the fundamental operation desired, the next six bits comprise address tags $A_1$, $A_2$, and $A_3$ of two bits each which indicate how many syllables follow the operator syllable. The first six bits represent the octal number for the command desired and the three address tags of two bits each are the remaining six bits which with the six command bits make up the twelve bit syllable.

The operator syllable is the only one required for every instruction. It identifies any syllables that may follow and any stack usage for the instruction. This type of syllable is not indexable. The $A_1$, $A_2$, and $A_3$ codes identify the three possible "addresses" of the instruction as follows:

| Code: | Definition |
|---|---|
| 00 | Stack (or no address) |
| 01 | Hold stack |
| 10 | An unindexed syllable follows |
| 11 | An indexed syllable follows (index syllable followed by any other syllable to which it is applied) |

That is, to indicate the number of syllables in the syllable string following the operator syllable, three two-bit address tags $A_1$, $A_2$, and $A_3$ are included as the second half of the 12-bit operator syllable. The first six bits are the octal equivalent of the particular instruction. The complete list of instructions by name and octal number are given in the instruction index shown herein in column 100.

Restating each of the two-bit tags, $A_1$, $A_2$, and $A_3$ has four possible configurations. The address tag is ignored if the address is not used for an instruction. The four possible binary configurations are:

00 *Operand Referenced to Stack:* No memory address syllable relating to operand is contained in syllable string. Stack to be stepped normally ("stack normal").

01 *Operand Referenced to Stack:* No memory address syllable relating to this operand is contained in syllable string. Stack to be held ("stack hold").

10 *Either Memory Syllable which is part of Program or Operand Referenced to Core Memory:* Indexing not used. Relative memory address syllable relating to this operand appears in syllable string. Alternatively, unindexed special syllable in syllable string.

11 *Operand Referenced to Core Memory:* Indexing used. Index syllable precedes relative address syllable in syllable string. Alternativelly, special syllable in syllable string preceded by index syllable.

VARIABLE-LENGTH INSTRUCTIONS

Many fundamental computer operations such as binary add, for example, require three addresses. A single-address computer furnishes fixed-length, single-address instructions for which the programmer assembles the sequence of instructions needed to perform a desired fundamental operation such as binary add. The computer of this invention eliminates the assembly process by specifying in a single variable-length (polysyllabic) all the information necessary to perform a desired fundamental operation. For example, "binary add" in a single-address computer requires programmer assembly of three single-address instructions, each using a separate storage location. These instructions are (1) clear A register and add data from memory from memory address $A_1$ to A register, (2) transfer data from memory address $A_2$ and add to A register, (3) store the A register (sum) at memory address $A_3$. In the computer of the present invention, only one polysyllabic instruction is required for binary add. This is, (1) binary add the data at memory address $A_1$ to the data at memory address $A_2$, and (2) store the sum at memory $A_3$.

For fundamental computer operations requiring less than three addresses, the number of addresses in the inventive machine instruction is correspondingly reduced so that only the needed information appears. Examples of 2-, 1-, and no-address instructions of the machine of the present invention are given below:

(1) Two-address "logical complement": logically complement the data at memory address $A_1$ and store the result at memory address $A_2$. This instruction comprises an operator syllable and up to two memory address syllables. In a single address computer, this logical complement instruction requires three instructions. (a) Clear A register and add data from memory address $A_1$, (b) complement the result, and (c) store the result at memory address $A_2$.

(2) One address "unconditional transfer": branch to the instruction at memory address $A_1$. This is a two-syllable instruction comprising the operator syllable and a relative branch address syllable.

(3) No-address "step stack down": this instruction says step the stack counter in store direction. It comprises one syllable, and operator syllable.

It is thus seen above that each instruction comprises a string of 12-bit syllables, the exact number (from 1 to 7) of syllables in the string depend upon the number of addresses in the instruction and several other factors to be discussed hereinbelow.

There are five basic types of syllables in the machine:

(1) Operator Syllable: Specifies the fundamental operation to be performed and the number of syllables in the string following the operator syllable, itself.

(2) Relative Memory Data Address Syllable: Specifies the relative address of the operand to be fetched from or stored in the main (ferrite-core) memory.

(3) Relative Branch Address Syllable: Specifies the relative address in main memory of the instruction to which branching is desired.

(4) Special Syllable: Specifies the control data essential to the execution of an instruction.

(5) Index Syllable: A relative memory data address, relative branch adddress, or special syllable may be indexed.

When indexing is desired, an index syllable is inserted into the syllable string (instruction), just preceding the syllable to be indexed. The index syllable itself contains the addresses of three index registers (selected out of the 15 index registers available) whose contents are to be added serially and automatically to the syllable immediately following.

Figure 7:
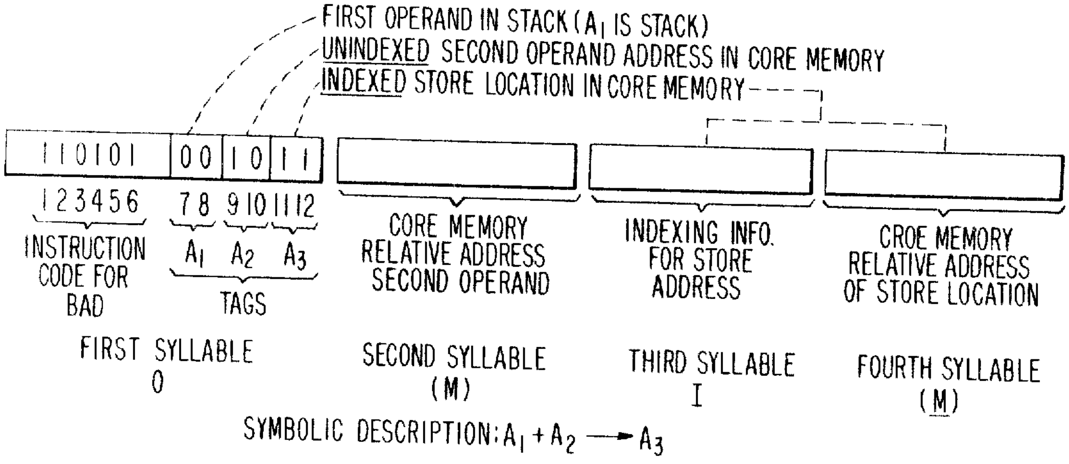
FIG. 7 is a diagrammatic representation of the string of syllables in a typical instruction utilized in the illustrative embodiment computer.

FIG. 7 illustrates a typical instruction (string of syllables) of the present invention. The operator syllable specifies the fundamental operations as "binary add" (BAD) and includes the three address tags $A_1$, $A_2$, and $A_3$. The instruction code for binary add 110101 is equal to the octal number 65, (sixty-five is the octal number for the binary add instruction). The $A_1$ tag, 00 (the seventh and eighth bits of the first syllable which is the operator syllable), indicates that the first operand (augend) is taken from the top of the stack; hence no memory address syllable relating to the first operand appears in the syllable string. The $A_2$ tag, 10 (the ninth and tenth bits of the operator syllable) indicates that the second operand is to be taken from the core memory using the unindexed relative memory address syllable ($A_2$) which is the second syllable in the string (i.e., that following the operator syllable). Each syllable is a 12-bit syllable. The second operand address in this particular word follows directly.

Address tag $A_3$, 11, indicates that the binary sum is to be stored in the core memory using indexed memory address syllable $A_3$ whence the third syllable in the string is an index syllable shown as index third syllable I which is a 12-bit syllable indicating indexing information and the fourth syllable is the memory address syllable. Where indexing is used, the index syllable precedes the syllable to which it applies.

WORD STRUCTURE

Figure 5:
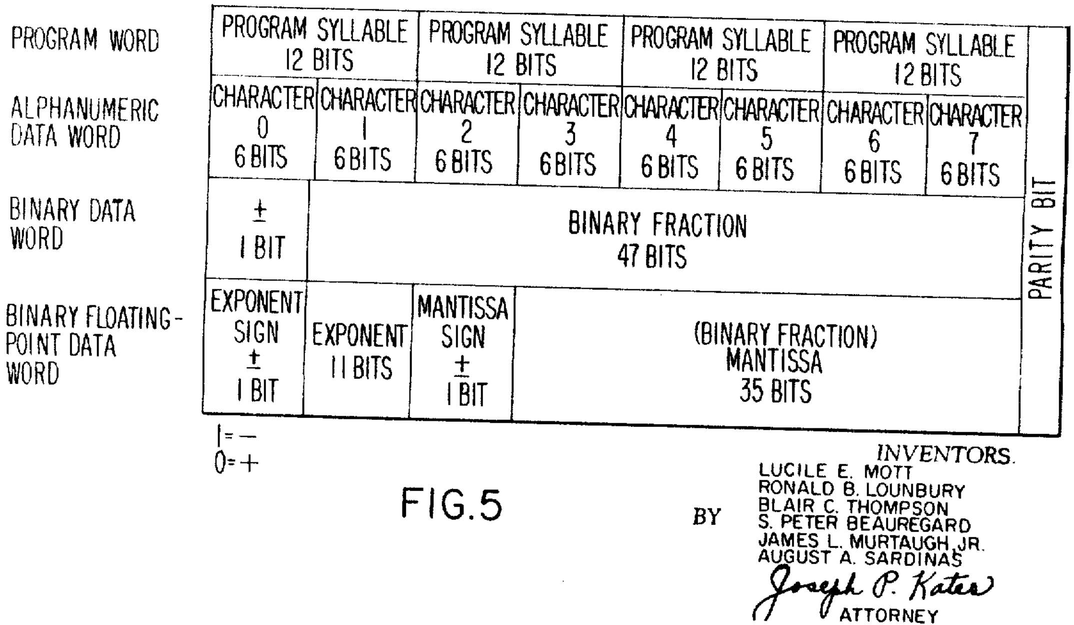
FIG. 5 is a diagram illustrative of the computer word structure of the illustrative embodiment of the present invention of showing structure of program words, alphanumeric data words, binary data words, and binary floating-point data words.

FIG. 5 illustrates the word structure applicable in the illustrative embodiment of the present invention. The basic word is 48 bits in length followed by a 49th parity bit. It may constitute: (1) four 12-bit program syllables; (2) eight 6-bit alphanumeric data characters from character 0 to character 7; (3) a 48-bit binary data word consisting of one 47-bit fixed-point binary fraction prefixed by a sign bit; and (4) a binary floating-point data word comprising an 11-bit exponent prefaced by a sign bit and followed by a 35-bit binary fraction mantissa prefaced by a sign bit. Sign-bit convention used is 0=plus, 1=minus, although the opposite could readily be used without departing from the principles of the invention.

SYLLABLE STRUCTURE

The structure of each different type syllable of the illustrative embodiment is shown in FIG. 8.

*Operator Syllable (O):* The operator syllable of the instruction word has been described hereinabove. The top column bits 1 through 12 are the bit positions for each syllable. As shown in the first row, which shows the operator syllable "O," the command bits are bits 1 through 6 and specify the fundamental operation desired. Address "tags" $A_1$, $A_2$, and $A_3$ indicate how many syllables follow the operator syllable.

In the following example of the use of the operator syllable, the number contained in the top of the stack is squared and the results are stored in the stack. Refer to FIG. 81. The binary equivalent is:

| 110001 | 01 | 00 | 00 |
|---|---|---|---|
| Binary Multiply | Hold Stack | Normal Stack | Normal Write Stack |

The first 6 binary digits 110001 are the octal number 61 for binary multiply. The next two digits 01 indicate "hold the stack," which indicates that the number contained at the top of the stack is taken and that the stack address is held. The second operand the multiplier then is the same number as the multiplicand taken from the same stack address. Thus, the top of the stack is multiplied by itself and this is a squaring operation. The last two bits, 11 and 12 of the syllable 00 indicate that the result is stored in the stack and this is done in a write stack operation in which the stack is rotated in the store direction and then stored under the "read" head.

*Index Syllable (I):* The index syllable "I" is shown in the row below the operator syllable row of FIG. 8. The index syllable is used optionally with any syllable except the index syllable itself, the operator syllable, or any syllable used in a repeated instruction. The contents of the three thin-film index registers whose addresses are given in the three 4-bit groupings of the index syllable may be added to the syllable to be indexed. If subtraction is desired, the index register or registers contain the 2's complement of a number. An index register address of zero signifies no index. When indirect addressing is used in conjunction with indexing, the contents of index registers are applied to the last-level address only (i.e., indirect addressing is completed first, then indexing).

When a syllable is indexed, it is immediately preceded by an index syllable. The contents of up to 3 index registers can be added to the contents of this syllable.

The core memory data relative address syllable (M): This syllable illustrated in the row next to M in FIG. 8 is used to address the ferrite core memory to fetch an operand or store a result. Bits 2 through 12 form a relative address which must be added to the 16-bit base address contained in the thin-film base address register 055 (see FIG. 1A) in order to form a core memory direct address (16-bit). Bit 1, 1A, is an indirect address indicator. If bit 1=ONE, the relative address in bits 2 through 12 is the relative address of an address. In this case, the relative address plus base address register 055 contents is used to fetch a next-level address from the least significant portion of a 48-bit word in the core memory, i.e., bits 33 through 48. If the 16 bit next-level address fetched is preceded by a ONE in bit location 32, it is in turn, an indirect address and is used to fetch the next-level address from core memory without adding the contents of the base address register 055. The indirect addressing "chain" continues until bit 32 is a zero. The last-level address is used with or without indexing to fetch an operand from or store a result in the core memory. An underlined memory syllable M, represents a store address. A memory syllable in parentheses, (M), represents an optional core memory address which may be replaced by an operand stack reference.

In the following example, the index syllable and the memory address syllable (the latter to be described hereinbelow) follow the operator syllable. Refer to FIG. 82 in conjunction with FIG. 8. If index register 15 (1111) contains (*b*) and index register 2 (0010) contains (*c*), then the contents of the memory location specified by relative address (*a*) plus (*b*) plus (*c*) plus the base address register 055 contents all added, is added to the top of the stack (floating-point in this case), and the results are stored in the stack. This is because according to the operator syllable, the first operand is a memory indexed fetch, the second operand is a stack fetch, and the result is to be stored in the stack. In the memory relative address syllable for the first operand the first bit being a zero indicates a direct address and this is followed by the relative address (*a*) which is added to the base address register 055 contents and to the contents of the index registers addressed.

Now refer to FIG. 83 in conjunction with FIG. 8. The operator syllable includes the binary add code written as a binary number (the first six bits), the seventh and eighth bits immediately following the command in the operator syllable being 10 indicate that an unindexed relative address syllable follows, the ninth and tenth bits being 00 and the eleventh and twelfth bits being 00 indicate a stack reference for the second and third operands. Since the first bit of the memory address syllable is a ONE, the memory address obtained by the addition of this relative address (*a*) and the contents of the base address register 055, is indirect and contains the second level address. If a zero appears in the indirect address bit of the second level address, the contents of the memory location specified by the second level address is added to the contents of the top of the stack and the results are stored in the stack. If the indirect address bit is a ONE, this address is indirect and contains the next level address; the indirect addressing chain continues until the indirect address bit is a ZERO. Second level (and subsequent level), absolute addresses are found in bits 33 through 48 of the 48-bit memory word and bit 32 is the indirect address bit.

*Relative Branch Address Syllable (B):* The branch address syllable shown on the fourth syllable row of FIG. 8 adjacent to the letter "B" is used to address a program word (four-syllable) in the core memory. The 12-bit relative address is added to the 16-bit contents of the thin-film base program register 054 (see FIG. 1A), to form a 16-bit direct address used to fetch the program word from memory whenever branching is desired.

Now refer to FIGS. 84A and 84B in conjunction with FIG. 8. The contents of the relative address (*a*) is added to the contents of the base program register 054 to obtain the effective branch address.

The example of FIG. 84B is an unconditional transfer to the program word stored in the memory location specified by (*a*)+the contents of base program register. The first 6 bits of the operator syllable form the command code for the unconditional transfer instruction.

In all cases, where a branch is used, the first syllable of the 48-bit memory location, thus addressed, must be the operator syllable of the next instruction to be performed. When a branch is made, the program count register 057 is automatically loaded with the address of the branch.

*Character Search Syllable (C):* Refer to the syllable in the row adjacent the letter "C" in FIG. 8. This syllable is used as an integral part of the character search instruction. The routine for this instruction is described hereinbelow in the description of FIG. 53. Bits 7 through 12 form the 6-bit character whose image is to be searched for.

*Field Definition Syllable (F):* Refer to the row adjacent to F in FIG. 8. The field definition syllable is used in field-defined instructions. A field is basically made up of from 1 to 8 physically adjacent 6-bit characters in a 48-bit word. To define a specific field, it is necessary to specify the character with which the field begins and the length (number of characters) of the field. Bits 10 through 12 specify the number (0 through 7) of the beginning character. Bits 6 through 8 specify the field length (1 through 8 characters). Bits 2 through 4 specify the amount by which the result of the field operation is to be shifted.

*Index Increment Amount Syllable ($I_a$):* Refer to the row adjacent to "$I_a$" in FIG. 8. This syllable is used in the index limit compare instruction described in the description of FIG. 77 hereinbelow. The index increment amount syllable indicates the amount to be added to or subtracted from the index register contents.

*Index Increment Variant Syllable* ($I_v$): Refer to the FIG. 8 syllable adjacent "$I_v$." This syllable is used in the index limit compare instruction shown in the flow chart of FIG. 77. Variant bit 1 in combination with bit 2, or 3, or 4 specifies the comparison condition desired as shown following:

S1 decrease index specified before comparing
$\overline{S1}$ increase index specified before comparing

| S2 | S3 | S4 | |
|---|---|---|---|
| 0 | 0 | 0 | No comparison, no branch. |
| 0 | 0 | 1 | Compare for index equal to limit. |
| 0 | 1 | 0 | Compare for index greater than limit. |
| 0 | 1 | 1 | Compare for index greater than or equal to limit. |
| 1 | 0 | 0 | Compare for index less than limit. |
| 1 | 0 | 1 | Compare for index less than or equal to limit. |
| 1 | 1 | 0 | Compare for index unequal. |
| 1 | 1 | 1 | Unconditional branch. |

Bits 5 through 8 specify the index register address. Bits 9 through 12 specify the limit register address.

*Input/Output Syllable* (*IO*): Refer to the FIG. 8 syllable adjacent "IO." This syllable is used with a transmit input/output instruction to select the input/output bus and to control the I/O descriptors. This instruction is described in the description associated with FIG. 73.

*Subroutine Jump Address Syllable* ($J_a$): Refer to the syllable adjacent "$J_a$" of FIG. 8. This syllable is always used with a subroutine jump instruction described with the description of the Flow chart of FIG. 70. The 12-bit relative address given is added to the 16-bit subroutine base address in the subroutine base address register 060 (see FIG. 1A) to obtain the core memory direct address (16-bit) of the word which contains the start of the subroutine address.

*Subroutine Jump Increment Syllable* ($J_i$): Refer to the $J_i$ syllable of FIG. 8. This syllable is always used with the subroutine jump instruction. The 12-bit relative address given is added to the 16-bit base address of data in the thin-film base address register 055 to obtain the base address of subroutine data.

*Logical Machine Condition Syllable* (*L*): Refer to the "L" syllable of FIG. 8. This syllable is used with a branch on condition instruction such as described in the flow chart of FIG. 43. This syllable specified the condition under which the branch is made.

*Repeat Count Syllable* ($R_c$): Refer to "$R_c$" of FIG. 8. This syllable is used with the repeat instruction described in the flow chart of FIG. 66. It specified the number of repetitions to be performed on the instruction to be repeated.

*Repeat Increment Syllable* ($R_i$): This syllable is shown opposite "R" in FIG. 8. This syllable is used with the repeat instruction. Bits 1 through 4, 5 through 8, and 9 through 12 specify the amounts by which the second, third, and fourth syllables of the instruction being repeated are to be incremented for each repetition.

*Shift Syllable* (*S*): Refer to "S" syllable in FIG. 8. This syllable is used with the shift instruction, the flow chart of which is shown in FIG. 69. Variant bits 3 through 6 specify the particular manner in which the shift of information in the "A" register 3033 alone, or in the A register 3033 and the C register 3034 of the arithmetic unit 3030 (see FIG. 1) is to be performed as follows: Bit 3: ONE=double length shift of data in A register 3033 and of data in thin film C register 124 to 127 (using C register 3034), ZERO=single length shift of data in A register 3033 only; Bit 4: ONE=shift right, ZERO=shift left; Bit 5: ONE=logical shift (shift bits 1 through 48), ZERO=arithmetic shift (shift bits 2 through 48); Bit 6: ONE=End-off (read least significant bit into "space"), ZERO=End-around (read least significant bit to most significant bit position of A register 3033 according to bit 5); Bits 7 through 12 specify the amount of shift desired.

*Thin-Film Address Syllable* (*T*): Refer to syllable "T" in FIG. 8. This syllable is used with the store thin film instruction or load thin-film instruction illustrated in the flow charts of FIG. 72 and FIG. 64 respectively. The store thin-film instruction causes a transfer of information from thin film and storing of this information, and the load thin-film instruction causes a transfer of information into thin film. Variant bits 3 and 6 specify the type thin-film register address as follows.

Bit 3:
ONE=Multiple-syllable thin-film register addressed,
ZERO=Single-syllable thin-film register addressed, Bit 6:
ONE=16 bit/syllable thin-film register addressed,
ZERO=12 bit/syllable thin-film register addressed.

Bits 6 through 12 form the address of the thin-film register desired. If a multiple-syllable register is addressed, the address given in bits 6 through 12 is for the first syllable.

*Special Register and Computer Interrupt Variant Syllable* ($V_s$): This syllable is shown adjacent the row of "$V_s$" in FIG. 8. The syllable is used with the load special register instruction which is octal code 31 illustrated in the flow chart of FIG. 63. Variant bits 10 through 12 are interpreted as follows:

Bit 12: ONE=load mask register,
Bit 11: One=load eight least significant bits of A into memory lower bounds register, load next eight least significant bit into memory upper bounds register. A means the A (accumulator) register 3033.
Bit IO: 1=interrupt the computer register designated by bits 46, 47 and 48 of the A (accumulator) register 3033.

*Transmit Variant Syllable* ($V_t$): This syllable shown opposite "$V_t$" in FIG. 8 is used with the transmit modified instruction described in the flow chart of FIG. 74. This instruction specified sign modification and rounding as follows:
Bit IO: ONE=Round off data

| Bit 11 | Bit 12 | Variant |
|---|---|---|
| ZERO | ONE | = Set sign positive. |
| ONE | ZERO | = Set sign minus. |
| ONE | ONE | = Change sign. |

*Modular Description*: Refer again to the block diagram of the computer module of the illustrative embodiment of the inventive system of FIG. 1A and FIG. 1B. A computer basically has three functions: arithmetic, control, and memory. It also receives input and gives off output. The computer of the invention in conjunction with its thin-film memory and the shared memory and other system units accomplishes these functions. However, the computer module may be thought of also as divided into five functional units: (1) thin-film memory; (2) memory protection; (3) memory exchange; (4) control; and (5) arithmetic.

*Thin-Film Memory*: The computer module comprises a thin-film temporary memory section 3001 employing a thin-film vacuum deposited memory element which contains thin-film storage sufficient to store one hundred and twenty-eight words. These thin-film words are provided with octal addresses from 000 to 177.. Addresses 000 to 077 comprise 16-bit words and addresses 100 to 177 comprises 12-bit words. It should be understood that in the thin-film memory herein which comprises a number of word locations, these words are grouped, addressed by the computer, and structurally assembled with relation to the computer as register, and this term register will be used herein to describe these words instructions. Structure is provided whereby each of these words constitute either a register or a portion of a register or a spare register. Thus, some of the 16-bit, thin-film words form a portion of larger registers of 32 bits, 48 bits, and 64 bits divided into 16-bit syllable register sections; some of the 12-bit thin-film words are a portion of larger registers of 24 bits, 36 bits, and 48 bits divided into 12-bit syllable register sections. Whenever accessing thin-film memory, it should be understood that when addressing a register of more than one thin-film word, each portion of either 12 bits or 16 bits of that register is addressed sequentially.

The thin-film registers include 15 index registers of 16 bits each numbered 001 to 017 in the octal system. In the octal system the least significant digit is taken as such and added to the next least significant digit multiplied by eight to the first power, and then added to the next least significant digit multiplied by eight to the second power. Therefore, register 017, 7 plus $(1 \times 8^1)$ plus $(0 \times 8^2) = 15$. There are 15 limit registers of 16 bits each which are registers 021 to 037 in the octal system. A 48-bit interrupt storage register is provided and comprises three, 16-bit words 040 to 042. Three 16-bit registers comprising a base program register 054, a base address register 055, and a program count register 057 are provided in thin-film memory 3001. In the event of interrupt of the system, the contents of the base program register 054, the base address register 055, and program count register 057 are stored in the interrupt storage register 040 to 042. A repeat program register of 64 bits which comprise octal addresses 044 to 047 is provided for implementation of the repeat instruction. During the repeat instruction, the instruction to be repeated is stored in the repeat program register 044 to 047 instead of in the two program storage registers PSR1, 100 to 103, and PSR2, 104 to 107. A subroutine storage register of 48 bits which comprises thin-film memory 16-bit octal words 050 to 052 is provided. Its use is similar to that of the interrupt storage register in that in the event of a subroutine jump instruction, it stores the information contained in the base program register 054, the base address register 055 and the program count register 057.

The base program register (BPR) 054, the base address register (BAR) 055, and the program counter register (PCR) 057 are provided to store the respective bases of a program and data and for sequencing of addresses in memory. The program count register 057 sequences through the program being run by the computer. In the event of any jumps in the program the jump address is obtained by adding the relative branch address called for in the program to the contents of the base program register 054. In the event of data fetches from memory, the data address is obtained by adding the relative memory data address to the contents of the base address register 055.

A subroutine base address register (SAR) 060 of 16 bits is provided for implementation of a subroutine jump. A memory syllable is added to the contents of the subroutine base address register 060 to obtain an address, which address contains the location of the starting word of the subroutine. An interrupt base address register (IAR) 063 of 16 bits is provided for the interrupt system.

A 16-bit index increment register (XIR) 062 is provided in the 16-bit portion of thin-film memory 3001 to implement the index limit and compare instruction. It contains the increment to be added to the index register. When using the index limit compare instruction, the contents of the index increment register 062 are added to one of the fifteen index registers 001 to 017, and then comparison for less, equal, or greater is made with one of the fifteen limit registers 021 to 037 designated by the program and branching occurs if the condition tested for is met.

When an interrupt occurs, a delta or increment corresponding to the interrupt is added to the interrupt base address register 063 contents to determine the address in memory that contains an unconditional transfer instruction to an area in the program which services the particular interrupt. A 32-bit power failure dump register (PDR) 064 and 065 is provided for power failures. In the event of power failure a sensing device on the primary power lines sends a signal to the computer indicating power failure interrupt. This is described aforementioned patent application S.N. 224,344 of Fegley for High Speed Alternating Current Sensing Circuit, filed Sept. 18, 1962. This power failure signal allows 500 microseconds to the computer to finish the instruction in process and to store in the power failure dump register the necessary information to restart the computer automatically from the point of interruption. This information includes the state of certain control flip-flops and of the interrupt register 3002.

A 16-bit interrupt dump register (IDR) 070 is provided. Its use is similar to that of the power failure dump register 064 and 065 except that it contains the control flip-flops which are dumped into it in the event of a normal interrupt as contrasted with a power failure. All of the above registers from 001 to 070 are assembled from 16-bit registers. In all of the 16-bit registers, the first octal digit is a zero as numbered hereinabove. That is, the octal numbers designating the 16-bit registers in thin film memory 3001 range from 001 to 070. In addition there are a plurality of thin-film registers which are assembled from 12-bit registers. These range from octal number 100 to octal number 157. In each 12-bit register, the most significant digit of the three-bit octal addresses is a one (1). In addition to the 16-bit registers from 001 to 070, there are spare 16-bit registers numbered up to register 077, (octal 077). In addition to the 12-bit registers shown, there are spare 12-bit registers so that the total number of 12-bit registers is register octal 100 to register octal 177, inclusive. Program Storage Register PSR1 of 48 bits comprising syllable registers 100 to 103 and program storage register PSR2 of 48 bits comprising syllable registers 104 to 107 are provided. That is, program storage register 1 comprises 12-bit registers 100 to 103 and program storage register 2 comprises 12-bit registers 104 to 107.

The first operation that has to be performed by the computer is to load the program into the memory modules of the system. The computer utilizes the program storage registers for this as will be explained hereinafter.

Normally, program storage registers PSR100 to 103 are the only ones used. However, in the event of a long instruction where the memory addressing logic is not to be used in the execution of the instruction, an "overlap" is performed.

The "overlap" means that during the execution of a long instruction, when the memory addressing logic will not be used in the execution of the instruction, another program word is brought from memory and stored in program storage register #2, 104 to 107. This is the only way in which a program word can be stored in program register #2, 104 to 107.

An interrupt program register (IPR), comprising 12-bit registers 110 to 113 for total contents of 48 bits is provided. The interrupt program register 110 to 113 is used to store the program storage register contents being used (program storage register 100 to 103 or 104 to 107) when an interrupt occurs. A 24-bit real time clock (RTC) register 114 and 115 is provided. This is a counter which is incremented every 10 milliseconds. The incrementing is done by an oscillator which brings out its contents every 10 milliseconds, adds to them logically, and puts them back into the real time clock register 114 and 115. A 12-bit repeat count register (RCR) 120 is provided for implementation of the repeat instruction in a program. It contains the number of times the instruction is to be repeated.

A character count register (CCR) 123 of 12 bits is provided in thin-film memory 3001 to implement the character search instruction. It keeps the character position being compared in a character search where scanning is effected to keep track of which character is currently looked at in the scanning process. A thin-film C register (TFC) 124 to 127 comprising assembled 12-bit registers 124 to 127 for a total of 48 bits is provided. The arithmetic unit to be described hereinafter has a 12-bit flip flop C register 3034. The thin-film register 124 to 127 is used in conjunction with the C register 3034. Each time 12 bits are accumulated in the C register 3034, they are transferred into the thin-film C register 124 to 127 and the C register 3034 then proceeds to accumulate the next 12 bits. At the end of an arithmetic operation, a full word or total of 48 bits will have been accumulated in the thin-film C register 124 to 127.

Three 12-bit repeat increment registers, (RIR), 130 to 132 are provided for implementation of a repeat instruction. They hold the increment added to each of the memory syllables of the repeated instruction.

Four stack registers of 48 bits each, 140 to 143, 144 to 147, 150 to 153, and 154 to 157 are provided in a thin-film memory stack circular end around arrangement 3099. This is the stack 3099 which has been described in detail in the description of FIGS. 6A and 6B and in the description of the operator syllable hereinabove. These 48-bit stack registers 140 to 143, 144 to 147, 150 to 153, and 154 to 157 form stack 3099 to provide a scratch pad or temporary and erasable memory which is addressed only alternatively to addressing main core memory during the course of an instruction. The term "scratch pad" is used herein for a memory which can be utilized to erasably store the intermediate results, operands or data. Although only four words at a time are stored, the stack 3099 finds considerable repeated use in providing a fast access memory which speeds up to the machine operation considerably.

A K and E register 3004 and 3005 of which the K register portion 3004 contains four bits and the E register portion 3005 contains 12 bits, is provided in the computer module. The K and E register 3004 and 3005 is primarily a read-write register for the thin-film memory, (3001). An L and M register 3006 and 3007 comprising 4-bit L register 3006, and 12-bit M register 3007 is provided to facilitate computer transfer to and from the memory modules. L and M adders 3008 and 3009, respectively, comprising a 4-bit adder 3008 and a 12-bit adder 3009 are provided for adding the contents of the K register 3004 and the L register 3006 together and the E register 3005 and the M register 3007 together, the result being put into the L register 3006 and the M register 3007 respectively. The primary function of adders 3008 and 3009 is that of performing address arithmetic. This is used to add the memory syllable to the base program register 054 or base address register 055 and index registers contents to provide the true address in memory. Adders 3008 and 3009 are also used for incrementing the program count register 057.

The 128-word thin-film memory of the illustrative embodiment is used for control and data registers. As shown in aforementioned copending application, Ser. No. 226,-895 of Albert M. Bates for Magnetic Memory System, thin-film memory is logically divided into two sections: 64 words of 16 bits and 64 words of 12 bits. Octal addresses 000 through 077 address the 16-bit words and 100 through 177 address the 12-bit words. The K/E register 3004, 3005 provides a 16-bit buffer for data and the 7-bit film address register 3510 (see FIG. 1A and FIG. 4) provides address storage. However, since the thin-film memory is being used as separate registers, each address must be computed when it is needed. Some single-address registers, such as base address register 055, require only the direct encoding of the 7-bit address. Multi-address registers (e.g., the stack 3099), require incrementing of the address until the whole word is read out. To use the thin-film memory 3001 as a random word memory, provisions must be made to transfer in a 7-bit address into the thin-film address register 3510. Refer to FIG. 4. Control flip-flops are provided to feed into the encoder and comprise 3-bit program syllable address 3504, 2-bit stack address 3508, 2-bit syllable counter 3507, and 2-bit input syllable counter 3506. As shown in FIG. 1, syllable register 3017, which comprise three 4-bit portions (scan), 5-bits, or 7-bits, and the thin-film address switches 3510 feed the encoder also. FIG. 4 illustrates the indicators for the registers feeding the encoder.

When each thin-film register is addressed with a subcommand, the 7-bit thin-film address register 3510 is accordingly set in its film address register, bits 1 to 7 to address the particular thin-film register in thin-film memory 3001 called for by the address.

A ONE set in any thin-film address bit is enough to initiate the thin-film cycle as long as the computer operating in normal mode, is not trying to address the interrupt base address register 063, a special subcommand which should be given in the control mode only. A thin-film insert flip-flop 3509 is provided and when set, determines a write; and when reset, determines either read from thin-film or thin-film not being used (see FIG. 4). Initiate thin-film command indicates that a write is desired and the thin-film insert flip flop 3509 is set. However, unless an address subcommand is given, the thin-film cycle is not initiated. Otherwise, the thin-film insert flip-flop 3509 is reset and a read occurs if the thin-film cycle is initiated.

The thin-film memory circuit of the aforementioned patent application of Albert M. Bates for Magnetic Memory System can be utilized with the present invention and is initiated responsive to a 7-bit address of the subcommand matrix 3020. These circuits are shown in FIGS. 108, 109, 110, 111, 96C and 104B. Upon initiation, the thin-film address register 3510 is set and following decoding in a pair of decoders, driving and switching the octal addresses are caused to be written into or read out of memory planes in thin-film memory 3001 along the proper information lines for the odd and even memory planes along the 128 address lines provided. From the K and E register 3004 and 3005, through appropriate insert or copy gates upon an insert copy strobe (FIG. 104B), the thin-film sense amplifiers (FSA 1–16 see FIG. 109) amplify signals upon actuation of the sense lines, which signals pass through the insert copy gate (FIG. 104B) through the thin-film information register (FIG. 109) and then are applied to the K and E register 3004, 3005 or into the write polarity gates (not shown) and the film information drivers (FIG. 110) to write the information into thin-film memory 3001.

The output of the thin-film sense amplifiers trigger one-shot multivibrators (not numbered). In the read cycle, these one-shot multivibrators (which have both ONE and ZERO outputs), are used to rewrite the information into the thin-film memory 3001 and to transfer the same information into the K and E register under control of the subcommand TTFE, transfer thin-film to E. In the write cycle, these one-shot multivibrator outputs are inhibited from rewriting and the information in the K/E register 3004, 3005 is written in thin-film memory 3001.

Since the output of the thin-film memory 3001 is furnished by single shot multivibrators, when operating single-pulse, this information is lost before it can be locked into the E register 3005. Therefore, any time a transfer thin-film to E register subcommand is given, during single pulse operation, the contents of data input switches (not shown) are transferred into the K and E register 3004, 3005.

MEMORY PROTECTION UNIT

The memory protection unit stores upper and lower address limits within which data may be stored in the main memory. The memory protection unit comprises two memory bounds registers and two comparators. Each time a result is to be stored (written) in the main memory, the store address is compared with the upper and lower address limits and storage is permitted only if the store address is within these limits.

An 8-bit upper limit (X) flip-flop register 3012, and an 8-bit lower limit (Y) flip-flop register 3013 are provided. Limit registers 3012 and 3013 define the upper and lower limits of the memory field which can be written by the computer module. Limit registers 3012 and 3013 are program loadable to store the bounds within which information may be written into the main memory. The limit registers 3012 and 3013 furnish 8 predetermined upper and 8 predetermined lower bits to be compared with the 8 most significant bits of the memory direct address (in the L/M register 3006, 3007), being requested for a write operation. Limit registers 3012 and 3013 are in effective operation only when the machine is operating in the normal mode; they are not in effect when in the control mode. A 12-bit flip-flop interrupt register 3002 is provided in the event attempt is made to write out of the bounds provided by the upper and lower limit registers 3012 and 3013; an interrupt bit is set in the interrupt register 3002. That is, if the upper or lower bound is violated in normal mode of operation of the computer, the write into memory is inhibited and an interrupt bit is set. In this manner, memory is protected in blocks of 256 words. The 8 most significant bits of a memory address comprise the 4 bits contained in the L register 3006 and the 4 most significant bits of the M register 3007. A comparator 3010 is connected to receive input from upper limit register 3012 and L and M register 3006 and 3007. A comparator 3011 is connected into the computer to receive input from lower limit register 3013 and L and M register 3006 and 3007. The 8 bits comprising the 4 L register 3006 bits and 4 most significant M register 3007 bits are fed into the comparator 3011 and compared with the 8 bits in the lower limit register 3013. When these 8 L and M register bits exceed the value of the 8 bits of the lower limit register 3013, the comparator causes a signal to be sent to the subcommand matrix and control unit 3020. The subcommand matrix and control unit 3020 is responsive to this comparator output signal to effect setting of the interrupt register 3002. Similarly, to the comparison with the lower limit register 3013 in comparator 3011, the four bits of the L register 3006 and the four most significant bits of the M register 3007 are compared in the comparator 3010 with the 8 bits of the upper limit register 3012. In the event that the 8 most significant bits of the L and M registers 3006 and 3007 exceed the value for the 8 bits of the upper limit register 3012, the comparator 3010 provides an output which is sent through the subcommand matrix and control unit 3020 to set the interrupt register 3002 for an interrupt. The statement, "Setting the interrupt register 3002," as hereinabove set forth means setting one bit in the interrupt register 3002. The bounds register 3012 and 3013 are cleared to each limit. That is, the lower bound register 3013 is reset to zero and the upper limit register 3012 is set to all ones. The registers are then set from the A register 3033 under the subcommand which transfers the contents of the A register 3033 to the upper limit register 3012 and the lower limit register 3013. The zero sides of bits A33 to A40 of the A register 3033 are transferred into the upper limit register 3012 and the one sides of bits A41 to A48 of the A register 3033 are transferred into the lower limit register 3013.

COMPARATOR

The comparator 3011 investigates the least significant end of the register, develops a signal A is less than or equal to $B(A \leqq B)$, and propagates this signal to the next stage. By inverting this signal, the signal A is less than $B(A<B)$ is obtained. The comparator may use two types of circuits, initiate and propagate. Comparators of this type are well-known in the art.

Summarizing, the thin-film memory employs a vacuum-deposited thin-film as the memory element. It provides storage for one hundred and twenty-eight 16-bit words at address 0 through 127 respectively. Thirty-eight addresses are spares in the drawing presented. The remaining 90 addresses are used to form single- or multiple-syllable thin-film registers. The 7-bit word needed to address a single thin-film register, or a given syllable of a multiple-syllable register, is furnished by the subcommand matrix 3020 to the thin-film address circuit 3510. If the operation is fetch, the content (syllable) of the register addressed is transferred from the thin-film register 3001 to the K and E register 3004 and 3005. If the operation is store, the content of the K/E register 3004, 3005 is stored in the register or syllable position of the multiple-syllable register addressed. A fetch or store involving a single-syllable register requires only one 7-bit address whereas a fetch or store involving a multiple-syllable register requires an address for each syllable (i.e., a succession of subcommands in which the address is successively updated).

MEMORY EXCHANGE UNIT

The memory exchange unit comprises a buffer register to thin-film memory, the 16-bit K and E register 3004 and 3005 and an L and M register 3006 and 3007 plus address adders 3008 and 3009 interposed between the registers (K/E 3004, 3005 and L/M 3006, 3007). The unit has two major functions: (1) computing a direct address to be used when communicating with the main "ferrite-core" memory; (2) handling information when communicating either with the main memory or the thin-film memory 3001.

A 16-bit direct address is needed whenever information is to be fetched from the main memory to the computer or stored in the main memory from the computer. Basically, the 16-bit direct address is computed by transferring the 12-bit memory relative address syllable to the L and M register 3006, 3007 and a 16-bit base address from a thin-film base address register 055 or 057 to the K and E register 3004, 3005. A 16-bit direct address is then formed by adding the relative and base addresses (adding K and E register 3004, 3005 contents to L and M register 3006, 3007 contents) and storing the result in the L/M register 3006, 3007. The function of the memory exchange unit during indirect addressing and/or indexing is discussed subsequently. The four most significant bits of the resulting 16-bit direct address, which appear in the L register 3006 portion of the L/M register, 3006, 3007, represent a memory module address, while the 12 remaining bits, which appear in the M portion 3007 represent an in-module address.

To fetch a word (48 bits plus parity bit, represented as four 12-bit syllables plus parity bit) from the main (ferrite-core) memory to the computer, the direct address is first computed and stored in the L/M register 3006, 3007 as discussed above. Access to memory is then requested. When access is granted by a particular memory module addressed (i.e., the module whose 4-bit address is contained in L register 3006) its memory address register accepts the 12-bit in-module address (from the M register 3007) and a memory read cycle is initiated (see aforementioned copending patent application Ser. No. 246,855 for Computer System, of Anderson, Hoffman, Mott, Pezely, Shifman, and Wilkinson). The addressed memory word is sensed and transferred into the memory information register (not shown) in the M memory in parallel. The word is transferred into the L/M register 3006, 3007 at four sequential clock times with the least significant syllable entering first. The three remaining syllables are transferred to the M register 3007 at times $n+1$, $n+2$, and $n+3$. As each syllable following the least significant is transferred into M register 3007, the syllable preceding is transferred from the M register 3007 to a computer "destination" register as will be described. During a fifth clock time, transfer of the parity bit to check parity is accomplished.

To store a word (48 bits plus parity bit) in the main memory, a 16-bit direct address is formed and access is requested as in a fetch operation. When access is granted, the write portion of the memory read-write cycle is initiated. The least significant syllable, which has been placed in the M register 3007, is transferred to the memory information register of the specified memory module. The remaining syllables are successively transferred from the computer "source" register to the M register 3007 and then transferred to the memory information register. Parity is generated and sent last as a fifth syllable.

Communication with the thin film memory 3001 requires no address computation. To fetch from thin film, the particular thin-film register whose contents are required is directly addressed by the subcommand matrix 3020. The address is a 7-bit word. A 12- or 16-bit word is then transferred from the register in the thin film which was addressed to the K and E register 3004, 3005. In the case of multiple-syllable thin-film registers, the least significant syllable is transferred to the K and E register 3004, 3005 first, followed by successive transfers of the remaining syllables, each syllable requiring an updated address supplied by the subcommand matrix 3020. As each syllable following the least significant syllable is transferred from thin-film memory to the K and E register 3004, 3005, the preceding syllable is transferred from K/E register 3004, 3005 to the computer "destination" register. To store in thin film, the 12- or 16-bit word to be stored is placed in the K/E register 3004, 3005 and the particular thin film register in which storage is desired is addressed by the subcommand matrix 3020. In the case of multiple-syllable words, the least significant syllable is stored first, followed by storage of the remaining syllables. Each syllable requires an updated address from the subcommand matrix 3020.

K/E REGISTER

Common inputs into the K and E registers 3004, 3005 include the following subcommands from the subcommand matrix 3020:

TLMKE—Transfer L/M register to K/E register: A full parallel transfer of 16 bits.

TTFE—Transfer Thin-Flm to E: A full parallel transfer of thin-film one-shot register outputs into K register 3004 and into E register 3005.

TCFIE—Transfer a group of control flip flops to K and E register 3004 and 3005.

TCF2E—Transfer a second group of control flip flops (interrupt register 3002) to K and E register 3004, 3005.

TSWKE—Transfer data switches to K and E used during manual load of thin film and single pulse instead of Transfer Thin-Film to E (TTFE).

Inputs to the K portion 3004 only of the K/E register 3004, 3005 include:

TMK—Transfer bits M9 through M12 into bits K1 through K4. This is used for indirect addressing.

LTFPH5—Transfer bits A33 through A36 of A register 3033 to K1 through K4 of K register 3004. This is used during a load thin-film instruction.

Inputs to the E portion 3005 only of the K/E register 3004, 3005 include:

TAE—Transfer bits A37 through A48 of the A register 3033 into bits E1 through E12 of E register 3005.

TCE—Transfer bits C1 through C12 of C register 3034 into bits E1 through E12 position of the E register 3005.

TME—Transfer bits M10 through M12 of M register 3007 into E10 through E12 of E register 3005.

L/M REGISTER

Inputs common to the L and M registers 3006, 3007 include the following subcommands from the subcommand matrix 3020:

RLM—Reset L/M Register 3006, 3007.

SLM—Set L/M Register 3006, 3007.

FALM—Enters the sum of L/M register 3006, 3007 and K/E register 3004, 3005 into L/M register 3006, 3007. FALM is the full ad in L and M register subcommand.

Inputs to the M portion 3007 only of the L and M register 3006, 3007 include:

TAM—Transfer bits A37 through A48 of the A register 3033 to M register 3007 bits M1 through M12.

TMEMMA—Transfer memory bits from one of the memory modules 1 to 8.

TMEMMB—Transfer memory bits from one of the memory modules 9 to 16.

TEM—Transfer bits E1 through E12 of the E register 3005 from M1 to M12 of the M register 3007.

L AND M ADDERS

These address adders 3008 and 3009 between the K/E register 3004, 3005 and the L/M register 3006, 3007 are the same as the arithmetic adder 3032 except there is no provision for end around logic. A carry can be initiated into the least significant end by the subcommand ICYM12.

CONTROL UNIT

Refer to FIG. 1 again and also to FIGS. 4, 85A, 85B, 85C, 87, 88, and 89 illustrating the control units. The control unit furnishes timing and control for computer module operation. A timing distributor (see FIG. 88 for timing distributor circuit), supplies the basic clock pulse used to operate the computer. When reference is made to the main memory to fetch or store, the particular memory module temporarily slaved to the computer for the reference is operated by a memory time counter (TM)—(see FIG. 89). A phase distributor (see FIG. 87) enables selection of the order in which the operational phases (1 through 6) occur. The multiply-divide counter 3021 (see FIGS. 85A, 85B and 85C), controls the number of shifts to be executed during an instruction (in particular, the number of add or subtract cycles during multiply or divide operations).

FUNCTION REGISTER

A 12-bit flip flop function (F) register 3015 is provided to hold (store) the operator (instruction) syllable of the program. The operator (instruction) syllable actually comprises a 6-bit instruction field plus three 2-bit address indicators. The 12-bit function register 3015 holds the operator syllable which is written by "ONES" transferred from the E register 3005. A 12-bit flip flop syllable (S) register 3017 holds (stores) the program index syllable in the event of indexing. When not being used to retain index syllables it is used to retain variant (special) syllables which are program syllables used to modify the program instruction at the time being held in the function register 3015. The syllables are written in full parallel transfer from the E register 3005 or the M register 3007.

INTERRUPT REGISTER

An interrupt register 3002, responsive to external and internal interrupt conditions, is provided. A bit of the interrupt register 3002 is set whenever its interrupt condition occurs. More than one interrupt bit may prove to be set when the interrupt register is interrogated. Any single bits set in the interrupt register 3002 (ITE) sets the interrupt flip flop 3540 which causes the computer to enter the control mode. The most significant set bit of the interrupt register 3002 is reset when the subcommand (TINEM), transfer interrupt register to M register, is given while the interrupt is being serviced.

The 12-bit flip flop register, interrupt register 3002, is used to indicate interrupts of various kinds. When an interrupt occurs it causes an interrupt routine jump to be effected. This is similar to a subroutine jump which transfers control to another program area. Upon setting of this interrupt register 3002, operation, as will be described in detail hereinafter, is effected in the control mode rather than in the normal mode.

MASK REGISTER (P&Q)

The 23-bit mask register 3016 is provided and connected between the arithmetic unit 3030 (to be discussed) and the interrupt register 3002. It comprises a P register and a Q register. The Q register is a 16-bit register and the P register contains the additional 7 bits to make up a total of 23 bits. The 23-bit mask register 3016 (P&Q) screens out predetermined bits of the interrupt register 3002. The Q register or External Interrupt Register masks out 16 external request lines for external interrupt. TAQ, a ONES transfer signal transfers bits A21 through A36 of A register 3033 into bits E1 through E16. Signal RQ resets the P section of register 3016.

The 12-bit mask register 3016 holds mask bits for certain interrupt conditions. Only 5 masks are provided. Bits 3, 5, 9, 11, and 12 (mask for input/output descriptor return, real time overflow, arithmetic overflow, and two spares). A signal TAQ transfer A to Q transfer bits A39, 41, 45, 47, and 48 into corresponding Q3, 5, 9, 11 and 12 respectively of the mask register 3016. These bits are reset by RQ subcommand. Each of the 16 bits in the P register is a flip-flop, the output of which is ANDed with a particular external request line. All 16 of these AND gates are ORed together to set one interrupt register bit in interrupt register 3002. There is only one external request flip-flop bit in the interrupt register 3002. An output signal is provided from as many of the 16 bits of the P register as are in the set state, to be ANDed together with the 16 external request lines. In the event that any external request line is not to be serviced for an interrupt, the particular corresponding flip-flop to this external request line in the P register portion of the mask register 3016 is reset so that an output does not occur from its AND gate even in the presence of a signal on the corresponding external request line. The setting or resetting of the bits of the mask register is program settable. In order to find out which interrupt did actually occur, the incoming signal on the external request lines are stored with a variant of the load special register instruction which is one of the instructions concerned with the automatic operating and scheduling method and means (AOSP), described in the aforementioned patent application for Computer System, of Anderson, Hoffman, Mott, Pezely, Shifman and Wilkinson. This storage may be effected in stack or in any place in memory. The 7-bit Q register in the mask register 3016 is used only for certain of the bits of interrupt register 3002. There is a one for one correspondence with the Q register, there being an interrupt register 3002 bit for each of the bits in the Q register of mask register 3016. Therefore all 16 bits in the P register or mask register 3016 are utilized in determining a single one of the 12 bits of the interrupt register 3002, but each of the 7 bits in the Q register of mask register 3016 has a corresponding bit in the interrupt register 3002. Thus, a total of 8 bits (7 for Q plus 1 for all 16 of P), of the interrupt register 3002 are fed from the mask register 3016.

MULTIPLY DIVIDE COUNTER

Between the subcommand matrix unit 3020 and the arithmetic unit is connected a multiply-divide counter (D) 3021. Multiply-divide counter (D) 3021 is a 6-bit flip flop register. It is used in the mechanization of various arithmetic instructions. One of its primary functions is as a shift counter during shift operations. As its name implies, multiply-divide counter 3021 also serves to count the number of additions or subtractions in the respective multiply and divide operations. The multiply-divide counter 3021 can count down in multiples of 1, 6 and 12. This is in accordance with the ability of the A register 3033 in the arithmetic unit 3030 to shift to the right either one, six or twelve bits at a time. The multiply-divide counter 3021 counts up one at a time. The A accumulator register 3033 can only shift left one bit at a time.

The thin-film address gating unit 3018 is a 7-bit address encoder. On receiving signals from the subcommand matrix 3020 it encodes the 7-bit address from the matrix 3020 and uses the encoded output to address the thin-film memory. There are fourteen lines at the output of the thin-film address gating encoder 3018 which feed into the thin-film address register 3510.

The 6-bit multiply-divide counter 3021 is a control counter to count shifts made in various instructions. The following subcommands set information (ONE bits) into this register:

(1) TAD—Transfer bits A7 to A12 of A register 3033 to bits D1 through D6 multiply-divide counter 3021.
(2) ASD—Transfer bits S7 through S12 of syllable register 3017 to D1 through D6 of the multiply-divide counter 3021.
(3) S32D—Set bit one.
(4) S36D—Set bits one and four.
(5) S48D—Set bits one and two.
(6) SDA—Set the fourth bit of multiply-divide counter 3021.
(7) SD5—Set the fifth bit of multiply-divide counter 3021.
(8) SD6—Set the sixth bit of multiply-divide counter 3021.
(9) TS2T4D—Transfer bits S2 through S4 of the syllable register 3017 to bits D4 through D6 of multiply-divide counter 3021.
(10) RF—Reset multiply-divide counter 3021.

A subcommand (CDD—count down D), decrements the counter 3021 by one. A subcommand (CUD—count up D), increments the counter by one. If SHRAD (shift right A according to multiply-divide-counter 3021) occurs, the counter 3021 is decremented by: 12 if counter 3021$\geq$12; 6 if 6$\leq$ counter 3021<12; 1 if counter 3021<6. Correspondingly, the A register 3033 is shifted by 12, 6, or 1. When the counter reaches zero (DZ), it stops counting. Thus, shift register instructions according to the condition of the number in the multiply-divide counter 3021 can cause shifting by 12, 6, or 1.

The interrupt storage register 040 to 042 provides storage for data in the operational registers in the event of an interrupt. The thin-film interrupt base address register 063 contains the base address of the interrupt routines; the contents of this register are protected during the normal operation mode. The thin-film interrupt storage register 040 to 042 holds interrupt return information (i.e., the former contents of the base address register 055, base program register 054, and program count register 057). The thin-film interrupt program register 110 to 113 provides storage for the contents of the program storage register 100 to 103 or 104 to 107 in use upon interrupt. The thin-film interrupt dump register 070 holds the contents of the control flip flops (see FIG. 4) necessary to proceed with the program upon return from the interrupt routine.

An over-under voltage detector (see aforementioned applications of Fegely), detects and signals excursions of primary power between fixed voltage limits. The out-of-tolerance signal causes the computer module of the invention to store sufficient information to restart the program without loss of data. Provision is made for automatic program restart by automatically reloading stored data into the flip flop registers. The power supplies themselves have a sufficiently long time constant to protect the hardware, program, and data from all primary transients and failures and to allow continuation of the program when stable primary power is restored.

The automatic interrupt system utilized with the computer module of the present invention is described in aforementioned copending application for automatic Interrupt System for Data Processor, of Thompson, Perkins, Pezely, and Shifman.

The interrupt system handles interrupt arising from such conditions as power failure arithmetic overflow, running down of the real-time clock, illegal instructions, parity errors, external input-output requests, and I/O control module result descriptor situations, etc.

The computer module as shown in FIG. 1B, has an interrupt register 3002 which can be set through the interrupt mask register (Q) 3016. When a particular condition has set a ONE at some bit position in the interrupt register 3002, a program interrupt occurs. This interrupt stops the program being executed, stores sufficient registers to allow continuation of the interrupted program at a later time, and transfers control to a routine in an automatic operating and scheduling means (AOSP) to service the interrupt.

In further detail, the subcommand matrix and control unit 3020 generates subcommands for implementation of all instructions. The subcommand matrix and control section 3020 contains a T timing distributor of 15 bits which is actually a 15-bit shift register, (see FIG. 88). It also contains a 6-bit phase distributing register, (see FIG. 87). The subcommand matrix and control section 3020 also contains a memory timing counter (see FIG. 90).

The timing distributor, (see FIG. 88), is responsive to the slave clock, (see aforementioned copending application Ser. No. 246,855 of Anderson, Hoffman, Mott, Pezely, Shifman, and Wilkinson for discussion of master-slave clock system,) in this computer module. The memory timing counter in the subcommand matrix and controls unit 3020 is used for timing control for data transfer between the memory modules and the computer. The remainder of the subcommand matrix 3020 is made up of decoders which make use of the timing distributor, the phase distributor, the memory timing counter and the decoded output of the function register 3015 to generate subcommands for implementation of the instructions. These are shown in detail in drawing FIGS. 85 through 107.

The subcommands, made up mainly from the function register and the three timing distributors, implements the commands in the program. At the interrupt signals input, which is 30 lines into the interrupt register 3002, 16 of these are the external interrupt signal lines already discussed. The interrupt register 3002 also obtains the remaining 14 interrupt signals from external units and receives 7 internal lines comprising parity error lines, no access to memory, and other automatic interrupt lines responsive to automatic interrupt conditions within the system.

SUBCOMMAND MATRIX

The subcommand matrix 3020 is that body of logic which, taking inputs from control registers such as the phase register, timing register, multiply-divide counter 3021, interrupt register 3002, etc., makes up the subcommands needed to execute a particular instruction.

PHASE DISTRIBUTOR

Refer to FIGS. 4 and 87. Of the 7 operating phases, phase PH0, PH1–PH6, all but PH0 are represented by flip flops. PH0 is defined when all other phases are off. Only one phase is set at a time. Moving from phase to phase is accomplished by giving a jump subcommand. The jump subcommand is timed in accordance with the instruction being executed. Whenever a jump subcommand is given, the reset phase signal occurs providing the reset input to each of the phase flip flops and in particular, the exit phase—that is, the phase just executed and the entry phase, phase next to be executed, is present.

TIMING DISTRIBUTOR

Refer to FIGS. 4 and 88. The timing distributor consists of 15 flip flops which provide the T time intervals from T1 to T15. As in the phase distributor, only one of the flip flops is set at a time. The timing distributor is normally stepped sequentially unless a jump to some other T is required.

Now refer to the FIG. 4. FIG. 4 illustrates the illustrative embodiment computer control panel and its indicating lights which show registers, counters, distributors, and flip flops provided for the control and other sections of the computer. In FIG. 4, when the light on the control panel of FIG. 4 is lit, this indicates that the particular bit or flip flop is set.

In the upper left hand corner of FIG. 4 is illustrated the control mode flip flop 3540, which is set when the computer is in the control mode and is reset when the computer is operating in the normal mode. The B register 3031 lights indicate the second operand of the three-address instruction which is in the B register 3031 of the arithmetic unit 3030. The carry flip flop 3541 (OV) is set upon overflow out of the adder 3032 of the arithmetic unit 3030 and reset with no overflow out of the adder 3032. The A register 3033 lights indicate bits 1 to 48 of either the first operand or the result. This corresponds to the setting of the A register 3033 in the arithmetic unit 3030. The setting of twelve bits each illustrated in the command register 3542 by lights numbered one to twelve indicates the operator syllable for the instruction being performed. The syllable register 3017 (bits 1–12) lights indicates that a special or index syllable is being used.

PROGRAM SYLLABLE ADDRESS COUNTER

Continue to refer to FIG. 4. The program syllable address counter 3504 is a three-bit counter whose count always indicates which syllable of which program storage register PSR1 100 to 103 or PSR2, 104 to 107 is next fetched. Because of its importance in the control of operation, it is disussed under a separate heading. The program syllable counter comprises three flip flops: PS1, PS2, and PS3; and as stated, indicates which of the eight possible program syllables in the program storage registers 100 to 103 or 104 to 107, (see FIG. 1), are to be used next. Normally, the counter is reset to 011. This count 011 indicates that the most significant syllable of the program storage register 100 to 103 is next to be fetched. When the most significant syllable has been fetched, the counter is decremented to 010 to permit fetch of the next most significant syllable of the PSR1 program storage register 100 to 103. In like manner, counts 001 and 000 are used to fetch the next least and least significant syllable of PSR1 program syllable register 1, 100 to 103. If the program storage register number 2, 104 to 107 stores an unused program word, (overlap has occurred), the counter is next decremented to 111 and the most significant syllable of program storage register 2, 104 to 107 is next fetched. In a like manner, counts of 110, 101, and 100 are used to fetch the remaining syllables of the program storage register 2, 104 to 107. If the program storage register #2, 104 to 107 is empty, (no overlap), the program syllable address counter 3504 is reset to 011.

Now continue with the description of the other control unit means illustrated in FIG. 4. The phase distributor 3501 determines which phase is being executed. The phase distributor lights (PH1–6) on the panel indicates which phase is being executed, except that in single-phase operation they indicate the next phase to be executed. The stack address counter 3508 (SA1–2) determines which of the four stack levels is currently at the top of the stack. The up-down (RSF) flip flop 3543 changes state for a reversal of stack. The overflow flip-flop unit 3544 comprises three flip-flops: a POV flip-flop set when program overflow occurs (arithmetic result too large to be represented), a PUN flip-flop set when program underflow occurs (floating point result too small to be represented), and a PNN flip-flop set when either or both operands are a float-point instruction not normalized. This is also referred to hereinafter as the program not normalized flip-flop.

The command control flip-flop unit comprises five flip-flop circuits, interrupt power failure (IPF), update Real Time Clock (IRT), Enter control mode (IRJ), Repeat (RPF), and Iterate (FRP). The IPF command control flip-flop is set when power failure has occurred. Upon power failure all control flip-flops must be stored. The IRT command control flip-flop is set when the real-time clock must be updated. The IRJ command control flip-flop is set for preparation to enter into the control mode. The RPF command control flip-flop is set for a repeated instruction being executed. The FRP command control flip-flop is set for going through the first iteration of a repeat instruction.

A shift counter 3546 (D1–6; DZ) is provided and the control panel lights indicate the shift count, the DZ flip-flop being for a count of zero.

A program register full flip-flop unit 3505 comprising two program full flip-flops PF1 and PF2 is provided. The program full flip-flop PF1 is set when the program storage register PSR1, 100 to 103 (FIG. 1) has unused syllables of program word in it. Program full flip-flop PF1 of program register full flip-flop unit 3505 is reset when all four syllables of the first program storage register #1 (PSR1) 100 to 103 in thin-film registers 3001, (see FIG. 1) have been used. The second program register full flip-flop PF2 is set when the program storage register #2 (PSR2) 104 to 107 has unused syllables of program words in it. PF2 of programs full flip-flop unit 3505 is reset when all four syllables of the second program storage register (PSR2) 104 to 107 have been used.

A timing distributor 3502 as mentioned above (see FIG. 88 and FIG. 4) is provided. In the FIG. 4 representation of indicators corresponding to timing distributor 3502, the lights T1–T15 corresponding to the T1–T15 flip-flops indicate in accordance with the light which is lit which decimal T time is being executed. All lights out indicates time zero.

The memory timing counter 3503 (TC1–5; TMZ) is a flip-flop counter which counts specific memory time. TMZ2 light lit indicates memory not being used. (TC1–5 lights should be out) TMZ light out indicates memory in use and TC1–5 lights indicate (binary) specific memory time. When the TC1 flip-flop light is lit, it indicates memory read taking place. The TC1 and TMZ flip-flops light indicators when out (reset condition of TC1 and TMZ flip-flops) indicate that a write is taking place.

A miscellaneous control unit 3548 comprising AES, BRF, and IAF flip flops is provided. The AES control flip flop is set when the contents of the A register 3033 (see FIGS. 1 and 2) are equal to the contents of the top of the stack. The BRF control flip flop is set when the condition for branch has occurred and the program will branch with the next branch syllable. The IAF control flip flop is set when an indirect address is called for. These three flip flops AES, BRF, and IAF comprise the miscellaneous control flip flops 3548.

Master control flip flops (MC1–5) all provide for internal control. The mechanization charts incorporated hereinbelow give the individual uses of each of these flip flops.

An input syllable counter 3506 (IS1–2) is provided for inserting a 4-syllable memory program word into the thin-film memory 3001. It comprises IS1 and IS2 flip flops.

A C register 3034 (C1–C12) is a 12-bit data register in the arithmetic unit which will be described in detail hereinbelow. The external request mask register indicator (P1–16) for mask register 3016 (see FIG. 1) indicates that an external request is associated with the particular bit whose light is lit (set to a one state) and that this request will be allowed to interrupt the computer. An interrupt flip flop 3550 is provided and when set, (the light is lit), it indicates that at least one interrupt condition has occurred.

A thin-film insert (FIC) flip flop 3509 is set for "write" into thin film occurring and reset when either read from thin-film occurs or thin film is not being used.

A memory control flip flop unit 3551 comprises RFF, IOA, IOB, and PAR flip flops. The RFF flip flop is set when the computer requests access to thin memory. The IOA flip flop is set upon an I/O descriptor request to I/O bus "A." The IOB flip flop is set upon I/O descriptor request to I/O bus "B." The PAR flip flop indicator is lit to indicate odd parity in a memory word up to bit not including the syllable now in the memory module memory information register (described in the aforementioned application for Computer System of Anderson, Hoffman, Mott, Pezely, Shifman, and Wilkinson), and is reset for even parity under the same condition.

Indicating means are provided on the control panel of FIG. 4 for the upper memory bound register (X1–8) 3012 and lower memory bound register (Y1–8) 3013 which set upper and lower limits respectively of main memory in which the computer can write. Neither register is used in the control mode.

Indicating lights corresponding to the respective registers are provided on the control panel of FIG. 4 for the L and M registers 3006, 3007, the thin-film data or K and E register 3004, 3005, the thin-film address register 3510 (FAR 1–7) and the Q portion of the mask register 3016 for bits Q3, 5, 9, 11, and 12.

The interrupt register 3002 (see FIG. 1) has a corresponding indicator provided on the control panel (FIG. 4) wherein when a light is on an interrupt condition has occurred and the corresponding mask bit if any is set. Interrupt conditions are listed in order, highest priority first. Bit 1 (PF) light when lit indicates return from power failure. Bit 2 (ER) when lit indicates external request (masked by external request mask register 3016). All interrupts are recognized in normal mode only. Bit 3 (I/O) when lit indicates an I/O descriptor has been returned. Bit 4 (ICN) when lit indicates interrupt by another computer. Bit 5 (RT) when lit indicates real time clock overflow. Bit 6 (MB) when lit indicates attempt to write out of bounds in main memory in normal mode. Bit 7 (II) when lit indicates illegal instruction. Bit 8 (PE) in lit condition indicates parity error, or no response to a memory request for at least 10 milliseconds. Bit 9 (OV) is lit to indicate overflow at the end of an arithmetic instruction. Bit 10 (NH) is lit to indicate halt in normal mode or snag bit in an indirect addressed word.

OPERATIONAL PHASES

Referring again to FIG. 4, a phase distributor 3501 and a timing distributor 3502 are provided. Phase distributor 3501 and timing distributor 3502 have been discussed hereinabove in the description of the Computer Control portion. The phase distributor 3501 is shown in detail in FIG. 87 and the timing distributor is shown in detail in FIG. 88.

In execution, each instruction is implemented using at least one and not more than six phases. Each phase takes care of executing a portion of an instruction so that the total instruction is fully executed in this given number of phases from one to six. The usual procedure is to progress from phase one, to phase two, to phase three, to phase four, to phase five and then to phase six, if six phases are necessary. All computer instructions are executed using a minimum of one phase in the case of a no-address instruction and a maximum of six phases for certain three-address instructions. In general, the phase functions are as follows:

(1) Phase Zero (PH0): This is the state assumed by the computer immediately after the power on or clear button has been depressed. If the automatic program start switch is on, the computer will attempt to start automatically. This phase is used mainly for manual read-from or write-into thin-film memory 3001 in setting up the program.

(2) Phase one (PH1): In general, this phase is used to fetch the operator syllable from the program storage register (PSR) 100 to 103 or 104 to 107 and to store this operator syllable in the function (F) register 3015 (see FIG. 1). Subsequent coding of this syllable in the function register 3015 determines the instructions to be executed. As shown in FIG. 1, this syllable transfer occurs through the E register 3005 into the function register 3015.

(3) Phase two (PH2): Depending upon the instruction, this phase is used to (a) fetch an operand (48-bit data word) from the main memory or from the stack 3099 and store this operand in the A register 3033 (see FIG. 1); (b) store a result (48-bit data word) in the main memory or the stack 3099; (c) fetch a branch program word from the main memory and store this branch program word in the program storage register (PSR #1 or 2, 100 to 103, or PSR 104 to 107); (d) fetch a special syllable from the program storage register 100 to 103 or 104 to 107 (PSR #1 or PSR #2) and store this special syllable in the appropriate working register.

(4) Phase three (PH3): Reserved for "execute" portion of some instructions.

(5) Phase four (PH4): Similar to phase two except that the second operand fetched from the main memory or the stack 3099 is stored in the B register 3031, (see FIGS. 1 and 2).

(6) Phase five (PH5): This phase is also reserved for the "execute" portion of some instructions.

(7) Phase six (PH6): Depending upon the instruction, this phase is used to: (a) store a result from the A register 3033; (b) fetch a branch program word from the main memory and store this branch program word in the program storage register (PSR #1 or PSR #2) 100 to 103 or 104 to 107. The progression from phase one to phase six is shown by phase distributor 3501 in FIG. 4. This indicates each of six phase flip-flops which are set for the corresponding phase operations by the successful completion of the previous phase.

In each phase the timing distributor 3502 (see FIG. 88) is used to implement each sequential step of the phase. At the end of each phase, the timing distributor is reset to time $T_1$. The timing distributor (see FIG. 88) comprises a shift register of 15 flip-flops which correspond respectively to times $T_1$ to $T_{15}$. The timing distributor operates at the computer clock rate of three megacycles and hence each T time is one-third of a microsecond long. However, it may be desired to remain at $T_1$ time for a period longer than one-third microsecond and, in fact, as long as desired. For example, it may be desired to remain in $T_1$ in order to jump into a memory cycle to fetch a program word and store the program word in one of the two programs storage registers 100 to 103, or 104 to 107. In order to hold up in $T_1$, the timing distributor shift register is inhibited from shifting for the desired number of clock pulses necessary to accomplish the execution of the particular function desired. This is done automatically by the wiring of the sub-command matrix 3020. In the case of fetching a program word from memory, for example, the memory timing counter 3503 (see FIGS. 4 and 90) is used in conjunction with the timing distributor 3502. The memory timing counter 3503 (FIG. 90) is an actual counter and each time it counts up one, the time is decoded from the memory timing counter 3503 itself as time TM3 through time TM8 for a write operation and time TM15 or TM19 through time TM28 for a read operation. Entry into memory timing counter 3503 may be effected at TM3, TM15 or TM19 and will depend upon the particular operation to be performed. For example, in the case of a memory fetch, entry would be into memory time TM15 in the timing counter and the timing counter would proceed to count up until time TM28 during which time the timing distributor 3502 (FIG. 88) would be held in the particular time at which it was at which would be T1 or T2. A program word, for example, is fetched at time T1 or T2. A data word is fetched while T15 in the timing distributor 3502 is being held. This is built automatically into the machine. At the completion of each phase the timing distributor 3502 is reset to time T1. Although in any straight cycling through the time distributor 3502, there is a limit of 15 pulses; actually this can be much longer since a jump can be executed to recycle back to a prior time at any point of the timing sequence. The exact sequence will be described hereinafter in the implementation discussion of particular instructions. A program syllable address counter 3504 is provided to address in sequence the syllables from the program storage registers, PSR1 and PSR2 100 to 103 and 104 to 107. That is, in sequence either the program storage register #1 PSR1 100 to 103 has its syllables 103, 102, 101, and 100 addressed in sequence or the program storage register #2, PSR2, 104 to 107 has its syllable registers 107, 106, 105, and 104 addressed in the latter sequence.

There are two program register full flip-flops 3505 (PF1 and PF2) which determine which program storage register 100 to 103 or 104 to 107 is in use. When the program full #1 or PF1 flip flop of program register full flip flops 3505 is set, this indicates that the program storage register #1 containing syllable registers 100 to 103 is either full or is being used. When the program full flip-flop #2 or PF2 flip-flop is set, this indicates that the program register #2 containing syllable registers 104 to 107 is either full or is being used. These flip-flops are set automatically by the condition of each of the program storage registers PSR1 and PSR2, 100 to 103 and 104 to 107. Both program storage registers 100 to 103 and also 104 to 107 are used, and hence, both flip flops PF1 and PF2 of unit 3505 are set only during an overlap condition. In the absence of an overlap condition, only program storage register #1, 100 to 103 is in use or full. When both flip-flops PF1 and PF2 of program register full unit 3505 are in reset condition, this indicates that neither program storage registers is either in use or full, or it indicates that it is necessary to fetch a new program word from memory. That is, when all of the syllables have been read out of the program storage registers 100 to 103 and 104 to 107 and both are empty, this is the signal to fetch the next program word from memory.

It should be emphasized that the stack 3099 is used in this machine only to contain data words, not program words. That is, the stack could be used to contain program words temporarily if these words are treated as data words, but in execution of the program, the program words must be drawn from memory into the program storage registers 100 to 103 and 104 to 107.

In fetching a program word from memory, the input syllable counter 3506 is used to count the syllables entering into the program storage registers 100 to 103 and 104 to 107. The counter 3506 counts from zero up to three and then is reset into the zero state. This is for the four syllables 100 to 103 or 104 to 107 of program storage registers PSR1 and PSR2. The input syllable counter 3506 insures that the least significant syllable is received from memory first and stored in the least significant syllable portion of the program storage register 100 to 103 or 104 to 107. Thus, on the first count, the least significant portion of data contained in the address in memory which is addressed is shifted into portion 100 of the program storage register #1, 100 to 103 or portion 104 of the program storage register #2, 104 to 107. Thus, the most significant syllable in the memory location of the word goes into the most significant syllable 103 of program storage register #1, 100 to 103 or the most significant syllable 107 of the program storage register #2, 104 to 107. As stated hereinabove, the program register full flip-flops 3505 determine which program storage register, 100 to 103 or 104 to 107, the word from memory is to enter. In taking information from the program storage registers 100 to 103 and 104 to 107, the most significant syllable of the program word is addressed first and taken out with the help of the program syllable flip-flops 3504. In order to effect this, whenever a fetch from the program storage register 100 to 103 or 104 to 107 is to occur, the program syllable address register 3504 which comprises 3 flip flops is set to binary 011 or 3. As each syllable is fetched from the program storage register 100 to 103 or 104 to 107, the program syllable address counter 3504 is decreased by one so that the next most significant syllable can be addressed and fetched.

A syllable counter 3507 is provided to count the syllables of data words fetched or stored from or into memory or stack 3099. This fetching is accomplished in the case of fetching the word from memory by fetching the data word and sending it through the L and M registers 3006, 3007 into the A register 3033 or B register 3031. The first operand drawn always goes into the A register 3033, and the second operand drawn from memory always goes into the B register 3031, in this fetch from memory operation. In the case of fetching from the stack 3099, the fetching of the data word is via the K and E register 3004, 3005 into the A or B register 3033 or 3031, also depending upon whether the word is the first operand or the second operand. This is effected by the timing, for example, if an operand is required in phase 2, this must be the first operand and the gates are opened into the A register 3033. In phase 4, if an operand is required, it must be the second operand and the gates are opened into the B register 3031. As described elsewhere, the B register is merely a shift register which shifts one syllable or 12 bits at a time receiving the information from either the K and E register 3004, 3005 or the L and M register 3006, 3007 and transferring the information until the 48 bits are accumulated in the B register 3031. The arithmetic unit 3030 operates by taking the contents, the operand in the A register 3033 and the operand in the B register 3031 and performing the function in the adder 3032, putting the result in the A register 3033. The syllable counter 3507 counts from 0 to 3 for data words just as the input syllable counter 3506 counts from 0 to 3 for syllables of program words.

A stack address counter 3508 determines which one of the four stacks 140 to 143, 144 to 147, 150 to 153, or 154 to 157 is involved in a fetch or a store operation at a given instant. When involved in such a store or fetch operation, the particular stack of these four stacks will be directly under the reading or writing head.

This is illustrated in FIGS. 6A and 6B. As illustrated in FIG. 6A and FIG. 6B, the stack counter 3508 is counted in the store direction or the fetch direction, as indicated by the arrows in FIG. 6B. When a store operation is called for, the rotation of the stack is in the clockwise direction, that is, counting of the counter 3508 is effected from stack 1 to stack 4 then to stack 3 and then to stack 2. When a fetch operation is called for, then counting is effected in a counterclockwise direction as shown in FIG. 6B. That is, the counter is counted from stack 1 to stack 2, to stack 3, to stack 4 respectively. By analogy, it is the stack 3099 which is moved and the read head is stationary. The moving of the stack 3099 is symbolized by the counting of the stack address counter 3508.

As indicated in FIG. 1, in the thin-film addresses 3001 the stack addresses are sequential from 140 to 157. The most significant three bits of the stack address is encoded in the thin-film address register 3510. The next two bits are made up with the stack address counter 3508. The last two bits which vary from zero to three are made up with the syllable counter 3507. That is, every time data is transferred into or out of the arithmetic unit 3030, the syllable counter 3507 is stepped up accordingly. Thus, in storing in the thin-film stack 3099 from the arithmetic A register 3033, the least significant 12 bits, that is, the least significant syllable 3033D of the A register 3033 as shown in FIG. 2, if transferred to the address, zero must be transferred into stack address 140. Then the second least significant syllable of 12 bits is transferred from the A register 3033 into stack syllable 141 of stack register 140 to 143, the next significant syllable from the A register 3033 is transferred to stack syllable 142 and the most significant syllable in the A register 3033 is transferred into syllable 143 in the zero stack register 140 to 143.

The operations involved in actually inserting information into the stack 3099 will be discussed later in detail in conjunction with a description of a sample program. However, for purposes for immediate explanation, a transfer from the A register 3033 into the stack 3099 is accomplished by at least one stack being addressed in the last 6 bits of an instruction word in the operator syllable. The thin-film address register 3510 is opened to receiving an instruction into thin-film memory 3001 by the first three flip-flops being set to the state 110 in the first three bits which is encoded into the thin-film register 3510 from thin-film address gating 3018. That is, an address stack signal (ASTP) occurs during any operation when thin-film memory 3001 is addressed and is a subcommand generated in the subcommand matrix 3020 whenever an operation syllable which involves addressing stack occurs. The subcommand matrix 3020 through the thin-film address gating 3018 causes the first three flip-flops in the thin-film address register 3510 to become set to the ONE, ONE and ZERO (1, 1 and 0) states, respectively. The next two flip-flops of the thin-film address register 3510 are set respectively to 00, 01, 10, or 11 depending upon the stack address which is in stack address counter 3508. The last two flip-flops of the thin-film address regsiter 3510 are set into respective states 00, 01, 10, or 11 determined by the syllable counter 3507 shown in FIG. 4. This occurs only when address stack is indicated by the sub-command matrix 3020 which is responsive to a program word in which stack 3099 is involved. All other addressing of other thin-film registers will not have a 110 state set in the first three bits of the thin-film address register 3510 by the sub-command matrix and controls unit 3020. The address register 3510 is shown in FIG. 1 and in FIG. 4.

Shown in FIG. 4 is also the thin-film insert flip flop 3509. When set into the one state flip flop 3509 it causes new data to be inserted in thin-film memory 3001 at the address called for by the thin-film address register 3510. Thus, when the thin-film insert flip-flop 3509 is set into the ONE state, it enables the information present in the K and E registers 3004 and 3005 of FIG. 1 to be stored in the thin-film register, the lines to which are opened by the particular address stored at that time in the thin-film address register 3510. If, however, the thin-film insert flip-flop FF 3509 is in the ZERO state, the data which is in a particular thin-film register in thin-film memory 3001 as determined by the thin-film address register 3510 setting, is transferred out of that particular thin-film register which is addressed and sent into the K and E registers 3004 and 3005. At the same time, with setting into the ZERO state of flip flop 3509, information is copied back into the thin-film register from which it is being taken by virtue of the fact that the information while being read to the K and E register 3004 and 3005 is also shifted back into the particular register indicated by the thin-film address register 3510.

Writing in thin-film memory 3001 is done in one pulse time in the illustrative embodiment machine which is in one-third of a microsecond. However, reading takes two pulse times, one pulse time to address and one pulse time to actually read the information into the K and E register 3004 and 3005. The circuits of the thin-film registers and their operation are discussed in aforementioned copending patent application, Ser. No. 226,895 of Albert M. Bates for Magnetic Memory System. Each of the registers in the thin-film register portion 3001 are individually addressed by encoding from the subcommand matrix and controls section 3020 to set the thin-film address register 3510 in accordance with the particular subcommand. This subcommand setting occurs in accordance with the particular command called for and in accordance with the phase responsive to the set which is responsive to the command called for in the operator syllable.

ARITHMETIC UNIT

Refer to FIG. 2, the block diagram of the arithmetic unit 3030. The arithmetic unit comprises a 48-bit A flip-flop register 3033 and a 48-bit flip flop B register 3031 with an adder 3032 interposed between them, plus a 12-bit C register 3034. It also comprises field selection logic, and special shift-data paths associated with the A register (paths logic not numbered). The A register 3033 stores the augend, minuend, product or dividend during add, subtract, multiply or divide operations. The B register 3031 stores addend, subtrahend, multiplicand, or divisor during add, subtract, multiply or divide operations. The C register 3034 stores the multiplier or quotient during multiply or divide operations. The A register 3033 can be shifted in optimum combinations of 12, 6 or 1 places to the right and iteratively to the left. The B register 3031 can be shifted iteratively to the right by 12 places. The C register 3034 can be shifted iteratively left or right by one place.

Now refer again to the block diagram of FIG. 2 which shows the arithmetic unit 3030 in greater detail. The A register 3033 and the B register 3031 are shown in 12-bit segments, 3033A, 3033B, 3033C, 3033D, and 3031A, 3031B, 3031C and 3031D, respectively. This is the syllable structure of the transfers effected. All transfers are effected 12 bits at a time serially, 4 times for a total of 48 bits. This is serial-parallel transfer. Data is received either by the A register 3033 or the B register 3031 the least significant 12 bits being transferred into and out of these registers first. On the input transfer, the least significant 12 bits are first transferred into the most significant syllable of the register, 3033A or 3031A respectively. On subsequent transfers of 12 bits into registers 3033A and 3031A, the 12 bits in those registers are transferred at the same time into respective registers 3033B and 3031B. In subsequent transfers simultaneously with a new 12 bit transfer, for example, into most significant syllable register 3033A and subsequent transfer out of next most significant register 3033B, the bits from second most significant register 3033B are successively transferred into third most significant register 3033C and thence on the fourth transfer into register 3033D. This occurs similarly with the registers 3031A, 3031B, 3031C and 3031D of the B register. On transferring data out of the A register 3033 and the B register 3031, the converse takes place. That is, for example, looking at the A register 3033, transfers effected out of the least significant syllable register 3033D of its contents simultaneously will shift from the second 12 least significant bits in register 3033C into the least significant register 3033D. There is no transfer out of register B, but only an end around shift. All results always end up in the A register from whence they are transferred into storage. At the end of any instruction, the result always ends up in either the thin-film memory stack 140 to 143, 144 to 147, 150 to 153, 154 to 157 or in a memory module. The syllable in the function register 3015 indicates whether transfers are to be effected into stack or into a memory module (according to the last indicator). Which one of the stacks is determined by the stack counter 3508 which will be hereinafter described in detail. If indicated as a memory transfer, there will be a program memory syllable to indicate the address in memory to which transfer from the arithmetic unit 3030 is to be effected. The operator syllable structure and the indicators which determine such transfer will be discussed hereinafter.

Referring to the C register 3034 this is a 12 bit register which accumulates data during the arithmetic operations. Each time it accumulates 12 bits as hereinbefore described, it transfers the 12 bits into the thin-film C register 124 to 127. This occurs four times until 48 bits are transferred from the C register 3034 into the thin-film C register 124 to 127. The C register 3034 is used to hold the multiplier for the multiply instruction. When it uses 12 bits of the multiplier, upon transferring the first 12 bits into the thin-film C register 124 to 127 it simultaneously retrieves the next 12 bits from the thin-film C register 124–127. That is, there is a circular transfer wherein the unoperated portions in the thin-film register 124 to 127 are transferred into the C register 3034, and upon operation the results are transferred back from the C register 3034 into the thin-film C register 124 to 127. In the double shift, there is a double precision when it is desired to shift the entire 96 bits of a 2 word result where in double precision arithmetic, a 96 bit result rather than a 48 bit result is to be obtained. Use of the C register 3034 and the thin-film C register 124 to 127 is made when a double shift is required. The C register 3034, of course, operates under the control of the subcommand matrix 3020 as will be hereinafter described in order to effect the multiply, divide or double shift instruction, as indicated.

The A register 3033 stores 48 bits. For logical purposes, it may be thought of as two sections, 1W and 2W. Section 1W includes bits 1 through 12. Section 2W includes bits 13 through 48. Most of the subcommands affect both sections, but certain subcommands affect only bits 1 through 12 (1W) or bits 13 through 48 (2W) only.

The following subcommands affect both sections (1W and 2W) in the A register 3033:

(1) *Shift Left A* (*SHLA*): Shift left A enables the A register 3033 to shift left one place. Consequently, the next significant bit is gated with shift left A except for bit 1 and bit 48. Whether bit 2 is shifted into bit 1 is determined by the data shift path logic (i.e., by the type of shift). Bit 48 is reset if the shift is end-off (EO). The end-off shift is effected by bringing zero in the last place. Bit A1 shifts into bit A48 of the shift is end-around logical (EAL). Bit A2 shifts into A48 if the shift is end-around not logical (EANL).

(2) *Shift Right A by One* (*SH1*): This enables the shift right by one gates where, except for bits 1 and 2, the next most significant bit is gated with this signal. What is placed in bits land 2 is determined by the shift path logic.

(3) *Shift Right A by Six* (*SH6*): This enables the shift right by six gates where, except for bits 1 through 7, the bit six places more significant is gated with this signal. What is placed in bits 1 through 7 is determined by the shift path logic.

(4) *Shift Right A by 12* (*SH12*): This enables the shift-right by 12 gates where, except for bits 1 through 13, the bit 12 places more significant is gated with this signal. The shift data path logic determines what is placed in bits 1 through 13.

LOGICAL AND (LAND)

This places the function $A\cdot B$ into $A$. The AND function is accomplished by resetting A register bit $n$ where $A_n\cdot B_n$ is not true. If $A_n$ is already zero, reset is unnecessary. If $A_n$ is a one, then $A_n$ must be reset if $B_n$ is zero.

LOGICAL OR (OR)

OR places the function $A+B$ into the A register. The OR function is performed by setting A bit $n$ if $A_n+B_n$ is true. If $A_n$ is already ONE, $A_n$ need not be set. If $A_n$ is zero, then $A_n$ must be set only if $B_n$ is set.

LOGICAL EXCLUSIVE OR (XOR)

This places the function $A+B$ into A. The exclusive-OR function is expressed: $A_n+B_n=A_n\cdot\bar{B}_n+\bar{A}_n\cdot B_n$. If $A_n\bar{B}_n$ exists, $A_n$ must be reset or if $\bar{A}_nB_n$ exists, $A_n$ must be set; therefore, exclusive-OR is accomplished by complementing $A_n$ if $B_n$ is a ONE.

SIGNALS AFFECTING THE SECOND PORTION (2W) ONLY (A REGISTER BITS A13 THROUGH A48

Complement 2W (CMP2W): This signal complements bits A13 through A48 of A register 3033.

Full Add 2W (FA2W): This enters the sum of A register 3033 bits A13 through A48, and B register 3031 bits B13 through B48 into the A register 3033 bits A13 through A48. The output of the adder 3032 determines whether the A register bit is to be complemented.

Reset 2W (R2W): This allows A register 3033 bits A13 to A48 to reset if signal IRCAX ($X=0$ to 7) is true. This signal is normally true unless a field is being selected (see Character Selection Logic.)

Transfer External Request Lines to A Register (TERLA): This enables the 16 external request lines, which enter the computer from terminal equipment, to be transferred to bits A33 to A48 of the A register 3033.

SIGNAL AFFECTING 1W PORTION (BITS 1 TO 12 OF A REGISTER)

Complement 1W (CMP1W). Complements bits A1 through A12 of A register.

Full add 1W (FA1W): This enables the sum of A and B bits 2 through 12 to enter A register 3033 bits A2 through A12.

Reset 1W (R1W): This resets all A register 3033 bits A1 through A12 if signal IRCAX ($X=0$ to 7) is true, which is generally the case, unless a field is being selected (see Character Selection Logic).

Set 1W (S1W): This signal sets bits A1 through A12 of the A register 3033.

Transfer the contents of the B register to the A register (TBA): This transfers the least significant syllable of the B register 3031, bits B37 to B48, to bits A1 through A12 in the A register 3033.

Transfer C register to A register (TCA): This transfers bits C1 to C12 of the C register 3034 into the correponding bit positions in the A register 3033.

Transfer E register to A register (TEA): This transfers the 12 bits in the E register 3005 to the corresponding bit positions in the A register 3033.

Transfer K register to A register (TKA): This transfers bits K1 to K4 of register K 3004 into bits A1 to A4 of the A register 3033.

Transfer M register contents to A register contents (TMA): This transfers bits M1 through M12 in the M register 300 to A register 3033 bit positions A1 through A12.

ADDER

The adder 3032 complements an A register 3033 bit to produce the sum. It provides a carry by two's scheme.

SHIFT DATA PATH LOGIC

The shift data path logic controls the end-around data paths for each of the variations of the shift instruction. The following table lists each data path variations and the data path taken:

| | SHIFT DIRECTION AND MAGNITUDE | | | |
|---|---|---|---|---|
| TYPE | RIGHT ONE | RIGHT SIX | RIGHT TWELVE | LEFT ONE |
| END OFF (EO) Logical (LOG) | 0→A1<br>A1→A2 . . A47→A48 | 0→A1 through A6<br>A1 through A6→ A7 through A12<br>⋮<br>A37 through A42→A43 through A48 | 0→A1 through A12<br>A1 through A12→A13 through A24<br>⋮<br>A25 through A36→A37 through A48 | 0→A48→ A47<br>A3→A2→A1 |
| END AROUND LOGICAL (EAL) | A48→A1→ A2 . . . A47→ A48 | A43 through A48→A1 through A46<br>⋮<br>A37 through A42→A43 through A48 | A37 through A48→A1 through A12<br>⋮<br>A25 through A36→A37 through A48 | A1→A48→ A47 . . . A2→A1 |
| END AROUND ARITHMETIC (EANL) | A48→A2→ A3 . . . A47→A48 | A43 through A48→A2 through A7<br>⋮<br>A2 through A7→ A8 through A13<br>⋮<br>A37 through A42→A43 through A48 | A37 through A48→A2 through A13<br>A2 through A13 →A14 through A25<br>A25 through A36→A37 through A48 | A2→A48→ A47 . . . A3→A2 |
| END OFF ARITHMETIC (EONL) | 0→A2→A3 . . . A47→ A48 | 0→A2 through A7<br>A2 through A7 →A8 through A13<br>⋮<br>A37 through A42→A43 through A48 | 0→A2 through A13<br>A2 through A13 →A14 through A25<br>⋮<br>A25 through A36→A37 through A48 | 0→A48→ A47 . . . A63→A2 |

CHARACTER SELECTION LOGIC

A 48-bit word may be considered as eight 6-bit characters numbered 0 through 7 respectively, as follows:

| | | | | | | | | |
|---|---|---|---|---|---|---|---|---|
| Bits: | 123456 | 7. . .12 | 13. . .18 | 19. . .24 | 25. . .30 | 31. . .36 | 37. . .42 | 43. . .48 |
| Character: | 0 | 1 | 2 | 3 | 4 | 5 | 6 | 7 |

The yield syllable (F) defines the field to be selected. This field is kept (Strip) or eliminated (Insert) depending on the instruction execution.

Bits 10 to 12 of the field syllable (F) define the starting position of the field. Bits 6, 7 and 8 of the field syllable define the character length of the field.

The field length and starting position are encoded to choose a particular character or set of characters. The character(s) comprising the defined field may be reset, or, the character(s) outside the defined field may be reset, the two possibilities being termed "insert" and "strip" respectively. Resetting the defined field inserts a hole of ZERO's into the eight character word. Resetting characters outside the defined field strips away to ZERO all information surrounding the defined field.

B REGISTER

The B register 3031 (see FIGS. 1 and 2) contains the second operand in a two operand instruction. As in the A register 3033, the B register 3031 is divided into two parts 1Z comprising bits B1 through B12 and 2Z bits B13 to B48. The second section 2Z shifts by 12. The first section 1Z receives information from other registers. The subcommand signals into the first section 1Z (bits B1 through B12) are:

(1) TAB (Transfer A to B): Transfer bits A37 through A48 of the A register 3033 into the bits B1 through B12 of the B register 3031;

(2) TEB (Transfer E to B): Transfer the 12 bits of the E register 3005 E1 through E12 into B register 3031 bits B1 through B12;

(3) TMB (Transfer M to B): Transfer M register 3007 bits M1 through M12 into B register 3031 bits B1 through B12;

(4) SHBEA (Shift B End Around): B register 3031 bits B37 through B48 are transferred into bits B1 through B12;

(5) R1Z (Reset 1Z): Resets B1 through B12 bits of B register 3031.

C REGISTER

The 12 bit C register 3034 (see FIG. 2) acts as a buffer between the thin-film C register 124 to 127 (see FIG. 1) and the arithmetic unit 3030. Each syllable of data is manipulated in the C register 3034 before being placed in the thin film C register 124 to 127. As a manipulated syllable is transferred from the C register 3034 into the thin-film C register 124 to 127, the next syllable to be manipulated is transferred into the C register 3034.

The subcommands into the C register 3034 are:

(1) TAC (Transfer A to C): Transfer bits A1 through A12 of A register 3033 to bits C1 through C12 of C register 3034;

(2) TBC (Transfer B to C): Transfer bits B1 through B12 of the B register 3031 to bits C1 through C12 of the C register 3034;

(3) TEC (Transfer E to C): Transfer bits E1 through E12 of E register 3005 to bit positions C1 through C12 of the C register 3034;

(4) SHLC (Shift Left C): Shift C register 3034 contents left one place, letting bit C12 remain unchanged;

(5) SHRC (Shift Right C): Shift C register 3034 contents right one place, letting bit C1 remain unchanged;

(6) RC (Reset C): Reset C register 3034 to Zero.

Transfer into particular bits may be utilized with the shift subcommands such as: TMCZC1, transfer the MC flip flop to C1 (C register bit 1), TA48C1, transfer A register 3033 bit A48 to the C register 3034 in bit position C1, and TMC3C12, transfer the master control flip flop 3 state to bit position C12 of the C register 3034.

PROGRAMMING AND COMPUTER OPERATION

The present invention provides means and method whereby the computer program consists of a syllable string. A syllable consists of 12 bits. The syllables include operator syllables, index syllables, variant syllables, which are variations of the command syllable and address syllables. The operator syllable comprises 12 bits, 6 bits of which are a command or instruction syllable, and three 2-bit address indicators. The code of the 2-bit address indicators has been described hereinabove wherein 00 indicates stack (or no address) with normal stack stepping, 01 indicates operand referenced to stack and stack hold, 10 indicates an unindexed syllable follows, and 11 indicates that an indexed syllable follows (comprising an indexed syllable followed by any other syllable, to which it is applied).

The index syllable comprises three 4-bit index register addresses. These are the addresses of the index registers to be added to the relative address syllable plus the contents of the base address register 055 or of the base program register 054. The address indicators of the operator syllable indicate whether or not there are contents of any index registers to be added to the relative address syllable plus either the base address register 055 contents or the base program register 054 contents. All syllables can be indexed except the operator syllable and the program syllables of a repeated instruction. As an example, it is possible to index the variant syllables of the shift instruction. Thus, if indexing is indicated, the syllable string consists of the operator syllable, followed by the index syllable and then followed by the address syllable for the first address. That is, following the command portion 6 bits of the operator syllable is the indicator for the first address, then the indicator for the second address, and then the indicator for the third address. Then follows the second syllable which comprises the index syllable if called for by the first address indicator, then the address syllable, if called for by the first indicator. Then follows the second index syllable, if called for by the second indicator, then followed by the second address syllable if called for by the second indicator in the first or operator syllable. Then follows the third index address if called for by the third indicator in the operator syllable, and then followed by the third address syllable if a third address syllable is called for by the third indicator in the operator syllable. This is the word format which may have a maximum of seven syllables counting the operator syllable and a maximum of three index syllables and of three address syllables. Therefore, to execute an instruction, from one to seven syllables may be used.

In operation of the computer, the programmer therefore writes the operator syllable and the other syllables which may be required in a given word. He writes the words in sequence. This program may be, for example, written on punched tape. The punched tape can be read in from the "Flexowriter" or from the punched tape reader. The program may be unloaded into a predetermined portion of memory under program control by means of an automatic operating and scheduling system which incorporates an automatic operating and scheduling control (AOSP) means. That is, as called for by the automatic and scheduling system, the particular programs are loaded into predetermined portions of memory in accordance with the operating and scheduling program. The Automatic Scheduling and Operating System is fully described in the aforementioned patent application for Computer System of Anderson, Hoffman, Mott, Pezeley, Shifman and Wilkinson. The AOSP is originally loaded into memory manually from the I/O control panel by setting up the switches on the control panel to simulate an input descriptor. This descriptor sends a signal to the flexowriter or to the tape reader whichever is being used to unload the AOSP into memory. The descriptor sent contains the information which tells what device is to do the unloading of the AOSP and which determines whether this is an input or an output operation. It also contains the number of words or of records to be loaded into memory. It further contains the starting address of memory into which the AOSP is to be loaded. After being loaded and the machine is started up, the AOSP at the proper point in its program causes a particular program to be unloaded in a predetermined portion in memory in accordance with the AOSP. This unloaded program comprises words as described hereinabove which contains strings of syllables including a first operator syllable and as many addresses as are called for by the indicators in the operator syllable.

The computer is originally started by manually loading from the computer control panel the base program register 054 contents, the base address register 055 contents, and the contents of the program count register 057. The programmer must set up these three registers 054, 055, and 057. These may be loaded manually or alternatively just the program count register 057 may be started, and if the first thing that the program does is to load the base program register and the base address register, this method can be used to load the base program register 054, the base address register 055, and the program count register 057 into thin-film memory. What happens is that the contents of the program count register 057 are loaded into the base address register 055 and into the base program register 054. Therefore, at the start of operation, the contents of the program count register 057 are manually set up in that register 057. Following that, on the program count register plus one count, the program may have a store thin-film into stack instruction (STF→STACK).

STF→STACK takes two syllables. There is a two-syllable instruction which is LTF (Load thin film stack) into base address register. In the second half of the program word, this two-syllable instruction will then cause the contents of the stack, which contents is the base address register contents desired, to be placed into the base address register 055. The base program register 054 needs to be loaded only when there is going to be a branch. If there are no branches in the first part of the program, then the base program register 054 is not loaded. Once loaded, the base address register 055 and the base program register 054 will be changed many times during the course of the program. The initial setup just described for the base address register 055 is to get the program started.

As stated hereinabove, there are two thin-film program storage registers 100 to 103 and 104 to 107. The first program storage register is a 48-bit storage register 100 to 103. The second program storage register is a 48-bit program storage register 104 to 107. In the subcommand matrix and control unit 3020, as hereinbefore stated, there are three program storage address flip-flops PS1, PS2 and PS3 in the Program Syllable Address Counter 3504. One of these indicates which the program storage register is being used and the other two comprise a counter which indicates the program syllable to be read next out of the program storage register. There are also two control flip flops (Program Full Flip-Flops PF1 and PF2 in Program Full Register 3505) which indicate whether the program storage registers 100 to 103 and 104 to 107 contain program. These two flip-flops PF1 and PF 2 indicate whether there is program stored in the program storage registers, one PF1 of register 3505 indicating this for the program storage register 100 to 103 and the other PF2 of register 3505 indicating this in the event that there is program storage also in program storage register 104 to 107.

The two flip flops, program full flip-flop 1 and program full flip-flop 2, in the subcommand matrix and controls unit 3020 which indicate whether or not there is program stored in the first and second program storage registers 100 to 103 and 104 to 107, respectively, in set state indicate unused syllables of program word in the register. The reset state of the program full flip-flops PF1 and PF2 indicate that program is needed. When program is needed, the full state can occur any time in the execution of an instruction. That is, any time that a program syllable is to be pulled from the Program Storage Register 100 to 103 or 104 to 107, the possibility exists that these program storage registers may be empty. This will be indicated by the program full flip-flops PF1 and PF2. At this time the program count register 057 is read out from the thin-film memory at address 057 and brought into the K and E register 3004 and 3005. The contents of the K and E register 3004, 3005 are incremented by ONE in adders 3008 and 3009. That is, the contents of the K and E register 3004 and 3005 are taken together and being worked as a 16-bit register and the least significant bit in the 16 bits is upped by one in the adders 3008 and 3009.

This is actutlly accomplished by clearing the contents of the L and M registers 3006 and 3007 and initiating a carry of the least significant bit of the adders as the contents of the K and E registers 3004 and 3005 are added to the contents of the L and M registers 3006 and 3007. The result of the addition of the K and E registers 3004 and 3005 with the L and M registers 3006 and 3007 is placed into the L and M registers 3006 and 3007. This occurs on command from the subcommand matrix 3020. The L and M register 3006 and 3007 now contains the address of the next program word to be fetched from memory. Four bits of the L register 3006 designate the address of the particular memory being addressed, that is, it identifies the module of the 16 modules being addressed and the M register 3007 contains the address within the module.

The memory request flip flop, RFF of memory control unit 3551, in the subcommand matrix and control unit 3020 is now set to request access to the memory module addressed by the L register 3006. When the memory module is available, it responds by a control line and accepts the word address from the M register 3007 and performs a read operation. This causes a transfer of a program word from the memory module addressed into the M register 3007. Serial-parallel transfers are effected twelve bits in parallel, at a time four times for a total of 48 bits, plus a fifth transfer which transfers the parity bit.

The computer checks ODD parity. If EVEN parity is indicated, a parity error bit (18) is set in the interrupt register 3002. Upon being received 12 bits at a time in the M register 3007, the 12 bits of data from memory each time is shifted simultaneously with shift therein of the next 12 bits. That is, the first 12 bits into the M register 3007 are shifted out of the M register 3007 into the E register 3005 and thence upon each transfer of 12 bits into the E register 3005, the preceeding 12 bits into the E register 3005 are shifter from the E register 3005 into the program storage register 100 to 103. The input syllable counter 3506 (see FIG. 4) causes the first syllable from the E register 3005 to be written into program storage register 100, the second syllable to be written into program storage register 101, the third syllable to be written into program storage register syllable 102, and the fourth count of which enables writing the last 12 bits from the E register 3005 into the program storage register 103.

Upon completion of the transfer of memory into program storage register 100 to 103, the program full flip-flop PF1 associated with the first program storage register 100 to 103 is set indicating that this program storage register now contains program.

Transfers from memory are effected by transferring the least significant syllable first, whereas in use, the program syllables are used with the most significant syllable being used first. Therefore, the program address counter 3504 in the subcommand matrix and control system 3020 counts down as program syllables are used. That is, the information is successively placed into syllable registers 100, 101, 102, 103, of that program storage register. The program, however, is read out in order from syllable registers 103, 102, 101, and 100, successively by dint of counting down of the counter program address counter 3504 in the subcommand matrix and control unit 3020.

The only time program storage register #2, 104 to 107 is used is when a program overlap condition exists. This condition exists during the execution of a long instruction when the K and E and L and M registers 3004, 3005, and 3006, 3007, respectively will not be used for instruction execution. A program fetch is initiated concurrent with the execution of the instruction at which time the program storage register 104 to 107, (PSR2) is filled and its program full flip flop PF2 set.

Assuming that the first syllable of the word stored in the program storage register 100 to 103 is an operator syllable, (which condition is not always present), this syllable is read from program storage register 103 into the E register 3005. The syllable is transferred from the E register 3005 into the function register 3015. The command portion which is read into the function register 3015 is decoded by the subcommand matrix and controls 3020. The first indicator bits of the operator syllable in the function register 3015 are examined in this decoding. These are the first two bits of the operator syllable following the six command bits. These bits indicate whether the data is to be brought from memory or from stack, and if from memory, whether the address is to be indexed, and if from stack, whether the stack counter is to be advanced or held. For a stack read operation, the stack address is read and then the stack address is stepped in the read direction.

For a stack write operation, the stack counter 3508 is stepped in a write direction and then a thin-film write occurs. The operation, therefore, is either read and step or step and then write.

Stack stepping is in opposite directions for read and write.

Assume that the first address indicator indicates a stack normal operation (first indicator is 00). This means that the data is to be fetched from the stack 3099 (see FIG. 1) as indicated by the stack counter 3508 which will be either stack register 140 to 143, 144 to 147, 150 to 153, or 154 to 157, and the stack counter 3508 is counted. This is opposed to the stack hold operation wherein the stack counter 3508 is not stepped. The stack counter 3508 (see FIG. 4) is a 2-bit counter in the subcommand matrix and controls unit 3020. The stack counter 3508 indicates which stack of stacks 140 to 143, 144 to 147, 150 to 153, 154 to 157 is currently the top of the stack 3099. A stack syllable counter 3507 (see FIG. 4) addresses the syllables within a particular address.

The stack syllable address is thereby encoded for the indication of which stack register 140 to 143, or 144 to 147, or 150 to 153 or 154 to 157 by the stack counter 3508 and which syllable by the syllable counter 3507 (FIG. 4). The transfer path is that the syllables are read out of the stack 140 to 143 or 144 to 147, or 150 to 153, or 154 to 157 into the E register 3005, 12 bits at a time from whence they are transferred into the most significant end of the A register 3033 in the arithmetic unit 3030 and the 12-bit syllables are then shifted in succeeding transfers from succeeding stack register syllables into the E register 3005 from the stack syllable addressed and thence into the most significant 12-bit positions of the A register 3033, the A register being shifted down. The most significant 12-bit syllable of the A register is 3033A; the next most significant is 3033B, then comes 3033C and 3033D in order. The first operand is thus sent into the A register 3033. If the instruction is a two operand instruction, the second operand is sent similarly into the B register 3031.

Assuming that the first address indicator bit of the example instruction is an indicator bit to indicate a memory operation (10 or 11), a program syllable is read from the program storage register 100 to 103 into the E register 3005. This syllable consists of an 11-bit address plus an indirect address bit. The 11-bit address is transferred to the least significant 11 bits of the M register 3007 while the indirect address bit is transferred to the indirect address flip flop IAF 3548 of FIG. 4 in the subcommand matrix and controls unit 3020. The base address register 055 is then read from thin-film memory 3001 into the K and E registers 3004 and 3005. Thus, 11 bits are contained in the M register 3007 (from the program storage register) and 16 bits (from base address register 055) are contained in the K and E registers 3004 and 3005. The K/E register 3004, 3005 and the L/M register 3006, 3007 are then added in adders 3008 and 3009 and the result is put into the L and M register 3006 and 3007. This address in the L and M register 3006, 3007 corresponds to the memory module address and the address within the memory module being addressed. A memory module is then requested in a manner similar to that used in program fetching. As the data is received from memory, it is transferred into the M register 3007. From the M register 3007 similar to the way in which the information from stack was transferred from the E register 3005, 12 bits at a time, the data is transferred from the M register 3007 in 12-bit syllables at a time into the A register 3033 in arithmetic unit 3030 in a parallel 12 bit transfer four times serially until the A register 3033 contains the four (4) times twelve (12) or forty-eight (48) bits of the word in memory. Shifting occurs each of the four parallel times. On all memory transfers, the parity bit is checked, on the fifth transfer, which is the parity bit transfer, and if a parity error exists (on the line going into the 12th bit of the M register), this is indicated in the interrupt register.

The above description transfer is for the case where the indirect address bit is zero indicating that there is not indirect addressing. For the case where the indirect address bit is a 1, as the word is received from memory, the twelve least significant bits are transferred to the M register 3007 and then transferred from the M register 3007 to the E register 3005. The next least significant 12 bits are transferred into the M register 3007, the four least significant bits of which are transferred to the K register 3004.

At the same time, bit 8 of the contents of the M register 3007 is transferred to the indirect address flip-flop (IAF, 3548 of FIG. 4) in the subcommand matrix and controls unit 3020. Bit 7 of the M register 3007 is examined as a flag bit. If present, the flag bit causes a halt interrupt to be set in the interrupt register 3002.

Upon completion of the memory transfer, parity is again checked and the 16 bits accumulated in the K/E register 3004, 3005 from the memory transfer are transferred down to the L/M register 3006, 3007. The memory is again requested.

That is, when there is direct address, the contents of the M register 3007 are emptied into the A register 3033. When there is an indirect address indicated by the indirect address bit, the least significant 16 bits of the memory address are accumulated in the K and E registers 3004, 3005 and constitute the next memory address which itself may be either a direct address or an indirect address. This could go on repeatedly as many times as desired.

Finally, when the address selected is direct, the contents of the K and E register 3004 and 3005 are transferred into the L and M register 3006 and 3007, and the data is fetched from that memory address and put into the A register 3033. Thus, shifting keeps occurring between the K and E registers 3004 and 3005 and the L and M registers 3006 and 3007 during indirect addressing until finally a direct address is indicated at which time the data is fetched from memory and placed into the A register 3033.

Assume that an instruction occurs wherein the first address indicated is that of memory address which is indexed. The first syllable after the operator syllable is fetched from the program storage register 100 to 103 and placed into the E register 3005. From the E register, the contents are transferred into the syllable register 3017. The next program syllable is fetched and placed into the E register 3005. This is an 11-bit address and a 1-bit indication of indirect or direct address. As stated hereinabove, the 11 bits are transferred to the M register 3007 and the indirect address bit is transferred to the subcommand matrix and control unit 3030 indirect address flip-flop (not shown). Also, as hereinabove indicated, the base address register 055 has its 16 bits transferred into the K and E registers 3004, 3005 and added to the contents of the L and M registers 3006, 3007. The result after adding in adders 3008, 3009 is placed into the L and M registers 3006, 3007. Indirect addressing is performed first and on the direct address, that is, relative address plus BAR, indexing is made possible.

In the syllable register 3017 there are three index register addresses. There are addresses of three (3) of the fifteen (15) index registers (octal) 007 to 017, in thin-film memory 3001. The first index register address in the syllable register 3017 is examined and the contents of the index register indicated by the first four-bits in the syllable register 3017 is read from the index register referred to by this four bit address into the K and E register 3004, 3005. These contents are added to the contents of the L and M register 3006 and 3007, and the result is placed in the L and M register 3006, 3007.

Similarly, addresses two (2) and three (3) in the syllable register 3017 select two other index registers of the 15 index registers 001 to 017 (octal) and their contents are read sequentially into the K and E registers 3004, 3005 whence they are added to the contents of the L and M registers 3006, 3007 and in each of these two cases the total sum is placed into the L and M registers 3006, 3007. There now appears in the L and M registers 3006, 3007, the indexed syllable plus the base address register 055 contents plus the contents of three registers. This is the memory address selected.

In the event that the instruction is a two-operand instruction, operation with the second address indicator bits is identical except that the data is put into the B register 3031.

Upon completion of the execution of the instruction, the result appears in the A register 3033. That is, when the operation indicated by the first six bits of the operator syllable which constitute the command, has been effected, the result is in the A register 3033. The first indicator puts the contents of the address indicated by the first indicator of the operator syllable into the A register 3033, and for a two-operand instruction, the second set of address indicator bits refers to the operand to be put into the B register 3031. Also, if the instruction is a two operand instruction, the third set of address indicators indicates the storage location for the result. This is opposed to a one-operand instruction, where the second set of address indicator bits indicates the storage address of the result.

It should be understood that at least one instruction with one address indicator is always used, that if a one operand instruction, the second set of two address indicator bits may indicate a store. If it is two-operand instruction, the second set of indicator bits indicates a read location and the third set of indicator bits indicates the storage location. Thus, the first two indicator bits indicate either a read, a write or a branch, the second could be either a read, a write or a branch, and the last set of indicator bits is always a write or a branch indication.

Assume now, that the instruction is executed and the result is in the A register 3033. The storage address is computed as described above for operands except that information is transferred from the least significant syllable of the A register 3033 to the M register 3007, in the event of a memory store, or from the least significant syllable from the A register 3033 to the E register 3005 in the event of a stack store.

If a memory store is used, the computer computes the parity of the word transferred to memory and sends that parity to memory. This parity is checked by the computer or I/O control module, when it is read from memory. The memory module itself contains no parity generation or checking circuitry. That is, the module putting the information into memory generates the parity, and in using the information, checks it.

Some instructions contain variant syllables.

Variant syllables are syllables which modify the data or provide additional data for the execution of the instruction. That is, they modify the execution, or provide additional data for the execution of the instruction. These variant syllables are read from the program storage register 100 to 103 or 104 to 107 when indicated by the decode of the command portion of the function register 3015 in conjunction with the address indicator bits. They are read from the thin-film program storage register 100 to 103 or 104 to 107 into the E register 3005. From the E register 3005, these syllables are transferred to the M register 3007. These variant syllables may be indexed similarly to the indexing of memory address syllables. After indexing is indicated, the variant syllables are transferred from the M register 3007 into the syllable register 3017. In the syllable register 3017, these variant syllables are used for the instruction execution.

COMPUTER SYSTEM OPERATION

In describing the operation of the invention, instructions, phases, routines and their execution will be discussed. Instructions may be categorized by a number of addresses. This will be discussed first. Then the operational phases will next be described in conjunction with flow charts showing phase progression during execution of instructions by category. Phases then are individually discussed, referring to individual flow charts. Following this, common routines are treated in detail with accompanying flow charts and finally the execution of each instruction is described in conjunction with each flow chart.

INSTRUCTION CATEGORIES

Refer now to FIGS. 9A and 9B. This lists all the illustrative embodiment computer instructions categorized by number of addresses. Where possible, a class of instruction within the type is included. The basic information needed for each instruction is shown. The execution of each instruction is presented symbolically where feasible. The syllable layout for each instruction appears in the last column. The letter M represents a ferrite core "main" memory location. The letter M shown in parentheses—(M)—means that the information may be taken from, or stored, in either the operand stack or the main memory. An instruction index in which instructions are listed alphabetically by mnemonic code appears in a glossary of terms and abbreviations hereinbelow in this application.

The computer of this invention accepts instructions which are made up of a number of syllables from one syllable to seven syllables. A one syllable instruction is a no-address instruction.

Refer to FIG. 80. In a no-address instruction the only portion is the first six bits in the command portion of the instruction shown in FIG. 80.

Now refer to FIGS. 9A and 9B, which show the instructions categorized by number of addresses. For example, note the HALT, no-address instruction. The syllable layout shows an operator syllable which would be the binary equivalent of octal 01 which is the Halt instruction. This binary equivalent is 000001. Note the dashes (—) under the A1, A2 and A3 indicator columns. Since there are no addresses in this instruction, there is no indication of addresses necessary.

A program in the machine of the illustrative embodiment is merely a series of 12-bit syllables. In programming this machine, one syllable is thought of as twelve (12) bits taken three (3) at a time which represents four octal digits. For example, in the 12-bit syllable to represent the octal number 65, the word would be 000 000 110 101. This would correspond to 0065, thinking of it in four octal digits of 3 binary bits each. Now refer again to the operator syllable of FIG. 80. The first 6 bits of this syllable are the binary equivalent of an octal command which represents the digits from 00 to 77 in octal terminology. In decimal terminology this corresponds to 64 total coded from 0 to 63. Thus, there are 64 possible commands in the illustrative embodiment computer. In operation, actually about 53 may be used with expansion possibilities for particular or general future needs. Referring again to FIGS. 9A and 9B in the no-address instruction, the second octal digit, that is, the last three of the six command digits, varies from 00 to 06 inclusively, a total of 7 instructions. For example, the 00 instruction is the no-operation (NOP) instruction. The 01 instruction is a halt (HLT) instruction. Similarly, from 02 to 06 inclusive the instructions are step stack up (SSU), step stack down (SSD), subroutine return (SRR), interrupt routine return (IRR), reverse stack (RVS). These instructions are shown in the last 6 rows of the instructions (no address type) of FIG. 9B, which show the instructions categorized by number of addresses.

Proceeding to the one-address type instruction as shown in FIG. 9B, there are three such instructions. These are the clear address instruction (CLA), the store external requests instruction (SER), and the unconditional transfer (UCT). For example, take the clear address instruction. In this case either a stack address or a memory location may be cleared. The intermediate objective is that the A register in the arithmetic unit 3030 be cleared and that the contents of the A register 3033 in the arithmetic unit 3032 be transferred either into the stack or into the main memory. The clear address instruction is octal code 20. This means that the command instruction will read 010000. This instruction has a two in the tens column and a 0 in the digits column. In order to tell whether the stack or the memory is addressed, the next two bits of the instruction following the six bits of the command determine this.

Referring to FIG. 80, assume that the 2-bit A1 indicator is coded in and consists of the 7th and 8th bits, the A2 indicator is coded in and consists of the 9th and 10th bits, and the A3 indicator is coded in and consists of the 11th and 12th bits of the operator syllable. If bit 7 is a zero, it is a stack address. If bit 7 is a one, this is a memory address. Two things are possible in the stack address, (1) either the stack can be held or the stack can be stepped in either the fetch direction or in the store direction. If the command is a write command, it will be in the store direction, and if a read command, it will be in the fetch direction. The command which is decoded in the subcommand matrix and control section 3020 (see FIG. 1) determines then the direction of the rotation of the stack. In this case, since a clear A command is a store or a write instruction, therefore the stack is rotated in the direction to store. However, the programmer has the option to hold the stack address. This is done by placing a ONE in the bit 8 position. Thus, if the A1 code reads 01, the stack is held. The stack address comprises two bits for the four stacks and two bits determine which syllable in each of the stacks is being addressed. The stack address and the particular syllable of the stack take care of the four least significant bits involved in addressing the stack 3099 (see FIG. 1). The three next most significant bits are always 110 when addressing the stack. Thus, the A1 code for bits 7 and 8 in an operator syllable are 00 for a stack normal which rotates the stack and 01 in the case of an abnormal or stack hold. In the subcommand matrix and controls units 3020 are two counters, a two-bit address stack counter 3508 and a two-bit syllable counter 3507. The programmer must remember the position that the stack address was at the last program step in which it was used. Because the 00 in the A1 code is a stack normal, the stack address counter 3508 (see FIG. 4) will be stepped in the store direction. For example, if the stack counter 3508 was in the position 10, which designates the third stack, it would then go to position 01, which is the second stack. If this happens to be a command of the fetch type which involves a read from stack operation, then if the stack address counter 3508 is in the 10 state it counts up one to the 11 state or binary three. If the A1 indicator is 01 as the 7th and 8th bits of the operator syllable, then the stack address counter 3508 does not change, and if it was in the 10 state, it will remain in the 10 state. Therefore, by a stack hold the top of the stack can be cleared, with the indicator A1 (the first indicator being A1 code 01) or by a stack normal the lower numbered stack address can be cleared, that to which the stack pointer is directed at the time the command is executed.

The sample program of FIG. 112A and B illustrates the steps the programmer takes in programming and operation responsive to these steps. Assume, for example, that program words of the program are to be written in the first ten locations in memory module #3. In order to do this, the programmer performs certain set-up operations. First, he sets the program count register PCR 057 in the thin-film registers 3001, shown in FIG. 1, to the first program step address minus 1. For example, if the first program step is in location 0000 of memory #3, he sets the program count register 057 to 027777. This is the last word storable in the second memory module so that the next succeeding word will be the first word in the third memory module (see FIG. 3 also). Second, the programmer sets limit register #1, 021, to 7765. Twelve words in octal are equivalent to ten words in decimal. 7765 is 12 words less than 7777. 7777 is the octal equivalent of 4,096 words in decimal, the amount of words storable in each memory module. This enables the programmer to test the memory that this program is in.

Assume that the program illustrated in FIG. 112A is written into the first 10 locations in the third memory module, that is, from word 0000 to 0011, as shown in the left hand column of FIG. 112A.

The apparent skipping from 0007 to 0010 in column 1 is because these are octal words which are numbered from 0 to 7 and then start again from 10 to 17, for example. The numbers shown in the sample program in the next four columns are also written in octal configuration, from 0 to 7.

As shown by the enclosed rectangles around the words, each rectangle contains an instruction which may have anywhere from 1 to 7 syllables of four octal numbers each. Each octal number corresponds to three binary bits so that a single syllable is 12 binary bits. This is true for both program and data words. Hence, for example, the first syllable, 1544 actually means a binary digit instruction which is 001 101 100 100. In that 12-bit word, the 001 stands for the octal 1 of 1544, the 101 stands for second octal digit 5 of 1544, and each of the 100's stand for the respective octal digits 4 and 4, making it a 4 octal digit word. The illustrative sample shows rectangles where the instruction words vary from 1 to 6 syllables per word (the sample of FIG. 112A happens not to include a 7 syllable word). Actually, instruction words can vary anywhere from 1 to 7 syllables in the program. Since there are variable instruction lengths, waste space in memory is eliminated substantially since at the end of any instruction the next instruction immediately starts. Also, operating time is saved. However, some waste occurs whenever a branch instruction, for example, occurs. In the case of a branch to a new location, this new location must always be started with a command syllable. The first syllable of any program is a command. Thus, branch can only occur to the beginning of a program word and never to the second, third, or fourth syllables in a program word. Therefore, waste occurs after every branch that does not end at the end of the fourth syllable of a word. In the subcommand matrix 3020 is the program syllable counter 3504 (FIG. 4) which indicates which syllable of the program is currently being worked with. In addition to the program syllable counter (PSR) 3504 there are program full flip flops PF1 and PF2, 3505, which indicate which thin-film program storage register, 100 to 103 or 104 to 107 (see FIG. 1) is in use. Ordinarily, the program storage register #1, 100 to 103, is used. However, program storage register #2 is used also, but only when overlap occurs. Overlap signifies a program word fetch during a long instruction such as a multiplication or division instruction. These are binary multiply, binary divide, floating multiply, or floating divide instructions where 48 bits of data plus the bits required for the instruction are used. As will be explained hereinafter in the description of phases, in phase 3 or 5, which is the execute portion of the operation, if an overlap is possible, it will be effected there. As stated, in addition to the program syllable counter 3504 in the subcommand matrix and control section 3020, there are two flip-flops PF1 and PF2, 3505, to indicate which program storage register 100 to 103 or 104 to 107 is in use (see FIG. 4). These are the PF flip flops or program full flip-flops 3504. In any instruction when the first program word is put into the program storage register #1, 100 to 103, the program syllable address counter 3504 is set to 011, and the PF1 flip-flop of program register full flip flop 3505 is set into the ONE state. As each syllable is read out from the program storage register 100 to 103, the program syllable address counter 3504 is decreased by 1. When the count has gone the full gambit from 011 to 111, the PF1 flip flop of flip flops 3505 is reset concurrently to the ZERO state. When both PF's flip-flops of program register full flip-flops 3505 are set to the ZERO state, they indicate that a program full is required. When this occurs, a PCR count is read out of the thin-film program count register 057 through the K/E register 3004, 3005 (see FIG. 1) into the L/M register 3006, 3007. A ONE is added to the contents of the L/M register which then holds the address of the next program word. The next program word fetched from memory will be fetched in the address to which the L and M 3006 and 3007 register is now set. This next program word is put into the program storage register #1, 100 to 103. The program register full flip-flop PF1 of flip-flops 3505 is set again to the ONE state. The program syllable counter (PSR) 3504 is then set by the program full flip-flop PF1 of flip-flops 3505 to the 011 state.

The transfer of a memory word from memory into the thin film address registers 3001 is always done in the following manner:

The least significant syllable is always transferred first, then the second least significant syllable, then the third least significant syllable, and finally the most significant syllable of the four syllable word. The counter that effects this transfer is an input syllable (IS) counter 3506 (FIG. 4) in the subcommand matrix and controls section 3020. The input syllable counter 3506 is used just to transfer the program word into the program storage register 100 to 103 or 104 to 107. Which program storage register #1 or #2, 100 to 103 or 104 to 107, is employed, depends on whether an overlap is present or not.

The term "overlap" signifies the fetch of a second program word at the same time that the program syllable counter 3504 is actually addressing program syllable register #1, 100 to 103. This enables a new word to be brought into the program storage register #1, 100 to 103, at the same time that the machine is still working on a syllable in the program storage register #2, 104 to 107. This feature enables speed up of the program. This enables an automatic feature of overlap which saves time every time a multiply or divide operation occurs. Multiply and divide operations are normally long operations. In these operations automatically while an overlap occurs, that is, automatically while a first program word which is in the program storage register #1, 100 to 103, is being used, simultaneously the program storage register #2, 104 to 107, is being filled, so that immediately upon executing the program in the program storage register #1, 100 to 103, the program in the program storage register #2, 104 to 107, may be then executed.

For any multiply or divide operation since considerable shifting must take place during the instruction execute portion in the arithmetic unit 3030, several T times elapse during this operation. During these T times a concurrent operation could be effected and save time for the fetch portion during phase 3 or phase 5 of the current multiply or divide instruction. Hence, for any multiply or divide operation, the inventive machine automatically takes the next program word and puts it in the second program storage register 104 to 107 if the second program storage register 104 to 107 is empty. During a long instruction, overlap is permitted if and only if one of the program storage registers is empty. Therefore, if one of the program storage registers 100 to 103 or 104 to 107 is empty during a binary multiply or binary divide operation, it will be filled automatically during phase 3 or phase 5 of the current instruction. The filling will be the next program word. The state of the program full flip-flops 3505, PF1 and PF2 tell whether or not an overlap is desired by showing whether or not either one of the program storage registers 100 to 103 or 104 to 107 contains syllables which have not been read out. If they both hold unused syllables, an overlap is not permitted to occur, and if one does not hold any unused syllable then an overlap is permitted to occur.

Refer again to FIG. 112A and FIG. 112B of the drawings. Taking the first word in memory, for example, since the last significant syllable 0055 was read out first into the program storage register #1, register 100 to 103 of FIG. 1, that syllable will go to address 100 of program storage register 100 to 103 in thin-film memory 3001. The second least significant syllable 3030 will go to address 101, the third least signficant syllable 0057 which is the second syllable of the first program word will go to address 102, and the fourth least signficant (which is the most signficant) syllable 1544 will go to address 103 in thin-film memory 3001 in program storage register #1, 100 to 103.

Now since the program syllable address counter 3504 (FIG. 4) in the subcommand matrix and controls unit 3020 is set to 011, the most signficant syllable of the first word in memory 1544 (octal) is read out from address 103 in the program storage register #1, 100 to 103, into the function register (F) 3015 of FIG. 1. This is effected by reading out register 103 of the program storage register #1, 100 to 103, into the K and E register 3004 and 3005 and thence into the function (F) register 3015. Since the computer recognizes that code 1544 is a command, the channels are set up through the K and E register 3004 and 3005 into the function register 3015. If this syllable happened to be a non-command, it would not go into the function register 3015.

This operation is accomplished in phase 1. The phases will be described hereinbelow.

FIG. 112B illustrates the operator syllable 1544 expressed in binary digits. The function register 3015 is also decoded in phase 1 and shows that 15 is the code for the "store thin-film" instruction. The particular syllable following the operator syllable is a special syllable and calls for an address in thin-film memory 3001 and not an operand address. The first two bits of the next octal number 4, digit bits 7 and 8 of the function register is the first indicator $A_1$, and informs that the next syllable will be the thin-film address from which the data will be read into the A register 3033. The next two bits of the function register 3015, bits 9 and 10 represented by the last binary bit of the first digit 4 and the first binary bit of the last octal 4 in octal 1544 is the second indicator which informs that the contents of the A register 3033 are stored at the top of the stack 3099. The contents of A register 3033 is the contents of the program count register 057 (address 057 of thin-film memory 3001). The top of the stack 3099 is the beginning of the stack register 140 to 143 of thin-film registers 3001 of FIG. 1. Since the 9th and 10th bits are 01, this means "hold the stack address," and hence, storage of the A register 3033 contents occurs at the top of the stack 3099. The syllable 0057 (second syllable of sample program of FIG. 112A) is read out during phase 2 and stored in the syllable register. The actual execution portion of that instruction is performed in phase 3. When the execution portion is done in phase 3, phase 4 commences. During phase 4, the contents of address 057 in thin-film memory 3001 which was transferred into the A register 3033 in phase 3, will now be stored at the top of the stack 3099. Recall that 15 is a store thin-film instruction.

This is shown by FIG. 112B which presents the written out binary instruction corresponding to the operator syllable 1544 of the first octal instruction 1544–0057 in the sample program. In 1544, the "1" is represented by 001, the "5" is represented by 101, the first "4" is represented by 100, and the second "4" is represented by 100. This is the number 1544 which is the operator syllable of the first program word. The heavy bars single out the command as the first six binary bits, bits 7 and 8 are the indicator $A_1$ for the first address, bits 9 and 10 are the indicator $A_2$ for the second address, and bits 11 and 12 are the indicator $A_3$ normally used for the third address. Bits 7 and 8 refer to the first operand or thin-film register as in the case of the present special syllable, bits 9 and 10 refer to the second operand, and bits 11 and 12 refer to the result which is not being used in this particular instruction, which is 15, the store thin film instruction, in accordance with the code. Bits 7 and 8 being a 10, means that the next syllable octal 0057 is pulled out as the address in thin-film memory 3001 from which the data is transferred into the A register 3033. The 9th and 10th bits 01, informs that the A register 3033 contents are to be stored in the stack. 01 denotes stack hold which means that the present stack address is held so that the information from the A register 3033 may be stored in the present stack address.

When the storing of the data from the A register 3033 into the top of the stack 3099 which is held is completed, this is the end of the first instruction 1544–0057. The computer then goes back to the phase 1 (PH1) time 1 (T1) condition at which time the next operator syllable 3030 is pulled out. Since store thin-film does not go past phase 4 and storing has been accomplished by this time, whenever this instruction is generated, factored into the subcommand matrix and controls is automatic restoration to phase 1, Time 1 (PH1, T1), at which time the phase distributor 3501 is set to phase PH1 state and the timing distributor 3502 is set to time T1. On pulling out the next operator syllable 3030 of the instruction 3030–0055, the operator 3030 is transferred into the F register 3015 shown in FIG. 1 and is decoded in the subcommand matrix and control unit 3020. 30 is a load thin-film instruction, and the data is loaded from the top of the stack 3099 into the thin-film address 0055 (the base address register 055) in the thin-film memory 3001.

Since both the first and second instructions contain special syllables 0057 and 0055 respectively, both of these syllables are transferred to the syllable register 3017. Whenever such a special instruction occurs, the subcommand matrix 3020 generates the address thin-film subcommand (ATFS) with the syllable register subcommand and the least significant 7 bits of the 12 bits in the syllable register are transferred through the thin-film address gating 3018 directly into the 7 bits of the thin-film address register 3510 to set this address register 3510 such that the information is transferred into the called for register in thin-film memory 3001.

Now take the fourth word in memory, 0003, as an example of a non-special instruction. The first octal syllable 3554 is the operator syllable. Octal 35 is the command "transmit." The binary equivalent of octal 3554 is written 011, 101, 101, 100. This may be expressed 011101/10/11/00. The six bits 011101 are the octal 35 command "transmit." The seventh and eighth bits, 10, indicate an unindexed operand referenced to core memory. The memory address syllable relating to this operand appears in the syllable string as the next octal number 0011, the binary equivalent of which is 000, 000, 001, 001. The ninth and tenth bits of the binary expression for operator syllable, octal 3554, 11, indicate that the second operand is referenced to core memory and that an index syllable precedes the memory address syllable in the syllable string. The index syllable is the octal 0001 syllable which is equivalent to binary 000, 000, 000, 001. This may be expressed /0000/0000/0001/ as designations of address of three index registers in the film memory 3001. Since there is no "000" index register, only the contents of the one index register, octal 001, will be added to the contents of the memory syllable following the index syllable and to the contents of the base address register 055 to determine the memory address. The actual order is to first add the contents of the base address register, octal 055, to the relative address, octal 0012, and then the contents of index-register, octal 001 are added to this sum. Since the transmit instruction is a two-address instruction, indicator $A_3$ comprising bits 11 and 12 of the operator syllable, are disregarded. This will be taken care of by stopping operation at phase PH4 and returning to phase PH1 time T1, to proceed with the next instruction. This will be explained hereinbelow in the description of the phase routines. Therefore, the last-named memory address syllable octal 0012 is the last syllable used in this transmit instruction. Octal 0012 is the relative address written in binary as 000, 000, 001, 010, which, as stated, is added to the contents of the index registers indicated by the index syllable (one register 001 in this case), and to the contents of the base address register 055 to determine the effective address of this syllable in core memory.

The remaining portion of the sample program is executed in a similar fashion and will not be explained. In FIG. 112A, the strings of syllables comprising each instruction have been set off by heavy lines to facilitate understanding.

DISCUSSION OF OPERATION OF EACH PHASE

For each instruction of the computer (53 are illustrated in the illustrative embodiment computer) a sequence of operations in specific phases will occur. This is so because the subcommand matrix and control portion 3020 (FIG. 1) is set up to so interpret each command and to set up the predetermined sequence of operations in the phases. The phases are phase 0 and phase 1 through phase 6 abbreviated hereinafter PH1 for phase one, PH2 for phase two, etc. The times within the phases are abbreviated as T0 for T time 0, T1 for T time one, etc. A discussion of the operations involved in each of the phases follows:

*Phase Zero*: A maintenance panel (see FIG. 107) may be provided and on it may be a manual thin-film switch with "continuous" and "single" portions, a power on-off switch, a program start switch with "automatic" and "unusual" positions, an operation switch having 3 positions "on line," "module test" and "memory test," a program register switch having "repeat" and "fill" positions, and a service interrupt switch having "disable" and "enable" positions.

An off-phase and time-zero state (PH0, T0) is assumed by the computer after power on or after the clear button (not numbered) has been depressed (see FIG. 4 for showing of thin-film address, load thin-film, function, start, and reset switches). After power on, when the sequence of voltages terminates, a pulse simulates the function of the clear button and sets all necessary flip-flops to their initial state. However, if the program storage switch (FIG. 107) is on automatic, and the primary power has not previously failed, the computer will attempt to start automatically and stop in phase (PH1) at time 0 (T0). Whether in phase 0 or in phase 1, and at time T0, a computer can be started either automatically by another computer module or by manually depressing the start button. When the function switch (not numbered) is on read thin-film (Read T.F.) and the manual thin-film switch (FIG. 107) is on single, the data in the thin film memory location specified by the thin-film address switches TFA1, TFA2, TFA3 is transferred once into the K and E register 3004 and 3005 after the start button (not numbered) is depressed. However, when the function switch (not numbered) is on load-thin-film (Load T.F.), the data in the load thin-film switches D/A1 through D/A6 will be stored once in the thin-film memory location specified by the thin-film address switches TFA1, TFA2, TFA3. If the manual thin-film switch (FIG. 107) is on continuous, the read or load operation will repeat continuously. After this phase 0 operation, unless power failure occurs or the clear button is pressed, the operation of the computer module thenceforth is from phase 1 to phase 6, recycling back to phase 1 for each new instruction. Phase 0 can be usefully employed by the operator or by the programmer additionally since he may want to read the contents in thin-film memory 3001. He can do this by causing the machine to go into phase 0 by deliberately stopping it and clearing it, or preferably by throwing the function switch (not numbered) to single instruction. This is a help in originally writing the program and also when debugging the program for errors.

By phase 1 to phase 6 is meant those phases which are used in normal operation. In the illustrative embodiment computer different combinations of phases are utilized, PH1 is always used, so at least one and not more than six phases are used for each instruction.

A program word should not be confused with an instruction. A program word comprises 48 bits of program in memory. However, an instruction may vary from 1 to 7 syllables (syllable string) each of which syllables comprise 12 bits such that an instruction may have less bits than a word or more bits than a word. A seven syllable instruction could be located in three different words in memory.

*Phase One* (*operator fetch*); Refer to FIG. 11 of the drawings which shows the flow chart for phase 1 wherein the operations are performed in the T times as indicated and refer further to FIG. 1.

The first step in the execution of an instruction is to transfer the operator syllable from the thin-film program storage register PSR1 or PSR2, 100 to 103 or 104 to 107, to the function register 3015 (see FIG. 1). The operator syllable is decoded in function register 3015 to determine the succession of phases to follow. Fetch of the operator syllable is contingent upon the absence of several conditions, such as no power failure; no pseudo-interrupt to update the real-time clock; no other interrupt; no fill required. These interrupt operations are described more fully in aformentioned copending application Ser. No. 241,225 of Blair C. Thompson, Cornelius C. Perkins, Joseph Shifman, and Stanley J. Pezely, for Automatic Interrupt System for Data Processor, filed Nov. 30, 1962.

If none of these several conditions are present, the operator syllable is transferred from the program storage register PSR1 or PSR2, 100 to 103 or 104 to 107, of thin-film memory 3001 to the function register 3015. The operator syllable when transferred to the function register 3015 is decoded to determine whether a jump to time T1 of phase 1 (PH1), or a jump to time T1 of phase 2 (PH2) is the next step. That is, the then contents of the function register 3015 are decoded by virtue of the gates in the subcommand matrix and control unit 3020 to determine whether the jump occurs to time T1 of phase 1 or to time T1 of phase 2.

As shown (see FIGS. 1 and 4 for control units referred to), at time T1 of phase 1, a number of operations occur in the square box at the upper left hand corner in FIG. 11. These are: reset the function register 3015, reset the L and M register 3006 and 3007, reset the multiply-divide counter (D) 3021, reset the syllable counter (SY) 3507, reset the input syllable (IS) counter 3506, reset the master control (MC1–5) flip-flops 3541, reset the branch (BRF) flip-flop of miscellaneous control flip-flops 3548, and reset the interrupt routine jump (IRJ) flip-flop in command control unit 3545. During phase 1 at time T1 after each of these registers and flip-flops shown in the upper left hand box have been reset, certain conditional operations occur. The power failure (IPF) flip-flop of command control flips-flops 3545 is examined, and if set, then the power failure rountine shown in FIG. 12 is followed. If the power failure (IPF) flip-flop is not set, then the halt condition (HTC) flip-flop (not shown) is examined. If it is set, the timing distributor 3502 is reset so that a jump is effected to time T0. In this time T0 jump, a halt condition is being discussed, not a halt step in a program. The halt condition is a condition which, for example, would disable the computer and would cause the halt (HTC) flip-flop (not shown), to be set. On the other hand, a temporary or conditional halt would not cause the halt (HTC) flip-flop to be set and a jump to T0 would not be executed since in that case all that is required is to suspend the operation of the computer for a time and then go ahead.

When a jump to time T0 is effected, the timing distributor 3502 is stopped and the computer operate light turns off.

Assuming that the halt (HTC) flip-flop is not set, as shown in the next vertically below disposed box, at phase 1 time T1, the real-time clock interrupt (IRT) flip-flop of command control flip-flops 3545 is observed to see whether it is set. If set, the real-time clock interrupt routine shown hereinbelow in FIG. 13 is followed. If the real time clock interrupt (IRT) flip-flop is not set, then the interrupt register bits of interrupt register 3002 (again see FIG. 1 and see also FIG. 4), are observed. If one of the interrupt register 3002 bits is set, the computer jumps into the interrupt routine illustrated in FIG. 14. If an interrupt register 3002 bit is not set, the repeat (RPF) flip-flop of flip-flops 3545 is observed, and if set, the repeated instruction rountine shown in FIG. 15 is followed. If the repeat RPF flip-flop of Command Control flip-flops 3545 is not set, then the program register full (PF1 and PF2) flip-flops 3505 are observed. If both program register full flip-flops PF1 and PF2, 3505 are reset indicating that both program storage registers PSR1 and PSR2, 100 to 103, and 104 to 107, are empty, then the fill routine shown in FIG. 24 is followed. If one of these flip-flops PF1 and PF2, 3505, is set, then at phase PH1T times T1, T2 and T3, the operator syllable is fetched from the program storage reigster #1 or #2, 100 to 103, 104 to 107 according to the fill flip-flop PF1 or PF2 which is set at the address determined, in accordance with the syllable indicated by the program syllable counter 3504. The operator syllable is stored in the function register 3015 (see FIG. 1). During phase 1, time T4, the computer looks at the command portion of the operator syllable in the function register 3015 which command comprises the most significant 6 bits of the operator syllable to determine whether or not this is a no-address instruction. If it is not a no-address instruction, the computer jumps to phase 2, time T1 and then follows the routine for phase 2. If it is no-address instruction, then the computer determines whether or not the instruction is a halt instruction. The halt instruction is one of the no-address instructions. The computer determines then whether or not it is in the control mode by examining whether or not the control mode (INT) flip-flop 3540 is set. If flip-flop 3540 is set, then the halt condition (HTC) flip-flop is set. Following this branch, the instruction is completed and a jump to phase 1 PH1, time T1 occurs. If the control mode (INT) flip-flop 3540 is not set, then the normal mode interrupt flip-flop which is bit 10 of the interrupt register 3002 is set; the instruction is completed and the computer then jumps to phase 1 (PH1), time T1.

If examination at PH1 (phase 1) T4 (time T4) indicates that this instruction is not a halt instruction, but that it is another no-address instruction, then the computer determines whether it is a subroutine return instruction. If this instruction is a subroutine return instruction, the computer executes the subroutine return procedure shown in FIG. 71. If the instruction is not a subroutine return instruction, then the computer determines whether or not the instruction is an interrupt routine return instruction. If the instruction is an interrupt return routine instruction, then the computer goes through the interrupt routine return execute procedure shown in FIG. 58. If the instruction is not an interrupt return routine instruction, then the no-address instruction is completed and a jump is made to time T1 of phase 1 and the computer carries out the next program instruction. Following a halt, if the instruction is not a subroutine return or an interrupt routine return, and it is a no-address instruction, then it must be one of the following: (1) a no operation instruction, (2) a step stack down opertaion, (3) a step stack up operation, and (4) a reverse stack operation.

In these determinations it should be understood that the appropriate flip-flop set or reset condition determines the answer to the question and causes appropriate branching or connection to take place.

Since power failure, real-time clock interrupt, other interrupt routines and repeated instruction routine are peculiar to phase 1, they are discussed immediately below.

POWER FAILURE ROUTINE

In the event of a primary power failure during computation, 500 microseconds are provided to store in the non-volatile thin-film memory 3001, the contents of all control flip-flops necessary to restart computation from the interrupt point. However, computation resumes after POWER ON only if the automatic program start switch (not numbered) is on. Power failure interrupt has priority over all other interrupt routines as is explained in greater detail in the aforementioned copending application of Thompson, Perkins, Shifman, and Pezely for Automatic Interrupt System for Data Processor, filed Nov. 30, 1962.

FIG. 12A shows the flow chart for power failure dump routine and FIG. 12B shows the flow chart for power failure return routine.

Referring to FIG. 12A, the power failure dump routine, in the event of power failure, the power failure (IPF) flip-flop of Command Control flip-flops 3545 (see FIG. 4) is set and is recognized at phase PH1 time T1. A jump is executed to phase PH1, time T12. At time T12 of phase 1 the following operations take place responsive to this jump. First, in the power failure dump register 064 and 065 (see also the thin-film registers 3001 of FIG. 1) are stored the contents of a group of control flip-flops comprising the program syllable counter 3504 flip-flops PS1 and PS2 and PS3, the repeat (RPF) flip-flop and the first repeat (FRP) flip-flop of Command Control flip-flops 3545, the program register full (PF1 and PF2) flip-flops 1 and 2, 3505, the overflow flip-flops 3544 including the program overflow (POV) flip-flop, the program underflow (PUN) flip-flop and the program not normalized (PNN) flip-flop, the stack address (SA1 and SA2) flip-flops 1 and 2, 3508, the control mode (INT) flip-flop 3540, the power failure Command Control interrupt (IPF) flip-flop of unit 3545 and the reverse stack or up-down (RFS) flip-flop 3543. All of these flip-flops are shown in FIG. 4. All of this group of flip-flop contents are stored in the first power failure dump register 064. At time T13 the contents of a second group of control flip-flops are stored in the second power dump register 065 (FIG. 1). This group consists of the interrupt register 3002 bits 1 through 12 (see FIGS. 1 and 4). The power failure dump routine discussed hereinabove is then completed and a jump is executed to time T0, which means that the timing distributor 3502 is reset to zero and the computer operate light is disabled.

Refer to FIG. 12B, the power failure return routine, the automatic program start switch (not shown) if set in "on" condition and a power failure has occurred which causes the power failure dump routine to be executed, then, the function switch (not numbered) in FIG. 4, is examined to determine whether it is in the operate, conditional halt, single instruction, or single phase position. If the automatic start switch (not shown) was not "on," then the status of the phase PH0, time T0 will remain, namely, the computer is shut off.

If the computer is not in one of the above positions, then the function switch must be in single pulse position or load thin-film (Load TF) position, or read thin-film (Read TF) position. In any of these cases, the status will remain in phase 0. If the function switch is in one of the positions corresponding to the functions of operate, conditional halt, single instruction, or single phase, then the computer reads the contents of the first power failure dump register 064 into the K and E registed 3004 and 3005 (see FIG. 1). Bit 10 of the E register 3005 which corresponds to the power failure interrupt flip-flop setting is examined and if a ONE, it is set which indicates that a power failure has occurred previously.

Upon the 10th bit in the E register 3005, being set, this 10th bit corresponding to the power failure interrupt flip-flop, if it is set indicates a previous power failure. If this 10th bit of the E register 3005 is not set, this indicates that the interrupt is not a power failure and then the halt condition (HTC) flip-flop (not shown) is set.

Whenever the automatic program start switch (FIG. 107) is put on after the computer was turned off, the function switch (see FIG. 4) is examined and if in any one of the positions enumerated of operate, conditional halt, single instruction, or single phase position, then the contents of the first power failure dump register 064 are read into the K/E register 3004, 3005, and bit 10 of the E register 3005 is examined to ascertain whether a power failure had occurred before turning on the automatic program switch, (FIG. 107). If a power failure had not occurred, then the halt condition (HTC) flip-flop (not shown) is set. At times T13, T14, and T15 of phase PH1, the contents of the second power failure dump register 065 is read into the K and E register 3004 and 3005, again, and the interrupt register 3002 is restored to its pre-power failure state. This is the state that the interrupt register 3002 was in before a clear to phase PH0, time T0 was made. At time T15 of phase 1, (PH1), the first power failure dump register 064 in thin-film memory 3001 is cleared, and then the routine is completed during time T15. Following this a jump to time T1, phase 1, occurs. At time T14 of phase 1, if the 10th bit of the E register 3005 was set, then this indicates a previous power failure. In this case, at time T14 also, the first and third groups of control flip-flops are restored to their pre-power failure state (see FIG. 4). The first group of flip-flops consists of the program full 1 and the program full 2 flip-flops (PF1 and PF2) 3505, stack address (SA1 and SA2) flip flops 1 and 2, 3508, the control mode (INT) flip flop 3540 and the reverse stack flip flop 3543. The third group consists of the program full 1st and 2nd flip-flops (PF1 and PF2) 3505, the program syllable counter 1st, 2nd and 3rd flip-flops (PSR 1, 2 and 3) 3504, the repeat (RPF) flip-flop, the first repeat flip-flop (FRP) of Command Control flip-flops 3545, the overflow flip-flops 3544 including the program overflow (POV) flip-flop, the program underflow (PUN) flop-flop and the program not normalized (PNN) flip-flop. The first bit of the interrupt register 3002, bit 11, is set also to notify the programmer that a power failure routine was just performed.

Concurrently with and following the time T14, phase 1, operation just enumerated, the contents of the second power failure dump register 065 are read and the interrupt register 3002 is restored to its pre-power failure state. At time T15 the first power failure dump register 064 is cleared and at time T15 the routine is completed and the computer jumps to time T1 of phase 1. The reason why the first power failure dump register 064 is cleared is because concurrently bit 10 (E10) of the E register 3005 is cleared—unless a power failure occurs again.

REAL-TIME CLOCK INTERRUPT ROUTINE

The base of the real-time clock system is a 100 cycle oscillator. It has a 0.5 microsecond wide output pulse which sets a control flip-flop of Command Control flip-flops 3545 which is a real-time interrupt (IRT) flip-flop (see FIG. 4). The interrupt control (IRT) flip-flop causes an interrupt which may be made second in the priority logic (next to power failure interrupt) to up-date the real-time clock registers (114 and 115 in thin film 3001 of FIG. 1). When the two real-time clock registers 114 and 115 have reached their maximum count, that is, the time they are carrying over from all ONES to all ZEROS, the 5th bit (15) in the interrupt register 3002 is set.

FIG. 13 shows a flow chart for the real-time clock update routine. It is desirable that the real-time clock 114 and 115 of thin-film memory 3001 be up-dated every 10 milliseconds. This is permitted by causing a pulse from the 100 cycle oscillator (FIG. 107) to occur on each hundredth of a second. The resulting interrupt enables the updating of the real-time clock 114 and 115 each hundredth of a second. The hundred cycle oscillator (FIG. 107) should be accurate to one part in one millionth because in some applications it may be critical that the apparatus operate in real-time, in order, for example, to accurately predict the trajectory of the targets moving at extremely high speed.

In thin-film memory 3001, (FIG. 1), the real-time clock is composed of 2 twelve-bit registers 114 and 115. The least significant 12 bits are contained in the real-time clock register 114. Referring again to FIG. 13 every hundredth of a second or every 10 milliseconds, the interrupt is triggered and the real-time up-date routine is started. Upon interrupt in phase 1, time T1, a jump to phase 3, time T1 occurs. During times T1 and 2, the 12 bits of the real-time count register 114 are read into the E register 3005 and thence transferred into the M register 3007. In the M register this number is incremented by one. The incrementing by 1 in the M register 3007 is done in phase 3 times T3 and T4, and at time T5, the incremented or real time count is placed back into thin-film real-time clock register 114. If the contents were all ONES, that is the incrementing produced a carry, then the 12 most significant bits which are in the real-time clock counter 115 are read jumping back to time T1 and T2 of phase 3, and at time T3 and T4, the most significant bits are incremented by 1 in the M register 3007 similar to the incrementing of the real-time clock 114 contents just before described. The result is then stored back into thin-film in real time clock register 115. If the answer to "did the incrementing produce a carry at the time T5 operation," is no then the real-time clock update has been completed and a jump is made to phase PH1, time T1 for the next instruction. In the case where the carry was produced after storing back in thin-film memory 3001, the least significant 12 bits of the count, if incrementing the most significant 12-bit syllable in 115 does not produce a carry, then the real time clock updating is completed and a jump occurs to phase 1, time 1 for the next instruction. If a carry of the most significant bits occurred, then the mask bit of the P and Q mask register 3016 is examined to see whether it is set. If it is not set, then the real-time clock updating is completed and a jump is effected to phase PH1, time T1 (PH1–T1) for the next instruction. If the 5th bit Q5 of mask register 3016 (FIG. 1) was set, then at time T4, bit 5 of the interrupt register 3002, which is the real-time clock interrupt bit is set and following this setting, the real-time clock updating is completed and the computer jumps to the next instruction at phase PH1, time T1. When the real-time clock interrupt bit, bit 5 in the interrupt register 3002 has been set at time T4, the program is interrupted and this interrupt must be serviced by the automatic operating and scheduling means and method. This servicing is described in conjunction with copending application for Modular Computer System of Anderson, Hoffman, Mott, Pezely, Shifman, and Wilkinson in application of, Ser. No. 246,855 filed Nov. 30, 1962.

The power failure interrupt described above and all other interrupts must be serviced by the automatic scheduling and operating means (AOSP) in the manner described in that copending application before resuming of operation and completing the routine may take place.

Hereinafter the abbreviation PH1–T1 will be used for phase 1, time T1.

INTERRUPT ROUTINE

Refer to FIG. 14, the flow chart for Interrupt Routine. When an interrupt occurs, and the corresponding bit appears in the interrupt register 3002, the ITE control flip-flop 3550 shown in FIG. 4 is set by the next clock pulse. This could be an interrupt such as a parity error, a program overflow or underflow, an illegal instruction, a power failure or real time clock interrupts hereinabove described. That is, whenever an interrupt occurs, one of the bits in the interrupt register 3002 is set which sets the ITE control flip flop 3550 by the next clock pulse. Interrupts other than the power failure and the real-time clock update rank third in the priority logic, and may be set up in sequential priority as desired, as shown in the aforementioned, copending application for Modular Computer System of Anderson, Hoffman, Mott, Pezely, Shifman, and Wilkinson, and in the aforementioned, copending application for Automatic Interrupt System for Data Processor of Thompson, Perkins, Shifman and Pezely.

The ITE control flip-flop 3550 thus senses the presence of an interrupt bit in the interrupt register 3002. This sensing occurs at PH1, T1. The interrupt routine jump is then implemented by setting the interrupt routine jump (IRJ) flip-flop in Command Control flip-flops 3545.

The interrupt routine jump causes storage of information necessary to restart from the point of interruption. The initiation of the interrupt routine jump establishes the computer control mode. Whenever the control mode (INT) flip-flop 3540 is set, the equipment is in the control mode in which the automatic operating and scheduling program means takes over as contrasted with computer operation in the normal mode. The return to normal mode is accomplished by the interrupt return routine, IRR, instruction, which instruction appears in the automatic operating and scheduling program. The flow chart for the interrupt routine of FIG. 14 describes the automatic routine upon receipt of an interrupt other than power failure or real-time interrupt. When the interrupt occurs at phase PH1–T1, the interrupt routine jump (IRJ) flip-flop of the Command Control flip-flops 3545 (see FIG. 4) is set. Any interrupt is always recognized at PH1–T1. Simultaneously, the contents of a first group of control flip-flops are stored in the interrupt dump register (IDR), 070, of the thin-film register unit 3001 (see FIG. 1). This group of control flip-flops includes the program syllable counter flip-flops, PS1, PS2, and PS3, 3504, the repeat RPF flip-flop, and first repeat FRP flip-flop of command control flip-flops 3545, the program full PF1 and PF2 flip-flops of Program Register Full flip-flops 3505, the program overflow POV, program underflow, PUV, and program not normalized, PNN, flip-flops of overflow flip-flops 3544, the stack address flip-flops SA1 and SA2, 3508, the control mode INT flip-flop 3540, the power failure interrupt IPF flip-flop, and the reverse stack RSF flip-flop 3543. These flip-flops are shown in FIG. 4. The contents of these control flip-flops are stored in bits 1 through 15 of the interrupt dump register 070 in the group order above enumerated, the program syllable counter bits PS1, PS2, and PS3 being stored in the most, second most, and third most siginficant bit positions of the interrupt dump register 070 respectively.

During phase 1, times T7 and T8, after the jump to T7, the contents of the program storage register in use, of program storage registers 100 to 103 or 104 to 107 are stored in the interrupt program register 110 to 113 of thin-film unit 3001. The control mode flip-flop 3540 (FIG. 4) is also set. A jump occurs to phase 3, time T1 and during times T1 and T2, the contents of the base address register 055 in fast access thin-film memory 3001 are stored in the interrupt storage register 040 to 042, least significant location 040. During times T3 and T4, the contents of the base program register 054 are stored in the next least significant location 041 of the interrupt storage register 040 to 042. During times T5 and T6 of phase 3, the contents of the program count register 057 are read out into the K and E register 3004 and 3005. At time T6, if an overlap occurred immediately preceding the interrupt, then one is subtracted from the program count of the program count register 057 contents in phase 3 during times T6 and T7 and in time T8 the result is stored in the most significant location 042 of the interrupt storage register 040 to 042 in thin-film memory 3001.

If, on the other hand, an overlap did not occur, the program count in the program count register 057 itself is stored in the most significant location 042 of the interrupt storage register 040 to 042. After an overlap, both program full (PF1 and PF2) flip-flops 3505 are set. The subtract operation is effected because during overlap the next word of program would actually be held in the program storage register 100 to 103 or 104 to 107. This next word of program is presently disregarded and will be fetched again from memory once the program word (now in the Interrupt program register 110 to 113) which was in the program storage register in use at the time of the interrupt is completely processed upon return from the interrupt routine. The program syllable (PS1, PS2, PS3) counter 3504, the contents of which are also stored, indicates which syllable of the program word in use is being worked upon so as to start operation properly after the interrupt has been serviced.

In times T9, T10, and T11 of phase 3, the contents of the interrupt base address register 063 are stored in both the base address register 055 and the base program register 054. In phase 3 at times T10, T11, and T12, the binary number which corresponds to the particular position of the interrupt register which is being serviced is transferred into the M register 3007. That is, for example, if the third most significant bit (I3) in the interrupt register 3002 were being serviced for interrupt, then the binary number 011 would be placed in the least significant 3 bits positions of the M register 3007. This number is then added to the interrupt base address which is at this time contained in the K and E registers 3004 and 3005 by adders 3008 and 3009 and the result is stored in the L and M registers 3006 and 3007 momentarily. This result then is transferred to and stored in the program count register 057. At time T12 of phase 3, the instruction is completed and a jump is effected to PH1–T1 (phase 1, time 1). That is, at time T12, the instruction has been completed, a jump is made to PH1–T1.

Assume, for example, that the interrupt base address register 063 was set at 1000 for purposes of explanation. Assume further that the third interrupt is being processed. The third most significant bit in the interrupt register 3002 corresponds to the third interrupt. The number, then which would appear in the three least significant bits in the M register 3007 is 011 or binary 3. This added to the interrupt base address register 063 contents 1000 gives a result of 1003. Since, a fill of the first program step of the interrupt routine will be required, then "one" must be added to the program count register 057 contents 1003 to give 1004. At this address, 1004, in memory there will be found an unconditional transfer (UCT) instruction which will cause a jump in memory to the first program step of the number 3 interrupt routine. This would be an AOSP (automatic operating and scheduling program) routine which would cause providing of the correct service in the event of the number 3 interrupt. Using the octal system, if the base address, for example, were 1000, then the number 1 interrupt will cause the first UCT or unconditional transfer to be at the memory address location 1002 and in octal since there are 12 bits in the interrupt register 3002, the next 13 octal positions would be filled with unconditional transfers to the location of the first step of each of the routines servicing the interrupts which if all 12 interrupt register 3002 bits were being utilized, would extend to location 1015 in memory.

In the case of all of these interrupts, it has been stated that the machine switches from normal mode operation to control mode operation. What is meant by control mode operation is that a control mode flip-flop is set whenever an interrupt occurs and the machine goes into an interrupt routine. In this routine, special registers which are not normally used such as the interrupt base address register 063 are utilized.

The interrupt base address register 063 is utilized only during the control mode. Also, in the control mode, some instructions are used such as load special registers and interrupt routine return which instructions are not used in the normal mode of operation. These are specialized instructions for operation upon occurrence of an interrupt and transferring from the normal mode to the control mode. That is, the control mode is the operation which enables the automatic operating and scheduling control methods and means to take over and special instructions are required for this operation to execute that special program. An attempt to use such instructions in the normal mode will result in an illegal instruction which in itself will cause an interrupt. Control mode operation includes the concept that when these special instructions are used and the appropriate registers such as the interrupt base address register 063 are used, the concept includes the taking over by the method and means responsive to the automatic operating and scheduling control method and means and continuation in control mode until return to the normal mode occurs which normal mode involves operation of the computer in response to regular program instructions. The control mode is automatically initiated whenever an interrupt occurs, and return to the normal mode is initiated with an interrupt routine return (IRR) instruction. The TIO instruction also is given only in the control mode. The computer can be begun in the control mode and the AOSP immediately given jurisdiction manually by setting the control mode flip-flop 3540.

REPEAT ROUTINE

FIG. 15 is a flow chart of the operation which occurs on a repeat routine. All repeated instructions are initiated by a repeat (RPT) instruction which causes the computer to go through repeat routine.

The repeat instruction is a special kind of instruction in which the first syllable comprises the operator which includes the first 6 bit code for repeat and the following 6 bits for the designation of memory or program syllable for the first and second operand the and store addresses respectively. The second and third syllables of the repeat instruction are variant syllables. The first variant syllable contains the repeat count number which is the number of times the instruction will be iterated. The third syllable of the instruction, which is the second variant syllable, is a repeat increment syllable which is divided into three, four-bit portions. The first most significant four bits contain the increment affecting the first address or special syllable. The second four most significant bits contain the increment by which the second address or special syllable is modified. The four least significant bits of the repeat increment variant syllable are the increment by which the store or branch address is to be incremented. The fourth syllable contains the relative address of the instruction to be repeated. As in the case of the other instructions, any one of the last three syllables of the repeat instruction can be indexed and in such case an index syllable can appear before that syllable. In the special case of the repeat instruction, only instructions which are not more than one word or 4 syllables long can be repeated. For this reason any repeated instruction cannot be indexed.

Now refer again to FIG. 15, the flow chart of the repeat routine. When the repeat instruction occurs in a program, the computer processes the instruction by fetching the instruction to be repeated from memory and placing it into the repeat program register 044 to 047 in thin-film memory 3001, see FIG. 1. Then the repeat routine takes place. The repeat routine is initiated in response to the repeat instruction. The RPF repeat flip-flop of Command Control Flip-Flops 3545 (FIG. 4) is set in phase 1 at time T1. At times T1, 7, 8, and 9, the repeat count is read from the repeat count register 120 in thin-film memory 3001 and is decremented by 1 (one). At time T9 of phase 1 the computer compares to determine whether the repeat count syllable is equal to zero. If the repeat count syllable is not equal to zero, indicating there are more repeats to take place, then at time T10 of phase 1 the decremented repeat count is stored in the repeat count register 120. In the event that comparing the repeat count to zero did show that the count is a zero, then the repeat operation has been completed and at T9 the repeat RPF flip-flop and the first repeat FRP flip-flop of Command Control flip-flops 3545 are reset. This commpletes the operation at T9; and a jump is made to PH1–T1 for the next instruction to be fetched. As stated, in the event the count is not found to be zero, the decremented repeat count is stored in the repeat count register. At phase 1 times T11, T2 and T3, the operator syllable is fetched from the repeat program register 044 to 047 and is stored in the function register 3015 (see FIG. 1). The command which is set in the function register 3015 is executed in the subsequent phases depending upon the particular instruction. As a general note, the first time the instruction is iterated, the contents of the base address register 055 are added to the memory relative address syllable in the instruction, the contents of the base program register 054 are added to the branch relative address syllable and the result is stored in the repeat program register 044 to 047. That is, on the first iteration since the instruction to be repeated only contains an operator syllable which includes the command and three relative addresses and since each relative address has already had the contents of the base address register 055 added to it and then it has been stored back into the repeated program register 044 to 047. The addresses are no longer relative to BAR or BPR. For this reason only the first time the instruction is iterated are the contents added to the memory relative address syllables. That is, if the syllables are relative addresses, the contents of the base registers 055 or 055 are added, but, for example, as the case of a compare instruction where the first and second operands are compared, if there is a branch syllable, the relative branch syllable is the fourth syllable of the repeated instruction word. In such case, if will be the base program register 054 contents, not the base address register 055 contents that are added to the branch relative address. Only for the first time the repeated instruction is process may the indirect addressing be used.

Indirect addressing may be used on the first iteration only, since the indirect addressing is indicated in the most significant 12 bits in the three-address syllables in the instruction word by a one and since addition to the base address register 055 occurring may cause a one to be inserted in that most significant bit position anyway, the illustrative embodiment computer is intentionally designed to not enable a second indirect addressing function to take place.

After the first iteration, indexing is accomplished automatically by adding the contents of the appropriate portion of the repeat increment register 130 to 132 to the 16-bit direct address in the corresponding portion of the repeat program register 044 to 047.

If a branch occurs before the repeat count reduces to zero, the program will branch and both the repeat RPF flip-flop and first repeat FRP flip-flop will be reset. These flip-flops are in the Command Control flip-flops 3545 shown in FIG. 4.

This completes the operations and routines performed in the illustrative embodiment under phase 1.

PHASE 2

FIGS. 16, 17 and 18 are flow charts summarizing the phase 2 operations which are phase 2 operand fetch, phase 2 result store, and phase 2 branch, respectively. Referring to FIG. 16, assume a command has occurred in an instruction which calls for an operand fetch. At phase 2, time T1 (PH2–T1), bits 7 and 8 of the instruction word, which is in the function register 3015, determine whether the data will be fetched from the stack or from memory. If the operand or the first data word is to be fetched from the memory modules, then during times T1 through T9 the effective address is computed as shown in the computer address routine of FIG. 27. Then at times T10, T15, which correspond to memory times TM19 through TM28, the operand is transferred from the address of main memory computed to the arithmetic unit 3030 (see FIGS. 1 and 2) in accordance with the routine described in FIG. 29, which shows the flow chart for operand fetch from memory routine. The operand then appears in the A register 3033. At this point, if the instruction is a branch on bit instruction or a convert from binary to float instruction or a logical complement instruction, then a jump to time T1 phase 3 occurs and the fetch routine is ended. If the instruction is not one of these instructions, then a jump to time T1 phase 4 occurs and the fetch routine is ended.

In the event that at time T1 the operand to be fetched is to be fetched from stack, then during times T10 to T15 of phase 2, the operand is transferred from the stack to the arithmetic unit 3030 in accordance with the fetch from the top of the thin-film operand stack routine shown in the flow chart of FIG. 30 for operand transfer from the stack 3099 to the arithmetic unit 3030. After the operand has been transferred to the arithmetic unit 3030, if the instruction is a branch on bit (BRB) instruction, or a convert from binary to floating point (CBF) instruction, or a logical complement instruction, then a jump to PH3–T1 occurs and the fetch operation ends. If the instruction is not one of these, the jump is made to phase 4, time T1 and the fetch operation has ended.

As noted in the above description of FIG. 16, at times T1 through T9 of phase 2, the address is computed in the compute-address routine shown in FIG. 27. Inasmuch as this is one of the key functions of the computer and illustrates the operation of the computer module, this will be gone into in detail at this time.

Refer to FIG. 27, the flow chart showing the computation of a 16-bit memory direct address to be used to fetch an operand from, or store a result in, the main memory. After it has been determined at time T1 that the instruction is not a repeated instruction and that the operand is referenced to memory and not to stack, then the first step following this at time T1 is to determine whether a fill in the program storage registers 100 to 103 or 104 to 107 is required. If so, then the fill routine which is shown in detail in FIG. 24 is executed. The fill routine will be described in detail hereinafter. Assuming that a fill is not required or that the fill routine has been completed so that there is no fill routine required, at time T1 the appropriate program storage register 100 to 103 or 104 to 107 is use (see FIG. 1) is addressed and concurrently the program syllable counter 3504 (see FIG. 4) is decreased by one. It is determined in this time whether the syllable is indexed by looking at bit 8 of the operator syllable. If the bit 8 is a ONE then the syllable is to be indexed and if a ZERO, it is not. If the syllable is to be indexed, then at time T2 the index syllable is transferred from the program storage register in use, 100 to 103 or 104 to 107, to the E register 3005 (see FIG. 1). This is done by the transfer thin-film to E command which is a subcommand executed by the subcommand matix 3020. While reading of the index syllable into the E register 3005 is occurring, the program storage register in use, 100 to 103 or 104 to 107, is also addressed with the program syllable counter 3504.

The "address program storage register" subcommand is generated in the subcommand matrix 3020 which, in effect, causes the thin-film address register 3510, shown in FIGS. 1 and 4, to be opened to the program storage register in use, 100 to 103 or 104 to 107, in thin-film memory 3001 in the direction of the E register 3005 in accordance with the program syllable counter 3504 indication. That is, the address of the program syllable counter 3504 was transferred into the thin-film address register 3510 so that a syllable of the word in the program storage register in use, 100 to 103 or 104 to 107, at the next T time may be transferred into the E register 3005 at the next pulse time.

At time T2, the computer determines if a fill of the program storage register 100 to 103 or 104 to 107 is required or not prior to reading the memory address. If a fill is required, then the master control unit 3549 flip flop MC1 is set and the fill routine, which will be discussed hereinafter and shown in FIG. 24, is again gone through. If a fill is not required, then at time T3, the relative memory address syllable is transferred from the program storage register in use, 100 to 103 or 104 to 107, to the E register 3005. The L and M register 3006, 3007 and the master control flip flop 3549 are reset at this time. That is, the L and M register 3006, 3007 is set to ZERO since on the next T time the contents of the K and E register 3004, 3005 is going to be transferred to the L and M register. During the same time T3, the base address register 055 is addressed. Concurrently, if the MC1 master control flip flop 3549 (see FIG. 4) is reset, then the index syllable is transferred from the E register 3005 to the syllable register 3017. If the MC1 master control flip flop 3549 is set rather than reset, this transfer is not effected. At time T4, the base address register 055 contents is transferred to the K and E register 3004 and 3005. Concurrently, the memory address syllable is transferred from the K and E register 3004 and 3005 to the L and M register 3006 and 3007, while inhibiting the transfer of the most significant bit (E1) in the E register 3005 to the most significant bit position in the M register 3007. This is the bit which determines whether or not the address is an indirect address. In the case of an indirect address, this bit is a one. The most significant bit in the E register 3005 is instead transferred to the indirect address (IAF) flip-flop of Miscellaneous Control flip flops 3548 (see FIG. 4). At time T5, the base address is added to the memory address syllable in the L an M register 3006, 3007 by adders 3008 and 3009, and the result is stored in the L and M register 3006 and 3007. Concurrently, the (IAF) indirect address flip flop of miscellaneous control flip-flops 3548 is examined and if it has been set by a ONE, the indirect addressing routine shown in FIG. 26 is gone through. If the address is not an indirect address, that is, the indirect address (IAF) flip flop is not set, then bit 8 of the function register 3015 is examined to find out if the relative address syllable is indexed. If the syllable is indexed, then the indexing routine shown in FIG. 25 takes place, which is done between times T5 and T9. At the end of the indexing routine or in the event the relative syllable is not indexed, a jump to T10 occurs. The L and M register 3006 and 3007 at time T10 contains the 16-bit direct address of the operand or of the result store address. At time T10, the 16-bit address in the L and M register 3006, 3007 is the direct address of the operand or result store in memory from which the operand will be fetched or in which the result will be stored. This completes the compute address routine shown in FIG. 27.

Now refer to FIG. 29 which shows the operations involved in the operand transfer from main memory to the arithmetic unit 3030. This is the operand fetch from memory routine. At time T10 a jump to memory time TM19 occurs and access to main memory is requested by setting the request access to main memory (RFF) flip-flop of the Memory Control flip-flops 3551 of FIG. 4. If the memory module is busy and memory access is not granted within two real-clock times, then bit 8 of the interrupt register 3002 is set to indicate this fact. In this case, the interrupt causes the machine to go into the control mode when the automatic operating and scheduling control method and means take over and service this interrupt. If the memory module is not busy and access is granted to the memory modules, then at memory time TM–21 the memory address circuit (not shown) accepts the 16-bit direct address of the operand from the L and M registers 3006 and 3007. At memory time TM22, the request flip-flop (RFF of Memory Control flip-flops 3551) is reset and after delay during memory time TM23, at memory time TM24 the least significant memory syllable of the operand in the addressed word in the memory module is transferred from the memory information register to the M register 3007. At this time the memory control unit 3551 parity (PAR) flip flop is reset. The transfer is a parallel transfer of the least significant 12 bits in the memory word. At the next memory time TM25 the next least significant memory syllable of 12 bits is transferred in parallel to the M register 3007. Simultaneously, with transferring the next least significant memory syllable at memory time TM25 to the M register 3007, if the computer is in phase 2, the contents of the M register 3007 which are the least significant 12 bits are transferred into the A register 3033 of the arithmetic unit 3030.

If the computer is in phase 4, the transfer is effected into the B register 3031. The entry into the A or B register 3033 or 3031 in phase 2 or phase 4 respectively, is into the most significant 12 bits or most significant syllable of the corresponding A or B register 3033 or 3031. Transfer continues to be effected in accordance with the flow chart of FIG. 29 and as described hereinbefore, the description of the arithmetic unit of FIG. 2. In each case transfer is effected by parallel shift of a 12-bit syllable from the memory module into the M register 3007 and thence into the A or B register 3033 or 3031, shifting occurring serially 12 bits at a time into the next most significant syllable of the A or B register 3033 or 3031, depending upon whether the computer is in phase 2 or in phase 4, until the whole word of 48 bits has been transferred. At memory time TM28 parity is checked by resetting the L and M register 3007 and by sending the 49th bit of the word, the parity error bit, into the parity check logic. If a parity exists, bit 8 of the interrupt register 3002 is set which causes operation to occur in the control mode, in which mode the parity error routine is serviced. The sequence shown in FIG. 29 in the boxes indicates this serial-parallel transfer and the parity error transfer.

Now refer to FIG. 30 which shows the routine involved in operand fetch from the stack 3099 to the arithmetic unit 3030. Assume the operator syllable is the function register 3015. The stack operation is determined by bit 7 of the operator syllable in the function register 3015 for the first operand (bits 7 and 8 are the first operand indicator $A_1$). The stack operation is executed in phase 2. If a stack operation for a second operand is desired, it then is indicated by bit 9 of the operator syllable in the function register 3015 (bits 9 and 10 are the indicator $A_2$ for the second operand). The stack operation is executed in phase 4. If a stack operation is desired for the store operation, this is indicated by bit 11 of the operator syllable in the function register 3015 (bits 11 and 12 are the indicator $A_3$ for the result stored). The store in stack operation is accomplished in phase 6. In phase 2 only, if the contents of the A register 3033 is the same as the contents of the top of the stack 3099, the AES flip flop of Miscellaneous control flip-flops 3548 (FIG. 4) is set. In such case there is no need to fetch the operand from the stack into the A register 3033 since the data words are the same. Next determined in phase 2 is whether bit 8 in the function register is a ONE. If a ONE, the operation is a stack hold, and if a ZERO, stack normal. The stack 3099 will (effectively) rotate in the clockwise or counterclockwise direction depending upon whether the reverse flip-flop 3543 is set or reset. Count up of the stack 140 to 143, 144 to 147, 150 to 153, 154 to 157 occurs if the reverse flip-flop 3543 is in reset state. This is the normal state. Concurrently, if the instruction is a branch on bit, a convert binary to floating, or a logical complement instruction, then the machine jumps to time T1 of phase 3. If it is not one of these instructions, the jump is effected to time T1, phase 4.

These operations are accomplished only in the event that the information in the A register 3033 is identical to that in the stack 3099. If the A register contents are not equal to the contents at the top of the stack 3099, then the stack 3099 is addressed using the stack address counter 3508 to determine which stack of stacks 140 to 143, 144 to 147, 150 to 153 and 154 to 157 is addressed. The syllable counter 3507 determines which syllable in the stack address is being addressed.

The next step is to transfer the least significant syllable of the operand in the stack 3099 from the stack to the K and E register 3004 and 3005. The stack 3099 is then addressed sequentially syllable by syllable, counting up the syllable counter 3507 each time until the full word is transferred from the stack 3099 into the E register 3005 and each time from the E register 3005 into the A register 3033 in the arithmetic unit 3030. If the operation occurs in phase 2, this transfer is effected into the A register 3033 and if in phase 4, it is effected into the B register 3031. The remaining operations up to the end of this routine are apparent from the flow chart of FIG. 30.

Referring to the flow chart for phase 2 result store shown in FIG. 17, there are two instructions which can cause a result store in phase 2. These instructions are the clear address instruction and the store external request instruction. If a store external request (SER) instruction is received, then at time T1 of phase 2, transfer from the external request lines is effected directly into the A register 3033. If the instruction is a clear register A instruction (CLA) the A register 3033 was effectively cleared at time T4 of phase 1 so that phase 2 the all zeros which are the contents of the A register 3033 must be transferred to the stack 3099 or the memory address specified. Accordingly, at time T1 if an address to stack is specified, the zero contents of the A register 3033 are transferred into the stack in accordance with the stack routine of FIG. 32. If a memory address is indicated for transfer, then during times T1 through T9 the memory address is computed in accordance with the computer memory routine of FIG. 27 above-described. At times T10, T15 and memory times TM3 through TM8, the contents of the A register 3033 are stored in the memory module addressed at the address indicated in accordance with the routine for storing A register contents in main memory shown in the flow chart of FIG. 31. Following this storage operation, a jump is effected to PH1–T1 and the next instruction is serviced.

Refer to FIG. 18 which shows the flow chart for the phase 2 branch. There is only one instruction which can cause a branch to occur in phase 2. This is the unconditional transfer (UCT) instruction. In the event of an unconditional transfer program step indicated at times T1 through T9 of phase 2, the memory address of the branch indicated is computed in accordance with the compute memory address of branch program routine shown in FIG. 28. At times T10, T15 and memory times TM19 through TM28, the branch program word is transferred from main memory to the program storage register 100 to 103 or 104 to 107, in accordance with the routine shown in FIG. 33. A jump is then effected to phase 1 time T1 and the first step of the branch program is effected in accordance with the program now in the program storage register 100 to 103 or 104 to 107, depending upon which program storage register is in use.

This describes what is accomplished during phase 2 of the execution of an operting instruction.

PHASE 3

Phase 3 is an execute or partial-execute phase.

PHASE 4

Now will be described what is accomplished in phase 4 in the execution of an operating instruction. Refer to FIG. 19, the flow chart for the phase 4 operand fetch. In phase 4 the second operand is fetched in the identical manner in which the first operand was fetched in phase 2. A difference occurs, however, in that while in phase 2 the first operand was stored in the A register 3033, during phase 4 the second operand is stored in the B register 3031.

Now refer to FIG. 20 which shows the flow chart for the phase 4 result store. Assume that the information to be stored in this phase is already in the A register 3033.

The only instructions applicable to result store in phase 4 are the branch on bit instruction, the convert from binary to floating instruction, the logical complement, the store thin-film, and the transmit instructions. The branch on bit, the convert from binary to floating, the logical complement, and the store thin-film instructions are executed in phase 3. The transmit instruction does ont have an execute phase as such. Accordingly, in phase 4 at times T1 through T9, if the result is to be stored in memory, the memory address is computed in accordance with the compute memory address instruction routine of FIG. 27. If the result is to be stored in the stack 3099, then the store A register in stack routine, shown in FIG. 32, is effected in T10 through T13 times. If a transfer is to be effected into memory, then after the address instruction has been computed, the routine of FIG. 31 of store A register in memory is accomplished at times T10, T15 and memory times TM3 through TM8. After the store has been effected in either memory or the stack 3099, if the instruction applicable is a branch on bit, then a jump is effected at times T13 or T15 to phase 6 time T1. If the instruction is one of the other four instructions applicable, then the instruction is completed and the computer jumps to PH1–T1 for the next instruction. All storage of results occur at phases 2, 4, and 6, hence, for the store instructions not applicable to phase 4, storage occurs in either phase 2 or in phase 6.

Now refer to FIG. 21, the flow chart for phase 4 branch. Only one instruction, the branch on condition instruction, can cause a branch in phase 4. If a branch on condition occurs, then during times T1 through T9 the memory address of the branch program word is computed by the compute memory address of branch program word routine shown in FIG. 28. Then at times T10, T15 and memory times TM19 through TM28, the first program word of the branch is transferred from main memory to the program storage register used 100 to 103. This is effected by the branch program word transfer from main memory program storage register routine shown in FIG. 33. A jump is then effected to PH1–T1 and the instruction is complete, the computer then being ready to take the next instruction from the first program word of the branch.

PHASE 5 (EXECUTE)

Phase 5 is the execute phase.

PHASE 6 (STORE OR BRANCH)

Phase 6 is the store or branch phase for three-address instructions. Refer to FIGS. 22 and 23 which are flow charts for the store and branch operations respectively.

Now refer to FIG. 22 wherein is shown the flow chart for the phase 6 result store routine. This is the routine for execution of storing the result of an operation according to the indicator represented by the last 2 bits of an operator syllable.

If bit 11 of the operator syllable is reset for a zero, then the operation is a stack store. In that case at times T10 through T13 the contents of the A register 3033 are stored in the stack in accordance with the store A register in stack routine illustrated in FIG. 32. After this routine is accomplished a jump is executed to PH1–T1 for the next instruction.

In the event that the 11th bit of the operator syllable is a one, this indicates a memory store. If a memory store, at time T1 through T9 the address in memory in which this data word is to be stored is computed in accordance with the compute memory address routine described in the flow chart of FIG. 27.

At times T10, T13 and memory times TM3 through TM8, the contents of the A register 3033 are transferred and stored in the main memory in accordance with the store A register in main memory routine described in FIG. 31. After this, a jump is executed to time T1, phase PH1 (PH1–T1) for the next instruction.

FIG. 23 is the flow chart for the phase 6 branch. Assume that the conditions were right to take a branch in the program and the branch flip flop was set prior to phase 6. At times T1 through T9 of phase 6, the address at which will be found the first program word of the branch is computed in accordance with the compute memory address of branch program word routine illustrated in FIG. 28. The first program word is transferred from that main memory address to the program storage register 100 to 103 at times T10, T13 and memory times TM19 through TM28, according to the branch program word transfer from main memory to program storage register routine illustrated in the flow chart of FIG. 33. In any branch the program storage register 100 to 103 is the one used. A jump is then effected to PH1–T1 for the next instruction.

The mechanization of the subcommands for the phases is presented in tabular form after the discussion of phases and of routines herein.

Now refer to FIG. 28, the flow chart for memory-address-compute routine (branch). The memory-address-compute routine for branch is very similar to that of computing the memory-address-compute routine hereinabove described for FIG. 27 and will not be repeated in detail. However, although similarity exists in that the syllable can be indexed, no indirect address for a branch is possible. Also, instead of adding the contents of the base-address register (055) to the relative address in memory, the contents of the base program register 054 are added to the relative memory address to provide the effective address at which the first program step of the branch is located in memory.

Now refer to FIG. 31, the flow chart for store result in memory routine. Assume the 16-bit direct address has been computed and is in the L and M register 3006 and 3007 (see FIG. 1). The first step is to transfer the least significant syllable of 12 bits from the A register 3033 in the arithmetic unit 3030 to the E register 3005. The A register 3033 is then shifted right end-around 12 places. This is effected in accordance with the shift 12 signal of FIG. 102. Concurrently, while being shifted into the E register, the least significant syllable is shifted into the most significant syllable position in the A register 3033 and each of the most significant, the second most significant syllable and the third most significant syllable in the A register 3033 is shifted right by 12 bits or one syllable. Hence, the second most significant syllable is now in the third most significant syllable portion and the third most significant syllable is in the least significant syllable portion. This occurs at memory time TM3. At this time, the address which is in the L and M register 3006, 3007 is examined to see whether the memory address is within bounds. This is effected by the comparator 3010 and 3011 for the upper and lower registers 3012 and 3013 respectively. The comparator 3011 compares the contents of the L and M register 3006, 3007 with the contents of the lower limit register 3012 to insure that the contents of the L and M register 3006, 3007 are greater than the lower limit. The comparator 3010 similarly compares the contents of the L and M register 3006 and 3007 with the contents of the upper limit register 3012 to insure that the contents of the L and M registers 3006 and 3007 are less than the contents of the upper limit register 3012. If the address is not within the bounds, the interrupt register bit 6 is set and a jump to memory time 0 is effected. A jump then occurs to PH1–T1 to process the interrupt in the control mode. If the memory address is within bounds, the request (RFF) flip flop of memory control flip flops 3551 (see FIG. 4), which requests access to the main memory, is set. The memory control 3551 parity (PAR) flip flop is reset so that parity may be generated. If memory is busy and access is not granted within two real-clock times, bit 8 of the interrupt register 3002 is set, a jump to memory time 0 is effected and when the instruction is completed, the computer enters the interrupt routine. If memory access is granted within two real-clock times, then the least significant syllable of the A register 3033 which is now located in the E register 3005 is transferred to the M register 3007. This is a data syllable.

Before the least significant syllable was transferred from the E register 3005 to the M register 3007, as soon as memory access was granted, the initial contents of the L and M register 3006, 3007, that is, the 16-bit direct address was admitted to the memory address circuit. This address is decoded memory so that, when the data word comes in to the memory information register (not shown) which is 49 bits long, it will be placed in the proper location in memory. At memory times 5, 6, and 7, the next least significant syllable in the A register 3033 is transferred directly to the M register 3007 and concurrently a shift of 12 places to the right in the A register 3033 occurs as hereinbefore described. Concurrently again, the least significant bits are end-around shifted to set up conditions for the serial transfer of the next 12 bits parallelly from the A register 3033 to the M register 3007.

In the next two TM times TM6 and TM7, this step is repeated for the third and fourth syllables, the entire data word now remaining in the A register 3033 by the four end-around shifts of 4 syllables, is a carbon copy of the four syllables which were transferred out and now appear in the memory information register (not shown). At memory time TM8, the parity bit has been generated and transferred to the M register 3007, and the memory control 3551 request flip-flop (RFF) is reset. A jump is effected to memory time TM0 and the contents of the A register are now stored in the 16-bit memory address which was in the L and M register 3006, 3007 at the start of this routine and the routine is completed.

Now refer to FIG. 32, the flow chart for store result in stack routine. If the result is to be stored in the stack 3099, it is in the A register 3033. Storing in stack 3099 is always accomplished from the A register 3033. In phase 2, bits 7 and 8, in phase 4, bits 9 and 10, and in phase 6, bits 11 and 12 of the operator syllable, which is located in the function register 3015 (see FIG. 1) determine whether a stack normal or stack hold is indicated. The even bit 8, 10, or 12 of a one (or set) is a stack hold, and if a zero (or reset) is a normal stack store.

If the stack store is a stack normal operation, then the machine must count down the stack address and this is effected by counting down the stack address counter 3508 (see FIG. 4). If a hold, then the stack counter 3508 is not counted. In either case a jump to time T10 is now effected. At time T10 the stack 3099 is addressed at the stack register indicated by the stack address counter 3508. That is, in accordance with the count of stack address counter 3508, one of stack registers 140 to 143, 144 to 147, 150 to 153, or 154 to 157 in thin-film memory 3001 is addressed. The least significant syllable is then transferred from the A register 3033 to the E register 3005. Concurrently, a shift of 12 places to the right takes place in the A register 3033 so that the least significant syllable of the A register 3033 moves to the most significant syllable position in that register. Since storing in the stack 3099 uses the stack address counter 3508 and the syllable counter 3507, the syllable counter 3507 is counted up. This operation is then repeated two additional times, and then repeated a fourth time for the fourth syllable, as shown in the box of time T13 where as in the first three times the stack 3099 is addressed with the stack address counter 3508, the most significant syllable of the result is transferred from the least significant position in the A register 3033 where it appears at that time into the E register 3005, the A register 3033 is shifted right 12 places, the last time so as to have completed carbon copying of the word in the A register 3033 into itself, and the syllable counter 3507 is counted up concurrently to zero since the entire word which was in the A register 3033 is now stored in the stack register selected. The "store result in the stack" routine can occur in any of phases 2, 4, or 6. Once this storing is completed, the miscellaneous control 3548 "A register equals stack" (AES) flip-flop is set. Setting the "A equals stack" (AES) flip-flop of flip-flops 3548 enables the computer upon fetching the first operand in the next instruction, to save 5 pulse times since the information in the A register 3033 is the same information which appears at the top of the stack 3099, if the next operation is also a fetch operand from the top of the stack operation. If a memory fetch, of course, the machine does not save these 5 pulses.

Since the branch routine is very similar to the fill routine the fill routine will be discussed first.

FILL ROUTINE

The instructions for this computer are packed into the ferrite core memory as a series of four syllable words (4 syllables of 12 bits each equaling 48 bits plus a parity bit), program words appearing at discrete addresses. A program word is *always 4* syllables whereas an *instruction* may *vary* from 1 to 7 syllables. Since an instruction is taken syllable-by-syllable, considerable reduction in syllable access time is effected by reading the syllables from a thin-film program storage register 100 to 103 and 104 to 107 rather than from core memory. The process of transferring a program word from core memory to the thin-film program storage register 100 to 103 or 104 to 107, except as part of a branch routine, is termed "Fill." The fill routine is a routine for filling program storage register PSR1 100 to 103 when necessary. Another routine called overlap, which is identical to the fill routine, is used in cases of overlap that is when one of the program storage registers 100 to 103 and 104 to 107 is empty. The below description refers to the fill routine.

Fill of program storage register PSR1 100 to 103 is required whenever the least significant program syllable has been read out for use in an instruction execution. The least significant program syllable is read out by addressing the program storage register #1, 100 to 103, with the count 000 in the three bit program syllable counter 3504, or if by addressing the PSR2 register 104 to 107, with the count 100 in the three-bit program syllable counter 3504, if an overlap has just previously occurred. Simultaneously, counting down from 000 to 111 resets program-register fill PF1 flip flop 3505 or counting down from 100 to 011 resets program register full PF2 flip-flop in the same unit 3505. The reset state of both PF1 and PF2 flip-flops 3505 generates the fill signal to initiate the fill routine with a jump to memory time TM15.

Now refer to the flow chart of FIG. 24, the flow chart for fill routine. The fill routine comprises fetching the current program count from the program count register 057 (see FIG. 1) incrementing the count by placing the number in the L and M register 3006 and 3007 and adding ONE to that count and using the incremented count to address the next program word in the main memory. The incremented count is also stored back into the program count register 057 to record the current program word stored in the program storage register #1, 100 to 103. When access is granted to main memory, the memory address circuit accepts the 16-bit direct address of the program and transfers the program word to the memory information register (not shown). Using the input syllable counter 3506 counts of 00 through 11, the program word is stored in the program storage register PSR1 100 to 103 in least to most significant syllable order. When the full is completed the program-fill flip flop PF1 of flip-flops 3505 is set at memory time TM28 and a jump to memory time TM0 is effected. Also, the program syllable counter 3504 (PS1, PS2, PS3) is reset to 011.

With the PF1 flip-flop of program register full, flip-flops 3505 thus set, the Fill signal disappears and computer timing resumes. Whenever a Fill is required the T time at which the Fill was required is maintained until the full routine is completed and operation is resumed at this retained T time.

INDEXING ROUTINE

When indexing is desired, the syllable to be indexed is preceded in the instruction string of syllables by an index syllable. The index syllable is first transferred from the program storage register in use PSR1 100 to 103 or PSR2 104 to 107, to the E register 3005 and thence to the syllable register 3017 (see FIG. 1). The syllable to be indexed is next transferred from the program storage register in use 100 to 103 or 104 to 107, through the E register 3005 to the M register 3007.

If the syllable to be indexed is a relative address, the base address register 055 contents or the base program register 054 contents are added to the contents of the L and M register 3006 and 3007 and then indexing is performed. If the syllable to be indexed is a special syllable such a variant syllable or a thin film address, the indexing is performed using the K and E register and L and M register after which the indexed special syllable is transferred from the M register to the syllable (S) register. The indexing routine is shown in the flow chart of FIG. 25. The index syllable appears in the syllable register 3017 as three 4-bit partial addresses which may be referred to as XRA, XRB, and XRC. There are 15 index registers octal 001 to 017 in the thin film, any one of which can be addressed by the syllable register 3017. The syllable register contents comprise 12 bits which are three 4-bit thin-film partial addresses. Each of the four bits refers to one of the 15 index registers, although each of the 4-bit addresses may be to the same address, or two of these 4-bit partial addresses in the syllable register 3017 can refer to the same index register.

Assuming three different index registers are addressed by the syllable register 3017, then the contents of each of those three index registers are added to the syllable or the direct address contained in the L and M register 3006 and 3007.

The three partial addresses (4 bits to each partial address) in the syllable register 3017 respectively comprise bits S1–S4, S5–S8, and S9–S12. If the XRA address is not zero, i.e., if any of bits S1, S2, S3, or S4 is a one), the XRA address subcommand forms three bits which are combined with the four bits determined by S1, S2, S3, and S4 to form the 7-bit thin-film address required to address the first specific index register. That is, bits S1 through S4 are scanned (see FIG. 93 for the scan logic circuitry), and if not 0000, are combined with the three most significant bits which are determined by the AXR subcommand to form the complete specific index register address comprising "AXR, Scan A." The 16-bit contents of the first index register address XRA are transferred to the K and E register 3004 and 3005 (FIG. 1) and then are added to the syllable in the L and M register 3006 and 3007, this being effected by the full add L and M subcommand (FALM). If the XRA address is zero, the transfer and addition are not formed, since if the address is zero, the machine is not addressing an index. In a like manner the contents of index registers XRB and XRC are successively transferred to the K and E register 3004 and 3005 and added to the L and M register 3006 and 3007. At the end of the index routine, the L and M register 3006, 3007 thus contains the 16–bit number representing the sum of the syllable to be indexed plus the base address register 055 contents, plus the contents of three selected index registers.

INDIRECT ADDRESSING ROUTINE

During the initial formation of a 16-bit direct address, bit one of the memory relative address syllable is examined, and, if a ONE, the indirect address flip-flop IAF of miscellaneous control flip-flops 3548, is set (see FIG. 4). If the IAF flip-flop is set (the bit is a one), this indicates that the 16-bit address being formed is an indirect address (i.e., the address of an address). The 16-bit base address (from the base address register 055) is then added to the memory relative address excluding the most significant bit of the relative address from the addition. This is effected in the illustrative embodiment computer by inhibiting the transfer of the first bit in the E register 3005 to the M register 3007. The resulting 16-bit indirect address is now stored in the L and M register 3006, 3007 and now memory access is requested, at memory time TM19.

Now refer to FIG. 26, the flow chart for the indirect addressing routine. At memory time TM19, the request-access-to-main memory flip-flop RFF of the memory control group 3551 (see FIG. 4) is set. If memory access is granted at memory time TM20, the 16-bit indirect address in the L and M register 3006 and 3007 is accepted by the memory address circuit. After a memory delay during times TM22 and TM23, the addressed information is read into the memory information register (not shown) of the memory module selected. At time TM24, the least significant memory syllable (i.e., the address in the module) is transferred from the memory module memory information register (not shown) to the M register 3007. At time TM25, the address syllable is transferred from the M register 3007 to the E register 3005 and the next least significant memory syllable (i.e., the four-bit memory module address, bits M9 through M12) of the memory module memory information register plus indirect address indicator bits M8 and snag bit M7, which is a flag bit which sets up interrupt flip-flop 3550 (see FIG. 4) is transferred to the M register 3007. At time TM26, since the indirect address flip-flop IAF is still set:

(1) The four-bit memory module address is transferred from the M register 3007 to the K register 3004. This is the second least significant syllable which was contained in the memory module memory information register (not shown).

(2) The indirect address indicator bit M8 is transferred to the indirect address flip-flop IAF. If this bit is a zero there is no further indirect address indicated and the indirect address flip-flop IAF will be reset. If snag bit M7 is a one, bit 10 of the interrupt register 3002 is set. This is a flag to the programmer and which causes an interrupt which interrupt is serviced in the control mode by the automatic operating and scheduling methods and means (AOSP).

If bit M8 is a one, the K and E register 3004 and 3005 now contains a 16-bit indirect address whereas if bit M8 is a zero, the K and E register 3004, 3005 now stores a partial direct address (i.e., address of data). There is a possibility that an index if present may have to be added which would actually modify the address now in the K and E register 3304, 3005 to give the actual direct address. At memory time TM27 the remaining two syllables are brought into the M register 3007 since all four syllables must be brought in in order to check parity. At memory time TM28 parity is checked, the L and M register 3006 and 3007 is reset and memory timing jumps to zero. Upon detection of memory time zero (MT0) the computer timing resumes and the state of the miscellaneous controls 3548 indirect flip-flop IAF is checked. If the state of the indirect address flip-flop IAF is one, the 16-bit address in the K and E register 3004, 3005 is an indirect address whence another jump to memory time T18 immediately occurs and the indirect addressing routine above-described is repeated. Conversely, if the indirect address flip-flop IAF is a zero, computer timing continues (no jump to memory time TM19 occurs). If indexing is necessary at this point as determined by the presence of an index syllable, then the indexing routine is followed at this point.

Now refer to FIG. 33, the flow chart for branch routine. The branch routine is in many respects very similar to the fill routine described in the description of FIG. 24. At the beginning, assume that the branch flip flop BRF of miscellaneous controls flip-flops 3548 has been set by the occurrence of the right conditions necessary for a conditional branch or by an unconditional branch being specified. At the beginning of the branch routine a 16-bit direct address is present in the L and M register 3006 and 3007. This was computed by taking the branch syllable, adding the contents of the base program register 054 to it, performing the index routine if indexing was called for, and placing the result in the L and M register 3006, 3007.

At memory time TM19 the new program count, which is the computed 16-bit branch address, is transferred from the L and M register 3006 and 3007 through the K and E register 3004 and 3005 into the program count register 057 (see FIG. 1). The program syllable counter 3504 (see FIG. 4) is reset to 011. Both the program register PF1 and PF2 full flip-flops 3505 are also reset.

Access to main memory is requested by setting the request access to main memory flip-flop RFF of memory control flip flops 3551 (see FIG. 4). At memory time TH20, if memory access is not granted within two real-clock times, bit 8 of the interrupt register 3002 is set and the interrupt routine will follow. Assuming memory access is granted at memory time TM20, the 16-bit direct address in the L and M register 3006, 3007 is admitted to the memory address circuit (not shown) and at TM22 the request flip flop RFF is reset. At time TM23 memory operation occurs resulting in memory transfer into the memory information register (not shown). At memory time TM24 the least significant memory syllable is transferred to the M register 3007 and the parity flip-flop PAR of memory control flip-flops 3551 is reset. At memory times TM25, the least significant memory syllable is transferred from the M register 3007 through the E register 3005 into the first program storage register 100 to 103. A branch program word is always stored in the first program storage register 100 to 103. At the time of this transfer the second least significant memory syllable is transferred from the memory information register (not shown) into the M register 3007. At memory time TM26 the third least or the second most significant memory syllable is transferred in the M register 3007 while the second least significant memory syllable is transferred through the E register in the first program storage register in syllable 101. At memory time TM27 the most significant memory syllable is transferred from memory into the M register 3007 while the second most significant syllable is transferred through the E register 3005 into syllable address 102 of the first program storage register 100 to 103. Finally, while the parity bit enters the parity check circuit, the most significant syllable is stored into syllable address 103 of the program storage register 100 to 103.

Memory time TM28 the PF1 flip-flops of program fill flip-flops 3505 (FIG. 4) is set, the L and M register 3006, 3007 is reset and parity is checked. A jump at memory time TM28 is made to memory TM0 and the branch program word has been stored in the first program storage register 100 to 103.

Operation in each of the phases has been discussed in conjunction with the pertinent flow charts. Certain routines common to various phases of computer operation and the charts pertaining thereto were also discussed to present an orderly development of the various functions during each phase.

All computer instructions are executed using a minimum of one phase in the case of a no-address instruction and a maximum of 6 phases for certain three-address instructions. In general, the phase functions are presented in the mechanization of computer logic in columns 84–99 hereinbelow. Inasmuch as this mechanization involves many terms and abbreviations including terms nad abbreviations used in the above description and in the drawings accompanying this application, a glossary of such terms and abbreviations is now presented first, before the mechanization charts.

The glossary is divided into separate tabular presentations for (1) computer instructions and instruction groups containing the instruction, (2) computer subcommands, (3) computer flip-flops, (4) miscellaneous terms. A map of the thin-film registers is illustrated in FIGS. 78A1, 78A2, 78B1 and 78B2 taken as a composite figure. Following parts 1–4 of the glossary appears the mechainzation charts. The glossary follows:

GLOSSARY OF TERMS AND ABBREVIATIONS

Computer instructions and instruction gorups

| Instruction | Octal Code | Description and Instruction Groups Containing the Instruction |
|---|---|---|
| ACE | 72 | Alphanumeric Compare Equal. PH6BR, JAZZ, JAZZM, OOB, OOBS, BRCEQ, BOOB. |
| ACG | 71 | Alphanumeric Compare Greater. PHGBR, JAZZ, JAZZM, OOB, OOBS, BRCGR, BOOB. |
| ACL | 70 | Alphanumeric Compare Less PHGBR, JAZZ, JAZZM, OOB, OOBS, BRCLS, BOOB. |
| AIF | 40 | Adjust and Insert, Field. JAZZ, JAZZM, FLDA, FLDC, FLD, PH4VS, FLDA. |
| BAD | 65 | Binary Add. BFAA, BFAD, PH6ST, OOBS, OOS, JAZZ, JAZZM. |
| BAF | 43 | Binary Add, Field. FLD, PH4VS, FLDS, PH6ST, JAZZ, JAZZM. |
| BCL | -------- | BRB+CBF+LCM. |
| BDV | 60 | Binary Divide. BFMD, BFDV, PH6ST, OOBS, OOS, JAZZ, JAZZM. |
| BFAA | -------- | BAD+BSU+FAD+FSU. |
| BFAD | -------- | BAD+FAD. |
| BFDV | -------- | BDV+FDV. |
| BFMD | -------- | BDV+BMU+FDV+FMU. |
| BFMU | -------- | BMU+FMU. |
| BFSU | -------- | BSU+FSU. |
| BMU | 61 | Binary Multiply. BFMD, BFMU, PH6ST, OOS, OOBS, JAZZ, JAZZM. |
| BOOB | -------- | OOB+FLDB. |
| BRB | 26 | Branch on Bit. PH6BR, BCL, PH4ST, JAZZ. |
| BRC | 11 | Branch on Condition. |
| BRCEQ | -------- | CEF+ACE+CEQ. |
| BRCGR | -------- | CGF+ACG+CGR. |
| BRCLS | -------- | (ACL+CLS+CLF) PH5, MC5. |
| BSF | 42 | Binary Subtract, Field. FLD, PH4VS, FLDS, PH6ST, JAZZ, JAZZM. |
| BSU | 64 | Binary Subtract. BFAA, BFSU, PH6ST, OOS, OOBS, JAZZ, JAZZM. |
| CBF | 25 | Convert Binary to Floating Point. BCL, PH4ST, JAZZ. |
| CEF | 52 | Compare Equal, Field. BOOB, JAZZ, JAZZM, BRCEQ, FLDB, PH6BR, FLDS, FLD, PH4VS. |
| CEQ | 76 | Compare Equal. BRCEQ, OOB, PH6BR, BOOB, OOBS, JAZZ, JAZZM. |
| CGF | 51 | Compare Greater, Field, BOOB, JAZZ, JAZZM, BRCGR, FLDB, PH6BR, FLDC, FLD, PH4VS. |
| CGR | 75 | Compare Greater. BRCGR, OOB, PH6BR, BOOB, OOBS, JAZZ, JAZZM. |
| CLA | 20 | Clear Address CLASER. |
| CLASER | -------- | CLA & SER. |
| CLF | 50 | Compare Less, Field. BOOB, JAZZ, JAZZM, BRCLS, FLDB, PH6BR, FLDC, FLD, PH4VS. |
| CLS | 74 | Compare Less. BRCLS, OOB, PH6BR, BOOB, OOBS, JAZZ, JAZZM. |
| CSE | 32 | Character Search. PH6BR, PH4VS, JAZZ, JAZZM. |
| FAA | -------- | FAD, FSU. |
| FAD | 67 | Floating Add. BFAA, BFAD, FAA, FLT, PH6ST, OOS, OOBS, JAZZ, JAZZM. |
| FDM | -------- | FDV, FMU. |
| FDV | 62 | Floating Divide. BFMD, FDM, BFDV, FLT, PH6ST, OOS, OOBS, JAZZ, JAZZM. |
| FLD | -------- | AIF+SAF+BSF+BAF+LOF+LXF+LCF+LAF+CLF+CGF+CEF. |
| FLDA | -------- | AIF+SAF. |
| FLDC | -------- | AIF+SAF+CLF+CGF+CEF. |
| FLDS | -------- | LOF+LXF+LCF+LAF+BSF+BAF. |
| FLT | -------- | FAD+FDV+FSU+FMU. |
| FMU | 63 | Floating Multiply. BFMD, BFMU, FDM, FLT, PH6ST, OOS, OOBS, JAZZ, JAZZM. |
| FSU | 66 | Floating Subtract. BFAA, BFSU, FAA, FLT, PH6ST. |
| HLT | 01 | Halt. RTCC, HLTIRR. |
| HLTIRR | -------- | HLT+IRR. |
| II | -------- | Illegal Instruction. |
| IRR | 05 | Interrupt Return. HLTIRR, ISRR, ISJR. |
| ISJR | -------- | SRR+SRJ+IRR+IRJ. |
| ISRJ | -------- | SRJ+IRJ. |
| ISRR | -------- | SRR+IRR. |
| JAZZ | -------- | LCM+CBF+BRB+JAZZM. |
| JAZZM | -------- | LTF+FSR+CSE+TRM+TRS+SHF+AIF+SAF+BSF+BAF+LOF+LXF+LCF+LAF+CLF+CGF+CEF+LXR+LOR+LAN+BVD+BMN+FDV+FMU+BSU+BAD+FSU+FAD+ACL+ACG+ACE+CLS+CGR+CEQ. |

GLOSSARY OF TERMS AND ABBREVIATIONS—Continued

| Instruction | Octal Code | Description and Instruction Groups Containing the Instruction |
|---|---|---|
| LAF | 47 | Logical AND, Field. FLD, PH4VS, FLDS, PH6ST, LOCAXF, JAZZ, JAZZM. |
| LAN | 56 | Logical AND. PH6ST, LAXOR, OOS, OOBS, JAZZ, JAZZM. |
| LAXOR | | LXR+LOR+LAN. |
| LCF | 46 | Logical COMPLEMENT, Field. FLD, PH4VS, FLDS, PH6ST, LOCAXF, JAZZ, JAZZM. |
| LCM | 24 | Logical COMPLEMENT. BCL, PH4ST, JAZZ. |
| LOCAXF | | LOF+LXF+LCF+LAF. |
| LOF | 44 | Logical OR, Field. FLD, PH4VS, FLDS, LOC, AXF, JAZZ, JAZZM. |
| LOR | 55 | Logical OR, PH6ST, LAXOR, OOS, OOBS, JAZZ, JAZZM. |
| LSR | 31 | Load Special Register PH4VS, JAZZ, JAZZM. |
| LTF | 30 | Load Thin Film. PH4VS, JAZZ, JAZZM. |
| LXF | 45 | Logical EXCLUSIVE OR, Field. FLD, PH4VS, FLOS, PH6ST, JAZZ, JAZZM. |
| LXR | 54 | Logical EXCLUSIVE OR. LAXOR, LOCAXF, OOS, OOBS, JAZZ, JAZZM. |
| NOP | 00 | No Operation. RTCC. |
| OOB | | ACL+ACG+ACE+CLS+CGR+CEQ. |
| OOBS | | OOB+OOS. |
| OOS | | LXR+LOR+LAN+BDV+BMU+FDV+FMU+BSU+BAD+FSU+FAD. |
| PH4ST | | STF+CBF+TRS+BCL. |
| PH4VS | | FLD+LTF+LSR+CSE+SLC+SHF+TRM. |
| PH6BR | | BRB+CSE+FLDB+OOB+TIO. |
| PH6ST | | FLDS+OOB+SHF+TRM. |
| RPT | 10 | Repeat. |
| RTCC | | (NOP+HLT+SSU+SSD) $\overline{IRJ}$. |
| RVS | 06 | Reverse Stack. |
| SAF | 41 | Strip and Adjust, Field. FLDC, FLD, PH4VS, FLDA, JAZZ, JAZZM. |
| SER | 21 | Store External Requests. CLASER. |
| SHF | 36 | Shift. PH4VS, PH6ST, JAZZ, JAZZM. |
| SRJ | 14 | Subroutine Jump. SRJR, ISRJ, ISJR. |
| SRJR | | SRJ+SRR. |
| SRR | 04 | Subroutine Return. SRJR, ISRR, ISJR. |
| STF | 15 | Store Thin Film. PH4ST. |
| SSD | 03 | Step Stack Down. RTCC. |
| SSU | 02 | Step Stack Up. RTCC. |
| TIO | 16 | Transmit to Input/Output. PH6BR. |
| TRM | 34 | Transmit Modified. PH4VS, PH6ST, JAZZ, JAZZM. |
| TRS | 35 | Transmit. PH4ST, JAZZ, JAZZM. |
| UCT | 22 | Unconditional Transfer. |
| XLC | 12 | Index Limit—Compare PH6BR, PH4VS. |

In the above groups, each of the subcommands are performed in carrying out the instruction. For example, in CGF, BOOB including operand operand branch (OOB) occurs. The computer subcommands set up by the subcommand matrix controls unit 3020 follow:

COMPUTER SUBCOMMANDS

| Subcommand | Function |
|---|---|
| ABAR | Address the Base Address Register (BAR) contained in the thin film memory. |
| ABPR | Address the Base Program Register (BPR) contained in the thin film memory. |
| ACCR | Address the Character Count Register (CCR) contained in the thin film memory. |
| AIAR | Address the Interrupt Base Address Register (IAR) contained in the thin film memory. |
| AIDR | Address the Interrupt Dump Register (IDR) contained in the thin film memory. |
| AIPR | Address the Interrupt Program Register (IPR) contained in the thin film memory, with the syllable counter (SY1 & SY2). |
| AISR | Address the Interrupt Storage Register (ISR) contained in the thin film memory, with the syllable counter (SY1 & SY2). |
| ALIM | Address an Index Limit Register (LIM) contained in the thin film memory, with the S Register, and the syllable counter (SY1 & SY2). |
| APCR | Address the Program Count Register (PCR) contained in the thin film memory. |
| APDR | Address the Power Failure Dump Register (PDR) contained in the thin film memory, with the Syllable Counter (SY1 & SY2). |
| ASPRA | Address the Program Storage Register (PSR) contained in the thin film memory, with the Program Syllable Counter (PS1 & PS2). |
| APSRIS | Address the Program Storage Register (PSR) contained in the thin film memory, with the Input Syllable Counter (IS1 & IS2). |
| APSRSY | Address the Program Storage Register (PSR) contained in the thin film memory, with the Syllable Counter (SY1 & SY2). |
| ARCR | Address the Repeat Count Register (RCR) contained in the thin film memory. |
| ARIRIS | Address the Repeat Increment Register (RIR) contained in the thin film memory, with the Input Syllable Counter (IS1 & IS2). |

COMPUTER SUBCOMMANDS—Continued

| Subcommand | Function |
|---|---|
| ARPRIS | Address the Repeat Program Register (RPR) contained in the thin film memory, with the Input Syllable Counter (IS1 & IS2). |
| ARTC | Address the "Real Time Count Register" (RTC) contained in the thin film memory, with the Syllable Counter (SY1 & SY2). |
| ASAR | Address the Subroutine Base Address Register (SAR) contained in the thin film memory. |
| ASSR | Address the Subroutine Storage Register (SSR) contained in the thin film memory. |
| ASTK | Address the Stack contained in the thin film memory, with the Stack Counter (SA1 & SA2) and the Syllable Counter (SY1 & SY2). |
| ATFC | Address the thin film C-register (TFC) contained in the thin film memory, with the Syllable Counter (SY1 & SY2). |
| ATFS | Address the thin film addrsss indicated by the S-Register. |
| ATFSSY | Address the thin film address indicated by the S-Register and the Syllable Counter (SY1 & SY2) |
| ATFSW | Address the thin film address indicated by the Control Panel Address Switches. |
| AXIR | Address the Index Increment Register (XIR) contained in the thin film memory. |
| AXR | Address an Index Register contained in the thin film, with the S-Register. |
| CDD | Count down the D counter (shift counter) i.e., decrease the count by one. |
| CDIS | Count down the Input Syllable Counter (SY1 & SY2) i.e., decrease the count by one. |
| CDSTK | Count down the Stack Counter (SA1 & SA2) i.e., decrease the count by one. |
| CDSY | Count down the Syllable Counter (SY1 & SY2) i.e., decrease the count by one. |
| CKPAR-TM28 | Check parity of the core memory word. |
| CMPRSF | Complement the Reverse Stack Counting flip flop (RSF). |
| CMPIA | Complement the most significant syllable, including the sign bit, (A1 to A12), of the A register. |
| CMP3A | Complement the three least significant syllables, the thirty-six least significant bits (A13 through A48), of the A Register. |
| CUD | Count up the D Counter (shift counter) i.e., increase the count by one. |
| CUIS | Count up the Input Syllable Counter (SY1 & SY2) i.e., increase the count by one. |
| CUSTK | Count up the Stack Counter (SA1 & SA2) i.e., increase the count by one. |
| CUSY | Count up the Syllable Counter (SY1 & SY2) i.e., increase the count by one. |
| CYTA12 | Enable the carry out of A2 adder stage into A12 adder stage. |
| CYTA48 | Enable the carry out of A1 or A2 adder stage into A48 adder stage. |
| EAL | Enable the Logical end around (least significant to most significant) A-Register shift path. |
| EANL | Enable the non-logical end around (least significant to most significant) A-Register shift path. |
| EO | Enable the logical end off A-Register shift path. |
| EONL | Enable the non-logical end off A-Register shift path. |
| FALM | Add the contents of the K/E register to the contents of the L/M registers, result into L/M registers. |
| FA1 | Adder extension to include Bit A1. |
| FAIA | Add the most significant syllable of the A-Register (A2 through A12) to the most significant syllable of the B-Register (B2 through B12), the result into the most significant syllable of the A-Register (A2 through A12). |
| FA3A | Add the three least significant syllables of the A-Register (A13 through A48) to the three least significant syllables of the B-Register (B13 through B48), the result into the three least significant syllables of the A-Register. |
| FIC: 1 | Set FIC flip-flop. |
| ICYA48 | Initiate a carry into adder stage A48. |
| ICYM12 | Initiate a carry into adder stage M12. |
| IEITM1 | Inhibit EI from transferring into M1. |
| INSERT | Insert a hole into the A-Register as defined by the S-Register. |
| ITF | Insert into thin film memory. |
| JPH1 | Jump to the indicated phase of the phase timing distributor, i.e., reset the presently set phase flip-flop and set the indicated phase. |
| JPH2 | |
| JPH3 | |
| JPH4 | |
| JPH5 | |
| JPH6 | |
| JTM0 | Jump to the indicated time of the memory timing counter, i.e., reset the presently set memory timing count and set the indicated count. |
| JTM3 | |
| JTM15 | |
| JTM19 | |
| JT0 | Jump to the indicated time of the timing distributor, i.e., reset the presently set timing flip-flop, inhibit shift, and set the indicated flip-flop. |
| JT1 | |
| JT2 | |
| JT3 | |
| JT4 | |
| JT5 | |
| JT6 | |
| JT7 | |
| JT8 | |
| JT9 | |
| JT10 | |
| JT11 | |
| JT12 | |
| JT13 | |
| JT14 | |
| JT15 | |

COMPUTER SUBCOMMANDS—Continued

| Subcommand | Function |
|---|---|
| LAND | Logical AND bit by bit the A-Register with the B-Register, result into A-Register. |
| LOG | Enable logical shift path of A-Register, i.e., include sign bit A1. |
| OR | Logical OR bit by bit A-Register with the B Register, result into A-Register. |
| RAES | Reset A-Register equals the top of stack flip-flop (AES). |
| RA1 | Reset the A-Register's sign bit (A1). |
| RA13 | Reset the A-Register's floating point mantissa sign bit (A13). |
| RBRF-RF | Reset the Branch flip-flop (BRF). |
| RB13 | Reset the B-Register's floating point mantissa sign bit (B13). |
| RC | Reset the flip-flop C-Register. |
| RD-RF | Reset the D-Counter (shift counter). |
| RF | Reset the F-Register (Function Register). |
| RFRP | Reset the First Repeat Control flip-flop (FRP). |
| RIAF | Reset the Indirect address flip-flop (IAF). |
| RINT | Reset the Control Mode flip-flop (INT). |
| RIOA-RIOAB | Reset bus A's Input/Output Descriptor Request flip-flop (IOA). |
| RIOB-RIOAB | Reset bus B's Input/Output Descriptor Request flip-flop (IOB). |
| RIRJ-RF | Reset the Interrupt Routine Jump Control flip-flop (IRJ). |
| RIRT | Reset the Count Real Time Control flip-flop(IRT). |
| RIS | Reset the Input Syllable counter (IS). |
| RLM | Reset the L/M registers. |
| RMC1 | Reset MC1 flip-flop. |
| RMC2 | Reset the indicated master control flip-flops (MC2 to MC5). |
| RMC3 | |
| RMC4-RF | |
| RMC5 | |
| RPAR | Reset the Parity accumulating flip-flop (PAR). |
| RPFS | Reset the Program Storage Registers' filled flip-flops (PF1 & PF2), i.e., their busy flip-flops. |
| RPNN | Reset the Program Not Normalized flip-flop (PNN). |
| RPOV | Reset the Program Overflow flip-flop (POV). |
| RPSRA | Reset the Program Storage Registers Address Counter (PS1 to PS3). Reset state is PS1 reset, PS2, set, and PS3 set. |
| RPUN | Reset Program Under Flow flip-flop (PUN). |
| RQ | Reset the Interrupt Mask Registers (P & Q Registers). |
| RRFF-JTMO | Reset the Memory Request flip-flop (RFF). |
| RRPF | Reset the Repeat Control flip-flop (RPF). |
| RRSF | Reset the Reverse Stack flip-flop (RSF). |
| RSY | Reset the Syllable Counter (SY1 & SY2). |
| RYSX | Reset the Lower Limit Memory Bounds Register (Y-Register) and set the Upper Limit Memory Bounds Register (X-Register). |
| R1A | Reset the most significant syllable of the A-Register (A1 through A12). |
| R3A | Reset the three least significant syllables of the A-Register (A13 through A48). |
| R1B | Reset the most significant syllable of the B-Register (B1 through B12). |
| SAES-STKST | Set the A-Register Equals top of Stack flip-flop (AES). |
| SBRF | Set the Branch flip-flop (BRF). |
| SB1 | Set the B-Register sign bit (B1). |
| SB12 | Set bit 12 of the B-Register (B12). |
| SB13 | Set B13. |
| SCANA | Enable transfer path of S-Register bits 1 through 4 (S1 through S4). |
| SCANB | Enable transfer path of S-Register bits 5 through 8 (S5 through S8). |
| SCANC | Enable transfer path of S-Register bits 9 through 12 (S9 through S12). |
| SD4 | Set bit 4 (D4) of the Shift Counter (D-Counter). |
| SD5 | Set bit 5 (D5) of the Shift Counter (D-Counter). |
| SD6 | Set bit 6 (D6) of the Shift Counter (D-Counter). |
| SFA1 | Set A-Register's sign bit (A1). |
| SFA13 | Set A-Register's floating point mantissa sign bit (A13). |
| SFA48 | Set A-Register's bit 48 flip-flop (A48). |
| SFRP | Set First Repeat Control flip-flop (FRP). |
| SHBEA | Transfer the least significant syllable of the B-Register (B37 through B48) into the most significant syllable (B1 through B12). |
| SHLA | Shift A-Register left one place. |
| SHLC | Shift C Register left one place. |
| SHRB12 | Shft B Register right twelve places. |
| SHRAD | Shift the A-Register right 1, 6, or 12 places as indicated by the shift counter (D-Counter). |
| SHRC | Shift the C-Register right one position. |
| SH1 | Shift the A-Register right one position. |
| SH6 | Shift the A-Register right six positions. |
| SH12 | Shift the A-Register right twelve positions. |
| SIAF | Set the Indirect Address flip-flop (IAF). |
| SINT | Set the Control Mode flip-flop (INT). |
| SIOA | Set the Bus A Input Output Descriptor Request flip-flop (IOA). |
| SIOB | Set the Bus B Input Output Descriptor Request flip-flop (IOB). |
| SIRJ | Set the Interrupt Routine Jump Control flip-flop (IRJ). |
| SITE | Set the Interrupt Register Sensing flip-flop (ITE) |
| SI1 | Set indicated interrupt bit. |
| SI2 | |
| SI3 | |
| SI4 | |
| SI5 | |
| SI6 | |
| SI7 | |
| SI8 | |
| SI9 | |
| SI10 | |
| SLM | Set the L/M Registers (L1 through L4) & (M1 through M12). |
| SMC1 | Set the indicated master control flip-flop (MC1 through MC5). |
| SMC2 | |
| SMC3 | |
| SMC4 | |
| SMC5 | |
| SOV | Set the overflow flip-flop (OV). |
| SPF | Set the appropriate program storage registers fill flip-flop (PF1 or PF2 as indicated by their present states. |
| SP (x) (x=1 to 16) | Set corresponding P or Q bit. |
| SQ3 | |
| SQ5 | |
| SQ9 | |
| SQ11 | |
| SQ12 | |
| SRFF | Set the Memory Request flip-flop (RPF). |
| SRPF | Set the Repeat Control flip-flop (RPF). |
| SRSF | Set the Reverse Stack flip-flop (RSF). |
| STRIP | Reset the A-Register's characters not included in the S-Register field define. |
| S1A | Set the most significant syllable of the A-Register (A1 through A12). |
| S32D | Set a count of 32 into the Shift Counter (D-Counter). |
| S36D | Set a count of 36 into the Shift Counter (D-Counter). |
| S48D | Set a count of 48 into the Shift Counter (D-Counter). |
| TAB | Transfer the least significant syllable of the A-Register (A37 through A48) to the most significant syllable of the B-Register (B1 through B12). |
| TAC | Transfer the most dignificant syllable of the A-Register (A1 through A12) to the C-Register (C1 through C12). |
| TAD | Transfer the A-Register bits 7 through 12 (A7 through A12) to the Shift Counter (D-Counter, D1 through D6). |
| TAE | Transfer the least significant syllable of the A-Register (A37 through A48) to the E-Register (E1 through E12). |
| TAK-LTFPH5 | Transfer the A-Register's bits 33 through 36 (A33 through A36) to the K-Register (K1 through K4). |
| TAM | Transfer the least significant syllable of the A-Register (A37 through A48) to the M Register (M1 through M12). |
| TAQ | Transfer appropriate A-Register bits to the mask registers (P1 through P16, Q1 through Q12). |
| TAXY | Transfer the appropriate A Register bits to the memory limit bounds register (X1 through X8, Y1 through Y8). |
| TA2OV | Transfer the second bit of the A-Register (A2) to the Overflow flip-flop (OV). |
| TA48C1 | Transfer the least significant A-Register bit (A48) to the most significant C-Register bit (C1). |
| TBA | Transfer the least significant syllable of the B-Register (B37 through B48) to the most significant syllable of the A-Register (A1 through A12). |
| TBC | Transfer the most significant syllable of the B-Register (B1 through B12) to the C-Register (C1 through C12). |
| TCA | Transfer the C-Register (C1 through C12) to the most significant syllable of the A-Register (A1 through A12). |
| TCE | Transfer the C-Register (C1 through C12) to the E-Register (E1 through E12). |
| TCF1E | Transfer the first group of Control flip-flops to the E-Register. |
| TCF2E | Transfer the second group of Control flip-flops to the E-Register. |
| TC1A48 | Transfer the most significant bit of the C-Register (C1) to the least significant bit of the A-Register (A48). |
| TC2A48 | Transfer second bit of the C-Register (C2) to the least significant bit of the A-Register (A48). |
| TC12A1 | Transfer the least significant bit of the C-Register (C12) to the most significant bit of the A-Register (A1). |
| TC12A2 | Transfer the least significant bit of the C-Register (C12) to the second bit of the A-Register (A2). |
| TDB | Transfer the Shift Counter (D-Counter) D1 through D6 to the B-Register (B7 through B12). |
| TEA | Transfer the E-Register (E1 through E12) to the most significant syllable of the A-Register (A1 through A12). |
| TEB | Transfer the E-Register (E1 through E12) to the most significant syllable of the B-Register (B1 through B12). |
| TEC | Transfer the E-Register (E1 through E12) to the C-Register (C1 through C12). |
| TECF1 | Transfer the E-Register to the first group of control flip-flops. |

COMPUTER SUBCOMMANDS—Continued

| Subcommand | Function |
|---|---|
| TECF2 | Transfer the E-Register to the second group of control flip-flops. |
| TECF3 | Transfer the E-Register to the third group of control flip-flops. |
| TEF | Transfer the E-Register (E1 through E12) to the Function Register (F1 through F12). |
| TEIAF-SIAF | Transfer the most significant bit of the E-Register (E1) to the Indirect Address flip-flop (IAF). |
| TEM | Transfer the E-Register (E1 through E12) to the M-Register (M1 through M12). |
| TERLA | Transfer the sixteen External Request lines (ER1 through ER16) to the A-Register. |
| TES | Transfer the E-Register (E1 through E12) to the S Register (S1 through S12). |
| TME | Transfer the least significant three bits of the M Register to the corresponding bits of E. |
| TINTRM | Transfer the interrupt delta address to the M Register (M9 through M12). |
| TKA | Transfer the K Register (K1 through K4) to the A Register (A1 through A4). |
| TLMKE | Transfer the L/M Registers (L1 through L4, M1 through M12) to the K/E Registers (K1 through K4 and E1 through E12). |
| TMA | Transfer the M Register (M1 through M12) to the most significant syllable of the A Register (A1 through A12). |
| TMB | Transfer the M Register (M1 through M12) to the most significant syllable of the B-Register (B1 through B12). |
| TMC2C1 | Transfer Master Control flip-flop number two (MC2) to the most significant bit of the C-Register (C1). |
| TMC3C12 | Transfer Master Control flip-flop number three (MC3) to the least significant bit of the C-Register (C12). |
| TMC4A13 | Transfer Master Control flip-flop number four (MC4) to the thirteenth A Register bit (A13). |
| TMEMM | Transfer a syllable from Core Memory (MEMB1 through MEMB12) to the M-Register (M1 through M12). |
| TMK | Transfer the M Register (M9 through M12) to the K Register (K1 through K4). |
| TMS | Transfer the M Register (M1 through M12) to the S-Register (S1 through S12). |
| TOVA2 | Transfer the Overflow flip-flop (OV) to the second A-Register bit (A2). |
| TPARM-TM8 | Transfer the Parity Bit (PAR) to the M-Register (M12). |
| TSCANE | Transfer the output of the Scan logic (SCANB1 through SCANB4) to the E-Register (E9 through E12). |
| TSD | Transfer the S-Register (S7 through S12) to the Shift Counter (D-Counter, D1 through D6). |
| TSWKE | Transfer the Control Panel's Data switches (SWK1 through SWK4 & SWE1 through SWE12) to the K & E Registers (K1 through K4 and E1 through E12). |
| TS2T4D | Transfer S-Register bits 2 through 4 (S2 through S4) to the Shift Counter (D-Counter, D4 through D6). |
| TTFE | Transfer the thin film's data output (TF1 through TF16) to the K/E Registers K1 through K4 and E1 through E12). |
| XOR | Exclusive OR bit by bit the A-Register (A1 through A48) with the B-Register (B1 through B48), the result into the A-Register. |

Following is a list of abbreviations for the control flip-flops used throughout the specification and in the drawings (see FIG. 4). Opposite each abbreviation the function is stated. Abbreviations for the registers, descriptors, and counters are also functionally described. The D register referred to as "shift and iteration counter" is the multiply-divide counter 3021 shown in FIG. 1B:

COMPUTER FLIP-FLOPS

| Flip-Flop | Function |
|---|---|
| AES | A Register equals top of stack. |
| BRF | Branch flip-flop, set if branch is made. |
| CRT | Catch real time pulse from 100 cycle osc. |
| DZ | D reg. = Zero. |
| FRP | First repeat flip-flop. |
| FIC | Insert in Thin Film. |
| IAF | Indirect address flip-flop. |
| INT | Interrupt or Control mode flip-flop. |
| IOA | Descriptor request for device on I/O Bus A. |
| IOB | Descriptor request for device on I/O Bus B. |
| IPF | Power failure interrupt. |
| IRJ | Interrupt routine jump. |
| IRT | Real time interrupt. |
| IS1, IS2 | }Program Syllable Counter. |

COMPUTER FLIP-FLOPS—Continued

| Flip-Flop | Function |
|---|---|
| ITE | Interrupt catch flip-flop. |
| MC1 | Master control flip-flop #1. |
| MC2 | Master control flip-flop #2. |
| MC3 | Master control flip-flop #3. |
| MC4 | Master control flip-flop #4. |
| MC5 | Master control flip-flop #5. |
| OV | Overflow from adder. |
| PAR | Parity flip-flop. |
| PF1 | Program Reg. #1 has information in it. |
| PF2 | Program Reg. #2 has information in it. |
| PNN | Non-normalized floating point words used as operand. |
| POV | Overflow occurred in arithmetic instruction. |
| PS1, PS2, PS3 | Program Syllable Counter. |
| PUN | Underflow occurred in arithmetic instruction. |
| RFF | Memory Request flip-flop. |
| RPF | Repeat flip-flop. |
| RSF | Reverse stack count. |
| SA1, SA2 | }Address of top of stack. |
| SY1, SY2 | }Syllable Counter. |
| TMZ | TC Reg. = Zero. |
| A Register | Accumulator. |
| B Register | Operand Register. |
| C Register | Working C Register. |
| D Register | Shift and Iteration Counter. |
| E Register | Thin Film Buffer-Register. |
| F Register | Function Register. |
| FAR Register | Thin Film Address Register. |
| I Register | Interrupt Register. |
| K Register | Extension of E Register. |
| L Register | Memory Module address; extension of M Reg. |
| M Register | Memory Buffer Register; address accumulator. |
| P Register | External Request Mask. |
| PH distributor | Phase distribution. |
| Q Register | Interrupt Mask. |
| S Register | Index and Variant Syllable Register. |
| T distributor | Timing distributor. |
| TF Register | Single-Shot Output at Thin Film. |
| TM Counter (TC 1 to 5). | Memory Control Timing. |
| X Register | Upper Memory Bound. |
| Y Register | Lower Memory Bound. |

The following table entitled "Miscellaneous Terms" contains the abbreviations of terms not hereinabove described and the function or definition of these abbreviations. Some of these abbreviations appear in the logical drawings of FIGS. 85–111.

MISCELLANEOUS TERMS

| Term | Function |
|---|---|
| Adders | Form the Sum of A and B. |
| AEGE35 | A is greater than or equal to 35. |
| AEL35 | A is less than 35. |
| AIAB | All I/O on Bus A are busy. |
| AIBB | All I/O on Bus B are busy. |
| A Register Shift Paths. | Provide paths for shifting by 1, 6, or 12 Right or 1 left in the A register. |
| AUTOST | Automatic Start—switch. |
| A1EB1 | Bit A1 equals Bit B1. |
| A1T48Z | A Register bits 1 to 48 are Zero. |
| A2T48Z | A Register bits 2 to 48 are Zero. |
| $\overline{A13EA13}$ | Bit A13 does not equal B13. |
| $\overline{A14EB14}$ | Bit A14 does not equal B14. |
| CCA(x) (x=1 to 7) | Character Selection logic for field instructions. |
| CH | Switch position—Conditional Halt. |
| CHIRP | Control signal. |
| CLEAR | Clear all control. |
| COMPOP | Switch positions—<br>Operate.<br>Conditional halt.<br>Single instr.<br>Single phase.<br>Single pulse. |
| DR(x) (x=01 to 11 octal). | Thin film drivers. |
| D Register Decodes | Decodes amount in D Register. |
| E & M Adder | Form the Sum of E and M. |
| EQ | A Register 43–48 equals S Register 6–12. |

MISCELLANEOUS TERMS—Continued

| Term | Function |
|---|---|
| FAR(x): 1 / FAR(x): 0 (x=1 to 7) | Set (:1) and reset (:0) lines for thin film address register. |
| FGO | Enable thin film cycle. |
| FILL | New program word needed from memory. |
| FINIT | Initiate thin film cycle. |
| FRORN | First repeat or No repeat. |
| $\overline{GOMGO}$ | Address within memory bounds. |
| $\overline{HOLD}$ | Memory access obtained. |
| IB1, IB2, IB3, IB4 | Interrupt address encoder. |
| IDR(x) (x=1 to 16) | Thin film information drivers. |
| IRCA(x) (x=0 to 7) | Character Selection logic. |
| K & L Adder | Form the sum of K & L with carry input from E & M adder. |
| LMZ | L & M Register is Zero. |
| MEM(x)A (x=1 to 12) | Memory bit x from Memory 1 to 8. |
| MEM(x)B (x=1 to 12) | Memory bit x from Memory 9 to 16. |
| MPSRST | Store in Program Register from memory. |
| MRTF | Switch position—read thin film. |
| MRWTF | Switch position—load or read thin film. |
| MTFC | Thin film continuous—switch. |
| MWTF | Switch position—load thin film. |
| NOINTR | No interrupt. |
| NORMAL | Switch position—on line. |
| NORTCM | Switch positions—On line or Memory test. |
| OP | Switch position—Operate. |
| OSINT | Switch position—Single Instr. |
| OSPH | Switch position—Single phase. |
| OSPULS | Switch position—Single pulse. |
| $\overline{OSPSTF}$ | Switch position—Same as OSPULS. |
| $\overline{OVLP}$ | Program not overlapped. |
| PASTK | Stack address PH2, 4, or 6. |
| PASY | Memory address is PH2, 4, or 6. |
| PI | Permit interrupts—switch. |
| PO | Output of parity logic, parity is odd. |
| POVL | Allow overlap. |
| PRPFS | Permit reset of Program Filled flip-flops. (PF1, PF2) switch. |
| SCAN1 / SCAN2 | Four bits selected from S Register according to Scan A, Scan B, or Scan C. |
| SCAN3 / SCAN4 | Four bits selected from S Register according to Scan A, Scan B, or Scan C. |
| STKST | Store in Stack in PH2, 4, or 6. |
| SW(x) (x=01 to 17 octal) | Thin film switches. |
| SWE(x) (x=1 to 12) | Data switches (outputs). |
| SWFA(x) (x=1 to 7) | Thin film address switches (outputs). |
| SWK(x) (x=1 to 4). | Data switches (outputs). |
| TEST | Switch positions—Module or Memory test. |
| TM(x) | TC decodes. |
| TMRT | TM 25, 26, 27, 28. |
| TMWT | TM 5, 6, 7. |

COMPUTER MECHANIZATION CHARTS

Charts showing mechanization of computer logic follow. A glossary of meanings for the abbreviated terms of the mechanization is given in the last several pages of this specification. The mechanization charts appear in the following general order: Phase 0; Phase 1; Phase 2; Phase 3; Phase 4; Phase 5; Phase 6; TM (Memory Timing):

PH0

| T | Conditions | Commands | Notes |
|---|---|---|---|
| 0 | (CABINET READY) STPB | JT1 | (a b). |
| | OP.(SYSTEM READY) AUTOST | JT3 | (c). |
| | (CABINET READY). OP.I4.$\overline{ITE}$ | JT1; RINT | (a d). |
| | (CLEAR)(COMPOP) | RINT | (e f). |
| | (CLEAR)(MWRTF) | SINT | (g h). |
| 1 | MWRTF | ATFSW | (i). |
| | MWTF | TSWKE | (j). |
| 2 | MRTF | TTFE | (k). |
| 3 | COMPOP | JT12; JPH1 | |
| 4-14 | | | |
| 15 | MTFC | JT1 | |

[a] Time zero (T0) of any phase.
[b] PBST=Push button start.
[c] AUTOST=Automatic start.
[d] OP=Operate continuous.
[e] CH=Conditional halt.
[f] OSINST=Operate single-instruction.
[g] OSPH=Operate single-phase.
[h] OSPULS=Operate single-pulse.
[i] MRWTF=Manual read from or write into thin film.
[j] MRTF=Manual read from thin film.
[k] MWTF=Manual write into thin film.

PH1

| T | Conditions | Commands | Notes |
|---|---|---|---|
| 1 | $\overline{HTC}$.$\overline{RPF}$.FRP($\overline{ITE}$+INT)$\overline{IPF}$.IRT.$\overline{FILL}$. | APSRA | (a). |
| | TMZ($\overline{ITE}$+INT)$\overline{IPF}$. $\overline{IRT}$.FILL | JTM15 | (b). |
| | ($\overline{ITE}$+INT)$\overline{IPF}$.$\overline{IRT}$. FILL+$\overline{TMZ}$ | JT1 | |
| | IPF.TMZ | JT12 | |
| | $\overline{IPF}$.IRT.TMZ | JT1; JPH3 | |
| | $\overline{HTC}$.ITE.$\overline{IN}$ .TMZ. $\overline{IPF}$.$\overline{IRT}$. | SIRJ; AIDR; TCF1E; JT7; RRPF; RFRP; RPUN; RPOV; RPNN | (c). |
| | $\overline{HTC}$(FRP+RPF) $\overline{(ITE+INT)}$$\overline{IPF}$,IRT | JT7; ARCR; SRPF | |
| | | RMCI; RMC2; RMC3; RMC4; RMC5 | |
| | | RSY; RD; RF; RBRF; RIRJ | |
| | TMZ | RIS; RLM | |
| | RPF | RFRP | |
| | $\overline{IPF}$.HTC | JPH0; JT0 | |
| 2 | | TTFE | |
| 3 | | TEF | |
| 4 | SRR | JPH3; RPFS | |
| | IRR | AIDR | |
| | CLA+SER | R1A; R3A | |
| | UCT | SBRF | |
| | HLT.INT | SHTC | |
| | $\overline{(II+HLT+IRR)}$ | JT1 | |
| | SSU | CUSTK; RAES | |
| | SSD | CDSTK; RAES | |
| | RVS | SRSF; RRSF | |
| | ($\overline{II}$)($\overline{SSD+SSU+HLT+}$ $\overline{IRR}$+SRR+RVS+ $\overline{NOP}$) | JPH2 | |
| | HLT $\overline{INT}$ | SI10 | |
| | II+(TIO+LSR+IRR) $\overline{INT}$ | SI7 | |
| 5 | $\overline{INT}$(II+HLT+IRR) | TTFE | |
| | | JT1 | |
| 6 | | TECF3 | (d) |
| 7 | IRJ | APSRSY; SINT | |
| | IRR | AIPR | |

See footnotes at end of table.

PH1—Continued

| T | Conditions | Commands | Notes |
|---|---|---|---|
| | RPF | TTFE; RLM; SLM | |
| 8 | IRR | APSRSY | |
| | IRJ | AIPR | |
| | $\overline{\text{SYE3}}$(IRR+IRJ) | JT7 | |
| | $\overline{\text{SYE3}}$ IRJ | JT1; JPH3 | |
| | IRJ+IRR | TTFE; ITF; CUSY | |
| 9 | RPF | FALM; CDIS | |
| | CYL1 RPF | RRPF; JT1; RFRR | |
| | IRR | RINT; JT1; JPH3 | |
| 10 | | ARCR; TLMKE | |
| 11 | | ARPRIS; CDIS; JT2 | |
| 12 | | APDR; CUSY | |
| | IPF | TCF1E | |
| 13 | | APDR | |
| | $\overline{\text{IPF}}$ | TTFE: RSY | |
| | IPF | TCF2E; JTO JPHO | ([e]). |
| 14 | E10 | TECF1; TTFE; SI1; TECF3. | |
| | $\overline{\text{E10}}$ | SHTC | |
| 15 | | TTFE; APDR; ITE; JT1; TECF2 | |

[a] $\overline{\text{FILL}}$=FRP+RPF+PF2+$\overline{\text{(T1+T2)}}$; APSRA→ CDPSRA.
[b] FILL=$\overline{\text{FRP}}$.$\overline{\text{RPF}}$.$\overline{\text{PF1}}$.$\overline{\text{PF2}}$ (T1+T2).
[c] CFF GR1=PS1, PS2, PS3, RPF, FRP, SA1, SA2, PF1, PF2, INT, IPF, RSF, POV, PUN, PNN.

[d] CFF GR3=PS1, PS2, PS3, RPF, FRP and PS1 PF1→PF1 PS1 PF2→PF2 —POV, PUN, PNN.

[e] CFF GR2=I1 to I12.

PH2

| T | Conditions | Commands | Notes |
|---|---|---|---|
| 1 | $\overline{\text{RPF}}$.$\overline{\text{FILL}}$.F7 | APSRA | |
| | TMZ.FILL.F7 | JTM15 | |
| | FILL.F7 | JT1 | |
| | $\overline{\text{FILL}}$.F7.$\overline{\text{F8}}$ | JT3 | |
| | RPF.F7 | ARPRIS | |
| | (FLD+TRS+OOB +OOS+CSE+SHF +TRM+LTF+LSR) AES $\overline{\text{F7}}$ | JT1; JPH4 | ([a]). |
| | (BRB+CBF+LCM) AES.$\overline{\text{F7}}$ | JT1; JPH3 | |
| | $\overline{\text{(CLA+SER)}}$$\overline{\text{AES}}$.$\overline{\text{F7}}$ | JT11; ASTK; CUSY | |
| | $\overline{\text{(CLA+SER)}}$ $\overline{\text{F7}}$.$\overline{\text{F8}}$.AES | CUSTK | |
| | (CLA+SER) $\overline{\text{F7}}$ $\overline{\text{F8}}$ | CDSTK | |
| | (CLA+SER) $\overline{\text{F7}}$ | JT10 | |
| | | RAES | |
| | SER | TERLA | |
| 2 | TMZ | TTFE | |
| | $\overline{\text{FILL}}$ | APSRA | |
| | TMZ.FILL | JTM15; SMC1 | |
| | FILL | JT2 | |
| 3 | | RLM; RMC1 | |
| | SRJ | ASAR | |
| | UCT | ABPR | |
| | ($\overline{\text{RPF}}$+FRP)(CLA +SER+JAZZ) | ABAR | |
| | $\overline{\text{MC1}}$ | TES | |
| | | TTFE | |
| | RPF.FRP | ARIR1S | |
| 4 | | TTFE; TEM | |
| | (RPF+FRP) (CLS+ SER+JAZZ). | TEIAF; IE1TM1 | ([b]). |
| | FRP RPF | FALM | |
| 5 | TMZ | FALM | |
| | TMZ IAF | JTM19 | |
| | TMZ $\overline{\text{IAF}}$ $\overline{\text{F8}}$ | JT10 | |
| | TMZ(S1+S2+S3+S4) $\overline{\text{IAF}}$ F8 | AXR; SCAN A | |
| | IAF+$\overline{\text{TMZ}}$ | JT5 | |
| 6 | S5+S6+S7+S8 | AXR; SCAN B | |
| | | TTFE | |

See footnotes at end of table.

PH2—Continued

| T | Conditions | Commands | Notes |
|---|---|---|---|
| 7 | S9+S10+S11+S12 | AXR; SCAN C | |
| | | TTFE; FALM | |
| 8 | | TTFE; FALM | |
| 9 | | FALM | |
| 10 | F7(CLA+SER) | JTM3 | |
| | $\overline{\text{F7}}$ | ASTK; TAE; SH12; CUSY; EAL | |
| | JAZZ+SRJ+BRF | JTM19; JT15 | |
| | TIO | TLMKE; JT15 | |
| | F7(CLA+SER) | JT15 | |
| | STF+BRC | TMS; JT1; JPH3 | |
| | RPT | ARCR; TLMKE; JT1; JPH4. | |
| | XLC | AXIR; JT1; TLMKE; JPH4. | |
| | SRJ | SIAF | |
| | F7 RPF | ARPRIS; TLMKE; CDIS. | |
| 11 | | ASTK; CUSY; SH12 | |
| | CLA+SER | TAE; EAL | |
| | $\overline{\text{CLA+SER}}$ | TTFE | |
| 12 | | ASTK; CUSY; SH12 | |
| | CLA+SER | TAE; EAL | |
| | $\overline{\text{CLA+SER}}$ | TTFE; TEA | |
| 13 | | ASTK; CUSY; SH12 | |
| | CLA+SER | TAE; JT1; JPH1; EAL; SAES. | ([c]). |
| | $\overline{\text{CLA+SER}}$ | TTFE; TEA | |
| 14 | | TTFE; TEA; SH12 | |
| 15 | $\overline{\text{F7}}$ | SH12; TEA | |
| | $\overline{\text{TMZ}}$ | JT15 | |
| | TMZ(CLA+SER+ UCT) | JPH1 | |
| | TIO | TEC | |
| | TMZ(SRJ+BRB+ CBF+LCM). | JPH3 | |
| | TMZ(OOS+OOB+ CSE+SHF+TRM+ TIO+FLD+TRS+ LTF+LSR) | JPH4 | ([d]). |
| | $\overline{\text{F7}}$ $\overline{\text{F8}}$ | CUSTK | |
| | TMZ | JT1 | |

[a] JAZZM.
[b] IE1TM1=$\overline{\text{PSIAF FRORN T4}}$; TEIAF means SIAF if E1=ONE.
[c] SAES=PH2. $\overline{\text{F7}}$.CLASER.
[d] TMZ(JAZZM+TIO).

BRB.PH3

| T | Conditions | Commands | Notes |
|---|---|---|---|
| 1 | A48 | SBRF | |
| | | SH1; EAL; JT1; JPH4 | |

BRC.PH3

| T | Conditions | Commands | Notes |
|---|---|---|---|
| 1 | POV.S12 | SBRF; RPOV | |
| | PUN.S11 | SBRF; RPUN | |
| | PNN.S10 | SBRF; RPNN | |
| | | JT1; JPH4 | |

CBF.PH3

| T | Conditions | Commands | Notes |
|---|---|---|---|
| 1 | $\overline{\text{A2T4SZ}}$ | SMC4 | |
| 2 | MC4.$\overline{\text{A2}}$ | SHLA; EO; CUD; JT2 | |
| | | RIB | |
| | $\overline{\text{MC4}}$ | S1A; JT1; JPH4 | |
| 3 | | SH12; R1A | |
| | | TDB | |
| 4 | | FA1A; SFA1; JT1; JPH4. | |

(FAD+FSU) PH3

| T | Conditions | Commands | Notes |
|---|---|---|---|
| 1 | | TAC | |
| | A1EB1 | CMP1A; SMC1 | |
| | FSU | SB13, RB13 | |
| 2 | | | |
| 3 | | CY2A12; FA1A | |
| 4 | $\overline{MC1}$.OV.$\overline{B1}$ | SH12; SHRB12; TAB; TBA; CUSY; JT6 | |
| | $\overline{MC1}$.OV.B1 | SMC4; TCA; JT13 | |
| | MC1.$\overline{OV}$ | CMP1A | |
| | $\overline{CH.RPF}$ ($\overline{PF1}$+$\overline{PF2}$) (MC1+$\overline{OV}$) | JTM15 | |
| 5 | AEL35 | TAD | |
| | AEGE35 | SMC2 | |
| | A1 | TBC; SMC3 | |
| | | R1A; R1B; CUSY | |
| 6 | | SH12; SHRB12; CUSY | |
| | $\overline{MC3}$ | TAB; TBA | |
| | MC3 | EAL, SHBEA | |
| | $\overline{SYE3}$ | JT6 | |
| 7 | $\overline{MC1}$.OV | SMC4; JT13 | |
| | ($\overline{MC2}$) (MC1+$\overline{OV}$) | SHRAD; | |
| | (MC2) (MC1+$\overline{OV}$) | R1A; R3A; | |
| | DZ(MC1+$\overline{OV}$) | JT1; JPH5; | |
| | | EO, EONL, RMC2; RMC3 | |
| | (MC1+$\overline{OV}$) ($\overline{MC2}$.$\overline{DZ}$) | JT7 | |
| | DZ | RMC1 | |
| 8 | $\overline{A2}$ $\overline{MC2}$ | SHLA; EO; CUD; JT8 | |
| | MC2 | TOVA2; SH1 | |
| | | R1B | |
| 9 | $\overline{MC2}$ | TDB | |
| | MC2 | SB1; SB12 | |
| | | TCA; SH12 | |
| | $\overline{MC2}$ DZ | JT13 | |
| 10 | A1EB1 | CMP1A; SMC1 | |
| 11 | | | |
| 12 | | CY2A12; FA1A | |
| 13 | MC3+$\overline{MC1}$ $\overline{MC4}$ OV $\overline{B1}$ | S1A; R3A; SPUN | |
| | $\overline{MC1}$ $\overline{MC4}$ OV B1 | SPOV | |
| | MC1 $\overline{OV}$ TMZ | CMP1A | |
| | TMZ | JT1; JPH6 | |
| | $\overline{TMZ}$ | JT13 | |

FDV PH3

| T | Conditions | Commands | Notes |
|---|---|---|---|
| 1 | $\overline{A1EB13}$ | SMC2 | |
| | A13 | SMC4 | |
| | $\overline{A14}$+$\overline{B14}$ | SPNN; SMC5 | |
| | A1EB1 | CMP1A; SMC1 | |
| | | RA13; RB13 | |
| 2 | | | |
| 3 | | CY2A12; FA1A | |
| 4 | $\overline{MC1}$·OV·$\overline{B1}$ | S1A; R3A; SPUN | |
| | $\overline{MC1}$·OV·B1 | SPOV | |
| | MC1·$\overline{OV}$ | CMP1A | |
| | | RMC1 | |
| | $\overline{MC1}$ OV | JT1; JPH6 | |
| 5 | | TAC; R1A; R1B | |
| | | CDSY | |
| 6 | | ATFC; TCE | |
| | | RC; JT1; JPH5 | |
| 7 | | | |
| 8 | | SB12 | |
| | $\overline{A1EB1}$ | CMP1A; SMC1 | |
| 9 | | | |
| 10 | | CY2A12; FA1A | |
| | $\overline{MC1}$·OV | SPOV | |
| 11 | MC1.$\overline{OV}$ | CMP1A | |
| 12 | | JT1; JPH6 | |

FMU PH3

| T | Conditions | Commands | Notes |
|---|---|---|---|
| 1 | | RA13; RB13 | |
| | $\overline{A1EB13}$ | SMC2 | |
| | $\overline{A14}$+$\overline{B14}$ | SPNN | |
| | $\overline{A1EB1}$ | CMP1A; SMC1 | |
| 2 | | | |
| 3 | | CY2A12; FA1A | |
| 4 | $\overline{MC1}$·OV·$\overline{B1}$ | SPOV | |
| | $\overline{MC1}$·OV·B1 | SMC4 | |
| | MC1·$\overline{OV}$ | CMP1A | |
| | MC1+$\overline{OV}$ | JPH5; R1B; JT1 | |
| | $\overline{MC1}$·OV | JT12 | |
| | A14T48Z | SMC4; JT12 | |
| 5 | ($\overline{A14T48Z}$)·$\overline{A14}$ | SHLA; TC2A48; SB12; SMC3 | |
| | | ATFC; CUSY | |
| 6 | | TTFE; RMC1 | |
| | MC2 | SFA13 | |
| 7 | | TEA | |
| | $\overline{MC3}$ | JT12 | |
| 8 | A1EB1 | CMP1A; SMC1 | |
| 9 | | | |
| 10 | | CY2A12; FA1A | |
| 11 | $\overline{MC1}$·OV | SMC4 | |
| | MC1·$\overline{OV}$ | CMP1A | |
| 12 | MC4 | S1A; R3A; SPUN | |
| | | JT1; JPH6 | |

IRJ PH3 IRR PH3 SRJ PH3 SRR PH3

| T | Conditions | Commands | Notes |
|---|---|---|---|
| 1 | SRJ+IRJ | ABAR | |
| | SRR | ASSR | |
| | IRR | AISR | |
| | SRJ | FALM | |
| 2 | SRJ+IRJ+SRR+IRR | TTFE; ITF; CUSY | |
| | SRR+IRR | ABAR | |
| | IRJ | AISR | |
| | SRJ | ASSR | |
| 3 | SRJ+IRJ | ABPR | |
| | IRR | AISR | |
| | SRR | ASSR | |
| 4 | SRJ+IRJ+SRR+IRR | TTFE; ITF; CUSY | |
| | SRR+IRR | ABPR | |
| | IRJ | AISR | |
| | SRJ | ASSR | |
| 5 | SRR | ASSR | |
| | IRR | AISR | |
| | SRJ | TLMKE; ABPR; JT1; JPH4 | |
| | IRJ | APCR | |
| 6 | IRR+SRR | APCR; ITF; JT1 | |
| | SRR+IRR+IRJ | TTFE | |
| | IRJ[($\overline{PF1}$+$\overline{PF2}$)($\overline{PF1}$·$\overline{PF2}$+$\overline{PS2}$+$\overline{PS3}$)] | AISR; ITF; JT9 | (*). |
| | IRJ | RLM; SLM; RPFS | |
| | SRR | JPH5 | |
| | IRR | JPH1 | |
| 7 | IRJ | FALM | |
| 8 | IRJ | TLMKE; AISR | |
| 9 | IRJ | A1AR; RLM | |
| 10 | IRJ | ABAR; TTFE; ITF; TINTRM | |
| 11 | IRJ | ABPR; ITF; FALM | |
| 12 | IRJ | TLMKE; APCR; JT1; JPH1 | |

*($\overline{PF1}$+$\overline{PF2}$)($\overline{PF1}$.PF2+$\overline{PS2}$+$\overline{PS3}$)=$\overline{OVLP}$.

IRJ.IRT.NOP.PH3=RTCCP3

| T | Conditions | Commands | Notes |
|---|---|---|---|
| 1 | | ARTC | |
| 2 | | TTFE | |
| 3 | | ICYM12 | (a). |
| 4 | | FALM; RMC2; ICYM12 | (a). |
| | Q5.CYM1.MC2 | S15 | |
| | CYM1 | SMC2 | |
| 5 | | ARTC; TLMKE; CUSY; JT1 | |
| | $\overline{MC2}$ | RIRT; JPH1 | |

a ICYM12=RTCCP3.

LCM PH3

| T | Conditions | Commands | Notes |
|---|---|---|---|
| 1 | | CMP1A; CMP3A; JT1; JPH4 | |

STF PH3

| T | Conditions | Commands | Notes |
|---|---|---|---|
| 1 | $\overline{S6}$ | JT4 | (a). |
| | S3 | ATFSSY; CUSY | |
| | $\overline{S3}$ | ATFS | |
| 2 | | TTFE; S48D | |
| | S3 | ATFSSY; CUSY | |
| 3 | | TTFE; TEA; SHRAD; LOG | |
| | S3 $\overline{SYZ}$ | ATFSSY; CUSY | |
| | $\overline{DE12}$ | JT3 | |
| | DE12 | JT1; JPH4 | |
| 4 | | TTFE | |
| 5 | | TEA; SD4 | |
| | | SHRAD; LOG | |
| 6 | $\overline{DE1}$ | JT6 | |
| | | TKA | |
| | S3, $\overline{SYE3}$ | ATFSSY; CUSY | |
| 7 | S3.SYE3 | JT1; JPH4; CUSY | |
| | $\overline{S3}$ | S32D | |
| 8 | S3 | TTFE; SH12; JT5 | |
| | $\overline{S3}$ | SHRAD; LOG; R1A | |
| | S3.$\overline{DE1}$ | JT8 | |
| | DE1 | JT1; JPH4 | |

a See the following table:

| S6 | S3 | BITS | WDS |
|---|---|---|---|
| 0 | 0 | 16 | 1 |
| 0 | 1 | 16 | 3 |
| 1 | 0 | 12 | 1 |
| 1 | 1 | 12 | 4 |

PH4

| T | Conditions | Commands | Notes |
|---|---|---|---|
| 1 | $\overline{RPF}$.FILL.F9 | APSRA | |
| | TMZ.FILL.F9 | JTM15 | |
| | RPF.F9 | ARPRIS | |
| | FILL.F9 | JT1 | |
| | $\overline{FILL}$.F9.$\overline{F10}$ | JT3 | |
| | (OOB+OOS)$\overline{F9}$ | JT11; ASTK; CUSY | |
| | (TRS+BRB+CBF+ LCM+STF).$\overline{F9.F10}$ | CDSTK; | (e). |
| | (TRS+BRB+CBF+ LCM+STF)$\overline{F9}$ | JT10 | (e). |
| 2 | TMZ | TTFE | |

See footnotes at end of table.

PH4—Continued

| T | Conditions | Commands | Notes |
|---|---|---|---|
| | $\overline{FILL}$ | APSRA | |
| | TMZ.FILL | JTM15; SMC1 | |
| | FILL | JT2 | |
| 3 | | TTFE; RLM; RMC1 | |
| | BRC ($\overline{RPF}$+FRP) | ABPR | |
| | ($\overline{RPF}$+FRP)(STF+ OOS+OOB+BRB)+ TRS+SRJ+CBF+ LCM+TIO | ABAR | |
| | $\overline{MC1}$ | TES | |
| | BRC.$\overline{RPF}$.$\overline{BRF}$ | JT1; JPH1 | |
| | RPF.$\overline{FRP}$ | ARIRIS | |
| 4 | | TTFE; TEM | |
| | ($\overline{RPF}$+FRP)(TIO+ OOS+OOB+BRB+ TRS+CBF+LCM+ STF) | TEIAF; IE1TM1 | (b). |
| | $\overline{FRP}$.RPF | FALM | |
| 5 | TMZ.IAF | JTM19; | |
| | F10.$\overline{IAF}$.TMZ(S1+S2+ S3+S4) | AXR; SCAN A | |
| | $\overline{F10}$.$\overline{IAF}$.TMZ | JT10 | |
| | IAF+$\overline{TMZ}$ | JT5 | |
| | TMZ | FALM | |
| 6 | | TTFE | |
| | S5+S6+S7+S8 | AXR; SCAN B | |
| 7 | | FALM; TTFE | |
| | S9+S10+S11+S12 | AXR; SCAN C | |
| 8 | | FALM; TTFE | |
| 9 | | FALM | |
| 10 | F9.RPF | ARPRIS; TLMKE; CDIS | |
| | $\overline{BRF}$.BRC | JT1; JPH1 | |
| | OOB+OOS+$\overline{BRB}$. BRF+TIO | JT15; JTM19 | |
| | F9(BRB+CBF+LCM+ STF+TRS) | JT15; JTM3 | |
| | (CSE+FLD+LSR+ LTF+SHF+TRM+ XLC) | TMS; JT1; JPH5 | (c). |
| | SRJ | TLMKE; ABAR; JT1; JPH5 | |
| | RPT | TMS; TTFE; JT1; JPH5 | |
| | $\overline{F9}$ | SH12; EAL; TAE; ASTK; CUSY | |
| | TIO.$\overline{C11}$.INT | SIOA | |
| | TIO.C11.INT | SIOB | |
| 11 | | ASTK; CUSY | |
| | BRB+CBF+LCM +STF+TRS | SH12; EAL; TAE | |
| | OOB+OOS | TTFE | |
| 12 | | ASTK; CUSY | |
| | BRB+CBF+LCM +STF+TRS | SH12; EAL; TAE | |
| | OOB+OOS | TTFE; TEB; SHRB12 | |
| 13 | | ASTK; CUSY | |
| | TRS+BRB+CBF +LCM+STF | TAE; SH12; EAL | (d e). |
| | OOB+OOS | TTFE; TEB; SHRB12 | |
| | TRS+CBF+LCM +STF | JT1; JPH1 | |
| | BRB | JT1; JPH6 | |
| 14 | OOB+OOS | TTFE; TEB; SHRB12 | |
| 15 | (OOB+OOS)$\overline{F9}$ | TEB; SHRB12 | |
| | $\overline{TMZ}$ | JT15 | |
| | TMZ(CBF+LCM+STF +BRC+TRS) | JT1; JPH1 | |
| | TMZ.$\overline{FLT}$(OOB+OOS) | JT1; JPH5 | |
| | TMZ(BRB+TIO) | JT1; JPH6 | |
| | (OOB+OOS)$\overline{F9}$.$\overline{F10}$ | CUSTK | |
| | TMZ.FLT | JPH3; JT1 | |

a PH4 ST.
b IE1TM1=$\overline{PSIAF, FRORN, T4}$ TEIAF means SIAF if E1=ONE
c PH4 VR.
d SAES=PH4 ST.$\overline{F9}$.
e TRS+BRB+CBF+LCM+STF=PH4ST.

(BAD+BSU+FAD+FSU) PH5

| T | Conditions | Commands | Notes |
|---|---|---|---|
| 1 | BSU A1EB1+(FSU +FAD+BAD) (A1EB1) | CMP1A; CPM3A; SMC1; JT1 | |
| 2 | | CY2A48 | |
| 3 | | CY2A 48; FA1A; FA3A | |
| 4 | $\overline{MC1}$.OV | SMC2 | |
| | (BAD+BSU) $\overline{MC1}$.OV | SPOV | |
| | MC1.$\overline{OV}$ | CMP1A; CMP3A; JT4 | |
| | (MC1+OV)(BAD+BSU) | JT1; JPH6 | |
| | A2T48Z | RA1 | |
| | | RMC1 | |
| 5 | | JPH3, RD | |
| | A2T48Z | JT13; SMC3 | |
| | $\overline{A2T48Z}$ | JT8 | |

(FDV+BDV)PH5

| T | Conditions | Commands | Notes |
|---|---|---|---|
| 1 | | CMP1A; CMP3A; SOV | |
| | BDV.$\overline{A1EB1}$ | SMC2 | |
| | BDV | S48D | |
| | FDV | S36D | |
| 2 | | JT4 | |
| 3 | (not used) | | |
| 4 | | CDD | |
| | CYA2.$\overline{OV}$ | RMC3 | |
| | $\overline{CYA2}$+OV | SMC3; FA1A; FA3A | |
| 5 | | SHLC; TMC3C12; SFA48. | |
| | $\overline{DZ}$ | TA2OV; SHLA | |
| | $\overline{DZ}$.$\overline{DE12N}$ | JT2 | |
| | FDV.$\overline{MC5}$.DE35.MC3 | SMC5; CDD | |
| | DE35 | RMC5 | |
| 6 | (DE36+FDV DE24) C1 | SPOV | |
| | DE36+FDV.DE24 | TMC2C1 | |
| | | CDSY | |
| 7 | $\overline{TMZ}$ | JT7 | |
| | TMZ | ATFC; TCE | |
| | TMZ.$\overline{DZ}$ | JT4 | |
| | $\overline{CH}$.RPF($\overline{PF1+PF2}$) TMZ | JTM15 | |
| | TMZ.DZ | CMP1A; CMP3A | |
| 8 | | ATFC | |
| | SYZ.FDV | TMC4A13 | |
| 9 | | TTFE | |
| 10 | | TEA; SH12; TAE | |
| | | ATFC; CUSY | |
| | $\overline{SYE3}$ | JT8 | |
| 11 | | | |
| 12 | BDV.A2T48Z | RA1 | |
| | FDV.A14T48Z | S1A; RA13 | |
| | MC5.$\overline{A14T48Z}$ | JT8; JPH3 | |
| | $\overline{MC5}$ | JT1; JPH6 | |

(FMU+BMU)PH5

| T | Conditions | Commands | Notes |
|---|---|---|---|
| 1 | BMU.$\overline{A1EB1}$ | SMC2 | |
| | BMU | S48D | |
| | FMU | S36D | |
| 2 | | SH12; ATFC; TAE; R1A. CUSY | |
| | SYE1 | TEC; CDD | |
| | $\overline{SYE3}$ | JT2 | |
| 3 | | JT5, ROV | |
| 4 | (not used) | | |
| 5 | C12 | FA1A; FA3A | |
| 6 | | SH1; TOVA2; TA48C1; SHRC; CDD | |
| | $\overline{DE1}$.$\overline{DE12n}$.$\overline{C11}$ | JT6 | |
| | $\overline{DE1}$.$\overline{DE12n}$.C11 | JT3 | |
| | DE1 | JT11 | |
| 7 | TMZ | ATFC; TCE; CUSY | |
| | $\overline{TMZ}$ | JT7 | |
| 8 | | ATFC | |
| | $\overline{CH}$ RPF($\overline{PF1+PF2}$) | JTM15 | |

(FMU+BMU) PH5—Continued

| T | Conditions | Commands | Notes |
|---|---|---|---|
| 9 | | TTFE | |
| 10 | | TEC; JT5 | |
| 11 | | SHRC; TMC2C1 | |
| | BMU.MC2 | SFA1 | |
| | BMU.$\overline{MC2}$ | RA1 | |
| 12 | | ATFC; TCE; CUSY | |
| | BMU | JT1; JPH6 | |
| | FMU | JT5; JPH3 | |
| | A2T48Z | RA1 | |

CSE.PH5

| T | Conditions | Commands | Notes |
|---|---|---|---|
| 1 | | ACCR | |
| 2 | | TTFE; RLM | |
| 3 | | TTFE | |
| | $\overline{E10}$ (E10+E11+E12) | SD4 | |
| | $\overline{E11}$ (E10+E11+E12) | SD5 | |
| | $\overline{E12}$ (E10+E11+E12) | SD6 | |
| | $\overline{E10}$.$\overline{E11}$.$\overline{E12}$ | JT5 | |
| 4 | | 1CYM12; FALM; SH6; EAL | (a b). |
| | $\overline{DZ}$ | CDD; JT4 | |
| 5 | | 1CYM12 | (a). |
| | EQ ($\overline{M10+M11+M12}$) | FALM; SH6; EAL, JT5 | (b). |
| | EQ+M10.M11.M12 | SLM; RLM | |
| | $\overline{EQ}$ | SBRF | |
| 6 | | ACCR; TME; JT1; JPH6 | |

[a] 1CYM12=CSE.PH5.
[b] EAL=CSE.PH5.

FLDS.PH5*

| T | Conditions | Commands | Notes |
|---|---|---|---|
| 1 | | ATFC; TAE; SH12; EAL; CUSY | |
| | $\overline{SYE3}$ | JT1 | |
| | LCF SYE3 | JT5 | |
| 2 | | STRIP; ASTK; CUSY; R1A; R3A | |
| 3 | | TTFE; ASTK; CUSY; S48D | |
| 4 | | TTFE; TEA; TAB; SHRAD; LOG; SHRB12 | |
| | $\overline{SYZ}$ | ASTK; CUSY | |
| | $\overline{DE12}$ | JT4 | |
| 5 | LAF | LAND | |
| | LOF | OR | |
| | LCF | CMP1A; CMP3A | |
| | LXF | XOR | |
| | LAF+LOF+LCF +LXF | JT9 | |
| | BSF | STRIP; R1A; R3A | |
| 6 | | STRIP; SD5; R1A; R3A | |
| | BSF | CMP1A; CMP3A | |
| 7 | $\overline{D5}$.BSF | CY1A48 | |
| | $\overline{DZ}$ | JT7; CDD | |
| | DZ | F1A1; FA3A; FA1 | |
| | DZ.CYA1 | SMC5 | |
| 8 | BSF.MC5 | CMP1A; CMP3A | |
| 9 | | STRIP; ATFC; CUSY; R1A; R3A | |
| 10 | | TTFE; ATFC; CUSY; S48D | |
| 11 | | TTFE; TEA; TAB | |
| | | SHRAD; LOG; SHRB12. | |
| | $\overline{SYZ}$ | ATFC; CUSY | |
| | $\overline{DE12}$ | JT11 | |
| 12 | | INSERT; R1A; R3A | |
| 13 | | OR; TS2T4D | |
| 14 | $\overline{DZ}$ | SH6; EAL; CDD | |
| | $\overline{DZ}$ $\overline{DE1}$ | JT14 | |
| 15 | | JT1; JPH6 | |

*FLDS=LAF+LOF+LCF+LXF+BAF+BSF.

(LAN+LOR+LXR)PH5

| T | Conditions | Commands | Notes |
|---|---|---|---|
| 1 | LAN | LAND | |
| | LOR | OR | |
| | LXR | XOR | |
| | | JT1; JPH6 | |

LSR.PH5

| T | Conditions | Commands | Notes |
|---|---|---|---|
| | INT.S10.$\overline{A47}$.A48 | INTERRUPT COMPUTER #1 | |
| | INT.S10.A47.$\overline{A48}$ | INTERRUPT COMPUTER #2 | (a). |
| | INT.S10.A47.A48 | INTERRUPT COMPUTER #3 | |
| | INT.S10.A46 | INTERRUPT COMPUTER #4 | |
| 1 | INT.S12 | RQ | |
| | INT.S11 | RYSX | (a). |
| 2 | INT.S12 | TAQ | |
| | INT.S11 | TAXY | (a). |
| | | JT1; JPH1 | |

a See the following table:

| S10 | S11 | S12 | |
|---|---|---|---|
| 0 | 0 | 1 | —Load Mask Register. |
| 0 | 1 | 0 | —Load Memory Limit Registers. |
| 1 | 0 | 0 | —Interrupt Computer #N (N=A46, A47, A48 decoded). |

LTF.PH5*

| T | Conditions | Commands | Notes |
|---|---|---|---|
| 1 | | TAE; TAK; SH12 | |
| | $\overline{S3}$ | ATFS; JT3 | (a). |
| | S3 | ATFSSY; CUSY | |
| | $\overline{S6}$·S3 | SD4 | |
| 2 | $\overline{DZ}$ | SHRAD; LOG; JT2 | |
| | S6·$\overline{SYZ}$ | ATFSSY; CUSY; TAE; SH12; JT2 | |
| | $\overline{S6}$·DZ | ATFSSY; CUSY; TAE; TAK; SH12 | |
| | $\overline{S6}$·DZ·$\overline{SYE2}$ | SD4 | |
| | $\overline{S6}$·$\overline{SYEZ}$ | JT2 | |
| 3 | | JT1; JPH1 | |

* IAR can be handled only during Control Mode. Any attempt to write in IAR during Normal Mode sets I6.

a See the following table:

| S6 | S3 | Bits | Word |
|---|---|---|---|
| 0 | 0 | 16 | 1 |
| 0 | 1 | 16 | 3 |
| 1 | 0 | 12 | 1 |
| 1 | 1 | 12 | 4 |

(OOB+FLD C)PH5*

| T | Conditions | Commands | Notes |
|---|---|---|---|
| 1 | FLDC.$\overline{AIF}$ | STRIP | |
| | AIF | INSERT | |
| | FLDC.$\overline{SAF}$ | ASTK; CUSY | |
| | SAF | JT4 | |
| | OOB.A1EB1 | JT6 | |
| | OOB.$\overline{A1EB1}$ | JT1; JPH6 | |
| | $\overline{A1}$.B1(CGR+ACL) | SBRF | |
| | A1.$\overline{B1}$(CLS+ACG) | SBRF | |
| | FLDC | R1A; R3A | |
| 2 | FLDC | ASTK; CUSY; TTFE; SD4 | |
| 3 | FLDC | TTFE; CDD; SHRB12 | |
| | FLDC.$\overline{SYZ}$ | ASTK; CUSY | |
| | FLDC.AIF | TEB | |
| | AIF | TEA; TAB; SH12 | |
| | FLDC.$\overline{DEI}$ | JT3 | |
| 4 | FLDC | TS2T4D | |
| 5 | FLDC.$\overline{DZ}$ | SH6; EAL; CDD | |
| | FLDC.$\overline{DZ}$.$\overline{DEI}$ | JT5 | |
| 6 | AIF | OR | |
| | FLDA | JT1; JPH6 | |
| | OOB+FLDB | CMP1A; CMP3A | |
| 7 | OOB+FLDB | ICYA48 | |
| 8 | OOB+FLDB | ICYA48 | |
| 9 | OOB+FLDB | ICYA48; FA1; FA1A; FA3A | |
| | (OOB+FLDB)CYA1 | SMC5 | |
| 10 | | | |
| 11 | OOB+FLDB | JT1; JPH6 | |
| | A1T48Z(ACE+CEF+CEQ)<br>MC5·$\overline{A1T48Z}$(ACL+CLF)<br>$\overline{MC5}$(ACG+CGF)<br>$\overline{A2T48Z}$·CLS(MC5·$\overline{B1}$+$\overline{MC5}$·B1)<br>$\overline{A2T48Z}$·CGR(MC5·B1+$\overline{MC5}$·B1) | SBRF | |

*OOB=CEQ+CGR+CLS+ACE+ACG+ACL.

$FLDC=\underbrace{SAF+AIF}_{FLDA}+\underbrace{CEF+CGF+CLF}_{CLDB}$.

RPT.PH5

| T | Conditions | Commands | Notes |
|---|---|---|---|
| 1 | | ARIRIS, CUIS, SCAN C, TSCANE | |
| 2 | | ARIRIS, CUIS, SCAN B, TSCANE | |
| 3 | | ARIRIS; RIS; SCAN A; TSCANE | |
| | | JPH6; JT1 | |

SHF·PH5

| T | Conditions | Commands | Notes |
|---|---|---|---|
| 1 | | TSD | |
| | (S7T12Z)S3 | JT3 | |
| | | TAE | |
| 2 | S4 | SHRAD | |
| | $\overline{DZ}\cdot\overline{S4}$ | SHLA; CDD | |
| | $\overline{S6}\cdot S5$ | EAL | |
| | S5 | LOG | |
| | $\overline{S6}\cdot\overline{S5}$ | EANL | |
| | $S6\cdot\overline{S5}$ | EONL | |
| | S6 | EO | |
| | $\overline{DZ}$ | JT2 | |
| | DZ | JT1; JPH6 | |
| 3 | | ATFC; CUSY; SMC5 | |
| | S4 | TEC | |
| 4 | | ATFC; TTFE; CUSY; RLM | |
| | $\overline{S4}\cdot S6$ | RC | |
| | $\overline{S4}\cdot\overline{S6}$ | TAC | |
| 5 | | TTFE; TEA; TAB; SH12; SHRB12 | |
| | $\overline{SYZ}$ | ATFC; CUSY; JT5 | |
| | SYE2 | FALM | |
| 6 | | TEA; TAB; SH12; SHRB12 | |
| 7 | $\overline{S4}\cdot S5$ | SHLA; LOG; TC1A48; SHLC | |
| | $\overline{S4}\cdot\overline{S5}$ | SHLA; TC2A48; SHLC | |
| | S4·S5 | SH1; LOG; TC12A1; SHRC | |
| | $S4\cdot\overline{S5}$ | SH1; TC12A2; SHRC | |
| | | CDD | |
| | $\overline{DE1}$ | JT7 | |
| 8 | MC5 | ATFC; TAE; CUSY; TSD; RMC5TBA; SH12; SHRB12 | |
| | $\overline{S4}$ | TEC | |
| | S4.S6 | RC | |
| | $\overline{MC5}$ | JT1; JPH6 | |
| 9 | SYZ | ATFC; TAE; CUSY; TBA; SH12; SHRB12; JT9 | |
| | (S4+S6) SYZ | JT7 | |
| | S4.S6.SYZ | TLMKE | |
| 10 | | TEC; JT7 | |

TRM.PH5

| T | Conditions | Commands | Notes |
|---|---|---|---|
| 1 | S12 | RA1 | (a). |
| | S11 | SFA1 | |
| | $\overline{S10}$ | JT1; JPH6 | |
| | | R1B | |
| 2 | | CDSY; SHRB12 | (b). |
| 3 | | ATFC; CUSY; SHRB12. | (b). |
| 4 | | TTFE; SHRB12 | (b). |
| 5 | E2 | ICYA48 | |
| 6 | E2 | ICYA48 | |
| 7 | E2 | ICYA48; FA1A; FA3A | |
| 8 | OV | SPOV | |
| | | JT1; JPH6 | |

[a] See the following table:
[b] SHRB12=TRM·PH5.

| S | 10 | 11 | 12 |
|---|---|---|---|
| SSP | 0 | 0 | 1 |
| SSM | 0 | 1 | 0 |
| CHS | 0 | 1 | 1 |
| RND | 1 | 0 | 0 |

(SRJ+SRR) PH5

| T | Conditions | Commands | Notes |
|---|---|---|---|
| 1 | SRJ+SRR | ABAR; RLM | |
| 2 | SRJ+SRR | TTFE; ABPR | |
| 3 | SRJ+SRR | FALM; TTFE | |
| 4 | SRJ+SRR | RLM; SLM | |
| 5 | SRJ+SRR | ICYM12; FALM | |
| 6 | SRJ+SRR | TLMKE; AXR15 | |
| | SRR | JT1; JPH1 | |
| 7 | SRJ | APCR; RLM | |
| 8 | SRJ $(\overline{PF1}+\overline{PF2})(\overline{PF1}\cdot\overline{PF2}+\overline{PS2}+\overline{PS3})$ | JT11 | (a). |
| | SRJ | TTFE; RLM; SLM; RPFS | |
| 9 | SRJ | FALM | |
| 10 | SRJ | FLMKE | |
| 11 | SRJ | ASSR; ITF | |
| 12 | SRJ | ABPR | |
| 13 | SRJ | TTFE; APCR; ITF | |
| | SRJ | JTM15 | |
| 14 | | | |
| 15 | $\overline{TMZ}$ SRJ | JT15 | |
| | TMZ SRJ | JPH1; JT1 | |

[a] $(\overline{PF1}+\overline{PF2})(\overline{PF1}\cdot\overline{PF2}+\overline{PS2}+\overline{PS3})=\overline{OVLP}$.

XLC·PH5

| T | Conditions | Commands | Notes |
|---|---|---|---|
| 1 | | AX1R | |
| 2 | | TTFE; AXR; SCAN B; RLM. | |
| 3 | | FALM; TTFE | |
| | $\overline{S1}$ | SMC1 | (a b). |
| 4 | S1 | SLM; RLM | |
| 5 | | ICYM12 | (a). |
| | | FALM; RMC1 | |
| 6 | | AXR; SCAN B; TLMKE | |
| 7 | S9+S10+S11+S12 | ALIM; SCAN C | |
| | | SLM; TLM | |
| 8 | | TTFE | |
| 9 | | ICYM12; FALM | (a). |
| | CYL1 | SMC1 | |
| 10 | $S2\cdot\overline{LMZ}\cdot MC1+S3\cdot\overline{MC1}+S4\cdot LMZ$ | SBRF | |
| | | JT1; JPH6 | |

[a] $ICYM12=MC1\cdot XLC\cdot PH5\cdot\overline{T3}$.
[b] XLC Variants:
S1 0 Increases.
1 Decreases.
S2 1 X<L1M.
S3 1 X>L1M.
S4 1 X=L1M.

PH6

| T | Conditions | Commands | Notes |
|---|---|---|---|
| 1 | $\overline{RPF}\cdot\overline{FILL}\cdot F11$ | APSRA | |
| | TMZ·FILL·F11 | JTM15 | |
| | RPF·F11 | ARPRIS | |
| | FILL·F11 | JT1 | |
| | $\overline{FILL}$·F11·F12 | JT3 | |
| | $\overline{F11}$ | JT10 | |
| | $\overline{F11}\cdot\overline{F12}$ | CDSTK | |
| | | RMC1 | |
| 2 | TMZ | TTFE | |
| | $\overline{FILL}$ | APSRA | |
| | TMZ·FILL | JTM15; SMC1 | |
| | FILL | JT2 | |
| 3 | | TTFE; RLM | |
| | ($\overline{RPF}$+FRP)(TIO+FLDB+OOB+CSE+XLC+BRB+RPT) | ABPR | |
| | ($\overline{RPF}$+FRP)(FLDS+OOS+SHF+TRM+FLDA) | ABAR | (a). |
| | $\overline{MC1}$ | TES | |
| | $\overline{RPF}$ $\overline{BRF}$(BRB+CSE+FLDB+OOB+TIO+XLC) | JT1; JPH1 | (b). |
| | RPF·$\overline{RPF}$ | ARIRIS | |
| 4 | | TTFE; TEM | |
| | ($\overline{RPF}$+FRP) (FLDA+FLDS+OOS+SHF+TRM) | TE1IAF; IE1TM1 | (a c). |
| | FRP·RPF | FALM | |
| 5 | TMZ | FALM | |
| | TMZ·IAF | JTM19; JT5 | |
| | TMZ(S1+S2+S3+S4) $\overline{IAF}$ F12 | AXR; SCAN A | |
| | TMZ·$\overline{IAF}\cdot\overline{F12}$ | JT10 | |
| | TMZ+IAF | JT5 | |
| 6 | S5+S6+S7+S8 | AXR; SCAN B | |
| | | TTFE | |
| 7 | S9+S10+S11+S12 | AXR; SCAN C | |
| | | TTFE; FALM | |
| 8 | | TTFE; FALM | |
| 9 | | FALM | |
| 10 | F11·RPF | ARPRIS; TLMKE; CDIS. | (b). |
| | $\overline{BRF}$ (BRB+CSE+FLDB+OOB+TIO+XLC). | JT1; JPH1 | |
| | $\overline{F11}$ | ASTK; CUSY; TAE; SH12; EAL. | |
| | RPT+BRF | JTM19; JT13 | |
| | F11 (FLDS+OOS+SHF+TRM+FLDA) | JTM3; JT13 | |
| | RPT | SFRP | |
| 11 | | ASTK; CUSY; TAE; SH12; EAL. | |
| 12 | | ASTK; CUSY; TAE; SH12; EAL | |
| 13 | $\overline{F11}$ | ASTK; CUSY; TAE; SH12; EAL | (d). |
| | $\overline{TMZ}$ | JT13 | |
| | $\overline{TMZ}$ | JT1; JPH1 | |

a FLDS+OOS+SHF+TRM=PH6 ST.
b BRB+CSE+FLDB+OOB+TIO+XLC=PH6 BR.
c IE1TM1=$\overline{PSIAF}\cdot\overline{FRORN}$ T4; TEIAF means SIAF if E1=ONE.
d SAES=PH6·$\overline{F11}$.

TM

| T | Conditions | Commands | Notes |
|---|---|---|---|
| 0 | | OFF | |
| 1,2 | | | |
| 3 | | TAE; SH12; EAL | |
| | GOMGO | SRFF | |
| 4 | | RPAR | |
| | $\overline{HOLDA}$+$\overline{HOLDB}$ | TEM | |
| | $\overline{GOMGO}$ | JTMO; SI6 | (a). |
| 5 | | TAM; SH12; EAL | (b). |
| 6 | | TAM; SH12; EAL | (b). |
| 7 | | TAM; SH12; EAL | (b). |
| 8 | | TPARM; JTMO; RRFF | |
| 9–14 | | | |
| 15 | | APCR; TES | |
| 16 | | TTFE; RLM | |
| 17 | | FALM; ICYM12 | (c). |
| 18 | | SRFF | |
| 19 | BRF+FILL+PH5+PH3 | APCR; TLMKE | |
| | BRF+FILL+(PH5+PH3)($\overline{PF1}\cdot\overline{PF2}$) | RPSRA; RPFS | |
| | | SRFF | (d). |
| | BRF | RIS | |
| 20 | HOLDA+HOLDB | Permits count to 21 | |
| | | TSWKE | |
| 21 | | | |
| 22 | | SLM; RLM; RRFF | |
| 23 | | SLM; RLM | |
| | CHCMP | SHTC | |
| 24 | | TMEMM; RPAR | |
| 25 | | TMEMM; TLMKE | |
| | ($\overline{CLA+SER}$)PH2 $\overline{FILL}$ | TMA; SH12 | |
| | PH4 $\overline{FILL}$ | TMB; SHRB12 | |
| | $\overline{IOA}$ $\overline{IOB}$ BRF+FILL+PH5+PH3 | APSRIS | (e). |
| | IOA IOB BRF+FILL+PH5+PH3+RPT | CUIS | |
| | IOA AIAB $\overline{C12}$+IOB AIBB $\overline{C12}$ | SBRF | |
| | $\overline{FILL}$ RPT | ARPRIS | |
| 26 | | TMEMM | |
| | ($\overline{CLA+SER}$)PH2 $\overline{FILL}$ | TMA; SH12 | |
| | PH4 FILL | TMB; SHRB12 | |
| | $\overline{IOA}$ $\overline{IOB}$ BRF+FILL+PH5+PH3 | APSRIS | |
| | $\overline{FILL}$ RPT | ARPRIS | (a e b). |
| | $\overline{IAF}$ | TLMKE | |
| | IAF | TMK; TMIAF | |
| | IOA IOB BRF+FILL+PH5+PH3+RPT | CUIS | |
| | IAF M7 | SI10 | |
| 27 | | TMEMM | |
| | ($\overline{CLA+SER}$)PH2·$\overline{FILL}$ | TMA; SH12 | |
| | PH4·$\overline{FILL}$ | TMB; SHRB12 | |
| | $\overline{LOA}\cdot\overline{LOB}$·BRF+FILL=PH5+PH3 | APSRIS | |
| | $\overline{FILL}$ RPT | ARPRIS | (e). |
| | $\overline{IOA}\cdot\overline{IOB}$·BRF+FILL+PH5+PH3+RPT | CUIS; TLMKE | |
| 28 | | RLM; CKPAR; JTMO; RRFF | |
| | ($\overline{CLA+SER}$)PH2·$\overline{FILL}$ | TMA; SH12 | |
| | PH4·$\overline{FILL}$ | TMB; SHRB12 | |
| | $\overline{IOA}\cdot\overline{IOB}$·BRF+FILL+PH5+PH3 | APSRIS; SPF | (e). |
| | $\overline{FILL}$·RPT | ARPRIS | |
| | BRF·$\overline{FILL}$ | RRPF | |
| | $\overline{IOA}\cdot\overline{IOB}$·BRF+FILL+PH5+PH3+RPT | CUIS; TLMKE | |
| | | RIOA; RIOB | |

a SI6 may be masked by Q6.
b TMWT=TAM=TM5+TM6+TM7.
c ICYM12=$\overline{TMZ}$ ($\overline{SRJ\ PH5}$).
d $\overline{TIO}\cdot\overline{T5}$.JTM19 sets RFF.
e TMRT=TM25+TM26+TM27+TM28.
f TMIAF=RIAF if $\overline{M8}$ TMK.

INSTRUCTIONS

Shown from FIGS. 34 to 77 inclusive, and discussed hereinbelow, are the routines for each of the instructions of the illustrative embodiment computer.

The execution of each instruction is shown there in flow-chart form. The machine instructions have been presented in alphabetical sequence by mnemonic code. Only the actual execution (i.e., phase 3 and/or 5) is shown in detail on these flow charts. Phase one, two, four and six operations are simply summarized.

The following "Instruction Index" table lists in alphabetical order the instructions of the FIG. 1 illustrative embodiment computer, provides the mnemonic abbreviations and octal number command designations of the instructions which actually are written in binary form as the first six bits of the operator syllable which is the first syllable of an instruction. The syllable layout and symbolic description of each instruction are also listed. In the syllable layout, the O refers to the first 6 command bits, A1 is the 7th and 8th bits (first indicator), A2 is the second indicator, the 9th and 10th bits, and A3, the third indicator, is the 11th and 12th bits of the operator syllable. The abbreviations, such as (M), B, $(\underline{M})$, L, F, C, $V_s$, etc. are for 12-bit syllables of the various types indicated.

| Mnemonic and Octal | Instruction Name | Syllable Layout $A_1$ | $A_2$ | $A_3$ | Symbolic Description |
|---|---|---|---|---|---|
| ACE-72 | Alphanumeric Compare Equal | 0 (M) | (M) | B | $(A_1)=(A_2):A_3$ (alphanumeric) |
| ACG-71 | Alphanumeric Compare Greater | 0 (M) | (M) | B | $(A_1)>(A_2):A_3$ (alphanumeric) |
| ACL-70 | Alphanumeric Compare Less | 0 (M) | (M) | B | $(A_1)<(A_2):A_3$ (alphanumeric) |
| AIF-40 | Adjust and Insert, Field | 0 (M) | F | $(\underline{M})$ | |
| BAD-65 | Binary Add | 0 (M) | (M) | $(\underline{M})$ | $(A_1)+(A_2)\rightarrow A_3$ |
| BAF-43 | Binary Add, Field | 0 (M) | F | $(\underline{M})$ | |
| BDV-60 | Binary Divide | 0 (M) | (M) | $(\underline{M})$ | $(A_1)\div(A_2)\rightarrow A_3$ |
| BMU-61 | Binary Multiply | 0 (M) | (M) | $(\underline{M})$ | $(A_1)\times(A_2)\rightarrow A_3$ |
| BRB-26 | Branch on Bit | 0 (M) | $(\underline{M})$ | B | |
| BRC-11 | Branch on Condition | 0 L | B | | $A_1:A_2$ |
| BSF-42 | Binary Subtract, Field | 0 (M) | F | $(\underline{M})$ | |
| BSU-64 | Binary Subtract | 0 (M) | (M) | $(\underline{M})$ | $(A_1)-(A_2)\rightarrow A_3$ |
| CBF-25 | Convert Binary to Floating Point | 0 (M) | $(\underline{M})$ | | $(A_1)\rightarrow A_2$, floating |
| CEF-52 | Compare Equal, Field | 0 (M) | F | B | |
| CEQ-76 | Compare Equal | 0 (M) | (M) | B | $(A_1)=(A_2):A_3$ (algebraic) |
| CGF-51 | Compare Greater, Field | 0 (M) | F | B | |
| CGR-75 | Compare Greater | 0 (M) | (M) | B | $(A_1)\geq(A_2):A_3$ (algebraic) |
| CLA-20 | Clear | 0 $(\underline{M})$ | | | zeroes$\rightarrow A_1$ |
| CLF-50 | Compare Less, Field | 0 (M) | F | B | |
| CLS-74 | Compare Less | 0 (M) | (M) | B | $(A_1)<(A_2):A_3$ (algebraic) |
| CSE-32 | Character Search | 0 (M) | C | B | $(A)=A_2:A_3$ |
| FAD-67 | Floating Add | 0 (M) | (M) | $(\underline{M})$ | floating, $(A_1)+(A_2)\rightarrow A_3$ |
| FDV-62 | Floating Divide | 0 (M) | (M) | $(\underline{M})$ | floating, $(A_1)\div(A_2)\rightarrow A_3$ |
| FMU-63 | Floating Multiply | 0 (M) | (M) | $(\underline{M})$ | floating, $(A_1)\times(A_2)\rightarrow A_3$ |
| FSU-66 | Floating Subtract | 0 (M) | (M) | $(\underline{M})$ | floating, $(A_1)-(A_2)\rightarrow A_3$ |
| HLT-01 | Halt | 0 | | | |
| IRR-05 | Interrupt Return | 0 | | | |
| LAF-47 | Logical AND, Field | 0 (M) | F | $(\underline{M})$ | |
| LAN-56 | Logical AND | 0 (M) | (M) | $(\underline{M})$ | $(A_1)\cdot(A_2)\rightarrow A_3$ |
| LCF-46 | Logical COMPLEMENT, Field | 0 (M) | F | $(\underline{M})$ | |
| LCM-24 | Logical COMPLEMENT | 0 (M) | $(\underline{M})$ | | $(A_1)\rightarrow A_2$ |
| LOF-44 | Logical OR, Field | 0 (M) | F | $(\underline{M})$ | |
| LOR-55 | Logical OR | 0 (M) | (M) | $(\underline{M})$ | $(A_1) \vee (A_2)\rightarrow A_3$ |
| LSR-31 | Load Special Register | 0 (M) | Vs | | |
| LTF-30 | Load Thin Film | 0 (M) | T | | $(A_1)\rightarrow A_2$, thin film |
| LXF-45 | Logical EXCLUSIVE OR, Field | 0 (M) | F | $(\underline{M})$ | |
| LXR-54 | Logical EXCLUSIVE OR | 0 (M) | (M) | $(\underline{M})$ | $(A_1)$ ⓥ $(A_2)\rightarrow A_3$ |
| NOP-00 | No Operation | 0 | | | |
| RPT-10 | Repeat | 0 Rc | Ri | B | Repeat $(A_3)$, by $A_2$, $A_1$ times |
| RVS-06 | Reverse Stack | 0 | | | |
| SAF-41 | Strip & Adjust Field | 0 (M) | F | $(\underline{M})$ | |
| SER-21 | Store External Requests | 0 $(\underline{M})$ | | | |
| SHF-36 | Shift | 0 (M) | S | $(\underline{M})$ | $(A_2)$ shifted, by $A_1$, $\rightarrow A_3$ |
| SRJ-14 | Subroutine Jump | 0 Ja | Ji | | |
| SRR-04 | Subroutine Return | 0 | | | |
| STF-15 | Store Thin Film | 0 T | $(\underline{M})$ | | Thin film, $(A_1)\rightarrow A_2$ |
| SSD-03 | Step Stack Down | 0 | | | $s-1\rightarrow s$ |
| SSU-02 | Step Stack Up | 0 | | | $s+1\rightarrow s$ |
| TIO-16 | Transmit to Input/Output | 0 IO | M | B | |
| TRM-34 | Transmit Modified | 0 (M) | Vt | (M) | $(A_1)$, by $A_2$, $\rightarrow A_3$ |
| TRS-35 | Transmit | 0 (M) | $(\underline{M})$ | | $(A_1)\rightarrow A_2$ |
| UCT-22 | Unconditional Transfer | 0 B | | | $:A_1$ |
| XLC-12 | Index, Limit-Compare | 0 Ia | Iv | B | |

Now refer to FIG. 34. The ACE (alphanumeric compare equal) instruction is shown in that flow-chart which will be described by way of illustration of the commands. The alphanumeric compare equal instruction is a program control instruction wherein the contents of the location specified by A1 are compared with the contents of the location specified by A2 and if equal, the next instruction is taken from the location specified by A3, and if not equal, continuation in sequence is followed, by taking the next instruction of the program. In FIG. 34, the operator syllable comprises the binary equivalent of the octal number 72 in the first six bits (111010) to determine the symbol for the alphanumeric compare equal. The next two bits, the seventh and eighth bits, are A1, the indicator A1 denoting whether the first address is in stack or memory, the next two bits, the ninth and tenth bits determine A2 and indicate whether the second operand is to be fetched from stack or memory and the other conditions specified in such case, the eleventh and twelfth bits determine A3, the third indicator which if A1 and A2 location contents are equal specifies whether the branch syllable is to be indexed or not. Now refer to the FIG. 34 flow chart of operation. In phase 1 the operator syllable is fetched. The operator syllable comprises the first twelve bits of the instruction word. These first 12 bits include the above-described six bits for determining the command as octal 72, alphanumeric compare equal. The next two bits, 7 and 8 determine for the first operand indication of memory or stack, whether stack hold or normal and whether if memory, an unindexed syllable or an indexed syllable is involved. The 9th and 10th bits determine for the second operand whether stack or memory, if stack, whether hold or normal, and if memory, whether an unindexed or an indexed syllable follows. If the contents of the location specified by A1 are equal to the contents of the location specified by A2, a branch is to occur and the 11th and 12th bits determine whether the first syllable location branched to is a stack or memory, whether if a stack the stack is to be held, and if a memory whether an unindexed syllable or an indexed syllable follows.

In phase 2 the first operand is fetched from the stack or memory as determined by the seventh and eighth bits of the operator syllable and the address syllables if memory and the first operand is stored in the A register 3033 of the arithmetic unit 3030 in the computer module. During phase 4 the second operand is fetched from stack or memory determined by bits 9 and 10, and if memory by the corresponding address syllables and the second operand is stored in the B register 3031.

In phase PH5 at time T1 most significant bit in the A register 3033 is compared with the most significant bit in the B register 3031. If the most significant bits of the two registers 3031 and 3033 are not equal then a jump to phase 6 occurs, the branch syllable is read out, and with the branch flip flop BRF (FIG. 4) in reset condition the instruction is completed and a jump is executed to PH1–T1 for the next instruction.

If the most significant bit in the A register 3033 is equal to the most significant bit in the B register 3031 the conditions for alphanumeric compare equal and the branch may be present. During phase 5, time T6 the contents of the B register 3031 in the arithmetic unit 3030 are subtracted from the contents of the A register 3032 and the results are left in the A register 3032. In phase 5 at time T11, if the result in the A register 3033 shows the A register 3033 to read a ZERO then the contents of the locations determined by bit 7 and 8 and bits 9 and 10 are equal. If not a ZERO the data words compared were not equal and the branch syllable is read out, and if the BRF branch flip flop of miscellaneous control flip flop 3548 (FIG. 4) is reset, the instruction is completed and a jump is executed to PH1–T1, for the next instruction. However, if the contents of the A register 3033 were ZERO then the branch flip flop BRF is set and in phase 5 at time T11, the branch syllable is read and with the BRF branch flip flop set (see FIG. 4) the next program word is fetched from the memory location relatively indicated by the branch syllable and stored in the program storage register 100 to 103. This next program word is executed then with the remainder of the program to which a branch has occurred.

The alphanumeric compare greater and alphanumeric compare less instructions shown in FIGS. 35 and 36 are similar to the alphanumeric compare equal instruction and with that instruction in mind are apparent from the charts of these figures. These will not be described.

Now refer to FIG. 37 which shows the AIF (adjust and insert field) instruction flow chart. This instruction is to clear a field of the contents of the location specified by A1. This field is defined by the contents of A2. The contents of the top of the stack are adjusted (shifted) as indicated by the contents of the syllable denoted by A2, the two quantities are logically ORed and the results stored in the location specified by operator syllable bits 11 and 12, A3.

This insruction is in the group of unpacking and partial word instructions. In the AIF instruction octal 40, the first 6 bits are the command. The command is followed by bits 7 and 8 which denote a stack or memory address. In this case the syllable indicated by the 9th and 10th bits is a variant syllable. The 11th and 12th bits determine where the result is to be stored. This is a memory or stack optional address. The machine always knows the special or variant syllables from the command portion of the operator syllable.

Now refer to the flow chart of FIG. 37. During phase 1 the operator syllable is fetched from the program storage register 100 to 103 or 104 to 107. In phase 2 the operand denoted by the stack or memory address as indicated in the A1 (7th and 8th bits) is fetched from stack 3099 or from memory and stored in the A register 3033.

In phase 4, the special variant syllable F, which defines the field of ZERO's to be inserted in the operand now stored in the A register 3033 and which indicates the number of characters by which the contents of the top of the stack must be shifted before being ORed with the contents of the A register 3033 is stored in the syllable register 3017. Refer to the field definition syllable (F) of FIG. 8, which shows the format of the syllable now in the syllable register 3017. A special field syllable comprises a plurality of adjacent fields. A field is composed of from 1 to 8 physically adjacent 6-bit characters in the 48-bit word. The character positions are numbered from ZERO to seven from left to right. If the field is continuous in an end-around fashion then, the field comprises only the portion between the starting and the least significant bit position of the word. The field syllable "F" (FIG. 8) when stored in the syllable register 3017 is divided into groups of bits. Bits 6 through 8 of the field syllable F contain the length (number of characters) of the field which is to be stripped. A length of zero means that the field to be stripped is a full 8-character word. Since this is an insert instruction, a length of ZERO then means that all ZERO's are to be inserted in the word in the A register 3033.

Bits 10–12 of the field syllable in the syllable register 3017 ("F" syllable of FIG. 8) contain the position number of the leftmost character of the field to be stripped.

Bits 2–4 of the field syllable (F) in the syllable register 3017 (also in E register 3005) contain the number of character positions through which the contents of the top of the stack 3099 is to be shifted. This shift is a 6-bit end-around-right and logical shift. Logical means that the most significant bit of the word is included in the shift.

Now return to FIG. 37. In phase 4, the special syllable "F" was fetched and was stored in the syllable register 3017.

In phase PH5, time T1, the ZERO's are inserted (a "hole" made in the contents of the A register 3033). The "hole" length is in accordance with the syllable contained in bits 6–8 in the syllable register 3017. The "hole" beginning is determined by bits 10–12 of the syllable in the syllable register 3017 which bits 10–12 define with what character the "hole" is begun. The contents of the A register 3033 thus at the end of the PH5, T1 step just enumerated, contain the operand with ZERO's substituted in accordance with this last step for one or more of the characters of the operand.

In phase PH5, times T1, T2, and T3, the contents of the A register 3033 are shifted to the B register 3031 (see FIG. 2). The contents of the top of the stack 140 to 143, 144 to 147, 150 to 153, or 154 to 157, whichever happens to be at the top of stack 3099 are fetched and stored in the A register 3033. Following this, in accordance with the description above of the shift being an end-around shift right and logical, the new contents of the A register is shifted end-around right by 6, the number of times indicated by bits 2–4 in the syllable register 3017.

At phase PH5, time T6, the contents of the A register 3033 and the B register 3031 are ORed together in the input gates to the arithmetic unit 3030 and the result of ORing the contents of the A register 3033 and the B register 3031 are stored in the A register 3033 (see FIG. 2).

In phase 6, the contents of the A register 3033 are stored either in the stack 3099 or in the memory location as indicated by the last memory address syllable of the AIF (add insert field) instruction. During this phase the instruction being completed, a jump is executed to PH1, time T1 for the next instruction to be serviced.

Now refer to FIG. 38 the binary add instruction flow chart. The execution of this instruction is similar to the above-described instruction. However, one difference is that a comparison of the signs is made to determine equality. Complementing if the signs are not equal is effected in the course of adding in the arithmetic unit 3030.

Referring to FIG. 38, the binary add instruction flow chart in greater detail, the first 6 bits are the binary add 65 command and of the next 6 bits, bits 7 and 8 executed in phase 2 refer to a memory or stack address operation, the 9th and 10th bits to a memory or stack address operation, executed in phase 4, and the 11th and 12th bits to a memory or stack store operation executed in phase 6. In the binary add instruction the contents of the location specified by bits 7 and 8 are added to the contents of the location specified by bits 9 and 10 and the result is stored in the location specified by bits 11 and 12.

A discussion of the flow chart of operations follows: In phase 1, the operator is fetched and the subcommand matrix and control portion set up accordingly. In phase 2, the first operand which is the addend is fetched from stack or memory in accordance with the 7 and 8 bits and the contents are stored in the A register 3033. In phase 4, the augend or second operand is fetched from the stack 3099 or memory depending upon bits 9 and 10 and stored in the B register 3031. At phase PH5, time T1, a comparison is made by examining the most significant bit which is the sign of each of the operands. If the signs are different the A register 3033 is complemented, a control flip-flop MC1 of master control flip-flops 3549 (FIG. 4) is set and remaining at time T1, upon reexamination, the signs will prove to be the same. A shift is then executed to time T2 of phase 5. The gates which permit propagation of the carry to take place are opened so that end-around carry will be permitted. In phase 5, time T3, the contents of the A register 3033 and the B register 3031 are added in the adder 3032 and the sum is stored in the A register 3033. At phase 5, time T4 the control flip-flop MC1 is examined and if reset and the overflow (carry bit) 3541 is set causes the program overflow flip-flop POV of overflow unit 3544 to be set at PH5, time T4. Whether or not the unit 3544 program overflow flip-flop (PO) is set, the contents of the A register 3033 are stored in stack 3099 or memory in phase 6 and the instruction is then completed. Then at PH5, time T4, if the control bit flip-flop MC1 is set and the overflow flip-flop 3541 is reset then the contents of the A register 3033 are complemented and the control flip-flop MC1 is reset. Following this with both the control and overflow flip-flops MC1 and OV set or reset, the contents of the A register 3033 are stored in the stack 3099 or memory and the instruction is completed. Thus the condition is corrected if the control flip-flop MC1 is set and the overflow flip-flop OV 3541 is reset by resetting MC1 and the contents of the A register 3033 is then stored in stack 3099 or memory or in the case of the other two conditions of both flip-flops MC1 and OV 3541 being set or reset, the contents of the A register are immediately stored in stack or memory in accordance with the phase 6 store routine.

Now refer to FIG. 39, the binary add field, binary subtract, field instructions. Referring to FIG. 39 the binary add field, and binary subtract field, operations are similar to the binary add and binary subtract instructions except that this is a field operation with steps similar to that described in the adjust and insert field handling of a variant syllable.

In FIG. 39, the binary add field, and binary subtract field instructions, the format is shown at the top of that figure wherein a binary add field instruction first 6 bits are the binary equivalent of the octal command 43. Following the operator syllable, the 7th and 8th bits denote a stack or memory operation and the F syllable is a special field syllable. The results are stored in accordance with the 11th and 12th bits of the operator syllable for binary add field.

BINARY DIVIDE

The binary divide instruction is similar to the binary multiply instruction which will be described. The binary divide instruction is illustrated in the flow chart of FIG. 40.

THE BINARY MULTIPLY CIRCUIT

Refer to FIG. 41, the binary multiply instruction flowchart. The binary multiply instruction is octal 61. The 12-bit instruction syllable includes 6 bits for the binary equivalent of octal 61 (110 001) plus seventh and eighth $A_1$ first operand indicator bits, ninth and tenth $A_2$ second operand indicator bits, and eleventh and twelth $A_3$ result store indicator bits. Each operand, $A_1$ and $A_2$ may be either fetched from the stack or from main memory and the result $A_3$ may be stored in the stack or in main memory. The instruction binary multiply is used to multiply the contents of the location specified by $A_1$, by the contents of the location specified by $A_2$; storing the 47 high-order bits of the double precision product with sign (the 48th bit), in the location specified by $A_3$ and leaving the 47 lower-order bits of the double-precision product with sign in the thin-film C register 124 to 127.

In multiplication, two times the number of digits for each operand are necessary for a result of the same order of accuracy.

Now referring to the flow chart of FIG. 41, in phase 1, the binary multiply operator syllable is fetched. In phase 2, the multiplier is fetched from the stack 3099 or memory in accordance with the $A_1$ designation and is stored in the A register 3033 (see FIGS. 1 and 2). In phase 4, the multiplicand (the second operand) is fetched from the stack 3099 or memory in accordance with $A_2$ of the operator syllable and stored in the B register 3031.

At phase 5, time T1, if the signs of the first operand (the multiplier) and the second operand (the multiplicand) are different, the $MC_2$ flip-flop of master control flip-flops 3549 (see FIG. 4) is set. At the same time, a binary count of 48 is set into the multiply-divide counter 3021. This is made from the subcommand matrix and controls section 3020 and applied directly into the multiply-divide counter on the line shown in FIG. 1 in the vertical center of the right side of the subcommand matrix and controls block between the subcommand matrix block 3020 and the multiply-divide block 3021.

At time T2 of phase 5, the multiplier (first operand) is stored in the thin-film C register 124 to 127, the least significant syllable being stored, also in the 12-bit C register 3034 in arithmetic unit 3030. As each syllable of the A register is being stored in the thin-film C register, the A register is reset. The multiply-divide counter 3021 is counted down by 1. The multiply-divide counter 3021, thus registers 47 when counted down by 1. At time T3, phase 5, the OV (carry) overflow-sensing flip-flop 3541 (FIG. 4) is reset and this T3 pulse is also used to allow time for propagation of the carry. At time T5, the least significant bit C12 of the C register 3034 (FIG. 2) is examined to see whether it is set, and if it is set, the contents of the B register 3031 are added to the contents of the A register 3033 and the sum is left in the A register 3033. At time T6 of phase 5, the contents of the A register 3033 and the C register 3034 are each shifted right one place, the setting of the (carry) overflow-sensing flip-flop 3541 is transferred to the second most significant bit position A2 in the A register 3033 and the 48th bit, A48 of the A register 3033 is set into the first bit position, C1 of the C register 3034. If, at time T5, upon examination of the 12th bit, C12 of the C register 3034 was not set, then the step of adding the contents of the B register 3031 and the A register 3033 and leaving the sum in the A register 3033 is not followed through and instead the operation of shifting the contents of the A register 3033 and the contents of the C register 3034 right one place, transferring the overflow-sensing flip-flop 3541 setting into bit A2 of the A register and transferring bit A48 into the most significant bit position C1, of the C register 3034, is immediately effected.

At time T6, the multiply-divide counter 3021 is examined to see if it contains a multiple of 12 count.

Before the multiply-divide counter 3021 was examined for counting and for the multiple of 12, this multiply-divide counter 3021 was counted down by one in the previous operation. If the multiply-divide counter 3021 does not register a multiple of 12 then the multiply-divide (D) counter 3021 is examined to see if its count equals 1. In the first iteration, it should not equal 1, therefore the counter is counted down by one and a jump to T3 of phase 5 occurs. The overflow-sensing flip flop 3541 is again examined allowing time for the carry propagation. As before, the C12 bit in the C register 3034 is examined to see if it is set. Then the previous operation of adding the contents of register B, 3031 to A register 3033 leaving the sum in the A register 3033, if set, and if not set, the immediate shifting of contents of the A register and contents of the C register right one place, transferring the overflow flip flop 3541 setting into bit position A2 and the A48 bit into C register 3034 position C1 is followed while counting down of the multiply-divide counter 3021 by one. This recycling continues until the multiply-divide counter 3021 count holds a multiple of 12. When this occurs, at time T6, the contents of the C register 3034 are stored in the thin-film C register 124 to 127 into the least significant syllable position 124, that is, when the D counter 3021 is equal to 36, the next lower multiple of 12 from 48. Successively when the multiply-divide counter 3021 registers 24, 12 and 0 respectively, so that the successive numbers of storing will be 36, 24, 12 and 0, the contents of the multiply-divide counter 3021 are shifted a syllable at a time into the corresponding thin-film C registers 124, 125, 126, 127 of the thin-film C register 124 to 127. At each of the iterations in counting down to 36 to 24, to 12 and to 0 of the multiply-divide (D) counter 3021 at time T7 of phase 5, after the successive storing into the thin-film C register 124 to 127 at time T7, the computer determines whether overlap is desired from the condition of the PF1 and 2 program register full flip-flops 3505 (see FIG. 4). If one of these flip flops 3505 (PF1 or 2) is reset, then an overlap is possible and it will take place concurrently. This is done in times T3 through T8 of phase 5. In this period the next program word from memory is fetched and stored in the empty PSR1 or PSR2 program storage register 100 to 103 or 104 to 107, while the computer proceeds to determine the next 12 product bits, i.e., that is, if count down through 36 has occurred, only the first syllable has multiplied the multiplicand and successive operation must be done for each of the other three syllables of the multiplier. Recycling occurs from this operation in times T3 through time T8 by going through the step of determining the setting of bit C12 in the C register 3034 each time.

If overlap is desired at time T7 of phase 5, that is, by one of the program storage registers 100 to 103 or 104 to 107 being empty as determined by one of the program full flip flops 3505 being reset, then overlap is performed, but if overlap is not desired, the next multiplier syllable is fetched from the thin-film C register 124 to 127 and stored in the C register 3034. The process of determining whether the C12 bit of C register 3034 is set is repeated after this transfer of the next multiplier syllable into the C register 3034 had taken place once again. That is, the cycle repeats, until all 4 syllables have been transferred from the thin-film C register 124 to 127 successively into and out of the C register 3034. When at time T11 of phase 5 the count of the multiply-divide counter 3021 is equal to one, the contents of the C register 3034 are shifted right one place. Also a negative sign is attached to both halves of the product by putting a 1 in the most significant bit position of the thin-film C register 124 to 127 and in the most significant bit position of the A register 3033, providing that the signs of the original operands of the binary multiply instruction were different, one being a plus and the other being a minus, i.e., a ONE in the most significant bit position of either the multiplier or the multiplicand and a ZERO in the other. At phase 6, the contents of the A register 3033 are stored in the stack 3099 or in memory in accordance with the indication of the relative address signal of the A3 designation in the operator syllable. This completes the instruction and a jump to PH1–T1 is made for the next instruction.

FIG. 42 shows the branch on bit instruction flow chart. Note that this is a conditional instruction with the condition occurring if bit A48 of the A register is a ONE in which case the branch flip-flop is set and the branch occurs.

FIG. 43, the branch on condition instruction, is a similar branch instruction in which branch occurs if any of the three conditions of the condition box are met. These conditions are that any of the overflow flip-flops 3544 and an appropriate corresponding syllable register bit are set. That is, the condition occurs if (1) the POV flip-flop and bit S12 of the syllable register 3017 are set, (2) the PUN flip-flop and bit S11 are set, (3) the PNN flip-flop and bit S10 are set. If so and the branch BRF flip-flop is set, the branch occurs to the memory location relatively indicated by the branch syllable, and the first program word of the branch is stored in the program storage register 100 to 103 for execution next.

FIG. 44 shows the binary subtract instruction. The binary subtract instruction is similar to the binary add instruction above-described except that in phase PH5, time T1, the signs are examined to see if they are the same sign.

Now refer to FIG. 45, the convert binary to floating-point instruction flow chart. This is instruction 25. Following the operator the instruction covers converting the contents of the location specified by A1 of the operator syllable from binary to floating-point format, the results being stored in the location specified by A2. In phase 1 of the instruction, the operator syllable is fetched. In phase 2, the data to be converted from binary to floating-point is fetched from stack or memory. At phase PH3, time T1, if the contents of the A register 3033 are ZERO, then at time T2, the floating-point zero is formed by setting the 12-bit exponent, A1 through A12 to all ONE'S, while the mantissa, A13 through A48, remains in the zero state. In phase 4, the result is stored in stack or memory. This completes the instruction. If at phase 3, time T1, the A register 3033 contents are not a ZERO, then bits B1 through B12 of B register 3031 are reset and it is determined whether or not the A2 bit in the A register 3033 is a ONE. If the A2 bit is not a one, then at time T2, the A register 3033 is shifted left inserting a ZERO into bit A48 and the multiply-divide counter 3021 is counted up ONE. After shifting left inserting the ZERO into bit A48 of A register 3033 and counting up the multiply-divide counter 3021, bits B1 through B12 of the B register 3031 are also reset, and A2 is again examined to see if it is a ONE. This process continues until bit A2 of the A register 3033 is a ONE and at phase 3, time T3 a shift right twelve places is executed. Bits A1 through A12 of the A register 3033 are reset and the contents of the multiply-divide register 3021 are shifted into the B register 3031.

At time T4 the contents of the 12 bits of the first syllable of the B register 3031, B1 through B12 are added to bits A1 through A12 in the A register 3033 and bit A1 is set. In phase 4 the result is stored in stack 3099 or memory, the instruction completed and the jump is executed to PH1–T1.

The compare equal, fiield instruction illustrated in the flow chart of FIG. 46 is similar to the alphanumeric compare equal ACE instruction hereinabove described. This instruction differs in that a portion of one data word may be compared with a portion of another data word.

Now referring to FIG. 47, the compare equal instruction is shown in this flow chart. This also is similar to the above-described alphanumeric compare equal ACE instruction but is an algebraic comparison not a logical comparison.

The compare greater field instruction of FIG. 48 is also like the ACE instruction and will not be described further. In this instruction, the fields are compared rather than the whole word.

The compare greater instruction shown in the flow chart of FIG. 49 is self-evident from that flow chart and will not be described further.

The clear instruction in the flow chart of FIG. 50 is a simple instruction wherein a 48-bit word, whose location is indicated by $A_1$ referring to stack or memory, may be made equal to ZERO by merely resetting the A register 3033 and storing the ZERO's in the stack 3099 or in the memory location indicated by the relative address syllable.

FIG. 51 the compare less, field instruction and FIG. 52 the compare less instruction flow charts show steps similar to the ACE compare instruction set forth hereinabove. Execution of these instructions are apparent from the flow charts and therefore will not be described in detail.

Now refer to FIG. 53, the character search instruction, octal number 32. The command signal of 6 bits is the 6-bit equivalent of the octal number 32. The next two bits, bits 7 and 8, are the $A_1$ indication in the operator syllable of either a memory or stack fetch of information. The bits of $A_2$ indicate a memory syllable comprising a 6-bit character represented by the C in the syllable format presentation of FIG. 8. This 6-bit character is specified by bits 7 through 12 of the $A_2$ syllable. The $A_3$ syllable indicates a memory syllable, the relative address of a branch. The branch is to an address in main memory. The character search instruction involves comparing the 6-bit character specified by bits 7 through 12 of the memory syllable denoted by $A_2$ with successive characters of the contents of the location indicated by $A_1$. The search commences to the left of the character position indicated by the thin-film character count register 123 and continues until the character is found or until the leftmost character has been considered. For example, if the character count register 123 had referred to position 6, then the computer would start the character search commencing at the position 5 and would continue to position zero. If the character count register 123 contains a zero, the search begins with the rightmost character of the word. The 12 bits of the character syllable are contained in the syllable register 3017. The last 6 bits of that syllable in syllable register 3017 are compared character-by-character directly with the last 6 bits of the information word in the A register 3033, as the information is shifted right, end-around, six places at a time in the A register.

The M register 3007 is preset to the number of shifts required to adjust the data so that the character on which the compare is to start is in the rightmost position of the A register 3033. Every time a comparison is made the M register 3007 is counted up from zero to seven, that is, until all the characters in the word have been compared with the characters in the syllable register 3017. On each search cycle, the count in the M register 3007 is first examined. The character position counter (which is the M register 3007 acting as a counter) is counted up and tested until it reaches seven. When the M register 3007 reaches seven, unless an equality occurs earlier, the M register 3007 is complemented and the zero left therein is transferred to reset the thin-film character count register 123 to zero. If the equality occurs earlier, that is, the character is found before the count up of the M counter 3007 to seven, the computer takes the next instruction from the location specified by the $A_3$ indicator and the character count register 123 indicates the position in which the character was found. Thus the counter (the M register 3007 acting as a counter) contents at the end of the instruction have been recorded in the character count register 123. As stated, if the character is not found, the computer takes the next instruction in sequence and the character count register 123 contains a zero.

Restated, in the search cycle, the multiply-divide counter 3021 is loaded with the complement of the contents of the character count register 123. These contents specify the character position prior to which the search will begin. That is, if the character count register 123, for example, contains a 7, the character search in the A register 3033 starts at 6 and continues in the left direction or toward the direction of the more significant characters. Thus, if the character count register, for example, contained a zero, the character position 7 in the A register 3033 is examined, then the step up counter (the M register 3007 acting as a step up counter) would step up to one. Then at the count of 1, the character position 6 in the A register 3033 is examined and compared with the contents of the syllable register 3017 which contents will be the character searched for.

That is, the character search instruction picks up a 48-bit data word and compares it from least significant character to the most significant character consecutively, with the contents of the syllable register 3017 to determine if there is a character in the word which is the identical character to that set up in the syllable register 3017. If the equality is found, this is recorded by storing the complement of the step up counter (the M register 3007 acting as a step up counter) which determines the position in the data word at which the equality of the character in the word with the syllable character was found. Thus, wherever equality is found, that count is stored in the character count register 123. In examination of the character position counter (M register 3007), each time it is stepped up to seven and there is no equality, the computer will take the next instruction in sequence and the character count register 123 will contain a zero. Therefore, after each character is compared with the contents of the syllable register 3017, the M register 3007 counter is tested for seven at which time the next instruction is taken.

Usually the character search instruction is a repeated instruction so that a file of data words is searched one by one until the character that is being searched for is found.

Now refer to the operations involved in this character search. At phase 1, the operator comprising the character search 6-bit equivalent of the octal number 32 and the remaining 6 bits of the syllable are fetched. In phase 2, the operand indicated by $A_1$ in the operator syllable is fetched from stack 3099 or memory and stored in the A register 3033. In phase 4, the special syllable C, indicated by the $A_2$, 9th and 10th syllables of the operator syllable, is fetched and stored in the syllable register 3017. This special syllable contains the actual character for which the search is being made in one or more data words. At phase 5, times T1 and T2, the character count is fetched from the character count register 123 in the thin-film 3001 (see FIG. 1) and stored in the E register 3005. The L and M register 3006 and 3007 is cleared. The character count is always set for zero for the first word and if a character has been previously found, it will be set at the position in the word at which this character was found and after storing in the character count register 123, return is made to the character counter in this position. At time T3 of phase 5, the complement of the character count is set in the multiply-divide counter 3021 and the K and E register 3004 and 3005 are cleared of the contents which are the character count. The complement set of the character count in the multiply-divide register 3021 is not the two's complement but the one's complement. As long as the count in the multiply-divide counter 3021 is not zero, then at least one more shift than the actual count will be accomplished. Therefore, if the character count set was six in the character count register 123, then the one's complement of this will be a one which is put in the multiply-divide counter 31 and a shift of two character positions will occur in the A register 3033. Therefore, if the character count were six as determined in the character count register 123 and shift by two character positions occurs, then the character to be examined is seven minus two, or five. Search will therefore start with character position 5.

At time T4, phase 5, the count in the multiply-divide counter 3021 is examined, and if not a zero, then at time T4 of phase 5, the A register 3033 is shifted to the right six places end-around logical and the multiply-divide register 3021 contents are decremented by one. The multiply-divide register 3021 is then again examined for zero and the process continued until the multiply-divide (shift) register 3021 registers zero. At this time when the multiply-divide register 3021 shows a zero, the L and M register 3006, 3007 is incremented still one more, a shift A register 3033 right six places end-around logical occurs and then at T5 the bits A43 to A48 in the A register 3033 are compared with bits S7 to S12 in the syllable register 3017. This is the special syllable which is to be compared with the word in the A register 3033, character-by-character. Bits A43 to A48 is the character for which comparison is to be made in the A register 3033. If the characters are equal, showing equality, then the computer has found what it is searching for. In that case the L and M register 3006 and 3007 is complemented and the position at which equality was obtained is stored in the thin-film character count register 123 so that a subsequent character search instruction could examine the next character position. In this case in phase 6 the BRF branch flip-flop of miscellaneous control flip-flops 3548 (FIG. 4) is examined, and if not set, the instruction is completed and a jump is effected to PH1–T1. If the BRF branch flip-flop is set in phase 6, then the branch syllable is read out from the PSR #1 or PSR #2 program storage register in use 100 to 103 or 104 to 107. If equality was found, that is, the characters were equal at time T5 above, the BRF branch flip-flop is set. At time T5 of phase 5, if the characters were not equal, that is, the computer did not determine equality, then the computer determines whether this is the last comparison to be made, that is, whether character position zero is being compared. If not, the contents of the L and M registers 3006, 3007 are incremented by one, the A register 3033 is shifted to the right six places end-around logical, and the process of comparing A register 3033 bits A43 to A48 with syllable register 3017 bits S7 to S12 at time T5 of phase PH5 is repeated. If this is the last comparison of the word, then at time T6 of phase 5 a zero is stored in the thin-film character count register 123. Then, if the branch flip-flop BRF is not set, the instruction is completed and a jump to phase PH1, time T1 (PH1–T1) of the next instruction is made. If the branch flip-flop BRF is set, this indicates a first and the branch program word of the branch is fetched from memory and stored in the program storage register PSR1 100 to 103.

FLOATING ADD

Now refer to FIG. 54, the floating add instruction. This is the first floating point instruction described in detail herein. In this instruction the contents of the location indicated by $A_1$ are added to the contents of the location indicated by $A_2$ and the normalized floating-point sum is stored in the location specified by $A_3$. Both operands in this instruction are assumed to be in floating-point format. The floating-point format involves an eleven bit exponent plus a sign and a 35 bit mantissa plus a sign. The sign in each case is in the most significant bit position, that is, the sign is in bit number 1 for the exponent and sign of the mantissa is in bit 13. Thus the exponent portion is in bits 1 through 12 including the sign and the mantissa portion is in bits 13 through 48 including the sign. The flow chart is substantially the same for floating add and floating subtract instructions, the floating subtract being executed exactly in the same way as the floating add after phase PH3, time T1, when the sign of the subtrahend mantissa is complemented.

Now refer to the actual flow of operations. At phase 1 the operator including the six-bit command, which is 67 in the case of the floating point add, and 66 in the case of floating point subtract, is fetched. In phase 2 the augend is fetched from the stack or memory in accordance with $A_1$ and stored in the A register 3033. In phase 4 the addend is fetched from stack 3099 or memory, depending upon the indication $A_2$ and stored in the B register 3031. At time T1, phase 3, the augend exponent which is the first twelve bits in the A register 3033 is transferred to the twelve-bit C register 3034. At this time the addend exponent which is the first twelve bits in the B register 3031 is subtracted from the augend exponent still in the A register 3034, which subtraction is carried out in the adder 3032, and the result is placed in the first twelve bit positions in the A register 3033. If the difference is too large, that is, greater than 2047, which is the highest possible total for eleven bits, then, if the difference is positive, the entire 48-bit contents of the A and B registers 3033 and 3031 are interchanged at times T4, T6 and T7 of phase 3. Also the control flip-flop MC4 (see FIG. 4) is set. If the difference is positive, no addition is necessary, and the contents of the A register 3033 are selected as the operand with the most positive exponent. On the other hand, if the difference was negative, then the augend exponent is transferred from the C register 3034 to to A register 3033 and the control flip-flop MC4 is set. This time again, since the C register 3034 contained the more positive exponent, no addition is necessary and the operand with the most positive exponent is in the A register 3033. The contents of the A register 3033 are then stored in stack 3099 or in the memory location relatively indicated by the third indicator $A_3$ of the address syllable, bits 11 and 12 of the address syllable, the instruction is completed and a jump to PH1–T1 is made for the next instruction. If the difference is not too large, that is, not greater than 2047, then at time T5 of phase 3 the addend exponent is transferred from the B register 3031 to the C register 3034, providing that bit $A_1$ in the A register 3033 is set. This indicates that the addend exponent must have been larger than the augend exponent and this is the exponent which will be attached to the final answer. Bits A1 through A12 in the A register 3033 and bits B1 through B12 in the B register 3031 are then reset to zero. Overlap is permitted and at time T5 if the difference in exponents is equal to or greater than 35, then the two numbers cannot be aligned and the MC2 flip-flop is set. If the difference in exponents is not greater than 35, then the contents of bits A7 through A12 of the A register 3033 are transferred to the multiply-divide counter 3021. This determines how much the contents of the A register 3033 are shifted to align with the contents of the B register 3031.

As stated, at time T6, the computer makes a choice of shifting the contents of the A register 3033 and the contents of the B register 3031 to interchange them in order to have the most significant portion of the mantissa in the most significant portion of both registers 3033 and 3031. That is, the three most significant syllables of the A register 3033 must contain the mantissa whose exponent is algebraically less, and the B register 3031 contains in its three most significant syllables the mantissa whose exponent is algebraically more. Thus, if the difference of the exponents in the multiply-divide counter 3021 is only one, then all that must be done is to shift the contents of the A register 3033 right by one in order to insure that the two exponents, that is, the exponent in the A register 3033 and the exponent in the B register 3031, are equal. Only the A register 3033 contents, not the B register 3031 contents, can be shifted, so it must be insured that the one to be shifted in order to equal the other is in the A register 3033. Shifting then occurs bit by bit until the two exponents are equal so that the mantissas can be added, that is, until the multiply-divide counter 3021, which holds the difference between the exponents, counts down to zero, at which time addition of mantissas can take place. If master control unit 3549 (FIG. 4) MC2 control flip-flop is set at time T7, then this means that the difference of exponents was greater than 35 and also that the addition of the mantissa of the smaller exponent will not change the value of the mantissa with the greater exponent so the addition does not take place effectively, although mechanically it does. If flip-flop MC2 is set, bits A1 through A48 in the A register 3033 are reset to zero and the flip-flops MC1, MC2, and MC3 of master control flip-flops 3549 are reset. Then the addition takes place in phase 5, time T1, the same as in binary add. In this case the mantissa which is in the B register 3031 is added to the contents of the A register 3033 which is zero at this time, the result is stored in the A register 3033 and eventually this is the result which will be stored in stack 3099 or memory. If the MC2 flip-flop is not set, the contents of the A register 3033 are shifted right according to the count in the multiply-divide counter 3021 and master control flip-flops MC1, MC2, and MC3 are reset. Then the addition takes place in phase 5 in the manner explained in binary add.

The binary add procedure has been described for phase 5 in the explanation of FIG. 38 and the identical procedure is followed (see also FIG. 54), when the exponents have been made equal. That is, the mantissas are added in phase 5, the sum being left in the register A 3033. However, if overflow occurred at time T4, this must be remembered by setting control flip-flop MC2, and the machine jumps to time T8 of phase 3, the contents of the A register 3033 are shifted right one place and the POV over-flow flip-flop of overflow flip-flops 3544 contents are transferred into bit position A2 in the A register 3033. Then in phase 3, time T9, the contents of the A register are shifted right 12 places and the exponent is transferred from the C register 3034 to the A register 3033 positions A1 through A12. Then at times T9 and T10, T11 and T12, a ONE is algebraically added to the exponent in bits A1 to A12 in the A register 3033. If overflow then occurs, the program overflow flip-flop POV of overflow flip-flops 3544 is set. If not set, then in either case set or reset of the program overflow flip-flop POV, the contents of the A register 3033 are stored in stack 3099 or memory in the location relatively indicated by the address syllable in bits A11 and A12. This completes the instruction and the jump is made to phase 1, time T1. If master control flip-flop MC2 is not set, that is, if an overflow from the condition does not occur, then the A register 3033 is normalized by shifting left until bit A2 is a 1. Each time a shift occurs the multiply-divide counter 3021 is counted up by one. Again at time T9, the A register 3033 is shifted right 12 places and the exponent is transferred from the C register 3034 to bits A1 through A12 in A register 3033. Then in times T9, T10, T11, T12 in phase 3, the number of shifts that occurred in normalizing the number in the A register 3033 are algebraically subtracted from the exponent itself. At time T13 in phase 3, it is determined whether overflow occurred (actually an underflow), and if so, then at time T13 the floating-point underflow flip-flop PUN is set and a floating-point zero is inserted into the A register 3033. The floating point zero is an insert of all "ones" into the exponent portion and all zeros are inserted into the mantissa portion of the A register 3033. That is, bits 1 through 12 are all one's in the A register 3033, and bits 13 through 48 in the A register 3033 are all zero's. Then at phase 6 again, the contents of the A register 3033 are stored in stack 3099 or in the memory location relatively indicated by the operator syllable bits 11 and 12; the instruction is completed and a jump to PH1–T1 for the next instruction is effected.

If, as a result of the addition in phase 5, a zero occurs in bits A2 through A48 of A register 3033, this is detected, the control flip-flop MC3 is set and a floating-point zero is inserted in the A register 3033 and the program underflow flip-flop PUN is set. In such case the contents of the A register 3033 are stored in stack 3099 or in the memory location relatively indicated by operator syllable bits 11 and 12, the instruction is completed and a jump to PH1–T1 is executed. Thus, the floating add instruction is completed in that it was determined first that actually the addition was possible. If a difference in the exponents was too great thus indicating that it was not possible to add 48 bits, then the mantissa with the most positive exponents was selected and stored away. If, however, the difference in exponents was less than 35, then the two mantissas were aligned so that addition took place. After this, the result was normalized by bringing in the most significant bit of the mantissa in the most significant position of the mantissa next to the sign bit. Since the mantissa comprises 35 bits plus sign, then, if the difference in exponents is 35 or greater, then the mantissas cannot be aligned. Whenever the exponent difference is greater than 35, the least significant bits would fall outside the register.

The floating divide instruction shown in FIG. 55A and 55B is similar to the just above-described floating add instruction and floating subtract instruction. FIG. 56, the floating multiply instruction flow chart is self-evident in view of the above similar descriptions and will not be further described.

The halt instruction is shown in the flow chart of FIG. 57 and involves checking the control mode (INT) flip-flop 3540 to determine whether or not the machine is in control mode. In the normal mode the instruction causes a transfer to the control mode and involves the interrupt bookkeeping processes (bit 10 of interrupt register 3002 is set). When the halt instruction is used in the control mode, the halt flip-flop HTC is set and the computer stops.

Now refer to FIG. 58 which is a flow chart of the interrupt routine return instruction. The interrupt return instruction is an interrupt control instruction, designed for the control mode wherein the computer can execute this special class of instructions which are not available in the normal mode. On interrupt return the interrupt return instruction 05 restores the contents of the base address register 055, the base program register 054, the program count register 057, the contents of the program storage registers 100 to 103 and 104 to 107 and associated controls. The control mode flip-flop 3540 (see FIG. 4) is reset. The next instruction contained in the restored program storage register is executed upon interrupt return and this automatically continues the object program after interrupt processing. As stated, the interrupt return instruction is operable only in the control mode of the machine upon an interrupt occurring.

Now refer to the flow chart of operations. In phase 1, times T1, T2, and T3 of the interrupt routine return the operator is fetched. In phase 1, times T4, T5, and T6, bits 1 through 10 of the interrupt dump register 070 are transferred to a group of control flip-flops (see FIG. 4) comprising the PS1, PS2, and PS3 flip-flops of the Program syllable address counter 3504, the repeat RPF and the first repeat FRP flip-flops of the command control flip-flops 3545, the PF1 and PF2 program full flip-flops 3505, the program overflow, program underflow, and the program normalized flip-flops of the overflow unit 3544. The PF1 program full flip-flop will be restored if the PS1 flip-flop of the program syllable counter 3504 was reset and the PF2 flip-flop of the program full flip-flops 3505 will be restored if the PS1 flip-flop of the program syllable counter 3504 was set.

At times T7 and T8 of phase 1, the contents of the interrupt program register 110 to 113 in thin-film memory 3001 (see FIG. 1) is restored to the program storage register in use 100 to 103 or 104 to 107. At time T9 of PH1 the control mode flip-flop 3540 is reset. At phase 3, times T1 and T2, the contents of the least significant portion of the interrupt storage register 040 to 042 are transferred to the base address register 055. At times T3 and T4 of phase 3, the contents of the next least significant portion of the interrupt storage register 040 to 042 are then transferred into the base program register 054. At times T5 and T6 of phase 3, the contents of the most significant portion of the interrupt storage register 040 to 042 are transferred into the program count register 057 in thin-film memory 3001, the instruction is completed and a jump is made to PH1–T1.

This interrupt routine return instruction must be performed in the control mode only. In the normal mode, this instruction would cause an illegal instruction to take place.

FIG. 59 shows the logical AND, field, the logical OR, field and the logical exclusive-OR, field instructions. Execution of these instructions is apparent from this flow chart in view of the previous description for binary add, field involving the similar special (variant) syllable which appears in the syllable register 3017 in the manner of the binary add, field fetch operation. The ANDing, ORing, or exclusive-ORing is effected with the corresponding field taking the contents at the top of the stack. Stripping and filling the hole are like the field instruction previously described. FIG. 59 will not be described further in detail.

FIG. 60 shows the logical AND, logical OR, and logical exclusive-OR instruction flow chart and syllable formats similarly are apparent from the flow chart of that Figure. FIG. 61 is a flow chart illustrating the logical complement, field instruction. The execution of this instruction is apparent from the chart. The logical complement instruction set forth in the flow chart of FIG. 62 involves fetch of the operator in phase 1, data fetch and store in A register 3033 in phase 2, and complement of the A register 3033 in phase 3. In phase 4 the contents of the A register 3033 are stored in stack or in memory in accordance with the $A_2$ syllable indication and the computer jumps to PH1–T1.

The load special register instruction shown in the flow chart of FIG. 63 is of special interest in that it is the instruction which enables the one computer to interrupt another computer. This instruction must be performed in the control mode only. In the normal mode, this instruction will result in an illegal instruction interrupt. In the load special register instruction there are three variations which permit (1) loading the mask register 3016, (2) or loading the memory bounds upper limit register 3012 and lower limit register 3013 from the least significant portion of the contents of the location specified by indicator $A_1$, (3) or interrupting the computer designated by the least significant bits of the contents of the location specified by $A_1$.

For the load special register instruction, the operator syllable comprises the 6-bit binary equivalent of octal 31 as the first 6-bits of the operator syllable, the memory or stack designation of bit 7 and 8 and the bits for variable syllables. The operator syllable is fetched in phase 1. In phase 2, the data word with which the special register will be loaded or which the computer will be interrupted is fetched from the stack 3099 or a memory module in accordance with indicator $A_1$ and stored in the A register 3033. The least significant 3 bits of the variant syllable $V_s$ determine in phase 4 which register will be loaded or where applicable which computer is to be interrupted. The variant syllable $V_s$ is fetched and stored in the syllable register 3017. If bit S10 of the syllable register 3017 is set and phase 5 is entered, then the A register 3033 is examined. If bit A48 is set and bit A47 is reset in the A register 3033, computer #1 is interrupted. If bit A48 is reset and bit A47 in the A register 3033 (see FIG. 1) is set, then computer #2 is interrupted. If bit A47 is set and bit A48 is set in the A register 3033, then computer #3 is interrupted. If bit A46 is set and bit S10 of the syllable register 3017 has been set, then computer No. 4 is interrupted. Then the instruction is completed and the jump is made to PH1–T1 for the next instruction.

If bit S10 in the syllable register 3017 is not set, bit S11 of the syllable register 3017 is examined in phase 5, time T1, and if set, the memory limit registers, upper limit register 3012 and lower limit register 3013, are reset. The contents from bits A41 through A48 of register 3033 is transferred into the lower limit (Y) register 3013 and the contents of bits A33 through A40 of the A register 3033 are transferred into the upper limit (X) register register 3012. The instruction is then completed and a jump is then executed to PH1–T1 for the next instruction. This instruction thus loads the upper and lower limit registers.

Assuming that bit S10 of the variant syllable in the syllable register 3017 is not set and bit S11 is not set, at phase 5, time T1, bit S12 is examined, and if not set, the instruction is completed and a jump to PH1–T1 is made for the next instruction to be introduced. If bit S12 in the S register 3017 is set, then in phase 5, time T1 and T2, the P & Q mask register 3016 is reset. The contents of bits A21 through A36 of the A register 3033 are transferred into bits P1 through P16 of the mask register 3016. Bit A39 of the A register 3033 is transferred into bit Q3 of the mask register 3016. Bit A41 of the A register 3033 is transferred into bit Q5 of the mask register 3016. Bit A45 of the A register 3033 is transferred into bit Q9 of the mask register 3016. This permits loading the mask register 3016 as desired. The instruction is completed in phase 5, time T2 and a jump is executed to PH1–T1 for the next instruction.

FIG. 64 is a flow chart of the load thin-film instruction. This instruction designated by the first 6 bits corresponding to octal number 30 involves loading the least significant end (or whole word) of the contents of the location specified by $A_1$ into the thin-film register (or group of registers) specified by $A_2$.

At phase 1 (PH–1), the load thin-film operator syllable comprising the load thin film instruction and the designations $A_1$ and $A_2$ are fetched. In phase 2, the operand designated by $A_1$ is fetched from the stack 3099 or core memory and stored in the A register 3033. In phase 4, the variant syllable T which indicates the number of bits per word (12 or 16) and the number of words (1, 3, or 4) to be loaded into thin-film is fetched and stored in the syllable register 3017. The registers 100 to 157 shown in FIG. 1A at the right hand portion of the thin-film registers 3001 contain words of 12 bits syllables. The registers of thin film registers 3001 at the left of FIG. 1A which registers are numbered from 001 to 070, contain words of 16 bits per syllable. The setting of thin-film address register 3510 is in accordance with whether the 12- or 16-bit registers are to be addressed.

At phase 5, time T1, if bit 3 in the syllable register 3017, containing the variant syllable is set, the machine jumps immediately to time T1 of phase 5. If bit S3 is set, it indicates that there are three or four words to be transferred. If bit S3 of the syllable register 3017 is reset, this indicates a one word transfer.

Assuming that bit S3 in the syllable register 3017 is not in the set state, then thin-film memory 3001 is addressed with bits S6 through S12 of the variant syllable in the syllable register 3017. That is, upon addressing thin-film memory 3001 with bits S6 through S12, this sets the thin-film address register 3510. If bit S6 in the syllable register 3017 is set, this indicates a 12-bit word and the register 3510 will pass the information into the 12-bit registers through thin-film address register 3510. If bit S6 in the syllable register 3017 is reset, this indicates a 16-bit word which will be transferred into the 16-bit registers of the thin film registers 3001 through thin-film address register 3510. At times T1 and T2 of phase 5, if bit S6 is reset, then the contents of the A register 3033 from bits A33 through A48 are stored in the 16-bit portion of thin-film memory according to the setting of the thin-film address register 3510, the instruction is completed at time T3 of phase 5 and a jump of the next instruction is made to PH1–T1. If bit S6 is set, then this is a 12-bit register and the thin-film address register 3510 passes the contents of the A register 3033 bits A37 through A48 into the appropriate 12-bit register in thin-film memory 3001. The instruction is complete and a jump is made to PH1–T1 for the next instruction.

If at time T1 of phase 5, bit S3 was set, this indicates three or four words. Thin-film memory 3001 is addressed with bits S6 through S10 of the contents of the syllable register 3017 and also with the syllable counter 3507 of FIG. 4, which provides the two least significant bits.

At this point, if the S6 bit of the syllable register 3017 is set, this indicates a 12-bit word to be placed in the 12-bit registers of thin-film registers 3001 and the contents of the A register 3033 are stored at times T1 and T2 of phase 5 in four consecutive thin-film 12-bit locations, storing the least significant syllable first. The instruction is completed and a jump is made to PH1–T1 for the next instruction. When thin-film memory was addressed with bits S6 through S10 of the syllable register 3017 and with the syllable counter 3507 to provide the two least significant bits in the thin-film address register 3510 with bit S6 reset, this indicates 16-bit or multi-sixteen-bit registers and a store will be effected in the 16-bit thin-film registers 3001. At times T1 and T2 of phase 5, the contents of the A register 3033 are stored in three consecutive thin-film locations, storing the contents of bits A33 through A48 in the A register 3033 first. After these three consecutive storings, the instruction is completed and a jump is effected to PH1–T1.

Now refer to FIG. 65 which illustrates the flow chart of instructions for no operation, reverse stack, step stack down, and step stack up instructions. The no operation instruction contains 6 zeros corresponding to octal number 000 in the first 6 bits (command portion) of the operator syllable. Upon fetching the operator in phase 1, times T1, T2 and T3 if a no operation instruction, the instruction is completed and a jump is made to PH1–T1 for the next instruction to be fetched.

The reverse stack is octal number 06 in the command portion of the operator syllable. This instruction reverses the direction of the stack counter 3508. That is, referring to the illustrations of the stack before and after the instruction in the case of the before instruction in a storing operation the stack is rotating clockwise and for a fetch operation, it rotates counterclockwise. Upon the reverse stack command, the stack goes clockwise for the fetch operation and counterclockwise for the store operation. After fetching the operator, if a reverse stack instruction, the machine jumps to phase 1, time T4, and the RSF reverse stack flip-flop 3543 (shown in FIG. 4) is complimented. This completes the instruction and a jump is executed to PH1–T1 for the next instruction. With the reverse stack flip-flop 3543 set, the stack counter 3508 direction is reversed.

The step stack up instruction is octal instruction 02. This instruction steps the stack counter 3508 once in the fetch direction. That is, for example, assuming the stack counter 3508 to indicate the first stack 140 to 143, the stack counter 3508 will be stepped one so that the indication is pointing to the second stack 144 to 147. That is, at phase 1, time T4, the stack address counter 3508 shown in FIG. 4 is stepped once in the fetch direction from S1 to S2, or from S2 to S3, or from S3 to S4, or from S4 to S1, depending upon what is at the top of the stack at the time. This completes the instruction and a jump is executed to phase PH1–T1 for the next instruction.

The step stack down instruction is octal instruction 03. Step stack down causes the stack counter 3508 to be stepped once in the store direction which is clockwise. That is, if the stack counter 3508 indicated stack 1, then after this instruction it would indicate stack 4. If the head (figuratively, not literally) was pointed at stack 4, it would indicate stack 3, if it was pointed at stack 3, it would indicate stack 2, and if it was pointed at stack 2, the counter would after this instruction indicate stack 1. After the stack address counter 3508 has been stepped in the store direction once, the instruction is completed and the jump is made to PH1–T1 for the next instruction fetch.

Refer to FIG. 66, the repeat instruction flow chart. This will not be described in detail. This instruction involves the repeat routine. In the repeat routine the instruction contained in the location specified by $A_3$ is performed the number of times specified by the contents of $A_1$, the repeat count syllable.

The strip and adjust, field instruction shown in the flow chart of FIG. 67 is apparent from the flow chart in view of the similar adjust and insert operation for adjust and insert instruction of FIG. 37 previously described.

The store external request instruction is shown in FIG. 68. This stores the external request lines which are inputs to the inventive system for external requests for input-output processing service. After operator fetch in PH1–T1, 2, 3, the A register 3033 is reset at PH1–T4. At PH2–T1, the contents of the 16 external request lines are transferred to bits A33 through A48 of A register 3033. After storing the A register 3033 contents in stack or in the memory location relatively indicated by the address syllable, the jump is made to PH1–T1 (instruction completed).

Summarizing, this instruction involves resetting the A register 3033 and transferring the contents of the external request lines into bits A33 through A48 of the A register and storing in the stack or the memory location relatively indicated by the address syllable.

Refer to the shift instruction flow chart of FIG. 69. A shift right or left; end-around or end-off; shift logical or arithmetic; a long shift both thin-film C register and A register, or single A register can be effected. This enables 16 combinations of the shift to be performed in accordance with the special variant syllable S which defines the type of shift and the number of places the contents of the A register 3033 will be shifted. A single or double shift may be made.

Refer to the subroutine jump instruction, octal command 14 illustrated in the flow chart of FIG. 70. In this jump instruction the contents of the base address register 055, the base program register 054, and the program count register 057, are stored in the thin-film memory 3001 subroutine storage register 050 to 052. The least significant 16-bits of the memory location specified by the contents of the subroutine base address register (SAR) 060 plus the contents of the jump address syllable $A_1$ indicated by the instruction contain the starting address of the subroutine. The base program register 054 and the program count register 057 are each loaded with these same 16 bits. The base address register 055 is incremented by the amount specified in the jump increment syllable $A_2$. The index register number 15 of the 15 index registers 001 to 017 is loaded with the new contents of the base program register 054 minus the new contents of the base address register 055. The next instruction is then taken in sequence which is specified by the new contents of the program count register 057.

The execution occurs as follows: During phase 1 of the subroutine instruction the operator syllable is fetched. At phase 2 the special syllable $J_A$, the jump address, is fetched and added to the base subroutine base address register 060, the sum being stored in the L and M register 3006 and 3007 (see FIG. 1). This sum is used to fetch to the K and E register 3004, 3005 from memory the 16-bit subroutine starting address. This subroutine starting address is transferred from the L and M register 3006, 3007 to the K and E register 3004, 3005 at time T1 of phase 3. At times T1 and T2 of phase 3, the contents of the base address register 055 are stored in the least significant stage of the subroutine storage register 050 to 052. At time T3 of phase 3 the contents of the base program register 054 are stored in the next least significant stage of the subroutine storage register 050 to 052. At time T5 of phase 3 the subroutine starting address is transferred from the L and M register 3006, 3007 to the base program register 054. In phase 4 the special syllable $J_I$ which is the jump increment, is fetched and added to the contents of the base address register 055 and stored in the base address register 055. This sum is the base address used in this subroutine.

In phase 5 at times T1, T2 and T3, the subroutine base address which is the new contents of the base address register 055 are fetched from the base address register 055 and transferred to the L and M register 3006 and 3007. The subroutine starting address, which is the new contents of the base program register 054, are taken from the base program register 054 and placed in the K and E register 3004 and 3005. At times T4, T5 and T6 of phase 5, the subroutine base address is subtracted from the subroutine starting address, the result being stored in the index increment register #15 (017 octal). If the computer performed an overlap immediately preceeding the subroutine jump instruction, one is subtracted from the contents of the program count register 057 and the results stored in the most significant portion of the subroutine storage register 050 to 052. At times T12 and T13 of phase 5, the subroutine starting address is read from the base program register 054 and stored in the program count register 057. The contents of the program count register are then used to fetch the first program word of the subroutine from memory and this word is stored in the program storage register in use 100 to 103 or 104 to 107. This completes the instruction and a jump is made to PH1–T1 for the next instruction.

If an overlap was not performed by the computer immediately preceeding its instruction, then the contents of the program count register 057 are stored in the most significant stage of the subroutine storage register 050 to 052. At time T12 and T13, the subroutine starting address is read from the base program register 054 and stored in the program count register 057. At times T13, T14, and T15 of phase 5, using the contents of the program count register 057, the first program word of the subroutine is fetched from memory and stored in the program storage register in use 100 to 103 or 104 to 107. The instruction is completed and a jump is made to PH1–T1.

Now refer to the subroutine return instruction octal 04 which is shown in FIG. 71, the subroutine return and instruction flow chart. In the subroutine return instruction the base address register 055, the base program register 054 and the program count register 057 are loaded with the contents of the thin-film subroutine storage register 050 to 052. The index register #15, 017, is loaded with the new contents of the base program register 054 minus the new contents of the base address register 055. The next instruction is taken in sequence as specified by the restored program count register 057. The program continues with its addressing now relative to the restored base address register 055, base program register 054, and program count register 057. In this instruction, in phase 1, the operator for subroutine return instruction 04 is fetched. In times T1 and T2 of phase 3, the contents of the least significant syllable of the subroutine storage register 050 to 052 are read out and stored in the base address register 055.

At times T3 and T4 of phase 3, the contents of the next least significant syllable of the subroutine storage register 050 to 052 is read out and stored in the base program register 054. At times T5 and T6 of phase 3 the contents of the most significant state of the subroutine storage register 050 to 052 are read out and stored in the program count register 057. At phase 5, times T1, T2, T3, the restored base address register 055 contents are fetched and stored in the L and M register 3006, 3007. At times T2 and T3, the restored base program register 054 contents are fetched and stored in the K and E register 3004, 3005. At phase 5, times T4, T5, and T6, the contents of the restored base address register 055 in the L and M register 3006, 3007 are subtracted from the contents of the restored base program register 054 in the K and E register 3004 and 3005 and the result is stored in index register #15, 017. At time T6 of phase 5 the instruction is completed and a jump is made to PH1–T1 for the next instruction.

When in a subroutine, the data read from the subroutine area must be accessed by indexing the data syllables with the contents of the fifteenth index register 017. However, the intermediate data words are stored and read from locations designated by the object program base address register 055 plus the contents of the second syllable of the subroutine jump instruction. The store thin-film instruction flow chart of FIG. 72 explains this instruction which is very similar to the load thin-film instruction explained in detail, except that load thin-film is the inverse of store thin-film.

Refer now to FIG. 73, the transmit to input/output control module instruction flow chart. This is a system instruction which arises in one of the computers whereby a descriptor is transmitted upon command of the computer to an input to the first available non-busy input-output control module. That is, assuming that the descriptor is not a release descriptor. In the case of a release descriptor, the I/O (input/output) control module which is addressed is made non-busy.

The transmit to input-output control instruction is octal number 16 and the first six bits of the operator are binary 001110 equivalent to octal 16. The seventh and eighth bits of the operator syllable call for a special syllable or program syllable. These 7th and 8th bits are either 10 or 11, depending upon whether or not the address is indexed. The 9th and 10th bits denote a memory address which can be indexed and the 11th and 12th bits indicate a branch address which can be also be indexed.

The transmit to input-output control unit instruction can only be given in the control mode. It is employed to send the set-up descriptor, command descriptor, or release descriptor, obtained from the memory locations, specified by $A_2$ (bits of nine and ten of the operator syllable), to an input/output control module. If this instruction is given in the normal mode, the instruction sets up an illegal instruction interrupt.

Now refer to the flow chart of execution of the TIO (transmit to input/output) instruction. In phase 1, the operator syllable is fetched. In phase 2 the special input-output syllable (IO) is fetched. The two least significant bits, bits 11 and 12 of the IO syllable, determine the bus address and whether or not a branch occurs at the end of this instruction. That is, if bits 11 and 12 of the IO syllable are both zeros, it is a command descriptor for bus A, the bus connected to a first group of input-output control modules. If bit 11 is a zero and bit 12 is a one, it is an unconditional descriptor which the I/O control module (see FIG. 3) must accept and the descriptor will be used as a set up or release descriptor. If bit 11 is a zero, then in both cases whether bits 11 and 12 are 00 or are 01, the bus A is addressed. As stated, bus A is the bus from the computer which has the first group of I/O control modules at its other end. If bit 11 is a one, then bus B is connected. This only occurs where there are two groups of input-output I/O control units in the system. That is, bus B which goes from the computer to the second group of input-output control units, if present, is addressed when bit 11 is a one. As in the case of bus A, if bit 12 is a zero, this a command descriptor, and if bit 12 is a one, it is an unconditional descriptor, which means that access must be gained and the type of descriptor is either a set up or a release descriptor.

The IO syllable is stored in the C register 3034 during phase 2. In phase 4 the next syllable which is the relative memory address if the descriptor is fetched and computed and put into the L and M register 3006, 3007. This descriptor, in accordance with the syllable stored in the C register 3034, is unconditionally or conditionally transmitted to all I/O control modules connected to the bus selected in accordance with that syllable. At phase 4 it is determined whether or not the twelfth bit of the C register 3034 is set, that is, whether it is a command or an unconditional descriptor. If the descriptor is an unconditional descriptor, it is either a set up or a release descriptor. If bit C12 in the C register 3034 is set, then the branch syllable is read out at phase 6 to destroy the descriptor. If bit C12 is not set indicating a command descriptor, then at phase 4 it is further determined whether or not all I/O control modules on the selected bus are busy. If they are busy, then the BRF branch flip-flop of miscellaneous control flip-flops 3548 is set, and if not busy, the branch flip-flop BRF is not set. In either case the branch syllable is read out. If the branch flip-flop BRF is not set, then the branch syllable is destroyed. If the branch flip-flop BRF is set, it indicates that the I/O control modules are all busy. Then at phase 6 the next program word is fetched from the memory location relatively indicated by the branch syllable and stored in the PSRI program storage register 100 to 103. Then the instruction is completed and a jump is executed to PH1–T1.

In phase 4 in examining the I/O control modules on a selected bus, if it is determined that they were busy, then obviously the descriptor is sent to the first available non-busy I/O control module and the instruction is completed insofar as the computer module is concerned.

FIG. 74 illustrates in flow chart form the transmit modified instruction. This instruction is used whenever it is desired to modify before transmissions such as, for example, by modifying the sign or rounding off before transmitting the contents of a location to the same or another location. The data to be modified is fetched and stored in the A register 3033 in phase 2. The variant syllable describing the modification is fetched and stored in the syllable register 3017 in phase 4. The syllable register bits S10, S11 and S12 are successively examined in phase 5. If bit S10 is set, the most significant syllable in thin-film C register 124 to 127 is fetched and stored in the E register 3005, and if bit E2 is set, the absolute value A register 3033 contents are increased by ONE, and if this does not overflow the A register 3033, then in phase 6 the contents of A register 3033 are stored in stack 3099 or memory and the instruction is completed (JPH1–T1). If overflow occurs, the program overflow flip-flop (POV) is set. If bit S10 was not set upon the above examination, bit S11, if set, caused setting of bit A1, but if bit S12 next examined is set, bit A1 of A register 3033 is reset. Whether or not bit S11 is set, bit S12, if set, resets A1. Then, after storing the A register 3033 contents in stack 3099 or memory, the instruction is completed and a jump to PH1–T1 follows. If on the above examinations of bits S11 and S12, they are not set, or if bit E2, it is not set, the contents of A register 3033 are stored in stack 3099 or memory and a jump is then made to PH1–T1.

FIG. 75 presents a flow chart to illustrate the transmit instruction of the illustrative embodiment of the invention. The transmit instruction provides for taking a word from stack 3099 or memory and transferring the word into a different place. The word is fetched from $A_1$ indicated location, stored in the A register 3033 and these contents of A register 3033 are stored in stack or memory in the location indicated by indicator $A_2$.

FIG. 76 presents a flow chart to illustrate the (UCT) unconditional transfer instruction. The unconditional transfer instruction (octal 22) involves taking the next instruction from the location specified by a branch, the $A_1$ indicator of the operator syllable specifying an index or unindexed branch syllable. At phase 1, times T1, T2 and T3, the operator syllable is fetched. At phase 1, time T4, the branch flip-flop BRF is set, then the computer goes to phase 2 to fetch the first program word of the branch. The next program word from the memory location relatively indicated by the branch syllable is stored in that program storage register 100 to 103.

Refer now to FIG. 77, the index limit compare instruction flow chart. In the index limit compare instruction the object is to increase or decrease the contents of the index register specified by bits 5 to 8 of the $A_2$ indicated syllable by the amount specified in the syllable indicated by indicator $A_1$. The contents of this index register are then compared with the contents of the limit register specified by bits 9–12 of the instruction indicated by indicator $A_2$ for the conditions indicated by bits 2–4 of the $A_2$ indicated syllable. If the conditions are present, the next instruction is taken from the location specified by the indicator $A_3$ syllable; otherwise a program is continued in sequence.

The index variant syllable ($A_2$), numbering the bits from left to right, is coded as follows.

| Bit | Branch Condition | | | | 5–8 | 9–12 |
|---|---|---|---|---|---|---|
| | 2 | 3 | 4 | | | |
| increase if 0<br>decrease if 1 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | none<br>equal<br>index>limit<br>index≥limit<br>index<limit<br>index≤limit<br>index≠limit<br>unconditional | Index register number (1 thru 15) | Limit register number (1 thru 15) |

If the limit register with address zero is used, the contents of the specified index register is compared with the number "zero." Limit register ZERO can be loaded and its contents stored, like other thin-film registers. For example, assume that the first syllable, the operator syllable, contains the binary number 001010 which is octal 12 and that the six bits are followed by 7th and 8th bits, one, zero, (1, 0), 9th and 10th bits, one, zero (1, 0), and 11th and 12th bits, one, zero (1, 0). Assume that the second syllable $I_a$ comprises binary bits 000 000 000 011. Assume that syllable 3, $I_v$, is 0011, 1010, 0010. Assume that syllable 4 is any group of 12 binary numbers *a*. This indicates that the contents of index register number ten, which is the decimal equivalent of binary 1010 specified by bits 5 through 8 of syllable 3, the $I_v$ syllable, are decreased by three (the number 3 being in syllable 2, the $I_a$ syllable); the new contents of index register number ten are compared with the contents of limit register number two (bits 9–12 of syllable 3, $I_v$, equal two, and if the contents of the index register are greater than or equal to (bits 011 of syllable 3 indicate the branch condition is met, that index is greater than or equal to limit) then the next instruction is taken from (unconditional transfer to) the location specified by (a plus the base program register 054) otherwise continue in sequence.

During phase 1 the operator syllable is fetched.

During phase 2 the special increment syllable $I_a$ by which the index register concerned will be modified and compared with the limit register, is fetched and stored in the index increment register 062. In phase 4, the special variant syllable $I_v$ is fetched. Syllable $I_v$ contains a limit register address in bits 9–12, an index register address in bits 5–8 and the manner in which the index register will be modified is indicated by bits 2, 3 and 4. Bit 1 indicates an increase if a zero or a decrease if a one. This syllable is stored in a syllable register 3017 (see FIG. 1). At time T1 of phase PH5 the increment is fetched from the index increment register 062 and stored in the L and M register 3006, 3007. At time T2 the content of the index register whose address is in bits 5 through 8 of the syllable register 3017 is fetched and stored in the K and E register 3004, 3005. At time T4 of phase 5, if the first bit in the syllable register 3017 is set, the increment of the index increment register in the L and M register 3006, 3007 is added to the contents of the index register and the sum left in the L and M register 3006, 3007. Then at time T6 the contents of the L and M register 3006, 3007 are stored in the index register. If the first bit stored in the syllable register 3017 is set at time T4, then this indicates a decrease and the increment is subtracted from the contents of the index register, the result being left in the L and M registers 3006, 3007. At time T6 the contents of the L and M register 3006, 3007 are stored also in the index register.

At time T7 of phase 5, the limit register address bits 9 through 12 in the syllable register 3017 is examined to see if limit register zero is indicated. In this address indicates limit register with the zero address, then a zero is stored in the K and E register 3004 and 3005 at time T7, and at time T9 of phase 5, the contents of the L and M register 3006, 3007 (index register) are compared with the contents of the K and E register 3004, 3005 (limit register). If the address of the limit register determined by bits 9 through 12 in the syllable register 3017 is not equal to zero, then at time T7 the contents of the limit register whose address is indicated by those bits 9 through 12 of the syllable register 3017 is stored in the K and E register 3004, 3005. In either case (limit register zero address or not zero address), the contents of the L and M register 3006, 3007 (index register) are compared with the contents of the K and E register (limit register), at time T9 of phase 5. At time T10, the bits 2, 3, and 4 of the syllable register 3017 are examined. If bit S2 is set and the contents of the index register are less than the contents of the limit register; or if bit S3 of the syllable register 3017 is set and the contents of the index register are greater than the contents of the limit register; or if bit S4 in the syllable register 3017 is set and the contents of the index register are equal to the contents of the limit register; then at time T10 of phase 5 the branch flip-flop BRF (FIG. 4) is set.

If one of these three conditions are not met, then in phase 6 the branch syllable is read out and destroyed. However, if the branch flip-flop BRF has been set by one of the conditions of time T10 being met, then in phase 6 the next program word is fetched by the memory location relatively indicated by the branch syllable and stored in the program storage register 100 to 103. The instruction then is completed and a jump is executed to phase 1, time T1, to the next instruction.

The above description describes flow charts of phases, routines, and instructions.

Now refer to FIGS. 85 through 111 of the drawings generally. These figures show the logic circuits for specific sections of the illustrative embodiment computer of FIGS. 1A and 1B.

Many of the units shown in FIG. 1 comprise units known to the art which may be employed, and these are not illustrated or described in detail. For example, the A register 3033 may be a convention 48-bit accumulator register, each bit circuit of which comprises a bank of groups of AND gates providing inputs to a bank of OR gates. A third bank comprising a bank of AND gates has inputs such as shift signal inputs in addition to inputs from the second bank of OR gates. Responsive to signal output from the AND gates of the third bank are a fourth bank comprising two OR gates, one of which OR gates feeds input into the zero side of each of the A register 3033 flip-flops, and the other of which OR gates feeds input to the one side of the register flip-flop. In the A1 flip-flop circuit, for example, that generates the A1 and $\overline{A1}$ A register 3033 output signals.

The B register 3031 logic circuits (not shown) may comprise 48-bit logic circuits. Each bit circuit may comprise a first and second group of AND gates. Each AND gate group may feed into an OR gate, one of the OR gates feeding into the zero side and the other OR gate feeding into the one side of the B register bit flip-flop. The output signals of each of the flip-flops are the B and $\overline{B}$ signals, for example, in the first bit circuit the B1 signal and the $\overline{B1}$ signal. The C register 3034 comprises a twelve-bit register. The logic of C register 3034 (not shown) may comprise for each bit circuit, two groups of AND gates, each group feeding into a respective OR gate. Each of these OR gates may feed into one of the C register flip-flops, for example, C1. The A, B, and C registers may be conventional flip-flop arithmetic registers and the details of their logic circuits are not shown.

Refer to FIGS. 85A, 85B and 85C, which illustrate the first six bits of the multiply-divide (D) counter 3021. As in the case of the A, B, and C registers, these comprise groups of AND gates and OR gates in logical array which are responsive to sub-commands and input from counters and registers to activate the zero side or the one side, respectively, of the multiply-divide counter individual flip-flops to provide bit signal outputs. The input and output signals at the various stages are apparent from the showing of FIGS. 85A, B, and C.

The K and E register 3004, 3005, comprises bits 1 through 4 of the K register and bits 1 through 12 of the E register. The logic circuits of this register are not illustrated inasmuch as each of the bits may be conventional logical flip-flop register circuits. Each logic circuit may comprise a plurality of AND gates responsive to thin-film inputs and to inputs from registers in the memory exchange portion. These AND gates furnish input into OR gates, which in turn feed into the ZERO and ONE inputs to the bit flip-flops of the K and E register 3004, 3005. Similarly, the L and M register 3006, 3007, comprising bits 1 through 4 of the L register 3006 and 1 through 12 of the M register 3007, presents conventional flip-flop register circuitry similar to that of the K and E register. The logic circuit details of the L and M register are not illustrated herein.

The syllable register (logic circuits not illustrated in detail) is a 12-bit conventional flip-flop register and similarly comprises groups of AND gates, introducing input into OR gates which in turn feed to the ZERO and ONE sides of the individual flip-flop bit circuits of syllable register 3017.

Now refer to FIG. 86, which shows the logic circuit for the adder 3032 of the arithmetic unit 3030. The adders 3008 and 3009 may be similar except for shifting circuitry. FIG. 86 presents bits 1 through 12 of the 48-bit adder 3032. These logic circuits comprise AND gates, OR gates, and inverters, where required to form the adding circuit. The circuit for bits 13 through 48 are not shown inasmuch as this circuit is substantially repetitive of the FIG. 86 illustration.

The A register 3033 carry logic, the OV flip-flop, the data path gates for the A register 3033 shifts (bits 1 through 13) are not illustrated inasmuch as this is simple AND gate followed by OR gate logic circuitry. Similarly, the adder 3008 for the K and L register contents and adder 3009 for the E and M register contents are simple adders of the type shown in the circuit of FIG. 86 of adder 3032, with the exception that shift commands are not carried out. The adder 3009 for the E and M register comprising adder circuits for bits 1 through 12, the adder 3008 for the K and L registers comprising bits 1 through 4, and the character halt compare logic circuits are not shown as presenting conventional adder logic circuitry.

The mask register 3016 is a simple 23-bit flip-flop register providing inputs directly into bit flip-flop circuits and is not illustrated in the drawings. A parity generator is provided for parity checking, is conventional in computers, and is not illustrated in logical circuit detail. Similarly, the memory limit comparators and the lower and upper limit registers are respectively flip-flop register and conventional comparator circuits and are not illustrated in logical detail. The character comparator and A register decoders similarly represent conventional combinations of AND/OR circuits and in some cases buffer amplifiers and inverters in conventional circuit array. The function register 3015 presents a readily apparent flip-flop register responsive to AND gate and thence OR gate inputs on one side of each flip-flop and receiving signals directly on the other side. The flip-flop circuits shown in FIG. 4 are conventional flip-flop circuits and not shown in logic drawing detail.

The real time count generator (not shown in logical circuit detail) comprises output means from a 100 cycle oscillator (not shown) into a flip-flop. Logical circuits responsive to this oscillator flip-flop (not shown) provide input to a second flip-flop whose output triggers off the interrupt circuit for the real time count clock 114 and 115 in thin-film memory 3001. The interrupt address encoder provides a plurality of circuits (not shown) comprising AND gates feeding into an OR gate. The interrupt register 3002 may be a conventional 12-bit register (not shown).

Interface units provided at the output of the computer module comprise a plurality of receivers, AND gates and OR gates in logical arrangement (not shown in the drawings). The memory multiplex unit, bits 1 through 12, comprise similar units which are not illustrated herein. These circuits are described in the aforementioned copending application of Anderson, Hoffman, Mott, Pezely, Shifman and Wilkinson, for Computer System.

Refer to FIG. 87, the phase distributor 3501. The phase distributor 3501 comprises a plurality of AND gates responsive to respective jump phase signals and an AND gate responsive to a memory read/write thin-film signal activated in accordance with a T0–1 signal, any of the AND gates on being enabled causes OR gate 02426 to actuate the corresponding flip-flops in accordance with phase jump signals introduced directly into the flip-flops.

Refer to FIGS. 88A and 88B, the Timing Distributor 3502 (FIG. 88B is on the same sheet as FIG. 90). This circuit in response to time counting inputs and jump inputs fed into AND gate circuits comprises responsive OR gate circuits feeding to the one side of a plurality of flip-flops to provide the timing output pulses. "Jump not" level signals reset the flip-flop "Zero" sides. In FIG. 88B, the JA, JB, and JC inputs to the AND gates of FIG. 88A are generated.

FIG. 89 shows the memory timing TM counter of the subcommand matrix, and controls portion 3020 (see FIG. 1). The timing count inputs are utilized in simple logic input AND and output OR circuits (inverted in some cases) to generate the memory time outputs for the TM memory time counts. The TMZ (TM zero) circuit also provides a TMZ flip-flop. FIG. 90 shows the timing counter which comprises simple AND gate, OR gate and flip-flop circuitry, wherein the time counts from 1 to 5 are shown by way of illustration. The T5, T9, T10, T13, T11 and T14, and T12, T15 circuits (not shown) comprise simple AND and followed by OR circuits with input combinations from the timing distributor (FIG. 88A).

The PSR address counter 3504 and syllable counter 3507 and decoders present single AND and OR gate and flip-flop decoding circuitry (not shown).

FIG. 91A shows the decoders for the program storage register fill flip-flop circuits to determine: "Is fill needed?" FIG. 91B is the interrupt decoder; FIG. 91C is also part of the interrupt decoder; FIG. 91D is the decoder to enable loading of the program storage register either for needed fill or for overlap; and FIG. 91E is the overlap logic circuit. The PSR fill flip-flops 3505 comprise a group of input AND gates and OR gates for each flip-flop state input, the stack address counter and input syllable counter are conventional as logical flip-flop circuits and are not illustrated. FIG. 92 shows a portion of the function register decoders which, responsive to the function register flip-flop bits, causes the respective signals necessary for generation for subcommand matrix and control signals to be effected. The other function register decoders are similar in logical configuration and are readily understood from the understanding of the subcommand desired. They comprise merely AND gates, OR gates and buffers, in that sequence. These are not illustrated.

Refer to FIG. 93, the scan logic diagram. These AND gate groups, OR gates and inverters are responsive to inputs from the flip-flop of the syllable register 3017 and the scan A, scan B, and scan C commands to provide the output scan signals.

FIG. 94A and FIG. 94B comprises the character selection for strip and adjust field circuitry. The input from the syllable register 3017 to the FIG. 94B circuit is applied to a plurality of AND gates, which provide OR gate outputs which are inverted in some cases and not inverted in others. The outputs of FIG. 94B circuits provide the appropriate signal inputs to the circuit of FIG. 94A to provide the character selection logic required.

FIG. 95, the reset inhibits for strip and insert, comprises the simple strip and insert logic circuits. FIG. 96A comprises simple logic circuitry in the subcommand matrix section 3020 to provide the "address the base address register" output. This output ABAR is used as input in the FIG. 96B1 circuit, the thin film address register 3510 bits 1 and 2. The thin film address gating is shown in the FIGS. 96B1, B2, B3 and B4. These are straightforward logic circuits comprising primarily AND gates and OR gates, wherein the AND gates are responsive to the commands indicated by the abbreviated symbols. FIG. 1 presents in block diagramatic representation the flip-flops of the 7-bit thin-film address register 3510 at the input to thin-film memory 3001.

The address signals to each of the bits cause the seven thin-film fiip-flops to be set to the appropriate thin-film register addressed. These flip-flops are set by the film address gating of FIG. 96B1, 96B2, 96B3, and 96B4 in conjunction with other thin-film address gating (not shown).

Other commands of the subcommand matrix similarly comprise simple AND gate and OR gate and buffer amplifier configuration; for example, the commands for ACCR, AIDR, AIPR, APSRSY, ARIRIS, ARTC, ATFS, AXIR, RIS, RPNN, RPOV, AIR, APCR, APDR, APSR, ICYA48, RF, RIF, RIOAB, RPAR, SINT, SPAR, SRPF, TEM, TMEMMA, TMEMMB, TS2T4D, ATFIS, etc. These are not illustrated and will not be described in detail, inasmuch as in most cases they comprise either a plurality and AND gates or a single AND gate feeding into an OR gate, sometimes followed by a buffer amplifier. However, the subcommand matrix CUSY (count up the syllable) subcommand is illustrated in FIG. 97. This is a more complex subcommand logic circuit but nevertheless is apparent from the drawing. The Jump to phase 1 (JPH1) portion of the jump of phases circuits to provide the JPH1 or jump to phase 1 signal in the subcommand matrix 3020 is illustrated in FIG. 98. The remaining jump phase circuits are similar but less complex than the JPH1 circuit and are not illustrated in the drawings.

In FIG. 99 the relatively simple logic of the JTM0, $\overline{\text{JTM0}}$, JTM3, JTM15 and JTM19 circuits are shown to illustrate the subcommand matrix for jump to memory timing circuits. The JT0 and JT1 subcommand matrix circuits are similar to circuits shown in FIG. 100. FIG. 100 illustrates the JT2, $\overline{\text{JT2}}$, JT3, $\overline{\text{JT3}}$, circuits which latter illustrate the jump to T time pulse circuits in the timing distributor circuit. These circuits are self-explanatory from the logic and the symbols. The remaining jump time subcommands are similar and therefore not shown. The subcommand matrix circuits for RA1, R1B, SHLA, RC, RMC3, S1A, SFA, and SHRL subcommands and the remaining reset and shift circuits comprise simple AND gates groups to which an OR gate is responsive, and since they are readily apparent they are not illustrated.

Refer to FIG. 101, the subcommand matrix set branch flip-flop circuit. This comprises a more complex AND and OR gate configuration to provide the set branch flip-flop (SBRF) output. The subcommand matrix shift SHRB12, TAB, and scan circuits similarly comprise AND gates feeding into OR gates and are apparent logic without illustration. The more complex logic circuit, the subcommand matrix SH12 signal is shown in FIG. 102.

FIG. 103 illustrates the PTAE1, PTAE2 and TAE subcommands involved in transfers from the A register 3033 to the E register 3005. In conjunction, on each transfer from any register to the E register 3005, during the next pulse time, the contents of the E register 3005 are stored in the address in the thin-film register at the address set up by the thin film address register.

Figure 96C:
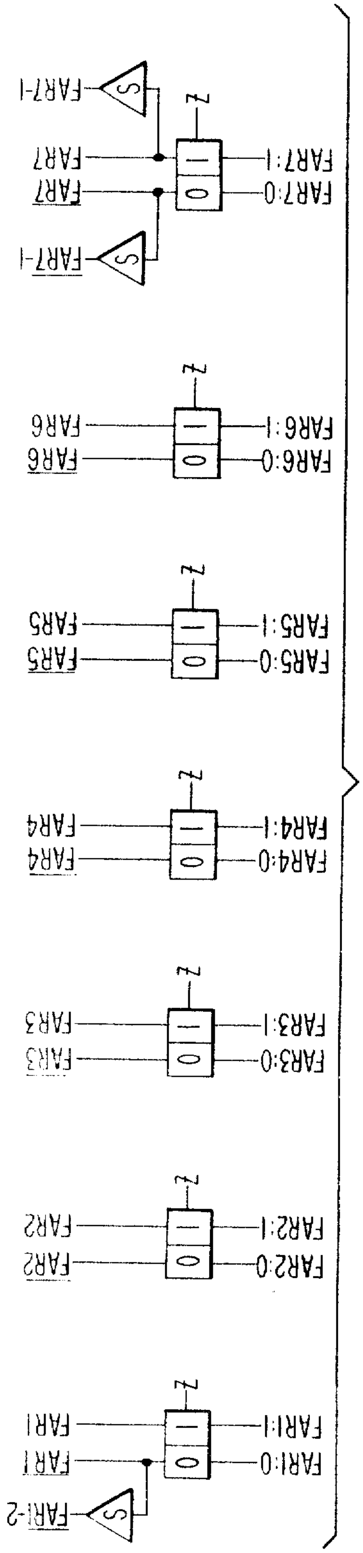

FIG. 104A comprises the subcommand matrix gating circuit to write the contents of the E register in thin film at the address set up in the thin-film address register 3510 of FIG. 96C. This logic circuitry is taken in conjunction with the showing of FIG. 104B which shows the insert copy flip-flop logic circuit to provide the outputs for the insert and copy functions. The outputs of FIG. 104A are fed to the inputs of the copy insert flip-flop in FIG. 104B. FIG. 104A presents simple and/or logic operand from the drawings. The logic for the RLM (read L/M register 3006, 3007) is substantially similar to the circuit of FIG. 104A (except for specific input and output signals) and is not illustrated.

FIG. 105 illustrates the subcommand matrix transfer thin-film to E register circuit (TTFE) including the PTTFE1 through PTTFE6 logic circuits. These comprise AND gates which accept the necessary subcommand signals and generate outputs to respective OR gates, the OR gates forming the PTTFE individual outputs and providing an input to the TTFE OR gate and buffer configuration circuit.

FIG. 106 provides the decoders for the multiply-divide counter 3021 presenting simple AND gate groups and responsive OR gates and buffers for generation of the multiply-divide counter divider output signals required including the DZ and $\overline{\text{DZ}}$ flip-flop input signals and the $\overline{\text{DZ}}$ flip-flop circuit.

FIG. 107 shows the control switches and the slave clock oscillator in an electromechanical schematic diagram. This illustrates the hereinabove described control console operations. The K register panel data switches, the E register panel data switches, the thin-film address switch, and the thin-film address panel switches number two and three are similar to the switches of FIG. 107 and are not illustrated.

FIG. 108 illustrates the thin-film memory write driver switches DR00 through DR17 and the film write switches FWS–SW0 through SW7; and FIG. 109 shows the thin film memory sense amplifiers FSA1 through FSA16 and information register (FIR) bits TF1 through TF16. FIG. 110 illustrates the (FID) thin-film information drivers IRDR1 through IRDR8. The thin-film memory information drivers IRDR9 through IRDR16 are not shown as they are repetitive of the circuits of information drivers IRDR1 through IRDR8.

FIG. 111 illustrates the thin-film word gate, strobe and information gate control circuit including the delay line comprising delta 1, delta 2, and delta 3. The circuits of FIGS. 108–111 are described in detail in electrical circuit representation in the aforementioned copending application, Ser. No. 226,895, now U.S. Patent No. 3,271,741 of Albert M. Bates for Magnetic Memory System.

Thus, there has been described a computer which may be a computer module in a modular processing system which is operational to permit broad programming flexibility. The computer of the invention presents salient characteristics. It is adaptable to sharing memory with other devices. It is capable of multi-megacycle operation at the rate of a multi-megacycle clock. The illustrative embodiment of the computer of the invention uses 48-bit data words. The inventive computer of the illustrative embodiment employs a parallel arithmetic unit; serial-parallel transfers; fractional binary fixed-point and floating-point operation relative direct addressing; indirect addressing; variable address structure with addresses being indexable for single and multiple indexing. The illustrative embodiment supplies 15 index and 15 limit registers. The invention further provides a fast-access auxiliary memory. The illustrative embodiment employs as this fast-access memory a thin-film memory. The fast-access memory comprises data and control registers, and an up-down circular operand stack. Parity check is provided for switching interlock transfers. The inventive computer is adapted to employ a versatile repertoire of instructions which include binary and fixed-point arithmetic instructions, field-defined instructions, and control instructions. Obviously, variations of many illustrative embodiment teachings such as the clock rate, the amount of bits per word, syllable, etc., the specific registers and many other features may readily be introduced without departing from the scope of the present invention.

The computer of the invention described hereinabove further provides oher unique features including three address (but variable address) programming and variable length instructions to provide efficiency and versatility and wherein the instructions comprise varying length strings of syllables. The inventive computer is adapted to employ a set of field-defined instructions which facilitate code conversion and multiple use of a memory location. The invention features simple and effective sub-routine control and interrupt features whereby the computer of the present invention is adaptable to control under an automatic operation and scheduling system. In summary, the computer means and method of this invention introduces a second generation of computers adaptable to a second generation system computer techniques, and advanced inventive means and methods. Obviously, many modifications and variations of the present invention are possible in the light of the above teachings. It is therefore to be understood that within the scope of the appended claims the invention may be practiced other than as specifically described and illustrated.

What is claimed is:

1. A computer comprising:
means for providing execution of commands involving selectively no address, one address, two address, and three address programming capability, and means in electrical relationship to said means for capability of selectively no address, one address, two addresses, and three addresses for providing variable length instructions.

2. A computer comprising:
phase distributor and subcommand matrix means to provide selectively no-address, 1-address, 2-address, and 3-address capability,
at least one program storage register, and
a program syllable counter,
said program syllable counter and said program storage register in relation with said phase distributor and subcommand matrix forming means to provide variable length instructions.

3. A computer comprising:
a phase distributor, a subcommand matrix responsive to said phase distributor to provide a plurality of fixed phases of computer operation, and to provide capability selectively for no, single, and multi-addressing comprising double and triple addressing,
a program storage register, and
a program syllable counter,
said program storage register and program syllable counter in relation with said phase distributor and subcommand matrix providing variable length instructions which in cooperation with said address capability provides programming of different types of instructions involving no-, single- and multi-operands and results wherein said instructions comprise strings of syllables, which strings vary in length from one to seven syllables per instruction.

4. A computer comprising:
a phase distributor,
subcommand matrix means responsive to said phase distributor to in conjunction therewith provide up to three address programming capability,
a first and a second program storage register to temporarily store program words,
each program storage register comprising a plurality of syllable storage means,
a program syllable counter to pick out syllables in the program storage register being operated upon,
said program syllable counter and program storage registers operating in conjunction with said phase distributor and subcommand matrix to provide variable length instructions which can begin at any syllable location of a memory word and end selectively with this or any succeeding syllable of the memory word and can continue for up to two more successive memory words to effect improved speed of operation and time and space saving use of available storage.

5. A computer comprising a first fast-access memory and control means to adapt said computer to coact with a second memory to execute program words comprising a plurality of units of information,
wherein each of said units of information comprises syllables having a variety of different formats determined by the information that a specific instruction needs,
and wherein each program word comprises an operator syllable, the operation code of the instruction forming a portion of the operator syllable, and
means to effect the instruction as "strings of syllables" varying in length from one to seven syllables per instruction,
and wherein the operator syllable is located in a predetermined syllable position in the string,
said means to effect the instruction as variable length strings comprising an arithmetic unit and a syllable counter to transfer a train of syllables from memory to be computed in said arithmetic unit,
an input syllable counter,
said fast-access memory comprising a first and second program storage register,
each comprising means to store a plurality of syllables,
said input syllable counter bringing in syllables from memory to said first and second program storage register in accordance with its count to thereby provide said variable string of syllables per instruction and providing means such that an instruction can begin at any syllable location in a memory word and end with this or any succeeding syllable of the memory word, or can continue on to as many as two succeeding memory words.

6. In a system comprising a computer and a separate memory unit, means for implementing an instruction word comprising at least a first operator syllable and from none up to a predetermined number of additional syllables comprising none, one, two, and three syllables to form a variable string of syllables from one to said predetermined number plus one,
said means comprising a syllable counter to effect transfer of a train of data syllables from memory to said computer,
a first program storage register having capability to store a plurality of syllables,
an input syllable counter to bring in the syllables in predetermined order to said first program storage register, and,
means to execute commands in accordance with the separate strings of syllables in said program storage register.

7. The apparatus of claim 6 including:
a second program storage register,
said input syllable counter being adapted to bring the syllables in predetermined order to said first and second program storage registers, said means to execute commands being adapted to executed commands in accordance with separate strings of syllables in said program storage registers.

8. In a computer having a main memory associated therewith: an auxiliary fast-access memory, said auxiliary memory comprising a program storage register and data containing means, means to execute program instructions comprising variable strings of syllables comprising:

means to transfer a string of data syllables from said main memory to said computer syllable-by-syllable in accordance with a predetermined count, means to bring in program syllables from said main memory to said fast-access memory, said fast-access memory being capable of storing a plurality of said program syllables from memory, means to count the input of said program syllables, said means to bring in program syllables being means operative in accordance with said means to count the input of said program syllables, and, means to execute the instructions brought into said fast-access memory in accordance with the syllable content of said program syllables, upon data contained in the memory, and upon said data contained in said fast-access memory.

9. In a computer and main memory system responsive to control by a program, means to provide relative addressing, said relative addressing means comprising:

a base program register, and a program count register, and means responsive to transfer of control of the program to add a literal specified in the program to the contents of said base program register and to effect placing of the sum in sai dprogram count register, thereby permitting transfer to be specified to locations relative to the beginning of a program block in memory, and the program to be loaded and executed in any position in memory with no modification of branch addresses and no wasted indexing.

10. In a computer system, means to load and execute a program in any position in memory with no modifications of branch addresses and no wasted indexing, said means comprising, means to load a program within a block of continuous memory locations, wherein the beginning location of the block may be any location in memory, means to store address of this beginning location, means to insert a specified literal and to add this literal to said address of said beginning location of the block to thereby effect transfer of control of the program, a second storage means and means to insert the sum of the literal and of the base program location in said second storage means, and, means to count up said second storage means along with execution of the program, the counted up designation at all times pointing to the actual position of the instruction in memory.

11. In a computer, means for effecting combined relative and indirect addressing of data, said means comprising a base address register, means to insert the constants and variable data of a program together in a block of contiguous memory locations, means to insert the first location of the data block in said base address register, means to provide for each data operand a memory address syllable comprising a plurality of memory syllable bits to specify the location of each operand of a program relative to the beginning of the data block, means to provide in a predetermined bit portion for each memory address syllable a bit of said memory address syllable which determines according to it being a ONE or a ZERO that the address is selectively indirect or direct, means to reference additional operands to memory, means to add upon said reference of additional operands to memory all but the most significant bit of the memory syllable to the contents of the base address register to form the absolute address, the first location of the data block placed in the base address register being a complete data syllable and the operand memory references comprising less than said complete data syllable.

12. The computer of claim 11 further including means to examine the most significant bit of the memory address syllable as to whether the address is an indirect address, and means to selectively fetch and operate upon data where the address is direct and to continue examining successive words at the addresses derived in the indirect address chain.

13. The computer of claim 12 further including means operative upon determining that the address is a direct address at the last level, to determine if indexing is specified, and means responsive where indexing is specified, to perform said indexing at the last level only.

14. The computer of claim 13 further including means to examine at each level of addressing after the first level of addressing, a predetermined bit more significant than the indirect-direct address determining bit for binary condition, and means to selectively set an interrupt register bit upon predetermined binary condition of said more significant bit.

15. In a computer and coacting memory system, means for allocating any available space in the memory to a program to be run, said means comprising, a base address register to contain a binary representation of the first location of a data block in the memory, means operative upon reference to the address syllable for the relative address of an operand memory word to add all but the most significant bit of the memory relative address syllable to the contents of the base address register to form an absolute address, and means responsive to the state of the most significant bit of the memory relative address syllable selectively to execute the program instruction when in a first direct address indicating state and when the state indicates that the address is an indirect address to examine the word at the address indicated by the word at the indirect address and to selectively follow further addresses until indication of a direct address occurs, said means being operative to execute the instruction upon the word at the true direct address.

16. In a system comprising a main memory and a computer adapted to execute instructions including address tag portions contained in the main memory and operate on data, said computer comprising:

a fast-access operand stack auxiliary to said main memory, whereby operands which are used repeatedly can be kept in said stack and addressed in a shorter time than required to get an operand out of memory, said data being optionally stored in said stack and said main memory, said stack comprising a plurality of electrically rotatably positioned stack registers, said stack registers each being of capacity to retain a word, the register currently rotated to top of stack position in a rotated position of the stack being accessible at a given instant, said stack comprising an electrically rotatable multi-word circular memory arrangement, means responsive to hold and normal indications for selectively holding the stack and circulating the stack one step upon access being made to said stack, said circulating means comprising means normally to enable counterclockwise stepping for one of the operations of fetch and deposit and clockwise stepping in the opposite operation,
said stepping means and holding means being responsive to the address tag portions of instructions,
means to effect addressing continuously at the stack register which is currently at the top of the stack,
said addressing means comprising a stack address counter.

17. In a modular processor system comprising a complement of at least one computer module, memory modules, and a switching interlock therebetween, said computer module comprising,
an arithmetic unit operating in parallel and responsive to the memory module to receive data from the memory through the said switching interlock in serial-parallel form, said computer module further comprising a fast-access register storage and operand stack means to operate at a high speed rate and to reduce required accesses to memory modules, said stack comprising a plurality of electrically rotatably positioned stack registers.

18. The apparatus of claim 17 wherein said computer further comprises;
means responsive to commands to execute binary fixed and floating point arithmetic instructions,
said computer further comprising addressing structure incorporating means to execute binary fixed and floating point arithmetic instructions,
said computer addressing structure incorporating phase means wherein up to three addresses can be processed with each instruction.

19. A computer adapted to operate at multimegacycle clock output pulse rate, and
adapted to receive information from and send information to a first main memory connectible to said computer, and
comprising a parallel operating arithmetic unit responsive to serial-parallel data transfer of groups of digits in parallel at successive of said pulse rate times to selectively store and supply for fetching an information word,
means to provide relative direct addressing of memory locations,
indirect addressing means to provide indirect addressing at a plurality of levels, coacting with said relative directing means to extend the range of said direct addressing,
a plurality of index and a pluarlity of limit registers,
means for modifying memory addresses by adding contents selectively of zero, one, and more of said index registers, subject to comparison of the sum with contents of said limit registers to provide variable addressing,
said computer comprising further a fast-access auxiliary memory operating at the computer clock rate, said memory comprising data and control registers,
said fast-access memory further comprising an up/down circular operand stack, and
means to provide information flow selectively between said arithmetic unit and said stack, and between said arithmitic unit and said memory.

20. In a system comprising a main memory and a computer connectible to said memory, the computer comprising,
a fast-access memory for auxiliary control and storage,
an arithmetic unit responsive to information from said main memory and said fast access memory to store said information and perform arithmetic manipulation thereupon,
a memory exchange unit to compute direct addresses used for communicating with main memory to handle information when communicating with said fast-access memory and the main memory,
and a control unit to provide timing and control for execution of instructions involving transfer of information away and operations performed on information handled by said fast-access and main memory, said arithmetic unit and said memory exchange unit.

21. The computer of claim 20 including a memory protection unit to store upper and lower address limits within which data may be stored in the main memory and to permit storage only where a store address is within said address limits.

22. The apparatus of claim 20 wherein said arithmetic unit comprises a first and a second multibit register with an adder interposed between them, and,
a third multibit register to contain a fraction of the bits of said first and second registers,
said first register storing selectively the augend, minuend, product, and dividend during selective add, subtract, multiply, and divide operations,
said second register selectively storing addend, subtrahend, multiplicand, and divisor figures during selective add, subtract, multiply, and divide operations, respectively, said third register storing selectively the multiplier and quotient during multiply and divide operations,
said fast-access memory further comprising an auxiliary register of full length operating in conjunction with said third register in circularly transferring relationship for effecting a double shift operation.

23. The apparatus of claim 22, said computer further comprising
means to shift said first register in combinations of 12, 6, and 1 places to the right and iteratively to the left,
means to shift said second register iteratively to the right by 12 places, and
means to shift said third register iteratively selectively left and right one place.

24. The apparatus of claim 20 wherein said fast-access memory of said computer is a thin-film memory unit divided into storage registers for a plurality of full syllable multibit words,
a fast-access memory addressing register,
said computer further comprising subcommand matrix means to address said address register,
a flip-flop register responsive to said matrix to receive transfer from said fast-access register for fetch operations and to supply information responsive to a store operation determined by said subcommand matrix to store its contents in the addressed register at addressed syllable position in the fast-access memory.

25. The computer of claim 20 wherein said memory exchange unit comprises,
a first and a second register,
an adder interposed between said first and second registers,
whereby said memory exchange unit is responsive to said control unit to compute a direct address for use when communicating with main memory and also to handle information when communicating with the main memory and with said fast-access memory.

26. The computer of claim 20 wherein:
said memory exchange unit comprises a first full length multibit memory exchange register,
a second full length multibit memory exchange register,
adder means interposed between said first and said second memory exchange register,
said fast-access memory comprising a first and a second program storage register,
each of said first and second program storage registers comprising a plurality of a fast multibit partial length syllable storage retaining means,
means to transfer a first multibit partial length memory relative address syllable from each of said program storage registers to said second memory exchange register,
a fast-access memory base address register,
means to transfer a second full length multibit base address from said base address register to said first memory exchange register, said adder adding said relative and said base addresses by adding said first and said second memory exchange register contents and storing the result in said second memory exchange register, said second memory exchange register comprising a first portion to contain the bits in addition to the partial length syllable bits and a second portion to contain bits of the amount of said partial length syllables, said bits in said first portion representing a main memory module address, the remaining second portion bits representing an in-module main memory address, means to transfer a word of bit length equal to a plurality of said partial syllables from the memory into the said second memory exchange register in a number of sequential clock times equal to the number of said last around plurality of partial syllables with the least significant partial length syllable entering first, said arithmetic unit including destination registers, means to transfer said syllables in said first memory exchange register into one of said destination registers concurrently with said transfer of succeeding syllables into said second memory exchange register, means to fetch address from said fast-access memory, said fast-access memory fetching means including subcommand matrix means associated with said control unit to directly address said fast-access memory, to thereby transfer contents from said fast-access memory to said first memory exchange register, some of said fast-access memory registers being multisyllable registers, means to transfer from said multisyllable fast-access memory registers the least significant syllable into said first memory exchange register followed by successive transfers of the remaining syllables, and means to transfer said remaining syllables sequentially out of said first memory exchange register into said computer destination register, said subcommand matrix including means to store in fast-access memory comprising, means to transfer words into said first memory exchange register, said subcommand matrix further comprising means to address the particular fast-access memory register in which storage is desired, said last-named addressing means including means in the case of multisyllable words to address the least significant syllable storage portion of said fast-access memory registers.

27. The computer of claim 20 wherein said control unit comprises:

a timing distributor to supply a basic clock pulse used to operate the computer, a memory time counter to operate a memory module temporarily slaved to the computer upon reference to main memory being made for fetch or store operation, a phase distributor to enable selection of the order in which operational phases occur, a multiply-divide counter coacting with said arithmetic unit to control the number of shifts to be executed during an instruction including the number of add or subtract cycles during multiply or divide operations, a function register to store the operator syllable of an instruction word in program execution, and, a syllable register to store index syllables for modifying addresses of said main memory and special syllables required for execution of computer commands.

28. In a system comprising a main memory and a computer connectible to said memory, said computer comprising:

a fast-access memory, a memory exchange unit to compute direct addresses of locations in main memory and to provide a buffer from said fast-access memory, a subcommand and controls unit to provide computer timing and control for execution of instructions of said computer, said subcommand and controls unit comprising a plurality of control flip-flops to actuate fast-access and main memory transfers and execution of instructions, said fast-access memory comprising a base address register, a normal mode base program register, and a program count register to provide relative addressing of data and program locations in main memory, and, a program storage register to hold instructions transferred in execution sequence from main memory for rapid removal in sequence and program execution under control of said subcommand and controls unit.

29. The apparatus of claim 28 wherein said computer operates in a normal mode except upon interrupt when the computer operates in a control mode, said computer further comprising an interrupt register and interrupt system registers to provide storage for data in the event of an interrupt, said interrupt system registers comprising, a fast-access memory interrupt base address register having its contents protected in normal mode, said interrupt base address register containing the base address of computer interrupt routines, a fast-access memory interrupt storage register to hold interrupt return information comprising contents of said normal mode base address register, said base program register, and said program counter register, an interrupt program register to provide storage for the contents of said program storage register upon interrupt.

30. The apparatus of claim 29, said control flip-flops comprising program storage register control flip-flops and repeat control flip-flops, said interrupt system registers further comprising a fast-access memory stored interrupt dump register to hold upon appropriate interrupt, the state of said program storage register and repeat control flip-flops for interrupt return, a fast-access memory power failure dump register to hold the contents of said control flip-flops and said interrupt register, said interrupt register comprising a flip-flop register in the event of power failure, an over-under voltage detector to detect an dsignal excursions of primary power beyond fixed voltage limits, said fast-access memory comprising a thin-film memory adapted to hold storage condition without external applied energy as well as to afford rapidity of access.

31. A computer adapted to provide up to three-address programming capability and variable length instructions, said computer comprising:

an arithmetic unit, a subcommand matrix and controls portion, a fast-access, thin-film memory portion, and a memory exchange portion, said subcommand matrix and controls portion including a phase distributor to provide up to three-address capability, said phase distributor providing means to provide a plurality of operating phases, means responsive to jump subcommands to move from phase to phase, said jump subcommands means being subcommand martix means responsive to an instruction being executed, means responsive to a jump subcommand to effect a reset-phase signal to provide an input to said phase distributor comprising, a plurality of phase flip-flops including a phase just executed flip-flop and an entry phase flip-flop for the phase next to be executed.

32. A computer comprising:

means to execute variable-length instruction, a fast-access memory comprising a multi-level operand stack in which operands acted upon by the instructions are optionally stored, means to provide relative addressing of main memory, means to provide indirect addressing of main memory at any level of indirect addresses within the capability of said main memory, an interrupt system, and, means to effect subroutine control associated with said interrupt system.

33. In a computer system comprising a switch interlock, a plurality of computers, a plurality of input/output control modules, a plurality of individual input and output units, said input/output control modules being connectible to the units of said plurality of individual input and output units, and a shared memory comprising a plurality of memory modules to contain program and data words including operands;

each computer comprising data transfer bus means exclusively leading from said computer to communicate via the switching interlock with any memory modulate in the system, a fast-access memory portion comprising control registers and storage registers containing program and data words including an operand stack, an arithmetic unit, a subcommands matrix and controls portion comprising means to implement three-address programming and variable length instructions, wherein said instructions comprise strings of syllables varying in length from one to a fixed number of syllables per instruction, and wherein each instruction can begin at any syllable location of a memory word and end with the same syllable or any succeeding syllable of a memory word and can continue on into several succeeding memory words, said fast-access operand stack containing operands and being responsive to the instructions and the subcommand matrix and controls portion to perform for addressing, fetching, and storing operations in a shorter time than the time required to get the operands out of the memory modules.

34. The apparatus of claim 33 including:

means to modify memory module addresses, said fast-access memory means further comprising a plurality of index registers, means to add the contents selectively of one, and more index registers to a predetermined number of index registers in order to obtain an effective address, and, means to modify the contents of said index registers to thereby enable multiple indexing by adding to an address the contents of up to a fixed number of index registers out of the total of index registers in said fast-access memory.

35. The apparatus of claim 34, said fast-access memory further comprising a plurality of limit registers, means to compare an address modified by an index register with the contents of a limit register, and depending upon the results of the comparison transferring program control to the appropriate location, each of said limit registers comprising sufficient bits to contain an absolute memory address not relative to any lesser bit base address.

36. In a system comprising a main memory and a computer to execute a program, a fast-access memory storage means in said computer, said fast-access memory storage means comprising a base program register, a program count register and a base address register, the program to be executed by the computer being storable in a block of contiguous memory locations in the main memory, means to effect communication between said base program register and the main memory, said base program register comprising means to store the address of the beginning location of the block of contiguous memory locations of the program, computer means operative upon transfer of control in the program occurring to add to the contents of said base program register, a literal specified in the program branch syllable for the transfer control instruction, and to place the sum in said program count register to thereby specify branches to locations relative to the beginning of the program block, said program thereby being loaded and executed in any position in memory with no modifications of branch addresses and no wasted indexing, said base address register comprising the first address of contiguous memory location data words to thereby permit available space in main memory to be allocated for blocks of data to be inserted.

37. The computer of claim 36 wherein the instructions to the computer include field defined instructions, the computer including:

means to perform arithmetic manipulation and comparison on fields, said fields comprising physically adjacent multi-bit characters of a predetermined number of bits in fixed locations in a word, said means to perform manipulation and comparison being responsive to and in accordance with the field-defined instructions of said computer program.

38. The computer of claim 36 including:

means for subroutine control, upon calling for a subroutine, said last-named means comprising means to transfer control to a remote subroutine and to return control, a subroutine base address register, said subroutine base address register containing a location of a list of all subroutine addresses to thereby ease the bookkeeping required to relocate a subroutine, and subcommand matrix and controls logic instruction implementation means to enable the location of said subroutine working storage area in the calling routines direct address area in main memory.

39. A computer responsive to information from and operative to transfer information to a main memory, said computer comprising:

means responsive to program instructions comprising strings of syllables of a variable number of syllables per instruction to execute the instructions, and to execute variable numbers of address instructions from no-address to three-address programming instructions of the variable length instructions, a fast-access memory, said fast-access memory comprising a base program register, and a base address register, means to provide relative addressing to allow ready relocation of programs and data and to enable separation of the program and data by changing the base reference address in each of said base program register and said base address register to which programs and data are established as being in relation, said means to change the contents of the base registers being operative to permit all program addresses to be made relative to the base program register and all data addresses to be made relative to the base address register thereby enabling programs to be located and relocated at will in the main memory and independently enabling the data to be located and relocated at will in the main memory.

40. A computer comprising:
means responsive to a first group of instructions to operate in a normal mode to perform arithmetic computations and manipulations upon data,
means responsive to computer conditions to automatically place said computer in a control mode upon occurrence of any of said conditions,
said computer when operating in the control mode incorporating means to execute a special class of instructions which are not available in the normal mode,
means operative in the normal mode to prevent change to control mode except in the presence of conditions causing change to the control mode,
said computer being responsive to a plurality of external requests and to a plurality of different internally generated signals to operate in the control mode,
said computer further comprising a plurality of registers and controls essential to operation of said computer in said normal mode,
a memory portion,
said memory portion comprising a non-volatile storage unit to store contents of said key registers and controls upon occurrence of said conditions causing operation in the control mode.

41. In a computer clock means to enable operation at a clock rate of the order of at least substantially a megacycle,
a fast register storage means,
said fast register storing means comprising an operand register stack operating at at least said computer clock megacycle and over a megacycle rate,
said computer comprising further means to call operands selectively from said fast operand register stack and from an external memory, and to provide storage selectively in the external memory and in said operand stack for subsequent processing as desired by a programmer,
said stack thereby reducing the number of references to main memory by holding partial and intermediate results of computation,
said stack being adapted to operate in a first normal mode and a second hold mode, the hold mode being employable for list manipulation and repeated use of data.

42. The apparatus of claim 41, including,
an arithmetic unit capable of operation in parallel and of receiving data in serial-parallel form,
means in co-operation with said arithmetic unit to provide both binary fixed and floating point arithmetic operation to permit floating point and fixed computation, and,
means to transfer memory data and program instruction in serial-parallel mode into said computer while said computer is operating upon data and instructions previously brought in.

43. A computer comprising:
means to operate upon instructions of addresses from zero to three operand addresses for each instruction,
a plurality of fast index registers,
means to modify each of said operand addresses by between a fixed number at maximum and zero at minimum of said fast index registers,
means to provide indirect addressing at any number of levels,
said computer thereby providing variable instruction type and variable address modification control.

44. A multimegacycle clock operated computer comprising:
a parallel arithmetic unit capable of serial-parallel data transfer and fractional binary fixed point and floating-point operations,
said computer incorporating means to provide relative direct addressing, indirect addressing, and a variable address structure with each address being indexable,
said last-named means comprising a plurality of index and limit registers and a multimegacycle operating auxiliary memory,
said auxiliary memory comprising data and control registers including an up-down auxiliary memory operand stack,
means providing parity check for transfers into said computer,
a subcommand matrix and controls portion comprising means to execute program instructions including binary fixed and floating-point arithmetic instructions, field defined instructions, and control instructions,
said relative address of said relative address means being selectively an absolute address and an indirect address.

45. In a computer system comprising a plurality of computer modules, a plurality of memory modules, a complement of input/output control modules, each computer module having exclusive use of a data transfer bus by which it communicates with any number of modules in the system, a switching interlock to afford said communication, a plurality of input and output devices, at least one automatic input/output exchange circuit to selectively connect the input/output control modules and the input and output devices, a bus shared by the input/output control modules of each input/output exchange, said switching interlock being adapted to automatically resolve conflicts according to priority and to queue the lower priority items, whereby one functional bus gains immediate access where the other is delayed only until completion of the first memory transfer; said computer module comprising,
an arithmetic unit which operates in parallel but receives data from the switching interlock in serial-parallel form,
a thin-film register storage and operand stack,
said thin-film register and operand stack operating at a three megacycle clock rate to reduce required accesses to memory modules,
said computer being responsive to a command list including binary fixed and floating-point arithmetic instructions,
said computer being adapted to process up to three addresses with each instruction to thereby save instruction time and program storage,
said computer further comprising means to operate on binary data words comprising operands optionally fetched from memory and from said stack,
said stack comprising a fixed plurality of operand registers,
means selectively to step said stack in circular memory relationship and to hold said stack,
said computer being operative to store results of operations selectively in memory and in the operand stack for subsequent processing at the will of a programmer.

46. In the combination of a computer,
a main memory having words stored in addresses therein, and
a switch interlock disposed between said computer and said main memory,
the computer which comprises a fast-access memory,
said fast-access memory comprising an operand stack,
said operand stack comprising a first predetermined number of word storing registers,
each said register comprising a second predetermined number of syllables,
each syllable comprising a third predetermined number of bits,
said operand stack reducing the number of references to main memory by holding words comprising partial and intermediate results of computation,
means to operate said stack in a first normal mode and in a second hold mode, said stack being operable in hold mode for operations including list manipulation and repeated use of a number, means to process instruction syllables, said instruction syllables including at least an operator syllable and variable numbers of additional syllables from zero to a fourth predetermined fixed number of data syllables following said operator syllable, said operator syllable supplying an operation code and three address indicators, means responsive to the address indicators to fetch and store required operands and results selectively from and in said stack and from or in the main memory, said address indicator responsive means being further responsive to effect in accordance with the indicator selective stack mode normal and stack mode hold operations and to selectively cause and not cause the memory address to be indexed.

47. The apparatus of claim 46 wherein said fast-access memory comprises further, a base address register, means to add the literal address determined by said instruction syllables which furnish memory address to the contents of said base address register to provide a computed reference direct address area, said base address register containing more bits than said literal address syllables, the contents of said direct address area being either an operand or next level memory address, means to afford indirect addressing of a desired number of levels of memory addresses until a direct address area is found, a plurality of index registers, and means to modify said computed memory addresses of operands by adding a fixed fraction of the total number of index registers to said computed addresses.

48. A computer module comprising:

an arithmetic unit, a thin-film memory unit, and a memory exchange unit, said arithmetic unit comprising, an A register, a B register, a C register, controls associated with said registers, and an adder, said thin-film memory unit comprising, a set of storage registers and a set of control registers, said memory exchange unit in combination with said thin-film memory providing capability for indexing, means providing address accumulation and, means to provide indirect addressing, and a command and subcommand matrix and controls unit to provide subcommands and control so as to actuate said memory units, said arithmetic unit and said memory exchange unit in predetermined sequence and operations.

49. In a computer comprising a memory portion, a fast-access operand stack, said stack comprising a plurality of registers and being addressable in a shorter time than required to get an operand out of memory means other than the fast-access memory and, means to address said stack registers in circular end-around rotatable stack register arrangement such that only the top register of the stack is accessible at a given instant.

50. The computer of claim 49 wherein each register in said stack comprises a word length stack register, said circular memory stack comprising four word length registers, an addressing counter to address each of the four word length registers such that said addressing counter is always in pointer relationship with one out of said four word length stack registers, each of the four word length stack registers being rotated with respect to said addressing counter, means for selectively holding said stack and circulating said stack one step, said stack being normally stepped one step, said stepping operation following fetches from the stack and preceding deposits made in the stack, said stepping action being counterclockwise following a fetch and clockwise preceding a deposit.

51. A computer comprising:

a thin-film memory comprising an operand stack, said operand stack comprising four forty-eight bit, thin-film registers, each of said forty-eight bit registers comprising four twelve-bit syllable-containing register portions, said stack comprising a steppable four word circular memory, means to address said stack, said stack being addressable to fetch the stack register containing an operand currently under the means to address said register, said stack being responsive to addressing to be held and stepped selectively when said stack is addressed to store, said stack being first selectively stepped in the store direction and held following which the operand is stored in the register under the addressing means, said stack normally being stepped, and being operative in non-normal operation to be held in stack hold.

52. The apparatus of claim 51 wherein said computer further comprises:

means to control said stack in accordance with an operator syllable, said operator syllable comprising a command syllable, said computer further comprising a subcommand matrix and controls unit responsive to said command to set up and execute said command, said operator syllable further comprising three address indicator tags, each of said tags being two bits, said computer being responsive to the last-named two bits to provide access selectively to stack and to provide no address, and to hold the stack and to provide access to memory means external of the computer, said syllables selectively indicating that an unindexed syllable and an indexed syllable follows.

53. In a computer, means responsive selectively to no address, one address, two address, and three address instructions to perform desired fundamental computer operations wherein the responsiveness is provided by specifying in single variable length polysyllabic instruction words all the information necessary to perform said fundamental computer operations, said means comprising phase distributor means and subcommand matrix and controls means associated with said phase distributor means to operate the computer in a sequence of phases to thereby provide only those phases necessary for executing an instruction, said instruction word syllables comprising an operator syllable for each instruction word, each operator syllable including a command defining the fundamental operation to be performed, memory address syllables, branch address syllables to specify the relative address in main memory of the instruction to which branching is desired, special syllables to specify the control data essential to the execution of an instruction and index syllables to modify the memory address syllables, the branch address syllables and the special syllables, said subcommand matrix and controls section including a function register to store said operand syllables defining the fundamental operations to be performed,
control means responsive to the relative address of the operand specified by said memory address syllable selectively to fetch from and store information,
means responsive to said branch address syllables to branch to the relative address in main memory to which branching is desired,
a syllable address register responsive to said special syllables to provide control essential to the execution of an instruction containing the special syllable,
said index syllables being inserted into the syllable string of the instruction word immediately preceding the syllables to be indexed, and
means to add serially the contents and optionally to subtract the contents of three index registers out of the index registers available comprising the index syllable, selectively to the address of the syllable immediately following where a direct address and where an indirect address to the last level of the address syllable immediately following to provide the required modified memory address syllable.

54. In a computer,
an arithmetic register, a thin-film storage unit,
a subcommand matrix and controls section, and a memory exchange portion,
said arithmetic unit comprising:
an A register,
a B register, and
a C register,
said subcommand matrix and controls section comprising:
a multiply-divide register operative as a shift register means responsive to variant syllables to provide shift in said A register,
said shift register comprising means to provide combinations of selectively one of each of single and double shifts, shift right and shift left, logical and arithmetic shift, long shift both thin-film and A register and single A register end-off and end-around shift, shift said A register right 1-bit, 6-bit and 12-bit positions, shift said A register left one bit,
adder means to add the contents of said A and B registers setting the result in said A register,
means to complement said A register,
means to transfer the contents of said B register to said A register, and the contents of said C register to said A register,
said memory exchange comprising registers adapted to receive addresses from said thin-film and said main memory portions and transfer said addresses to said A register,
said adders incorporating a carry-by-two means,
said B register containing the second operand in two-operand instructions and being adapted to receive information from said A register, said memory exchange, and said memory exchange registers, and to be shifted around by said shifting means and to be reset,
said C register providing buffer register means between said thin-film means and said arithmetic unit,
said thin-film unit comprising a thin-film C register,
said C register providing means to manipulate data before transfer into said thin-film C register.

55. A computer comprising an auxiliary thin-film memory,
an arithmetic unit,
memory protection means to keep memory addresses within predetermined bounds,
memory exchange means electrically interconnecting said thin-film memory,
said memory protection means and said arithmetic unit being responsive to introduce memory words from a main memory portion,
and subcommand matrix and control means to control operation of said thin-film memory, said memory protection, said memory exchange and said arithmetic unit,
said thin-film memory portion comprising:
a plurality of full number of bits registers and
a plurality of less than a full number of bits registers,
a plurality of multiples of full number of bits registers, and
a plurality of registers which are multiples of said lesser number of bits divided into said lower number of bits registers,
said plurality of a full number of bits registers comprising
an interrupt storage register comprising three full number of bits syllable registers;
a base program register,
a base address register and
a program count register; responsive to system interrupts to empty their contents into said interrupt storage register,
a repeat program register comprising four syllable registers for implementation of a repeat instruction,
a first and a second four lesser number of bits syllable program storage registers,
said repeat program register being responsive to repeat instructions to store a program of said program storage registers,
a subroutine storage register comprising three full number of bits syllable registers,
to store information contained in said base program register, base address register and program count register in the event of a subroutine jump;
said base program register, base address register, and program count register storing the respective bases of a program and data and providing sequences of addresses in memory,
said program count register sequencing through the program run by the computer,
jumps in the program being defined by a memory syllable called for in a program being added to the contents of said base program register,
said base address register having contents which are added to a memory syllable called for in a program to define data fetches from memory,
a subroutine base address register of a full number of bits for implementation of a subroutine jump whereby a memory syllable is added to the contents of the subroutine base address register for the starting word of a subroutine jump program,
a full number of bits interrupt base address register responsive to interrupts of the computer,
a plurality of full number of bits index registers and limit registers,
an indexing increment register to implement index limit and compare instructions, said index increment register containing increments to be added to said index registers, such that in operating the program, when indexing, the contents of the index increment register are added to one of the plurality of said index registers and after incrementing comparison is made with a designated one of said plurality of limit registers and branching occurs in accordance with whether the comparison shows the amount to be less, equal, or greater.

56. A computer comprising an auxiliary thin-film memory,
an arithmetic unit,
memory protection means to keep memory addresses within predetermined bounds,
memory exchange means electrically interconnecting said thin-film memory,
said memory protection means and said arithmetic unit being responsive to introduce memory words from a main memory portion, and subcommand matrix and control means to control operation of said thin-film memory, said memory protection, said memory exchange and said arithmetic unit, said computer further comprising:

an interrupt base address register responsive to an interrupt to add an increment corresponding to the interrupt to determine the address in memory that contains an unconditional transfer instruction to transfer to a program area which contains a program to service the interrupt which has triggered off the operation, a power failure dump register comprising two sixteen-bit syllable registers to store contents of control flip-flops and of the interrupt register upon power failure, an interrupt dump register to in the event of a normal interrupt store control flip-flops.

57. A computer comprising an auxiliary thin-film memory, an arithmetic unit, memory protection means to keep memory addresses within predetermined bounds, memory exchange means electrically interconnecting said thin-film memory, said memory protection means and said arithmetic unit being responsive to introduce memory words from a main memory portion, and subcommand matrix and control means to control operation of said thin-film memory, said memory protection, said memory exchange and said arithmetic unit, said thin-film memory comprising:

a plurality of full number of bits syllable registers, a plurality of less than a full number of bits syllable registers, and a plurality of single and multiple full and less than full number of bits syllable registers, said plurality of lesser number of bit multiple registers comprising:

a first and a second program storage register, each program storage register comprising a plurality of said syllable registers lesser number than full number for each syllable, said computer being connectible with a main memory, said first program storage register comprising temporary storage means for loading a program into the computer and thence into the main memory and comprising means to temporarily store a program instruction-by-instruction in said computer for fast-access operation by the remainder of said computer, said second program storage register being responsive to a selected group of extended duration instructions comprising multiple and divide instructions where the memory addressing logic is not used in execution and where overlaps are performed.

58. The computer of claim 57 wherein said less than full number of bits multiple and single registers further comprise:

an interrupt program register comprising four syllable registers, said interrupt program register being operative upon an interrupt to store the contents of the register being used of said first and second program storage registers, a two syllable length real-time clock, means for incrementing said real-time clock every ten milliseconds, a repeat count register containing the number of times that a program is to be repeated for implementation of a repeat instruction in a program, a character count register to keep the character position being compared in a character search where scanning is effected to keep track of which character is currently looked at in the scanning process thereby to implement the character search instruction;

a thin-film C register comprising:

a plurality of assembled less than full number of bit syllable registers, said arithmetic unit having a C register, said thin-film C register being used in conjunction with said C register of said arithmetic unit, such that each time the less than full number of bits are accumulated in the C register they are transferred into the thin-film C register and the C register then proceeds to accumulate the next twelve bits, a full word total of four of the syllables being accumulated in said thin-film C register at the end of an arithmetic operation, and a plurality of repeat increment registers, each comprising a less than full number of bits syllable registers to hold the increment added to each of the memory syllables in a repeated instruction for implementation of said repeat instruction.

59. In a system comprising a main memory portion and at least one computer, the computer comprising:

a thin-film memory, a memory exchange section connecting said thin-film and main memory portion, and a subcommand matrix and controls section responsive to execute computer program instructions and cause operation upon data contained in said memories;

said thin-film memory comprising four stack registers, each of said stack registers comprising a memory word length word divided into four syllables, said stack registers being connected in a thin-film memory stack circular end around arrangement to provide a scratch pad memory addressed alternatively to addressing of said main memory during the course of program instructions, to thereby speed up machine operation by the fast-access thin-film memory provided.

60. The apparatus of claim 59, said thin-film memory having associated therewith in memory exchange association;

a read-write first and second portion combined thin-film memory register, said first read-write register portion comprising four bits and said second read-write register portion comprising twelve bits, a second four-bit, twelve-bit portion combined register to facilitate computer transfer to and from the main memory, a first adder connectible between said first and second four-bit registers, a second adder connectible between the said twelve-bit portions of said first and second portioned registers, said first adder adding the contents of said 4-bit registers together and said second adder adding the twelve-bit portions of said registers together, said computer comprising:

means to place the result of said addition into said second four-bit and twelve-bit portions of said second register, to thereby enable performance of address arithmetic, said thin-film memory further comprising a program address register and a base address register, one of said registers being added by said adders to the memory syllable to provide a true address in memory, a program count register, said adders further comprising means for incrementing said program count register.

61. A computer comprising:

a fast access, thin-film memory, said memory comprising a first section comprising a first plurality of full bit length registers and a second section comprising a plurality of less than full bit length registers, a full bit length thin-film buffer register, a multi-bit film address register, said film address register being of length to be directly encoded to address single address registers,
some of said thin-film memory registers being single-address registers,
the other thin-film registers comprising groups of single-address syllable registers to form multi-address registers,
said multi-address registers comprising:
at least one program storage register, and
a stack of four multi-address registers,
a program syllable address counter,
a stack address counter,
a syllable counter and
an input syllable counter,
subcommand matrix means to generate subcommands to set said thin-film address register to address the particular thin-film register called for by the address and to initiate the thin-film cycle,
a thin-film insert flip flop to determine in accordance with settings selectively write and read and thin-film not being used operation,
said buffer register comprising a first and second portion which buffer register portions together comprise the full number of bits length of said thin-film full bit length registers,
insert copy strobe means to effect transfer to and from said buffer register in accordance with read-write and read subcommands,
said program syllable address register causing addressing of the corresponding program storage register syllable register for transfer selectively therein and therefrom,
said syllable counter counting data syllables upon data transfer into and out of said thin-film registers,
said input syllable counter counting four syllable program memory words inserted into said thin-film memory,
said stack address counter counting to determine which of the four stack register level registers is currently at the top of the stack and accessible.

62. A computer comprising:
a memory protection unit to store upper and lower address limits within which data may be stored in a main memory, said memory protection unit comprising:
an upper bounds memory register and
a lower bounds memory register,
a first and a second adder, and
comparitor means to compare memory store addresses with the upper and lower bounds register contents,
said memory protection unit being responsive to permit storage only if the storage address is within the limits set by the bounds register,
said bounds registers being program loadable to store the bounds within which information can be written into memory and comprising a lesser amount of bits than the memory direct address bits, such that a predetermined number of memory direct bits only are compared.

63. The memory protection means of claim 62 and further comprising:
means to permit operation of said bounds registers only when said computer is operating in normal mode, and
interrupt register means responsive to said memory protection circuit in the event attempt is made to write out of the bounds provided by said upper and lower bounds registers, to inhibit write into memory.

64. In a main memory and computer system wherein said computer comprises:
an auxiliary fast-access memory portion,
a subcommand matrix and controls portion to generate subcommands and provide control functions responsive to programs executed by said computer,
an arithmetic unit, and
a memory exchange unit, said memory exchange unit comprising:
a thin-film memory buffer register,
a memory buffer register connectible between said thin-film buffer register and the main memory,
first and second address adders connected between said thin-film buffer register and said memory buffer register,
said memory exchange unit being program responsive to compute a direct address to be used when communicating with the main memory and to handle information when communicating either with the main memory or with said fast-access memory,
said fast-access auxiliary memory comprising a base address register to contain a direct address length base address of information in the main memory,
means to cause transfer of a lesser than direct address length memory relative address syllable to said memory connectible buffer register,
said arithmetic unit comprising a destination register,
said relative address lesser length syllable and said base address register contents being added in said first and second adders, to thereby add the relative and base addresses and store the result in said memory buffer connectible register,
said memory buffer connectible register comprising a compound register including a first plurality of bit positions, the contents of which represent a memory module address and a second multi-bit register to provide an in-module address,
fetching a word in memory occurring by fetching the lesser length syllable number of bits from main memory to the memory buffer register, computing the direct address and storing it in said memory buffer memory connectible register,
input into said memory connectible register occurring in parallel transfer a syllable at a time, syllable-by-syllable, syllables being serially transferred out in parallel bit groups into a computer destination register, each syllable following the least significant being transferred into said memory connectible buffer register and substantially, simultaneously the preceding syllable being transferred from the connectible register into said destination register, and
means to provide parity check after said transfer.

65. In a computer responsive to a main memory:
an auxiliary memory comprising a base address register,
a memory exchange unit,
a first auxiliary memory buffer register,
a second main memory buffer register,
said first auxiliary buffer register and said second main memory buffer register each being a complex register and comprising a 4-bit portion and a 12-bit portion,
a first address adder to add the contents of said first 4-bit first auxiliary memory buffer and second main memory buffer register portions,
a second address adder to add the contents of said 12-bit first auxiliary buffer register and said 12-bit second main memory buffer register portions,
said first and second adders being electrically connected respectively between said 4-bit portions of said first auxiliary and second main memory buffer registers and the 12-bit portions of said first auxiliary and said second main memory buffer registers,
said memory exchange unit enabling computing a direct address when communicating with the main memory and handling information when communicating either with said auxiliary memory or with the main memory, means to compute the direct address required for fetching information from the main memory to the computer and for storing in the main memory from the computer, said direct address computing means comprising means to transfer a 12-bit memory relative address syllable to said second memory buffer register, means to transfer 16-bit base address contained in said base address register to said auxiliary memory buffer register, said adders adding the relative address in said main memory buffer register to the base address in said auxiliary memory buffer register, the result being stored in said main memory buffer register to thereby form a 16-bit direct address in said main memory buffer register, the most significant 4 bits in said first portion of said main memory buffer register representing a memory module address and the remaining 12 bits which appear in the second portion of said main memory buffer register representing an in-memory-module address.

66. The computer of claim 64, said auxiliary memory comprising a fast-access thin-film memory including means connectible to said thin-film memory buffer register.

67. The apparatus of claim 65 including:

an arithmetic unit comprising a register acting selectively as a destination and a source register, means operative to fetch a word comprising 48 bits plus a parity bit in 12-bit syllables in serial-parallel fashion, 12-bits at a time, syllable-by-syllable from the main memory to the computer, said means comprising means to request access to main memory in the particular memory module whose 4-bit address is contained in the main memory buffer register, means to transfer the memory word at said address addressed in main memory to said main memory buffer register in four sequential clock times with the least significant syllable entering first, means to transfer the contents of said memory buffer register syllable-by-syllable as each syllable following the least significant syllable is transferred into said memory buffer register so as to transfer the preceding syllable from said memory buffer register to a computer destination register, means to check parity during a 5th clock time;

means to store a word in the main memory, said last-named means comprising means to transfer syllables from said main memory buffer register to to the memory modules, transferring out the least significant syllables in least significant syllable to most significant syllable order successively from the computer source register to said main memory buffer register and thence to memory, and means to send parity as a 5th, last-written syllable.

68. In a system comprising a main memory portion divided into modules and a computer: said computer comprising a first auxiliary and a second main memory buffer register, a fast-access auxiliary memory portion to store a base address syllable, means to compute a direct address to be used when communicating with main memory and to handle information when communicating either with the main memory or the fast-access memory, said means comprising means to compute a full multibit direct address whenever information is to be fetched from the main memory to the computer and stored in the main memory upon transfer from the computer, said last-named means to compute said multibit direct address further comprising:

first means to transfer a lesser than direct address comprising a relative address syllable to the first auxiliary memory buffer register and a base address syllable from the fast-access memory to the second main memory buffer register, means to add the relative and base address, means to store the result in the main memory buffer register, a predetermined number of most significant bits representing a memory module address in the main memory and the remaining bits representing an in-memory-module address, means to gain access to said memory module address, means to transfer said memory word at the location addressed into said main memory buffer register in serial-parallel syllable fashion with the least significant syllable being transferred first, means to transfer the remaining syllables in successive clock times, means acting substantially simultaneously with transfer of significant syllables into said main memory buffer register, to transfer the proceeding syllable from the main memory buffer register to a destination register, means to check parity in the clock time after transfer of all syllables of a memory word into said main memory buffer register, said transfer means being for fetching operation, and for storing following gaining access by transferring from a computer source register successive syllables into said memory buffer register and into said memory module addressed, said computer still further comprising means to transfer syllables out of said source register into said memory buffer register as preceding syllables are transferred into said memory register in serial-parallel syllabic transfer.

69. In a computer system comprising a shared main memory module and a computer, said computer comprising:

a fast-access auxiliary memory, a memory exchange unit, an arithmetic unit and a subcommand matrix and controls unit to furnish timing and control for computer operation, said subcommand matrix and controls unit comprising a timing distributor to provide the basic clock pulse to operate said computer, memory time counter means to operate the memory module referenced to temporarily slave it to the computer when reference is made to main memory for fetch and store operations, and a phase distributor to enable selection of the order in which operational phases of operating the computer occur.

70. The computer of claim 69, said computer being responsive to program words comprising strings of syllables, the first syllable of which is an operator syllable, said subcommand matrix and controls unit further comprising:

a multiply-divide counter to control the number of shifts to be executed during an instruction and in particular the number of add and subtract cycles during multiply and during divide operations, a function register to hold the operator syllable of a program controlling said computer, said syllable comprising a six bit instruction field plus three two-bit address indicators, a syllable register to store the program index syllables in the event of indexing, and to store variant syllables, said variant syllables being program syllables used to modify a program instruction at the time being held in said function register.

71. The apparatus of claim 69, said subcommand matrix and controls unit further comprising an interrupt register responsive to external and internal interrupt conditions, control mod flip-flop means to cause said computer to operate selectively in a normal mode and a control mode, said interrupt register comprising a plurality of bits each set when a corresponding interrupt condition occurs, interrupt routine jump means responsive to setting of said interrupt register to transfer control to another program area, and entry into an interrupt routine to cause setting of said control mode flip-flop and entry into the control mode.

72. A computer comprising:

a subcommand matrix and controls unit, an arithmetic unit, a multiply-divide counter electrically connected between said subcommand matrix unit and said arithmetic unit, said multiply-divide counter comprising a six-bit flip-flop register for mechanization of certain arithmetic instructions, means to operate said register as a shift counter during shift operations, said multiply-divide counter comprising means responsive to said subcommand routine and controls unit to decrement by one, six and twelve and to stop upon reaching zero, said arithmetic unit comprising an A register responsive to signals of said multiply-divide counter to shift to the right selectively, one, six and twelve bits at a time, and to shift left one bit at a time automatically in accordance with ranges of the count in said multiply-divide counter, said multiply-divide counter being responsive to character search instructions to count up one count at a time.

73. A computer comprising:

a subcommand matrix and controls unit to generate subcommands for implementation of instruction applied to the computer in a program, said subcommand matrix and control unit comprising a function register, a T timing distributor, said T timing distributor comprising:

a fifteen-bit shift register, a six-bit phase distributing register and a memory timing counter for timing control for data transfer between external memory modules and said computer, said subcommand matrix further comprising a plurality of decoders responsive to said timing distributor, said phase distributor, said memory timing counter and the decoded output of said function register, to generate subcommands for implementation of computer instructions, said subcommands being made up primarily from the function register and said timing and phase distributors to implement commands in the program.

74. The apparatus of claim 73 wherein:

said phase distributor comprises six flop-flop circuits and an additional phase means to set a zero phase, said flip-flop circuits representing phases one through six, said phase distributor being responsive to set only one phase at a time, moving from phase to phase, jump subcommand means to provide moving from phase to phase of said phase distributor, the jump subcommand being timed in accordance with an instruction being executed, when a jump subcommand is given, a reset phase signal occurring providing reset of each of the phase flip-flops, said T timing distributor fifteen flip-flops providing T time intervals from T1 to T15, only one of said timing distributor flip-flops being set at a time, and means selectively to normally set said timing distributor sequentially and to cause a jump non-sequentially to some other T time.

75. A computer comprising:

a fast-access auxiliary memory, said auxiliary memory comprising a plurality of storage and a plurality of control registers, an arithmetic unit, memory exchange means and a subcommand matrix and controls section, said subcommand and matrix and controls section comprising a control mode flip-flop to enable selective control and normal mode operation of said computer, said arithmetic unit comprising an A register, a B registor, a first C register, and an adder, said B register comprising a destination and source register for second operands of instructions, said A register comprising a first operand destination and source register in instruction execution, a carry flip-flop set upon overflow out of said arithmetic unit adder and reset with no overflow out of said adder and means to couple said auxiliary memory, said arithmetic unit, and said memory exchange means to be responsive to said subcommand matrix and controls section and to effect transfer and control of said registers and said adders and said carry flip-flop of said arithmetic unit, said fast-access memory further comprising a second auxiliary C register operating in circularly transferring arrangement with said first C register in double shift operation.

76. The apparatus of claim 75, said auxiliary memory comprising a first and a second program storage register, each register comprising a plurality of syllable registers, a program syllable address counter to determine which program storage register syllable is next fetched, said counter normally being set to the most significant syllable of the first program storage register as next to be fetched, said counter being decremented to permit fetch of the next most significant syllables of said program storage registers in order, said counter being decremented when said program storage register stores and unused program word and overlay has occurred to fetch in most significant order the syllables from said second program storage register, said program syllable address counter being reset to said most significant syllable of said first storage register count when said second storage register is empty and there has been an overlap.

77. The apparatus of claim 76, said subcommand matrix and controls unit further comprising a phase distributor to activate phases of execution of instructions, said fast-access memory further comprising a stack comprising four stack level registers, each of said stack level registers comprising four syllables, a stack address counter to determine which of said four stack level registers is currently at top of the stack, an up-down flip-flop to provide selectively reversal of stack and forward stack, an overflow flip-flop unit comprising a first flip-flop set when program overflow occurs and arithmetic result is too large to be represented, a second under flow flip-flop set when program underflow occurs when the floating point results are too small to be represented and a program not normalized flip-flop set when selectively either and both operands are a floating-point instruction not normalized, a command control flip-flop unit comprising interrupt power failure, update real time clock, enter control mode, repeat, and iterate flip-flops, a multiply-divide shift counter to cause shift in said arithmetic unit, a first and a second program full flip-flop, each program full flip-flop being set for a one of said program storage registers when it has unused syllables of program word to indicate when all four syllables of said program storage registers have been used to enable transfer of another word from memory therein, a timing distributor to determine decimal T times for execution of instructions, and a memory timing flip-flop counter to slave external main memory modules temporarily for fetch and store operations.

78. The apparatus of claim 77, said subcommand matrix and control unit further comprising a miscellaneous control unit comprising:

a flip-flop set when the contents of said arithmetic unit A register are equal to the contents of the top of the stack to enable omission of transfer therebetween and save time of such transfer, a branch flip-flop to provide program branch when conditions for branch have occurred, an indirect address flip-flop set when an indirect address is called for, a plurality of master control flip-flops providing for internal control conditions to which selected subcommands are responsive to be set up, an input syllable counter for inserting a four syllable memory word from an external memory into said fast-access memory, a fast-access memory insert flip-flop set for write into fast-access memory and reset for fast-access memory read and not being used condition, a memory control flip-flop unit comprising:

a request flip-flop set when said computer request access to the external memory, at least one IO flip-flop comprising an IO flip-flop set upon an IO descriptor request to an input-output control module bus A, and a parity flip-flop set in accordance with parity and non-parity conditions.

79. A computer comprising:

an arithmetic unit comprising an A and a B register, a subcommand matrix and controls portions, an auxiliary memory comprising:

a program storage register to temporarily hold program instructions and a stack to temporarily hold data, said computer including means to communicate with a main memory, said subcommand matrix and controls portion comprising a function register, a phase distributor, and a timing distributor, said computer being adapted to execute program instructions in accordance with the phases provided by said phase distributor, each instruction using at least one and not more than six phases, individual phase executing portions of instructions so that different instructions are fully executed in different predetermined numbers of phases, a progression being made in sequence from phase one, to phase two, to phase three, to phase four, to phase five, and then to phase six, with omissions of phases according to particular instructions, the operator syllable being fetched from said program storage register and stored in said function register in the first phase, coding means responsive to the syllable in said function register to determine the instruction to be executed, selectively one of:

first an operand selectively being fetched from main memory and from said stack and stored in said arithmetic unit A register, second a result selectively being stored in the main memory and in the stack, third a branch program word being fetched from the main memory and stored in said program storage register, and fourth a special syllable being fetched from said program storage register and stored in an appropriate working register;

the execute portion of certatin instructions being carried out in said phase three, the second operand of an instruction being fetched selectively from main memory and the stack and stored in said arithmetic unit B register, certain instructions being executed in phase five, in phase six depending upon the instruction selectively;

first storing a result from said A register, second fetching a branch program word from the main memory and storing this branch program word in said program storage register, said phase distributor comprising six phase flip-flops each set for the corresponding phase operation by the successful completion of a previous phase, said timing distributor in each phase implementing each sequential step of the phase, said timing distributor being reset at the end of each phase to time T1, said timing distributor comprising a shift register of fifteen flip-flops corresponding to times T1 to T15, said timing distributor operating at the computer clock rate to determine length of each T time, means associated with said timing distributor to cause remaining in a specified T time in order to jump into a memory cycle to fetch a program word and store the program word in said program storage register, said timing distributor associated means comprising means for inhibiting said timing distributor shift register from shifting for the desired number of clock pulses necessary to accomplish the execution of the particular function desired, a memory timing counter operative in conjunction with the timing distributor to cause proper timing of fetchin a program word from memory, said memory timing counter each time counting up one decoding time to hold said timing distributor at a particular time.

80. A computer connectible to a main memory, said computer comprising:

means to operate said computer in phases, gating means, a temporary and erasable memory portion comprising, a first and second multisyllable program storage register, a multilever register operand stack, each level register being a multisyllable register, an arithmetic unit comprising an A and a B register and gates thereto and therefrom, a program syllable address counter to address in sequence the syllables of said program storage registers, a program register full flip-flop for each program storage register to determine which program storage register is in use and to determine if said program storage registers are full, said program full flip-flops when in reset condition providing the signal for necessary fetching of a new program word from memory,
said stack normally containing data words only,
an input syllable counter to count the syllables entering into the program storage register from the main memory, to insure that the least significant syllable is received from the main memory first and stored in the least significant syllable portion of said program storage register,
a program syllable address counter to enable fetching in most significant syllable down order from said program storage register,
a syllable counter to count the syllables of data words selectively fetched and stored from and into the memory and said stack, in accordance with the instruction words and the determination of which operand is being fetched and stored,
a timing distributor causing timing output to determine the phase of the operand required to provide opening of said gates into said respective A and B registers in accordance with whether phase 2 or phase 4 operands are required,
a stack address counter to determine which one of the four stack registers is involved in a fetch or store operation at a given instant, the involved stack being directly under writing and reading means, said stack counter being counted in a clockwise direction in store operations wherein counting is effected from stack 1 to stack 4, to stack 3 and then to stack 2, counting being effected in a counterclockwise direction, normally when a fetch operation is called for and thereby counting from stack 1 to stack 2 to stack 3 and to stack 4 respectively,
a seven-bit temporary and erasable memory address register, the most significant three bits of the stack address being encoded in said temporary and erasable address register when addressing stack,
the next two bits being made up with said stack address counter, and the last two bits which vary from zero to three being made up with said syllable counter, every time data is transferred into and out of said arithmetic unit, said syllable counter being stepped up accordingly to regulate transfer of proper significance of syllables between said A register and the stack syllable registers of said stack registers,
subcommand matrix means to generate an address stack signal and temporary and erasable memory address gating means to cause the first three flip-flops in said temporary and erasable address register to become set to the state necessary to address said stack.

81. A computer comprising:
an arithmetic unit and,
means to control said arithmetic unit,
said arithmetic unit comprising a four syllable A register,
a four syllable B register,
an adder interconnected between said A register and said B register,
a one syllable C register,
field selection logic means and,
special shift data paths associated with said A register,
said A register storing the augend, minuend, product or dividend during respective add, subtract, multiply and divide operations,
said B register storing addend, subtrahend, multiplicand, and divide during respective add, subtract, multiply and divide operations,
said C register storing the multiplier and quotient during respective multiply and divide operations,
said A register being shiftable in optimum combinations of twelve, six and one places to the right and iteratively to the left,
said B register being shiftable iteratively to the right by twelve places,
said C register being shiftable iteratively selectively left and right by one place,
means to effect transfers a syllable at a time serially a fixed plurality of times for total of bits necessary to form a word, said transfer comprising serial-parallel transfer of a syllable, the number of syllables necessary to make a word,
said transfer being effected such that said A register and B register receive the least significant syllable first and shift along a syllable at a time as subsequent transfers into said registers are effected, and means to cause the results to end up in said A register for transfer into storage.

82. The computer of claim 81 and further comprising:
a thin-film memory, said thin-film memory comprising a stack responsive to operate in conjunction with a main memory,
the result at the end of any operation selectively ending up in said thin-film memory stack and in said main memory,
said control means comprising a function register to determine transfers selectively into stack and into main memory,
stack counter means to determine into which stack the arithmetic result from the A register is transferred,
said function register being operative to determine the address in memory upon memory transfers to which transfer from said arithmetic unit is to be effected,
said C register accumulating data during the arithmetic operations,
said thin-film memory further comprising a thin-film C register of storage capability to hold a full word, and divide into syllable registers,
said thin-film C register being adapted to hold the multipliers for a multiply instruction, and upon using a syllable of the multiplier upon transfer of said syllable into the thin-film C register,
means whereby it simultaneously retrieves the next syllable from said C register to provide a circular transfer wherein the unoperated portions in said thin-film C register are transferred into said C register, and upon operation the results are transferred back from the C register into said thin-film C register,
means to implement a double shift instruction,
said C register and said thin-film C register operating such that said B register is used as a double register for the double word length required in double precision arithmetic,
said adder being operative to complement said A register to produce the sum and operating on a carry by two scheme,
said shift data path logic providing means to control end-around data paths for each variation of the shift instructions.

83. A computer comprising:
means to execute a program,
said program comprising instruction words of a variable syllable string,
each syllable of said syllable string comprising twelve bits,
said syllables including operator syllables, index syllables, variant syllables which are variations of the command syllable and address syllables,
said operator syllable comprising a six bit command and three two bit address indicators,
said address indicators being in accordance with a code wherein 00 indicates stack or no address with normal stack stepping, 01 indicates operand reference to stack and stack hold, 10 indicates an unindexed syllable follows, and 11 indicates that an indexed syllable follows,
a plurality of index registers, said index syllable comprising three four-bit index register addresses of index registers to be added to the address syllable, said computer further comprising an auxiliary memory,
said memory comprising a base address register,
said index register addresses being added to an address syllable plus the contents of the base address register as determined by the address indicators of the operator syllable to indicate whether there is an index address to be added,
said syllable string comprising where indicated said operator syllable followed by the first address syllables which comprises the index syllable where called for by the first address indicator and then the address syllable where called for by the first indicator, then followed by the second index syllable where called for by the second indicator and then followed by the second address syllable where called for by the second indicator of the first operator syllable, then followed by the third index address where called for by the third indicator in the operator syllable and then followed by the third address syllable where the third address syllable is called for by the third indicator, said instruction format thereby having a maximum of seven syllables comprising the operator syllable and a maximum of three address syllables, each of which address syllables may be preceded by an index syllable for a maximum of three index syllables to execute an instruction,
said auxiliary memory further comprising a base program register and,
a program count register,
reference from said base program register being made to determine the direct address in memory of program instructions,
said program counter determining the count of the instruction for sequencing of program instructions.

84 The computer of claim 83,
said auxiliary memory further comprising:
a first and a second program storage register, subcommand matrix and control unit means comprising a program syllable address counter to address the program syllable to be read out of said program storage registers,
a first and a second program fill control flip-flop responsive to unused syllables and empty conditions of program word content in said program storage registers to where empty initiate transfers of new instructions to said program storage registers as needed by each,
a memory request flip-flop responsive to need for program fill to request a main memory for the next instruction required,
means to transfer main memory contained instructions into said program storage register, in least significant to most significant syllable order,
said second program storage register being responsive to be activated when a program overlap condition exisits in the execution of a long instruction.

85. The computer of claim 84,
said computer further comprising:
an auxiliary memory buffer register,
said subcommand matrix and control unit comprising means responsive to operator syllable commands to read from said first program storage register into said auxiliary memory buffer register, the most significant syllable being used and transferred out of said program storage register first,
said program address counter in said subcommand matrix and control system thereby counting down as program syllables are used,
a function register, said syllables being transferred from said auxiliary buffer register into said function register,
said subcommand matrix and control unit comprising means to decode the contents of said function register to determine selectively that data is to be brought from memory and stack and when brought from memory selectively that the address is to be indexed and not indexed and when brought from stack to determine that the stack counter is to be stepped and held.

86. The apparatus of claim 83,
said auxiliary memory being a fast-access thin-film array of control and data registers,
a thin-film buffer register,
said computer comprising further an arithmetic unit including an A register,
said thin-film registers comprising an operand containing stack,
said stack comprising, first, second, third and fourth stack registers,
a stack counter to step said stack in direction and sequence such that for read operations operation is read and stepped and for write operations the operation is stepped and then written, step stacking being in opposite directions for read and write,
means to effect stack normal and stack hold operations,
said stack counter being counted in stack normal operations and not being counted in stack hold operations,
said stack counter indicating which stack register is currently addressable as the register at the top of the stack,
a stack syllable counter to address the syllables within a particular stack address,
transfer occurring upon stack syllable counter indication a syllable at a time into said thin-film buffer register from said top of stack register and thence into the most significant end of said A register in said arithmetic unit,
said syllables being shifted in succeeding transfers from succeeding stack register syllables into said thin-film buffer register and then into the most significant syllable position of said A register, said A register being shifted down concurrently with transfer thereinto.

87. The apparatus of claim 83 including:
means responsive to said address indicators to indicate a memory operation,
said auxiliary memory comprising a program storage register,
a memory exchange comprising a first auxiliary memory buffer register and a second memory buffer register,
said program syllables upon the indicators indicating memory operation being read from said program storage register into said first buffer register,
said address syllable comprising an 11-bit address plus an indirect address bit, the 11-bit address being transferred to the least significant 11-bit positions of said second memory buffer register,
an indirect address flip-flop to which said indirect address bit is transferred,
said base address register contents comprising 16 bits, said 16 bit contents being read into said first buffer register,
adder means connected between said first auxiliary memory and said second memory buffer registers to add said 11-bits in said second memory buffer register to the 16 bits from said base address register and place the sum into said second memory buffer register,
said memory buffer register thereby comprising 4 most significant bits comprising a memory module address and 12 lesser significant bits comprising the address within the memory module being addressed, to thereby enable initiation of transfer from memory,
an A arithmetic unit register into which said transfer is directed,
the data in the memory address addressed being transferred from said memory into said second memory buffer register in 12-bit syllables at a time, 4 times per word and being transferred therefrom into said A register in a parallel 12-bit transfer, 4 times serially until said A register contains said memory word, said A register being adapted to provide shifting down each of the four serial times.

88. The apparatus of claim 87 including:

indirect address means responsive to said indirect address bit being a one, indicating an indirect address whereupon said 12 least significant bits upon receipt from memory are transferred to said first buffer register, as the next least significant 12 bits are transferred into said second memory buffer register, the four least significant bits of said next least significant 12 bits are transferred to said first auxiliary memory buffer register most significant 4 bits, when said 16 bits are accumulated in said first buffer register, transfer being effected down to said second memory buffer register, said memory being again requested until when there is a direct address the contents of said memory buffer register are emptied into said A register, to thereby provide repeated action wherein when there is a direct address, the contents of said memory buffer register are emptied into said A register and when there is an indirect address as indicated by the indirect address bit, the least significant 16 bits of the memory address are accumulated in said first auxiliary memory buffer register to constitute the next memory address which may be selectively a direct address or an indirect address, finally, when the address selected is direct, the contents of said second auxiliary buffer register being transferred to said second memory buffer register and the data being fetched from that memory address and put in said register.

89. The apparatus of claim 83, said computer further comprising an auxiliary memory and a memory buffer register, a subcommand matrix and controls unit, said subcommand matrix and controls unit comprising a syllable register, and an indirect address flip-flop, when the first address indicated is that of a memory address which is indexed, the first syllable after the operator syllable is fetched from said program storage register and transferred via said auxiliary memory buffer register into said syllable register, the next program syllable then is fetched and placed into said first auxiliary memory buffer register, the next syllable comprising an 11-bit address and a one bit indication of indirect or direct address, said 11 bits being transferred to said second memory buffer register and, the indirect address bit being transferred into said subcommand matrix and control unit indirect address flip-flop, said base address register comprising a 16 bit register and having its 16 bit contents transferred into said first auxiliary memory buffer register and added to the contents of said second memory buffer register, the result being placed in said second memory buffer register, said syllable register contained index syllable comprising three index register addresses out of a plurality of index registers in said auxiliary memory, the contents of said index registers being added to said second memory buffer contents and the result being placed in said second memory buffer register and henceforth operation occuring to take the combined address and fetch the corresponding syllable from the main memory and store this syllable in said A register.

90. The apparatus of claim 83, said auxiliary memory comprising:

a first and a second program storage register, said computer comprising further, a first auxiliary memory buffer register and a second memory buffer register, a function register operating to decode syllables in conjunction with the address indicator bits of said operator instructions, said variant syllables being syllables which modify the data and provide additional data for the execution of the instructions, said computer further comprising means causing reading from the appropriate register of said program storage registers to said first auxiliary memory buffer register and thence to said second memory buffer register, means to selectively index and not index said variant syllables, and syllable register means into which the variant syllables are transferred from said second memory buffer register to enable instruction execution of the variant syllables.

91. A computer responsive to program instructions to execute said instructions in a sequence of operations in specific phases, said computer comprising:

an arithmetic unit comprising an A and a B register, phase distributor means to generate the phases, timing means to generate a sequence of pulse times within said phases and memory timing means responsive to said timing means to coordinate memory timing of an external main memory with said computer timing, a subcommand matrix and controls section to interpret each command of each instruction and to set up the predetermined sequence of operation in the phases, a fast-access memory comprising a program storage register and an operand stack, said subcommand matrix and controls section comprising a function register, means operative during said first phase to transfer the operator syllable of an instruction from said program storage register to said function register, and means to decode the operator syllable in the function register to determine the succession of phases to follow, said decoding means comprising gates of said subcommand matrix and controls unit to determine whether the jump occurs at time T1 of phase 1 or time T1 of phase 2, means operative in phase 2 which depending upon the instruction selectively, first, fetches an operand from the main memory or from said stack and stores it in the A register, second, stores a result in the main memory or said stack, third, fetches a branch program word from the main memory and stores it in said program storage register, and, fourth, fetches a special syllable from the program storage register and stores it in an appropriate working register, means to execute instructions in said third phase, phase 4 means operative similar to said second phase means to fetch the second operand selectively from the main memory and the stack and store it in said B register, phase 5 means reserved for the execute portion of certain instructions, and phase 6 means operative to selectively first store a result from said A register and second fetch a branch program word from the main memory and store it in said program storage register.

92. Apparatus to execute program instructions comprising:

means to divide execution into a plurality of phases comprising phases 1, 2, 3 and 4 and means to control operations within said phases in times comprising time T1 and additional times, a fast-access program storage register to temporarily store the program instructions, at least some of the program instructions comprising operator syllables, a function register, means operative in phase 1, to transfer subject to interrupt conditions in which case servicing of the interrupt condition is effected, the operator syllable of one of said instructions from said program storage register to said function register;

means to decode said instruction to determine the succession of phases to follow, means selectively in phase 2 to fetch an operand, to store a result and to branch respectively, a stack, an arithmetic unit, said arithmetic unit comprising an A register, said phase 2 operand fetching means comprising means to determine whether a stack or memory transfer fetch of the first operand is to be effected, means selectively, upon determining a stack to transfer the operand from the stack to the arithmetic unit, and upon determining a memory fetch to compute a memory address, means responsive upon determining the address in main memory to transfer the operand to the arithmetic unit and to determine if the instruction is a branch on bit, a convert binary to floating point or logical complement and means responsive selectively if not one of these to jump to time T1, phase 4 and if such an instruction to jump to time T1, phase 3 means operative in the event that the phase 2 operation is a result store, to determine if the instruction is a clear A or a store external request;

means operative when a store external request to transfer the external request lines to the A register, means operative where a clear add and store external request is absent to then determine whether a stack or a memory and when determining a stack store, to store the A register contents in the stack and when determining a memory, to compute the memory address, and thence to store the A register contents in main memory, means operative following storing the contents of the A register selectively in the stack and in the main memory to execute a jump to time T1, phase 1, means operative in the event that the phase 2 operation is a branch to compute the memory address of the branch program, to transfer the branch program word from main memory to the program storage register routine and, to jump to time T1, phase 1.

93. The apparatus of claim 92, the interrupt conditions upon which fetching the operator is contingent comprising absence of power failure, absence of pseudo-interrupt to update the real-time clock, no other interrupt, no repeat, and no fill required, said apparatus comprising a non-volatile thin-film memory means and a plurality of control flip-flops, means to service and interrupt conditions comprising:

means operative in the event of primary power failure to store in said non-volatile thin-film memory means, the contents of all control flip-flops necessary to restore computation from the interrupt point, and to execute power failure return upon correcting of conditions, said thin-film memory means comprising two real-time clock registers, said apparatus further comprising means operative in the event of real-time clock interrupt occurring when the two real-time clock registers have reached their maximum count, and in the event of predetermined other interrupts to perform interrupt servicing comprising, means to sense said interrupt condition, means to implement an interrupt routine jump to establish the control mode of the computer, means to execute an interrupt routine, and then to execute an interrupt return routine instruction for return to normal mode;

means operative in the event of a repeat instruction, to execute a repeat method, and means operative in the event of fill to perform required executing operations to fill the program storage register from main memory.

94. The apparatus to execute program instructions and to operate in phases of claim 92 and comprising further, means to execute portions of instructions requiring phase 3 operations during phase 3, means to perform selectively operand fetch, result store and branch operations in accordance with the instruction required in phase 4, said phase 4 operand fetch means comprising means to determine if the fetch is from stack or memory and where a stack, to transfer the operand from the stack to the arithmetic unit and where a memory, to compute the memory address and where an operand, to transfer the operand from main memory to the arithmetic unit, means to determine whether a floating instruction after the transfer to the arithmetic unit has occurred and where the instruction is a floating instruction to execute a jump to time T1 of phase 3 and where a floating instruction is absent to execute a jump to time T1 of phase 5, said means to execute said phase 4 result store comprising means to, determine if a stack or memory and where a memory, to compute the memory address, to store the A register contents in main memory and where a stack to store the A register contents in the stack, means operative after said store A register routine to determine if the instruction is one of a convert binary to floating point, a logical complement, store thin-film and transmit instruction and accordingly where one of these instructions is present, said apparatus comprising means to jump to time T1, phase PH1 for the end of the instruction, and where these instructions are absent, to determine whether a branch on bit instruction is present and, where present responsively to jump to time 1 of phase 6;

where said phase 4 operation step is a branch, to compute the memory address and to perform the branch program word routine and successively to transfer the branch program words from main memory to the program storages register, then to jump to T1 phase 1, and thence to execute phase 6 for store and branch for three-address instructions comprising:

where a phase 6 result store, means to determine whether a store in stack or memory, and when memory to compute the address, and to store the contents of the A register in the main memory and when a stack store, to store the contents of the A register in stack, where said phase 6 operation is a phase 6 branch to compute the memory address of the branch program first word and subsequently to transfer this branch program word from the main memory to the program storage register and to execute a jump to time T1, phase PH1, to end the instruction.

95. In a system having a memory and a computer, said computer comprising means to operate in a *plurality* of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said fill comprising:

a fast-access program storage register, means to transfer a program word from the memory to said fast-access program storage register to reduce syllable access time, said fill of program storage being required whenever the least significant program syllable has been read out of the program storage register for use in instruction execution, said means to perform said indexing comprising means to combine a plurality of partial index addresses with a sylable from the program storage register to provide an index syllable, said means to perform said indirect addressing comprising:

means to examine a memory relative address syllable for an indirect address, an indirect address indication bit means, a base address register, means to add a base address stored in said base address register to the memory relative address less the indirect address indication bit to provide an indirect address, and, means to store said last-named indirect address for additional processing, said means to perform said memory address computing process comprising means to compute a direct address whenever desired to selectively fetch and store in memory and to fetch a branch program word from memory, said means to provide said operand fetch and store-result comprising means to fetch an operand and to store a result, said means to perform said branch comprising means to fetch a branch program word from the memory.

96. In a system having a memory and a computer, said computer comprising means to operate in a plurality of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said fill comprising:

a program storage register, means to fill the program storage register whenever the least significant program syllable has been read out for use in instruction execution, a program fill flip-flop, a storage counter to address said program storage register to read out said least significant program syllable and means to simultaneously reset said program fill flip-flop corresponding to said program storage register to generate a fill signal used to initiate the fill, said means to perform the fill further comprising, means to jump to a predetermining memory time, a program counter register, means to fetch a current program count from the program count register, means to increment the program count, means to address the next program word in main memory with said incremented count, means to store said incremented count back into the program count register to record the current program word stored in said program storage register, means to gain access to main memory, means to obtain the program word from main memory, an input syllable counter to provide counting means to store a program word in said program storage register in least to most significant syllable order, means operative when fill is completed, to set said program fill flip-flop and to jump to memory time zero, the program fill flip-flop thus being set enabling said fill signal to disappear and computer timing to resume.

97. In a system having a memory and a computer, said computer comprising means to operate in a plurality of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said indexing comprising:

a program storage register, a syllable register, a plurality of index registers, a first memory buffer register and a second fast-access memory buffer register, means to transfer and index syllable from the program storage register to said syllable register, means to transfer the syllable to be indexed from the program storage register to said first memory buffer register, means to address index registers corresponding to the index syllables which are not zeros, means to transfer the contents of the index registers being addressed to said second fast-access memory buffer register, means to add the syllable in the second fast-access memory buffer register and the syllable in the first memory buffer register, and to successively add the contents of registers denoted by additional index syllable addresses such that at the end of the indexing the first memory buffer register contains a number representing the sum of the syllables to be indexed plus the contents of the preselected index registers.

98. In a system having a memory and a computer, said computer comprising means to operate in a plurality of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said indirect addressing comprising:

an indirect address flip-flop, means to examine the first most significant bit of a 12-bit memory relative address syllable, and responsive to said last-named bit being a one, to set said indirect address flip-flop to indicate that the sixteen bit address being formed is an indirect address, a base address register to contain a 16-bit address, means to add the 16-bit base address in said base address register to the memory relative address except for the first bit of the relative address and to inhibit this first bit from being added, a first memory buffer register to store said 16-bit indirect address result for use upon entry into memory timing, a second fast-access memory buffer register, means operative at a predetermined memory time, to transfer the least significant memory syllable of the indirect address to said first memory buffer register, and to simultaneously transfer the relative address syllable from said first memory buffer register to said second fast-access memory buffer register and to transfer the next least significant memory syllable to said first memory buffer register, said syllable now in said first memory buffer register comprising a 4-bit module address plus the indirect address indicator which is the eighth most signficant memory buffer bit and the snag bit which is the seventh most significant memory buffer bit, means to transfer the four bit memory module address from the first memory buffer register to the second fast-access memory buffer register, means to transfer the indirect address indicator eighth bit of the first memory buffer register to said indirect address flip-flop to reset said flip-flop if said eighth bit is a zero, an interrupt register, means responsive to the snag bit comprising the seventh bit of said first memory buffer register being a one, to set a bit of said interrupt register, means operative where said eighht memory buffer register bit is a one, to store in the first memory buffer register a sixteen bit indirect address whereas when said eighth buffer register bit is a zero, to store a direct address in said second fast-access memory buffer register, means to effect delaying, means to check parity, means ot reset said first memory buffer register, and means to jump memory timing to zero, means to effect repeating of the process where said indirect address flip-flop is in one state and the sixteen bit address in the second fast-access memory buffer register is therefore an indirect address, and where said indirect address flip-flop is a zero to effect continuing of computer time.

99. In a system having a memory and a computer, said computer comprising means to operate in a plurality of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said memory-address-compute comprising:

means to perform selective computation for operand fetch and result store and for a branch, said means to perform said memory address compute for operand fetch and for result store comprising a program storage register, a program storage address counter, a first memory buffer register, a second fast-access memory buffer register, a master control flip-flop, a base address register, and an indirect address flip-flop, means operative if a repeated instruction to determine whether the operand is referenced to stack wherein computation is unnecessary, whether a fill is required wherein a fill routine is gone through, and in the event of none of these occurring, means responsive thereto to address said program storage register with said program storage address counter, means to determine whether the syllable is to be indexed, and where not to be indexed, means responsive thereto to transfer the memory address syllable from the program storage register to said second fast-access memory buffer register, means to reset said first memory buffer register and said master control first flip-flop, means to transfer the base address in said base address register to said second fast-access memory buffer register, means to examine for an indirect addres, and if an indirect address, to transfer the memory address syllable from said second fast-access buffer register to said first memory buffer register, but to inhibit the transfer of the first bit, and to transfer this first bit to the indirect address flip-flop, means to add the base address to the memory address syllable and to store the result in said first memory buffer register, means to examiner the indirect address flip-flop, means to initiate indexing where required, means to initiate indirect addressing under the said indirect addressing process where required, and to perform the indirect indexing process where required, following which a sixteen bit direct address selectively of the operand and result store is in the first memory buffer register.

100. In a system having a memory and a computer, said computer comprising means to operate in a plurality of phases and means to execute functions required in said phases for selectively performing processes as required, said last-named means to execute functions comprising means to perform a fill, means to perform indexing, means to perform indirect addressing, means to perform memory address computing, means to perform an operand fetch and store of a result, means to perform a branch, said computer comprising computer and memory timing means including means to effect delay and jumps in timing, said means to perform said memory-address-compute in the case of a branch comprising:

means to examine for repeated instruction and for fill, and to initiate repeat and fill when required, a first memory buffer register, a second fast-access memory buffer register, a first master control flip-flop, a base program register, a syllable register, a phase 4 branch flip-flop, a second branch flip-flop, a program, an address counter to address said program storage register, means to determine whether a syllable is indexed, means operative where indexing has occurred to transfer the index syllable from the program storage register to said second fast-access memory buffer register, said program counter then comprising means to address said program storage register, means where fill is required to enable said means to perform the fill, means to set said first master control flip-flop, means operative selectively when the syllable is indexed and the syllable is not indexed to transfer the branch address syllable from the program storage register to said second fast-access memory buffer register, means to reset said first memory buffer register, means to reset said first master control flip-flop, means to determine whether the instruction is a phase 2 unconditional transfer instruction and where an unconditional transfer instruction to address a base program register, means to examine the first master control flip-flop for setting and where set, to transfer the index syllable from said second fast-access memory buffer register to the syllable register, means to examine said phase 4 branch flip-flop, and where set to repeat operation of said last three means to address the base program register, to examine the first master control flip-flop for setting and where set to transfer the index syllable from the fast-access buffer register to the syllable register, means to examine in phase 6 whether the instruction is an operand-operand branch, a field branch, a branch on bit, a character select, a transmit to I/O, or an index limit complement instruction, and where any of these to set said second branch flip-flop, then to repeat said three operations of addressing said base program register, determining if the first master control flip-flop is set and when set, transferring the index syllable from the fast-access buffer register to the syllable register, means operative thence regardless of condition of the first master control flip-flop to transfer the branch address from said second fast-access memory buffer register to said first memory buffer register,
means to transfer the base address of the program from the base program register to said second fast-access memory buffer register, thence to add the base address of the program to the branch address syllable to form a full direct branch address,
and means to perform the index process where the syllable is indexed and to store the branch address computed in said first memory buffer register.

101. Means to provide an operand fetch from memory, comprising a memory buffer register,
means to request access to memory,
means operative upon granting of access to transfer a direct address of an operand from said memory buffer register, and
said memory buffer register responsive thereto being adaptive to receive the least significant memory syllable of the operand from memory,
a computer arithmetic unit comprising an A register and a B register, means to transfer said least significant operand syllable from the memory buffer register respectively depending upon whether phase 2 and phase 4 operation selectively to said A register and to said B register of said computer arithmetic unit, said A and B registers thereby comprising destination registers, and
means to effect simultaneous transfer of the next least significant syllable from memory to the memory buffer register,
wherein said transfer to an arithmetic register when in phase 2 is a transfer to the A register and when in phase 4 is a transfer to the B register,
means to shift selectively said A and said B registers right, a number of places corresponding to a syllable,
and to transfer at the next pulse time the next memory syllable to said memory buffer register, and
selectively in accordance with phase 2 and phase 4 operation to transfer the next operand syllable from said memory buffer register selectively to said A register and said B register,
and to shift said last-selected destination register right a number of places corresponding to a syllable,
and to transfer the most significant memory syllable to said memory buffer register,
and selectively depending upon whether a phase 2 or phase 4 fetch, to transfer the next operand syllable from said memory buffer register to one of said A and said B registers and at the same time to shift the destination register to which the operand was transferred right a number of places corresponding to a syllable,
means to reset said memory buffer register,
means to check parity,
means to reset said request means,
means to jump to a starting memory time count designated TM0 and
said means to shift and transfer selectively further comprising means selectively in phase 2 to transfer the most significant operand syllable simultaneously from said memory buffer register to the A register and in phase 4 to transfer the most significant operand syllable from the memory buffer register to the B arithmetic unit register,
and at the same time to shift right a syllable number of bits the destination register into which transfer occurred,
a full word operand then appearing selectively in said A and said B register depending upon selectively phase 2 and phase 4 operation.

102. In a computer, means to effect operations in phases comprising a phase 2, phase 3 and phase 4, a thin-film memory including an operand stack and an arithmetic unit, including an A register, a thin-film memory buffer register, a stack address counter, a syllable counter, means to provide an operand fetch from said stack into said arithmetic unit comprising:
means to determine the phase of operation,
means to determine if the contents of the A register in said arithmetic unit are the same as the contents at the top of said stack,
and means where the contents are the same to determine if a stack normal or hold,
means to effect counting up of the stack address counter, and
to determine whether the instruction is one of a branch on bit, convert binary to floating point and logical complement instruction,
means operative where one of these instructions and said contents are the same to jump to phase for instruction execution, and
where not one of these instructions to jump to phase 4,
means operative where the A register contents are not equal to the stack, to address said stack with said stack address counter,
means to count up said syllable counter,
means to transfer the least significant syllable of the operand from the stack to the thin-film memory buffer register,
means to address the stack and count up the syllable counter,
means selectively when in phase 2 simultaneously to shift the A register a syllable number of places right and when in phase 4 to shift the B register a syllable number of places right,
said means to transfer the least significant syllable from the stack to the thin-film memory buffer register, to address the stack and to count up the syllable counter and to selectively shift a syllable a number of places right respectively when in phase 2, the A register, and when in phase 4, the B register comprising means to effect these operations for the second, third and fourth syllables in the operand stack,
means when in phase 2 and the instruction is one of a branch on bit, convert binary to floating point and logical complement instruction to effect a jump to phase 3 for execution of these last-named instructions, and
when not one of these instructions to effect a jump to phase 4, and
means operative upon the phase 4 transfer to determine whether a floating instruction and
where not a floating instruction to effect a jump to phase 5 for instruction execution.

103. A computer responsive to information contained in a main memory, said computer comprising an arithmetic unit A register,
an auxiliary memory operand stack,
a first auxiliary memory buffer register,
a second main memory buffer register, the A register and the stack each comprising means to contain multi-syllable words, means to store in memory at a location designated by a direct address contained in the second buffer register, comprising:
means to transfer the least significant syllable from the A register to the first buffer register,
means to shift the A register right a number of places corresponding to a syllable, and to transfer the least significant syllable to the most significant syllable in the A register,
means to request access to main memory, and upon gaining access,
to transfer the least significant syllable from the first buffer register to the second buffer register,
means to effect transfer of each sequentially next least syllable of the entire multisyllable word to the second buffer register, means to shift said A register right a number of places corresponding to a syllable on each of said last-mentioned transfers, and
means to transfer the least significant syllable of the A register to its most significant syllable on each of said last-mentioned transfers,
means to transfer a parity bit to said memory buffer register,
means to terminate the request for access to memory and
means to terminate memory timing and to jump to memory time zero, the contents of the A register now being stored at the main memory address intended.

104. A computer, means to operate said computer in phases comprising phase 1, phase 2, phase 3, phase 4, phase 5 and phase 6, an A register including a plurality of syllable retaining means, a thin-film memory stack, a thin-film buffer register means to determine when the A register contents are equal to the stack contents, a stack address counter, and a count up syllable counter, means to store a result, located in the A register in the stack, said means comprising:
means to determine the phase of operation as selectively phase 2, phase 4 and phase 6,
means operative when in phase 1 to reset the means to determine when the A register contents are equal to stack,
means operative selectively when a stack normal operation, to count down the stack address counter and to hold the stack address counter for stack hold,
then for a least significant A register contained results syllable, said stack address counter being operative to address,
means to transfer a syllable from the least significant syllable position of the A register to said thin-film buffer register,
means operative at the same time, to shift said A register right a number of places equal to a syllable,
means to transfer the least significant syllable of the A register to its most significant syllable position, and to count up the syllable counter,
means to effect repeat of the operation for each additional significant syllable in least to most order except for the most significant syllable of said stack address counter, address of the stack of said means to transfer from the A register to the thin-film buffer register and of said means to transfer the then least significant A register syllable to most significant A register location and at a predetermined later memory time,
means to again effect addressing the stack with the stack address counter, to again effect transferring of the most significant syllable of the A register from its least significant syllable postion to the thin-film buffer register,
to again effect shifting of the A register right the number of places corresponding to a syllable,
to again effect transferring of the least significant syllable of the A register to the most significant syllable position of that register,
and to again effect counting up of the syllable counter,
at that time the result in the A register being stored in the stack and
means to set the means to determine that the A register contents are the same as the stack contents, and means operative where the next operand is to be fetched from the top of the stack to the A register to omit this operation thereby saving a plurality of pulse times.

105. A computer to operate in conjunction with a main memory, said computer comprising a memory buffer register, a program count register, a program syllable counter, a program storage register, a program fill flip-flop and a parity flip-flop, means to establish a branch starting with a direct address which is the new program count in the memory buffer register, comprising:
means to transfer the new program count from said memory buffer register to the program count register,
means to reset the program syllable counter to the count of the most significant syllable of the program storage register,
means to request access to the main memory, means responsive to obtaining access to address the main memory with a direct address,
means to receive the least significant memory contained syllable at the addressed location into said memory buffer register,
means to transfer memory syllables syllable-by-syllable from least to most significant from the memory buffer register to the program storage register, and also to receive syllable-by-syllable the next most significant memory syllables in the memory buffer register for transfer to the program storage register,
until finally transfer of the most significant syllable from said memory buffer register to the most significant syllable of said program storage register which was indicated by said program syllable counter is effected,
means to set the program fill flip-flop in accordance with the program storage register having program word information therein, and
means to check parity, said parity flip-flop being responsive to said parity check means,
thereby causing the branch program word to be stored in the program storage register.

106. A computer comprising means operable to execute instructions of said computer in phases, said instructions comprising operator, memory relative address variant and branch syllables, means for executing a plurality of routines in said phases, said routines comprising:
a repeat routine, said means to execute the repeat routine comprising:
a command control repeat flip-flop,
a repeat count register,
a repeat program register,
a base address register,
a base program register,
a repeat increment register,
a command control iterate flip-flop means,
said repeat flip-flop being reset for repeat routine,
the repeat count upon setting the flip-flop in predetermined times of the first phase being decremented by one, and
selectively first where then registering a zero, said repeat flip-flop being reset and said iterate flip-flop being reset upon which the repeat operation is completed, and
selectively second where said repeat count is other than zero, the decremented repeat ground being stored in said repeat count register, and an operator syllable being fetched from said repeat program register,
a function register into which said operator syllable is stored and decoded and subsequent phase operations depending upon the operator of said function register stored instruction,
the first time an instruction is repeated the contents of said base address register being added to the memory relative address syllable, the contents of said base program register being added to the branch relative address syllable where present, and the result being stored in said repeat program register,
means to effect indirect addressing, said means effecting indirect addressing on first repetition only, and after the first repetition,
indexing being accomplished automatically by adding the contents of the appropriate portion of the repeat increment register indicated to a direct address in the corresponding portion of the repeat program register,
where a branch occurs before the repeat count reduces to zero, said program branching and both said repeat and said iterate flip-flops being reset to complete the operation,
where a branch is absent repeated decrementing and repeating execution of the instruction occurring until the repeat count register is decremented to zero.

107. In a computer comprising a program storage register,
means to provide fill of said program storage register whenever the least significant program syllable has been read out therefrom for use in instruction execution,
said means comprising:
a program syllable address counter,
a program fill flip-flop,
memory timing distributor means to provide storing of main memory timing to the computer,
a count-up input syllable counter,
said least significant program syllable being read out by addressing said program storage register with a predetermined count from said program syllable address counter, and simultaneously resetting said program fill flip-flop,
the reset state of said program fill flip-flop then generating a fill signal,
said fill means being initiated by a jump to a predetermined memory time established by said memory timing distributor,
said fill means comprising further a program count register,
a first auxiliary memory buffer register,
a syllable register,
the program count from said program count register being fetched and stored in said auxiliary buffer register,
the contents of said first auxiliary buffer register then being transferred to said syllable register to store possible index syllables,
means to increment the program count in said program count register,
means settable to request access to a main memory,
said incremented program count being stored in said program count register,
a second memory buffer register, said second buffer register accepting a direct address of a program word from main memory,
said program word being transferred into said second buffer register in serial-parallel transfers,
the program word then being transferred in serial-parallel transfers to said program storage register by addressing said program storage register and counting up with said input syllable counter to sequentially transfer each of the memory syllables of the program word into said program register,
said program fill flip-flop being set upon filling said program storage register,
said memory buffer register thereupon being reset, and
said computer thereby jumping to memory time zero.

108. Computer means for providing memory address indexing, said means comprising:
an auxiliary fast-access memory register comprising a plurality of index registers, a first fast-access memory buffer register,
a second memory buffer register,
a syllable register to temporarily store index syllables and capable of storing three index syllables,
said index syllables each comprising a partial address, the partial addresses each comprising a group of bits contained in said syllable register,
the syllable to be indexed being fetched and stored in said second memory buffer register,
means responsive to determination that the first index register of the three index register addresses contained in said syllable register is other than a zero to address the index register corresponding to the address denoted by the first group of bits in said syllable register and to transfer the contents of the index register addressed to said first buffer reigster, said means being means to enable repeated addressing of the index registers which are specified by said syllable register and transfer of contents to said first buffer register,
an adder disposed between said first auxiliary memory muffer register and said second memory buffer register, said adder adding the contents of said index registers sequentially to contents of said second memory register and adding a zero where the index syllable is a zero, until said second memory buffer register contains the complete indexed syllable.

109. Computer means for providing indirect addressing of a memory, said means comprising:
a first and a second compound memory buffer register each comprising a partial syllable portion and a syllable portion,
indirect address flip-flop means responsive to an indirect address most significant bit of a memory relative address syllable in said second buffer to be set,
a base address register,
means to add the contents of the memory relative address syllable to the base address register contents excluding the most significant bit of the relative address by inhibiting the transferring the first bit in the first buffer register and transferring the added remainder to the second buffer,
a memory timing distributor,
interrupt register means,
a phase distributor, and
a timing distributor,
means responsive to said phase distributor and said timing distributor to fetch from the address indicated by the contents of said second buffer register a least significant relative address syllable and store this syllable in said second buffer register syllable portion and to sequentially transfer this syllable to said first memory buffer register syllable portion, and to next transfer a next least significant syllable to said second buffer register syllable portion, said next least significant syllable including a memory module address, an indirect address indicator bit and a snag bit to set up said interrupt flip-flop,
said computer being selectively first responsive to setting of said indirect address flip-flop to transfer said second syllable contents in said second buffer register syllable portion to said first buffer register partial syllable portion and to transfer the indirect address bit from the syllable to the indirect address flip-flops to accordingly set and reset said interrupt address flip-flop,
means responsive to said indirect address flip-flop to selectively continue operations when reset and to enable indirect addressing when set,
said memory timing distributor enabling jumping to a predetermined memory time upon setting of said indirect address flip-flop,
transfer then occurring again of the word at the indirect address into said memory buffer register, in serial-parallel fashion, syllable-by-syllable,
said first syllable being transferred to said first memory buffer register,
said second least significant syllable being examined to determine when upon arrival in said second memory buffer register a predetermined numbered bit is a one, delay means responsive thereto and means to reset said second memory buffer register and subsequent thereto to enable repeating at a next higher level of indirect addressing operations.

110. Computer means for computing a direct address selectively to fetch an operand from and store a result in memory, said means comprising:

a program storage register containing memory address syllables of programs, a first fast-access memory buffer register, a second memory buffer register, a master control flip-flop means, a base address register to store a base address from which direct memory addresses may be computed, means to provide indexing, means to continuously replenish said program storage register with memory words as needed, said last-named means comprising means to determine if fill is required, means to execute a process of filling said program storage register, a program storage address counter, means to provide syllable indexing, adder means responsive to transfer the base address from said base address register to said fast-access memory buffer register to add said base address to said memory address syllable in said first fast-access memory buffer register and store the address in said second memory buffer reigster, means responsive to an indirect address stored in said second memory buffer register to provide an indirect addrssing process until said address is direct, said indexing routine means being responsive to a direct address subsequentially stored in said memory buffer register to index said direct address.

111. Computer means comprising:

a program storage register, means to provide computing of a memory direct address when a branch program word is to be fetched from memory and stored in said program storage register, a program storage register address counter to address syllables in said program storage register, means responsive to said program storage register being empty to cause filling of said program storage register, a syllable register, means responsive to indexed syllables to cause indexing of syllables stored in said program storage register, a first fast-access memory buffer register, a second memory buffer register, a master control flip-flop, branch actuating means comprising branch instruction means corresponding to phases and a branch flip-flop, means to transfer said branch address syllable from said program storage register to said first fast-access memory buffer register, and to reset said master control flip-flop and said second memory buffer register, means responsive to setting of said branch actuating means and of said master control flip-flop to transfer index syllables from said fast-access first buffer register to said syllable register, a base program register means responsive to said branch actuation means to address said base program register, said branch address thereby being transferred from said first fast-access memory buffer register to said second memory buffer register and said base address of program being transferred from said base program register to said fast-access memory buffer register, means to add the base address of the program in said first buffer register to said branch address syllable in said second memory buffer register to form a full length direct branch address, and means selectively responsive to indication of indexing of the syllable of the branch direct address to provide respective indexing and to omit indexing of said direct branch address as indicated, subsequently, said last-named branch address being stored in said second memory buffer register.

112. In a computer, an arithmetic unit comprising an A register and a B register, means to transfer an operand from a main memory portion to said arithmetic unit when a memory direct address has been computed, said means comprising:

memory buffer means to store an address from the main memory, means to effect serial-parallel transfer from the main memory to said storage means and simultaneously effect serial-parallel transfer syllable by syllable from said memory buffer storage means to said arithmetic unit, said computer further comprising:

phase distributor means to effect computer operation in a plurality of sequential phases including a second phase and a fourth phase, means responsive to operation in said second phase to enable transfer of syllables from said memory buffer register into the A register of said arithmetic unit, means responsive to operation in said fourth phase to transfer said syllable from said memory buffer register to said B register, arithmetic unit means causing shift right syllable by syllable as transfer thereinto of syllables from said memory buffer register are effected, means operative upon said sequential transfer of words from the memory, syllable by syllable, into said memory buffer register and thence into said selective A and B registers to shift right the contents of the selective A and B registers into which transfer is effected, syllable by syllable, for each syllable transfer thereinto, until the most significant memory syllable has been transferred into said arithmetic unit, means to reset said memory buffer register, and means to check parity of said transferred operand.

113. Computer means to provide an operand fetch from stack, said means comprising:

an auxiliary fast-access memory comprising an operand stack, a syllable counter to count the syllables in each register of said operand stack, said operand stack comprising a fixed plurality of stack registers in circular rotating arrangement with respect to a pointer, a stack address counter to count up the stack and point to the stack register currently at the top of the stack, means to set said stack selectively for normal rotating operation and hold operation, wherein in the case of a fetch, the stack is stepped in upwardly counting counterclockwise rotational order, an arithmetic register comprising an A register and a B register, flip-flop means responsive to said arithmetic unit A register contents equalling the contents in the top of the said stack, said computer further comprising means to operate in a plurality of phases including a second phase and a fourth phase, a fast-access memory buffer register, means to shift each of said arithmetic registers a plurality of places corresponding to a full syllable, a syllable counter, a command of operand fetch from stack causing determination to be made as to whether phase 2 or phase 4, means responsive when said A register is the same as the contents of said stack selectively determining stack normal and hold, and counting up said stack address counter accordingly, further means responsive when said A register is not equal to the stack to cause said stack address counter to address the stack and said syllable counter to be counted up, transfer of the least significant syllable of the operand thereby occurring from said stack to said fast-access buffer register, said syllable counter thereupon being counted up, subsequently transferring sequentially next syllables from said operand stack at the top of the stack to said fast-access memory buffer register in order and simultaneously transferring selectively from said fast-access memory buffer register to said A and said B register in accordance wtih selective ascertaining that the operation is phase 2 and phase 4, simultaneously shifting right a full syllable amount of places with the transfer of syllables of said operand from said fast-access memory buffer register to the most significant syllable of said selected arithmetic register, whence at the end of said transfer said A register in phase 2 and said B register in phase 4 contains the word which was in the register at the top of said stack, and means responsive to phase 2 determination and phase 3 executed instructions to initiate third phase operations and to phase 4 executed instructions to initiate fourth phase operations and when not a floating instruction to initiate fifth phase operations.

114. A computer responsive to program instructions comprising syllable strings to execute the instructions, comprising computer means responsive to a floating add instruction to add contents of a pair of operands in floating-point format to provide a stored normalized floating-point sum, said computer means comprising:

subcommand matrix and controls means and phase distributor means which in conjunction cause operation of said computer in phases including phases 1, 2, 3, an operand stack, an arithmetic unit including an A register, a B register, a C register, and an adder, a multiply-divide counter to determine shifting of said A and C registers, means to complement the contents of said A register, a plurality of program overflow flip-flop means including a program overflow, a program underflow and a program not normalized flip-flop, said subcommand matrix and controls means in conjunction with said arithmetic unit being operative in phase 2 to fetch the augend selectively from stack and memory and store it in said A register, operative in phase 4 to fetch the addend selectively from stack and memory and store it in said B register, and operative in phase 3 to transfer the exponent of said augend to said C register, and to subtract the addend exponent from said augend exponent leaving the difference result in said A register, magnitude of this difference being determined by the condition of the first bit in said A register, means responsive to the difference being less than the maximum amount of exponent able to be handled to transfer the augend exponent to said C register, and to reset each of the exponent portion bits of said A and B registers, means responsive to a positive too large difference to interchange the contents of said A and said B registers, and where the difference is not positive to transfer the augend exponent from said C register to said A register, means to select the operand with the most positive exponent, and to store the contents of said A register selectively in stack and in the memory location relatively indicated by an address syllable of the instruction, means operative in the phase 3 operation to permit overlap and to determine that the difference in exponents is selectively equal to and greater than the total length permitted for said exponents, where said difference is less than the total length transferring the contents of a preselected number of bits from said A register to said multiply-divide shift counter, and where greater selectively shifting and leaving in the three most significant syllables of said A register, the mantissa whose exponent is algebraically less, the contents of said A register being shifted right according to the count in said multiply-divide counter, performing an end-around carry propagate where the most significant bit of said A register then equals the most significant bit of said B register, said adder means being operative to add the contents of said A and B registers leaving the sum in said A register, further means responsive to the bits except for the most significant bit of said A register equalling zero to insert a floating point zero in said A register, said program underflow flip-flop being responsive to this condition, storing the contents of the A register in the stack or the memory location relatively indicated by said address syllable, means where all except the most significant bit of said A register does not equal zero, to shift the contents of said A register right one place selectively in overflow condition of said A register and when not in overflow condition normalizing said A register by shifting left until the second most significant bit in said A register is a one and counting up the multiply-divide counter by one each time said shift occurs, responsively the contents of said A register being shifted right a number of places corresponding to a syllable and the exponent being transferred from said C register to said A register in the most significant bit positions equal to the contents of said C register, said computer in said phase 3 responsively algebraically subtracting the number of shifts from the exponent and determining if overflow occurs so that where overflow is absent the contents of the A register are stored selectively in stack and memory as instructed, and where overflow occurs a floating point zero is inserted in said A register and said program underflow flip-flop is set, when all but the most significant bit of said A register does not equal zero and control conditions show that the difference in exponents was equal to or greater than the mantissa number of bits, the contents of said A register being shifted right one place transferring the contents of an overflow bit into said second most significant syllable of said A register, to then during said phase 3 operation shift the contents of said A register right a syllable number of places, transferring the exponent from said C register to the corresponding most significant bits equal to the C register length to said A register, thence algebraically adding one to the exponent, checking if overflow occurred and subsequently selectively first setting the program overflow flip-flop accordingly and then directly storing the contents of the A register selectively in said stack and in the memory location relatively indicated by the address syllable, where overflow occurred upon examination and the floating-point zero was inserted into said A register and the program underflow flip-flop was set, thence storing the contents of said A register selectively in stack and in the memory location relatively indicated by address syllable.

115. A computer comprising means to operate upon instructions upon strings of syllables including an operator syllable for each instruction in order numbered phases, said computer means comprising means to cause an index limit compare operation in accordance with an index limit compare instruction, said last-named means comprising a plurality of index registers, an index increment register, a limit register, a syllable register, a first fast-access memory buffer register, a second memory buffer register, a branch flip-flop, and a program storage register, said syllables further including special syllables and branch syllables, said computer further comprising means to fetch the operator syllable during phase 1, and further comprising means to fetch a special increment syllable to modify the index register concerned in phase 2, said special increment syllable being stored in said index increment register, said computer further comprising means to fetch the special syllable which contains a limit register address, an index register address and the manner in which the index register is to be modified and compared with the limit register and to store said special syllable in said syllable register in phase 4, said computer further comprising means to fetch and increment from the index increment register and to store said increment in said memory buffer register in phase 5, said computer further comprising means to store the contents of the index register the address of which is in first predetermined bit positions of said syllable register in said first fast-access memory buffer register, and depending upon the setting of the most significant syllable register bit, selectively where set and further comprising means to subtract the increment from the contents of said index register, and to leave the result in said second memory buffer register, and where reset to add the increment to the contents of the index register concerned leaving the sum in said second memory buffer register said computer comprising means to then store the contents of said memory buffer register in the index register concerned, where the address of said limit register in second predetermined bit positions in said syllable register are equal to zero, and to store the zero in said first-access memory buffer register, and where the address of the limit register is not equal to zero, to fetch the contents of the limit register whose address is in the second predetermined bit positions in said syllable register and to store them in said first buffer register, said computer further comprising means to compare the index register contents with the limit register contents and depending upon predetermined bit settings in said syllable register and the contents of the index register compared with the contents of the limit register, accordingly to selectively set and reset said branch flip-flop, and to read said branch syllable, and where the said branch flip-flop is set, and to fetch the next program word from the memory location respectively relatively indicated by the branch syllable and to store it in said program storage register and both subsequent to this last store where the branch flip-flop is set and immediately where said branch flip-flop is reset to terminate by jumping to the next instruction.

116. In a computer system comprising a computer and a main memory, said computer comprising:

a fast-access operand stack, an arithmetic unit comprising an A register, a B register, and a first, short, single-syllable C register, a multiply-divide counter, a first and a second program storage register, a second multi-syllable fast-access memory C register, an overflow sensing flip-flop, means to perform a binary division operation comprising means responsive to a binary divide instruction to effect fetching of a dividend selectively from said stack or the main memory as instructed and to store the dividend in said A register, means responsive to the binary divide instruction to effect fetching of a divisor selectively from stack or from the main memory as instructed and to store the divisor in said B register and setting a binary count of 48 in said multiply-divide counter, means responsive to said binary divide instruction to complement the contents of said A register to perform said binary division operations substantially in A register complemented contents condition, said overflow sensing flip-flop being set, said multiply-divide counter then counting down by one;

where the dividend in said A register is greater than the divisor in said B register subtracting and inserting a quotient bit in said first short C register in least significant bit position, then shifting the contents of said A register and said C register left one place therewith, transferring the setting of the second most significant bit of said A register into said overflow sensing flip-flop and setting the least significant bit of said A register, where the contents of the multiply-divide counter does not equal a multiple of 12, after time for carry propagation counting the multiply-divide counter down by one and recycling until equal to 12, when said multiply-divide counter count equals 36, setting the first bit of said first short C register, setting said program overflow flip-flop to indicate that the original dividend is greater in absolute value than the divisor, fetching a negative sign and storing it in the most significant syllable of the quotient selectively when the first most significant bit of the first C register is set and when said overflow-sensing flip-flop is set to the most significant syllable of the quotient indicating that the signs of the original operands were different, where the multiply-divide counter is other than equal to 36 and also when the negative sign is attached storing the contents of said first short C register in said second fast-operand full length C register, said program storage register being examined for overlap, when overlap occurs and one of the program storage registers is empty, storing of the next program word in the empty program storage register being effected, where said multiply-divide counter is other than zero recycling by counting said multiply-divide counter down by one and where said multiply-divide counter is equal to zero, complementing said A register and interchanging said A register contents comprising the remainder with the contents of said second fast-access, full length C register which contains the quotient, determining if all except the most significant bit of said A register equals zero and where so, resetting the sign of the quotient and storing the contents of said A register, and where not equal to zero directly storing the contents of said A register which contain the quotient selectively in the stack and in the memory location relatively indicated by the addressed syllable in accordance with the binary divide instruction.

117. Computer means to effect a binary division comprising:

an arithmetic unit comprising, an A register, a B register, and a syllable length C register;

a full length fast-access C register, a multiply-divide counter, means to operate said A register in dividend complemented condition during the binary division operation, said syllable length C register in conjunction with said full-length C register enabling division a syllable at a time, intermediate results being kept in said A register continuously as the binary divide execution is being performed, said multiply-divide counter being operative in multiple counts of 12 to effect transfer of the contents of said syllable length C register into said fast-access full length C register when said D counter is counted to zero, the quotient then being contained in said fast-access C register and being interchangeable with the contents of said A register comprising the remainder.

118. A computer comprising memory means responsive to operands fed thereinto, means to effect a character search comprising:

a syllable register, a character count register, a first and a second buffer register, a multiply-divide shift counter, to perform 1, 6, and 12 place right shifts, left one place shift, and end-around logical operations, comparator means, branch flip-flop means, and an A register wherein upon initiating a character search instruction and storing an operand in said A register, the computer operates to store a special syllable in said syllable register to fetch a character count from the said character count register storing it in said first buffer register and clearing said second buffer register, the complement of said character count being set in said multiply-divide register, said computer further clearing said first buffer register, determining if the character count is zero and when other than zero count incrementing said second buffer register by one, shifting said A register right 6 places end-around logical, and incrementing said multiply-divide shift register by one until said multiply-divide shift register registers a zero, then when said character count is zero, comparing the least significant predetermined number of bits with a same predetermined number of bits of said syllable register, said predetermined number of bits comprising the bits for a character, where said characters are equal setting said branch flip-flop and where not equal, incrementing said second buffer register, shifting said A register right 6 places end-around logical, and recycling by comparing said characters until equal characters are found to cause a set of a branch or a last comparison indicating that no characters are equal occurs, upon said last comparison storing a zero in said character count register and when said branch flip-flop is set upon characters being equal, complementing said second buffer register, storing the position at which equality was obtained in said character count register, thence upon said branch flip-flop being set, fetching a branch program word from a second main memory to said program storage register, and where said branch flip-flop is reset completing said character search.

119. A computer comprising:

a repeat count register, a syllable register, a repeat increment register, a repeat program register, and iterate flip-flop control means, said computer being operative to operate upon instructions, said repeat count register upon a repeat command being operative to store a special syllable which syllable indicates the repeat count, said syllable register pursuant thereto being operative to store a repeat increment special syllable, the contents of predetermined specified bits then being stored in predetermined bit positions in said repeat increment register, predetermined other contents of said syllable register thence being transferred to the next least significant repeat increment register bit positions and the contents of said most significant predetermined number of bits being stored in the most significant repeat increment register, means to fetch an instruction to be repeated from its location relatively indicated by an address syllable and store this instruction in said repeat program register, said storing thereby setting said iterate flip-flop, and means responsive to said setting of said iterate flip-flop to perform the instructions stored in said repeat program register the number of times indicated in said repeat count register unless interrupted by a branch.

120. A computer comprising means to perform a strip and adjust field instruction, said compute comprising:

an arithmetic unit comprising an A register which stores an operand, syllable register means responsive to a program special syllable comprising predetermined bits which describe the beginning and length of field to be stripped and the number of characters by which the field must be shifted before being stored to store said special syllable, means to strip the contents of said A register by resetting the A register except for the field defined by the predetermined bits in said syllable register to determine length and the predetermined bits to determine where the beginning of stripping shall occur, means to cause end-around shifting of said field which comprises the contents of said A register, a predetermined number of times and a predetermined number of places to the right in accordance with predetermined bit contents in predetermined bit positions in said syllable register, and means to store said A register contents after shifting and stripping as relatively indicated by said instruction.

121. In a computer system comprising a main memory and a computer, said computer comprising:

a thin-film control register and stack containing section, an arithmetic unit comprising an A register, a B register and a syllable length C register, a subcommand matrix and controls section including a predetermined bit length multiply-divide shift register counter, said computer providing selectively single and double shifts, end-around and end-off, logical and arithmetic, long shift of both thin-film and A register and single shift of A register, and in one, six and twelve places to the right and one place to the left;

a syllable register to store special variant syllables, said thin-film control and storage means including an auxiliary thin-film C register of length equal to the A register length so as to contain a multiple of the contents of said syllable length C register in said arithmetic unit, a first and second buffer register, in sequence upon a shift instruction, data being fetched selectively from the main memory and from said stack in accordance with instruction indication of stack or memory and stored in said A register, the special syllable being fetched and stored in said syllable register, said special syllable determining the type of shift and the number of places the contents of said A register is to be shifted, a predetermined group of bits of said syllable register special syllable bits equal to the multiply-divide counter total bits being transferred to said multiply-divide shift register counter, means responsive to a predetermined set bit setting of the special syllable in said syllable register to perform the single shift selectively shifting right and left, and logically and arithmetic, including and excluding the first most significant bit of said A register, end-off and end-around, inserting selectively zeroes and selectively the contents of the end of the A register, further selectively one place at a time, left twelve places at a time, six places at a time and one place at a time, right depending upon the count in said multiply-divide counter being respectively greater than twelve, less than twelve and equal to or greater than six and less than six, means responsive to said bit indicating a double shift and selectively to determination of a right shift whereupon the least significant syllable of said A register is transferred temporarily to said first buffer register and then to said syllable length C register, and to determinaton of a left shift and end-off whereupon said syllable length C register is reset and where a left shift end-around, transferring the contents of the most significant syllable of said A register to said syllable length C register, thence transferring the contents of said thin-film C register to said A register while shifting the contents of said A register to said B register, temporarily storing the least significant syllable of said thin-film C register in said second buffer register, then shifting the contents of the thin-film C register, shifting the contents of said A register and said syllable length C register one place at a time, the number of shifts of said thin-film C register being limited to twelve upon right shifts and upon logical left shift, and being limited to eleven for arithmetic left shift, a logical shift including the most significant bit of said syllable length C register while an arithmetic shift excludes said most significant bit of said syllable length C register, thence if not a right shift transferring the most significant syllable of said thin-film C register which is still in said first buffer register into said syllable length C register, where a right shift and not an end-off shift, transferring the contents of said second buffer register which is the original least significant syllable of said thin-film C register to said first buffer register and then to said syllable length C register, and where a right, end-off shift resetting said syllable length arithmetic unit C register and in any one of said right shift, end-off and reset C register and inverse cases, storing the shifted contents of said A register back into said thin-film C register, shifting the original contents of said A register from said B register to said A register and shifting the original contents of said A register, the number of shifts being limited to twelve where a right shift or logical left shift and to eleven where an arithmetic left shift, thence storing the contents of said A register in the selective stack or memory location relatively indicated by the address syllable.

122. A computer responsive to instructions including subroutine jump instructions, said subroutine jump instructions incorporating special syllables for jump address and jump increment, said computer comprising:

a first and a second buffer register, a fast-access memory including a subroutine address register, a base address register, a subroutine storage register, a base program register, at least one index register, and a program count register, wherein upon fetching a special syllable indicating a jump address, the subroutine address register contents are added to the jump address syllable and stored in said second buffer register, and the sum is used to fetch into said first buffer register a subroutine starting address, the subroutine starting address thence being transferred from said second to said first buffer register, the contents of the base address register then being stored in the least significant stage of the subroutine storage register, the contents of the base program register being stored in the next least significant stage of the subroutine storage register, subsequently the subroutine starting address being transferred from said second buffer register to said base program register, the special syllable for jump increment being added to said base address register contents and stored in said base address register to comprise the base address to be used in the subroutine, the subroutine base address comprising the new base address register contents being then fetched and stored in said second buffer register, the subroutine starting address comprising the new contents of the base program registered being fetched and stored in said first buffer register, the subroutine base address being subtracted from the subroutine starting address, the result being stored in said index register, where overlap did not immediately precede this subroutine jump instruction, storing the contents of the program count register in the most significant stage of said subroutine storage register, said subroutine storage register having three stages, where overlap is performed immediately preceding this subroutine jump instruction, reading the contents of said program count register, subtracting one, and storing the result in the most significant stage of said subroutine storage register, selectively where overlap and where no overlap has preceded the instruction reading the subroutine starting address from said base program register and storing it in said program count register, then responsive to said program count register fetching said first program word of the subroutine and storing it in said program storage register.

123. In a computer system comprising a computer module, at least a first plurality of input/output control modules commonly connected on a first bus, a shared main memory, and wherein said computer is operable on instructions comprising strings of syllables and in a control mode, said computer comprising means to operate in phases including first, second and fourth phases, an arithmetic unit including a C register, a program storage register and a branch flip-flop, said computer system comprising:

means to fetch an operator in the first phase, means to fetch a special syllable in the second phase, the two least significant bits of the special syllable determining a bus address and whether or not a branch occurs at the end of this instruction, and storing the syllable in said C register, means to fetch a syllable corresponding to the relative memory address of a descriptor in the fourth phase, and selectively conditionally and unconditionally to transmit this descriptor to all I/O control modules connected to a selected bus, said C register comprising a first predetermined bit which when reset indicates said first bus and when set indicates a second bus to which said I/O control modules may be connectible, where a second predetermined bit of said C register is reset, this determining that all I/O control modules on the selected bus are busy, means to accordingly set the branch flip-flop and then to read the branch syllable, and where not busy to directly read the branch syllable, said second bit being set in said C register causing said branch syllable to be read, means subsequently when said branch flip-flop is set to execute the next instruction and when said branch flip-flop is reset to fetch the next program word from the memory location relatively indicated by the branch syllable and to store it in the program storage register.

124. Computer means to execute a binary-add, field operation, said means comprising:

an arithmetic unit comprising an A and a B register, a fast-access memory comprising a fast-access C register to temporarily store the contents of said arithmetic unit A register and an operand stack comprising rotatable stack registers any one of which may be temporarily rotated to top of stack position, means responsive to an operator syllable to fetch an operand and to store the operand in said A register, a syllable register to hold a special syllable which defines a field to be logically added to a corresponding field taken from the contents of the top of the stack, means to strip the contents of said A register by resetting said A register except as to the field defined by first group predetermined bits of said special syllable in said syllable register to determine length and second group predetermined bits of said special syllable in said syllable register to determine beginning, means to shift said field into said B register while reading the contents of the top of said stack into said A register, means to determine the logical binary sum of the contents of said A and B registers, the results being left in said A register, means to strip the contents of said A register by resetting the A register except the field defined by said above-mentioned special syllable first group bits determining length and said above-mentioned special syllable second group bits determining beginning in said syllable register, means to shift this new field into said B register while reading the original operand from said fast-access C register into said A register, means to insert zeros in the contents of said A register in accordance with said first and second groups of predetermined bits of said syllable register determining length and for determining beginning, means to replace the zeros just inserted with the field frcm said B register, said arithmetic unit further comprising end-around shift means to shift the contents of said A register a number of times indicated by a third group of predetermined bits of the special syllable in said syllable register a shift of six places to the right for each of said number of times indicated by said third group, said A register contents thereafter being stored selectively in a stack and in a memory location as relatively indicated and in the memory core determined by an address syllable.

125. In a computer, means for providing indirect addressing, said means comprising:

an indirect address control means, a first and a second register, each of less bits than required to make a memory word syllable, a base address register of bit capacity to handle a computer memory address, means to store a relative address syllable in said first register, means to transfer said relative address syllable except for the most significant bit of said relative address syllable from said first to said second register and to transfer said most significant bit to said indirect address control means, means to transfer the contents of said base address register to said first register, an adder to add the contents of said first and said second registers, means responsive to reset condition of said indirect address control means to selectively fetch and store a data word in accordance with said first and second register added contents and selectively where said indirect control device is set, first to transfer a least significant syllable designated by said added contents of said first and second registers to said second register and second to transfer the next least significant syllable to said second register and transfer the least significant syllable from said second register to said first register, means responsive to a predetermined indirect address indicator bit in said second register selectively where said bit is in a first condition to initiate selectively a fetch or a store of a data word in accordance with the now direct address and where said indirect address indicator bit is in a second condition to reiteratively check parity, reset said second register, add the contents of said first and second registers, examine said indirect address means and accordingly selectively first, as required, fetch or store a data word, and secondly, to reiteratively check parity, reset said second register, add the contents of said first and second registers and where said indirect address control device is set in accordance with the added contents of said first and second registers to transfer the least significant syllable to said second register, transfer the next syllable to said second register and transfer the least significant syllable from said second register to said first register and in accordance with the successive indirect address indicator bits to reiteratively repeat said operation until the indirect address indicator bit permits selective fetching and storing of a data word.

126. In a system comprising a computer and a main memory responsive to computer time and memory time counting, said computer comprising means to effect delays and jumps in timing, means to operate in a plurality of phase of computer operation, said computer further comprising a plurality of memory buffer registers, program storage registers, index registers, arithmetic unit registers and control initiating units, a base address register, and auxiliary storage means to temporarily store data for arithmetic and manipulatory operation, said registers, units and means being adapted to cooperate in cooperating relationship with the main memory, said computer still further comprising means to execute functions required in said phases, said last-named function executing means comprising means to selectively perform fill, indexing, indirect address, memory address compute, operand fetch and store result and branch processes as required, said means to perform a fill comprising means to transfer syllables from main memory to said program storage registers at predetermined memory timing counts, said means to perform indexing comprising means to add contents of said index registers to contents of said buffer registers in accordance with computer timing predetermined counts, said means to perform indirect addressing comprising means to examine a relative address and successive levels of addresses in memory as successively containing reference to further addresses until a direct address is obtained and to transfer the information at said direct address into required computer positions, said means to compute a memory address comprising means acting in accordance with computer and memory timing counts as predetermined to transfer relative and base syllables to said buffer registers and to compute successively until required memory addresses at which information may be obtained are determined.

said means to provide operand fetches and store of results comprising means to act in accordance with said computer and said memory timing counts and in conjunction with requirements for fill and transfer to transfer information into said buffer registers and to perform computation upon said information and to transfer base addresses and further to perform computations and to fetch and to store in accordance with the addresses determined by said computations, said means to provide to perform a branch comprising means operative at predetermined memory timing counts to manipulate program counting and to effect transfer to thereby conduct operations as determined by the need to terminate a first sequence of operations and to embark upon a second sequence of operations.

References Cited by the Examiner

UNITED STATES PATENTS

| | | | |
|---|---|---|---|
| 2,936,116 | 5/1960 | Adamson et al. | 235—164 |
| 2,957,626 | 10/1960 | Havens et al. | 235—153 |
| 3,074,636 | 1/1963 | Baker et al. | 340—172.5 |
| 3,077,580 | 2/1963 | Underwood | 340—172.5 |

MALCOLM A. MORRISON, *Primary Examiner.*

ROBERT C. BAILEY, *Examiner.*

M. A. LERNER, M. SPIVAK, *Assistant Examiners.*